US010961873B2

(12) United States Patent
Noureldin et al.

(10) Patent No.: US 10,961,873 B2
(45) Date of Patent: Mar. 30, 2021

(54) POWER GENERATION FROM WASTE ENERGY IN INDUSTRIAL FACILITIES

(71) Applicant: Saudi Arabian Oil Company, Dhahran (SA)

(72) Inventors: Mahmoud Bahy Mahmoud Noureldin, Dhahran (SA); Hani Mohammed Al Saed, Jubail Ind. (SA); Ahmad Saleh Bunaiyan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 658 days.

(21) Appl. No.: 15/718,687

(22) Filed: Sep. 28, 2017

(65) Prior Publication Data

US 2018/0016946 A1 Jan. 18, 2018

Related U.S. Application Data

(63) Continuation of application No. 15/087,403, filed on Mar. 31, 2016, now Pat. No. 9,803,505, and a
(Continued)

(51) Int. Cl.
*F01K 13/02* (2006.01)
*C10G 59/00* (2006.01)
(Continued)

(52) U.S. Cl.
CPC .............. *F01K 13/02* (2013.01); *C10G 53/04* (2013.01); *C10G 55/00* (2013.01); *C10G 57/00* (2013.01);
(Continued)

(58) Field of Classification Search
CPC ........ F01K 13/00; F01K 23/06; F01K 23/064; F01K 23/067; F01K 23/068; F01K 3/18;
(Continued)

(56) References Cited

U.S. PATENT DOCUMENTS 3,995,428 A 12/1976 Roberts
4,024,908 A 5/1977 Meckler
(Continued)

FOREIGN PATENT DOCUMENTS

CN 85106253 4/1986
CN 1688796 10/2005
(Continued)

OTHER PUBLICATIONS

Chinese Office Action in Chinese Appln. No. 201680061069.2, dated Sep. 9, 2019, 20 pages (with English translation).
(Continued)

*Primary Examiner* — Mark A Laurenzi
*Assistant Examiner* — Mickey H France
(74) *Attorney, Agent, or Firm* — Fish & Richardson P.C.

(57) ABSTRACT

Optimizing power generation from waste heat in large industrial facilities such as petroleum refineries by utilizing a subset of all available hot source streams selected based, in part, on considerations for example, capital cost, ease of operation, economics of scale power generation, a number of ORC machines to be operated, operating conditions of each ORC machine, combinations of them, or other considerations are described. Recognizing that several subsets of hot sources can be identified from among the available hot sources in a large petroleum refinery, subsets of hot sources that are optimized to provide waste heat to one or more ORC machines for power generation are also described. Further, recognizing that the utilization of waste heat from all available hot sources in a mega-site such as a petroleum refinery and aromatics complex is not necessarily or not always the best option, hot source units in petroleum refineries from which waste heat can be consolidated to power the one or more ORC machines are identified.

28 Claims, 186 Drawing Sheets

Related U.S. Application Data continuation of application No. 15/087,329, filed on Mar. 31, 2016, now Pat. No. 9,803,930, and a continuation of application No. 15/087,512, filed on Mar. 31, 2016, now Pat. No. 9,803,513, and a continuation of application No. 15/087,606, filed on Mar. 31, 2016, now Pat. No. 9,803,508, and a continuation of application No. 15/087,412, filed on Mar. 31, 2016, now Pat. No. 9,803,506, and a continuation of application No. 15/087,503, filed on Mar. 31, 2016, now Pat. No. 9,816,759, and a continuation of application No. 15/087,440, filed on Mar. 31, 2016, now Pat. No. 9,803,507, and a continuation of application No. 15/087,518, filed on Mar. 31, 2016, now Pat. No. 9,803,511, and a continuation of application No. 15/087,441, filed on Mar. 31, 2016, now Pat. No. 9,803,509, and a continuation of application No. 15/087,499, filed on Mar. 31, 2016, now Pat. No. 9,803,145.

(60) Provisional application No. 62/209,217, filed on Aug. 24, 2015, provisional application No. 62/209,147, filed on Aug. 24, 2015, provisional application No. 62/209,188, filed on Aug. 24, 2015, provisional application No. 62/209,223, filed on Aug. 24, 2015.

(51) Int. Cl.

| | |
|---|---|
| ***C10G 61/00*** | (2006.01) |
| ***C10G 63/00*** | (2006.01) |
| ***F01K 3/00*** | (2006.01) |
| ***F01K 27/00*** | (2006.01) |
| ***C10G 53/04*** | (2006.01) |
| ***C10G 55/00*** | (2006.01) |
| ***C10G 61/10*** | (2006.01) |
| ***C10G 57/00*** | (2006.01) |
| ***F01D 17/14*** | (2006.01) |
| ***F01K 3/18*** | (2006.01) |
| ***H02K 7/18*** | (2006.01) |
| ***C10G 99/00*** | (2006.01) |

(52) U.S. Cl.

CPC ............ *C10G 59/00* (2013.01); *C10G 61/00* (2013.01); *C10G 61/10* (2013.01); *C10G 63/00* (2013.01); *C10G 99/00* (2013.01); *F01D 17/145* (2013.01); *F01K 3/00* (2013.01); *F01K 3/185* (2013.01); *F01K 27/00* (2013.01); *H02K 7/1823* (2013.01); *C10G 2300/00* (2013.01); *C10G 2300/4006* (2013.01); *C10G 2400/30* (2013.01); *Y02P 30/00* (2015.11)

(58) Field of Classification Search

CPC . F01K 3/185; F01K 3/188; F01K 3/22; F01K 3/24; F01K 3/245; F01K 13/02; F01K 15/00; F01K 21/00; F01K 25/00; F01K 25/08; F01K 25/10; F01K 25/103; F01K 25/106; F01K 25/14

USPC .................. 60/643, 645–648, 651–653, 660, 60/662–664, 667, 670, 671, 676

See application file for complete search history.

(56) References Cited

U.S. PATENT DOCUMENTS 4,109,469 A 8/1978 Carson
4,291,232 A 9/1981 Cardone
4,428,201 A 1/1984 Carson
4,471,619 A 9/1984 Nolley, Jr.
4,476,680 A 10/1984 Pollman
4,512,155 A 4/1985 Sheinbaum
4,792,390 A 12/1988 Staggs
4,962,238 A 10/1990 Wolfe
5,005,360 A 4/1991 McMurtry
5,007,240 A 4/1991 Ishida
5,164,070 A 11/1992 Munro
5,240,476 A 8/1993 Hegarty
5,497,624 A 3/1996 Amir
5,562,190 A 10/1996 McArthur
5,667,051 A 9/1997 Goldberg
5,685,152 A 11/1997 Sterling
5,740,677 A 4/1998 Vestesen
5,804,060 A 9/1998 Benguigui et al.
6,041,849 A 3/2000 Karl
6,733,636 B1 5/2004 Heins
7,340,899 B1 3/2008 Rubak
8,046,999 B2 11/2011 Doty
8,529,202 B2 9/2013 Zhang
9,328,634 B2 5/2016 Ikegami
9,334,760 B2 5/2016 Ernst
9,518,497 B2 12/2016 Tricaud
9,562,201 B2 2/2017 Noureldin
9,803,145 B2 * 10/2017 Noureldin .......... B01D 53/8603
9,803,505 B2 * 10/2017 Noureldin .............. C10G 57/00
9,803,506 B2 * 10/2017 Noureldin .............. C10G 69/00
9,803,507 B2 * 10/2017 Noureldin ............... F01K 3/185
9,803,508 B2 * 10/2017 Noureldin ............... F01K 27/00
9,803,509 B2 * 10/2017 Noureldin .............. B01D 53/48
9,803,511 B2 * 10/2017 Noureldin .............. C10G 69/00
9,803,513 B2 * 10/2017 Noureldin .............. C10G 45/02
9,816,759 B2 * 11/2017 Noureldin .............. B01D 3/007
2004/0088993 A1 5/2004 Radcliff et al.
2006/0010872 A1 1/2006 Singh
2008/0128134 A1 6/2008 Mudunuri
2008/0174115 A1 7/2008 Lambirth
2008/0257413 A1 10/2008 Noureldin
2008/0289588 A1 11/2008 Wees et al.
2008/0307789 A1 12/2008 Mak
2008/0314726 A1 12/2008 Choros
2009/0000299 A1 1/2009 Ast
2009/0000906 A1 1/2009 Petri
2009/0071652 A1 3/2009 Vinegar
2009/0225929 A1 9/2009 Genta et al.
2009/0287029 A1 11/2009 Anumakonda et al.
2009/0301087 A1 12/2009 Borissov et al.
2010/0076238 A1 3/2010 Brandvold
2010/0146974 A1 6/2010 Ast
2010/0242476 A1 9/2010 Ast
2010/0263380 A1 10/2010 Biederman
2010/0319346 A1 12/2010 Ast
2010/0326076 A1 12/2010 Ast
2010/0326098 A1 12/2010 Rog
2011/0016863 A1 1/2011 Ernst
2011/0041500 A1 2/2011 Riley
2011/0072819 A1 3/2011 Silva et al.
2011/0072820 A1 3/2011 Finkenrath
2011/0083437 A1 4/2011 Ast
2011/0158858 A1 6/2011 Alves
2011/0203289 A1 8/2011 Gutierrez
2011/0314844 A1 12/2011 Gu et al.
2012/0000175 A1 1/2012 Wormser
2012/0031096 A1 2/2012 Acikgoz et al.
2012/0047889 A1 3/2012 Acikgoz et al.
2012/0073951 A1 * 3/2012 Noe ........................ B01D 3/40
203/3
2012/0085095 A1 4/2012 Penton et al.
2012/0085096 A1 4/2012 Penton et al.
2012/0085097 A1 4/2012 Penton et al.
2012/0087783 A1 4/2012 Zhang
2012/0131921 A1 5/2012 Held
2012/0145050 A1 6/2012 Fisenko
2012/0192560 A1 8/2012 Ernst et al.
2012/0192563 A1 8/2012 Kauffman
2012/0198768 A1 8/2012 Khosravian
2012/0204817 A1 8/2012 Scherffius
2012/0234263 A1 9/2012 Van Wees et al.
2012/0279728 A1 11/2012 Northrop
2012/0279900 A1 11/2012 Noureldin et al.
2012/0285169 A1 11/2012 Freund

(56) References Cited

U.S. PATENT DOCUMENTS

| | | | |
|---|---|---|---|
| 2013/0047574 | A1 | 2/2013 | Kidambi |
| 2013/0062883 | A1 | 3/2013 | Kaneeda |
| 2013/0081977 | A1 | 4/2013 | Woo et al. |
| 2013/0090395 | A1 | 4/2013 | DiGenova et al. |
| 2013/0091843 | A1 | 4/2013 | Zyhowski et al. |
| 2013/0104546 | A1 | 5/2013 | Goswami |
| 2013/0145763 | A1 | 6/2013 | Mirmobin et al. |
| 2013/0161236 | A1 | 6/2013 | Strauss et al. |
| 2013/0165534 | A1 | 6/2013 | McComish |
| 2013/0213040 | A1 | 8/2013 | Goswami |
| 2013/0231909 | A1 | 9/2013 | Noureldin |
| 2013/0238154 | A1 | 9/2013 | Noureldin |
| 2013/0291808 | A1 | 11/2013 | Kautto |
| 2013/0334060 | A1 | 12/2013 | Koseoglu et al. |
| 2014/0090405 | A1 | 4/2014 | Held et al. |
| 2014/0174084 | A1 | 6/2014 | Kontomaris |
| 2014/0260311 | A1 | 9/2014 | Berlowitz |
| 2014/0318124 | A1 | 10/2014 | Ernst |
| 2015/0027118 | A1 | 1/2015 | Tricaud |
| 2015/0073188 | A1 | 3/2015 | Floudas |
| 2015/0252692 | A1 | 9/2015 | Honkatukia et al. |
| 2015/0361831 | A1 | 12/2015 | Myers |
| 2015/0377079 | A1 | 12/2015 | Noureldin |
| 2016/0032786 | A1 | 2/2016 | Zampieri |
| 2016/0045841 | A1 | 2/2016 | Kaplan |
| 2016/0076347 | A1 | 3/2016 | Diez |
| 2017/0058202 | A1 | 3/2017 | Noureldin |
| 2017/0058703 | A1 | 3/2017 | Noureldin |
| 2017/0058705 | A1 | 3/2017 | Noureldin |
| 2017/0058706 | A1 | 3/2017 | Noureldin |
| 2017/0058708 | A1 | 3/2017 | Noureldin |
| 2017/0058709 | A1 | 3/2017 | Noureldin |
| 2017/0058711 | A1 | 3/2017 | Noureldin |
| 2017/0058713 | A1 | 3/2017 | Noureldin |
| 2017/0058714 | A1 | 3/2017 | Noureldin |
| 2017/0058718 | A1 | 3/2017 | Noureldin |
| 2017/0058719 | A1 | 3/2017 | Noureldin |
| 2017/0058720 | A1 | 3/2017 | Noureldin |
| 2017/0058721 | A1 | 3/2017 | Noureldin |
| 2017/0058722 | A1 | 3/2017 | Noureldin |
| 2017/0058723 | A1 | 3/2017 | Noureldin |

FOREIGN PATENT DOCUMENTS

| | | |
|---|---|---|
| CN | 1844325 | 10/2006 |
| CN | 101389736 | 3/2009 |
| CN | 101424453 | 5/2009 |
| CN | 102177309 | 9/2011 |
| CN | 103328613 | 9/2013 |
| CN | 104024774 | 9/2014 |
| CN | 203925627 | 11/2014 |
| CN | 203928084 | 11/2014 |
| CN | 104246121 | 12/2014 |
| CN | 104560082 | 4/2015 |
| CN | 104619959 | 5/2015 |
| DE | 3731978 | 3/1988 |
| EP | 292391 | 11/1988 |
| EP | 949318 | 10/1999 |
| EP | 2516326 | 10/2012 |
| FR | 2990990 | 11/2013 |
| JP | S 5121407 | 2/1976 |
| JP | S 54140042 | 10/1979 |
| JP | S 5944581 | 3/1984 |
| JP | 2004123807 | 4/2004 |
| JP | 3824364 | 9/2006 |
| JP | 2007083137 | 4/2007 |
| JP | 2014513739 | 6/2014 |
| SU | 295317 | 10/1977 |
| WO | WO97/21786 | 6/1997 |
| WO | WO2004102082 | 11/2004 |
| WO | WO2011090553 | 7/2011 |
| WO | WO2012048132 | 4/2012 |
| WO | WO2012021314 A3 | 5/2012 |
| WO | WO2013055864 | 4/2013 |
| WO | WO2014205163 | 12/2014 |
| WO | WO 2015006872 | 1/2015 |

OTHER PUBLICATIONS

European Extended Search Report issued in European Application No. 19191332.6-1008 dated Oct. 21, 2019, 6 pages.

Zhang Bingjian et al, "Total Site Optimization Strategy of Energy System and Application for Petrochemical Industry," Computer and Applied Chemistry, vol. 26, No. 4, pp. 399-402, published on Apr. 28, 2009, Abstract Only.

Chinese Office Action in Chinese Appln. No. 201680061676.9, dated Sep. 2, 2019, 24 pages (with English translation).

"Organic Rankine Cycle," Choice of the Working Fluid, Wikipedia, published on or before Sep. 2014, 4 pages. http://en.wikipedia.org/wiki/Organic_Rankine_cycle?oldid=628773207.

Bertrand F. Tchanche, Gr. Lambrinos, A. Frangoudakis and G. Papadakis, "Low-grade heat conversion into power using organic Rankine cycles—A review of various applications," Renewable and Sustainable Energy Reviews, 15 |(2011) 3963-3979 (abstract filed).

Bourji et al., "Optimizing an Organic Rankine Cycle," CEP—Chemical Engineering Progress, Jan. 2013, 6 pages.

Jung et al., "Feasibility assessment of refinery waste heat to power conversion using an organic Rankine cycle," Energy conversion and Management, vol. 77, published in 2014, pp. 396-407.

Handayani et al., "Opportunities for Organic Rankine Cycles (ORCs) in the Process Industries," Newcastle University, Oct. 25-26, 2011, 40 pages.

Jose Maria Ponce-Ortega, et al., "Optimal design of inter-plant waste energy integration", Applied Thermal Engineering, 62 (2014), 633-652 (abstract filed).

Kapil et al., "Advanced Process Integration for Low Grade Heat Recovery," published on or before Mar. 2010, 58 pages.

Kevin J.DiGenova, Barbara B.Botros, and J.G. Brisson, "Method for customizing an organic Rankine cycle to a complex heat source for efficient energy conversion, demonstrated on a Fischer Tropsch plant", Applied energy, 102 (2013), 746-754 (abstract filed).

Meacher, Organic Rankine Cycle Systems for Waste Heat Recovery in Refineries and Chemical Process Plants, Proceedings from the Third Industrial Energy Technology Conference Houston, TX, Apr. 26-29, 1981, 8 pages.

Rowshanaie et al., "Generating the Electricity from Fluegas Produced by Boiler through a ORC Thermodynamic Cycle (Organic Rankine Cycle) by using a Shaft Tightness in Turbo-Expander," International Conference on Chemical, Agricultural and Medical Sciences, Dec. 29-30, 2013, 4 pages.

Tillman, "Low Temperature Waste Energy Recovery in Chemical Plants and Refineries," TAS Energy Inc., May 16, 2012, 11 pages.

Hasan et al., "First and Second Law Analysis of a New Power and Refrigeration Thermodynamic Cycle using a Solar Heat Source," Pergamon, Solar Energy, vol. 73, No. 5, Nov. 1, 2002, pp. 385-393.

Stecco, "Kalina Cycles: Some Possible Applications and Comments," Proceedings of the American Power Conference, XP000609703, Jan. 1, 1993, vol. 1, pp. 196-201.

Tamm et al., "Theoretical and Experimental Investigation of an Ammonia-Water Power and Refrigeration Thermodynamic Cycle," Science Direct, Solar Energy, vol. 76, No. 1-3, Jan. 1, 2004, pp. 217-228.

Sadrameli et al., "Optimum Operating Conditions for a Combined Power and Cooling Thermodynamic Cycle," Science Direct, Applied Energy, vol. 84, No. 3, Nov. 10, 2006, pp. 254-265.

Vidal, "Analysis of a Combined Power and Refrigeration Cycle by the Exergy Method," Science Direct, Energy 31, Dec. 1, 2006, pp. 3401-3414.

PCT International Search Report and Written Opinion of the International Searching Authority, PCT/US2016/027417, dated Jul. 6, 2016, 11 pages.

PCT International Search Report and Written Opinion of the International Searching Authority, PCT/US2016/027797, dated Oct. 19, 2016, 12 pages.

(56) References Cited

OTHER PUBLICATIONS

PCT International Search Report and Written Opinion of the International Searching Authority, PCT/US2016/027794, dated Oct. 19, 2016, 13 pages.
PCT International Search Report and Written Opinion of the International Searching Authority, PCT/US2016/030063, dated Oct. 19, 2016, 13 pages.
PCT International Search Report and Written Opinion of the International Searching Authority, PCT/US2016/030156, dated Oct. 19, 2016, 12 pages.
PCT International Search Report and Written Opinion of the International Searching Authority, PCT/US2016/048074, dated Nov. 9, 2016, 12 pages.
PCT International Search Report and Written Opinion of the International Searching Authority, PCT/US2016/048042, dated Nov. 9, 2016, 12 pages.
PCT International Search Report and Written Opinion of the International Searching Authority, PCT/US2016/048207, dated Nov. 21, 2016, 12 pages.
PCT International Search Report and Written Opinion of the International Searching Authority, PCT/US2016/048219, dated Nov. 21, 2016, 13 pages.
PCT International Search Report and Written Opinion of the International Searching Authority, PCT/US2016/048229, dated Nov. 21, 2016, 13 pages.
PCT International Search Report and Written Opinion of the International Searching Authority, PCT/US2016/048236, dated Nov. 21, 2016, 13 pages.
PCT International Search Report and Written Opinion of the International Searching Authority, PCT/US2016/048067, dated Nov. 15, 2016, 11 pages.
PCT International Search Report and Written Opinion of the International Searching Authority, PCT/US2016/048066, dated Nov. 15, 2016, 11 pages.
PCT International Search Report and Written Opinion of the International Searching Authority, PCT/US2016/048078, dated Nov. 15, 2016, 12 pages.
PCT International Search Report and Written Opinion of the International Searching Authority, PCT/US2016/048076, dated Nov. 15, 2016, 12 pages.
PCT International Search Report and Written Opinion of the International Searching Authority, PCT/US2016/027413, dated Nov. 22, 2016, 11 pages.
PCT International Search Report and Written Opinion of the International Searching Authority, PCT/US2016/048063, dated Nov. 23, 2016, 11 pages.
PCT International Search Report and Written Opinion of the International Searching Authority, PCT/US2016/048071, dated Nov. 23, 2016, 11 pages.
PCT International Search Report and Written Opinion of the International Searching Authority, PCT/US2016/048210, dated Dec. 22, 2016, 11 pages.
PCT International Search Report and Written Opinion of the International Searching Authority, PCT/US2016/048224, dated Dec. 22, 2016, 11 pages.
PCT International Search Report and Written Opinion of the International Searching Authority, PCT/US2016/048209, dated Dec. 22, 2016, 11 pages.
PCT International Search Report and Written Opinion of the International Searching Authority, PCT/US2016/048237, dated Dec. 22, 2016, 11 pages.
PCT International Search Report and Written Opinion of the International Searching Authority, PCT/US2016/048223, dated Dec. 22, 2016, 11 pages.
PCT International Search Report and Written Opinion of the International Searching Authority, PCT/US2016/048212, dated Dec. 22, 2016, 11 pages.
Gulf Cooperation Council Examination Report issued in GCC Application No. GC 2016-31927 dated Nov. 14, 2018, 3 pages.
European Communication under Rule 71(3) EPC issued in European Application No. 16770106.9 dated Dec. 20, 2018, 58 pages.
Chinese Office Action in Chinese Appln. No. 201680061248.6, dated Oct. 8, 2019, 9 pages (with English translation).
Chinese Office Action in Chinese Appl. No. 201680062040.6 dated Nov. 1, 2019, 9 pages (with English translation).
Chinese Office Action in Chinese Appl. No. 201680060786.3 dated Nov. 1, 2019, 9 pages (with English translation).
IN Examination Report issued in Indian Application No. 201817009379 dated Nov. 2, 2020, 6 pages (With English Translation).
CN Office Action issued in Chinese Application No. 2016800610692 dated Aug. 10, 2020, 8 pages (with English translation).
CN Office Action issued in Chinese Application No. 2016800610692 dated Mar. 20, 2020, 11 pages (with English translation).
IN Office Action issued in Indian Application No. 201817009036 dated Jul. 7, 2020, 5 pages.
IN Office Action issued in Indian Application No. 201817009039 dated Sep. 27, 2020, 6 pages.
IN Office Action issued in Indian Application No. 201817009040 dated Jul. 30, 2020, 6 pages.
IN Office Action issued in Indian Application No. 201817009374 dated Aug. 26, 2020, 7 pages.
IN Office Action issued in Indian Application No. 201817009377 dated Jul. 29, 2020, 7 pages.
IN Office Action issued in Indian Application No. 201817009568 dated Sep. 16, 2020, 7 pages.
IN Office Action issued in Indian Application No. 201817009573 dated Jul. 22, 2020, 6 pages.
IN Office Action issued in Indian Application No. 201817010867 dated Jun. 19, 2020, 5 pages.
JP Office Action issued in Japanese Application No. 2018-510733 dated Sep. 24, 2020, 5 pages (with English translation).
JP Office Action issued in Japanese Application No. 2018-510736 dated Sep. 24, 2020, 6 pages (with English translation).
JP Office Action issued in Japanese Application No. 2018-510737 dated Sep. 24, 2020, 10 pages (with English translation).
JP Office Action issued in Japanese Application No. 2018-510755 dated Jun. 25, 2020, 10 pages (with English tmnslation).
JP Office Action issued in Japanese Application No. 2018-510756 dated Jun. 25, 2020, 10 pages (with English tmnslation).
JP Office Action issued in Japanese Application No. 2018-510757 dated Jun. 25, 2020, 11 pages (with English tmnslation).
JP Office Action issued in Japanese Application No. 2018-510761 dated Jul. 27, 2020, 10 pages (with English tmnslation).
JP Office Action issued in Japanese Application No. 2018-510762 dated Jul. 27, 2020, 10 pages (with English tmnslation).
JP Office Action issued in Japanese Application No. 2018-510764 dated Jul. 27, 2020, 11 pages (with English tmnslation).
JP Office Action issued in Japanese Application No. 2018-510773 dated Jul. 14, 2020, 7 pages (with English tmnslation).
Deng, "Study into the Energy Efficiency of SINOPEC Maoming Co.'s Hydrocracking Unit and Ways of Saving Energy," SinoGlobal Energy, 2008, 6 pages (with English Abstract).
Jia et al., "Design Key Points of the Liquid Phase Diesel Hydrogenation Reaction Feed Heating Furnace," Contemporary Chemical Industry 5 (639-640, 644), 2013, 3 pages (with English Abstract).
Wang, "Recovery and Reuse on Low Temperature Heat in Refinery Unit," Qilu Petrocehmical Technology, 41:3 (205-210), 2013, 6 pages (with English Abstract).
Yin, "Energy consumption analysis and optimization of a refining enterprise," Petroleum Processing and Petrochemicals, 43:10, 2012, 6 pages (with English Abstract).
You, "Upgrade of Hydrocracking Unit for Optimized Utilization of Residual Heat and Power Conversion," Petroleum Processing and Petrochemicals, 2008, 4 pages (with English Abstract).
Zhang, "Energy Recovery of Hydrocracking Equipment Heating Furnace," Applied Energy Technology, 2006, 3 pages (with English Abstract).
IN Examination Report issued in Indian Appln. No. 201817009034, dated Nov. 4, 2020, 9 pages.

(56) References Cited

OTHER PUBLICATIONS

IN Examination Report issued in Indian Appln. No. 201817009189, dated Nov. 27, 2020, 5 pages.

* cited by examiner

POWER GENERATION FROM WASTE ENERGY IN INDUSTRIAL FACILITIES

CROSS-REFERENCE TO RELATED APPLICATIONS

This application is a continuation of, and claims priority under 35 U.S.C. § 120 to, each of the following ten (10) applications: U.S. patent application Ser. No. 15/087,403, filed Mar. 31, 2016, and entitled "Power Generation from Waste Heat in Integrated Aromatics and Naphtha Block Facilities"; U.S. patent application Ser. No. 15/087,329, filed Mar. 31, 2016, and entitled "Power Generation from Waste Heat in Integrated Hydrocracking and Diesel Hydrotreating Facilities"; U.S. patent application Ser. No. 15/087,512, filed Mar. 31, 2016, and entitled "Power Generation from Waste Heat in Integrated Aromatics, Crude Distillation, and Naphtha Block Facilities"; U.S. patent application Ser. No. 15/087,606, filed Mar. 31, 2016, and entitled "Power Generation from Waste Heat in Integrated Crude Oil Diesel Hydrotreating and Aromatics Facilities"; U.S. patent application Ser. No. 15/087,412, filed Mar. 31, 2016, and entitled "Power Generation from Waste Heat in Integrated Crude Oil Hydrocracking and Aromatics Facilities"; U.S. patent application Ser. No. 15/087,503, filed Mar. 31, 2016, and entitled "Power Generation using Independent Triple Organic Rankine Cycles from Waste Heat in Integrated Crude Oil Refining and Aromatics Facilities"; U.S. patent application Ser. No. 15/087,440, filed Mar. 31, 2016, and entitled "Power Generation using Independent Dual Organic Rankine Cycles from Waste Heat Systems in Diesel Hydrotreating-Hydrocracking and Continuous-Catalytic-Cracking-Aromatics Facilities"; U.S. patent application Ser. No. 15/087,518, filed Mar. 31, 2016, and entitled "Power Generation using Independent Dual Organic Rankine Cycles from Waste Heat Systems in Diesel Hydrotreating-Hydrocracking and Atmospheric Distillation-Naphtha Hydrotreating-Aromatics Facilities"; U.S. patent application Ser. No. 15/087,441, filed Mar. 31, 2016, and entitled "Power Generation from Waste Heat in Integrated Crude Oil Refining and Aromatics Facilities"; and U.S. patent application Ser. No. 15/087,499, filed Mar. 31, 2016, and entitled "Power Generation from Waste Heat in Integrated Crude Oil Refining, Aromatics, and Utilities Facilities." Each of the preceding ten (10) applications claims priority under 35 U.S.C. § 119 to each of the following four (4) provisional applications: U.S. Provisional Patent Application Ser. No. 62/209,217, filed on Aug. 24, 2015; U.S. Provisional Patent Application Ser. No. 62/209,147, filed on Aug. 24, 2015; U.S. Provisional Patent Application Ser. No. 62/209,188, filed on Aug. 24, 2015; and U.S. Provisional Patent Application Ser. No. 62/209,223, filed on Aug. 24, 2015. The entire contents of all of the preceding applications are incorporated herein by reference in their respective entireties.

TECHNICAL FIELD

This specification relates to power generation in industrial facilities.

BACKGROUND

Petroleum refining processes are chemical engineering processes and other facilities used in petroleum refineries to transform crude oil into products, for example, liquefied petroleum gas (LPG), gasoline, kerosene, jet fuel, diesel oils, fuel oils, and other products. Petroleum refineries are large industrial complexes that involve many different processing units and auxiliary facilities, for example, utility units, storage tanks, and other auxiliary facilities. Each refinery can have its own unique arrangement and combination of refining processes determined, for example, by the refinery location, desired products, economic considerations, or other factors. The petroleum refining processes that are implemented to transform the crude oil into the products such as those listed earlier can generate heat, which may not be re-used, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to power generation from waste energy in industrial facilities. The present disclosure includes one or more of the following units of measure with their corresponding abbreviations, as shown in Table 1:

TABLE 1

| Unit of Measure | Abbreviation |
|---|---|
| Degrees Celsius | ° C. |
| Megawatts | MW |
| One million | MM |
| British thermal unit | Btu |
| Hour | h |
| Pounds per square inch (pressure) | psi |
| Kilogram (mass) | Kg |
| Second | S |

The details of one or more implementations of the subject matter described in this specification are set forth in the accompanying drawings and the description later. Other features, aspects, and advantages of the subject matter will become apparent from the description, the drawings, and the claims.

BRIEF DESCRIPTION OF THE DRAWINGS

FIG. 1I is a graph that shows a tube-side fluid temperature and a shell-side fluid temperature in the evaporator during an operation of the system described with reference to FIG. 1A.

DETAILED DESCRIPTION

Figure 1A:
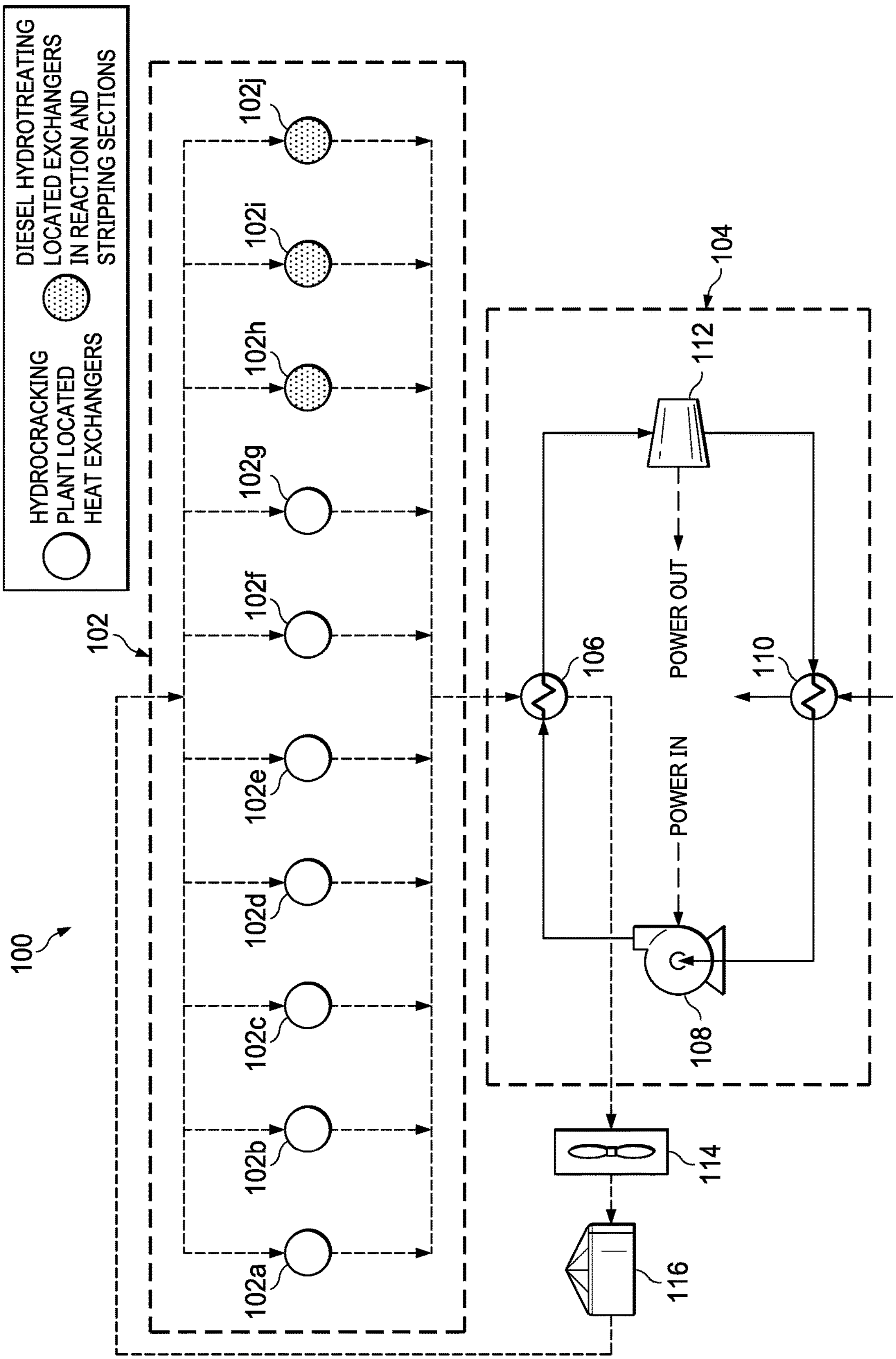
FIG. 1A is a schematic diagram of an example system to recover waste heat from ten heat sources.

Industrial waste heat is a source for potential carbon-free power generation in many industrial facilities, for example, crude oil refineries, petrochemical and chemical complexes, and other industrial facilities. For example, a medium-size integrated crude oil refinery with aromatics up to 4,000 MM Btu/h can be wasted to a network of air coolers extended along the crude oil and aromatics site. Some of the wasted heat can be used to power an Organic Rankine Cycle (ORC) machine, which uses an organic fluid such as refrigerants or hydrocarbons (or both) instead of water to generate power. ORC machines in combination with low temperature heat sources (for example, about 232° C. and below) are being implemented as power generation systems. Optimizing ORC machines, for example, by optimizing the power generation cycle (that is, the Rankine cycle) or the organic fluid implemented by the ORC machine (or both), can improve power generation from recovered waste heat.

An industrial facility such as a petroleum refinery includes several sources of waste heat. One or more ORC machines can receive the waste heat from one or more or all of such sources. In some implementations, two or more sources of low grade heat can be consolidated by transferring heat from each of the sources to a common intermediate heat transfer medium (for example, water or other fluid). The intermediate heat transfer medium can then be used to evaporate the working fluid of the ORC machine to generate power, for example, to operate a turbine or other power generator. Such consolidation of sources of low grade heat can allow the ORC machine to be sized to realize greater efficiencies and economies of scale. Further, such a consolidated operation can improve flexibility in petroleum refinery design and plot space planning, since each heat source need not be in close proximity to the power generator. The proposed consolidation of heat sources, particularly, in mega sites such as a site-wide oil refinery that includes an aromatics complex and is the size of an eco-industrial park can represent an over-simplification of the problem of improving the process of recovering waste heat to generate power.

This disclosure describes optimizing power generation from waste heat, for example, low grade heat at a temperature at or below 160° C., in large industrial facilities (for example, petroleum refineries or other large industrial refineries with several, sometimes more than 50, hot source streams) by utilizing a subset of all available hot source streams selected based, in part, on considerations for example, capital cost, ease of operation, economics of scale power generation, a number of ORC machines to be operated, operating conditions of each ORC machine, combinations of them, or other considerations. Recognizing that several subsets of hot sources can be identified from among the available hot sources in a large petroleum refinery, this disclosure describes selecting subsets of hot sources that are optimized to provide waste heat to one or more ORC machines for power generation. Further, recognizing that the utilization of waste heat from all available hot sources in a mega-site such as a petroleum refinery and aromatics complex is not necessarily or not always the best option, this disclosure identifies hot source units in petroleum refineries from which waste heat can be consolidated to power the one or more ORC machines.

This disclosure also describes modifying medium grade crude oil refining semi-conversion facilities and integrated medium grade crude oil refining semi-conversion and aromatics facilities plants' designs to improve their energy efficiencies relative to their current designs. To do so, new facilities can be designed or existing facilities can be re-designed (for example, retro-fitted with equipment) to recover waste heat, for example, low grade waste heat, from heat sources to power ORC machines. In particular, the existing design of a plant need not be significantly altered to accommodate the power generation techniques described here. The generated power can be used, in part, to power the facilities or transported to the electricity grid to be delivered elsewhere (or both).

By recovering all or part of the waste heat generated by one or more processes or facilities of industrial facilities (or both) and converting the recovered waste heat into power, carbon-free power (for example, in the form of electricity) can be generated for use by the community. The minimum approach temperature used in the waste heat recovery processes can be as low as 3° C. and the generated power can be as high as 80 MW. In some implementations, higher minimum approach temperatures can be used in an initial phase at the expense of less waste heat/energy recovery, while relatively better power generation (for example, in terms of economy of scale design and efficiency) is realized in a subsequent phase upon using the minimum approach temperature for the specific hot sources uses. In such situations, more power generation can be realized in the subsequent phase without needing to change the design topology of the initial phase or the subset of the low grade waste hot sources used in the initial phase (or both).

Not only pollution associated but also cost associated with power generation can be decreased. In addition, recovering waste heat from a customized group of hot sources to power one or more ORC machines is more cost effective from a capital cost point-of-view than recovering waste heat from all available hot sources. Selecting the hot sources in the customized group instead of or in addition to optimizing the ORC machine can improve or optimize the process of generating power from recovered waste heat (or both). If a few number of hot sources are used for power generation, then the hot sources can be consolidated into few (for example, one or two) buffer streams using fluids, for example, hot oil or high pressure hot water system (or both).

In sum, this disclosure describes several petroleum refinery-wide separation/distillation networks, configurations, and processing schemes for efficient power generation using a basic ORC machine operating under specified conditions. The power generation is facilitated by obtaining all or part of waste heat, for example, low grade waste heat, carried by multiple, scattered low grade energy quality process streams. In some implementations, the ORC machine uses separate organic material to pre-heat the exchanger and evaporator and uses other organic fluid, for example, isobutane, at specific operating conditions.

Examples of Petroleum Refinery Plants

1. Hydrocracking Plant

Hydrocracking is a two-stage process combining catalytic cracking and hydrogenation. In this process heavy feedstocks are cracked in the presence of hydrogen to produce more desirable products. The process employs high pressure, high temperature, a catalyst, and hydrogen. Hydrocracking is used for feedstocks that are difficult to process by either catalytic cracking or reforming, since these feedstocks are characterized usually by high polycyclic aromatic content or high concentrations of the two principal catalyst poisons, sulfur and nitrogen compounds (or both).

The hydrocracking process depends on the nature of the feedstock and the relative rates of the two competing reactions, hydrogenation and cracking. Heavy aromatic feedstock is converted into lighter products under a wide range of high pressures and high temperatures in the presence of hydrogen and special catalysts. When the feedstock has a high paraffinic content, hydrogen prevents the formation of polycyclic aromatic compounds. Hydrogen also reduces tar formation and prevents buildup of coke on the catalyst. Hydrogenation additionally converts sulfur and nitrogen compounds present in the feedstock to hydrogen sulfide and ammonia. Hydrocracking produces isobutane for alkylation feedstock, and also performs isomerization for pour-point control and smoke-point control, both of which are important in high-quality jet fuel.

2. Diesel Hydrotreating Plant

Hydrotreating is a refinery process for reducing sulfur, nitrogen and aromatics while enhancing cetane number, density and smoke point. Hydrotreating assists the refining industry's efforts to meet the global trend for stringent clean fuels specifications, the growing demand for transportation fuels and the shift toward diesel. In this process, fresh feed is heated and mixed with hydrogen. Reactor effluent exchanges heat with the combined feed and heats recycle gas and stripper charge. Sulphide (for example, ammonium bisulphide and hydrogen sulphide) is then removed from the feed.

3. Aromatics Complex

A typical aromatics complex includes a combination of process units for the production of basic petrochemical intermediates of benzene, toluene and xylenes (BTX) using the catalytic reforming of naphtha using continuous catalyst regeneration (CCR) technology.

4. Naphtha Hydrotreating Plant and Continuous Catalytic Reformer Plants

A Naphtha Hydrotreater (NHT) produces 101 Research Octane Number (RON) reformate, with a maximum 4.0 psi Reid Vapor Pressure (RVP), as a blending stock in the gasoline pool. It usually has the flexibility to process blends of Naphtha from the Crude Unit, Gas Condensate Splitter, Hydrocracker, Light Straight-Run Naphtha (LSRN) and Visbreaker Plants. The NHT processes naphtha to produce desulfurized feed for the continuous catalyst regeneration (CCR) platformer and gasoline blending.

5. Crude Distillation Plant

Normally, a two-stage distillation plant processes various crude oils that are fractionated into different products, which are further processed in downstream facilities to produce liquefied petroleum gas (LPG), Naphtha, Motor Gasoline, Kerosene, Jet Fuel, Diesel, Fuel Oil and Asphalt. The Crude Distillation plant can typically process large volumes, for example, (hundreds of thousands of barrels) of crude oil per day. During the summer months the optimum processing capacity may decrease. The plant can process mixture of crudes. The plant can also have asphalt producing facilities. The products from crude distillation plant are LPG, stabilized whole naphtha, kerosene, diesel, heavy diesel, and vacuum residuum. The Atmospheric Column receives the crude charge and separates it into overhead product, kerosene, diesel, and reduced crude. The Naphtha stabilizer may receive the atmospheric overhead stream and separates it into LPG and stabilized naphtha. The reduced crude is charged to the Vacuum tower where it is further separated into heavy diesel, vacuum gas oils and vacuum residuum.

6. Sour Water Stripping Utility Plant (SWSUP)

The SWSUP receives sour water streams from acid gas removal, sulfur recovery, and flare units, and the sour gas stripped and released from the soot water flash vessel. The SWSUP strips the sour components, primarily carbon dioxide ($CO_2$), hydrogen sulfide ($H_2S$) and ammonia ($NH_3$), from the sour water stream.

One of more of the refinery plants described earlier can supply heat, for example, in the form of low grade waste heat, to the ORC machine with reasonable economics of scale, for example, tens of megawatts of power. Studies have shown that particular refinery plants, for example, a hydrocracking plant, serve as good waste heat sources to generate power. However, in a study using only the hot source from the naphtha hydrotreating (NHT) plant, for example, at about 111° C., 1.7 MW of power was produced from about 27.6 MW of available waste heat at a low efficiency of about 6.2%. The low efficiency suggests that a hot source from the NHT plant alone is not recommended for waste heat generation due to high capital and economy of scale. In another study using one low grade hot source at about 97° C. from a crude distillation plant, 3.5 MW of power was produced from about 64.4 MW of available waste heat at a low efficiency of 5.3%. In a further study using one low grade hot source at about 120° C. from a sour water stripping plant, 2.2 MW of power was produced from about 32.7 MW of available waste heat at a low efficiency of 6.7%. These studies reveal that if waste heat recovery from a particular refinery plant to generate power is determined to be beneficial, it does not necessarily follow that waste heat recovery from any refinery plant will also be beneficial.

In another study, all waste heat available from all hot sources (totaling 11 hot source streams) in an aromatics complex were collected to generate about 13 MW of power from about 241 MW of available waste heat. This study reveals that using all available hot sources, while theoretically efficient, does not, in practice, necessarily translate to efficient power generation from available waste heat. Moreover, assembling power plants that can use all available hot sources can be very difficult considering the quantity of heat exchangers, pumps, and organic-based turbines (among other components and inter-connectors) involved. Not only will it be difficult to retrofit existing refineries to accommodate such power plants, but it will also be difficult to build such power plants from a grass roots stage. In the following sections, this disclosure describes combinations of hot sources selected from different refinery plants which can result in high efficiencies in generating power from available waste heat.

Even after identifying specific hot sources to be used for power generation in a mega-size site, there can be several combinations of hot sources that can be integrated for optimum generation of power using a specific ORC machine operating under specific conditions. Each of the following sections describes a specific combination of hot sources and a configuration for buffer systems which can be implemented with the specific combination to optimally generate power from waste heat with as minimum capital utilization as necessary. Also, the following sections describe two-buffer systems for low grade waste heat recovery where one-buffer systems for waste heat recovery as inapplicable. Each section describes the interconnections and related processing schemes between the different plants that make up the specific combination of hot sources, the configurations including components such as heat exchangers added in specific plants, at specific places and to specific streams in the process to optimize waste heat recovery and power generation. As described later, the different configurations can be implemented without changing the current layout or processes implemented by the different plants. The new configurations described in the sections later can generate between about 34 MW and about 80 MW of power from waste heat, enabling a proportional decrease of GHG emissions in petroleum refineries. The configurations described in the sections later demonstrate more than one way to achieve desired energy recovery using buffer systems. The configurations are related processing schemes do not impact and can be integrated with future potential in-plant energy saving initiatives, for example, low pressure steam generation. The configurations and processing schemes can render more than 10% first law efficiency for power generation from the low grade waste heat into the ORC machine.

Heat Exchangers

In the configurations described in this disclosure, heat exchangers are used to transfer heat from one medium (for example, a stream flowing through a plant in a crude oil refining facility, a buffer fluid or other medium) to another medium (for example, a buffer fluid or different stream flowing through a plant in the crude oil facility). Heat exchangers are devices which transfer (exchange) heat typically from a hotter fluid stream to a relatively less hotter fluid stream. Heat exchangers can be used in heating and cooling applications, for example, in refrigerators, air conditions or other cooling applications. Heat exchangers can be distinguished from one another based on the direction in which liquids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in crude oil refining and petrochemical facilities are often shell and tube type heat exchangers which include multiple tubes through which liquid flows. The tubes are divided into two sets—the first set contains the liquid to be heated or cooled; the second set contains the liquid responsible for triggering the heat exchange, in other words, the fluid that either removes heat from the first set of tubes by absorbing and transmitting the heat away or warms the first set by transmitting its own heat to the liquid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in crude oil refining and petrochemical facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threats that rotate through the liquids—both hot and cold—to extract or transfer heat. The heat exchangers described in this disclosure can include any one of the heat exchangers described above, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/h), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a crude oil refining facility and between plants in the crude oil refining facility. The process streams can be flowed using one or more flow control systems implemented throughout the crude oil refining facility. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the crude oil refining facility, the flow control system can flow the streams within a plant or between plants under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the crude oil refining facility using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

Figure 1B:
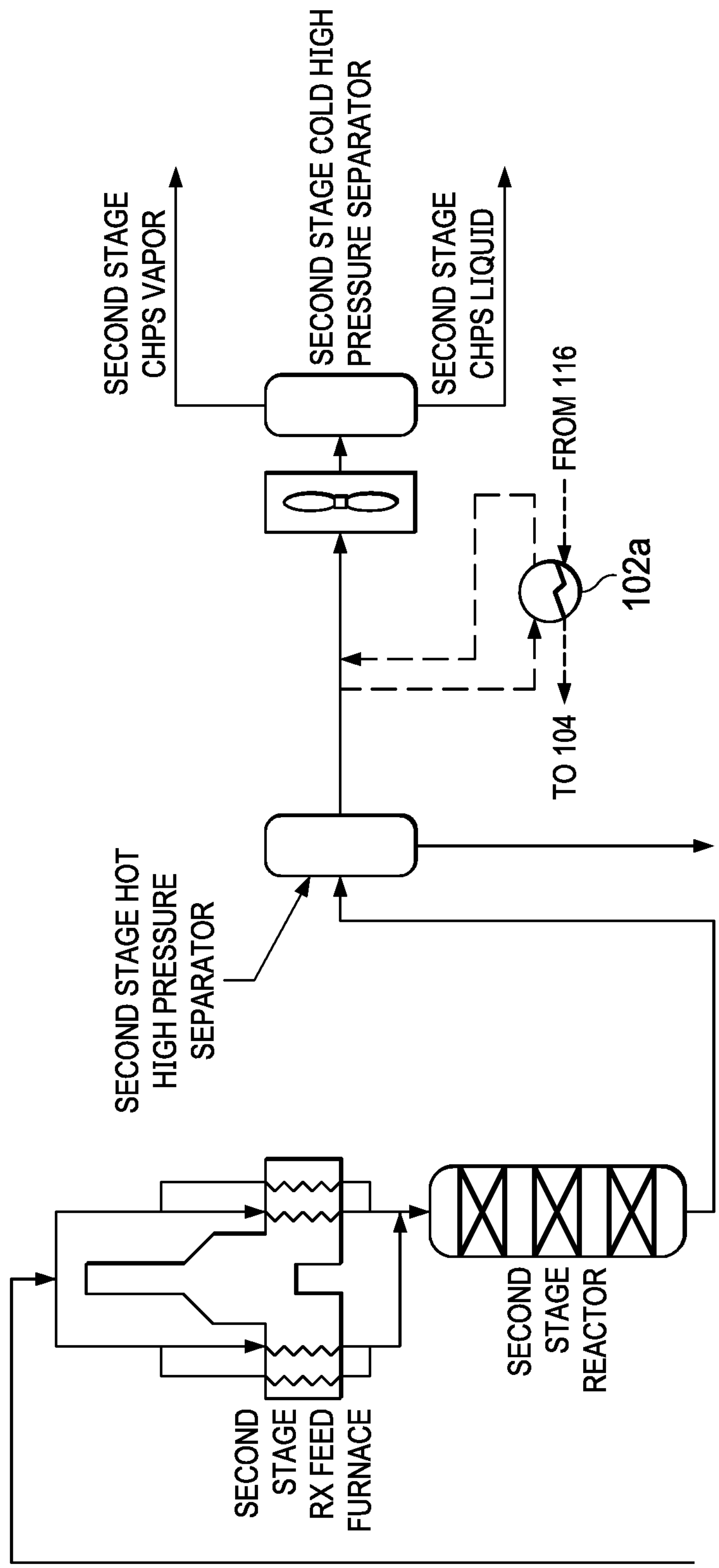
FIGS. 1B, 1C, 1DA and 1DB are schematic diagrams of seven heat sources in a hydrocracking plant.
Figure 1C:
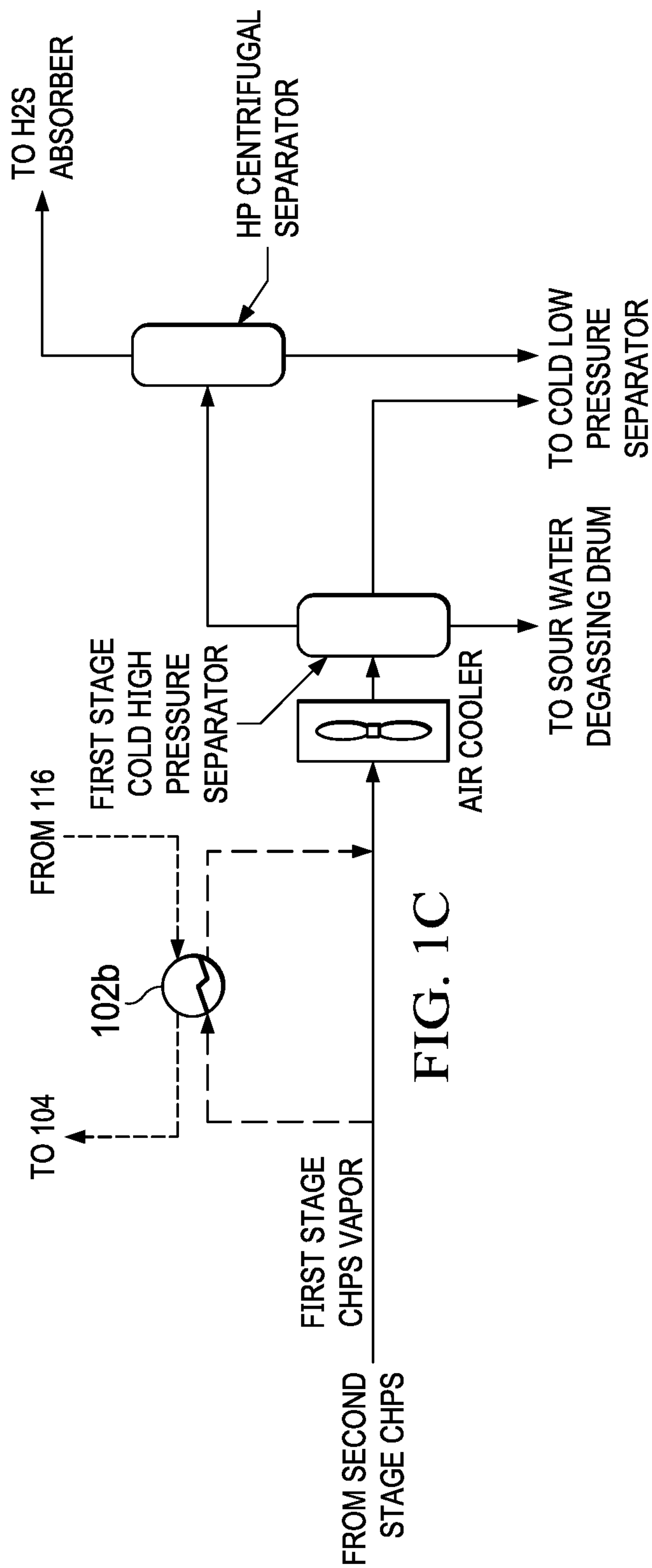
Figure 1D:
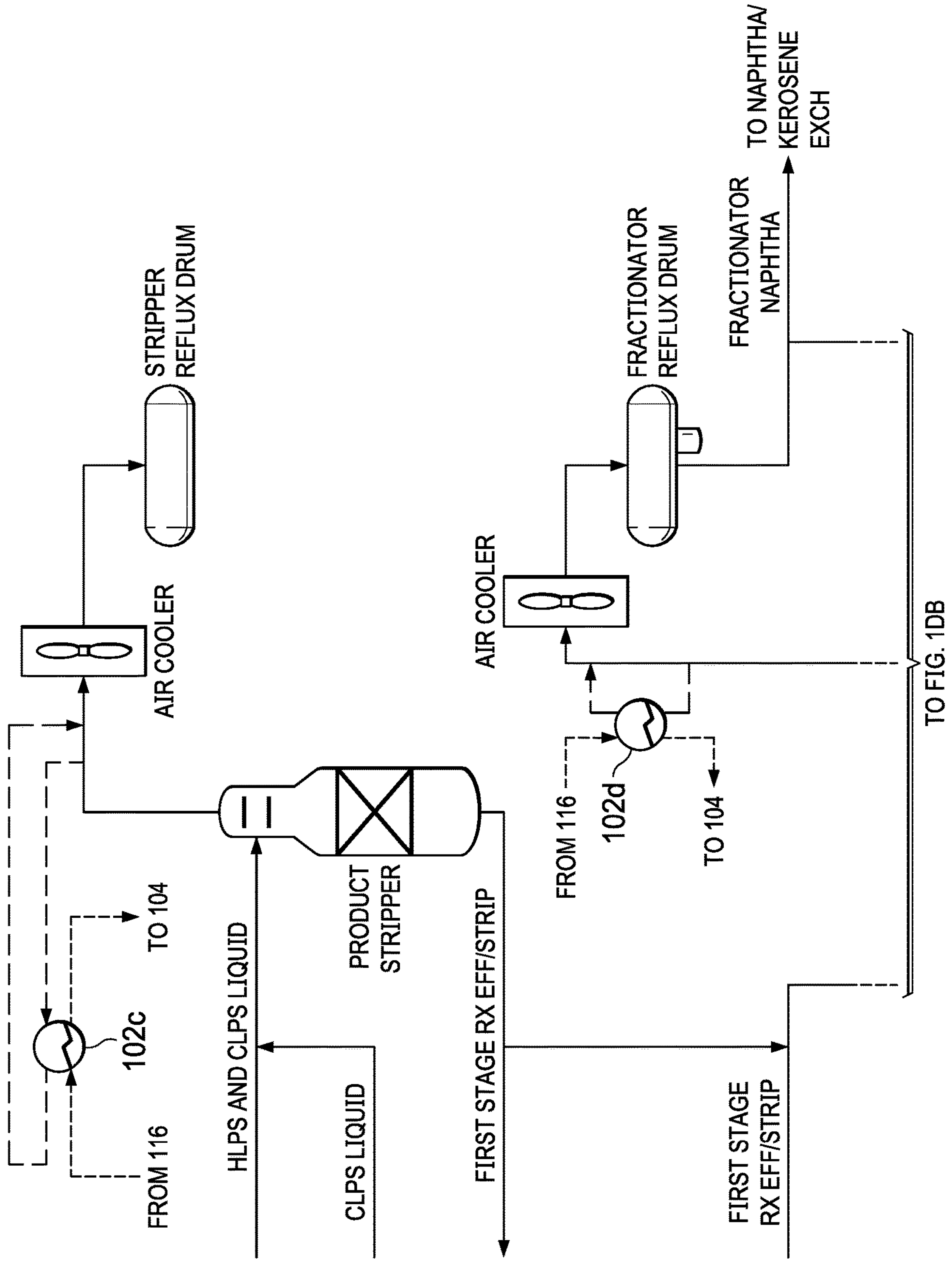
Figure 1D:
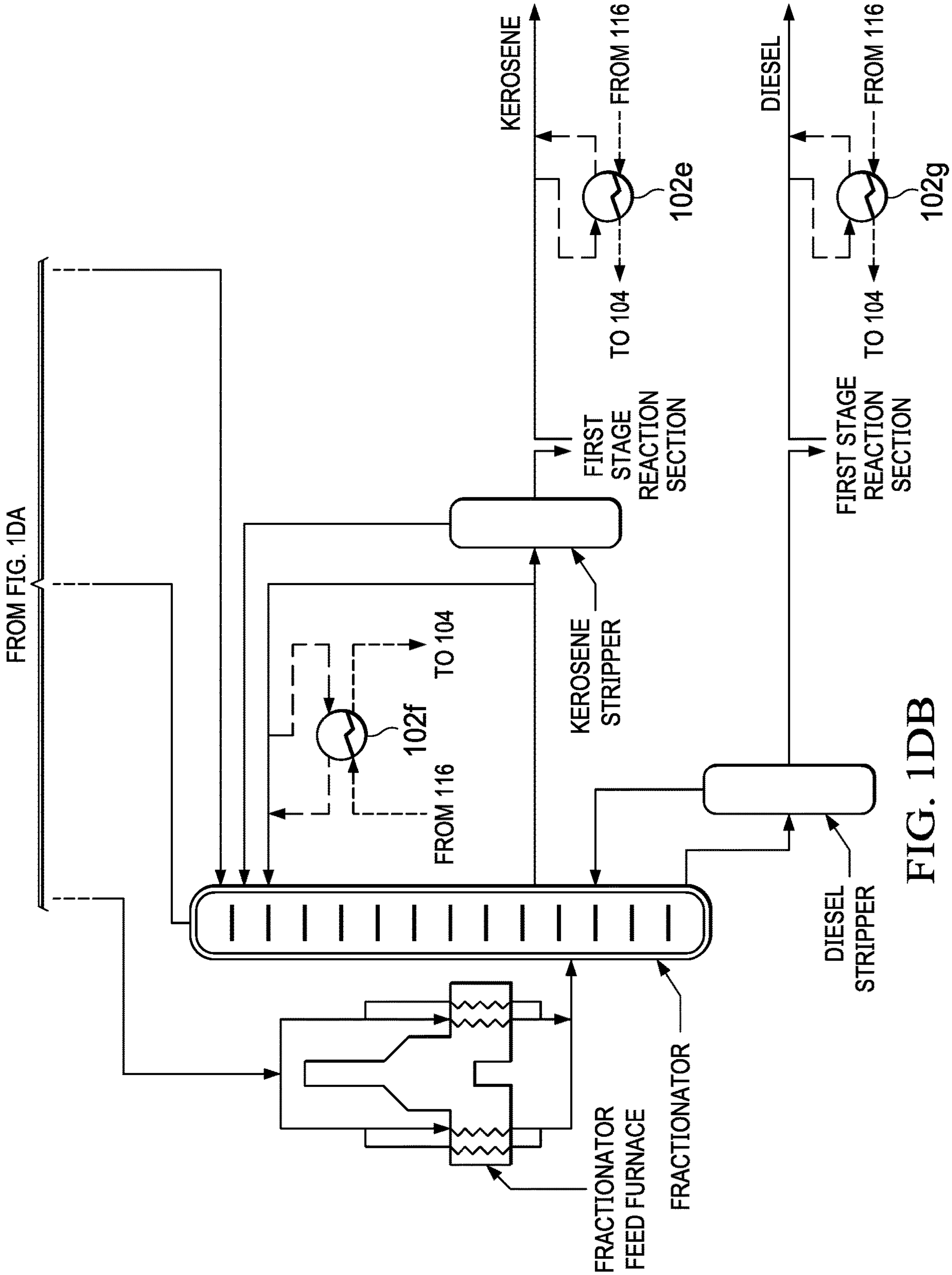
Figure 1E:
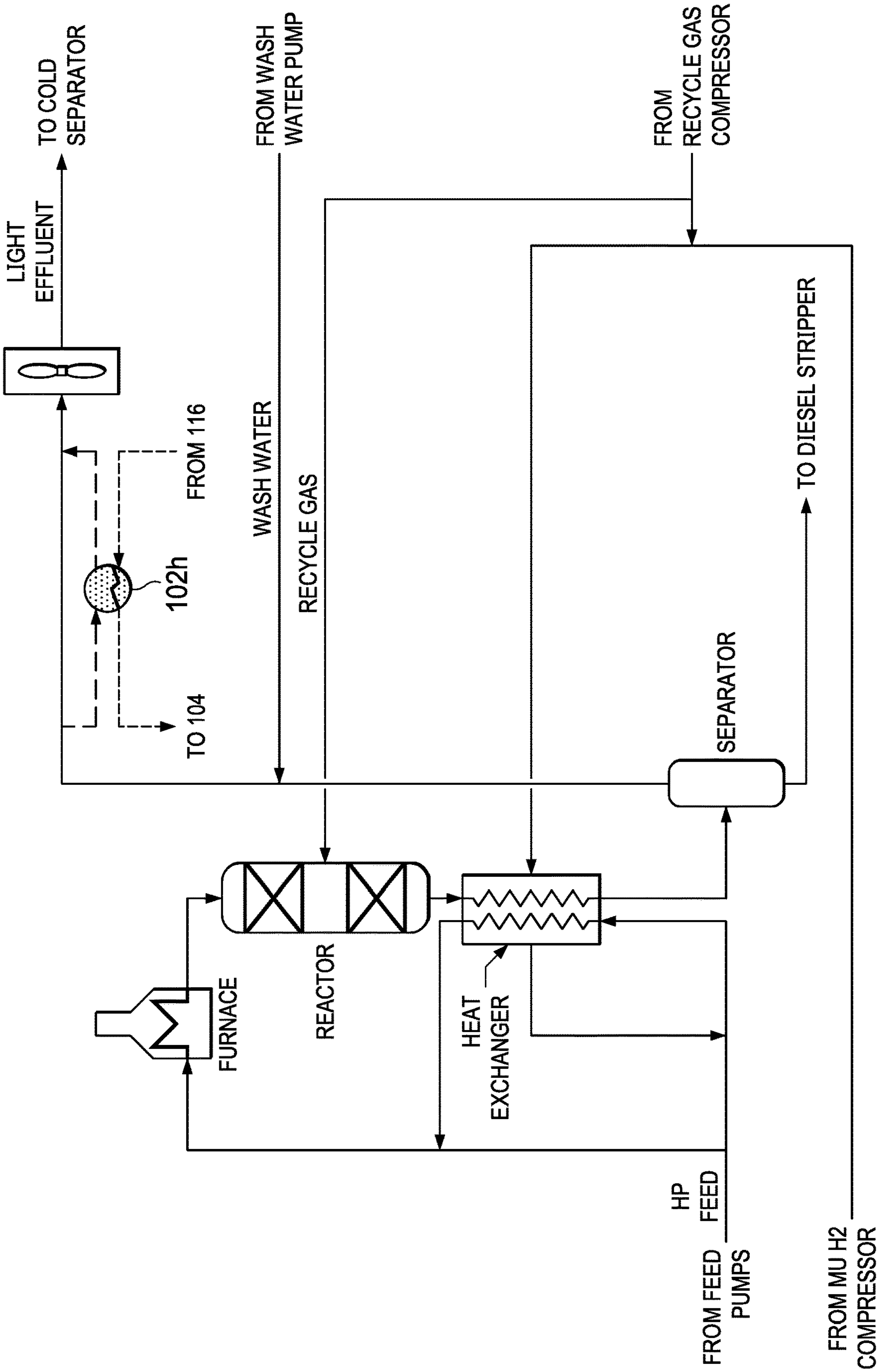
FIGS. 1E and 1F are schematic diagrams of three heat sources in a diesel hydro-treating plant.
Figure 1F:
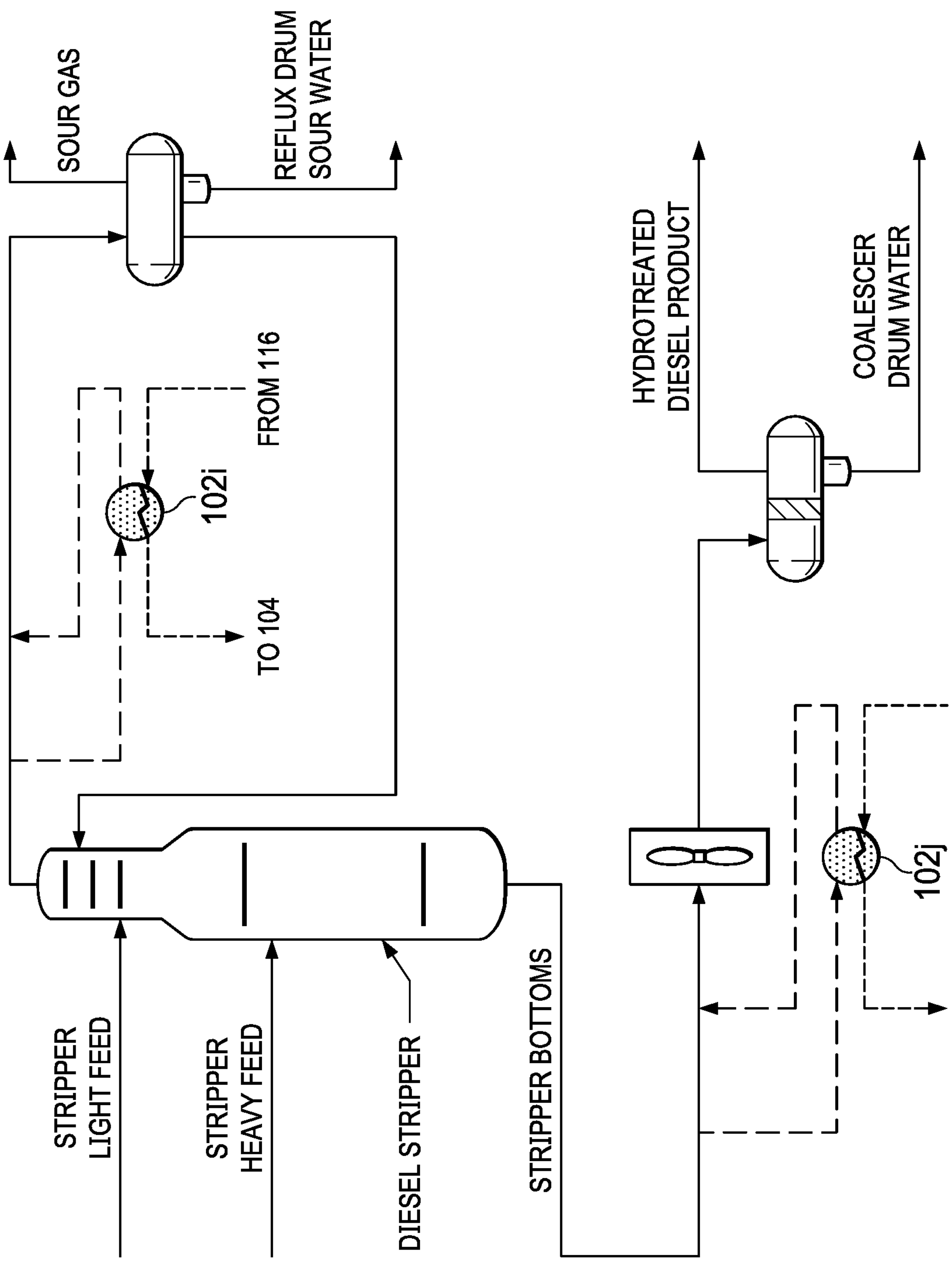
Figure 1G:
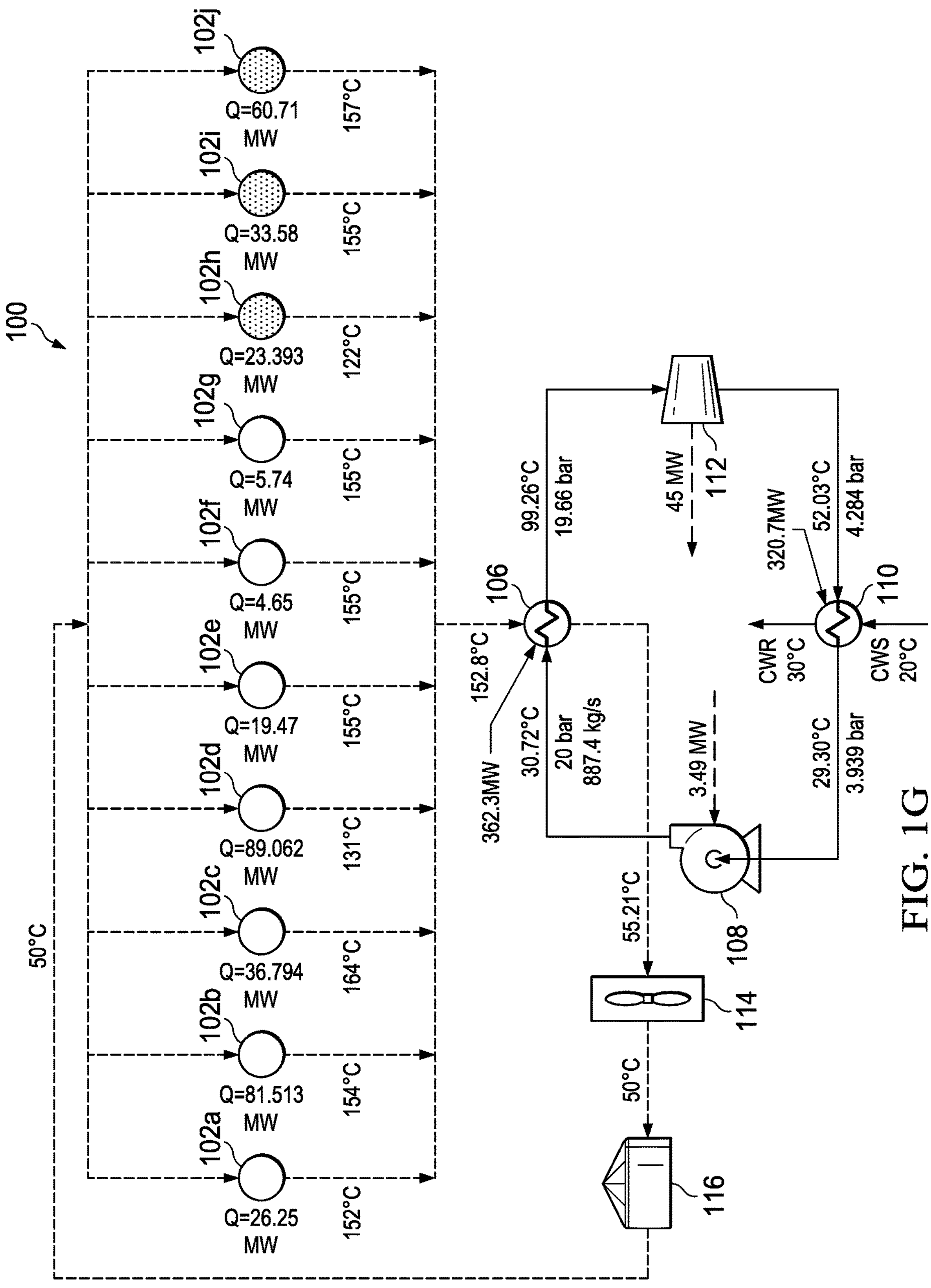
FIG. 1G is a schematic diagram of an implementation of the example network of FIG. 1A.

FIG. 1A is a schematic diagram of an example system 100 to recover waste heat from ten heat sources. FIGS. 1B-1D are schematic diagrams of seven heat sources in a hydrocracking plant. FIGS. 1E and 1F are schematic diagrams of three heat sources in a diesel hydro-treating plant. FIG. 1G is a schematic diagram of an implementation of the example network of FIG. 1A.

FIG. 1A is a schematic diagram of an example system 100 to recover waste heat from ten sources. In some implementations, the system 100 can include a heating fluid circuit 102 thermally coupled to multiple heat sources. For example, the multiple heat sources can include seven heat exchangers (a first heat exchanger 102*a*, a second heat exchanger 102*b*, a third heat exchanger 102*c*, a fourth heat exchanger 102*d*, a fifth heat exchanger 102*e*, a sixth heat exchanger 102*f*, and a seventh heat exchanger 102*g*) coupled to a hydrocracking plant of a petrochemical refining system. The multiple heat sources can also include three heat exchangers (an eighth heat exchanger 102*h*, a ninth heat exchanger 102*i*, and a tenth heat exchanger 102*j*) coupled to a diesel hydro-treating plant of the petrochemical refining system. In some implementations, the ten heat sources can be connected in parallel.

The example system 100 can include a power generation system 104 that includes an organic Rankine cycle (ORC). The ORC can include a working fluid that is thermally coupled to the heating fluid circuit 102 to heat the working fluid. In some implementations, the working fluid can be isobutane. The ORC can also include a gas expander 112 configured to generate electrical power from the heated working fluid. As shown in FIG. 1A, the ORC can additionally include an evaporator 106, a pump 108 and a condenser 110. In some implementations, the working fluid can be thermally coupled to the heating fluid circuit 102 in the evaporator 106.

In operation, a heating fluid (for example, water, oil, or other fluid) is circulated through the ten heat exchangers. An inlet temperature of the heating fluid that is circulated into the inlets of each of the ten heat sources is the same or substantially the same subject to any temperature variations that may result as the heating fluid flows through respective inlets. Each heat exchanger heats the heating fluid to a respective temperature that is greater than the inlet temperature. The heated heating fluids from the ten heat exchangers are combined and flowed through the evaporator 106 of the ORC. Heat from the heated heating fluid heats the working fluid of the ORC thereby increasing the working fluid temperature and evaporating the working fluid. The heat exchange with the working fluid results in a decrease in the temperature of the heating fluid. The heating fluid is then collected in a heating fluid tank 116 and can be pumped back through the ten heat exchangers to restart the waste heat recovery cycle. In some implementations, the heating fluid that exits the evaporator 106 can be flowed through an air cooler 114 to further cool the heating fluid before the heating fluid is collected in the heating fluid tank 116.

The heating fluid circuit to flow heating fluid through the ten heat exchangers can include multiple valves that can be operated manually or automatically. For example, the hydrocracking plant and the diesel hydro-treating plant can be fitted with the heating fluid flow pipes and valves. An operator can manually open each valve in the circuit to cause the heating fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

In the manner described earlier, the heating fluid can be looped through the ten heat exchangers to recover heat that would otherwise go to waste in the hydrocracking and diesel hydro-treating plants, and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

FIGS. 1B-1D are schematic diagrams of seven heat sources in a hydrocracking plant. FIG. 1B shows the first heat exchanger 102*a* in the hydrocracking plant of the petrochemical refining system. A feed stream from the 2nd reaction section, 2nd stage hot high pressure separator and the heating fluid flow through the first heat exchanger 102*a* simultaneously. The first heat exchanger 102*a* cools down the feed stream from a higher temperature, for example, about 157° C., to a lower temperature, for example, about 60° C., and increases the temperature of the heating fluid from a lower temperature, for example, from about 50° C., to a higher temperature, for example, about 152° C. The temperature of the heating fluid can be different from, for example, less than, 50° C. depending upon available cooling media temperatures in the condenser (for example, in cold weather countries) or more than 50° C. depending, for example, on design efficiencies or inefficiencies of the ORC system that render surplus heat available in the heating fluid stream after heating and vaporizing the working fluid in the ORC. In some implementations, a heating fluid temperature of about 50° C. can provide increased efficiency of waste heat to power conversion. The thermal duty of the first heat exchanger 102*a* to implement the heat exchange is about 26.25 MW. The heating fluid at 152° C. that exits the first heat exchanger 102*a* is circulated to a main header to be mixed with heated heating fluids from the other nine heat exchangers.

FIG. 1C shows the second heat exchanger 102*b* in the hydrocracking plant of the petrochemical refining system. A feed stream from the 1st reaction section, 1st stage cold high pressure separator and the heating fluid flow through the second heat exchanger 102*b* simultaneously. The second heat exchanger 102*b* cools down the feed stream from a higher temperature, for example, about 159° C., to a lower temperature, for example, about 60° C., and increases the temperature of the heating fluid from a lower temperature, for example, about 50° C., to a higher temperature, for example, about 154° C. The thermal duty of the second heat exchanger 102*b* to implement the heat exchange is about 81.51 MW. The heating fluid at 154° C. that exits the second heat exchanger 102*b* is circulated to the main header to be mixed with heated heating fluids from the other nine heat exchangers.

FIG. 1D shows the third heat exchanger 102*c*, the fourth heat exchanger 102*d*, the fifth heat exchanger 102*e*, the sixth heat exchanger 102*f* and the seventh heat exchanger 102*g* in the hydrocracking plant of the petrochemical refining system. A feed stream from the product stripper overhead and the heating fluid flow through the third heat exchanger 102*c* simultaneously. The third heat exchanger 102*c* cools down the feed stream from a higher temperature, for example, about 169° C., to a lower temperature, for example, about 60° C., and increases the temperature of the heating fluid from a lower temperature, for example, about 50° C., to a higher temperature, for example, about 164° C. The thermal duty of the third heat exchanger 102*c* to implement the heat exchange is about 36.8 MW. The heating fluid at 164° C. that exits the third heat exchanger 102*c* is circulated to the main header to be mixed with heated heating fluids from the other nine heat exchangers.

A feed stream from the main fractionator overhead and the heating fluid flow through the fourth heat exchanger 102*d* simultaneously. The fourth heat exchanger 102*d* cools down the feed stream from a higher temperature, for example, about 136° C., to a lower temperature, for example, about 60° C., and increases the temperature of the heating fluid from a lower temperature, for example, about 50° C., to a higher temperature, for example, about 131° C. The thermal duty of the fourth heat exchanger 102*d* to implement the heat exchange is about 89 MW. The heating fluid at 131° C. that exits the fourth heat exchanger 102*d* is circulated to the main header to be mixed with heated heating fluids from the other nine heat exchangers.

A kerosene product stream and the heating fluid flow through the fifth heat exchanger 102*e* simultaneously. The fifth heat exchanger 102*e* cools down the stream from a higher temperature, for example, about 160° C., to a lower temperature, for example, about 60° C., and increases the temperature of the heating fluid from a lower temperature, for example, about 50° C., to a higher temperature, for example, about 155° C. The thermal duty of the fifth heat exchanger 102*e* to implement the heat exchange is about 19.5 MW. The heating fluid at 155° C. that exits the fifth heat exchanger 102*e* is circulated to the main header to be mixed with heated heating fluids from the other nine heat exchangers.

A kerosene pumparound stream and the heating fluid flow through the sixth heat exchanger 102*f* simultaneously. The sixth heat exchanger 102*f* cools down the stream from a higher temperature, for example, about 160° C., to a lower temperature, for example, about 60° C., and increases the temperature of the heating fluid from a lower temperature, for example, about 50° C., to a higher temperature, for example, about 155° C. The thermal duty of the sixth heat exchanger 102*f* to implement the heat exchange is about 4.65 MW. The thermal duties of the heat exchangers can depend upon the heat capacity flow rates of the hot oil streams flowing through the heat exchangers. Therefore, in some instances, the thermal duties of two heat exchangers can be different even when the temperature changes of the heating fluid flowing through the two heat exchangers is the same. In such instances, the heat capacity flow rates of the two heat exchangers can be different. The heating fluid at 155° C. that exits the sixth heat exchanger 102*f* is circulated to the main header to be mixed with heated heating fluids from the other nine heat exchangers.

A diesel product stream and the heating fluid flow through the seventh heat exchanger 102*g* simultaneously. The seventh heat exchanger 102*g* cools down the stream from a higher temperature, for example, about 160° C., to a lower temperature, for example, about 60° C., and increases the temperature of the heating fluid from a lower temperature, for example, about 50° C., to a higher temperature, for example, about 155° C. The thermal duty of the seventh heat exchanger 102*g* to implement the heat exchange is about 5.74 MW. The heating fluid at 155° C. that exits the seventh heat exchanger 102*g* is circulated to the main header to be mixed with heated heating fluids from the other nine heat exchangers.

FIGS. 1E and 1F are schematic diagrams of three heat sources in a diesel hydro-treating plant. FIG. 1E shows the eighth heat exchanger 102*h* in the diesel hydro-treating plant of the petrochemical refining system. A stream from the light effluent to cold separator and the heating fluid flow through the eighth heat exchanger 102*h* simultaneously. The eighth heat exchanger 102*h* cools down the stream from a higher temperature, for example, about 127° C., to a lower temperature, for example, about 60° C., and increases the temperature of the heating fluid from a lower temperature, for example, from about 50° C., to a higher temperature, for example, about 122° C. The thermal duty of the eighth heat exchanger 102*h* to implement the heat exchange is about 23.4 MW. The heating fluid at 122° C. that exits the eighth heat exchanger 102*h* is circulated to the main header to be mixed with heated heating fluids from the other nine heat exchangers.

FIG. IF shows the ninth heat exchanger 102*i* in the diesel hydro-treating plant of the petrochemical refining system. A stream from the diesel stripper overhead and the heating fluid flow through the ninth heat exchanger 102*i* simultaneously. The ninth heat exchanger 102*i* cools down the stream from a higher temperature, for example, about 160° C., to a lower temperature, for example, about 60° C., and increases the temperature of the heating fluid from a lower temperature, for example, from about 50° C., to a higher temperature, for example, about 155° C. The thermal duty of the ninth heat exchanger 102*i* to implement the heat exchange is about 33.6 MW. The heating fluid at 155° C. that exits the ninth heat exchanger 102*i* is circulated to the main header to be mixed with heated heating fluids from the other nine heat exchangers.

A diesel stripper product stream and the heating fluid flow through the tenth heat exchanger 102*j* simultaneously. The tenth heat exchanger 102*j* cools down the stream from a higher temperature, for example, about 162° C., to a lower temperature, for example, about 60° C., and increases the temperature of the heating fluid from a lower temperature, for example, from about 50° C., to a higher temperature, for example, about 157° C. The thermal duty of the tenth heat exchanger 102*j* to implement the heat exchange is about 60.7 MW. The heating fluid at 155° C. that exits the tenth heat exchanger 102*h* is circulated to the main header to be mixed with heated heating fluids from the other nine heat exchangers. The heat capacity flowrate values for the high pressure hot water system is split between the hydrocracking and the diesel hydro-treating plants. The flowrate values for the two plants are 2.56 MW/° C. and 1.14 MW/° C., respectively. The total hot oil heat capacity flow rate is 3.7 MW/° C. This steam heat capacity flow rate is divided into two streams. The first stream is directed to the hydrocracking plant with heat capacity flow rate equal to 2.56 MW/° C. and the second stream is directed to the diesel hydrotreating plant with a heat capacity flow rate equal to 1.14 MW/° C.

FIG. 1G is a schematic diagram of an implementation of the example system 100 of FIG. 1A. The heating fluids received from the ten heat exchangers are mixed in the main header resulting in a heating fluid at a temperature of about 153° C. The heating fluid is circulated through the evaporator 106 of the ORC. In some implementations, the evaporator 106 increases the temperature of the working fluid (for example, isobutane or other working fluid) from about 31° C. at 20 bar to about 99° C. at 20 bar at a thermal duty of about 362 MW. The gas expander 112 expands the high temperature, high pressure working fluid to generate power, for example, about 45 MW, at a turbine efficiency, for example, 85%. The expansion decreases the temperature and pressure of the working fluid, for example, to about 52° C. and about 4.3 bar, respectively. The working fluid flows through the condenser 110 which further decreases the temperature and pressure of the working fluid at a thermal duty of about 321 MW. For example, cooling fluid flows through the condenser 110 at a lower temperature, for example, 20° C., exchanges heat with the working fluid, and exits the condenser 110 at a higher temperature, for example, about 30° C. The cooled working fluid (for example, isobutane liquid) is pumped by the pump 108 at an efficiency, for example, of about 75%, and an input power, for example, of about 3.5 MW. The pump 108 increases the temperature of the working fluid to about 31° C. and pumps the working fluid at a mass flow rate of about 890 kg/s to the evaporator 106, which repeats the Rankine cycle to generate power.

Figure 1H:
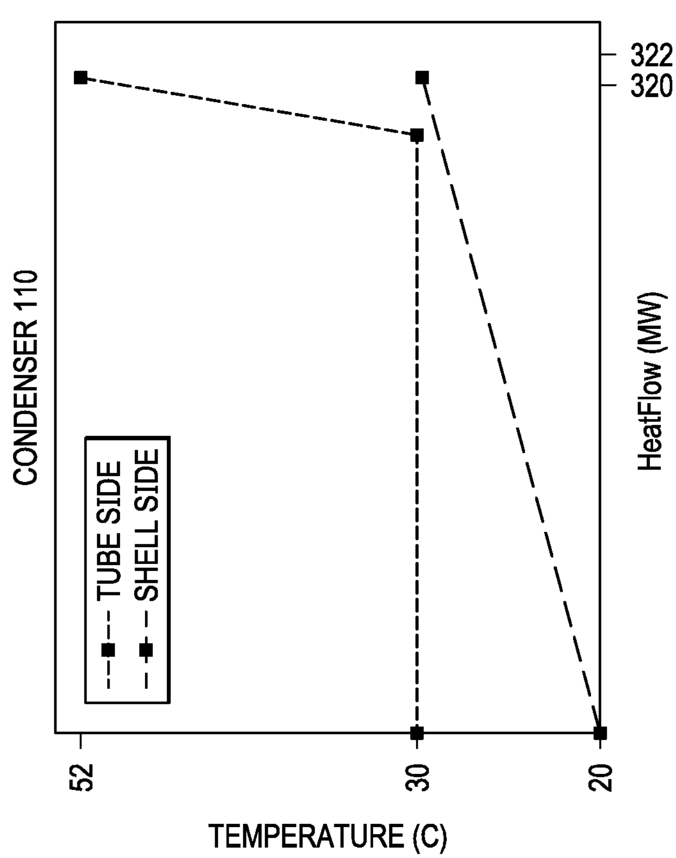
FIG. 1H is a graph that shows a tube-side fluid temperature and a shell-side fluid temperature in the condenser during an operation of the system described with reference to FIG. 1A.
Figure 11:
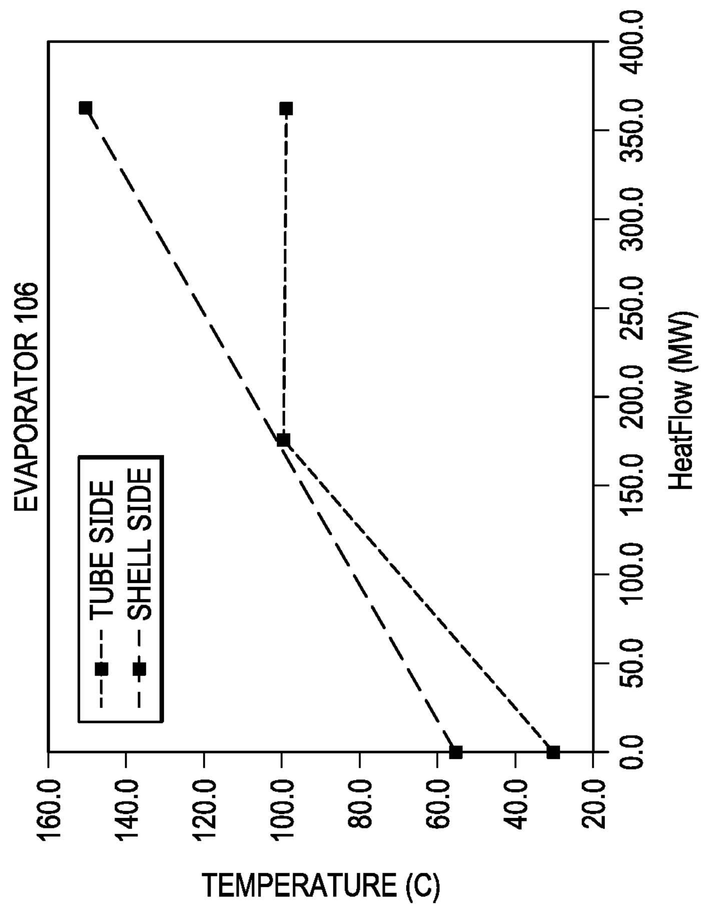

FIG. 1H is a graph that shows a tube-side fluid temperature (for example, a cooling, or condenser, fluid flow) and a shell-side fluid temperature (for example, an ORC working fluid flow) in the condenser 110 during an operation of the system 100. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature. As shown in FIG. 1H, the condenser water (entering the tubes of the condenser 110) enters at about 20° C. and leaves at about 30° C. The ORC working fluid (entering the shell-side of the condensers) enters as a vapor at about 52° C., and then condenses at 30° C. and leaves the condensers as a liquid at 30° C.

FIG. 1I is a graph that shows a tube-side fluid temperature (for example, a heating fluid flow) and a shell-side fluid temperature (for example, an ORC working fluid flow) in the evaporator 106 during an operation of the system 100. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 1I, as the tube-side fluid (for example, the hot oil or water in the heating fluid circuit 102) is circulated through the evaporator 106, heat is transferred from that fluid to the shell-side fluid (for example, the ORC working fluid). Thus, the tube-side fluid enters the evaporator 106 at about 152° C. and leaves the evaporator 106 at about 55° C. The shell-side fluid enters the evaporator 106 at about 30° C. (for example, as a liquid) and leaves the evaporator 106 at about 99° C. (for example, as a vapor with some superheating).

FIGS. 2A-2M illustrate schematic views of an example system 200 for a power conversion network significantly contributing to carbon-free power generation using waste heat sources associated with crude oil refining-petrochemical complex naphtha block plants (Continuous Catalytic Reforming (CCR) and aromatics plants). In some implementations, the example system 200, can efficiently (for example, 12.3%) generate about 37.5 MW from novel specific portions of an entire crude oil refining-petrochemical site-wide low-low grade available waste heat sources.

The disclosure related to system 200 is concerned with power generation from low grade waste energy in industrial facilities and is related to at least the described multi-generation based gasification plant smart configurations for energy efficiency optimization and crude oil refining facilities and aromatics complex advanced energy efficient configurations also in this disclosure. In particular, the disclosure is of a novel portion of a refining-petrochemical-wide separation network's waste-heat-recovery networks and a related detailed processing scheme for efficient power generation using a basic Organic Rankine Cycle with specific operating conditions from used multiple scattered sub-set of the low grade energy quality process streams (note that not all of a refining-petrochemical-wide plant's processes are shown/described, but parts of plants typically involved in Organic Rankine Cycle power generation).

In some implementations, described process schemes related to system 200 can be considered for implementation in a single or multiple steps or in phases, where each phase can be separately implemented without hindering future phases. In some implementations, a minimum approach temperature used in the described waste heat recovery schemes can be as low as 3° C. However, higher minimum approach temperatures can be used in the beginning at the expense of less waste heat recovery, while reasonable power generation economics of scale designs (still attractive in the level of tens of MW) are used and best efficiency is realized in the future upon using a minimum approach temperature recommended for specific streams used in system design. In such future situations, more power generation can be realized without changing the initial design topology or the sub-set of low grade waste heat streams selected/utilized from an entire first-phase studied crude oil refining-petrochemical complex (or combinations of them). The described mini-power plant configuration and related process scheme(s) can be performed directly or, for safety and operability, through one system or two buffer streams, such as hot oil or high pressure hot water systems (or both), or a mix of direct and indirect means, as well as novel connections among buffer systems (or combinations of them). A low-low grade waste-heat-to-power-conversion (for example, lower than the low grade waste heat temperature defined by U.S. Department of Energy (DOE) as 232° C.) is, in some implementations, implemented using a basic Organic Rankine Cycle system (ORC) using isobutane as an organic fluid at specific operating conditions.

The described configuration(s) and related process scheme(s) related to system 200 may not change with future energy efficiency improvement efforts inside individual crude oil refining-petrochemical complex naphtha block plants (for example, Continuous Catalytic Reforming (CCR) and aromatics plants) or improvements in plant waste heat recovery practices, such as heat integration and/or other improvements in in plant waste heat recovery practices (or combinations of them).

Figure 2A:
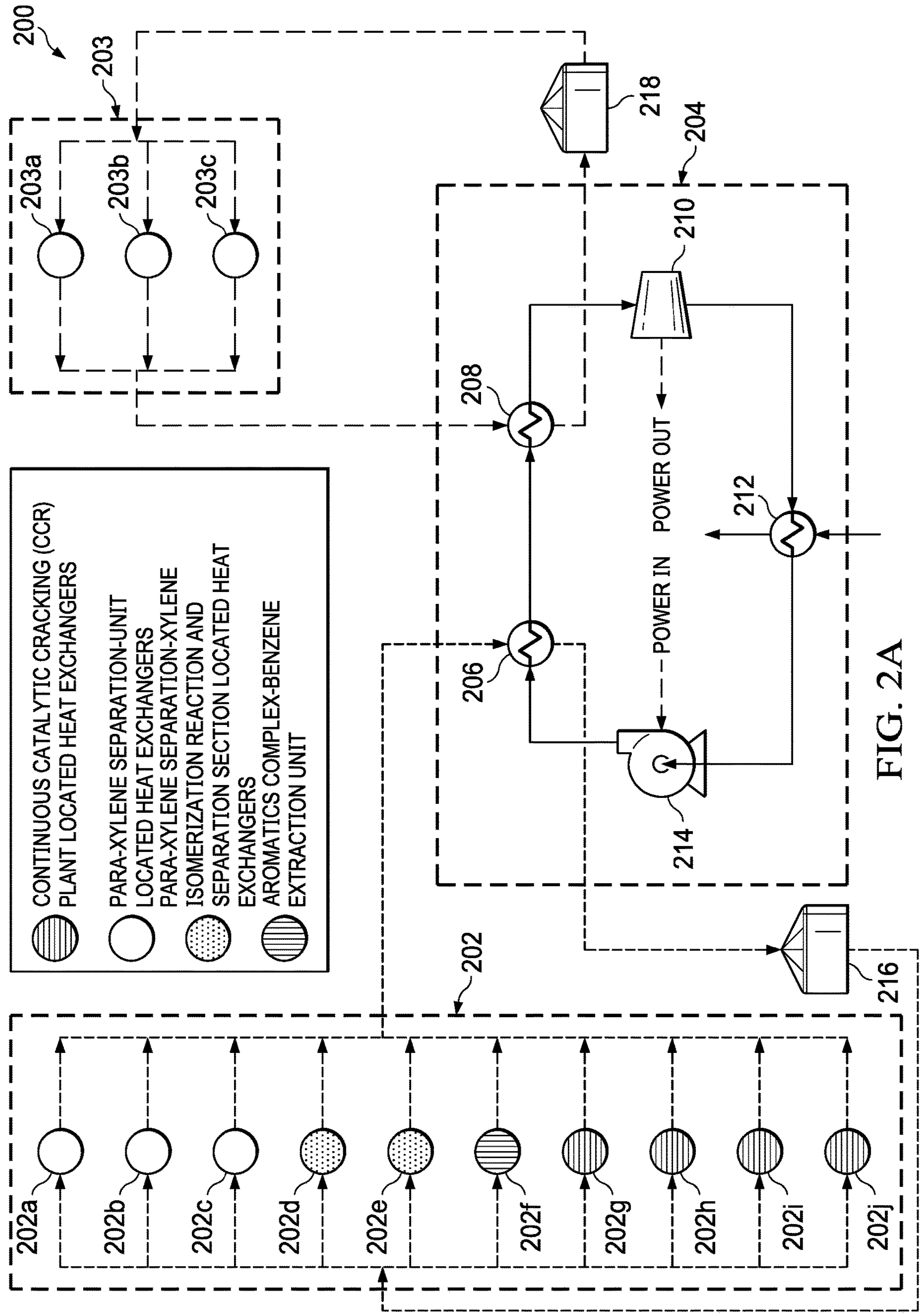
FIGS. 2A-2M are schematic illustrations of a power generation system that utilizes waste heat from one or more heat sources in a petrochemical refining plant.

FIG. 2A illustrates a schematic diagram of an example system 200 for a power conversion network utilizing a modular mini-power plant and including waste heat sources associated with a medium crude semi-conversion oil refining-petrochemical complex. In this example implementation, system 200 utilizes thirteen waste heat recovery heat exchangers that receive waste heat from a working fluid (for example, typically hot water but could include hot oil or other fluid (or combinations of them)) removing heat from continuous catalytic reforming CCR separation sections, Para-Xylene separation, Xylene Isomerization and benzene extraction units' separation sections. In the illustrated example, system 200 has two separate high pressure water systems/heat-recovery circuits (202 and 203) and one Organic Rankine Cycle (ORC) 204. For example, heat-recovery circuit 202 (first circuit) includes heat exchanges 202*a*-202*j* and heat-recovery circuit 203 (second circuit) includes heat exchangers 203*a*-203*c*. The ORC 204 includes a pre-heater 206, evaporator 208, gas expander 210, condenser 212, and a pump 214.

In a general operation, a working (or heating) fluid (for example, water, oil, or other fluid (or combinations of them)) is circulated through the heat exchangers of the heat recovery circuits (first circuit 202 and second circuit 203). An inlet temperature of the working fluid that is circulated into the inlets of each of the heat exchangers may be the same or substantially the same subject to any temperature variations that may result as the heating fluid flows through respective inlets, and may be circulated directly from a fluid heating tank 216 or 218. Each heat exchanger heats the working fluid to a respective temperature that is greater than the inlet temperature. The heated working fluids from the heat exchangers are combined in their respective heat recovery circuits (for example, mixed in a main header associated with each heat recovery circuit) and circulated through one of the pre-heater 206 or the evaporator 208 of the ORC 204. Heat from the heated working fluid heats the working fluid of the ORC 204 thereby increases the working fluid temperature. The heat exchange with the heated working fluid results in a decrease in the temperature of the working fluid. The working fluid is then collected in the fluid heating tank 216 or the fluid heating tank 218 and can be pumped back through the respective heat exchangers to restart the waste heat recovery cycle.

The working fluid circuit flowing heated working fluid through the heat exchangers of system 200 can include multiple valves that can be operated manually or automatically. For example, a modulating control valve (as one example) may be positioned in fluid communication with an inlet or outlet of each heat exchanger, on the heated working fluid and heat source side. In some aspects, the modulating control valve may be a shut-off valve or additional shut-off valves may also be positioned in fluid communication with the heat exchangers. An operator can manually open each valve in the circuit to cause the heated working fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

In the manner described earlier, the heated working fluid can be looped through the heat exchangers to recover heat that would otherwise go to waste in the various described plants (for example, hydro-cracking, hydro-treating, CCR, and aromatics plants), and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

More specifically, in the illustrated example, each heat exchanger facilitates heat recovery from a heat source in a particular industrial unit to the working fluid. For example, heat exchangers 202*a*-202*c* recover heat from heat sources in a para-xylene separation unit. Heat exchangers 202*d*-202*e* recover heat from heat sources in a para-xylene isomerization reaction and separation unit(s). Heat exchanger 202*f* recovers heat from a heat source(s) in a benzene extraction unit. Heat exchangers 202*g*-202*j* recover heat from heat sources in a continuous catalytic reforming plant (CCR). Together, heat exchangers in the first circuit 202 recover low grade waste heat from specific streams in a "Naphtha Block" to deliver the heat using the working fluid to the ORC 204. In this example, the heat from the first circuit 202 is provided to a header/pre-heater 206 of the ORC 204.

Generally, the first circuit 202 receives (for example, from an inlet header that fluidly couples a fluid heating tank 216 to the heat exchangers 202*a*-202*j*) high pressure working fluid (for example, hot water, hot oil, or other fluid (or combinations of them)) for instance, at between about 40° C. to 60° C. and supplies heated working fluid (for example, at an outlet header fluidly coupled to the heat exchangers 202*a*-202*j*) at or about 100-115° C. The working fluid heats up in the heat exchangers 202*a*-202*j*. The heat exchangers 202*a*-202*j* can be distributed along the refining-petrochemical complex and be fluidly coupled to low grade waste heat sources in the refining-petrochemical complex plants. Para-Xylene products separation unit/plant streams can be used in the first hot water circuit 202, along with other plants such as the benzene extraction unit; CCR; and Xylene isomerization reaction and separation sections.

Heat exchangers 203*a*-203*c* recover heat from heat sources in a refining-petrochemicals complex portion that contains the para-xylene separation unit. Together, the heat exchangers in the second circuit 203 recover low grade waste heat to deliver the heat using the working fluid to the ORC 204. In this example, the heat from the second circuit 203 is provided to an evaporator 208 of the ORC 204.

The second circuit 203 can also use Para-Xylene products separation unit/plant streams. In some implementations, the second circuit 203 can also use other plants such as the benzene extraction unit; CCR; and Xylene isomerization reaction and separation sections. The second circuit 203 typically receives (for example, from an inlet header that fluidly couples a fluid heating tank 218 to the heat exchangers 203*a*-203*c*) high pressure working fluid (for example, hot water, hot oil, or other fluid (or combinations of them)) for instance, at between about 100° C. to 110° C. and supplies heated fluid (for example, at an outlet header fluidly coupled to the heat exchangers 203*a*-203*c*) at or about 120-160° C. The working fluid heats up in the heat exchangers 203*a*-203*c*. The heat exchangers 203*a*-203*c* can be distributed along the refining-petrochemical complex and be fluidly coupled to low grade waste heat sources in the refining-petrochemical complex plants using only Para-Xylene products separation unit/plant streams.

In the example implementation of system 200, the ORC 204 includes a working fluid that is thermally coupled to the heat recovery circuits 202 and 203 to heat the working fluid. In some implementations, the working fluid can be isobutane (an isobutane storage tank is not shown). The ORC 204 can also include a gas expander 210 (for example, a turbine-generator) configured to generate electrical power from the heated working fluid. As shown in FIG. 2A, the ORC 204 can additionally include a pre-heater 206, an evaporator 208, a pump 214, and a condenser 212. In this example implementation, the first circuit 202 supplies a heated, or heating, working fluid to the pre-heater 206, while the second circuit 203 supplies a heated, or heating, working fluid to the evaporator 208.

In typical implementations, the ORC 204 uses two groups of heat exchangers to first pre-heat the ORC liquid and to second vaporize the working fluid (for example, high pressure isobutane liquid) before a fluidly coupled inlet of a gas turbine (for example, gas expander 210) of the ORC 204 system. The first circuit 202 (a lower-temperature circuit) consisting of the ten heat exchangers (202*a*-202*j*) is used for pre-heating the working fluid while the second circuit (a higher temperature circuit), consisting of three heat exchangers (203*a*-203*c*) is used to vaporize the working fluid.

In the illustrated example, in the first circuit 202, the ten illustrated heat exchangers 202*a*-202*j* are located in what is known in the refining-petrochemical business by "Naphtha Block" that consists of Naphtha Hydro-treating (NHT) plant, CCR plant and Aromatics plants. Heat exchangers 202*a*-202*c* are located in the Para-xylene separation unit. These heat exchangers typically have thermal duties of about 13.97 MW; 5.16 MW; and 7.32 MW respectively. Heat exchangers 202*d* and 202*e* are located in the Para-xylene Isomerization reaction and separation units. These two heat exchangers have thermal duties of about 15.63 MW and 21.02 MW respectively. Heat exchanger 202*f* is located in the benzene extraction unit and it has a thermal duty of about 4.99 MW. Heat exchangers 202*g*-202*j* are located in the continuous catalytic reforming plant (CCR) and have thermal duties of about 38.91 MW; 7.75 MW; 9.29 MW and 24.1 MW respectively. The 10 heat exchangers are located in what is known in the refining-petrochemical business by "Naphtha Block" that consists of Naphtha Hydrotreating (NHT) plant, CCR plant and Aromatics plants.

In typical implementations, heat exchangers 202*a*-202*j* recover about 147 MW of low grade waste heat from specific streams in the "Naphtha Block" to deliver it back to the working fluid (for example, isobutane liquid) to pre-heat it in the ORC 204 system, in some implementations, from about 31° C. to its vaporization temperature of about 100° C. at 20 bar.

In the illustrated example, in the second circuit 203, the three illustrated heat exchangers 203*a*-203*c* are located in what is known as the "Naphtha Block" portion that contains the specific Para-Xylene separation unit streams having low grade waste heat. In typical implementations, heat exchangers 203*a*-203*c* have thermal duties of about 33 MW; 91.1 MW and 32.46 MW respectively.

In some implementations, power generated in the gas turbine (for example, gas expander 210) assuming an efficiency of about 85% is about 37.5 MW and the power consumed in the pump 214 using an assumed efficiency of about 75% is about 2.9 MW. The ORC 204 high pressure at the inlet of the turbine 210 is about 20 bar and at the outlet is about 4.3 bar. The cooling water supply temperature is assumed to be at 20° C. and return temperature is assumed to be at 30° C. The evaporator 208 thermal duty is about 157 MW to vaporize about 745 Kg/s of isobutane. The ORC 204 isobutane pre-heater 206 thermal duty is about 147 MW to heat up the isobutane from about 31° C. to 99° C. The condenser 212 cooling duty is 269 MW to cool down and condense the same flow of isobutane from about 52° C. to 30° C.

Figure 2B:
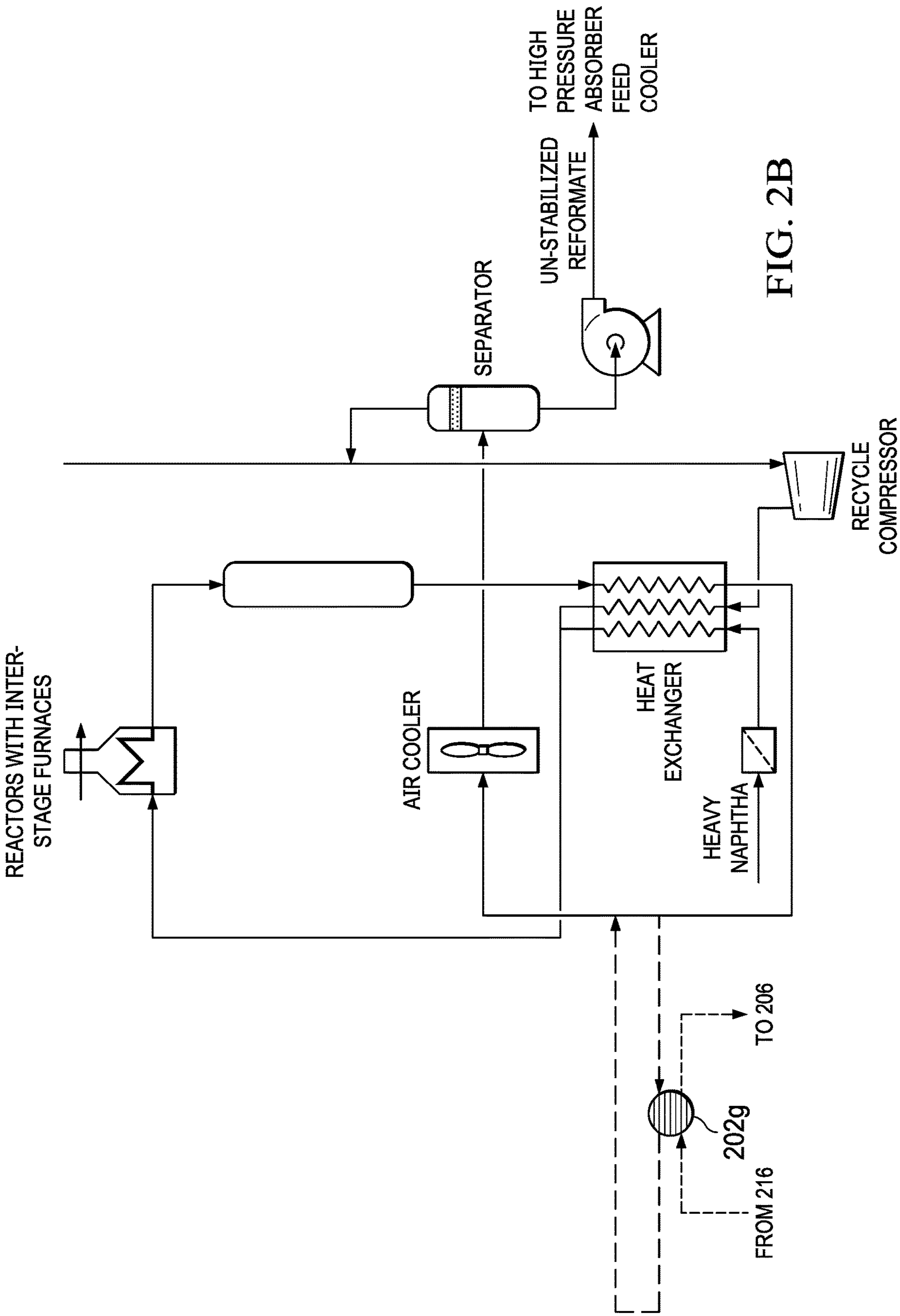

FIG. 2B is a schematic diagram that illustrates an example placement of heat exchanger 202*g* in a crude oil refinery continuous catalytic reforming (CCR) plant. In an example implementation, heat exchanger 202*g* may cool down the CCR last stage reactor outlet after the feed-effluent heat exchanger stream from 111° C. to 60° C. using the high pressure working fluid stream of the heat recovery circuit 202 at 50° C. to raise the working fluid temperature to 106° C. The thermal duty of heat exchanger 202*g* may be about 38.9 MW. The working fluid stream at 106° C. is sent to the header of heat recovery circuit 202.

Figure 2C:
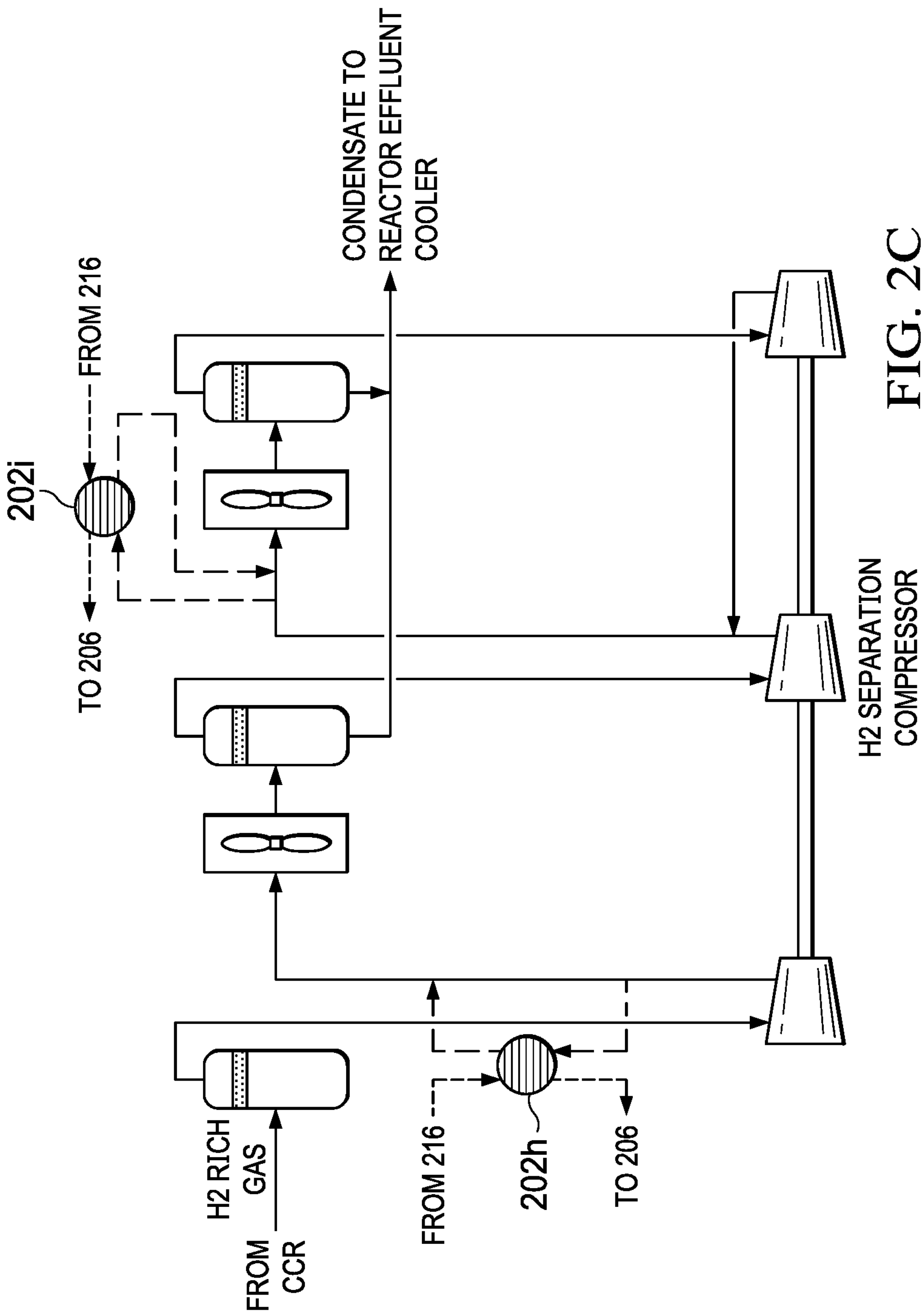

FIG. 2C is a schematic diagram that illustrates an example placement of heat exchangers 202*h* and 202*i* in the crude oil refinery continuous catalytic reforming (CCR) plant. In an example implementation, heat exchangers 202*h* and 202*i* have thermal duties of about 7.75 MW and 9.29 MW, respectively. Heat exchanger 202*h* cools down a 1st stage compressor outlet stream from 135° C. to 60° C. using the working fluid stream of first circuit 202 at 50° C. to raise its temperature to 130° C. The working fluid stream at 130° C. is sent to the header of the first circuit 202. The heat exchanger 202*i* cools down a 2nd stage compressor outlet stream from 143° C. to 60° C. using the working fluid stream of first circuit 202 at 50° C. to raise its temperature to 138° C. The working fluid stream at 138° C. is sent to the header of the first circuit 202.

Figure 2D:
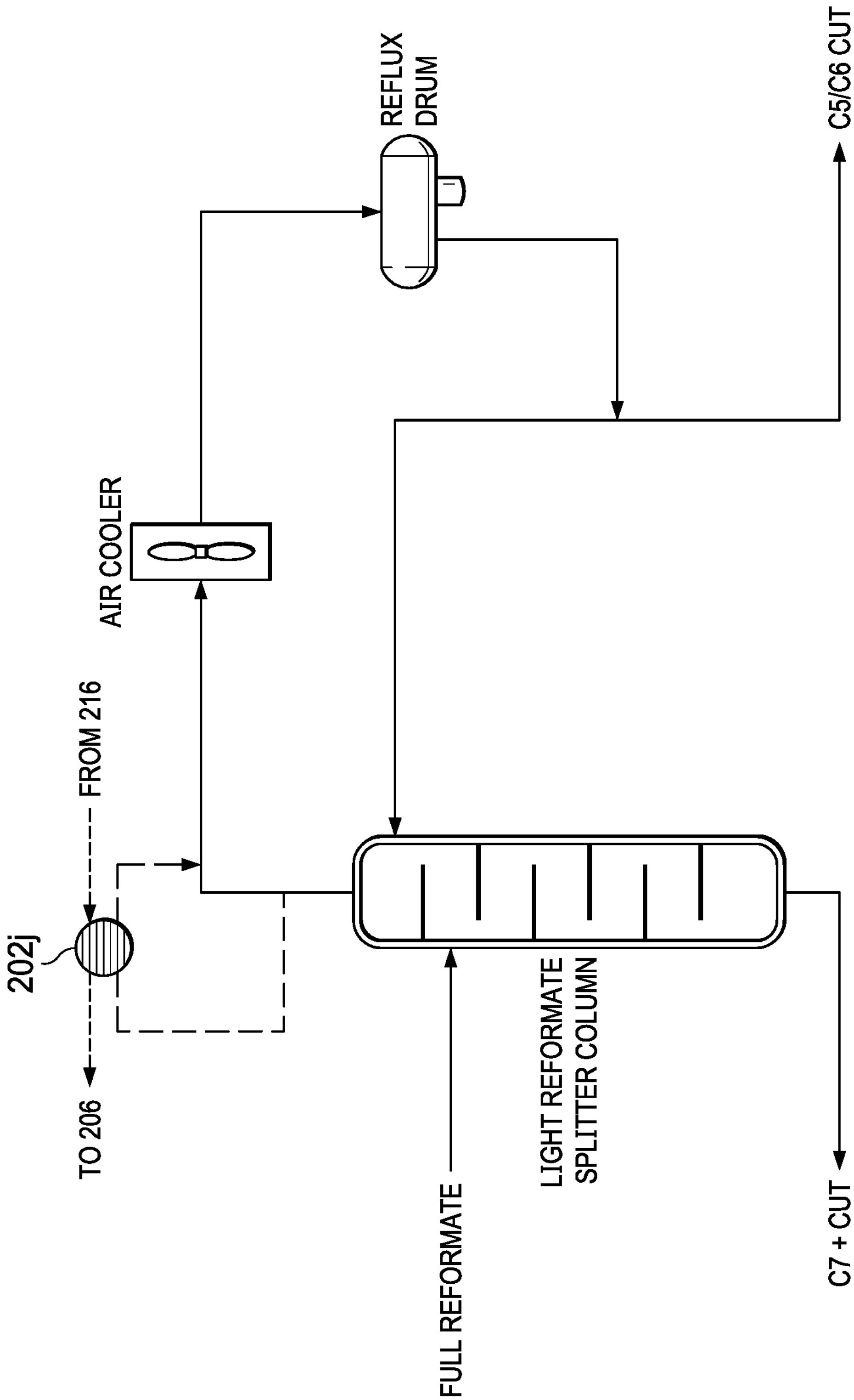

FIG. 2D is a schematic diagram that illustrates an example placement of heat exchanger 202*j* in the crude oil refinery continuous catalytic reforming (CCR) plant. In an example implementation, heat exchanger 202*j* cools down the CCR light reformate splitter column overhead stream from 87° C. to 60° C. using the working fluid stream of the first circuit 202 at 50° C. to raise the working fluid stream temperature to 82° C. The thermal duty of heat exchanger 202*j* is about 24.1 MW. The working fluid at 82° C. is sent to the header of the first circuit 202.

Figure 2E:
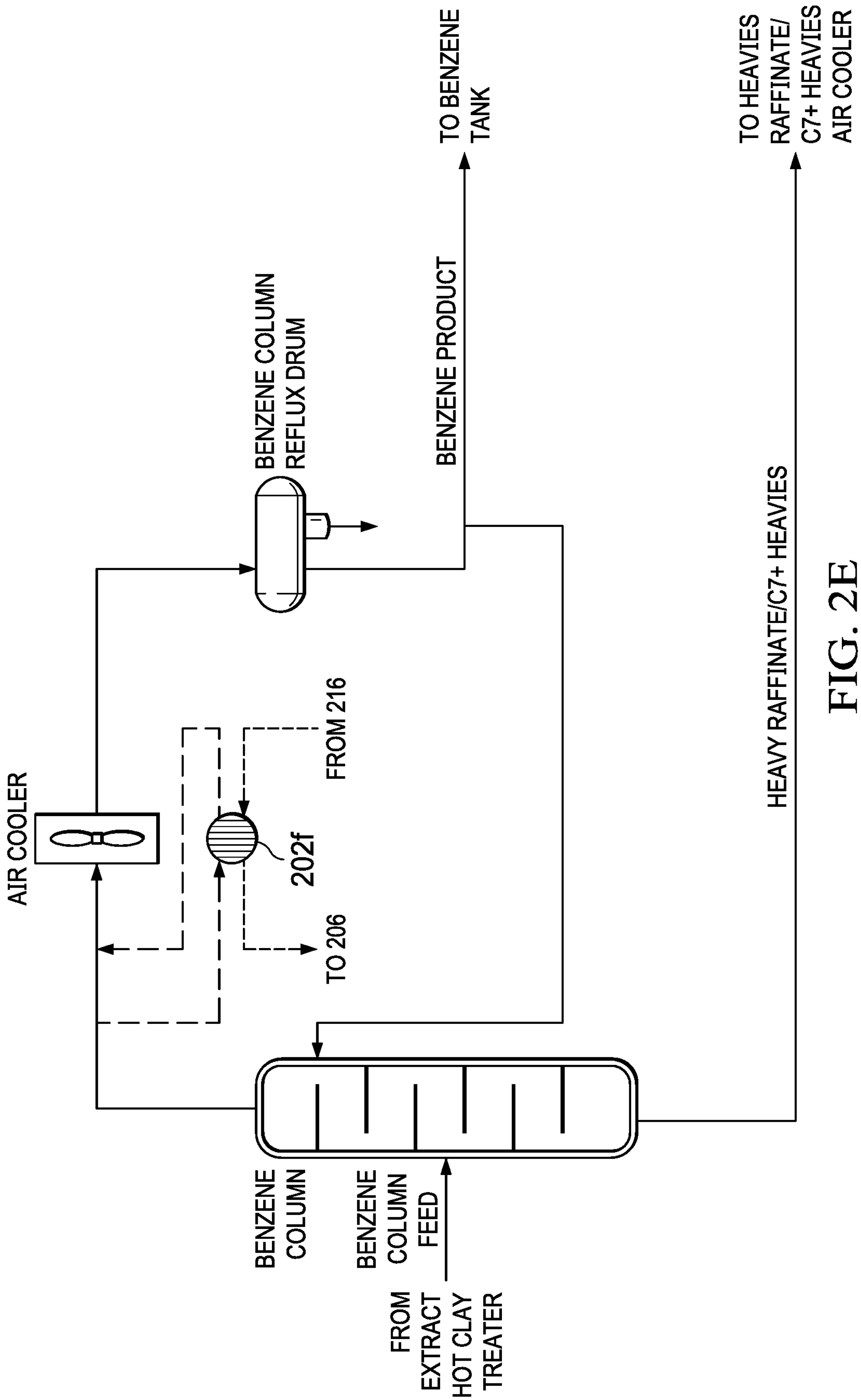

FIG. 2E is a schematic diagram that illustrates an example placement of heat exchanger 202*f* (the "Naphtha Block" benzene extraction unit waste heat recovery network heat exchanger) in the benzene extraction unit. In an example implementation, heat exchanger 202*f* cools down an overhead stream from 104° C. to 100° C. using the working fluid stream of the first circuit 202 at 50° C. to raise the working fluid stream temperature to 99° C. The thermal duty of heat exchanger 202*f* is 4.99 MW. The working fluid at 99° C. is sent to the header of the first circuit 202.

Figure 2F:
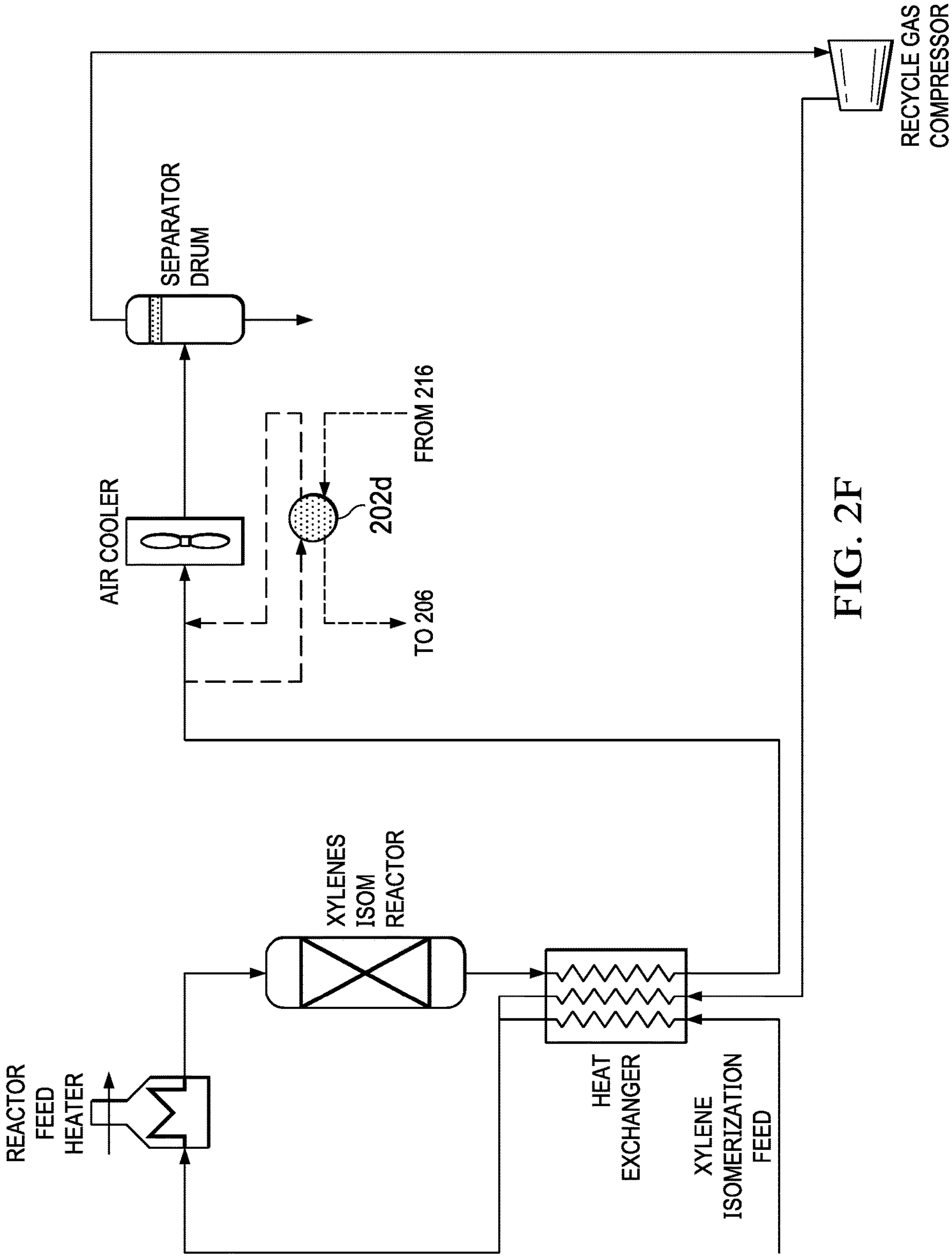

FIG. 2F is a schematic diagram that illustrates an example placement of heat exchanger 202*d* in the Para-Xylene separation plant. In an example implementation, heat exchanger 202*d* cools down the Xylene isomerization reactor outlet stream before the separator drum from 114° C. to 60° C. using the working fluid stream of the first circuit 202 at 50° C. to raise the working fluid stream temperature to 109° C. The thermal duty of heat exchanger 202*d* is about 15.6 MW. The working fluid at 109° C. is sent to the header of the first circuit 202.

Figure 2G:
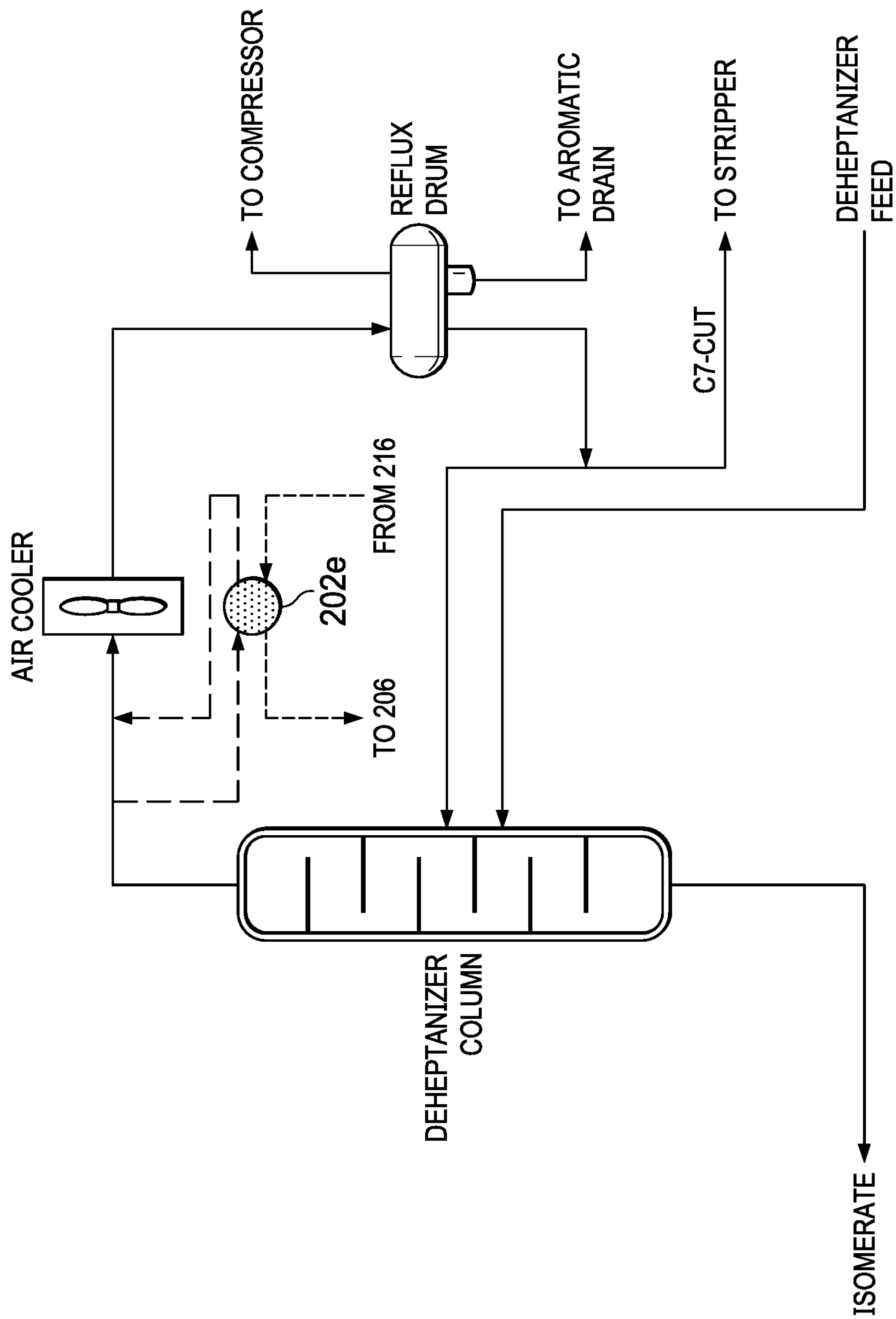

FIG. 2G is a schematic diagram that illustrates an example placement of heat exchanger 202*e* in the xylene isomerization de-heptanizer of the Para-Xylene separation plant. In an example implementation, heat exchanger 202*e* cools down the de-heptanizer column overhead stream from 112° C. to 60° C. using the working fluid stream of first circuit 202 at 50° C. to raise the working fluid stream temperature to 107°

C. The thermal duty of heat exchanger 202*e* is about 21 MW. The working fluid at 107° C. is sent to the header of the first circuit 202.

Figure 2H:
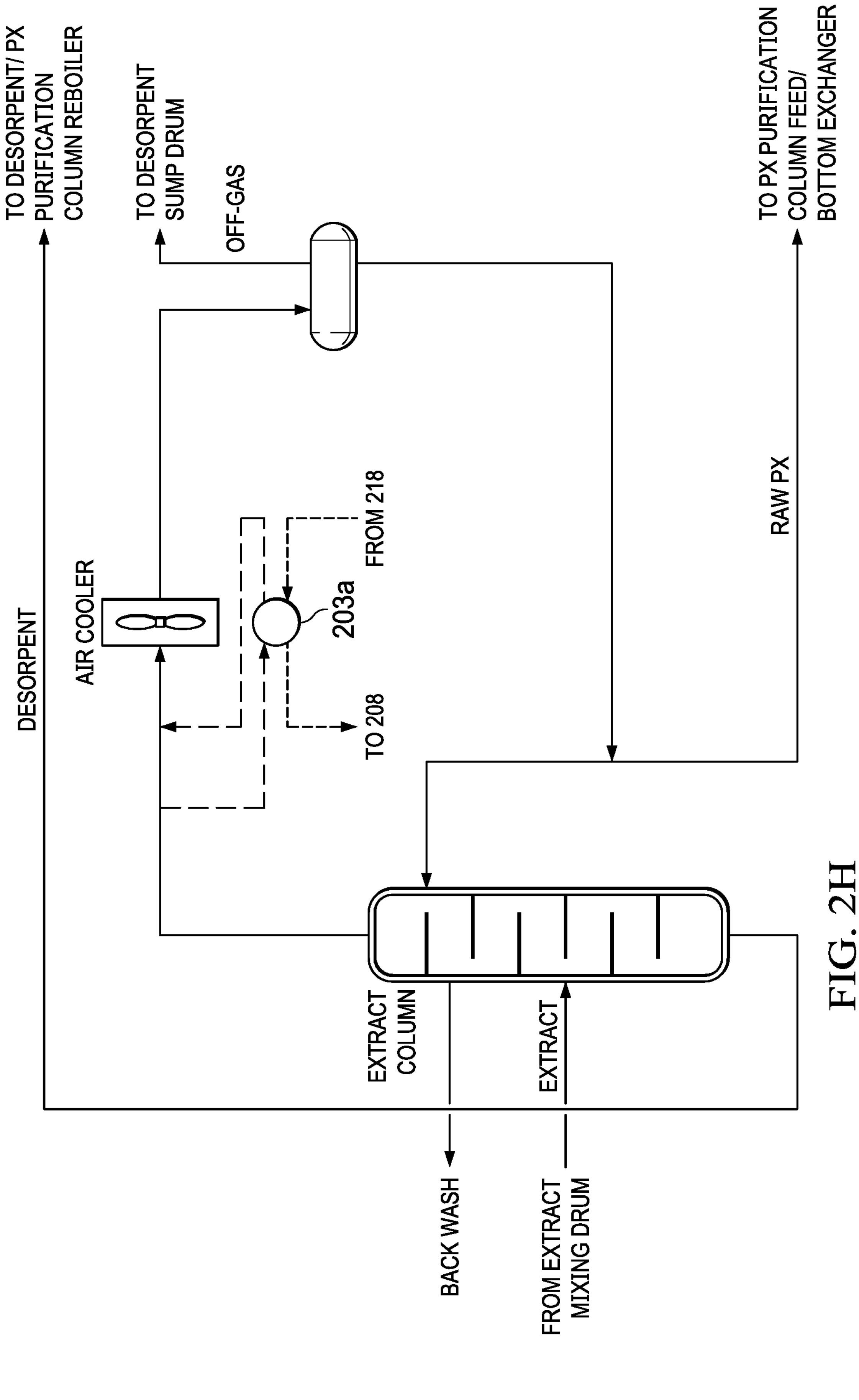

FIG. 2H is a schematic diagram that illustrates an example placement of heat exchanger 203*a* in the Para-Xylene separation plant. In an example implementation, heat exchanger 203*a* cools down an extract column overhead stream from 156° C. to 133° C. using the working fluid stream of the second circuit 203 at 105° C. to raise the working fluid stream temperature to 151° C. The thermal duty of heat exchanger 203*a* is about 33 MW. The working fluid at 151° C. is sent to the header of the second circuit 203.

Figure 2I:
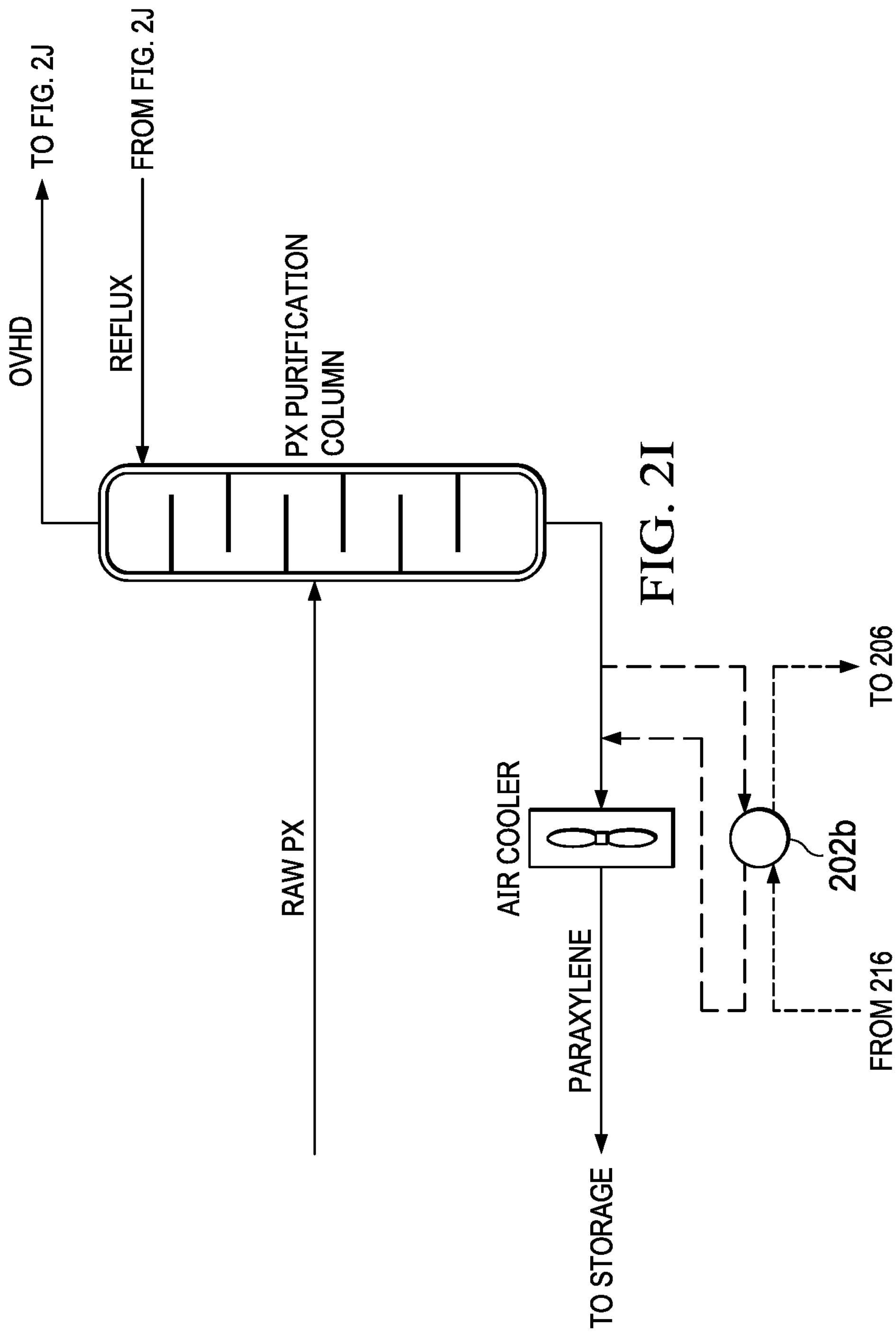

FIG. 2I is a schematic diagram that illustrates an example placement of heat exchanger 202*b* in the Para-Xylene separation plant. In an example implementation, heat exchanger 202*b* cools down the PX purification column bottom product stream from 155° C. to 60° C. using the working fluid stream of the first circuit 202 at 50° C. to raise the working fluid stream temperature to 150° C. The thermal duty of heat exchanger 202*b* is about 5.16 MW. The working fluid at 150° C. is sent to the header of the first circuit 202.

Figure 2J:
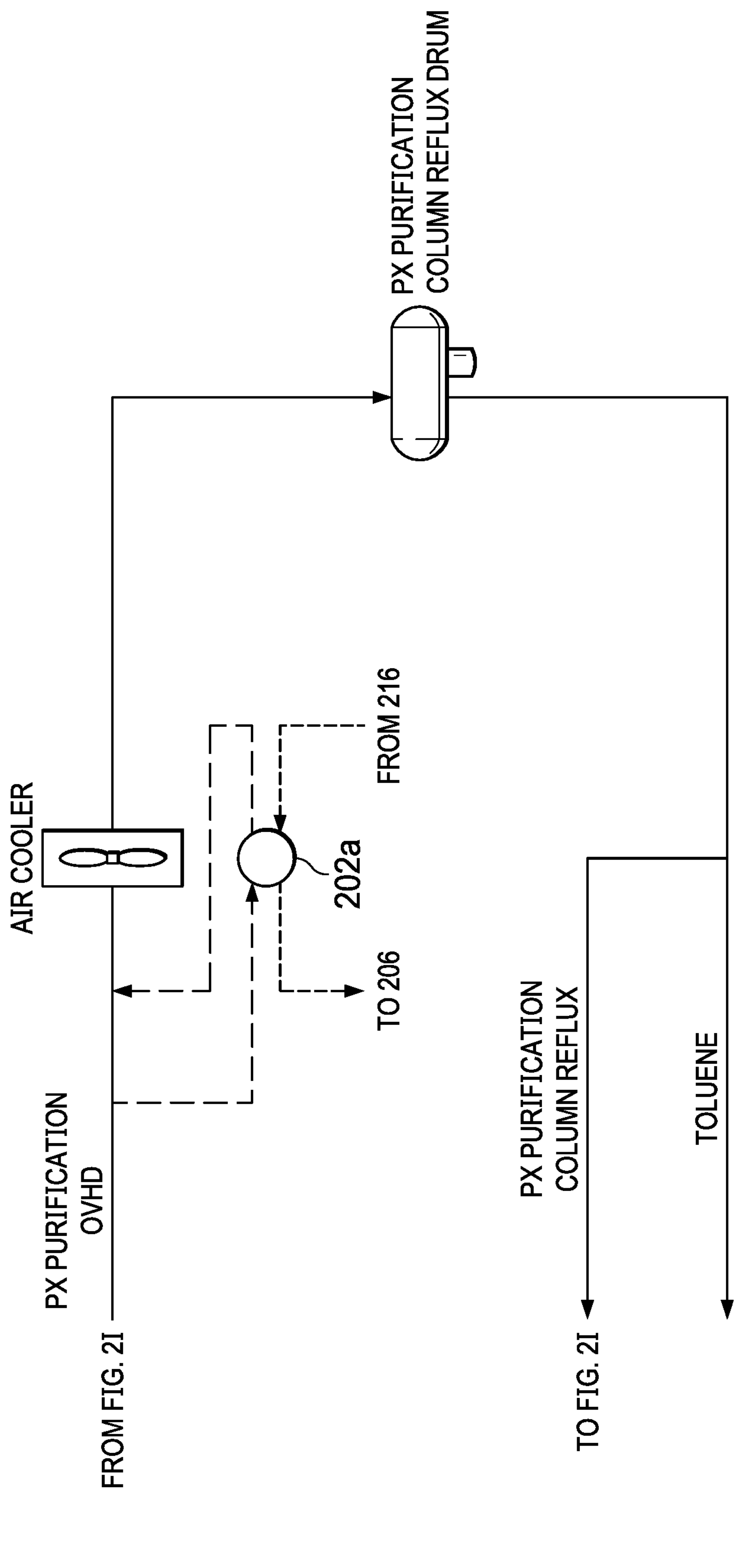

FIG. 2J is a schematic diagram that illustrates an example placement of heat exchanger 202*a* in the Para-Xylene separation plant. In an example implementation, heat exchanger 202*a* cools down the PX purification column overhead stream from 127° C. to 84° C. using the working fluid stream of the first circuit 202 at 50° C. to raise the working fluid stream temperature to 122° C. The thermal duty of this heat exchanger 202*a* is about 13.97 MW. The working fluid at 122° C. is sent to the header of the first circuit 202.

Figure 2K:
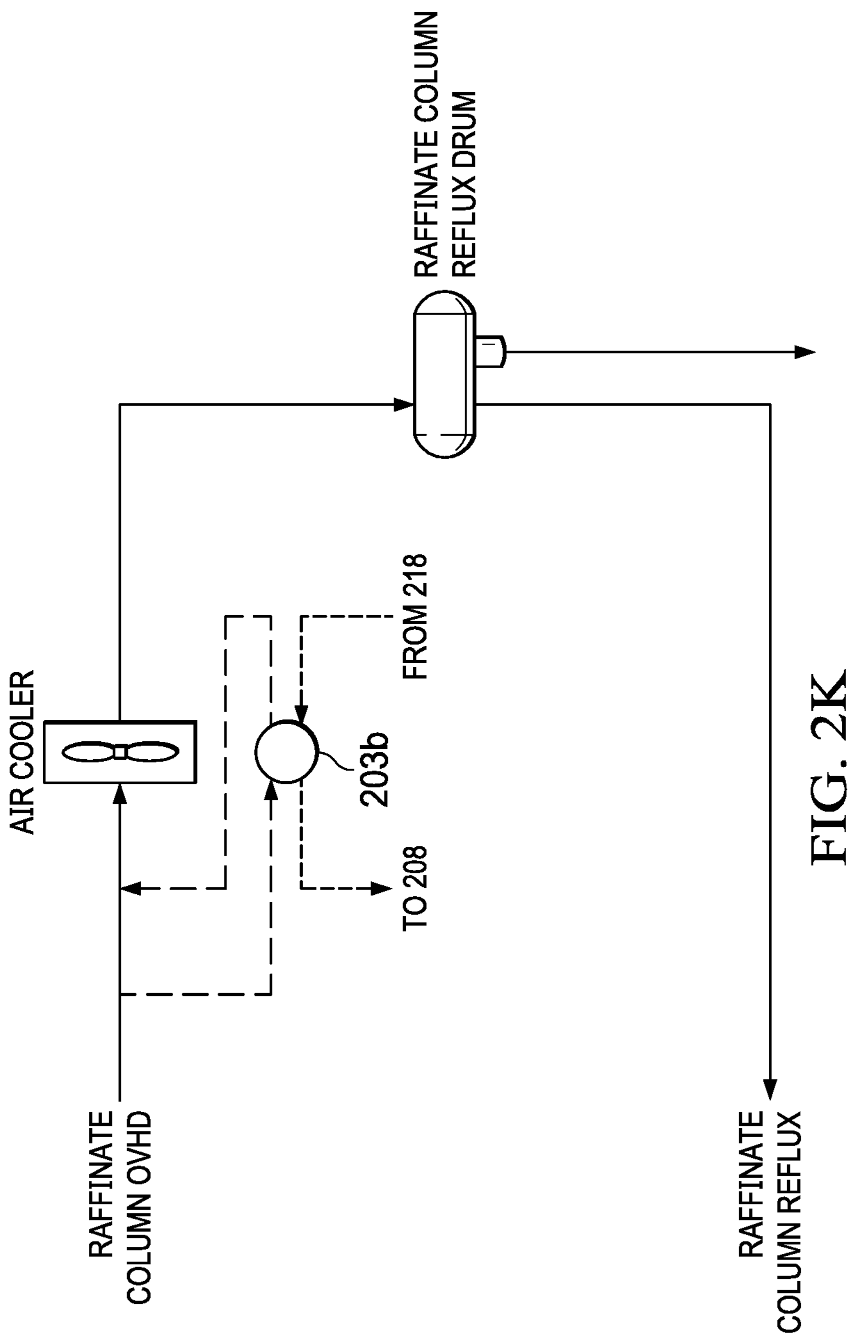

FIG. 2K is a schematic diagram that illustrates an example placement of heat exchanger 203*b* in the Para-Xylene separation plant. In an example implementation, heat exchanger 203*b* cools down a Raffinate column overhead stream from 162° C. to 130° C. using the working fluid stream of the second circuit 203 at 105° C. to raise the working fluid stream temperature to 157° C. The thermal duty of heat exchanger 203*b* is about 91.1 MW. The working fluid at 157° C. is sent to the header of the second circuit 203.

Figure 2L:
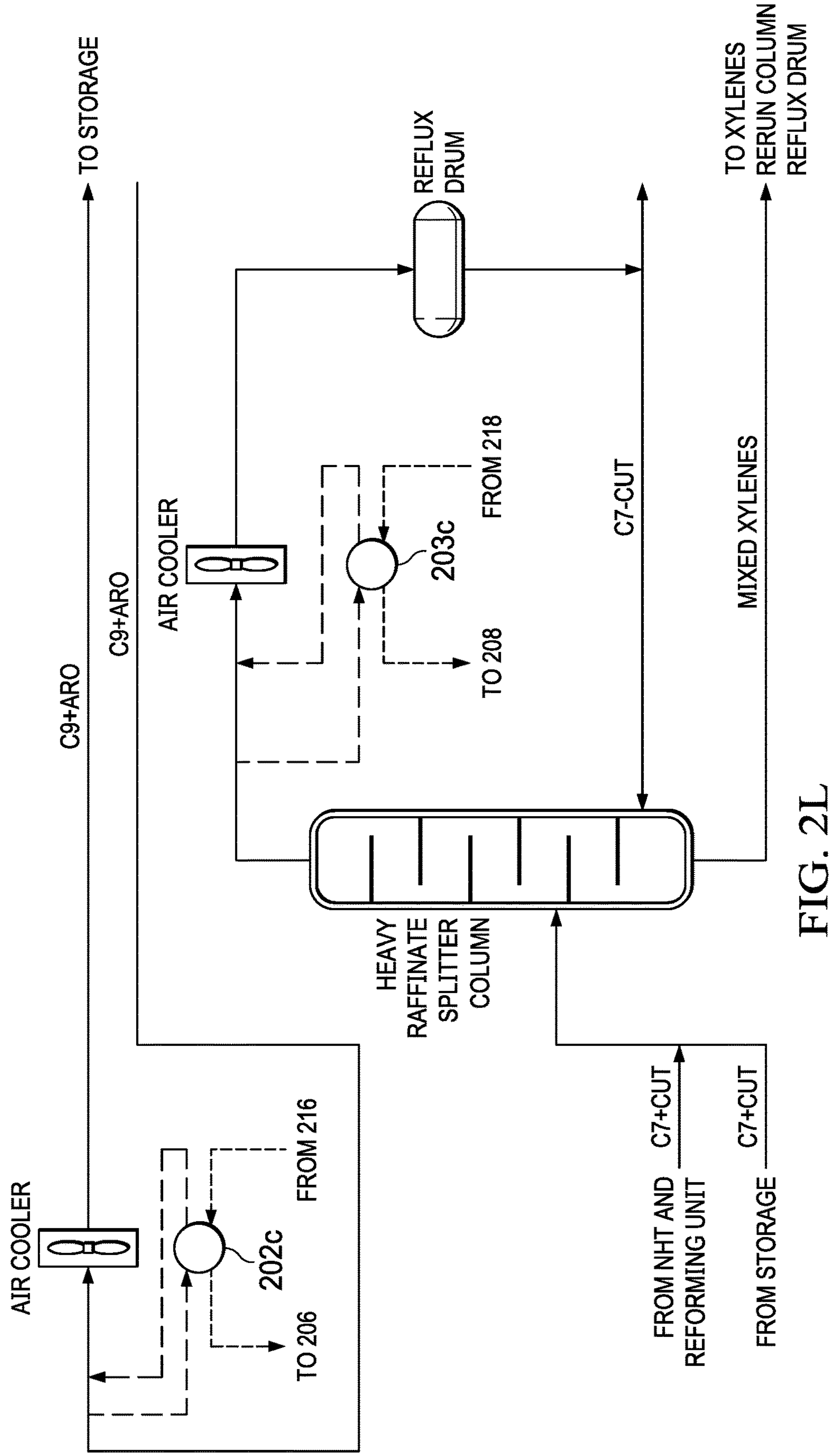

FIG. 2L is a schematic diagram that illustrates an example placement of heat exchangers 202*c* and 203*c* in the Para-Xylene separation plant. In an example implementation, heat exchangers 202*c* and 203*c* have thermal duties of 7.23 MW and 32.46 MW, respectively. Heat exchanger 202*c* cools down the C9+ aromatics before the storage tank from 169° C. to 60° C. using the working fluid stream of the first circuit 202 at 50° C. to raise its temperature to 164° C. The working fluid stream at 164° C. is sent to the header of the first circuit 202. Heat exchanger 203*c* cools down the heavy Raffinate splitter column overhead stream from 126° C. to 113° C. using the working fluid stream of the second circuit 203 at 105° C. to raise its temperature to 121° C. The working fluid stream at 121° C. is sent to the header of the second circuit 203.

Figure 2M:
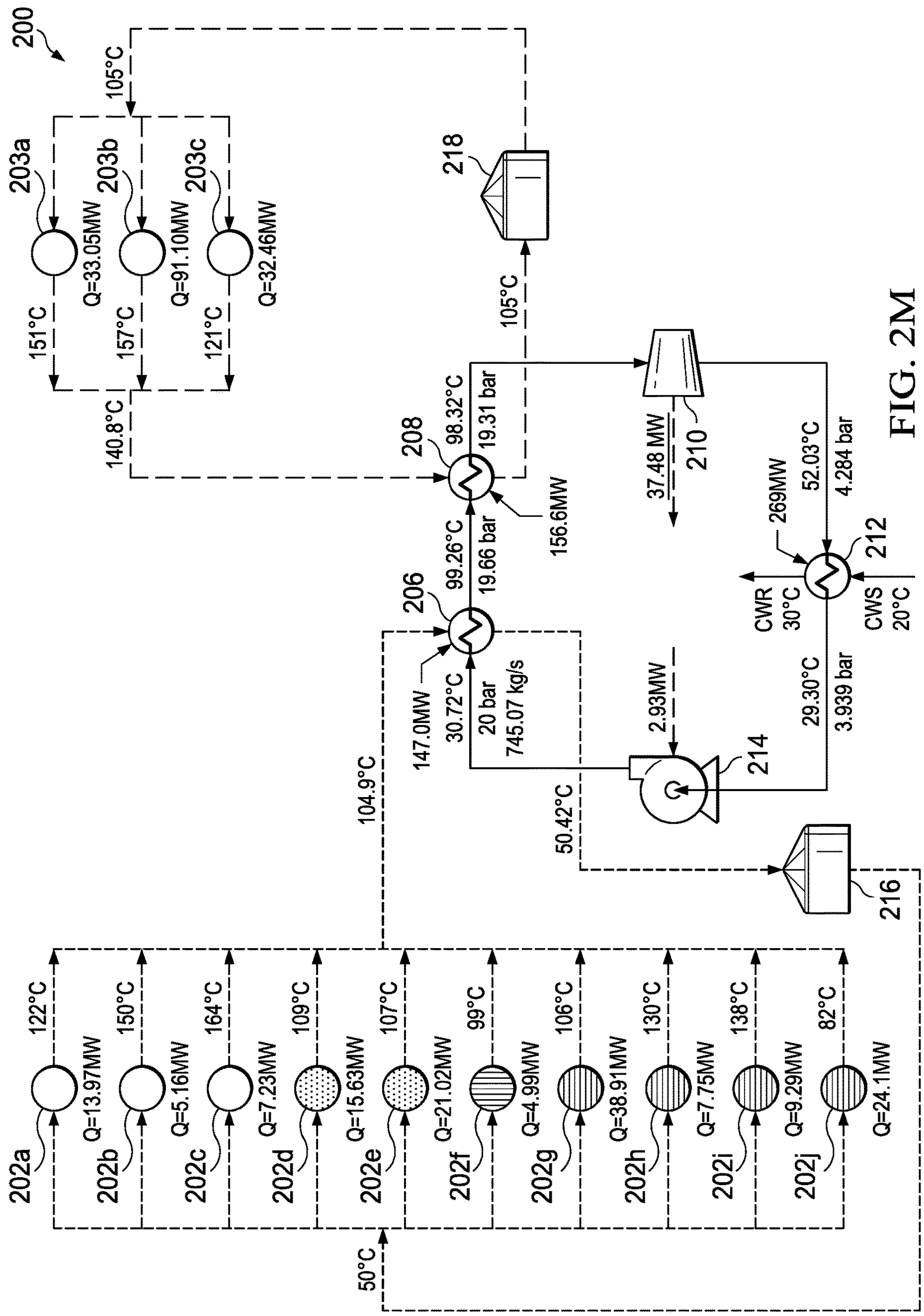

As described earlier, FIG. 2M illustrates a specific example of the system 200, including example temperatures, thermal duties, efficiencies, power inputs, and power outputs. For example, as illustrated in FIG. 2M, the CCR-Aromatics module generates a power output (with a gas turbine 210 using efficiency of 85%) of about 37.5 MW and the power consumed in the pump using efficiency of 75% is about 2.9 MW. The ORC 204 high pressure at the inlet of the turbine is about 20 bar and at the outlet is about 4.3 bar. The condenser 212 water supply temperature is assumed to be at 20° C. and return temperature is assumed to be at 30° C. The evaporator 208 thermal duty is about 157 MW to vaporize about 745 Kg/s of isobutane. The ORC 204 isobutane pre-heater 206 thermal duty is about 147 MW to heat up the isobutane from about 31° C. to 99° C. The condenser 212 cooling duty is 269 MW to cool down and condense the same flow of isobutane from about 52° C. to 30° C.

Figure 2N:
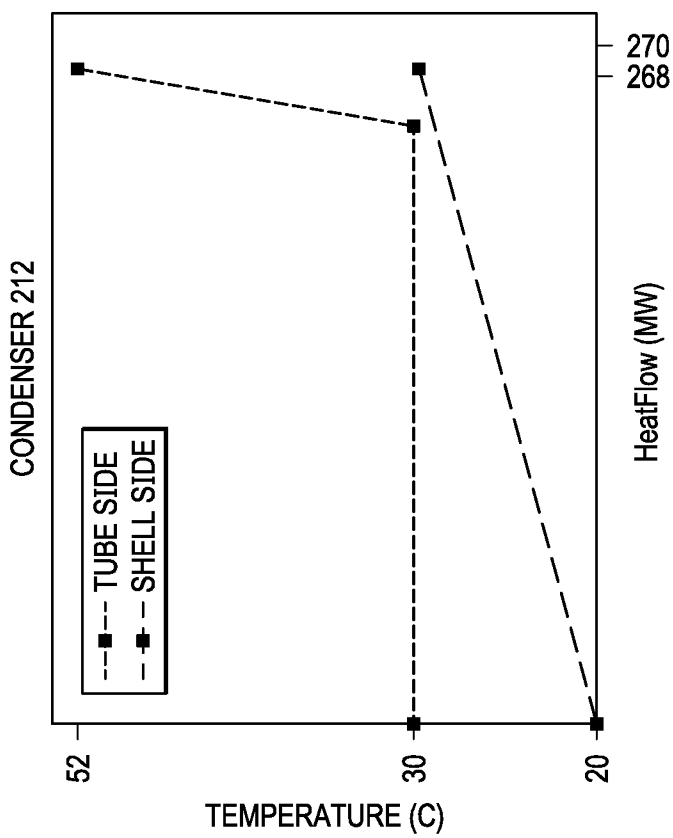
FIGS. 2N-2P are graphs that illustrate heat exchanger performance of heat exchangers in the power generation system shown in FIGS. 2A-2M.

FIG. 2N is a graph that shows a tube-side fluid temperature (for example, a cooling, or condenser, fluid flow) and a shell-side fluid temperature (for example, an ORC working fluid flow) in the condenser 212 during an operation of the system 200. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature. As shown in FIG. 2N, the condenser water (entering the tubes of the condenser 212) enters at about 20° C. and leaves at about 30° C. The ORC working fluid (entering the shell-side of the condenser) enters as a vapor at about 52° C., and then condenses at 30° C. and leaves the condensers as a liquid at about 30° C.

Figure 2O:
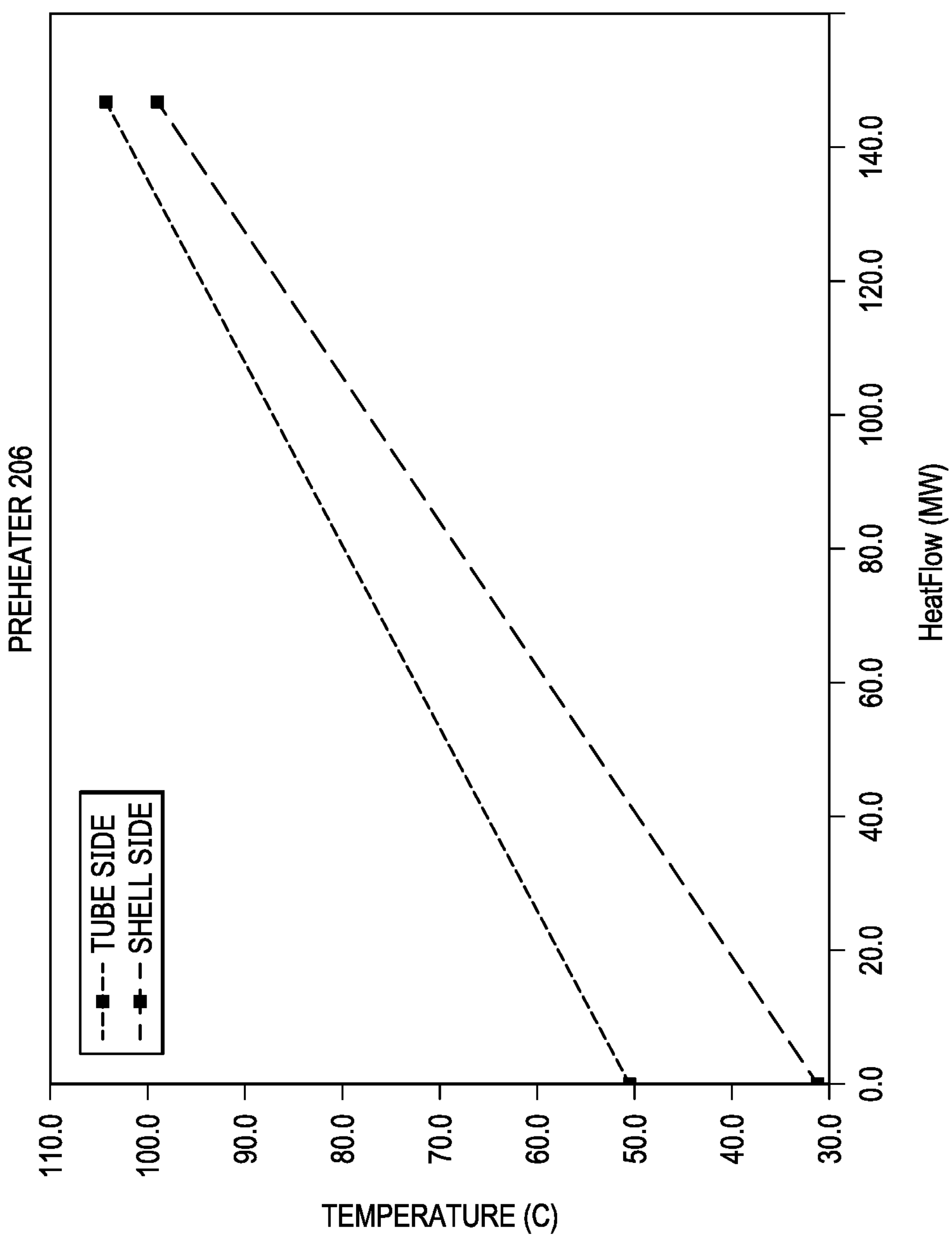

FIG. 2O is a graph that show a tube-side fluid temperature (for example, a heating fluid flow) and a shell-side fluid temperature (for example, an ORC working fluid flow) in the pre-heater 206 during an operation of the system 200. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 2O, as the tube-side fluid (for example, the hot oil or water in the heating fluid circuit 202) is circulated through the pre-heater 206, heat is transferred from that fluid to the shell-side fluid (for example, the ORC working fluid). Thus, the tube-side fluid enters the pre-heater 206 at about 105° C. and leaves the pre-heater 206 at about 50° C. The shell-side fluid enters the pre-heater 206 at about 30° C. (for example, as a liquid) and leaves the pre-heater 206 at about 99° C. (for example, also as a liquid or mixed phase fluid).

Figure 2P:
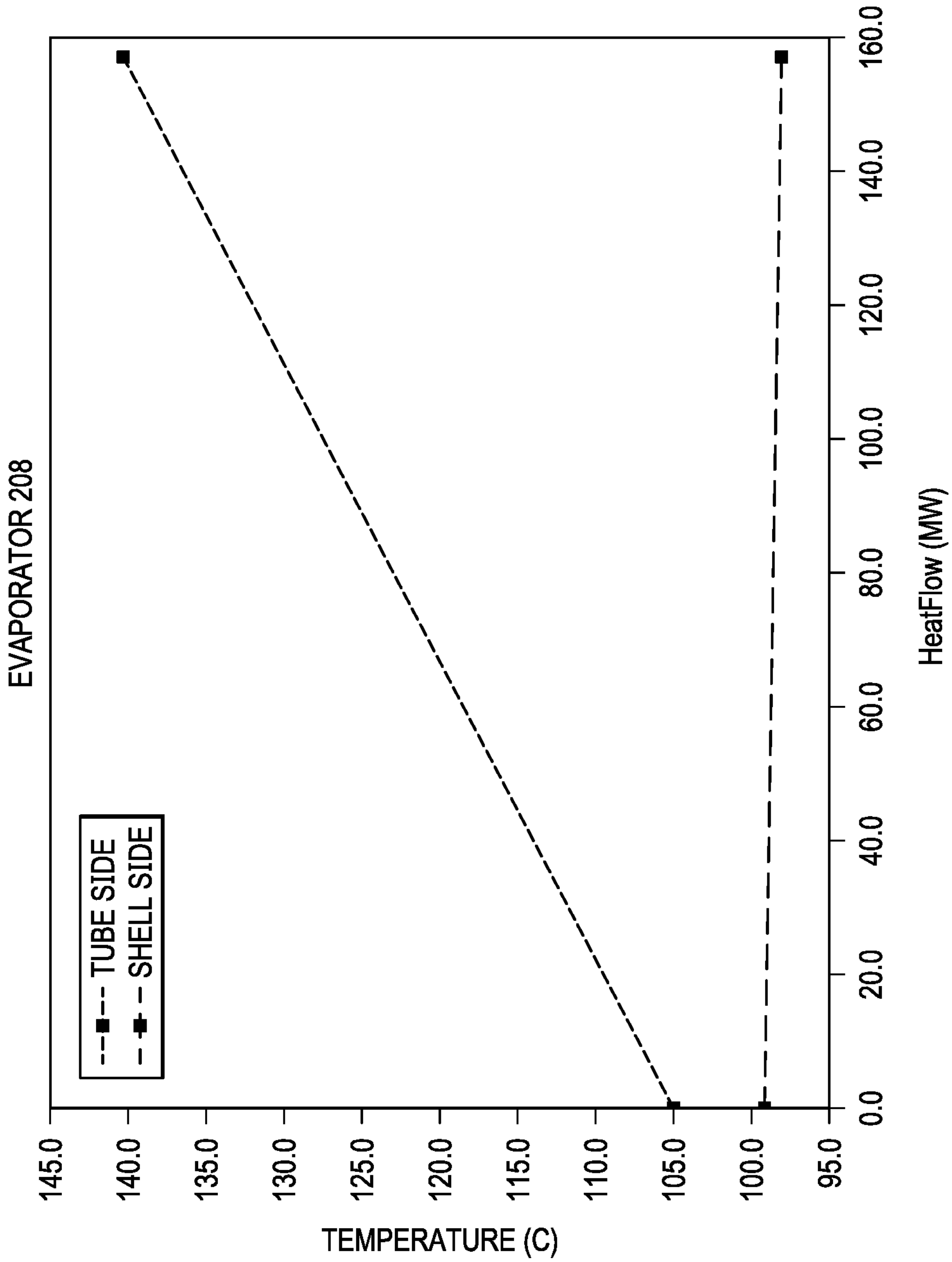

FIG. 2P is a graph that shows a tube-side fluid temperature (for example, a heating fluid flow) and a shell-side fluid temperature (for example, an ORC working fluid flow) in the evaporator 208 during an operation of the system 200. This graph shows a temperature difference between the fluids on the y-axis relative to a heat flow between the fluids on the x-axis. For example, as shown in this figure, as the temperature difference between the fluids decreases, a heat flow between the fluids can increase. For example, as shown in FIG. 2P, as the tube side fluid (for example, the hot oil or water in the heating fluid circuit 203) is circulated through the evaporator 208, heat is transferred from that fluid to the shell-side fluid (for example, the ORC working fluid). Thus, the tube-side fluid enters the evaporator 208 at about 141° C. and leaves the evaporator 208 at about 105° C. The shell-side fluid enters the evaporator 208, from the pre-heater 206, at about 99° C. (for example, as a liquid or mixed phase fluid) and leaves the evaporator 208 also at about 99° C. (for example, as a vapor with some superheating).

FIGS. 3A-3K illustrate schematic views of an example system 300 for a power conversion network significantly contributing to carbon-free power generation using waste heat sources associated with crude oil refining-petrochemical complex naphtha block plants (Naphtha Hydrotreating Plant (NHT), crude atmospheric distillation plant, and aromatics plant). In some implementations, the example system 300, can efficiently (for example, 12.3%) generate about 37.5 MW from novel specific portions of an entire crude oil refining-petrochemical site-wide low-low grade available waste heat sources.

The disclosure related to system 300 is concerned with power generation from low grade waste energy in industrial facilities and is related to at least the described multi-generation based gasification plant smart configurations for energy efficiency optimization and crude oil refining facilities and aromatics complex advanced energy efficient configurations also in this disclosure. In particular, the disclosure is of a novel portion of a refining-petrochemical-wide separation network's waste-heat-recovery networks of crude distillation Naphtha hydrotreating and aromatics plants and a related detailed processing scheme for efficient power generation using a basic Organic Rankine Cycle with specific operating conditions from used multiple scattered subset of the low grade energy quality process streams (note that not all of a refining-petrochemical-wide plant's processes are shown/described, but parts of plants typically involved in Organic Rankine Cycle power generation).

In some implementations, described process schemes related to system 300 can be considered for implementation in a single or multiple steps or in phases, where each phase can be separately implemented without hindering future phases. In some implementations, a minimum approach temperature used in the described waste heat recovery schemes can be as low as 3° C. However, higher minimum approach temperatures can be used in the beginning at the expense of less waste heat recovery, while reasonable power generation economics of scale designs (still attractive in the level of tens of MW) are used and best efficiency is realized in the future upon using a minimum approach temperature recommended for specific streams used in system design. In such future situations, more power generation can be realized without changing the initial design topology or the sub-set of low grade waste heat streams selected/utilized from an entire first-phase studied crude oil refining-petrochemical complex (or combinations of them). The described mini-power plant configuration and related process scheme(s) can be performed directly or, for safety and operability, through one system of two buffer streams, such as hot oil or high pressure hot water systems (or both), or a mix of direct and indirect means, as well as novel connections among buffer systems. A low-low grade waste-heat-to-power-conversion (for example, lower than the low grade waste heat temperature defined by DOE as 232° C.) is, in some implementations, implemented using a basic Organic Rankine Cycle system (ORC) using isobutane as an organic fluid at specific operating conditions.

The described configuration(s) and related process scheme(s) related to system 300 may not change with future energy efficiency improvement efforts inside individual crude oil refining-petrochemical complex naphtha block plants (for example, Continuous Catalytic Reforming (CCR) and aromatics plants) or with plant waste heat recovery practices (for example, heat integration or other improvements in in plant waste heat recovery practices) (or both).

Figure 3A:
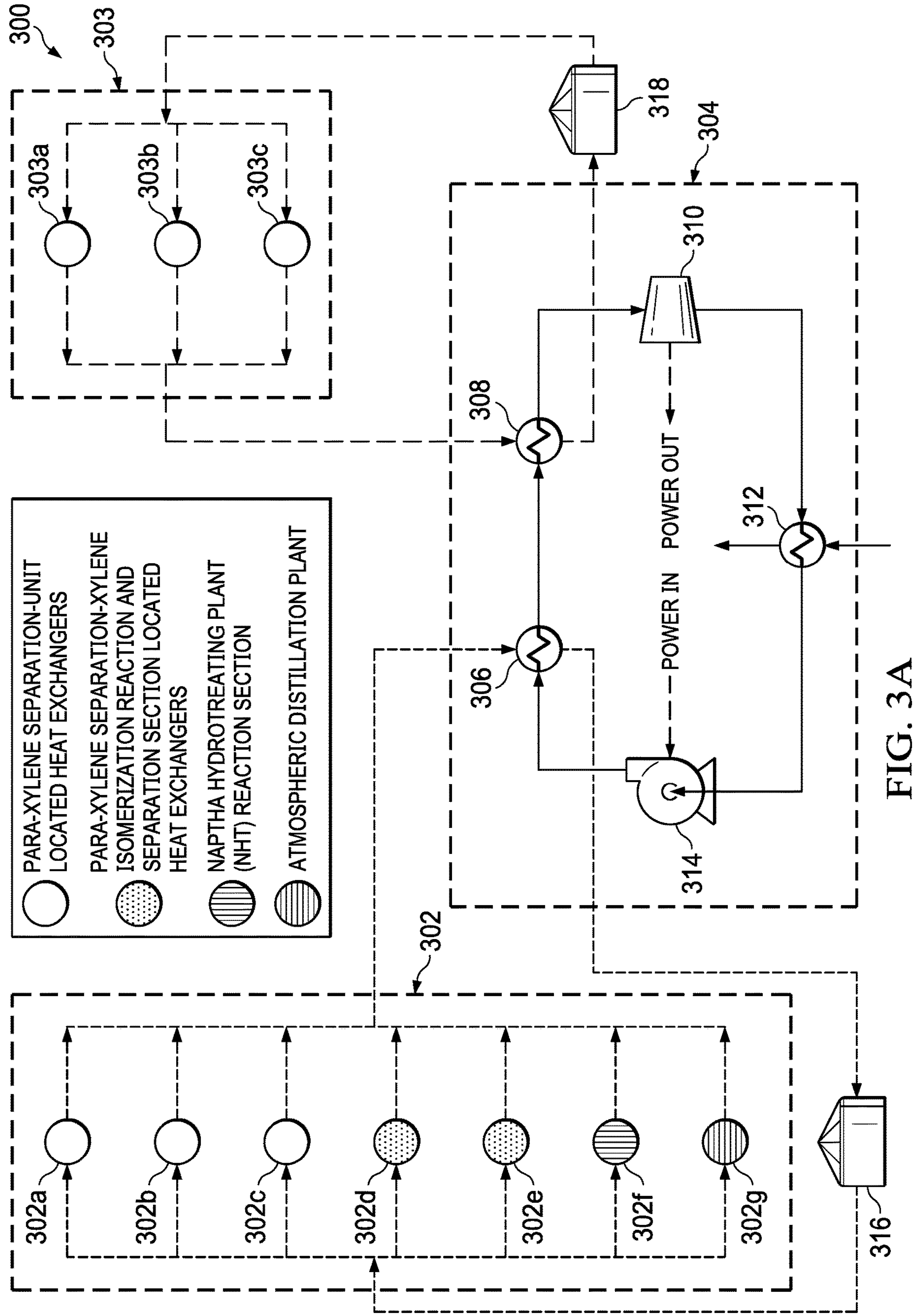
FIGS. 3A-3K are schematic illustrations of a power generation system that utilizes waste heat from one or more heat sources in a petrochemical refining plant.

FIG. 3A illustrates a schematic diagram of an example system 300 for a carbon-free mini-power plant synthesis in grassroots medium grade crude oil semi-conversion refining and aromatics using a novel waste-heat-to-power-conversion in crude distillation plant and naphtha block. In this example implementation, system 300 utilizes ten waste heat recovery heat exchangers that receive waste heat from a working fluid (for example, typically hot water but could include hot oil or other fluid (or combinations of them)) removing heat from naphtha hydrotreating plant (NHT) reaction section, atmospheric distillation plant, Para-Xylene separation, and Para-Xylene Separation-Xylene Isomerization Reaction and separation section Located Heat Exchangers. In the illustrated example, system 300 has two separate high pressure water systems/heat-recovery circuits (302 and 303) and one Organic Rankine Cycle (ORC) 304. For example, heat-recovery circuit 302 (first circuit) includes heat exchanges 302*a*-302*g* and heat-recovery circuit 303 (second circuit) includes heat exchangers 303*a*-303*c*. The ORC 304 includes a pre-heater 306, evaporator 308, gas expander 310, condenser 312, and a pump 314.

In a general operation, a working (or heating) fluid (for example, water, oil, or other fluid (or combinations of them)) is circulated through the heat exchangers of the heat recovery circuits (first circuit 302 and second circuit 303). An inlet temperature of the working fluid that is circulated into the inlets of each of the heat exchangers may be the same or substantially the same subject to any temperature variations that may result as the heating fluid flows through respective inlets, and may be circulated directly from a fluid heating tank 316 or 318. Each heat exchanger heats the working fluid to a respective temperature that is greater than the inlet temperature. The heated working fluids from the heat exchangers are combined in their respective heat recovery circuits (for example, mixed in a main header associated with each heat recovery circuit) and circulated through one of the pre-heater 306 or the evaporator 308 of the ORC 304. Heat from the heated working fluid heats the working fluid of the ORC 304 thereby increases the working fluid pressure and temperature. The heat exchange with the working fluid results in a decrease in the temperature of the working fluid. The working fluid is then collected in the fluid heating tank 316 or the fluid heating tank 318 and can be pumped back through the respective heat exchangers to restart the waste heat recovery cycle.

The working fluid circuit flowing working fluid through the heat exchangers of system 300 can include multiple valves that can be operated manually or automatically. For example, a modulating control valve (as one example) may be positioned in fluid communication with an inlet or outlet of each heat exchanger, on the working fluid and heat source side. In some aspects, the modulating control valve may be a shut-off valve or additional shut-off valves may also be positioned in fluid communication with the heat exchangers. An operator can manually open each valve in the circuit to cause the working fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

In the manner described earlier, the working fluid can be looped through the heat exchangers to recover heat that would otherwise go to waste in the various described plants (for example, Naphtha Hydrotreating Plant, Atmospheric Distillation Plant, and other plants), and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

More specifically, in the illustrated example, each heat exchanger facilitates heat recovery from a heat source in a particular industrial unit to the working fluid. For example, heat exchangers 302*a*-302*c* recover heat from heat sources in a para-xylene separation unit. Heat exchangers 302*d*-302*e* recover heat from heat sources in a para-xylene isomerization reaction and separation unit(s). Heat exchanger 302*f* recovers heat from a heat source(s) in a Naphtha Hydrotreating Plant Reaction Section. Heat exchanger 302*g* recovers heat from heat sources in an Atmospheric Distillation Plant. Together, heat exchangers in the first circuit 302 recover low grade waste heat from specific streams in a "Naphtha Block" to deliver the heat using the working fluid to the ORC 304. In this example, the heat from the first circuit 302 is provided to a header/pre-heater 306 of the ORC 304.

Generally, the first circuit 302 receives (for example, from an inlet header that fluidly couples a fluid heating tank 316 to the heat exchangers 302*a*-302*g*) high pressure working fluid (for example, hot water, hot oil, or other fluid (or combinations of them)) for instance, at between about 40° C. to 60° C. and supplies heated working fluid (for example, at an outlet header fluidly coupled to the heat exchangers 302*a*-302*g*) at or about 100-115° C. The working fluid heats up in the heat exchangers 302*a*-302*g*. The heat exchangers 302*a*-302*g* can be distributed along the refining-petrochemical complex and be fluidly coupled to low grade waste heat sources in the refining-petrochemical complex plants. Para-Xylene products separation unit/plant streams can be used in the first hot water circuit 302, along with other plants (for example, Naphtha Hydrotreating Plant, Atmospheric Distillation Plant, and other plants).

Heat exchangers 303*a*-303*c* recover heat from heat sources in a refining-petrochemicals complex portion that contains the para-xylene separation unit. Together, the heat exchangers in the second circuit 303 recover low grade waste heat to deliver the heat using the working fluid to the ORC 304. In this example, the heat from the second circuit 303 is provided to an evaporator 308 of the ORC 304.

The second circuit 303 can also use Para-Xylene products separation unit/plant streams. In some implementations, the second circuit 303 can also use other plants (for example, Naphtha Hydrotreating Plant, Atmospheric Distillation Plant, and other plants). The second circuit 303 typically receives (for example, from an inlet header that fluidly couples a fluid heating tank 318 to the heat exchangers 303*a*-303*c*) high pressure working fluid (for example, hot water, hot oil, or other fluid (or combinations of them)) for instance, at between about 100° C. to 110° C. and supplies heated fluid (for example, at an outlet header fluidly coupled to the heat exchangers 303*a*-303*c*) at or about 120-160° C. The working fluid heats up in the heat exchangers 303*a*-303*c*. The heat exchangers 303*a*-303*c* can be distributed along the refining-petrochemical complex and be fluidly coupled to low grade waste heat sources in the refining-petrochemical complex plants using only Para-Xylene products separation unit/plant streams.

In the example implementation of system 300, the ORC 304 includes a working fluid that is thermally coupled to the heat recovery circuits 302 and 303 to heat the working fluid. In some implementations, the working fluid can be isobutane (an isobutane storage tank is not shown). The ORC 304 can also include a gas expander 310 (for example, a turbine-generator) configured to generate electrical power from the heated working fluid. As shown in FIG. 3A, the ORC 304 can additionally include a pre-heater 306, an evaporator 308, a pump 314, and a condenser 312. In this example implementation, the first circuit 302 supplies a heated, or heating, working fluid to the pre-heater 306, while the second circuit 303 supplies a heated, or heating, working fluid to the evaporator 308.

In typical implementations, the ORC 304 uses two groups of heat exchangers to first pre-heat the ORC liquid and to second vaporize the working fluid (for example, high pressure isobutane liquid) before a fluidly coupled inlet of a gas turbine (for example, gas expander 310) of the ORC 304 system. The first circuit 302 (a lower-temperature circuit) consisting of the seven heat exchangers (302*a*-302*g*) is used for pre-heating the working fluid while the second circuit (a higher temperature circuit), consisting of three heat exchangers (303*a*-303*c*) is used to vaporize the working fluid.

In the illustrated example, in the first circuit 302, the seven illustrated heat exchangers 302*a*-302*g* are located in what is known in the refining-petrochemical business by "Naphtha Block" that consists of Naphtha Hydro-treating (NHT) plant, CCR plant, and Aromatics plants. Heat exchangers 302*a*-302*c* are located in the Para-xylene separation unit. These heat exchangers typically have thermal duties of about 13.97 MW; 5.16 MW; and 7.32 MW respectively. Heat exchangers 302*d* and 302*e* are located in the Para-xylene Isomerization reaction and separation units. These two heat exchangers have thermal duties of about 15.63 MW and 21.02 MW respectively. Heat exchanger 302*f* is located in the Naphtha hydrotreating plant and it has a thermal duty of about 27.12 MW. Heat exchanger 302*g* is located in the crude distillation plant and has a thermal duties of about 56.8 MW. The seven heat exchangers are located in what is known in the refining-petrochemical business by "Naphtha Block" that consists of Naphtha Hydrotreating (NHT) plant and Aromatics plants. In some implementations, the portion of the Naphtha block considered in an aromatics complex and naphtha hydrotreating plants only while the heat exchanger 302*g* is located in a crude distillation plant which is normally close to the Naphtha hydrotreating plant.

In typical implementations, heat exchangers 302*a*-302*g* recover about 147 MW of low grade waste heat from specific streams in the "Naphtha Block" to deliver it back to the working fluid (for example, isobutane liquid) to pre-heat it in the ORC 304 system, in some implementations, from about 31° C. to its vaporization temperature of about 100° C. at 20 bar.

In the illustrated example, in the second circuit 303, the three illustrated heat exchangers 303*a*-303*c* are located in what is known as the "Naphtha Block" portion that contains the specific Para-Xylene separation unit streams having low grade waste heat. In typical implementations, heat exchangers 303*a*-303*c* have thermal duties of about 33 MW; 91.1 MW and 32.46 MW respectively.

In some implementations, power generated in the gas turbine (for example, gas expander 310) assuming an efficiency of about 85% is about 37.5 MW and the power consumed in the pump 314 using an assumed efficiency of about 75% is about 2.9 MW. The ORC 304 high pressure at the inlet of the turbine is about 20 bar and at the outlet is about 4.3 bar. The cooling water supply temperature is assumed to be at 20° C. and return temperature is assumed to be at 30° C. The evaporator 308 thermal duty is about 157 MW to vaporize about 745 Kg/s of isobutane. The ORC 304 isobutane pre-heater 306 thermal duty is about 147 MW to heat up the isobutane from about 31° C. to 99° C. The condenser 312 cooling duty is 269 MW to cool down and condense the same flow of isobutane from about 52° C. to 30° C.

Figure 3B:
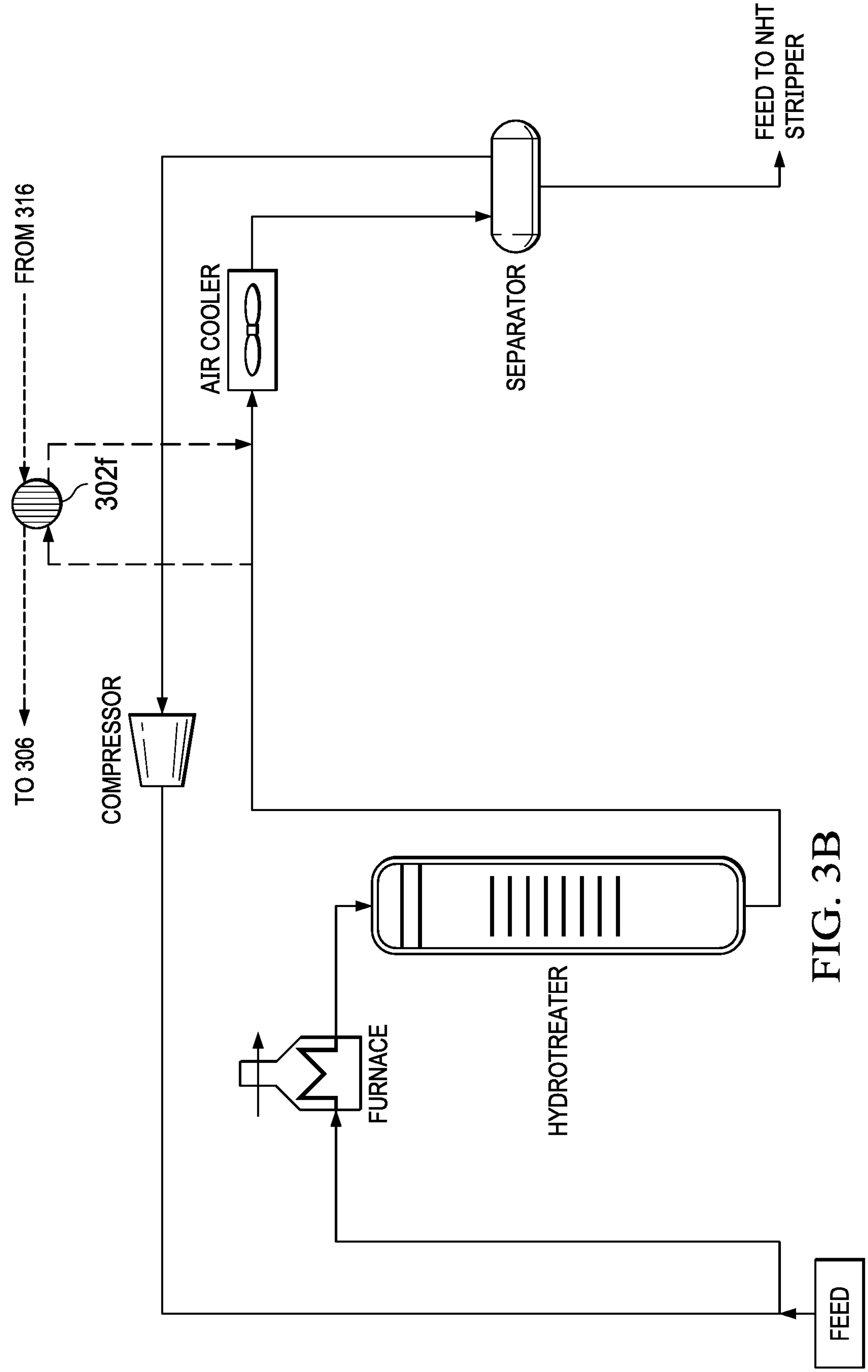

FIG. 3B is a schematic diagram that illustrates the Naphtha Hydrotreating (NHT) plant waste heat recovery network heat exchanger 302*f*. Heat exchanger 302*f* cools down the Hydrotreater/reactor product outlet before the separator from 111° C. to 59° C. using high pressure first circuit 302 working fluid stream at 50° C. to raise the working fluid stream temperature to 106° C. The thermal duty of heat exchanger 302*f* is about 27.1 MW. The working fluid stream at 106° C. is sent to the first circuit header 306.

Figure 3C:
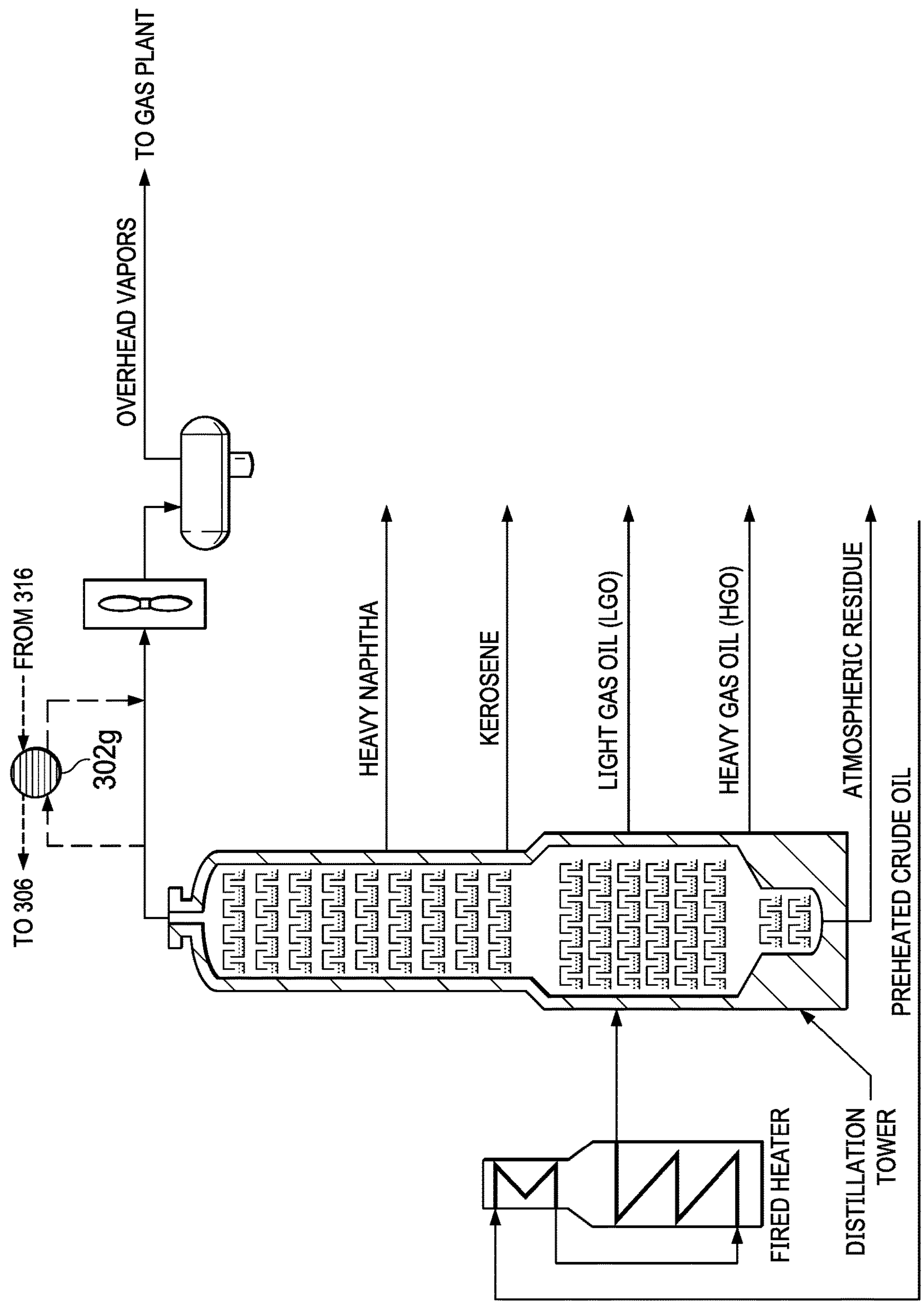

FIG. 3C is a schematic diagram that illustrates the atmospheric distillation plant waste heat recovery network heat exchanger 302*g*. Heat exchanger 302*g* cools down the atmospheric crude tower overhead stream from 97° C. to 60° C. using a high pressure first circuit 302 working fluid stream at 50° C. to raise the working fluid stream temperature to 92° C. The thermal duty of heat exchanger 302*g* is about 56.8 MW. The working fluid stream at 92° C. is sent to the first circuit header 306.

Figure 3D:
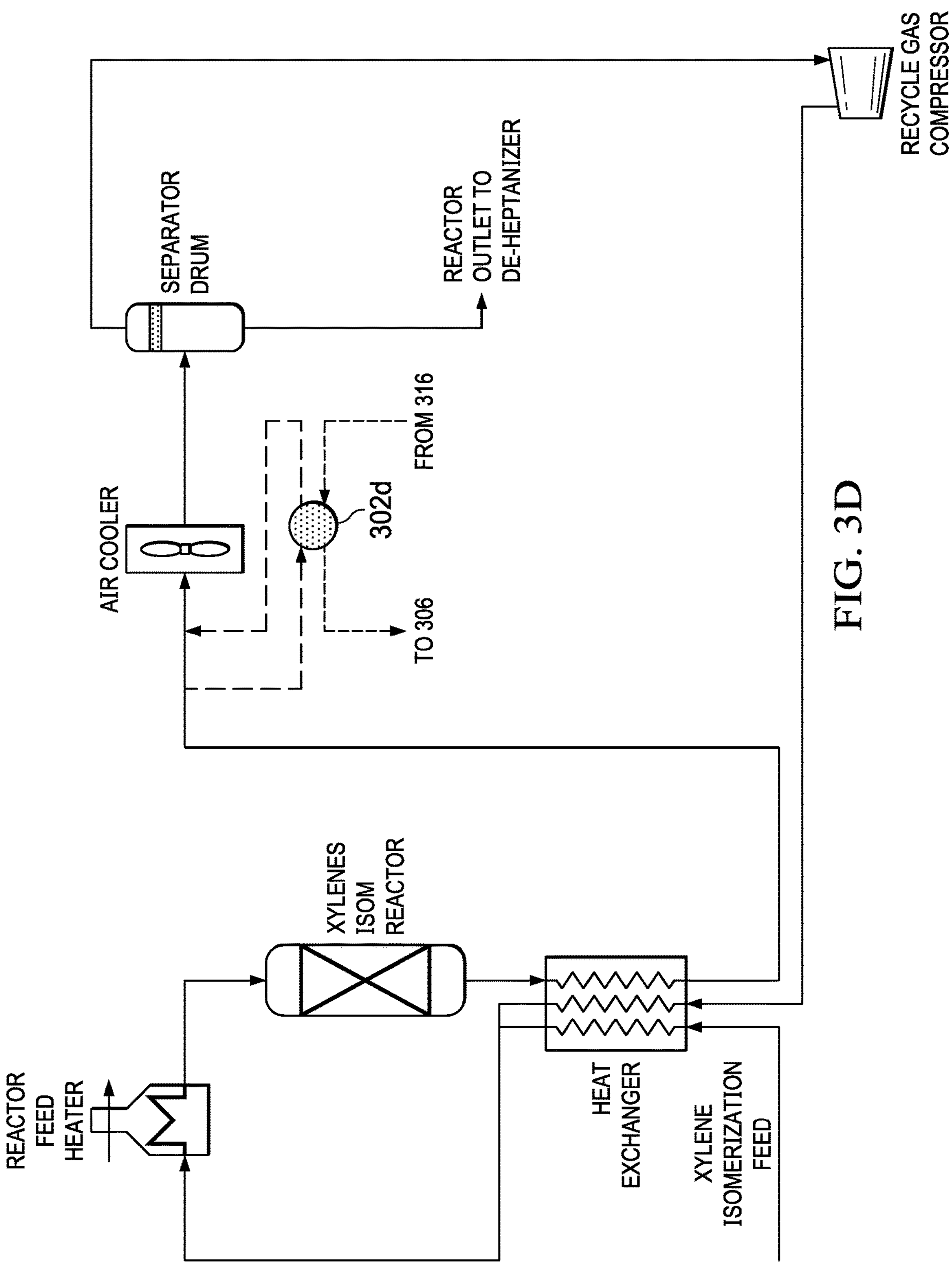

FIG. 3D is a schematic diagram that illustrates an example placement of heat exchanger 302*d* in the Para-Xylene separation plant. In an example implementation, heat exchanger 302*d* cools down the Xylene isomerization reactor outlet stream before the separator drum from 114° C. to 60° C. using the working fluid stream of the first circuit 302 at 50° C. to raise the working fluid stream temperature to 109° C. The thermal duty of heat exchanger 302*d* is about 15.6 MW. The working fluid at 109° C. is sent to the header of the first circuit 302.

Figure 3E:
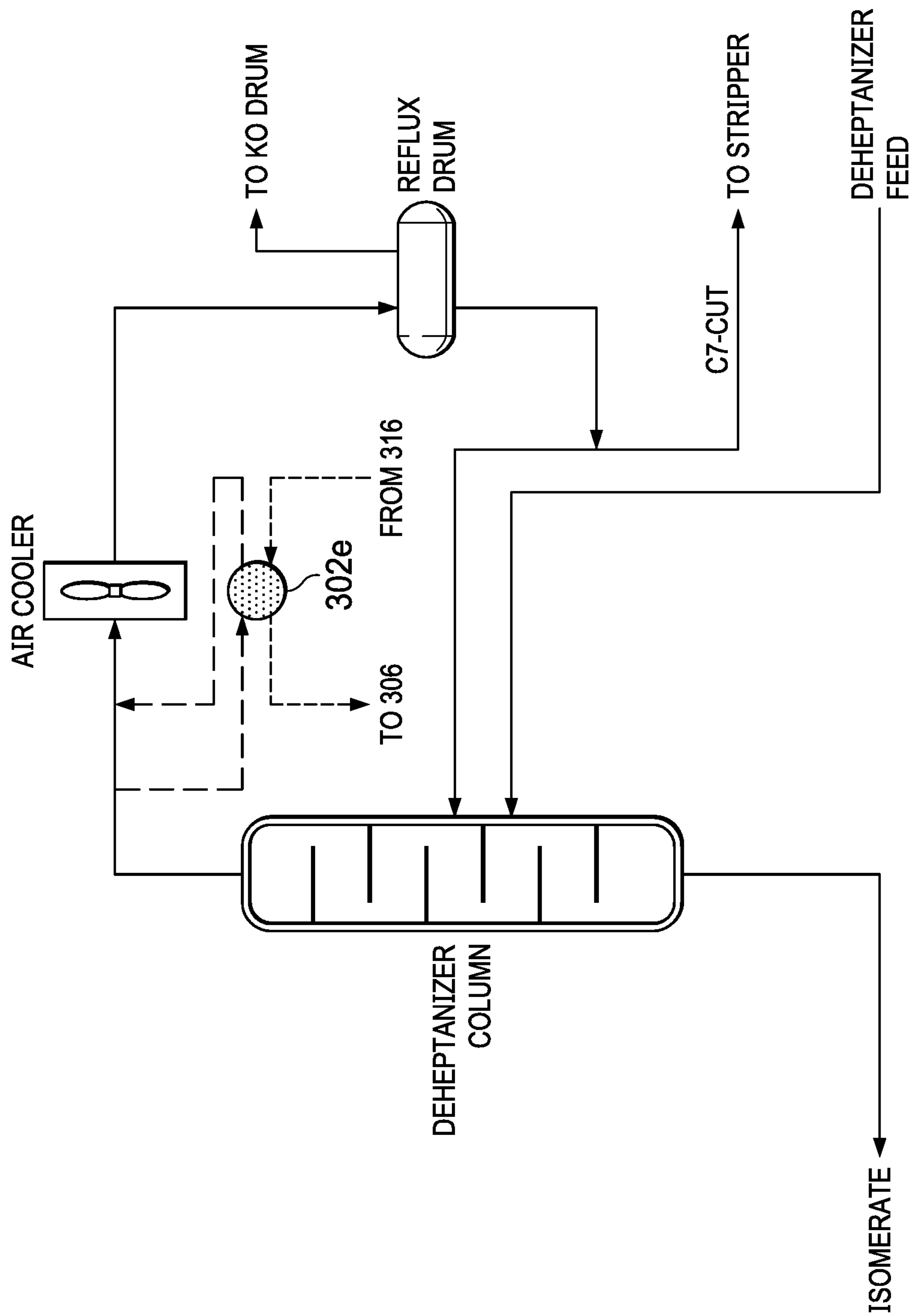

FIG. 3E is a schematic diagram that illustrates an example placement of heat exchanger 302*e* in the xylene isomerization de-heptanizer of the Para-Xylene separation plant. In an example implementation, heat exchanger 302*e* cools down the de-heptanizer column overhead stream from 112° C. to 60° C. using the working fluid stream of first circuit 302 at 50° C. to raise the working fluid stream temperature to 107° C. The thermal duty of heat exchanger 302*e* is about 21 MW. The working fluid at 107° C. is sent to the header of the first circuit 302.

Figure 3F:
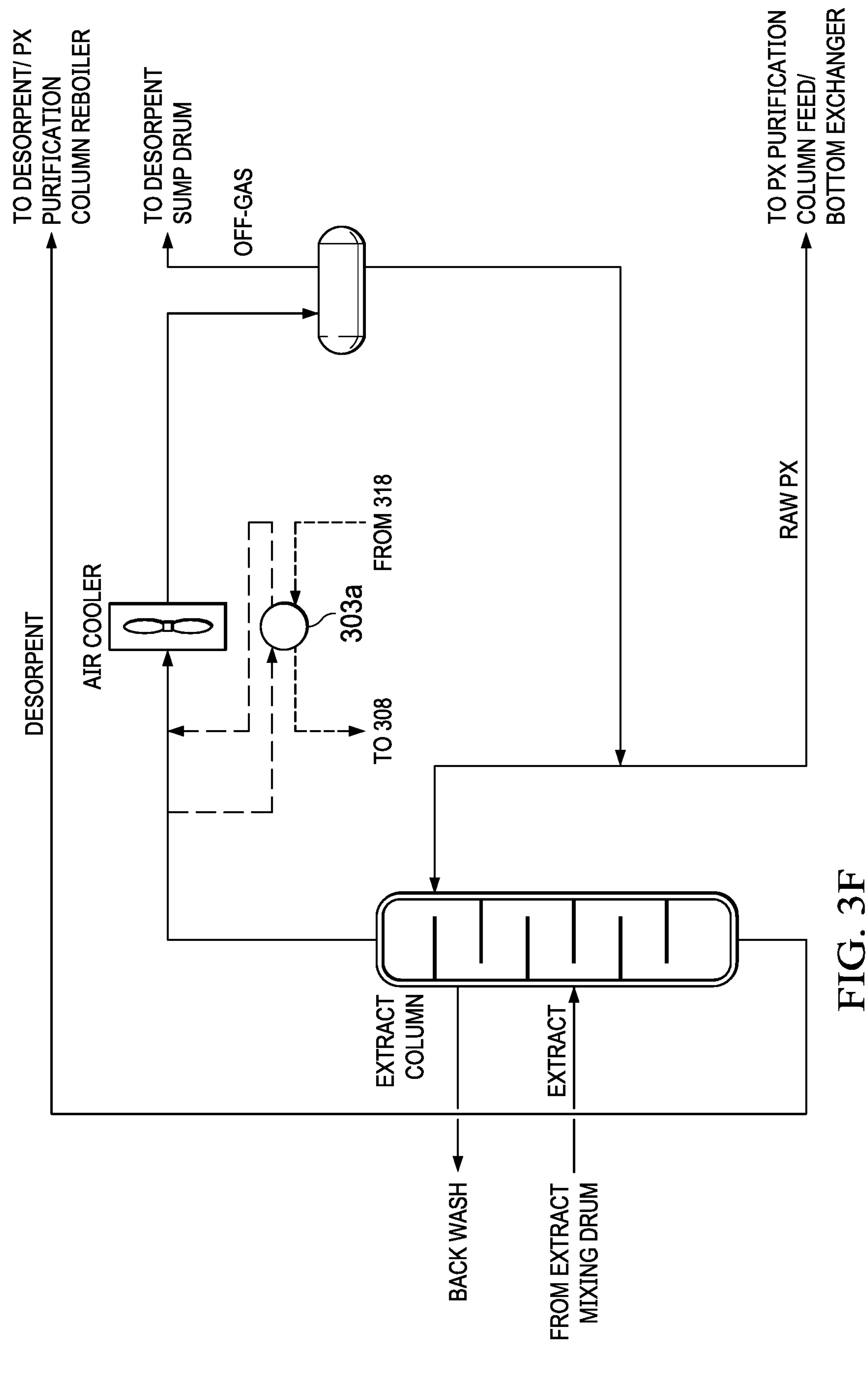

FIG. 3F is a schematic diagram that illustrates an example placement of heat exchanger 303*a* in the Para-Xylene separation plant. In an example implementation, heat exchanger 303*a* cools down an extract column overhead stream from 156° C. to 133° C. using the working fluid stream of the second circuit 303 at 105° C. to raise the working fluid stream temperature to 151° C. The thermal duty of heat exchanger 303*a* is about 33 MW. The working fluid at 151° C. is sent to the header of the second circuit 303.

Figure 3G:
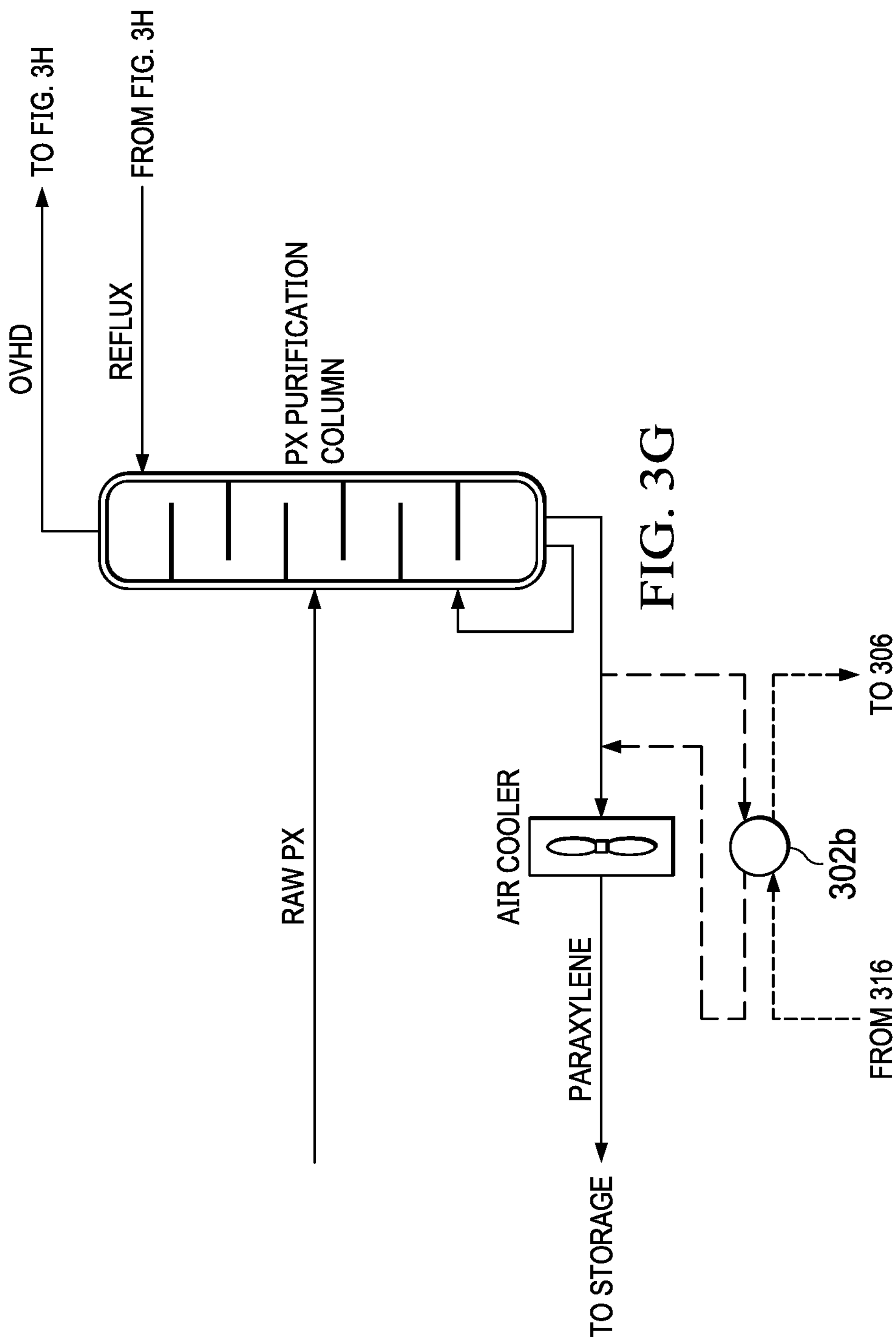

FIG. 3G is a schematic diagram that illustrates an example placement of heat exchanger 302*b* in the Para-Xylene separation plant. In an example implementation, heat exchanger 302*b* cools down the PX purification column bottom product stream from 155° C. to 60° C. using the working fluid stream of the first circuit 302 at 50° C. to raise the working fluid stream temperature to 150° C. The thermal duty of heat exchanger 302*b* is about 5.16 MW. The working fluid at 150° C. is sent to the header of the first circuit 302.

Figure 3H:
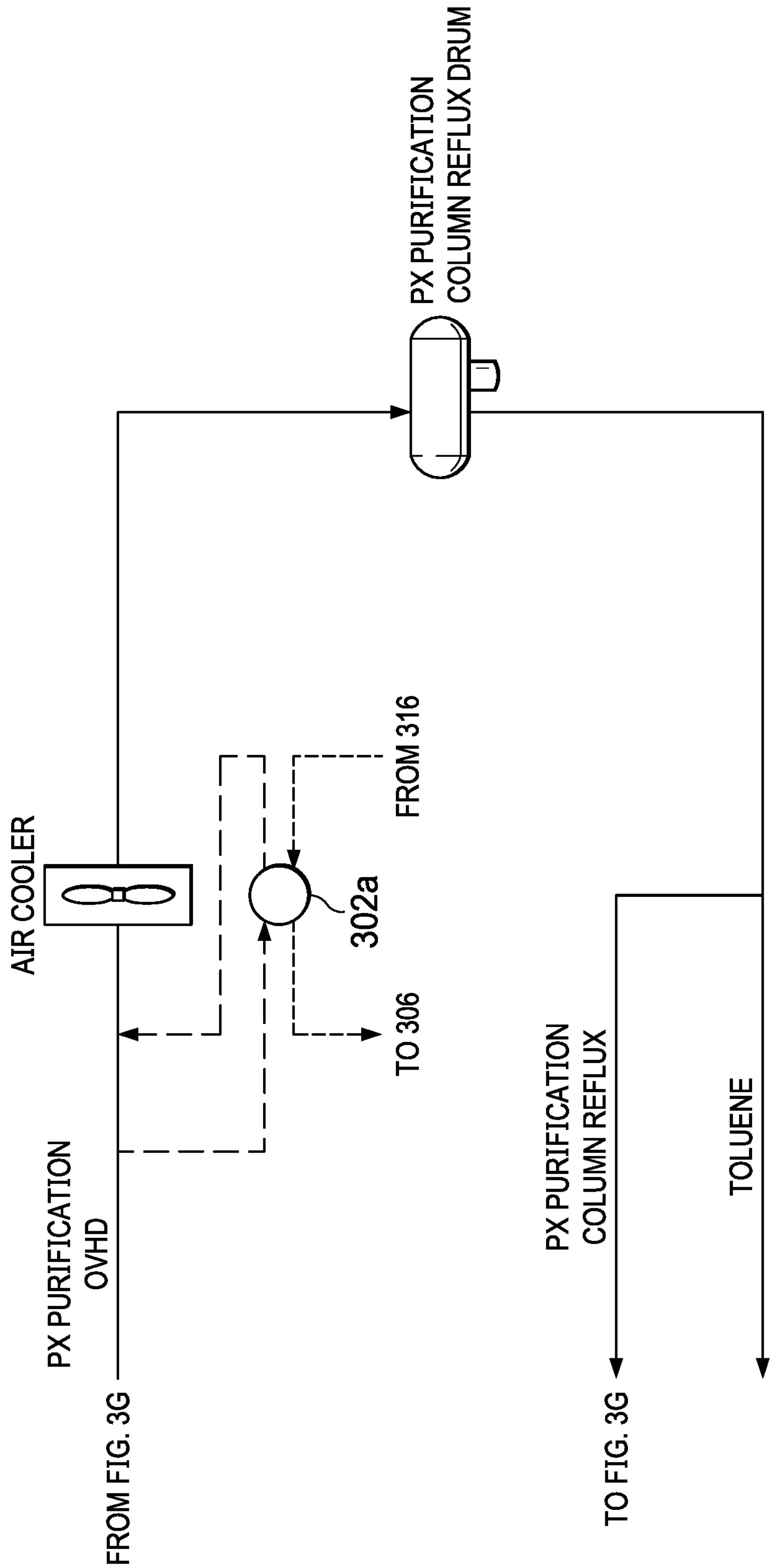

FIG. 3H is a schematic diagram that illustrates an example placement of heat exchanger 302*a* in the Para-Xylene separation plant. In an example implementation, heat exchanger 302*a* cools down the PX purification column overhead stream from 127° C. to 84° C. using the working fluid stream of the first circuit 302 at 50° C. to raise the working fluid stream temperature to 122° C. The thermal duty of this heat exchanger 302*a* is about 13.97 MW. The working fluid at 122° C. is sent to the header of the first circuit 302.

Figure 3I:
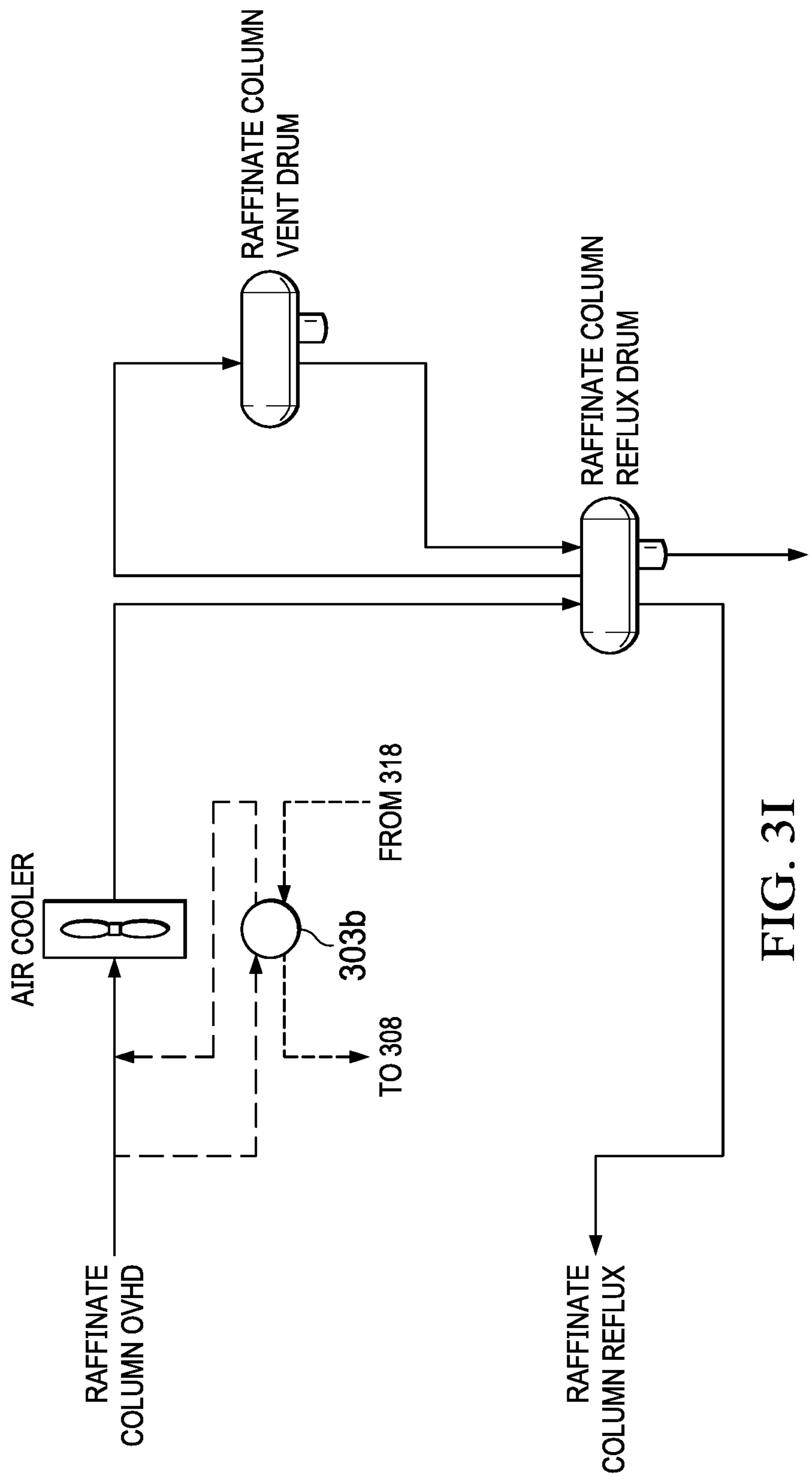

FIG. 3I is a schematic diagram that illustrates an example placement of heat exchanger 303*b* in the Para-Xylene separation plant. In an example implementation, heat exchanger 303*b* cools down a Raffinate column overhead stream from 162° C. to 130° C. using the working fluid stream of the second circuit 303 at 105° C. to raise the working fluid stream temperature to 157° C. The thermal duty of heat exchanger 303*b* is about 91.1 MW. The working fluid at 157° C. is sent to the header of the second circuit 303.

Figure 3J:
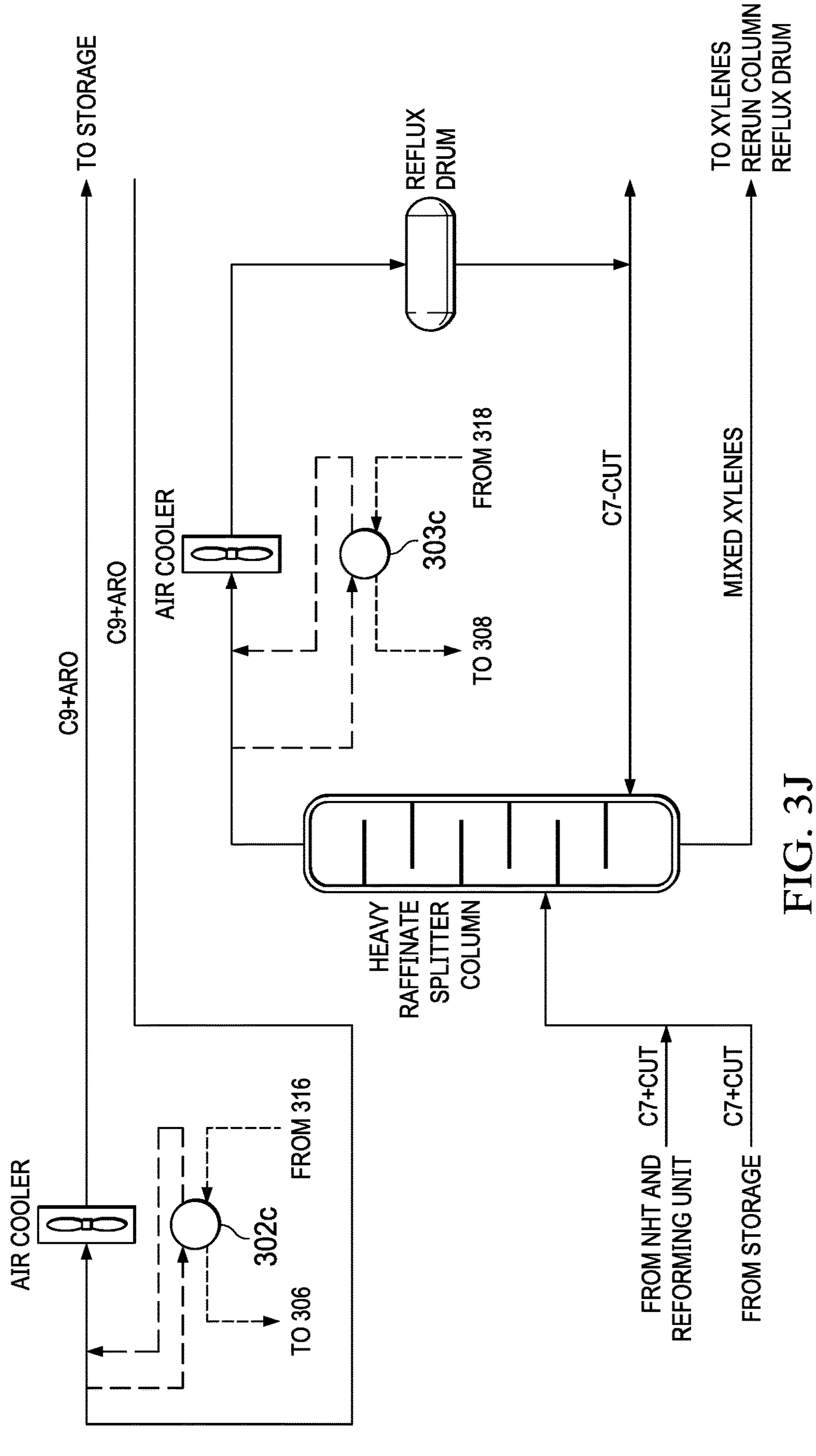

FIG. 3J is a schematic diagram that illustrates an example placement of heat exchangers 302*c* and 303*c* in the Para-Xylene separation plant. In an example implementation, heat exchangers 302*c* and 303*c* have thermal duties of 7.23 MW and 32.46 MW, respectively. Heat exchanger 302*c* cools down the C9+ aromatics before the storage tank from 169° C. to 60° C. using the working fluid stream of the first circuit 302 at 50° C. to raise its temperature to 164° C. The working fluid stream at 164° C. is sent to the header of the first circuit 302 at about 103° C. for the ORC 304 isobutane pre-heater 306 from about 30° C. to about 99° C. Heat exchanger 303*c* cools down the heavy Raffinate splitter column overhead stream from 126° C. to 113° C. using the working fluid stream of the second circuit 303 at 105° C. to raise its temperature to 121° C. The working fluid stream at 121° C. is sent to the header of the second circuit 303.

Figure 3K:
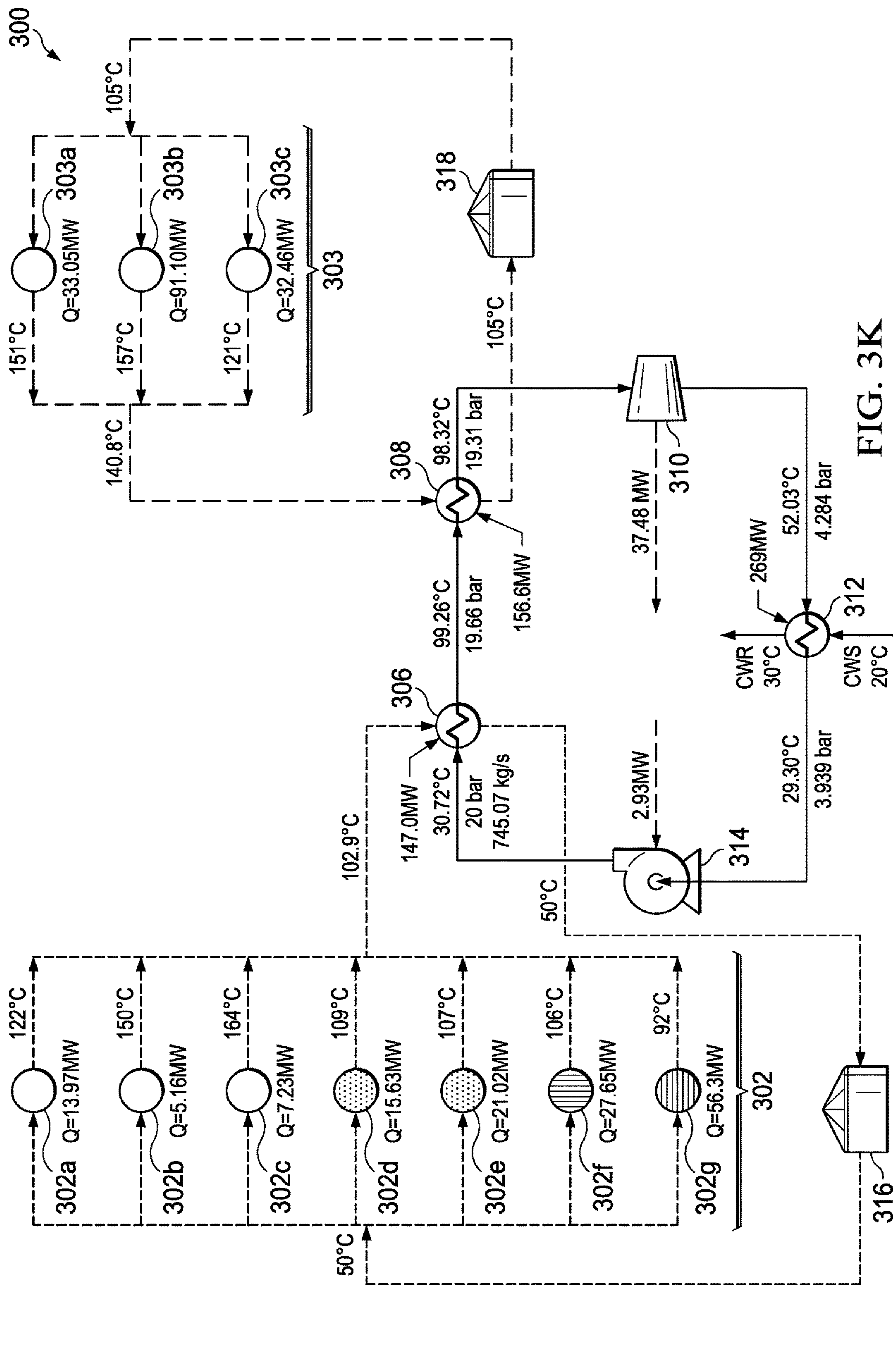

As described earlier, FIG. 3K illustrates a specific example of the system 300, including example temperatures, thermal duties, efficiencies, power inputs, and power outputs. For example, as illustrated in FIG. 3K, the Aromatics module generates a power output (with a gas turbine 310 using efficiency of 85%) of about 37.5 MW and the power consumed in the pump using efficiency of 75% is about 2.9 MW. The ORC 304 high pressure at the inlet of the turbine is about 20 bar and at the outlet is about 4.3 bar. The condenser 312 water supply temperature is assumed to be at 20° C. and return temperature is assumed to be at 30° C. The evaporator 308 thermal duty is about 157 MW to vaporize about 745 Kg/s of isobutane. The ORC 304 isobutane pre-heater 306 thermal duty is about 147 MW to heat up the isobutane from about 31° C. to 99° C. The condenser 312 cooling duty is 269 MW to cool down and condense the same flow of isobutane from about 52° C. to 30° C.

Figure 3L:
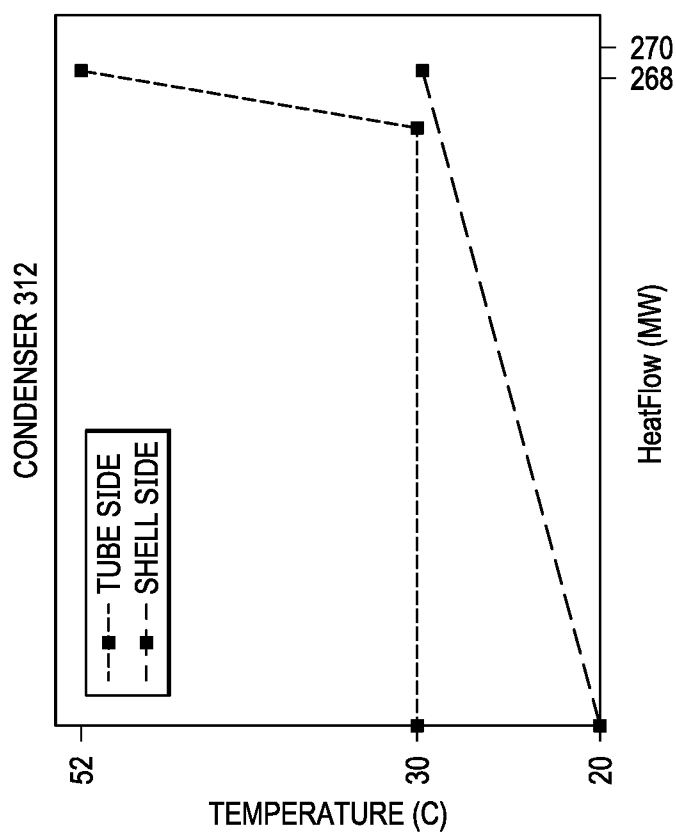
FIGS. 3L-3N are graphs that illustrate heat exchanger performance of heat exchangers in the power generation system shown in FIG. 3K.

FIG. 3L is a graph that shows a tube-side fluid temperature (for example, a cooling, or condenser, fluid flow) and a shell-side fluid temperature (for example, an ORC working fluid flow) in the condenser 312 during an operation of the system 300. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature. As shown in FIG. 3L, the condenser water (entering the tubes of the condenser 312) enters at about 20° C. and leaves at about 30° C. The ORC working fluid (entering the shell-side of the condenser) enters as a vapor at about 52° C., and then condenses at 30° C. and leaves the condensers as a liquid at 30° C.

Figure 3M:
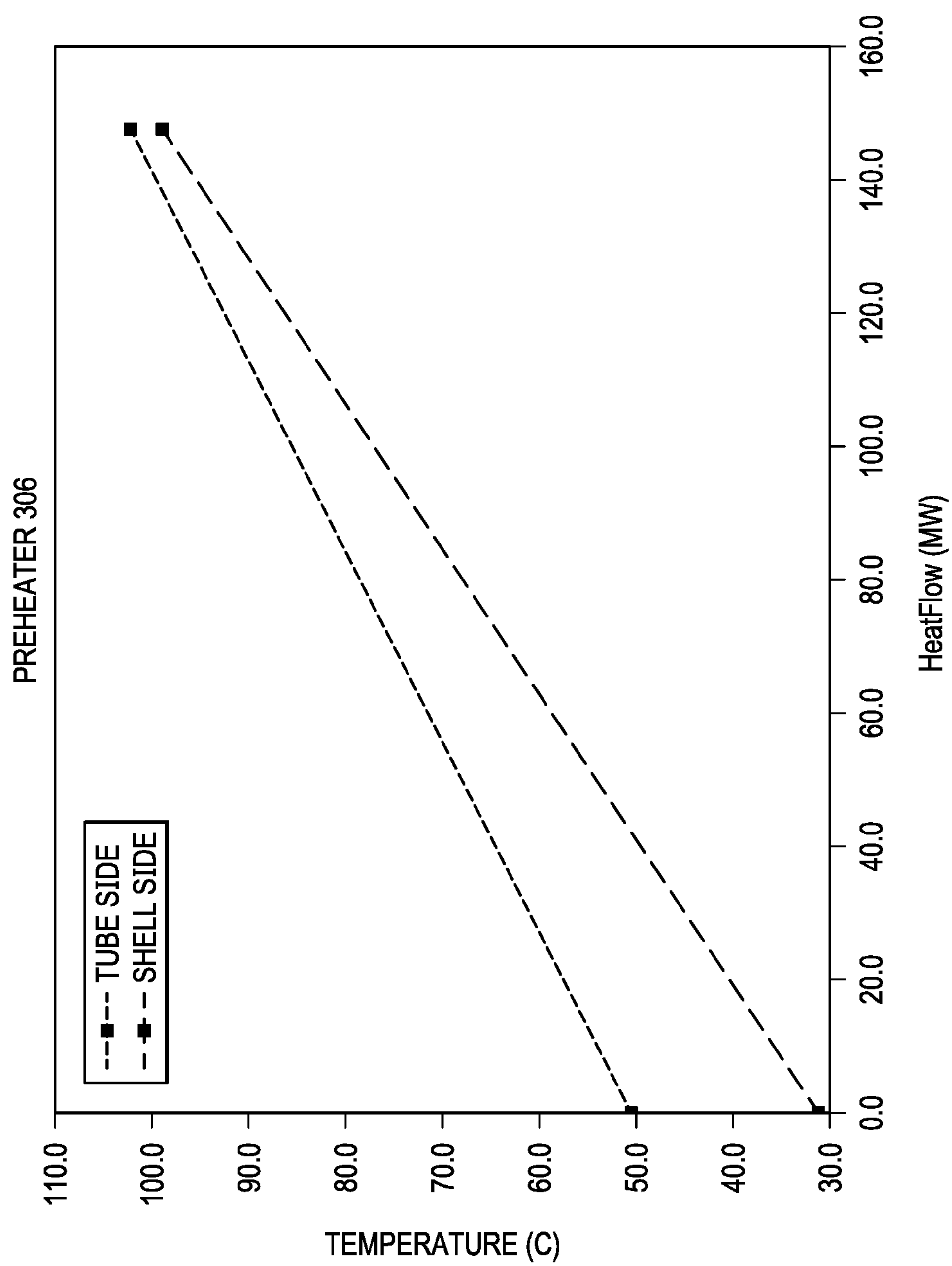

FIG. 3M is a graph that show a tube-side fluid temperature (for example, a heating fluid flow) and a shell-side fluid temperature (for example, an ORC working fluid flow) in the pre-heater 306 during an operation of the system 300. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 3M, as the tube-side fluid (for example, the hot oil or water in the heating fluid circuit 302) is circulated through the pre-heater 306, heat is transferred from that fluid to the shell-side fluid (for example, the ORC working fluid). Thus, the tube-side fluid enters the pre-heater 306 at about 103° C. and leaves the pre-heater 306 at about 50° C. The shell-side fluid enters the pre-heater 306 at about 30° C. (for example, as a liquid) and leaves the pre-heater 306 at about 99° C. (for example, also as a liquid or mixed phase fluid).

Figure 3N:
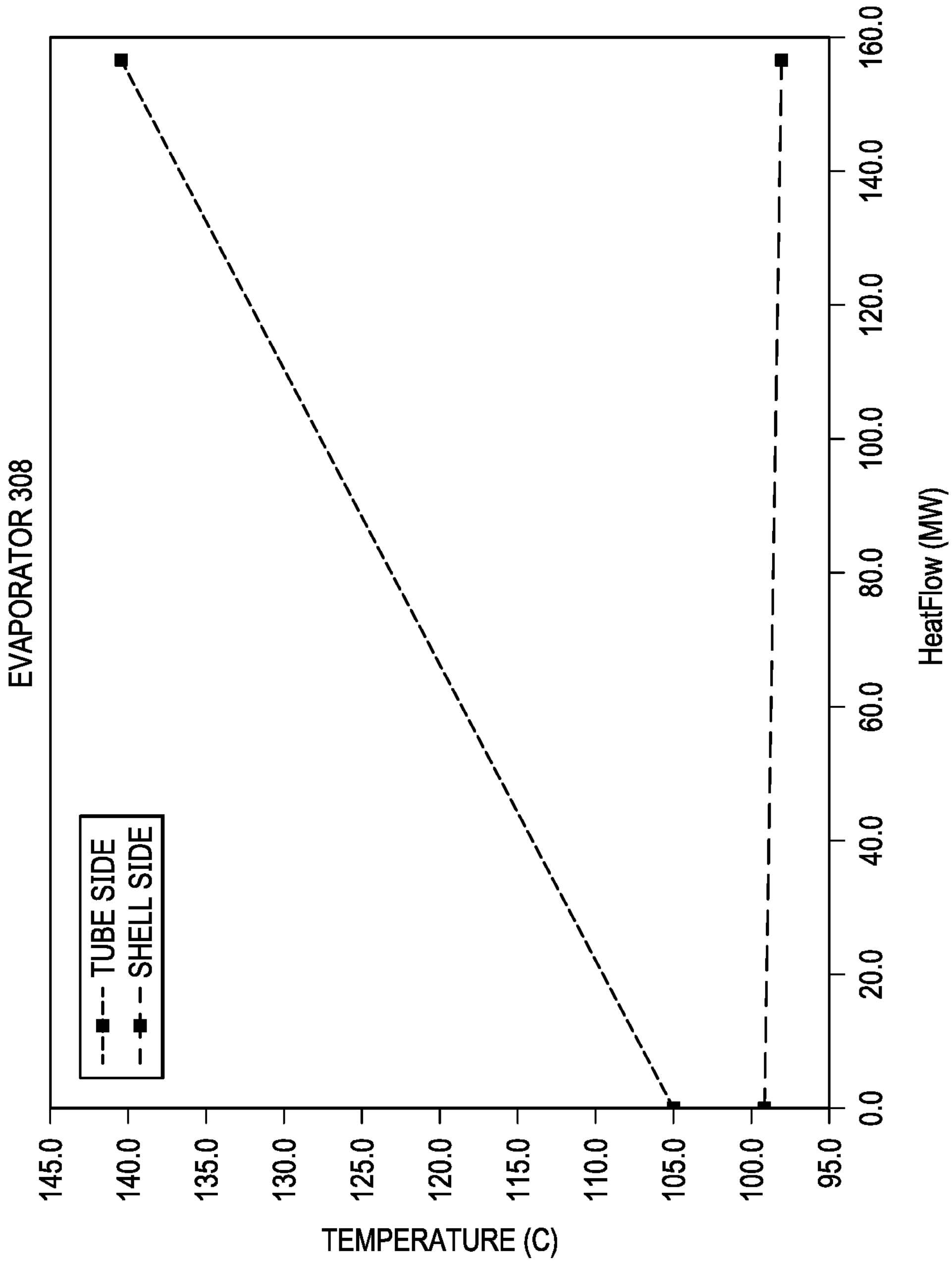

FIG. 3N is a graph that shows a tube-side fluid temperature (for example, a heating fluid flow) and a shell-side fluid temperature (for example, an ORC working fluid flow) in the evaporator 308 during an operation of the system 300. This graph shows a temperature difference between the fluids on the y-axis relative to a heat flow between the fluids on the x-axis. For example, as shown in this figure, as the temperature difference between the fluids increases, a heat flow between the fluids can increase. For example, as shown in FIG. 3N, as the tube-side fluid (for example, the hot oil or water in the heating fluid circuit 303) is circulated through the evaporator 308, heat is transferred from that fluid to the shell-side fluid (for example, the ORC working fluid). Thus, the tube-side fluid enters the evaporator 308 at about 141° C. and leaves the evaporator 308 at about 105° C. The shell-side fluid enters the evaporator 308, from the pre-heater 306, at about 99° C. (for example, as a liquid or mixed phase fluid) and leaves the evaporator 308 also at about 99° C. (for example, as a vapor with some superheating).

Figure 4A:
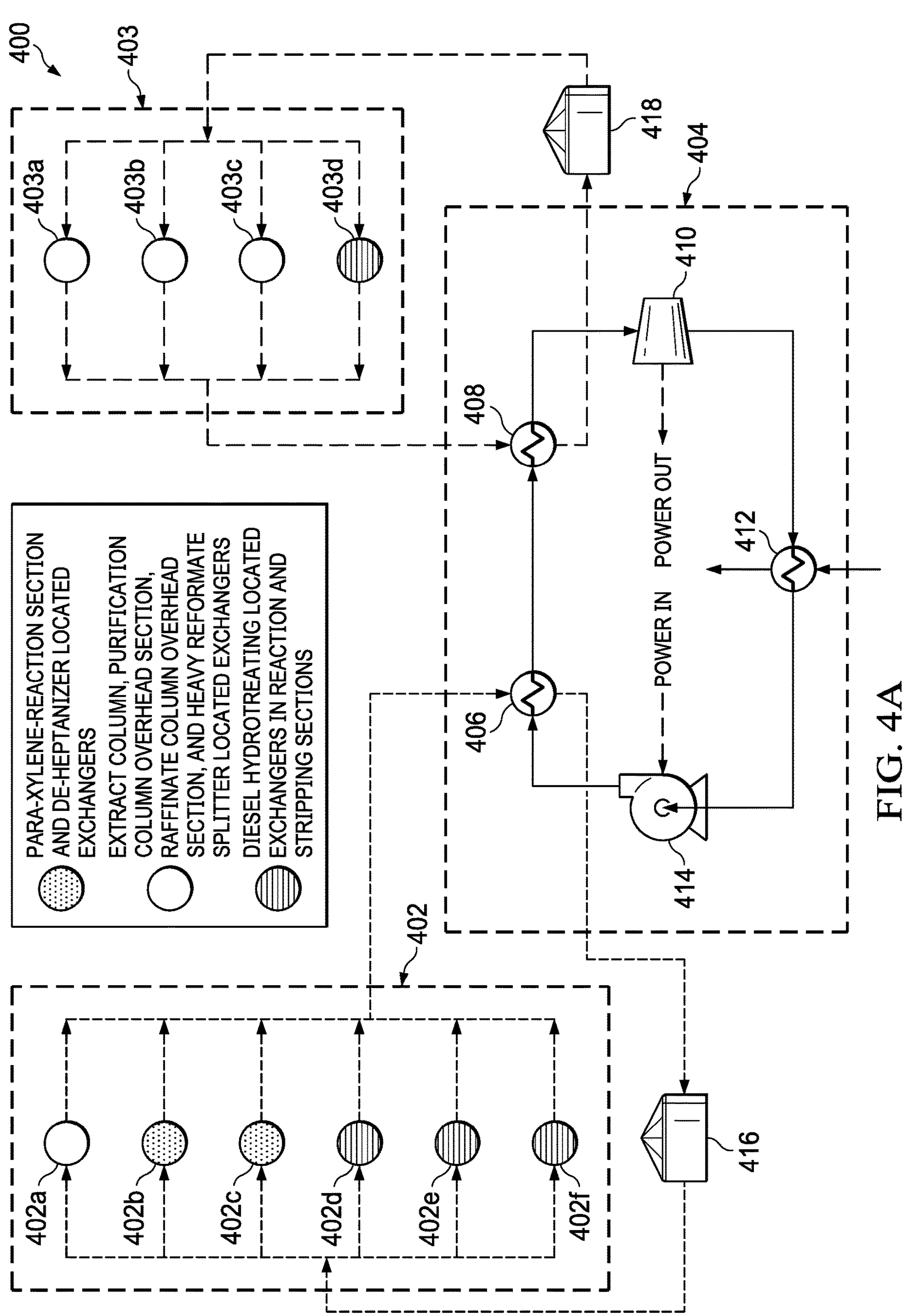
FIG. 4A is a schematic diagram of an example network to recover waste heat from ten heat sources.
Figure 4B:
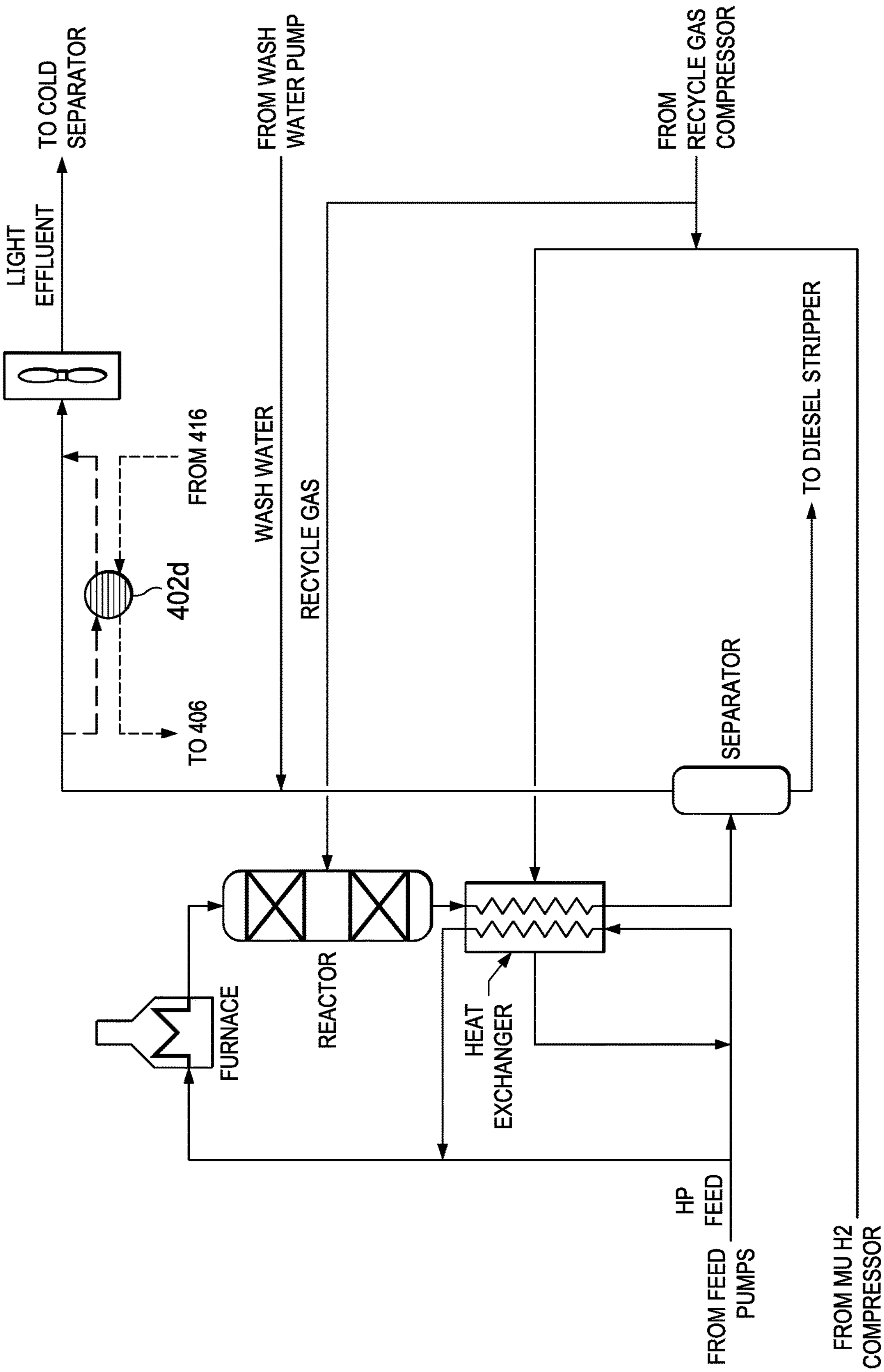
FIGS. 4B and 4C are schematic diagrams of heat sources in a diesel hydro-treating plant.
Figure 4C:
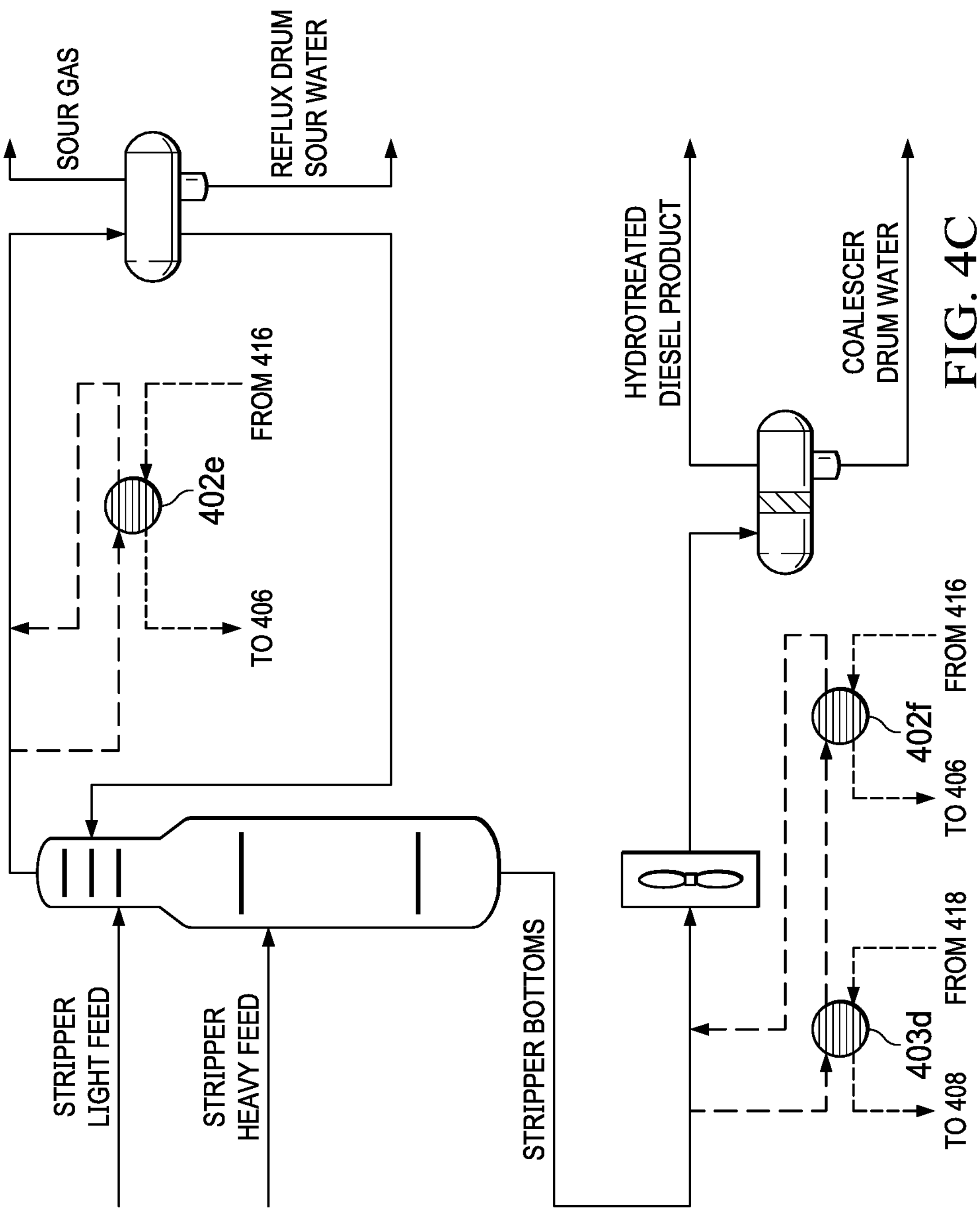

FIG. 4A is a schematic diagram of an example network to recover waste heat from ten heat sources. FIGS. 4B and 4C are schematic diagrams of heat sources in a diesel hydro-treating plant. FIGS. 4D-4I are schematic diagrams of heat sources in an aromatics plant. FIG. 4J is a schematic diagram of an implementation of the example network of FIG. 4A.

FIG. 4A is a schematic diagram of an example network to recover waste heat from ten heat sources. In some implementations, the network can include a first heating fluid circuit 402 coupled to multiple heat sources. For example, the multiple heat sources can include six heat exchangers (a first heat exchanger 402*a*, a second heat exchanger 402*b*, a third heat exchanger 402*c*, a fourth heat exchanger 402*d*, a fifth heat exchanger 402*e*, and a sixth heat exchanger 402*f*). In the first heating fluid circuit 402, the first heat exchanger 402*a* can be coupled to an aromatics plant, specifically, to one of an extract column, a purification column overhead section, a Raffinate column overhead section, or a heavy reformate splitter or an aromatics plant. In the first heating fluid circuit 402, the second heat exchanger 402*b* and the third heat exchanger 402*c* can be coupled to the aromatics plant, specifically, to one of a para-Xylene reaction section or a de-heptanizer of the aromatics plant. In the first heating fluid circuit 402, the fourth heat exchanger 402*d*, the fifth heat exchanger 402*e* and the sixth heat exchanger 402*f* can be coupled to the diesel hydro-treating plant. The six heat sources in the first heating fluid circuit 402 can be connected in parallel.

The network can include a second heating fluid circuit 403 coupled to multiple heat sources. For example, the multiple heat sources can include four heat exchangers (a first heat exchanger 403*a*, a second heat exchanger 403*b*, a third heat exchanger 403*c*, a fourth heat exchanger 403*d*). In the second heating fluid circuit 403, the first heat exchanger 403*a*, the second heat exchanger 403*b* and the third heat exchanger 403*c* can be coupled to the aromatics plant, specifically, to one of an extract column, a purification column overhead section, a Raffinate column overhead section, or a heavy reformate splitter or an aromatics plant. In the second heating fluid circuit 403, the fourth heat exchanger 403*d* can be coupled to the diesel hydro-treating plant. The four heat sources in the second heating fluid circuit 403 can be connected in parallel.

The example network can include a power generation system 404 that includes an organic Rankine cycle (ORC). The ORC can include a working fluid that is thermally coupled to the first heating fluid circuit 402 and the second heating fluid circuit 403 to heat the working fluid. In some implementations, the working fluid can be isobutane. The ORC can include a gas expander 410 configured to generate electrical power from the heated working fluid. As shown in FIG. 4A, the ORC can additionally include an evaporator 408, a pump 414, a condenser 412 and a pre-heater 406. In some implementations, the working fluid can be thermally coupled to the first heating fluid circuit 402 in the pre-heater 406, and to the second heating fluid in the evaporator 408.

In operation, a heating fluid (for example, water, oil, or other fluid) is circulated through the six heat exchangers in the first heating fluid circuit 402 and the four heat exchangers in the second heating fluid circuit 403. An inlet temperature of the heating fluid that is circulated into the inlets of each of the six heat sources in the first heating fluid circuit 402 is the same or substantially the same subject to any temperature variations that may result as the heating fluid flows through respective inlets. Similarly, an inlet temperature of the heating fluid that is circulated into the inlets of the each of the four heat sources in the second heating fluid circuit 403 is the same or substantially the same subject to any temperature variations that may result as the heating fluid flows through respective inlets. Each heat exchanger in each heating fluid circuit heats the heating fluid to a respective temperature that is greater than the respective inlet temperature. The heated heating fluids from the six heat exchangers in the first heating fluid circuit 402 are combined and flowed through the pre-heater 406 of the ORC. The heated heating fluids from the four heat exchangers in the second heating fluid circuit 403 are combined and flowed through the evaporator 408 of the ORC. The heating fluid flowed through the pre-heater 406 is then collected in a heating fluid tank 416 and can be pumped back through the six heat exchangers in the first heating fluid circuit 402 to restart the waste heat recovery cycle. Similarly, the heating fluid flowed through the evaporator 408 is then collected in a heating fluid tank 418 and can be pumped back through the four heat exchangers in the second heating fluid circuit 403 to restart the waste heat recovery cycle. In some implementations, the heating fluid that exits the pre-heater 406 or the heating fluid that exits the evaporator 408 (or both) can be flowed through a respective air cooler (not shown) to further cool the heating fluid before the heating fluid is collected in the respective heating fluid tank.

In the manner described earlier, the heating fluid can be looped through the ten heat exchangers distributed across the two heating fluid circuits to recover heat that would otherwise go to waste in the diesel hydro-treating plant and the aromatics plant, and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

FIGS. 4B and 4C are schematic diagrams of heat sources in a diesel hydro-treating plant. FIG. 4B shows the fourth heat exchanger 402*d* in the first heating fluid circuit 402 in the diesel hydro-treating plant of the petrochemical refining system. A feed stream from a hydrotreater light product outlet before the cold separator and the heating fluid flow through the fourth heat exchanger 402*d* simultaneously. The fourth heat exchanger 402*d* cools down the stream from a higher temperature, for example, about 127° C., to a lower temperature, for example, about 60° C., and increases the temperature of the heating fluid from a lower temperature, for example, about 50° C., to a higher temperature, for example, about 122° C. The thermal duty of the fourth heat exchanger 402*d* to implement the heat exchange is about 23.4 MW. The heating fluid at about 122° C. that exits the fourth heat exchanger 402*d* is circulated to a main heater to be mixed with the heated heating fluids from the other five heat exchangers in the first heating fluid circuit 402.

FIG. 4C shows the fifth heat exchanger 402*e* and the sixth heat exchanger 402*f* in the first heating fluid circuit 402 in the diesel hydro-treating plant of the petrochemical refining system. FIG. 4C also shows the fourth heat exchanger 403*d* in the second heating fluid circuit 403 in the diesel hydro-treating plant. A stream from a diesel stripper tower and the heating fluid flow through the fifth heat exchanger 402*e* simultaneously. The fifth heat exchanger 402*e* cools down the stream from a higher temperature, for example, about 160° C., to a lower temperature, for example, about 60° C., and increases the temperature of the heating fluid from a lower temperature, for example, about 50° C., to a higher temperature, for example, about 155° C. The thermal duty of the fifth heat exchanger 402*e* to implement the heat exchange is about 33.6 MW. The heating fluid at about 155° C. that exits the fifth heat exchanger 402*e* is circulated to a main heater to be mixed with the heated heating fluids from the other five heat exchangers in the first heating fluid circuit 402.

A stream from a diesel stripper tower bottom product and the heating fluid flow through the fourth heat exchanger 403*d* in the second heating fluid circuit 403 simultaneously. The fourth heat exchanger 403*d* cools down the stream from a higher temperature, for example, about 160° C., to a lower temperature, for example, about 143° C., and increases the temperature of the heating fluid from a lower temperature, for example, about 105° C., to a higher temperature, for example, about 157° C. The thermal duty of the fourth heat exchanger 403*d* to implement the heat exchange is about 11 MW. The heating fluid at about 143° C. that exits the fourth heat exchanger 403*d* is circulated to a main heater to be mixed with the heated heating fluids from the other five heat exchangers in the first heating fluid circuit 402.

The stream from the diesel stripper tower bottom product, which has been cooled to about 143° C. by the fourth heat exchanger 403*d*, and the heating fluid flow through the sixth heat exchanger 402*f* in the first heating fluid circuit 402 simultaneously. The sixth heat exchanger 402*f* cools down the stream from a higher temperature, for example, about 143° C., to a lower temperature, for example, about 60° C., and increases the temperature of the heating fluid from a lower temperature, for example, about 50° C., to a higher temperature, for example, about 139° C. The thermal duty of the sixth heat exchanger 402*f* is about 50 MW. The heating fluid at about 139° C. that exits the sixth heat exchanger 402*f* is circulated to a main header to be mixed with the heated heating fluids from the other three heat exchangers in the second heating fluid circuit 403.

Figure 4D:
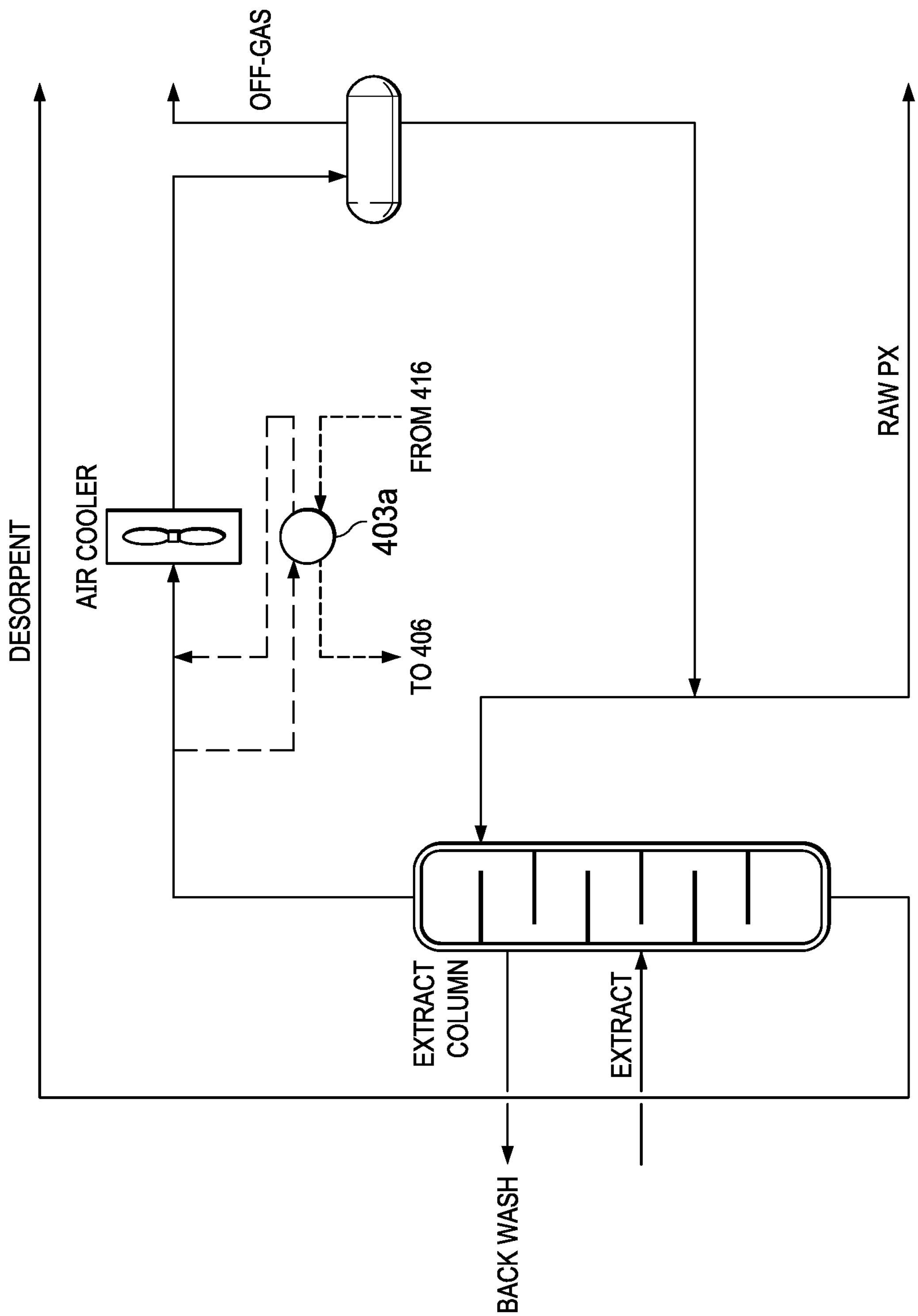
FIGS. 4D-4I are schematic diagrams of heat sources in an aromatics plant.

FIG. 4D shows the first heat exchanger 403*a* in the second heating fluid circuit 403 in the aromatics plant of the petrochemical refining system. The aromatics plant can include a Para-Xylene separation section. A stream from an extract column overhead and the heating fluid flow through the first heat exchanger 403*a* simultaneously. The first heat exchanger 403*a* cools down the stream from a higher temperature, for example, about 156° C., to a lower temperature, for example, about 133° C., and increases the temperature of the heating fluid from a lower temperature, for example, about 105° C., to a higher temperature, for example, about 151° C. The thermal duty of the first heat exchanger 403*a* to implement the heat exchange is about 33 MW. The heating fluid at about 151° C. that exits the first heat exchanger 403*a* is circulated to a main heater to be mixed with the heated heating fluids from the other three heat exchangers in the second heating fluid circuit 403.

Figure 4E:
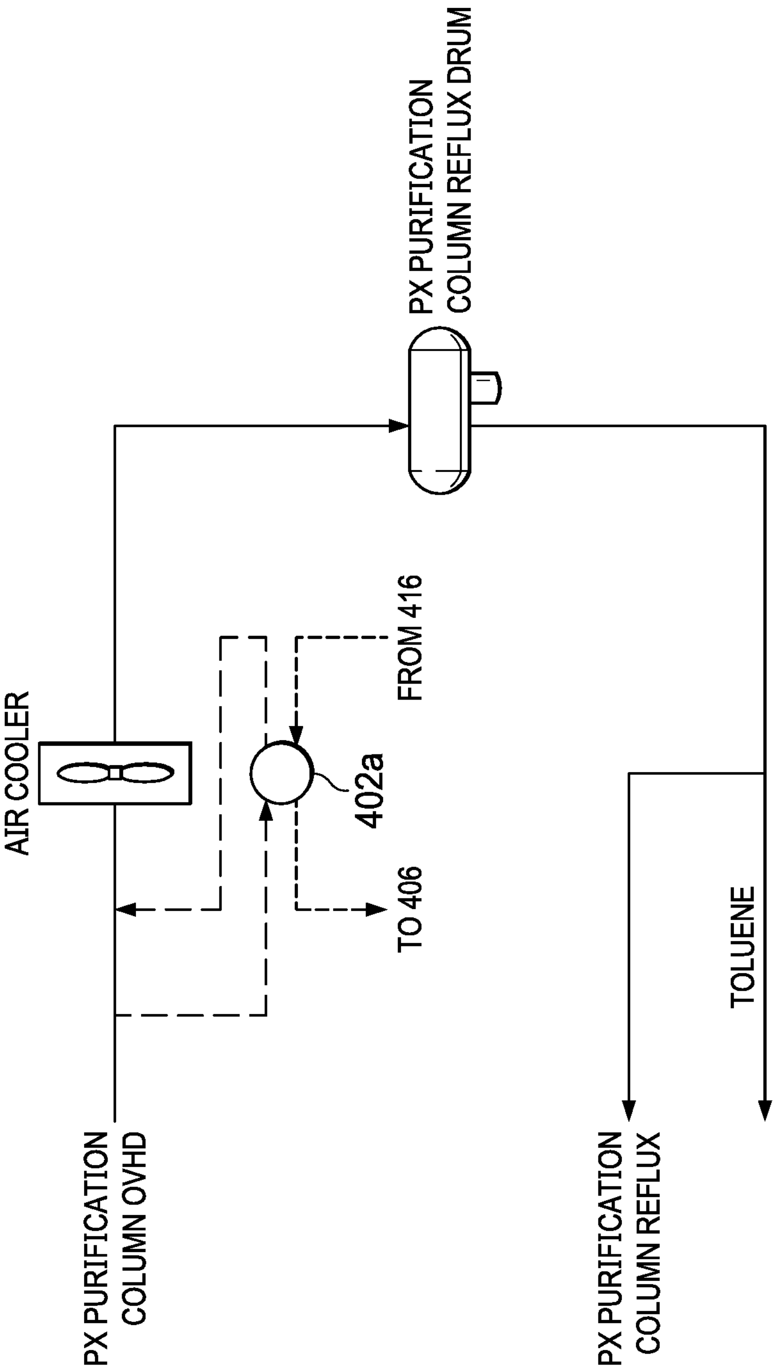

FIG. 4E shows the first heat exchanger 402*a* in the first heating fluid circuit 402 in the aromatics plant of the petrochemical refining system. The aromatics plant can include a Para-Xylene separation section. A stream from a Para-Xylene purification column overhead and the heating fluid flow through the first heat exchanger 402*a* simultaneously. The first heat exchanger 402*a* cools down the stream from a higher temperature, for example, about 127° C., to a lower temperature, for example, about 84° C., and increases the temperature of the heating fluid from a lower temperature, for example, about 50° C., to a higher temperature, for example, about 122° C. The thermal duty of the first heat exchanger 402*a* to implement the heat exchange is about 14 MW. The heating fluid at about 122° C. that exits the first heat exchanger 402*a* is circulated to a main heater to be mixed with the heated heating fluids from the other five heat exchangers in the first heating fluid circuit 402.

Figure 4F:
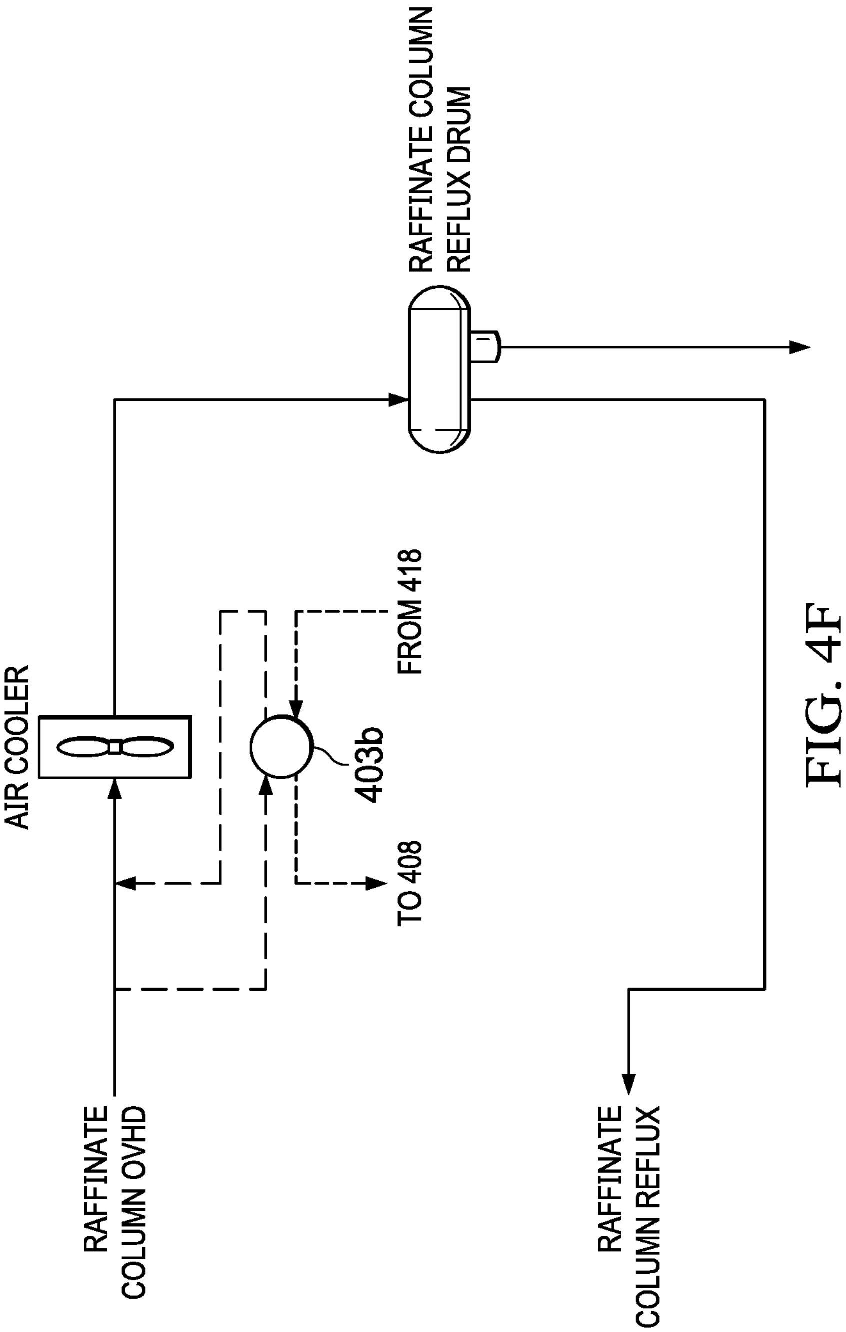

FIG. 4F shows the second heat exchanger 403*b* in the second heating fluid circuit 403 in the aromatics plant of the petrochemical refining system. The aromatics plant can include a Para-Xylene separation section. A stream from Raffinate column overhead and the heating fluid flow through the second heat exchanger 403*b* simultaneously. The second heat exchanger 403*b* cools down the stream from a higher temperature, for example, about 162° C., to a lower temperature, for example, about 130° C., and increases the temperature of the heating fluid from a lower temperature, for example, about 105° C., to a higher temperature, for example, about 157° C. The thermal duty of the second heat exchanger 403*b* to implement the heat exchange is about 91 MW. The heating fluid at about 157° C. that exits the first heat exchanger 403*b* is circulated to a main heater to be mixed with the heated heating fluids from the other three heat exchangers in the second heating fluid circuit 403.

Figure 4G:
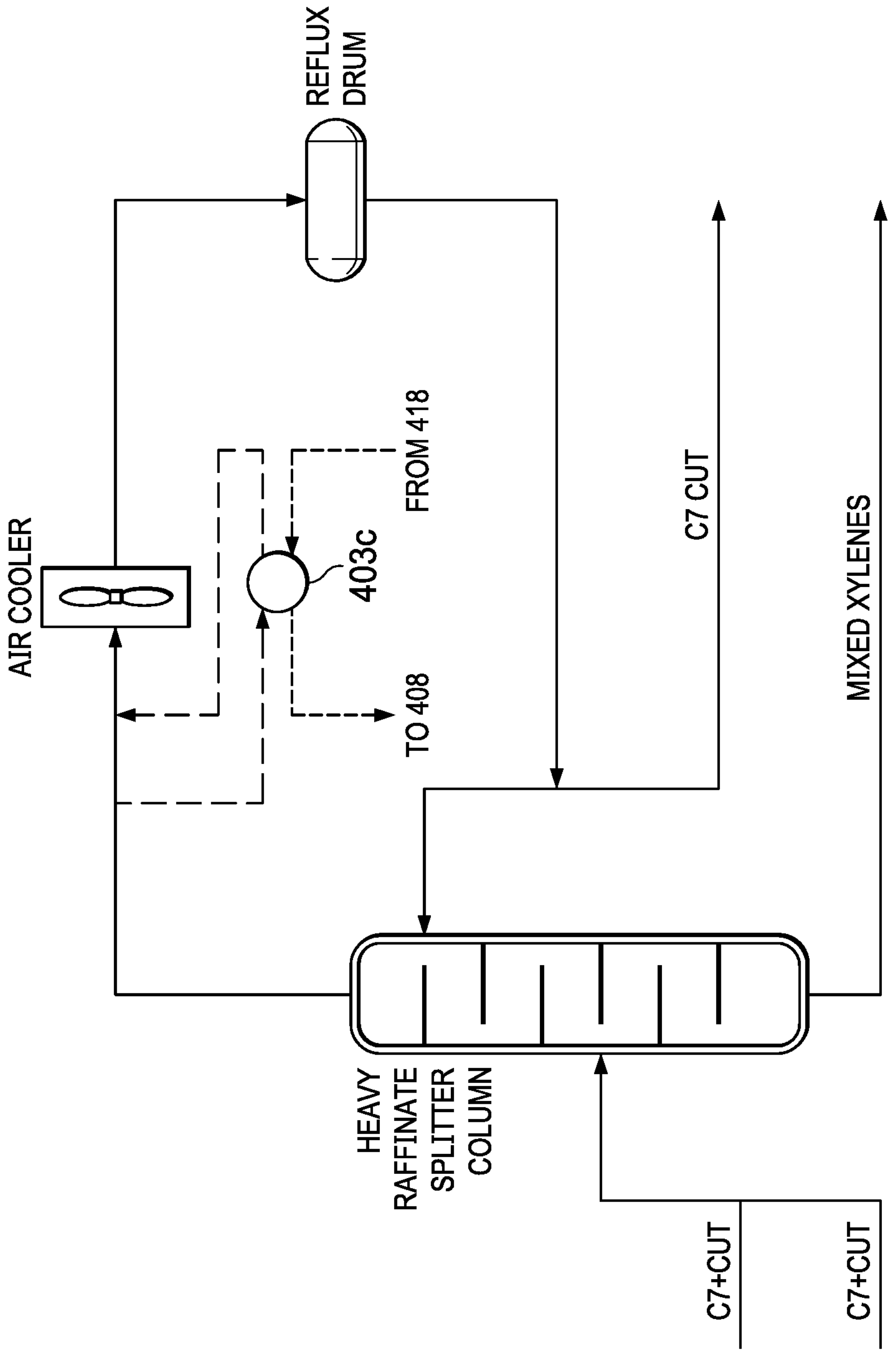

FIG. 4G shows the third heat exchanger 403*c* in the second heating fluid circuit 403 in the aromatics plant of the petrochemical refining system. The aromatics plant can include a heavy Raffinate column splitter. A stream from the heavy Raffinate column splitter and the heating fluid flow through the third heat exchanger 403*c* simultaneously. The third heat exchanger 403*c* cools down the stream from a higher temperature, for example, about 126° C., to a lower temperature, for example, about 113° C., and increases the temperature of the heating fluid from a lower temperature, for example, about 105° C., to a higher temperature, for example, about 121° C. The thermal duty of the third heat exchanger 403*c* to implement the heat exchange is about 33 MW. The heating fluid at about 121° C. that exits the third heat exchanger 403*c* is circulated to a main heater to be mixed with the heated heating fluids from the other three heat exchangers in the second heating fluid circuit 403.

Figure 4H:
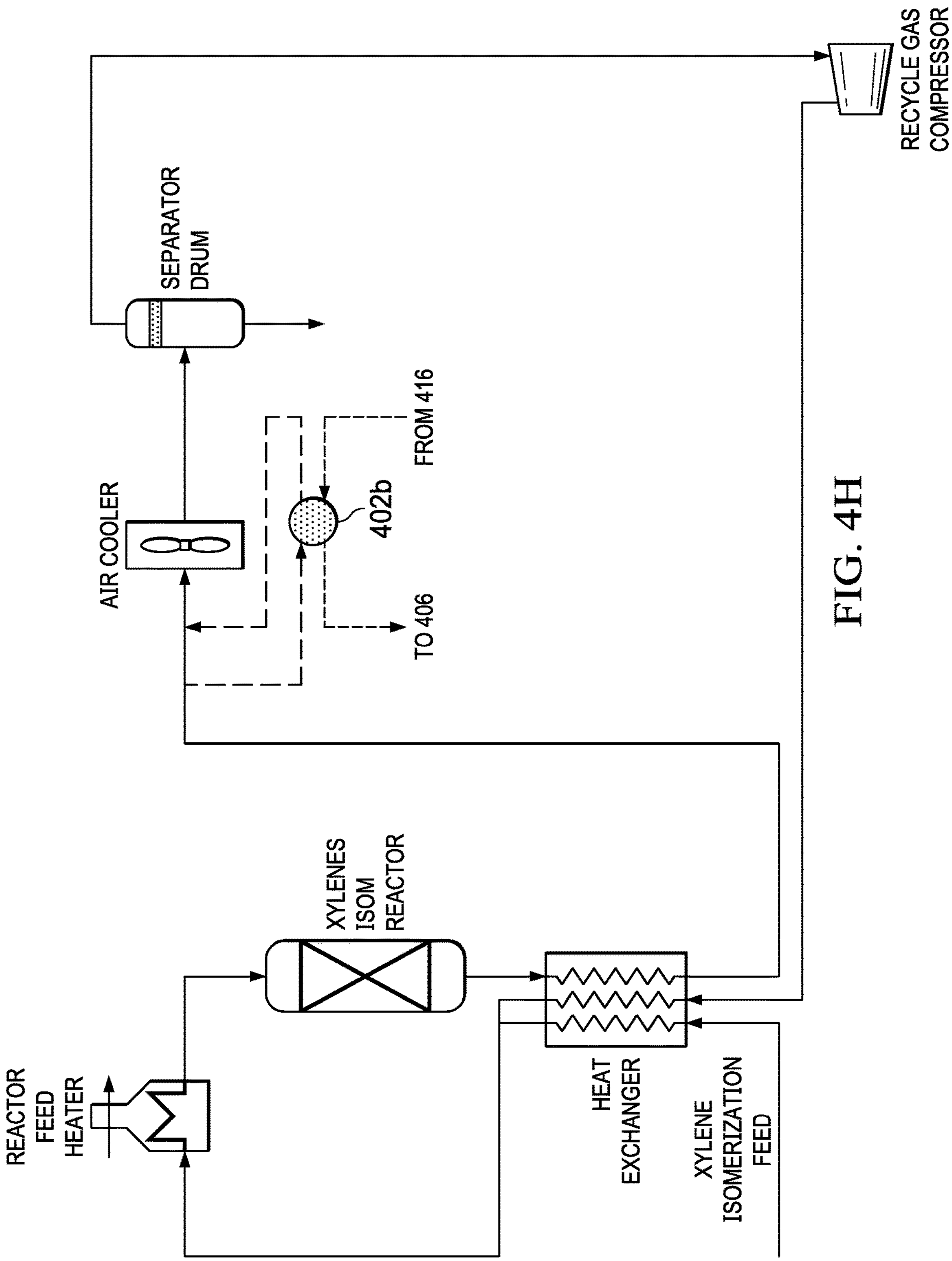

FIG. 4H shows the second heat exchanger 402*b* in the first heating fluid circuit 402 in the aromatics plant of the petrochemical refining system. The aromatics plant can include a Xylene isomerization reactor. A stream from the Xylene isomerization reactor outlet before the separator drum and the heating fluid flow through the second heat exchanger 402*b* simultaneously. The second heat exchanger 402*b* cools down the stream from a higher temperature, for example, about 114° C., to a lower temperature, for example, about 60° C., and increases the temperature of the heating fluid from a lower temperature, for example, about 50° C., to a higher temperature, for example, about 109° C. The thermal duty of the second heat exchanger 402*b* to implement the heat exchange is about 16 MW. The heating fluid at about 109° C. that exits the second heat exchanger 402*b* is circulated to a main heater to be mixed with the heated heating fluids from the other five heat exchangers in the first heating fluid circuit 402.

Figure 4I:
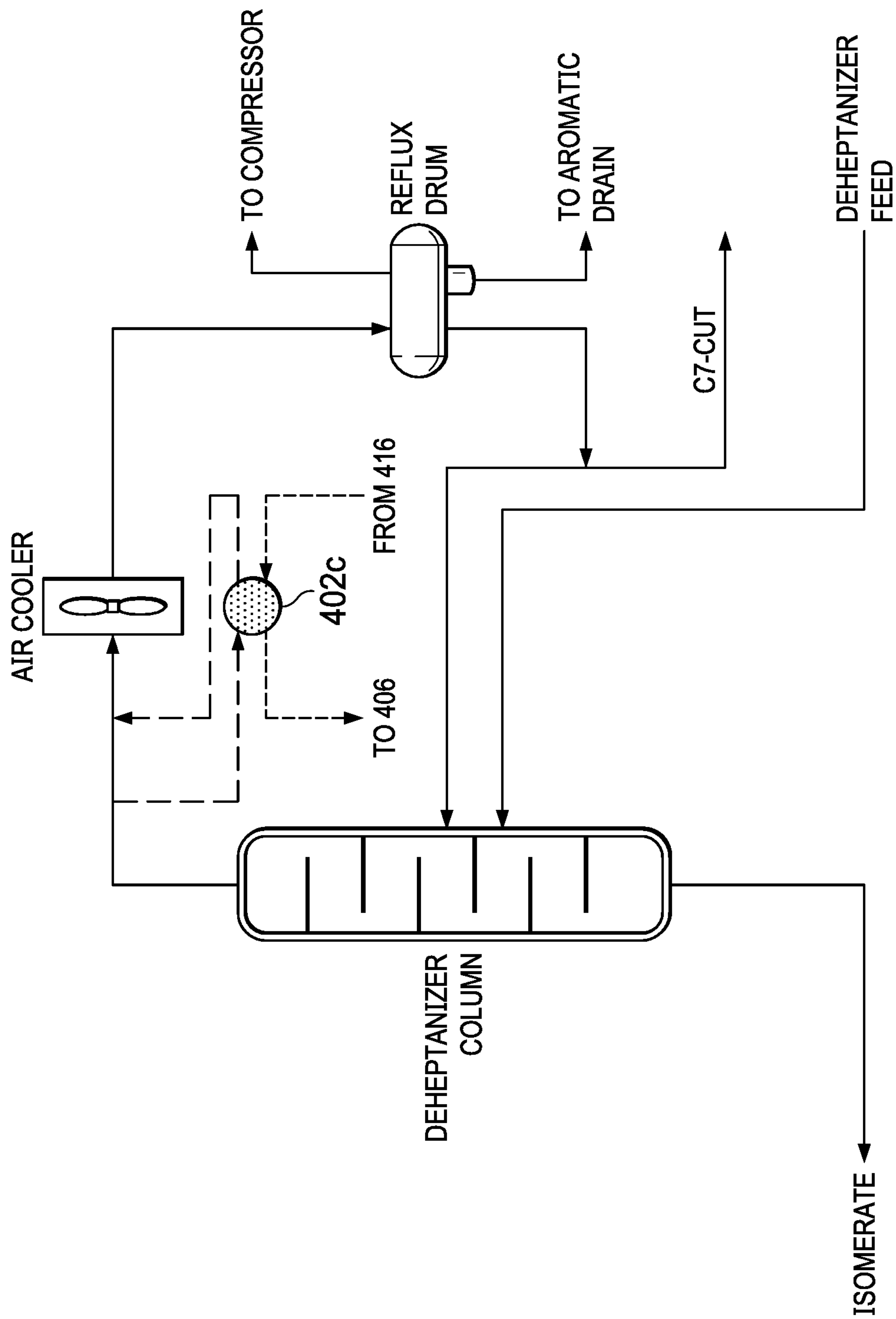
Figure 4J:
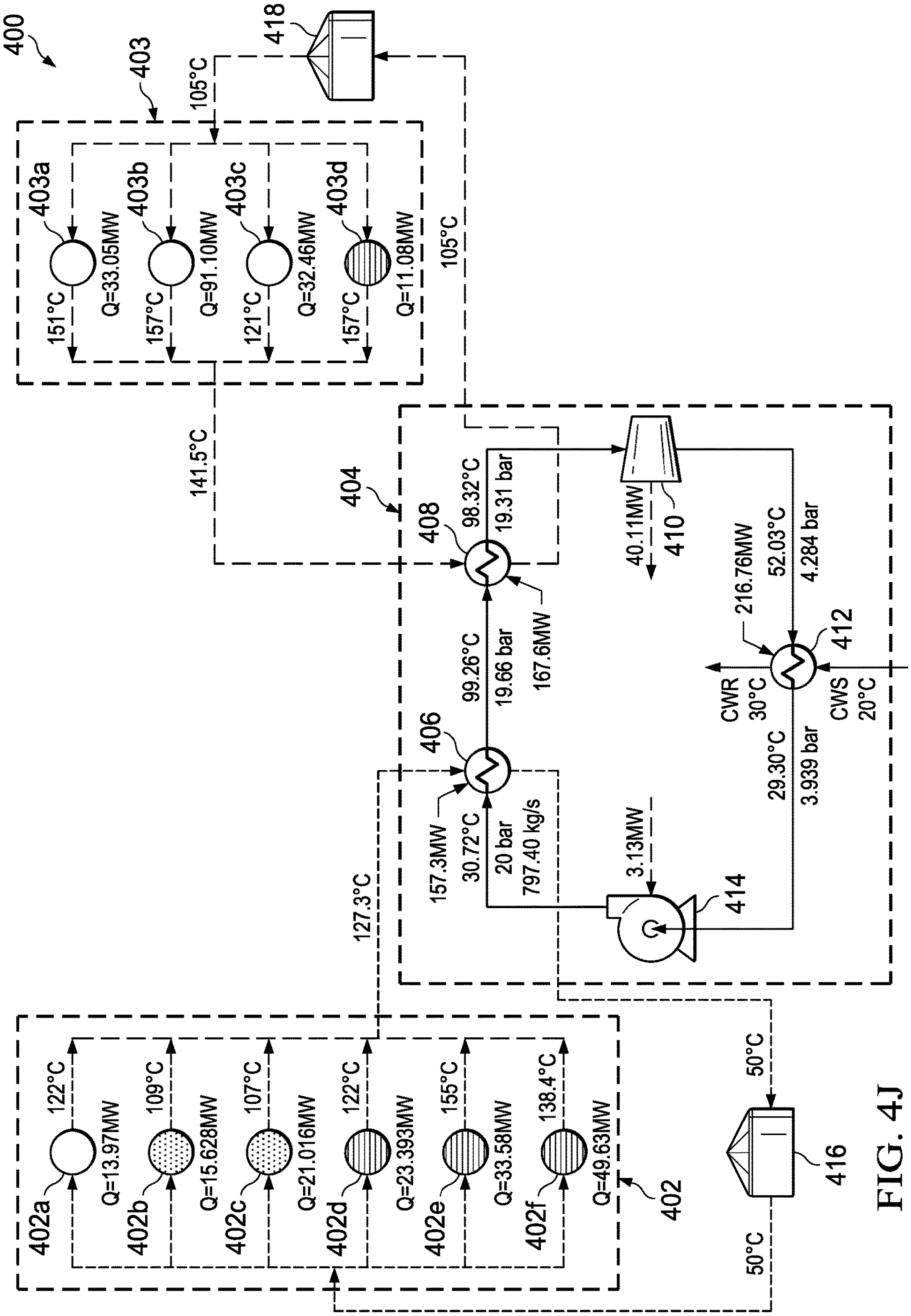
FIG. 4J is a schematic diagram of an implementation of the example network of FIG. 4A.

FIG. 4I shows the third heat exchanger 402*c* in the first heating fluid circuit 402 in the aromatics plant of the petrochemical refining system. The aromatics plant can include a Xylene isomerization de-heptanizer. A stream from the Xylene isomerization de-heptanizer overhead and the heating fluid flow through the third heat exchanger 402*c* simultaneously. The third heat exchanger 402*c* cools down the stream from a higher temperature, for example, about 112° C., to a lower temperature, for example, about 60° C., and increases the temperature of the heating fluid from a lower temperature, for example, about 50° C., to a higher temperature, for example, about 107° C. The thermal duty of the third heat exchanger 402*c* to implement the heat exchange is about 21 MW. The heating fluid at about 107° C. that exits the third heat exchanger 402*c* is circulated to a main heater to be mixed with the heated heating fluids from the other five heat exchangers in the first heating fluid circuit 402.

FIG. 4J is a schematic diagram of an implementation of the example network of FIG. 4A. The heating fluids received from the six heat exchangers in the first heating circuit are mixed in the main header resulting in a heating fluid at a temperature of about 127° C. The heated heating fluid from the first heating fluid circuit 402 is circulated through the pre-heater 406 of the ORC. The heating fluids received from the four heat exchangers in the second heating circuit are mixed in the main header resulting in a heating fluid at a temperature of about 142° C. The heated heating fluid from the second heating fluid circuit 403 is circulated through the evaporator 408 of the ORC. In some implementations, the pre-heater 406 and the evaporator 408 increase the temperature of the working fluid (for example, isobutane or other working fluid) from about 31° C. at about 20 bar to about 98° C. at about 20 bar at a thermal duty of about 157 MW and 167 MW, respectively. The gas expander 410 expands the high temperature, high pressure working fluid to generate power, for example, about 40 MW, at an efficiency of about 85%. The expansion decreases the temperature and pressure of the working fluid, for example, to about 52° C. and about 4.3 bar, respectively. The working fluid flows through the condenser 412 which further decreases the temperature and pressure of the working fluid at a thermal duty of about 217 MW. For example, cooling fluid flows through the condenser 412 at a lower temperature, for example, about 20° C., exchanges heat with the working fluid, and exits the condenser 412 at a higher temperature, for example, about 30° C. The cooled working fluid (for example, isobutane liquid) is pumped by the pump 414 at an efficiency, for example, of about 75%, and an input power, for example, of about 3 MW. The pump 414 increases the temperature of the working fluid to about 31° C. and pumps the working fluid at a mass flow rate of about 800 kg/s to the pre-heater 406, which repeats the Rankine cycle to generate power.

Figure 4K:
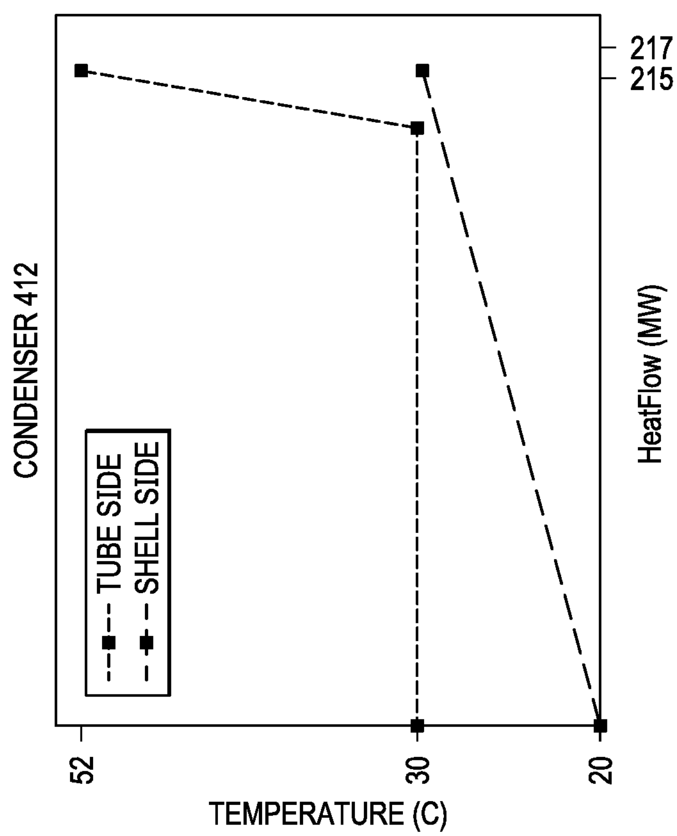
FIG. 4K is a graph that shows a tube side fluid temperature and a shell side fluid temperature in the condenser during an operation of the network of FIG. 4A.

FIG. 4K is a graph that shows a tube side fluid temperature (for example, a cooling, or condenser, fluid flow) and a shell side fluid temperature (for example, an ORC working fluid flow) in the condenser 412 during an operation of the system 400. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature. As shown in FIG. 4K, the condenser water (entering the tubes of the condenser 412) enters at about 20° C. and leaves at about 30° C. The ORC working fluid (entering the shell-side of the condensers) enters as a vapor at about 52° C., and then condenses at 30° C. and leaves the condensers as a liquid at 30° C.

Figure 4L:
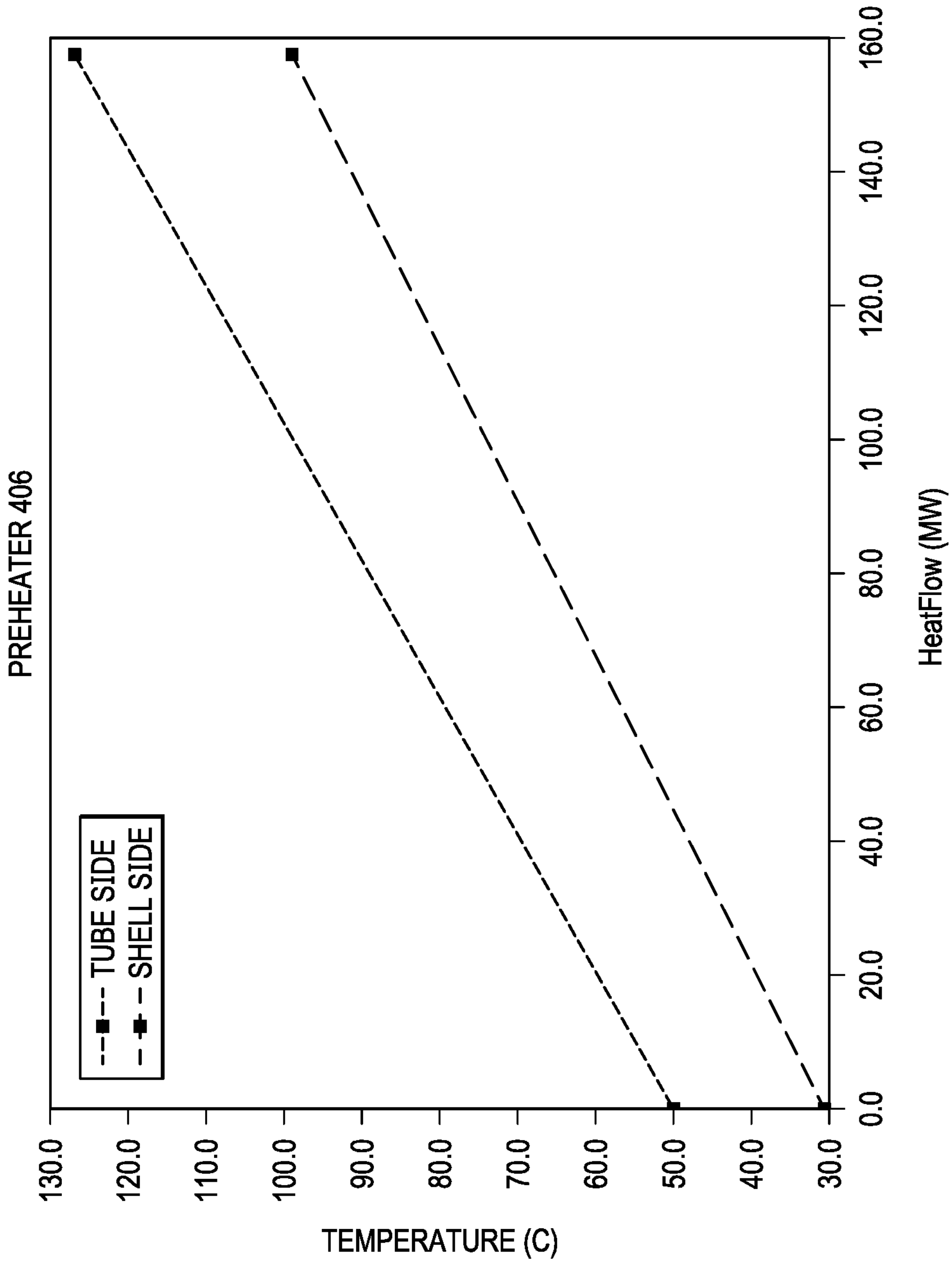
FIG. 4L is a graph that shows a tube side fluid temperature and a shell side fluid temperature in the preheater during an operation of the network of FIG. 4A.

FIG. 4L is a graph that show a tube-side fluid temperature (for example, a heating fluid flow) and a shell-side fluid temperature (for example, an ORC working fluid flow) in the pre-heater 406 during an operation of the system 400. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 4L, as the tube-side fluid (for example, the hot oil or water in the heating fluid circuit 402) is circulated through the pre-heater 406, heat is transferred from that fluid to the shell-side fluid (for example, the ORC working fluid). Thus, the tube-side fluid enters the pre-heater 406 at about 127° C. and leaves the pre-heater 406 at about 50° C. The shell-side fluid enters the pre-heater 406 at about 30° C. (for example, as a liquid) and leaves the pre-heater 406 at about 99° C. (for example, also as a liquid or mixed phase fluid).

Figure 4M:
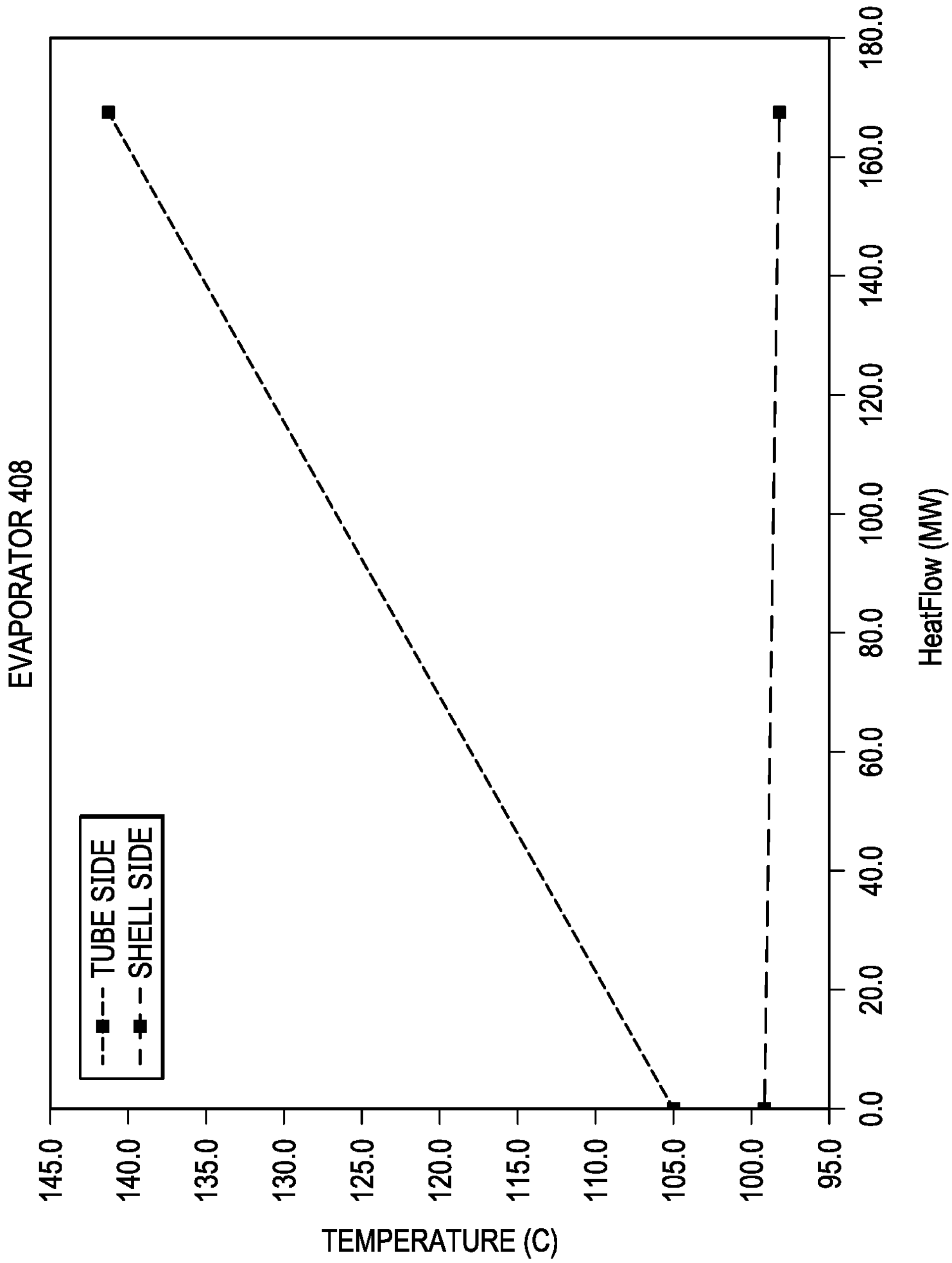
FIG. 4M is a graph that shows a tube side fluid temperature and a shell side fluid temperature in the evaporator during an operation of the network of FIG. 4A.

FIG. 4M is a graph that shows a tube side fluid temperature (for example, a heating fluid flow) and a shell side fluid temperature (for example, an ORC working fluid flow) in the evaporator 408 during an operation of the system 400. This graph shows a temperature difference between the fluids on the y-axis relative to a heat flow between the fluids on the x-axis. For example, as shown in this figure, as the temperature difference between the fluids increases, a heat flow between the fluids can increase. For example, as shown in FIG. 4M, as the tube-side fluid (for example, the hot oil or water in the heating fluid circuit 403) is circulated through the evaporator 408, heat is transferred from that fluid to the shell-side fluid (for example, the ORC working fluid). Thus, the tube-side fluid enters the evaporator 408 at about 141° C. and leaves the evaporator 408 at about 105° C. The shell-side fluid enters the evaporator 408, from the pre-heater 406, at about 99° C. (for example, as a liquid or mixed phase fluid) and leaves the evaporator 408 also at about 99° C. (for example, as a vapor with some superheating).

Figure 5A:
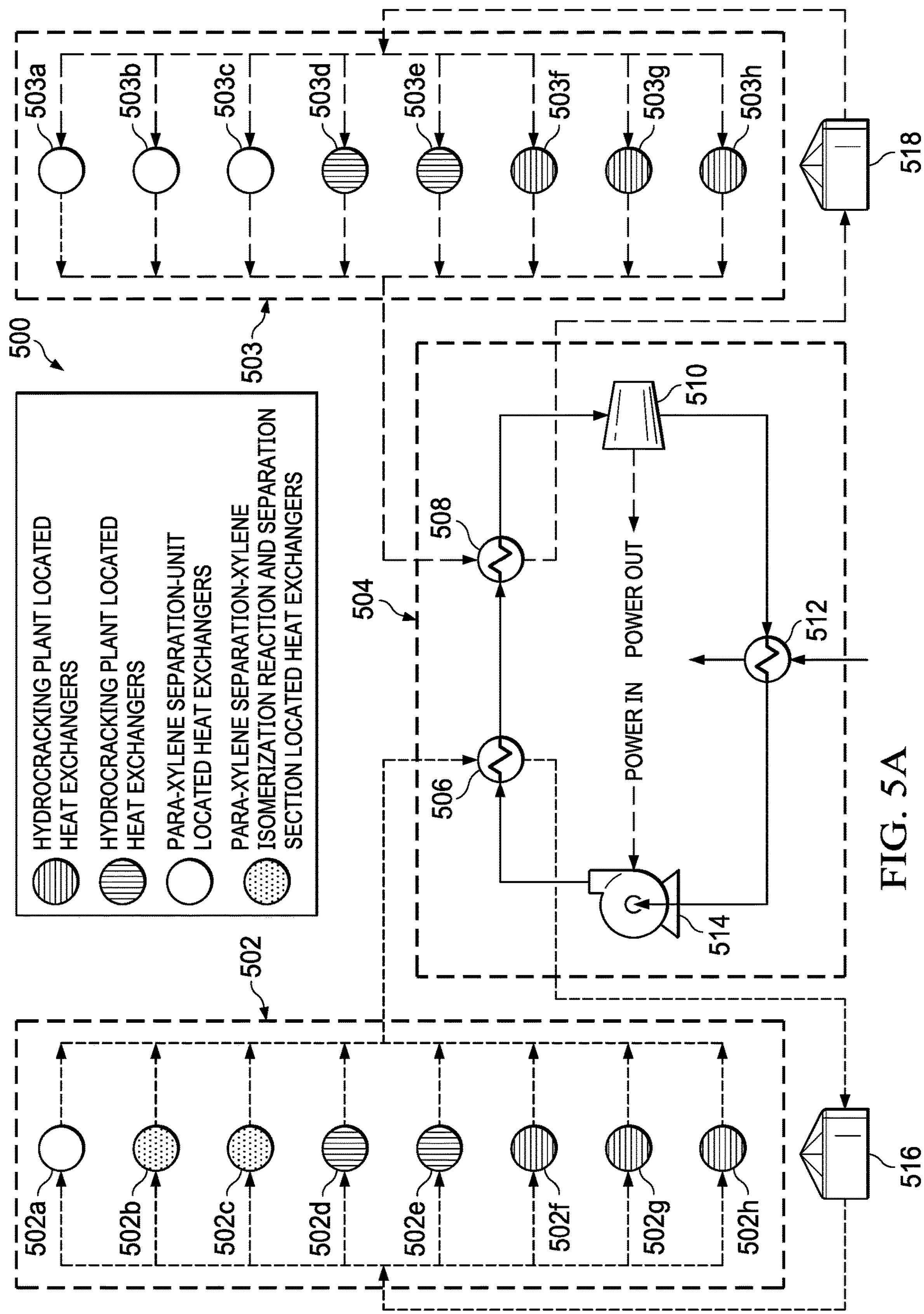
FIG. 5A is a schematic diagram of an example network to recover waste heat from sixteen heat sources.
Figure 5B:
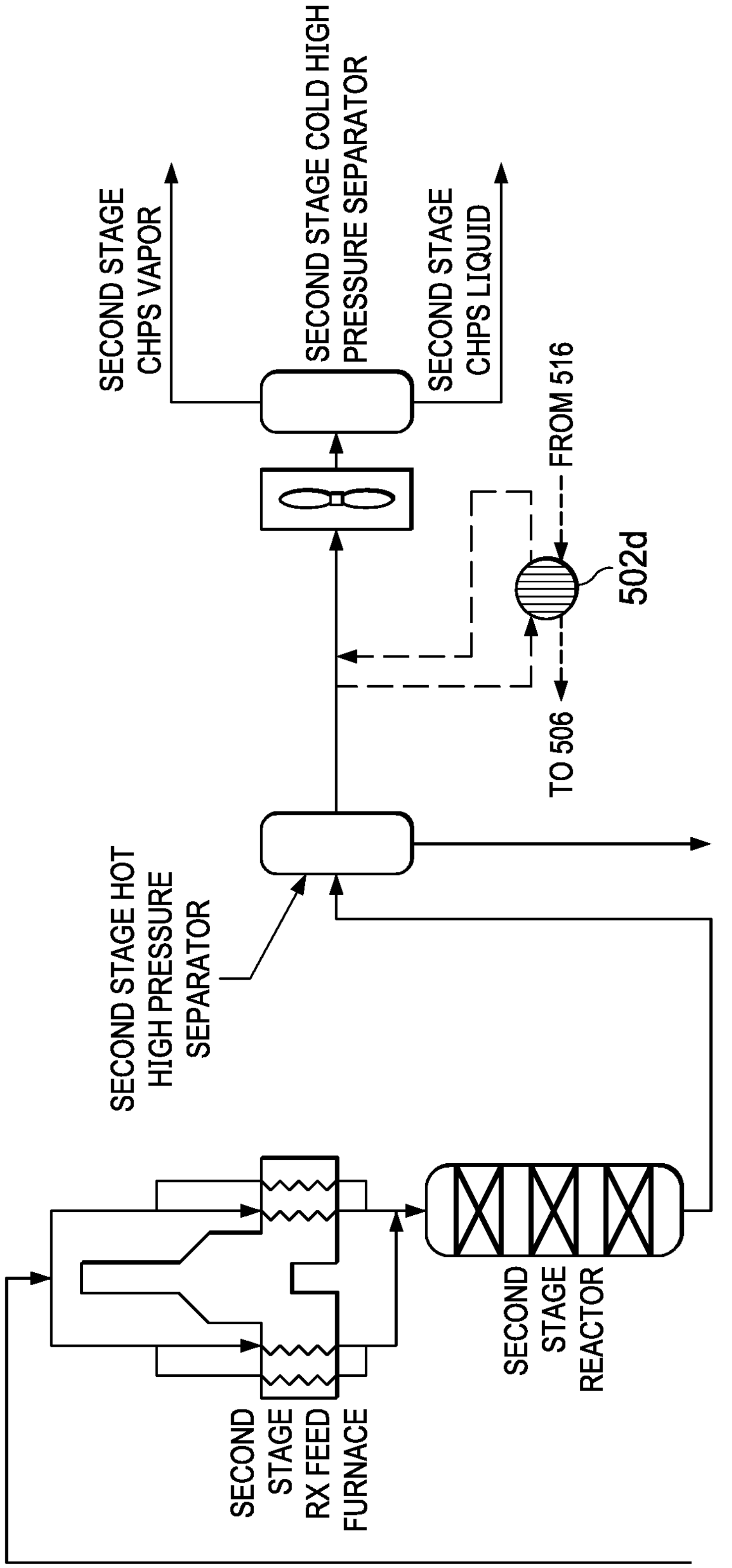
FIGS. 5B, 5C, 5DA and 5DB (collectively FIGS. 5B-5D) are schematic diagrams of heat sources in a hydrocracking plant.
Figure 5C:
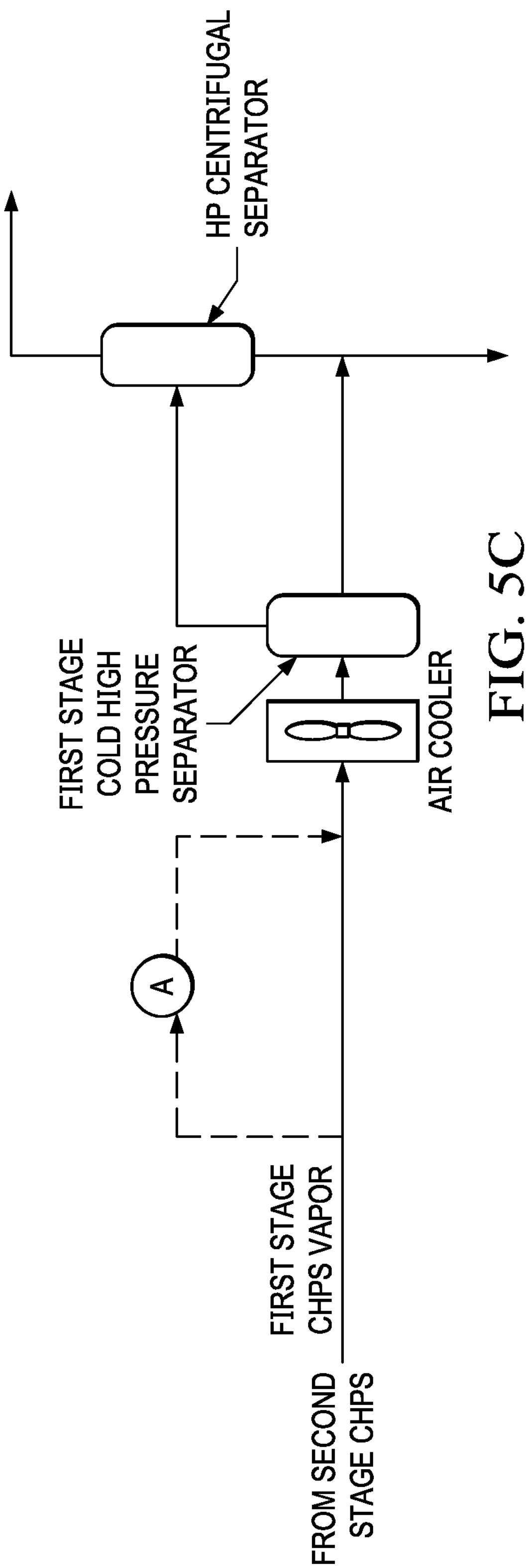
Figure 5D:
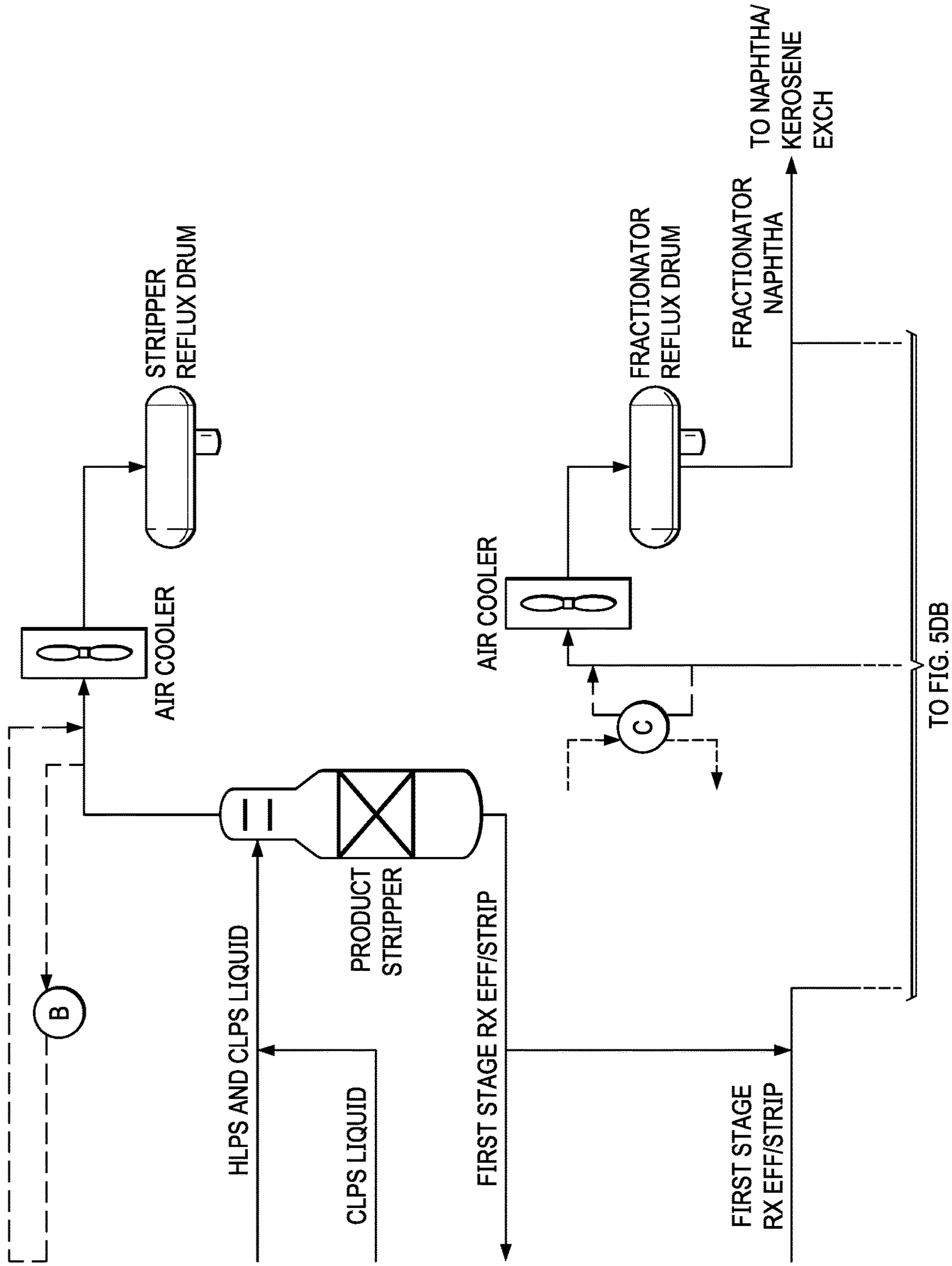
Figure 5D:
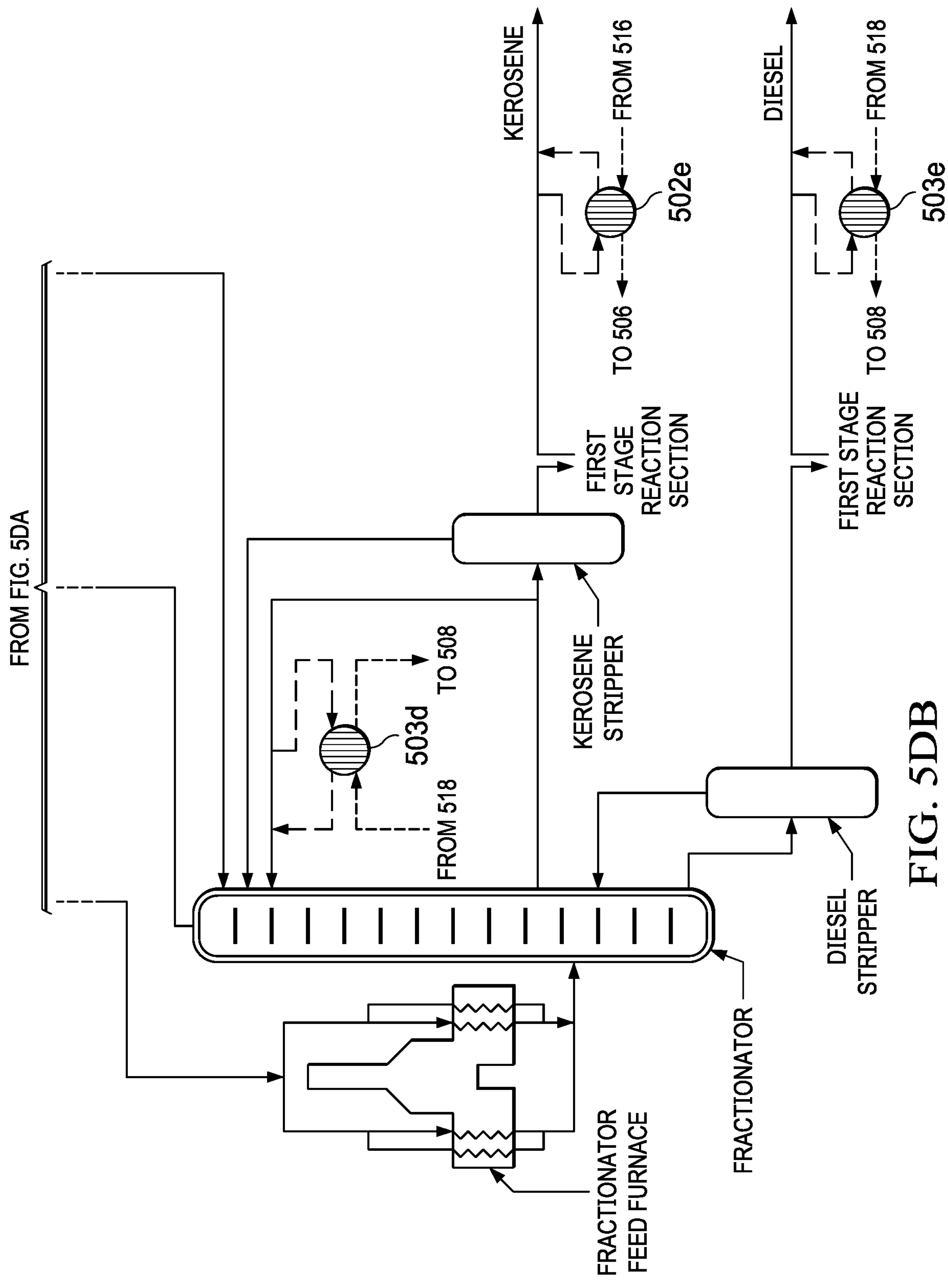
Figure 5F:
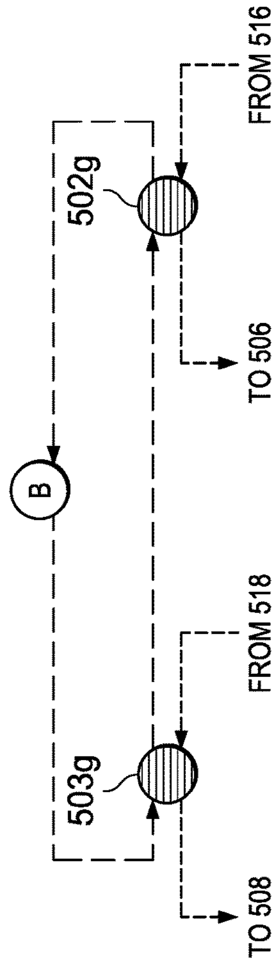
FIGS. 5E, 5F and 5G are schematic diagrams, each showing two heat sources in the hydrocracking plant connected in series.
Figure 5E:
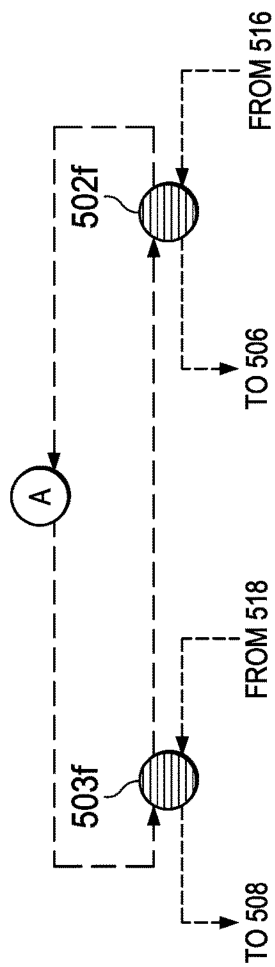
Figure 5G:
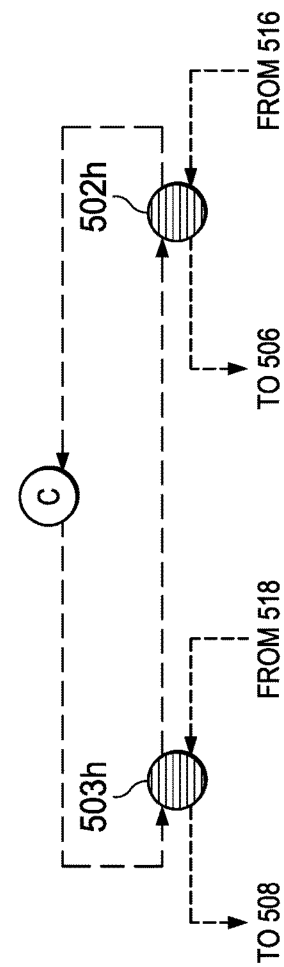

FIG. 5A is a schematic diagram of an example network to recover waste heat from sixteen heat sources. FIGS. 5B-5D are schematic diagrams of heat sources in a hydrocracking plant. Each of FIGS. 5E-5G is a schematic diagram of two heat sources in the hydrocracking plant connected in series. FIGS. 5H-5M are schematic diagrams of heat sources in an aromatics plant. FIG. 5N is a schematic diagram of an implementation of the example network of FIG. 5A.

FIG. 5A is a schematic diagram of an example network to recover waste heat from sixteen heat sources. In some implementations, the network can include a first heating fluid circuit 502 coupled to multiple heat sources. For example, the multiple heat sources can include eight heat exchangers (a first heat exchanger 502*a*, a second heat exchanger 502*b*, a third heat exchanger 502*c*, a fourth heat exchanger 502*d*, a fifth heat exchanger 502*e*, a sixth heat exchanger 502*f*, a seventh heat exchanger 502*g* and an eighth heat exchanger 502*h*). In the first heating fluid circuit 502, the first heat exchanger 502*a*, the second heat exchanger 502*b* and the third heat exchanger 502*c* can be coupled to an aromatics plant, specifically, to one of an extract column, a purification column overhead section, a Raffinate column overhead section, a heavy reformate splitter, a para-Xylene reaction section or a de-heptanizer of the aromatics plant. In the first heating fluid circuit 502, the fourth heat exchanger 502*d*, the fifth heat exchanger 502*e*, the sixth heat exchanger 502*f*, the seventh heat exchanger 502*g* and the eighth heat exchanger 502*h* can be coupled to the hydrocracking plant. The six heat sources in the first heating fluid circuit 502 can be connected in parallel.

The network can include a second heating fluid circuit 503 coupled to multiple heat sources. For example, the multiple heat sources can include eight heat exchangers (a first heat exchanger 503*a*, a second heat exchanger 503*b*, a third heat exchanger 503*c*, a fourth heat exchanger 503*d*, a fifth heat exchanger 503*e*, a sixth heat exchanger 503*f*, a seventh heat exchanger 503*g*, and an eighth heat exchanger 503*h*). In the second heating fluid circuit 503, the first heat exchanger 503*a*, the second heat exchanger 503*b* and the third heat exchanger 503*c* can be coupled to the aromatics plant. In the second heating fluid circuit 503, the fourth heat exchanger 503*d*, the fifth heat exchanger 503*e*, the sixth heat exchanger 503*f*, the seventh heat exchanger 503*g* and the eighth heat exchanger 503*h* can be coupled to the hydrocracking plant. The four heat sources in the second heating fluid circuit 503 can be connected in parallel. Also, as described later, the sixth heat exchanger 502*f* in the first heating fluid circuit 502 and the sixth heat exchanger 503*f* in the second heating fluid circuit 503 can be connected in series. Similarly, the seventh heat exchanger 502*g* in the first heating fluid circuit 502 and the seventh heat exchanger 503*g* in the second heating fluid circuit 503 can be connected in series. Also, the eighth heat exchanger 502*h* in the first heating fluid circuit 502 and the eighth heat exchanger 503*h* in the second heating fluid circuit 503 can be connected in series.

The example network can include a power generation system 504 that includes an organic Rankine cycle (ORC). The ORC can include a working fluid that is thermally coupled to the first heating fluid circuit 502 and the second heating fluid circuit 503 to heat the working fluid. In some implementations, the working fluid can be isobutane. The ORC can include a gas expander 510 configured to generate electrical power from the heated working fluid. As shown in FIG. 5A, the ORC can additionally include an evaporator 508, a pump 514, a condenser 512 and a pre-heater 506. In some implementations, the working fluid can be thermally coupled to the first heating fluid circuit 502 in the pre-heater 506, and to the second heating fluid in the evaporator 508.

In operation, a heating fluid (for example, water, oil, or other fluid) is circulated through the eight heat exchangers in the first heating fluid circuit 502 and the eight heat exchangers in the second heating fluid circuit 503. An inlet temperature of the heating fluid that is circulated into the inlets of each of the eight heat sources in the first heating fluid circuit 502 is the same or substantially the same subject to any temperature variations that may result as the heating fluid flows through respective inlets. Similarly, an inlet temperature of the heating fluid that is circulated into the inlets of the each of the eight heat sources in the second heating fluid circuit 503 is the same or substantially the same subject to any temperature variations that may result as the heating fluid flows through respective inlets. Each heat exchanger in each heating fluid circuit heats the heating fluid to a respective temperature that is greater than the respective inlet temperature. The heated heating fluids from the eight heat exchangers in the first heating fluid circuit 502 are combined and flowed through the pre-heater 506 of the ORC. The heated heating fluids from the eight heat exchangers in the second heating fluid circuit 503 are combined and flowed through the evaporator 508 of the ORC. The heating fluid flowed through the pre-heater 506 is then collected in a heating fluid tank 516 and can be pumped back through the eight heat exchangers in the first heating fluid circuit 502 to restart the waste heat recovery cycle. Similarly, the heating fluid flowed through the evaporator 508 is then collected in a heating fluid tank 518 and can be pumped back through the eight heat exchangers in the second heating fluid circuit 503 to restart the waste heat recovery cycle. In some implementations, the heating fluid that exits the pre-heater 506 or the heating fluid that exits the evaporator 508 (or both) can be flowed through a respective air cooler (not shown) to further cool the heating fluid before the heating fluid is collected in the respective heating fluid tank.

In the manner described earlier, the heating fluid can be looped through the sixteen heat exchangers distributed across the two heating fluid circuits to recover heat that would otherwise go to waste in the hydrocracking plant and the aromatics plant, and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be greater or lesser than the power output from the power generation system that does not implement the waste heat recovery network. Where the power output is less, the difference may not be statistically significant.

Consequently, a power generation efficiency of the petrochemical refining system can be increased.

FIGS. 5B-5D are schematic diagrams of heat sources in a hydrocracking plant. FIG. 5B shows the fourth heat exchanger 502*d* in the first heating fluid circuit 502 in the hydrocracking plant of the petrochemical refining system. A feed stream from a hydrocracking 2nd stage reaction section feed to 2nd stage cold high pressure separator and the heating fluid flow through the fourth heat exchanger 502*d* simultaneously. The fourth heat exchanger 502*d* cools down the stream from a greater temperature, for example, about 157° C., to a lesser temperature, for example, about 60° C., and increases the temperature of the heating fluid from a lesser temperature, for example, about 50° C., to a greater temperature, for example, about 152° C. The thermal duty of the fourth heat exchanger 502*d* to implement the heat exchange is about 26 MW. The heating fluid at about 152° C. that exits the fourth heat exchanger 502*d* is circulated to a main heater to be mixed with the heated heating fluids from the other seven heat exchangers in the first heating fluid circuit 502.

FIG. 5C shows a combination of the sixth heat exchanger 502*f* in the first heating fluid circuit 502 and the sixth heat exchanger 503*f* in the second heating fluid circuit 503. As shown in FIG. 5E, the sixth heat exchanger 502*f* and the sixth heat exchanger 503*f* are connected in series. A stream from a hydrocracking 1st stage reaction section feed to 1st stage cold high pressure separator flows through the sixth heat exchanger 503*f* in the second heating fluid circuit 503 simultaneously with a portion of the heating fluid from the second heating fluid circuit 503. The sixth heat exchanger 503*f* cools down the stream from a greater temperature, for example, about 159° C., to a lesser temperature, for example, about 115° C., and increases the temperature of the heating fluid from a lesser temperature, for example, about 105° C., to a greater temperature, for example, about 154° C. The thermal duty of the sixth heat exchanger 503*f* to implement the heat exchange is about 36 MW. The heating fluid at about 154° C. that exits the sixth heat exchanger 503*f* is circulated to a main heater to be mixed with the heated heating fluids from the other seven heat exchangers in the second heating fluid circuit 503. The stream from the hydrocracking 1st stage reaction section feed to 1st stage cold high pressure separator that exits the sixth heat exchanger 503*f*, then flows into the sixth heat exchanger 502*f* in the first heating fluid circuit 502 simultaneously with a portion of the heating fluid from the first heating fluid circuit 502. The sixth heat exchanger 502*f* cools down the stream from a greater temperature, for example, about 115° C., to a lesser temperature, for example, about 60° C., and increases the temperature of the heating fluid from a lesser temperature, for example, about 50° C., to a greater temperature, for example, about 510° C. The thermal duty of the sixth heat exchanger 502*f* to implement the heat exchange is about 45 MW. The heating fluid at about 110° C. that exits the sixth heat exchanger 502*f* is circulated to a main heater to be mixed with the heated heating fluids from the other seven heat exchangers in the first heating fluid circuit 502.

FIG. 5D shows a combination of the seventh heat exchanger 502*g* in the first heating fluid circuit 502 and the seventh heat exchanger 503*g* in the second heating fluid circuit 503. As shown in FIG. 5F, the seventh heat exchanger 502*g* and the seventh heat exchanger 503*g* are connected in series. A stream from a hydrocracking product stripper overhead flows through the seventh heat exchanger 503*g* in the second heating fluid circuit 503 simultaneously with a portion of the heating fluid from the second heating fluid circuit 503. The seventh heat exchanger 503*g* cools down the stream from a greater temperature, for example, about 169° C., to a lesser temperature, for example, about 115° C., and increases the temperature of the heating fluid from a lesser temperature, for example, about 105° C., to a greater temperature, for example, about 164° C. The thermal duty of the seventh heat exchanger 503*g* to implement the heat exchange is about 19 MW. The heating fluid at about 164° C. that exits the seventh heat exchanger 503*g* is circulated to a main heater to be mixed with the heated heating fluids from the other seven heat exchangers in the second heating fluid circuit 503. The stream from the hydrocracking 1st stage reaction section feed to 1st stage cold high pressure separator that exits the seventh heat exchanger 503*g*, then flows into the seventh heat exchanger 502*g* in the first heating fluid circuit 502 simultaneously with a portion of the heating fluid from the first heating fluid circuit 502. The seventh heat exchanger 502*g* cools down the stream from a greater temperature, for example, about 115° C., to a lesser temperature, for example, about 60° C., and increases the temperature of the heating fluid from a lesser temperature, for example, about 50° C., to a greater temperature, for example, about 110° C. The thermal duty of the seventh heat exchanger 502*g* to implement the heat exchange is about 18 MW. The heating fluid at about 110° C. that exits the seventh heat exchanger 502*g* is circulated to a main heater to be mixed with the heated heating fluids from the other seven heat exchangers in the first heating fluid circuit 502.

FIG. 5D also shows a combination of the eighth heat exchanger 502*h* in the first heating fluid circuit 502 and the eighth heat exchanger 503*h* in the second heating fluid circuit 503. As shown in FIG. 5G, the eighth heat exchanger 502*h* and the eighth heat exchanger 503*h* are connected in series. A stream from a hydrocracking main fractionator overhead flows through the eighth heat exchanger 503*h* in the second heating fluid circuit 503 simultaneously with a portion of the heating fluid from the second heating fluid circuit 503. The eighth heat exchanger 503*h* cools down the stream from a greater temperature, for example, about 136° C., to a lesser temperature, for example, about 118° C., and increases the temperature of the heating fluid from a lesser temperature, for example, about 105° C., to a greater temperature, for example, about 131° C. The thermal duty of the eighth heat exchanger 503*h* to implement the heat exchange is about 21 MW. The heating fluid at about 131° C. that exits the eighth heat exchanger 503*h* is circulated to a main heater to be mixed with the heated heating fluids from the other seven heat exchangers in the second heating fluid circuit 503. The stream from the hydrocracking 1st stage reaction section feed to 1st stage cold high pressure separator that exits the eighth heat exchanger 503*h*, then flows into the eighth heat exchanger 502*h* in the first heating fluid circuit 502 simultaneously with a portion of the heating fluid from the first heating fluid circuit 502. The eighth heat exchanger 502*h* cools down the stream from a greater temperature, for example, about 118° C., to a lesser temperature, for example, about 60° C., and increases the temperature of the heating fluid from a lesser temperature, for example, about 50° C., to a greater temperature, for example, about 113° C. The thermal duty of the eighth heat exchanger 502*h* to implement the heat exchange is about 68 MW. The heating fluid at about 113° C. that exits the eighth heat exchanger 502*h* is circulated to a main heater to be mixed with the heated heating fluids from the other seven heat exchangers in the first heating fluid circuit 502.

FIG. 5D further shows the fourth heat exchanger 503*d* in the second heating fluid circuit 503 in the hydrocracking plant of the petrochemical refining system. A feed stream from a hydrocracking main fractionator kerosene pump-around and the heating fluid flow through the fourth heat exchanger 503*d* simultaneously. The fourth heat exchanger 503*d* cools down the stream from a greater temperature, for example, about 160° C., to a lesser temperature, for example, about 130° C., and increases the temperature of the heating fluid from a lesser temperature, for example, about 105° C., to a greater temperature, for example, about 155° C. The thermal duty of the fourth heat exchanger 503*d* to implement the heat exchange is about 6 MW. The heating fluid at about 155° C. that exits the fourth heat exchanger 503*d* is circulated to a main heater to be mixed with the heated heating fluids from the other seven heat exchangers in the second heating fluid circuit 503.

FIG. 5D also shows the fifth heat exchanger 502*e* in the first heating fluid circuit 502 in the hydrocracking plant of the petrochemical refining system. A feed stream from a hydrocracking main fractionator kerosene product and the heating fluid flow through the fifth heat exchanger 502*e* simultaneously. The fifth heat exchanger 502*e* cools down the stream from a greater temperature, for example, about 160° C., to a lesser temperature, for example, about 60° C., and increases the temperature of the heating fluid from a lesser temperature, for example, about 50° C., to a greater temperature, for example, about 155° C. The thermal duty of the fifth heat exchanger 502*e* to implement the heat exchange is about 20 MW. The heating fluid at about 155° C. that exits the fifth heat exchanger 502*e* is circulated to a main heater to be mixed with the heated heating fluids from the other seven heat exchangers in the first heating fluid circuit 502.

FIG. 5D additionally shows the fifth heat exchanger 503*e* in the second heating fluid circuit 503 in the hydrocracking plant of the petrochemical refining system. A feed stream from a hydrocracking main fractionator diesel product and the heating fluid flow through the fifth heat exchanger 503*e* simultaneously. The fifth heat exchanger 503*e* cools down the stream from a greater temperature, for example, about 160° C., to a lesser temperature, for example, about 121° C., and increases the temperature of the heating fluid from a lesser temperature, for example, about 105° C., to a greater temperature, for example, about 155° C. The thermal duty of the fifth heat exchanger 503*e* to implement the heat exchange is about 6 MW. The heating fluid at about 155° C. that exits the fifth heat exchanger 503*e* is circulated to a main heater to be mixed with the heated heating fluids from the other seven heat exchangers in the second heating fluid circuit 503.

Figure 5H:
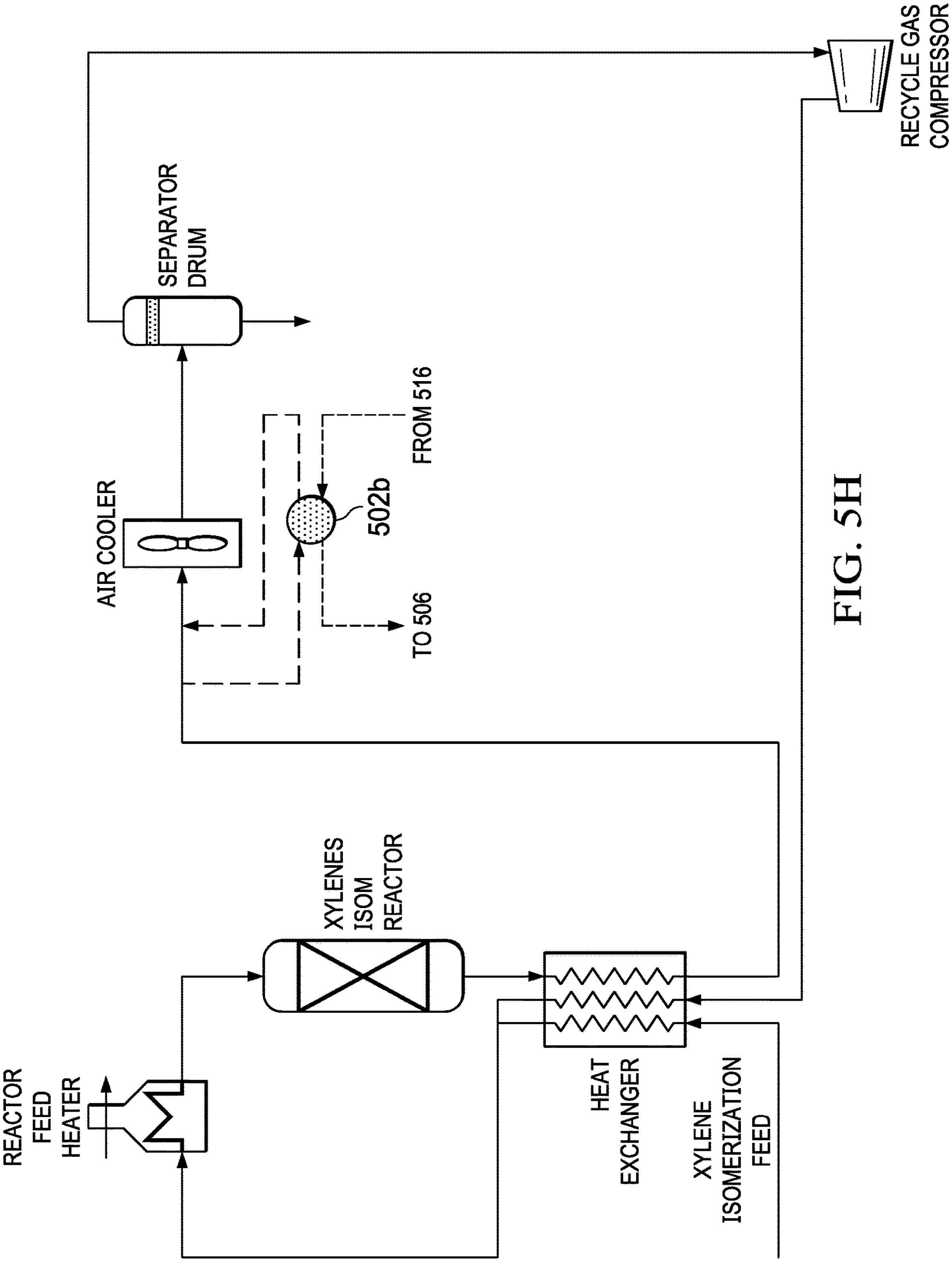
FIGS. 5H-5M are schematic diagrams of heat sources in an aromatics plant.

FIGS. 5H-5K are schematic diagrams of heat sources in an aromatics plant. FIG. 5H shows the second heat exchanger 502*b* in the first heating fluid circuit 502 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from a Xylene isomerization reactor outlet before the separator drum and the heating fluid flow through the second heat exchanger 502*b* simultaneously. The second heat exchanger 502*b* cools down the stream from a greater temperature, for example, about 114° C., to a lesser temperature, for example, about 60° C., and increases the temperature of the heating fluid from a lesser temperature, for example, about 50° C., to a greater temperature, for example, about 109° C. The thermal duty of the second heat exchanger 502*b* to implement the heat exchange is about 16 MW. The heating fluid at about 109° C. that exits the second heat exchanger 502*b* is circulated to a main heater to be mixed with the heated heating fluids from the other seven heat exchangers in the first heating fluid circuit 502.

Figure 5I:
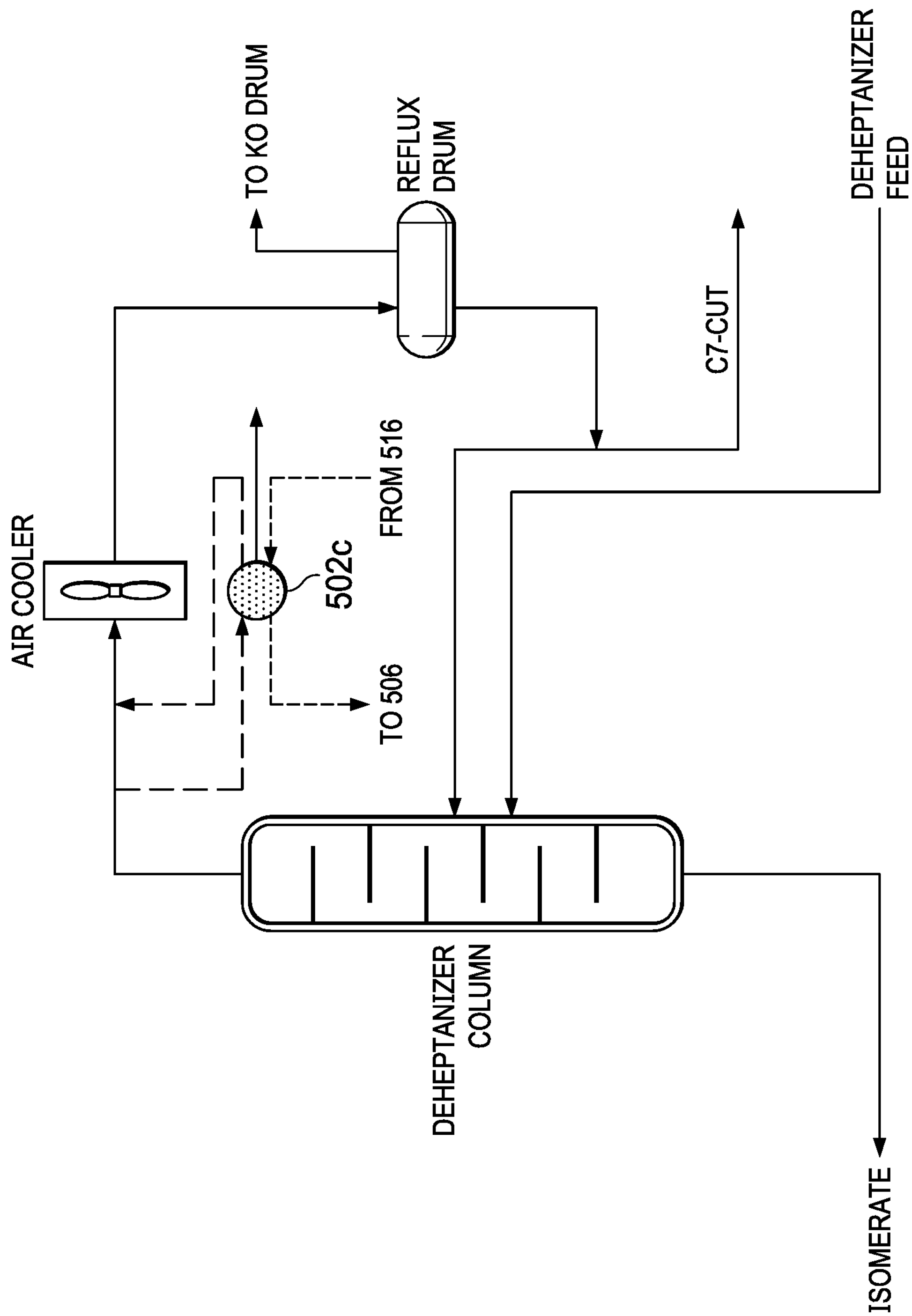

FIG. 5I shows the third heat exchanger 502*c* in the first heating fluid circuit 502 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from a Xylene isomerization de-heptanizer and the heating fluid flow through the third heat exchanger 502*c* simultaneously. The third heat exchanger 502*c* cools down the stream from a greater temperature, for example, about 112° C., to a lesser temperature, for example, about 60° C., and increases the temperature of the heating fluid from a lesser temperature, for example, about 50° C., to a greater temperature, for example, about 107° C. The thermal duty of the third heat exchanger 502*c* to implement the heat exchange is about 21 MW. The heating fluid at about 107° C. that exits the third heat exchanger 502*c* is circulated to a main heater to be mixed with the heated heating fluids from the other seven heat exchangers in the first heating fluid circuit 502.

Figure 5J:
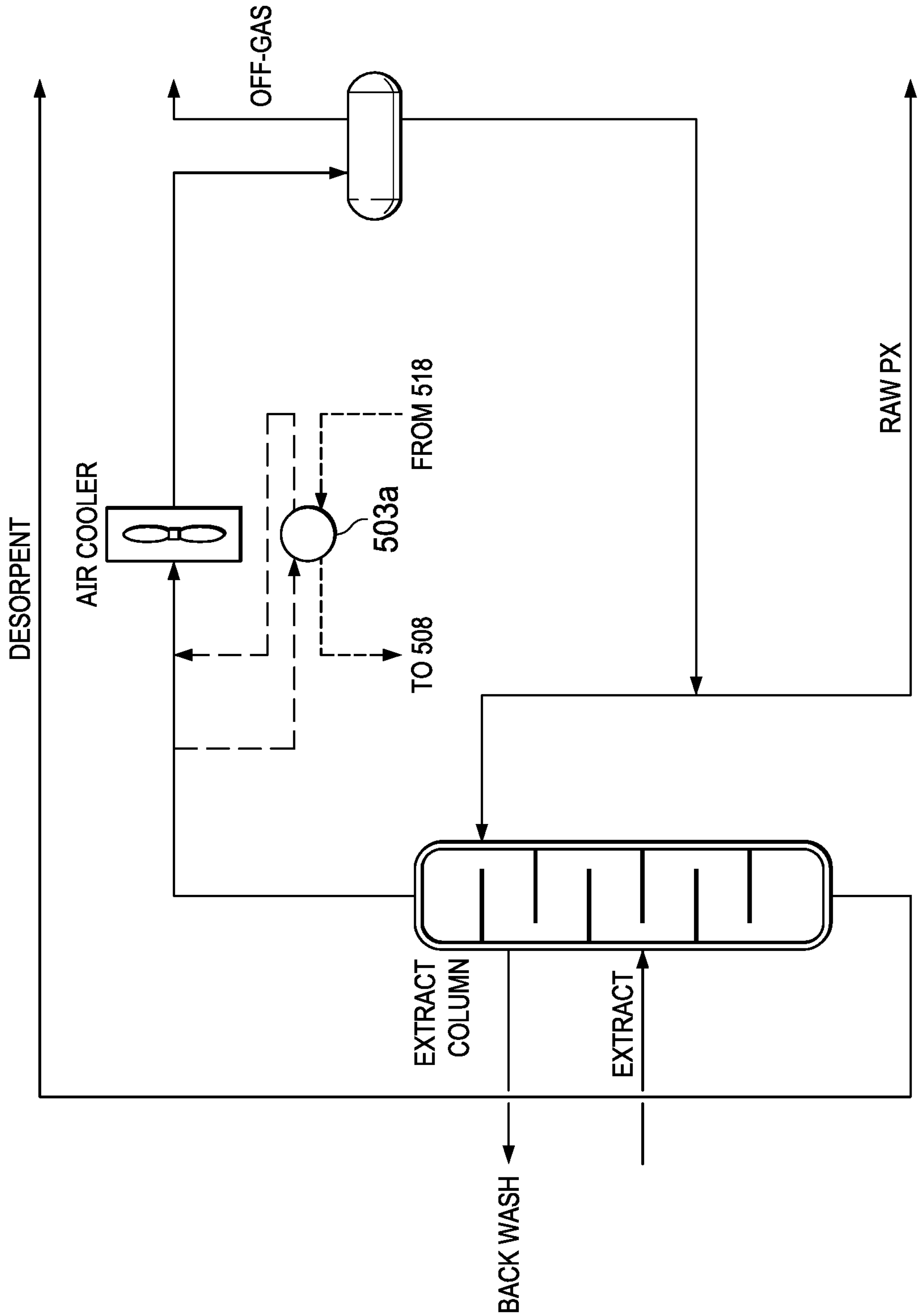

FIG. 5J shows the first heat exchanger 503*a* in the second heating fluid circuit 503 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from an extract column overhead and the heating fluid flow through the first heat exchanger 503*a* simultaneously. The first heat exchanger 503*a* cools down the stream from a greater temperature, for example, about 156° C., to a lesser temperature, for example, about 133° C., and increases the temperature of the heating fluid from a lesser temperature, for example, about 105° C., to a greater temperature, for example, about 151° C. The thermal duty of the first heat exchanger 503*a* to implement the heat exchange is about 33 MW. The heating fluid at about 151° C. that exits the first heat exchanger 503*a* is circulated to a main heater to be mixed with the heated heating fluids from the other seven heat exchangers in the second heating fluid circuit 503.

Figure 5K:
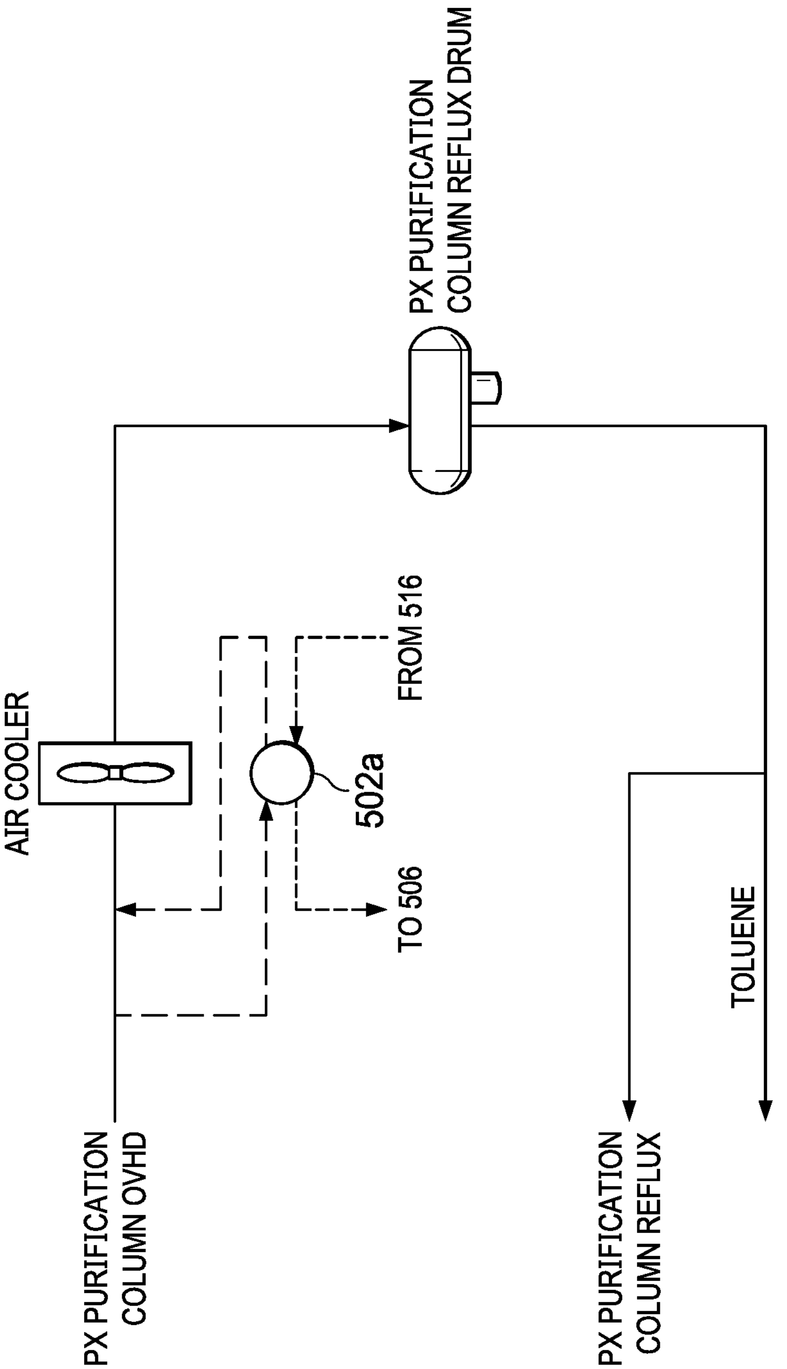

FIG. 5K shows the first heat exchanger 502*a* in the first heating fluid circuit 502 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from the para-Xylene purification column overhead and the heating fluid flow through the first heat exchanger 502*a* simultaneously. The first heat exchanger 502*a* cools down the stream from a greater temperature, for example, about 127° C., to a lesser temperature, for example, about 84° C., and increases the temperature of the heating fluid from a lesser temperature, for example, about 50° C., to a greater temperature, for example, about 122° C. The thermal duty of the first heat exchanger 502*a* to implement the heat exchange is about 14 MW. The heating fluid at about 122° C. that exits the first heat exchanger 502*a* is circulated to a main heater to be mixed with the heated heating fluids from the other seven heat exchangers in the first heating fluid circuit 502.

Figure 5L:
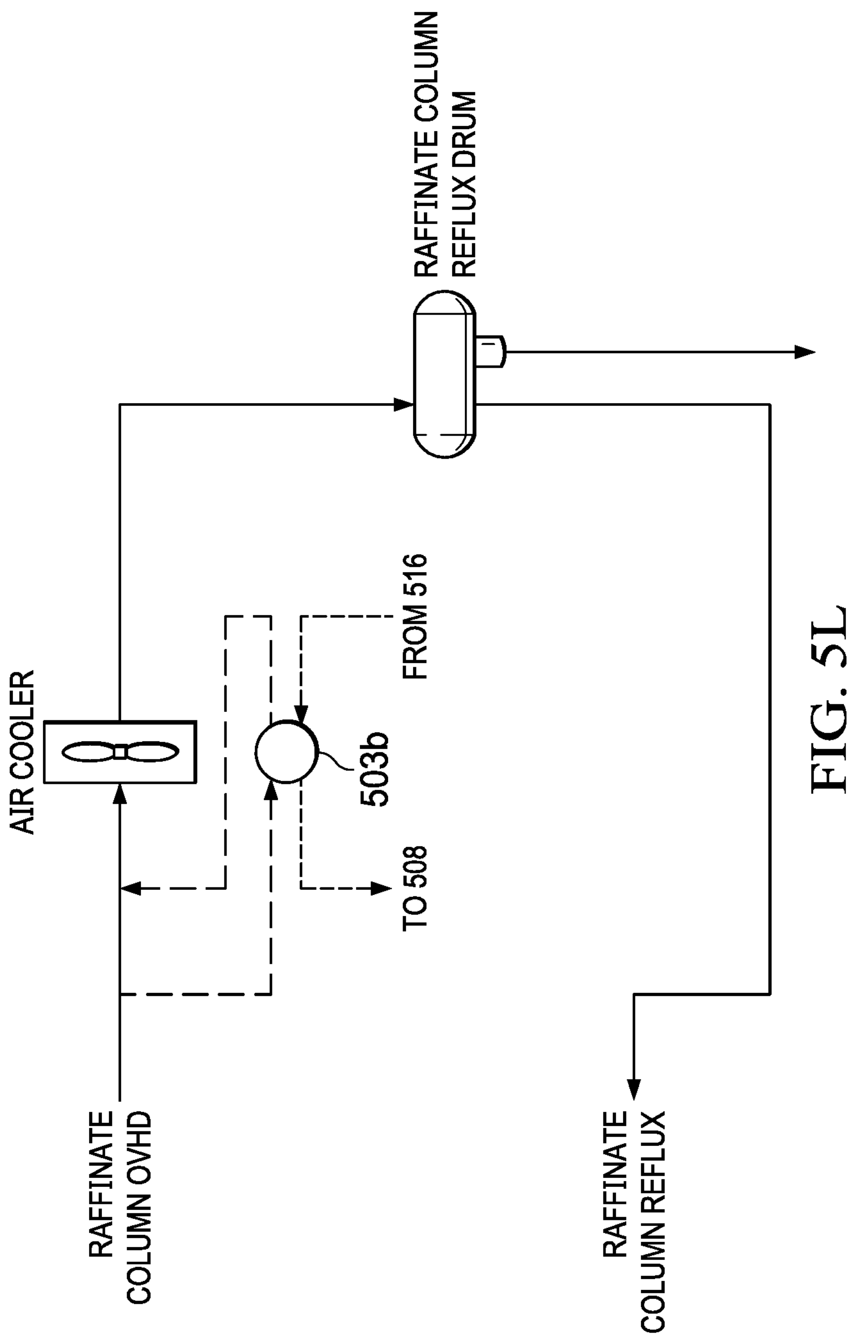

FIG. 5L shows the second heat exchanger 503*b* in the second heating fluid circuit 503 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from the heavy Raffinate column overhead and the heating fluid flow through the second heat exchanger 503*b* simultaneously. The second heat exchanger 503*b* cools down the stream from a greater temperature, for example, about 162° C., to a lesser temperature, for example, about 130° C., and increases the temperature of the heating fluid from a lesser temperature, for example, about 105° C., to a greater temperature, for example, about 157° C. The thermal duty of the second heat exchanger 503*b* to implement the heat exchange is about 91 MW. The heating fluid at about 157° C. that exits the second heat exchanger 503*b* is circulated to a main heater to be mixed with the heated heating fluids from the other seven heat exchangers in the second heating fluid circuit 503.

Figure 5M:
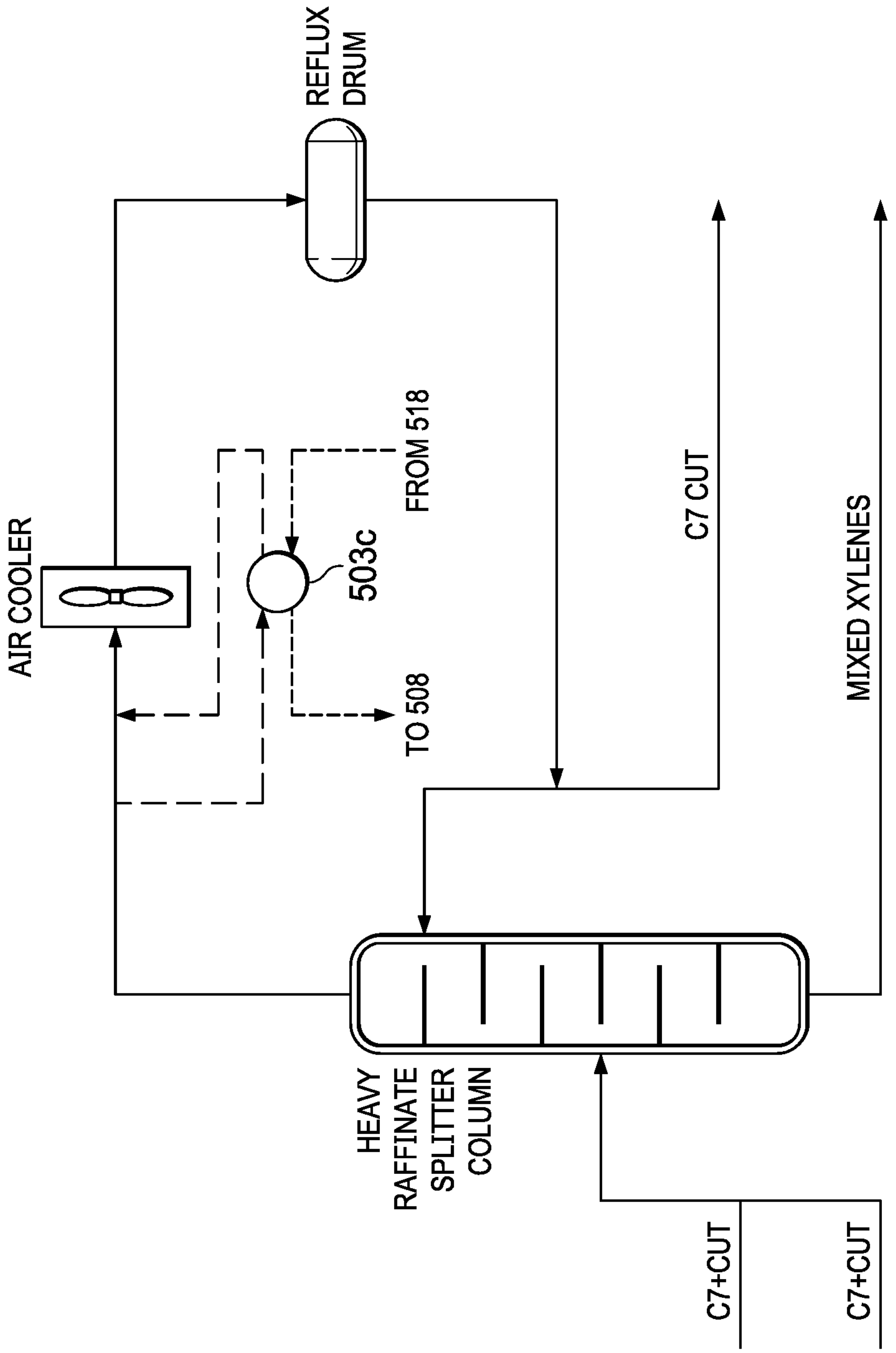
Figure 5N:
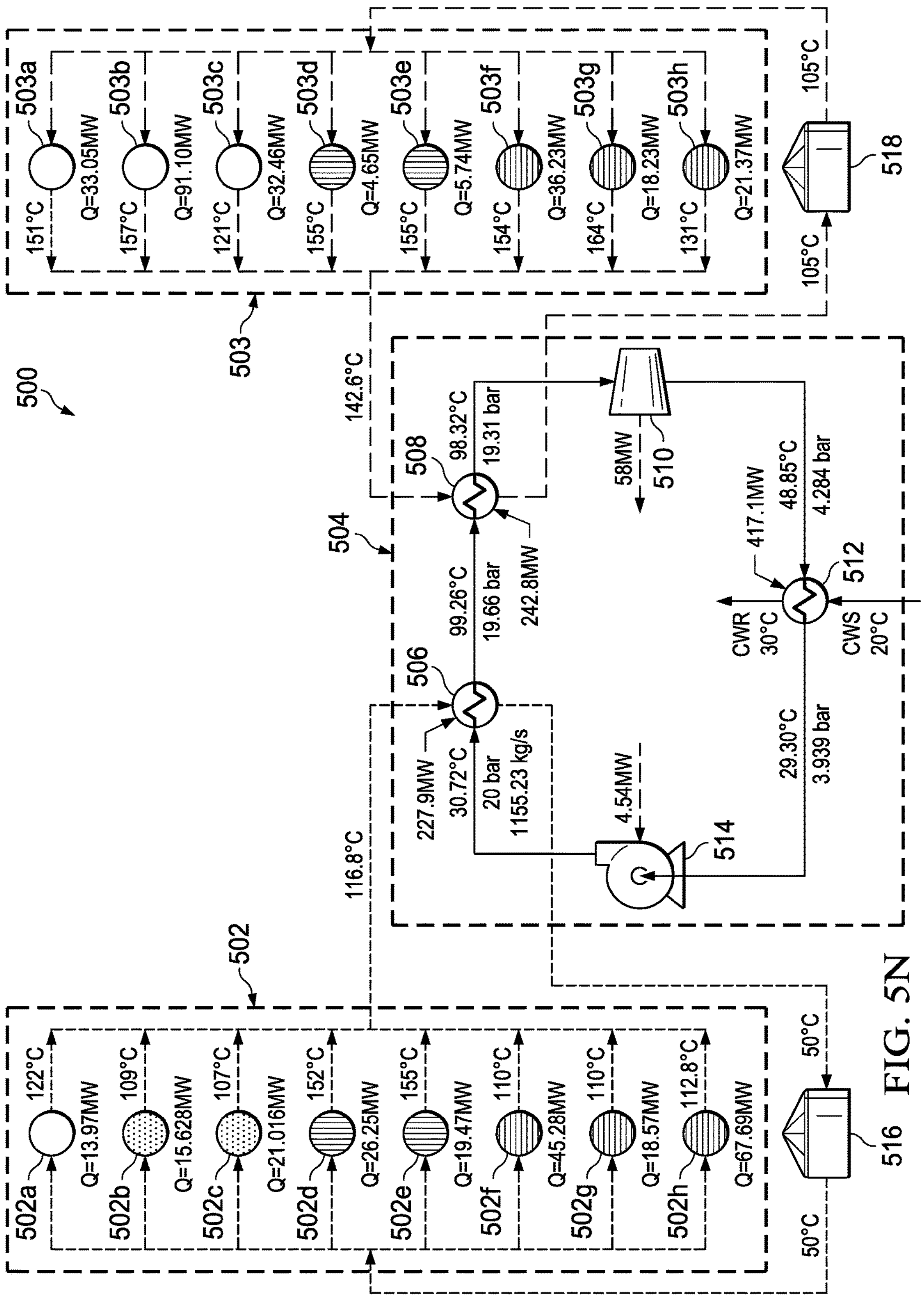
FIG. 5N is a schematic diagram of an implementation of the example network of FIG. 5A.

FIG. 5M shows the third heat exchanger 503*c* in the second heating fluid circuit 503 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from the heavy Raffinate column overhead and the heating fluid flow through the third heat exchanger 503*c* simultaneously. The third heat exchanger 503*c* cools down the stream from a greater temperature, for example, about 126° C., to a lesser temperature, for example, about 113° C., and increases the temperature of the heating fluid from a lesser temperature, for example, about 105° C., to a greater temperature, for example, about 121° C. The thermal duty of the third heat exchanger 503*c* to implement the heat exchange is about 33 MW. The heating fluid at about 121° C. that exits the third heat exchanger 503*c* is circulated to a main heater to be mixed with the heated heating fluids from the other seven heat exchangers in the second heating fluid circuit 503.

FIG. 5N is a schematic diagram of an implementation of the example network of FIG. 5A. The heating fluids received from the eight heat exchangers in the first heating circuit are mixed in the main header resulting in a heating fluid at a temperature of about 117° C. The heated heating fluid from the first heating fluid circuit 502 is circulated through the pre-heater 506 of the ORC. The heating fluids received from the eight heat exchangers in the second heating circuit are mixed in the main header resulting in a heating fluid at a temperature of about 143° C. The heated heating fluid from the second heating fluid circuit 503 is circulated through the evaporator 508 of the ORC. In some implementations, the pre-heater 506 and the evaporator 508 increase the temperature of the working fluid (for example, isobutane or other working fluid) from about 31° C. at about 20 bar to about 98° C. at about 20 bar at a thermal duty of about 228 MW and 243 MW, respectively. The gas expander 510 expands the high temperature, high pressure working fluid to generate power, for example, about 58 MW, at an efficiency of about 85%. The expansion decreases the temperature and pressure of the working fluid, for example, to about 49° C. and about 4.3 bar, respectively. The working fluid flows through the condenser 512 which further decreases the temperature and pressure of the working fluid at a thermal duty of about 417 MW. For example, cooling fluid flows through the condenser 512 at a lesser temperature, for example, about 20° C., exchanges heat with the working fluid, and exits the condenser 512 at a greater temperature, for example, about 30° C. The cooled working fluid (for example, isobutane liquid) is pumped by the pump 514 at an efficiency, for example, of about 75%, and an input power, for example, of about 5 MW. The pump 514 increases the temperature of the working fluid to about 31° C. and pumps the working fluid at a mass flow rate of about 1155 kg/s to the pre-heater 506, which repeats the Rankine cycle to generate power.

Figure 5O:
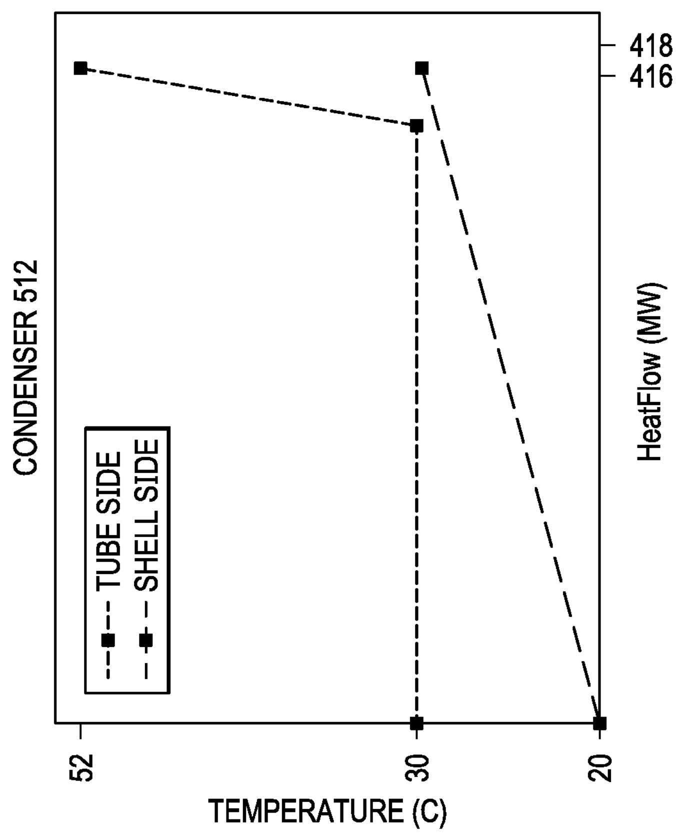
FIG. 5O is a graph that shows a tube side fluid temperature and a shell side fluid temperature in the condenser during an operation of the system of FIG. 5A.

FIG. 5O is a graph that shows a tube side fluid temperature (for example, a cooling, or condenser, fluid flow) and a shell side fluid temperature (for example, an ORC working fluid flow) in the condenser 512 during an operation of the system 500. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even greater. In such cases, a gas expander outlet pressure (for example, pressure of the ORC working fluid exiting the gas expander) may be high enough to allow the condensation of the ORC working fluid at the available cooling fluid temperature. As shown in FIG. 5O, the condenser water (entering the tubes of the condenser 512) enters at about 20° C. and leaves at about 25-27° C. The ORC working fluid (entering the shell-side of the condenser) enters as a vapor at about 49° C., and then condenses at 30° C. and leaves the condensers as a liquid at 30° C.

Figure 5P:
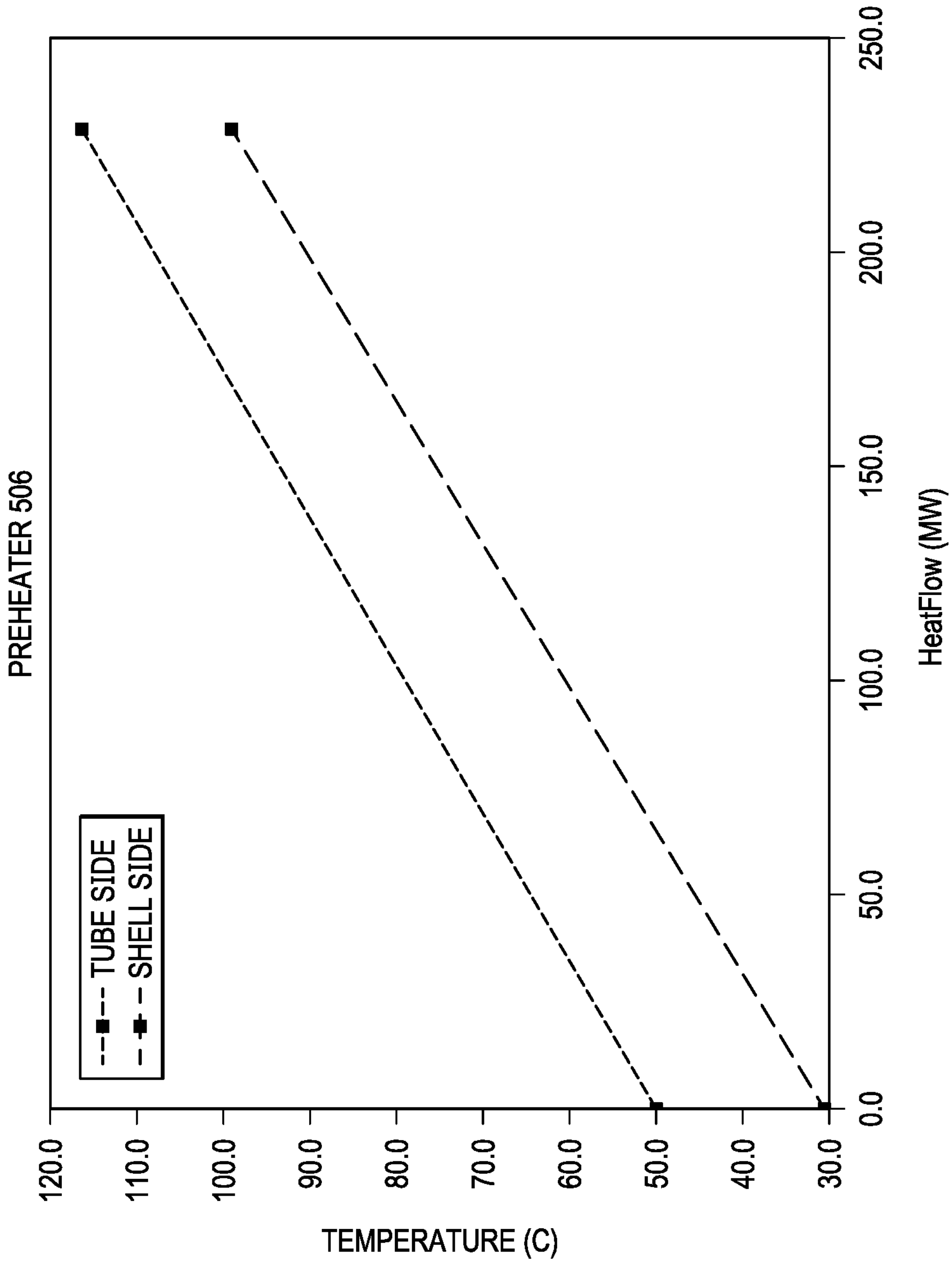
FIG. 5P is a graph that shows a tube side fluid temperature and a shell side fluid temperature in the preheater during an operation of the system of FIG. 5A.

FIG. 5P is a graph that show a tube-side fluid temperature (for example, a heating fluid flow) and a shell-side fluid temperature (for example, an ORC working fluid flow) in the pre-heater 506 during an operation of the system 500. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 5P, as the tube-side fluid (for example, the hot oil or water in the heating fluid circuit 502) is circulated through the pre-heater 506, heat is transferred from that fluid to the shell-side fluid (for example, the ORC working fluid). Thus, the tube-side fluid enters the pre-heater 506 at about 116° C. and leaves the pre-heater 506 at about 50° C. The shell-side fluid enters the pre-heater 506 at about 30° C. (for example, as a liquid) and leaves the pre-heater 506 at about 99° C. (for example, also as a liquid or mixed phase fluid).

Figure 5Q:
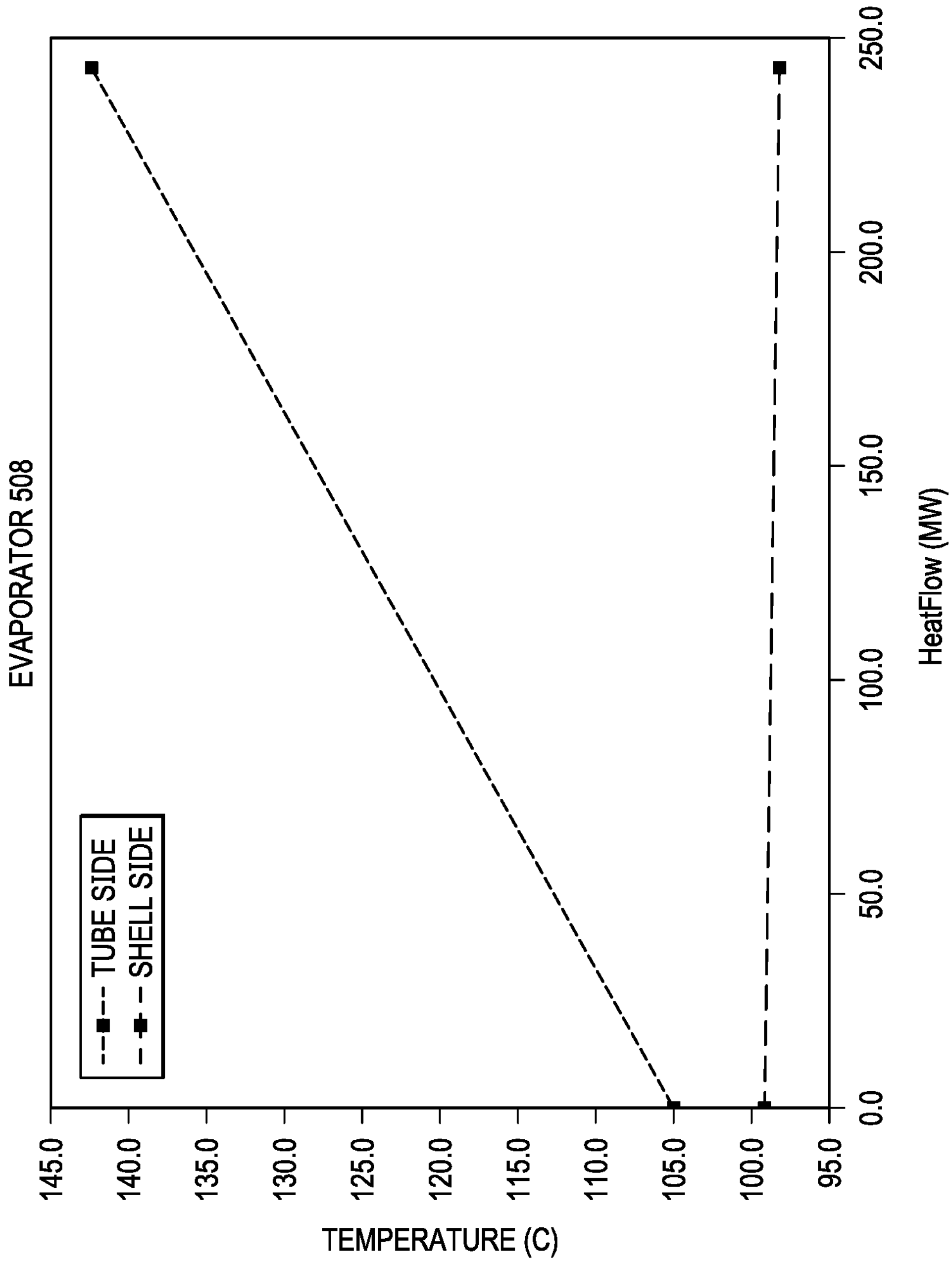
FIG. 5Q is a graph that shows a tube side fluid temperature and a shell side fluid temperature in the evaporator during an operation of the system of FIG. 5A.

FIG. 5Q is a graph that shows a tube side fluid temperature (for example, a heating fluid flow) and a shell side fluid temperature (for example, an ORC working fluid flow) in the evaporator 508 during an operation of the system 500. This graph shows a temperature difference between the fluids on the y-axis relative to a heat flow between the fluids on the x-axis. For example, as shown in this figure, as the temperature difference between the fluids increases, a heat flow between the fluids can increase. For example, as shown in FIG. 5Q, as the tube-side fluid (for example, the hot oil or water in the heating fluid circuit 503) is circulated through the evaporator 508, heat is transferred from that fluid to the shell-side fluid (for example, the ORC working fluid). Thus, the tube-side fluid enters the evaporator 508 at about 142° C. and leaves the evaporator 508 at about 105° C. The shell-side fluid enters the evaporator 508, from the pre-heater 506, at about 99° C. (for example, as a liquid or mixed phase fluid) and leaves the evaporator 508 also at about 99° C. (for example, as a vapor with some superheating).

Figure 6A:
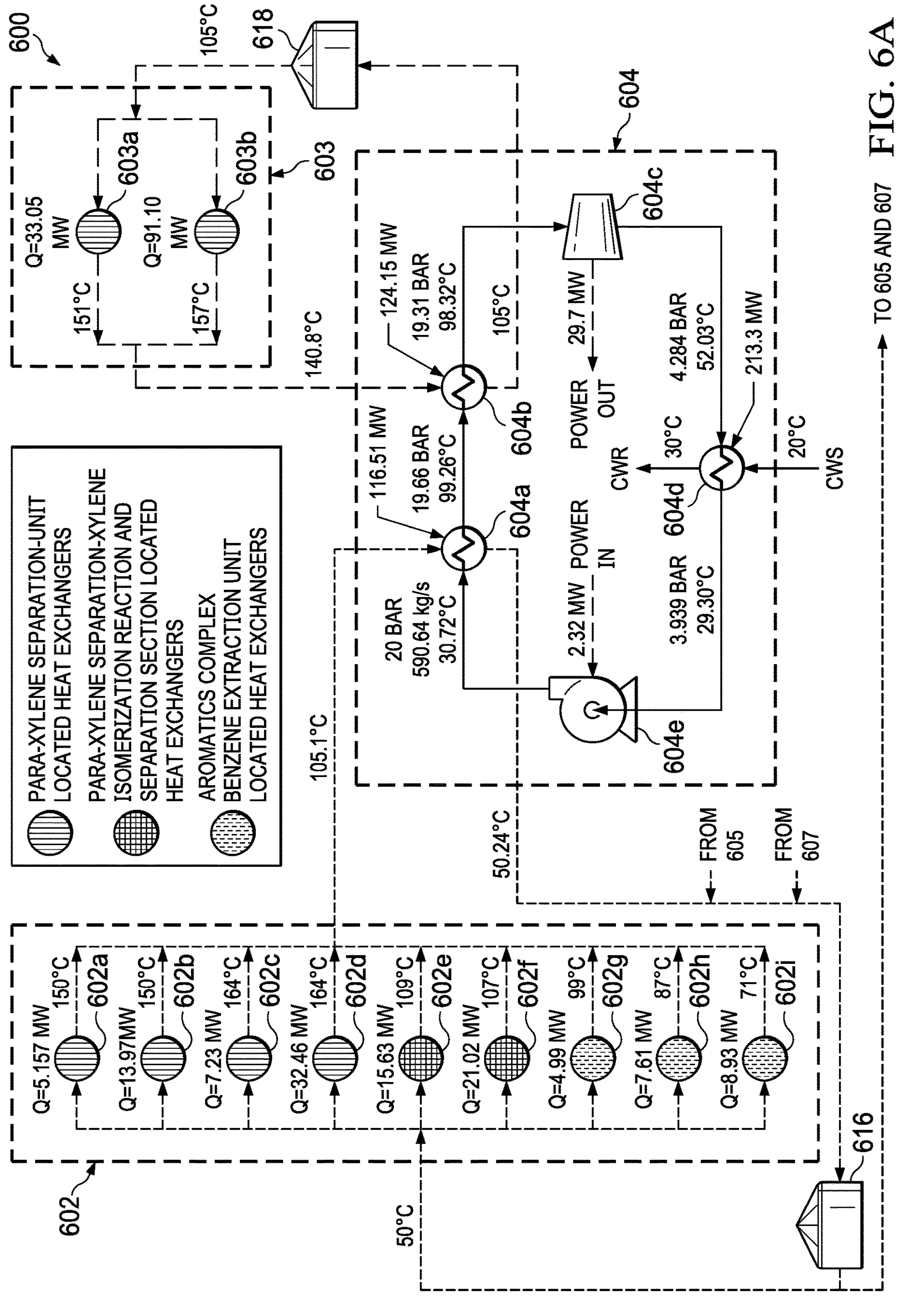
FIG. 6A is a schematic diagram of a portion of an example network to recover waste heat from eleven heat sources distributed across two heating fluid circuits.
Figure 6B:
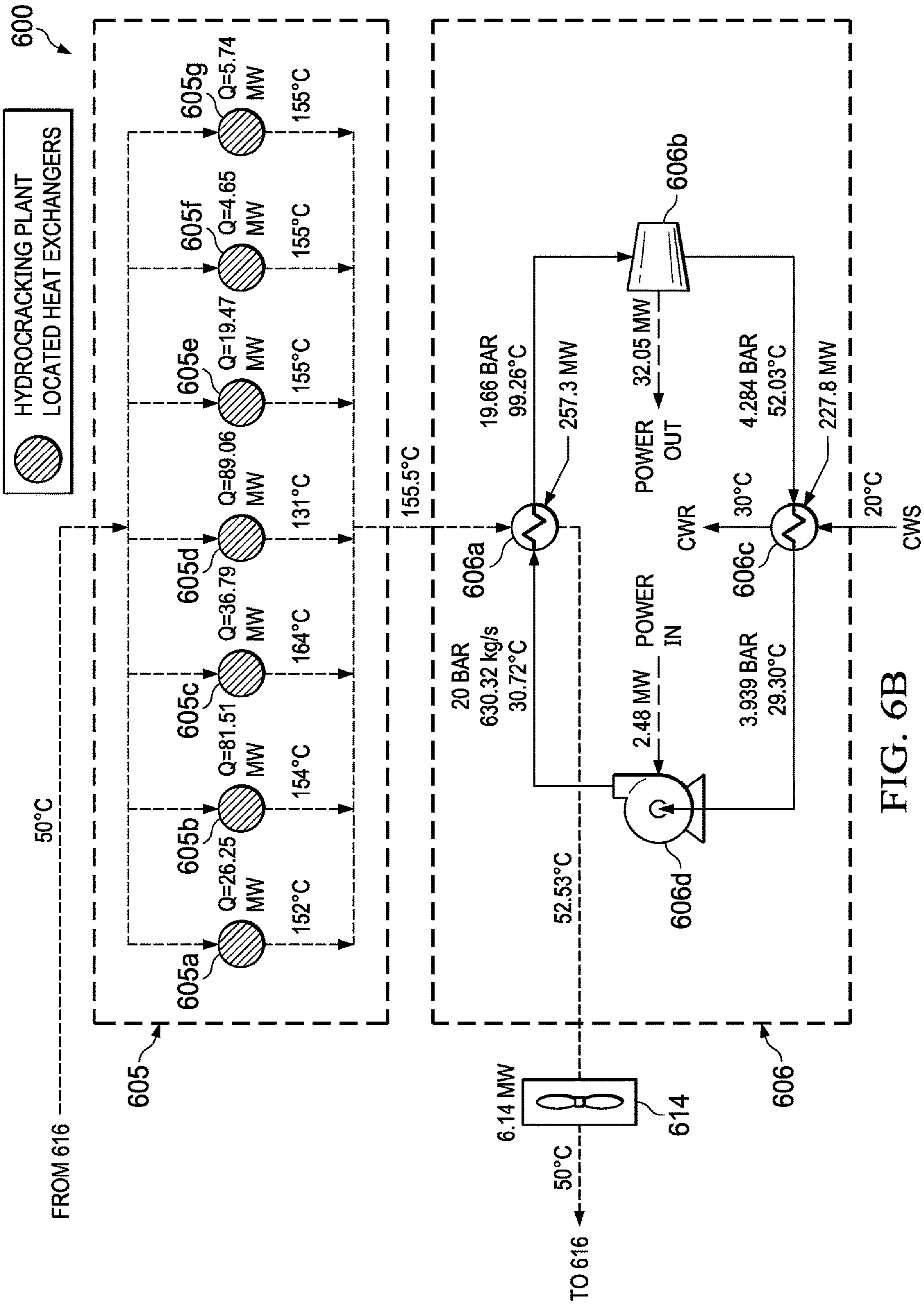
FIG. 6B is a schematic diagram of a portion of the example network to recover waste heat from seven heat sources in a heating fluid circuit.
Figure 6C:
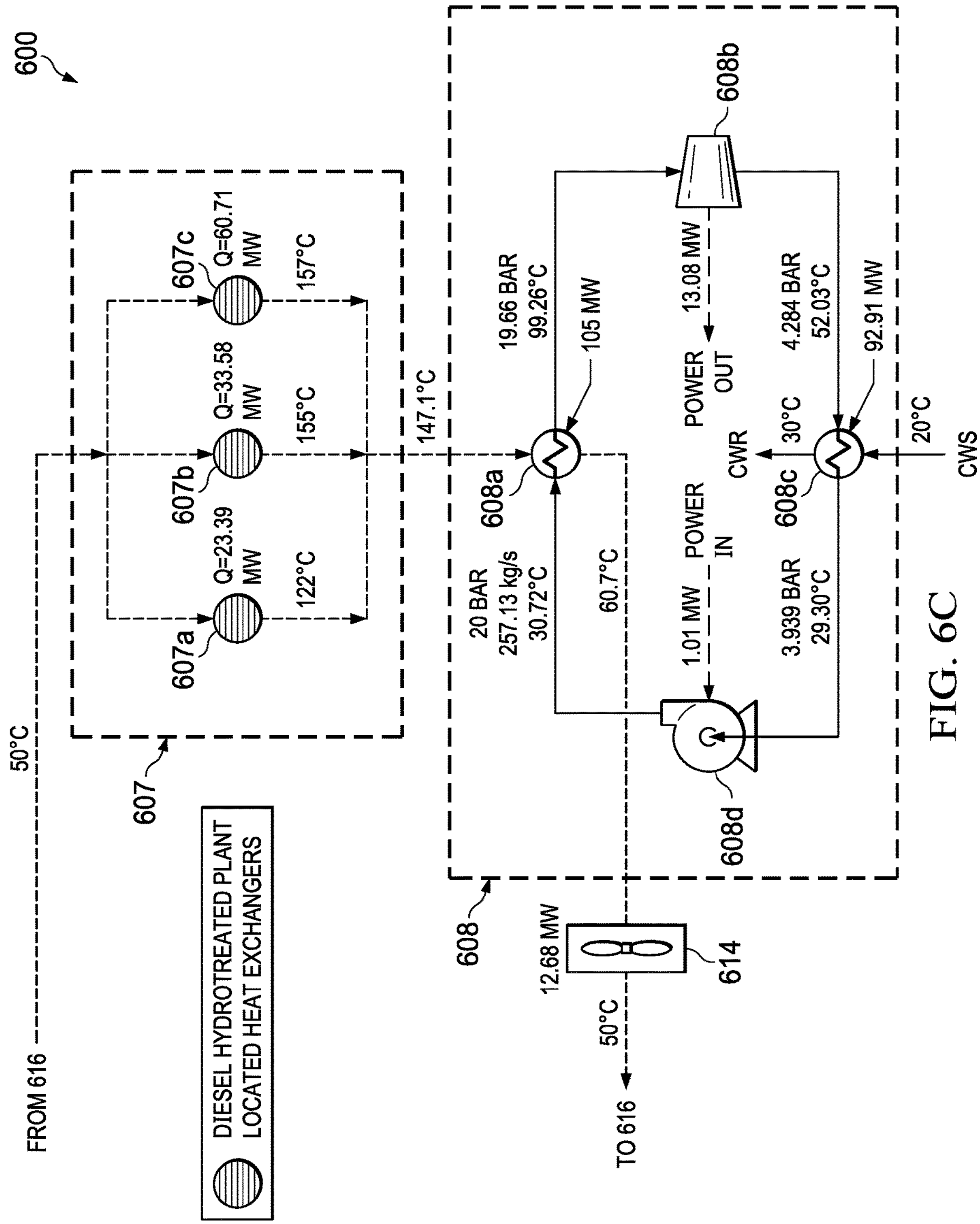
FIG. 6C is a schematic diagram of a portion of the example network to recover waste heat from three heat sources in a heating fluid circuit.

FIG. 6A is a schematic diagram of a portion of an example network to recover waste heat from eleven heat sources distributed across two heating fluid circuits. FIG. 6B is a schematic diagram of a portion of the example network to recover waste heat from seven heat sources in a heating fluid circuit. FIG. 6C is a schematic diagram of a portion of the example network to recover waste heat from three heat sources in a heating fluid circuit. FIGS. 6D-6M are schematic diagrams of heat sources in an aromatics plant. FIGS. 6N-6P are schematic diagrams of heat sources in a hydrocracking plant. FIGS. 6Q and 6R are schematic diagrams of heat sources in a diesel hydro-treating plant.

FIG. 6A is a schematic diagram of a portion of an example network 600 to recover waste heat from eleven heat sources distributed across two heating fluid circuits. In some implementations, the network can include a first heating fluid circuit 602 coupled to multiple heat sources. For example, the multiple heat sources can include nine heat exchangers (a first heat exchanger 602*a*, a second heat exchanger 602*b*, a third heat exchanger 602*c*, a fourth heat exchanger 602*d*, a fifth heat exchanger 602*e*, a sixth heat exchanger 602*f*, a seventh heat exchanger 602*g*, an eighth heat exchanger 602*h*, and a ninth heat exchanger 602*i*). All the heat exchangers in the first heating fluid circuit 602 can be coupled to an aromatics plant, specifically, to one of an extract column, a purification column overhead section, a Raffinate column overhead section, a heavy reformate splitter, a para-Xylene reaction section or a de-heptanizer of the aromatics plant. The nine heat sources in the first heating fluid circuit 602 can be connected in parallel.

The network can include a second heating fluid circuit 603 coupled to multiple heat sources. For example, the multiple heat sources can include two heat exchangers (a first heat exchanger 603*a* and a second heat exchanger 603*b*). Both the heat exchangers in the second heating fluid circuit 603 can be coupled to the aromatics plant. Both heat sources in the second heating fluid circuit 603 can be connected in parallel.

The portion of the example network can include a first power generation system 604 that includes an organic Rankine cycle (ORC). The ORC can include a working fluid that is thermally coupled to the first heating fluid circuit 602 and the second heating fluid circuit 603 to heat the working fluid. In some implementations, the working fluid can be isobutane. The ORC can include a gas expander 604*c* configured to generate electrical power from the heated working fluid. As shown in FIG. 6A, the ORC can additionally include an evaporator 604*b*, a pump 604*e*, a condenser 604*d* and a pre-heater 604*a*. In some implementations, the working fluid can be thermally coupled to 603 the first heating fluid circuit 602 in the pre-heater 604*a*, and to the second heating fluid in the evaporator 604*b*.

FIG. 6B is a schematic diagram of a portion of the example network 600 to recover waste heat from seven heat sources. In some implementations, the network can include a third heating fluid circuit 605 coupled to multiple heat sources. For example, the multiple heat sources can include seven heat exchangers (a first heat exchanger 605*a*, a second heat exchanger 605*b*, a third heat exchanger 605*c*, a fourth heat exchanger 605*d*, a fifth heat exchanger 605*e*, a sixth heat exchanger 605*f*, and a seventh heat exchanger 605*g*). All the heat exchangers in the third heating fluid circuit 605 can be coupled to a hydrocracking plant. The seven heat sources in the third heating fluid circuit 605 can be connected in parallel.

The portion of the example network can include a second power generation system 606 that includes an organic Rankine cycle (ORC). The ORC can include a working fluid that is thermally coupled to the third heating fluid circuit 605 to heat the working fluid. In some implementations, the working fluid can be isobutane. The ORC can include a gas expander 606*b* configured to generate electrical power from the heated working fluid. As shown in FIG. 6B, the ORC can additionally include an evaporator 606*a*, a pump 606*d* and a condenser 606*c*. In some implementations, the working fluid can be thermally coupled to the third heating fluid circuit 605 in the evaporator 606*a*. As further shown in FIG. 6B, an air cooler 614 cools the heat recovery circuit 605 exiting the evaporator 606*a* before the heating fluid in the circuit 605 is circulated to the heating fluid tank 616.

FIG. 6C is a schematic diagram of a portion of the example network 600 to recover waste heat from three heat sources. In some implementations, the network can include a fourth heating fluid circuit 607 coupled to multiple heat sources. For example, the multiple heat sources can include three heat exchangers (a first heat exchanger 607*a*, a second heat exchanger 607*b* and a third heat exchanger 607*c*). All the heat exchangers in the fourth heating fluid circuit 607 can be coupled to a diesel hydro-treating plant. The three heat sources in the fourth heating fluid circuit 607 can be connected in parallel.

The portion of the example network can include a third power generation system 608 that includes an organic Rankine cycle (ORC). The ORC can include a working fluid that is thermally coupled to the fourth heating fluid circuit 607 to heat the working fluid. In some implementations, the working fluid can be isobutane. The ORC can include a gas expander 608*b* configured to generate electrical power from the heated working fluid. As shown in FIG. 6C, the ORC can additionally include an evaporator 608*a*, a pump 608*d* and a condenser 608*c*. In some implementations, the working fluid can be thermally coupled to the fourth heating fluid circuit 607 in the evaporator 608*a*. As further shown in FIG. 6C, an air cooler 614 cools the heat recovery circuit 607 exiting the evaporator 608*a* before the heating fluid in the circuit 607 is circulated to the heating fluid tank 616.

In operation, a heating fluid (for example, water, oil, or other fluid) is circulated through each heating fluid circuit. For example, a portion of the heating fluid is circulated through the nine heat exchangers in the first heating fluid circuit 602. An inlet temperature of the heating fluid that is circulated into the inlets of each of the nine heat sources in the first heating fluid circuit 602 is the same or substantially the same subject to any temperature variations that may result as the heating fluid flows through respective inlets. Each heat exchanger in the first heating fluid circuit 602 heats the heating fluid to a temperature that is greater than the inlet temperature. The heated heating fluids from the nine heat exchangers in the first heating fluid circuit 602 are combined and flowed through the pre-heater 604*a* of the ORC of the first power generation system 604. The heating fluid flowed through the pre-heater 604*a* is then collected in a heating fluid tank 616 and can be pumped back through the nine heat exchangers in the first heating fluid circuit 602 to restart the waste heat recovery cycle using the first heating fluid circuit 602.

Similarly, for example, a portion of the heating fluid is circulated through the two heat exchangers in the second heating fluid circuit 603. An inlet temperature of the heating fluid that is circulated into the inlets of each of the heat sources in the second heating fluid circuit 603 is the same or substantially the same subject to any temperature variations that may result as the heating fluid flows through respective inlets. Each heat exchanger in the second heating fluid circuit 603 heats the heating fluid to a temperature that is greater than the inlet temperature. The heated heating fluids from both heat exchangers in the second heating fluid circuit 603 are combined and flowed through the evaporator 604*b* of the ORC of the first power generation system 604. The heating fluid flowed through the evaporator 604*b* is then collected in a heating fluid tank 618 and can be pumped back through the two heat exchangers in the second heating fluid circuit 603 to restart the waste heat recovery cycle using the second heating fluid circuit 603.

Similarly, for example, a portion of the heating fluid is circulated through the seven heat exchangers in the third heating fluid circuit 605. An inlet temperature of the heating fluid that is circulated into the inlets of each of the heat sources in the third heating fluid circuit 605 is the same or substantially the same subject to any temperature variations that may result as the heating fluid flows through respective inlets. Each heat exchanger in the third heating fluid circuit 605 heats the heating fluid to a temperature that is greater than the inlet temperature. The heated heating fluids from the seven heat exchangers in the third heating fluid circuit 605 are combined and flowed through the evaporator 606*a* of the ORC of the second power generation system 606. The heating fluid flowed through the evaporator 606*a* is then collected in the heating fluid tank 616 and can be pumped back through the seven heat exchangers in the third heating fluid circuit 605 to restart the waste heat recovery cycle using the third heating fluid circuit 605.

Similarly, for example, a portion of the heating fluid is circulated through the three heat exchangers in the fourth heating fluid circuit 607. An inlet temperature of the heating fluid that is circulated into the inlets of each of the heat sources in the fourth heating fluid circuit 607 is the same or substantially the same subject to any temperature variations that may result as the heating fluid flows through respective inlets. Each heat exchanger in the fourth heating fluid circuit 607 heats the heating fluid to a temperature that is greater than the inlet temperature. The heated heating fluids from the three heat exchangers in the fourth heating fluid circuit 607 are combined and flowed through the evaporator 608*a* of the ORC of the third power generation system 608. The heating fluid flowed through the evaporator 608*a* is then collected in the heating fluid tank 616 and can be pumped back through the three heat exchangers in the fourth heating fluid circuit 607 to restart the waste heat recovery cycle using the fourth heating fluid circuit 607.

In the manner described earlier, the heating fluid can be looped through the 21 heat exchangers distributed across the four heating fluid circuits to recover heat that would otherwise go to waste in the diesel hydro-treating plant, the hydrocracking plant and the aromatics plant, and to use the recovered waste heat to operate three power generation systems. By doing so, an amount of energy needed to operate the three power generation systems can be decreased while obtaining the same or substantially similar power output from the three power generation systems. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

The heating fluids received from the nine heat exchangers in the first heating circuit are mixed in the main header resulting in a heating fluid at a temperature of about 605° C. The heated heating fluid from the first heating fluid circuit 602 is circulated through the pre-heater 604*a* of the ORC of the first power generation system 604. The heating fluids received from the two heat exchangers in the second heating circuit are mixed in the main header resulting in a heating fluid at a temperature of about 141° C. The heated heating fluid from the second heating fluid circuit 603 is circulated through the evaporator 604*b* of the ORC of the first power generation system 604. In some implementations, the pre-heater 604*a* and the evaporator 604*b* increase the temperature of the working fluid (for example, isobutane or other working fluid) from about 31° C. at about 20 bar to about 98° C. at about 20 bar at a thermal duty of about 117 MW and 124 MW, respectively. The gas expander 604*c* expands the high temperature, high pressure working fluid to generate power, for example, about 30 MW, at an efficiency of about 85%. The expansion decreases the temperature and pressure of the working fluid, for example, to about 52° C. and about 4.3 bar, respectively. The working fluid flows through the condenser 604*d* which further decreases the temperature and pressure of the working fluid at a thermal duty of about 213 MW. For example, cooling fluid flows through the condenser 604*d* at a lower temperature, for example, about 20° C., exchanges heat with the working fluid, and exits the condenser 604*d* at a higher temperature, for example, about 30° C. The cooled working fluid (for example, isobutane liquid) is pumped by the pump 604*e* at an efficiency, for example, of about 75%, and an input power, for example, of about 2 MW. The pump 604*e* increases the temperature of the working fluid to about 31° C. and pumps the working fluid at a mass flow rate of about 591 kg/s to the pre-heater 604*a*, which repeats the Rankine cycle to generate power.

Figure 6D:
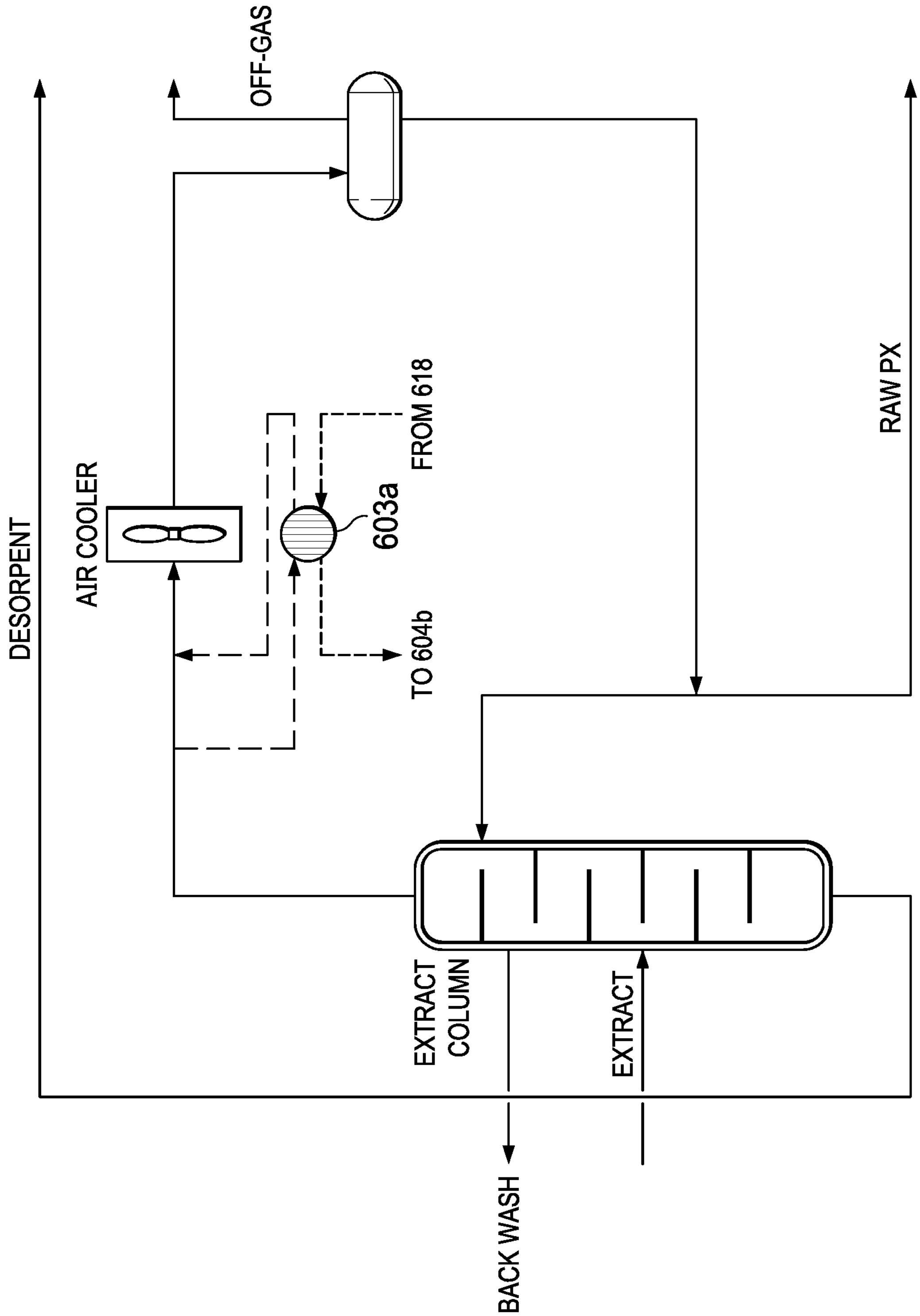
FIGS. 6D-6M are schematic diagrams of heat sources in an aromatics plant.

FIGS. 6D-6M are schematic diagrams of heat sources in an aromatics plant. FIG. 6D shows the first heat exchanger 603*a* in the second heating fluid circuit 603 in the aromatics plant of the petrochemical refining system. A stream from an extract column overhead and the heating fluid flow through the first heat exchanger 603*a* simultaneously. The first heat exchanger 603*a* cools down the stream from a higher temperature, for example, about 156° C., to a lower temperature, for example, about 133° C., and increases the temperature of the heating fluid from a lower temperature, for example, about 605° C., to a higher temperature, for example, about 151° C. The thermal duty of the first heat exchanger 603*a* to implement the heat exchange is about 33 MW. The heating fluid at about 151° C. that exits the first heat exchanger 603*a* is circulated to a main heater to be mixed with the heated heating fluid from the other heat exchanger in the second heating fluid circuit 603.

Figure 6E:
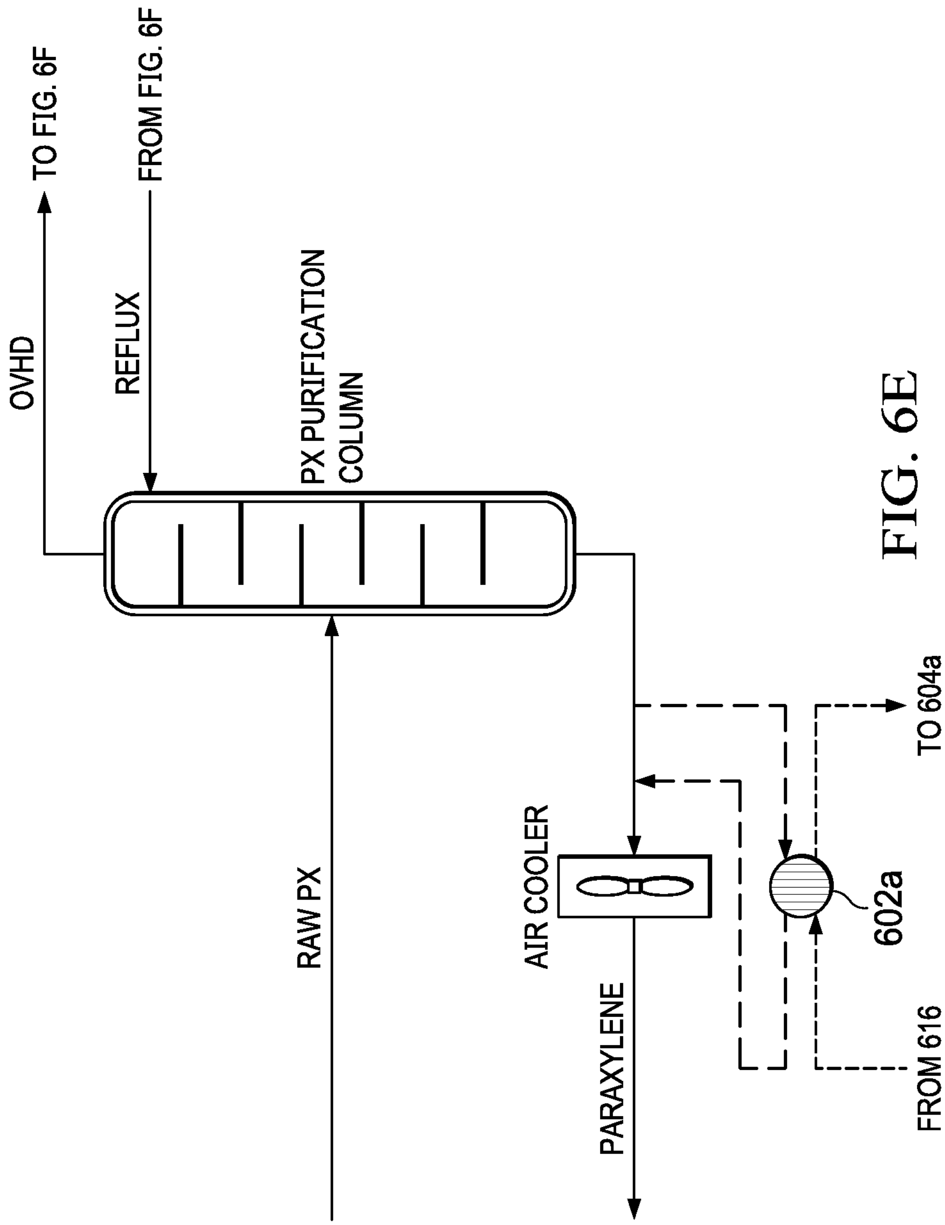

FIG. 6E shows the first heat exchanger 602*a* in the first heating fluid circuit 602 in the aromatics plant of the petrochemical refining system. The aromatics plant can include a para-Xylene separation plant. A stream from a para-Xylene purification column bottom product and the heating fluid flow through the first heat exchanger 602*a* simultaneously. The first heat exchanger 602*a* cools down the stream from a higher temperature, for example, about 155° C., to a lower temperature, for example, about 60° C., and increases the temperature of the heating fluid from a lower temperature, for example, about 50° C., to a higher temperature, for example, about 150° C. The thermal duty of the first heat exchanger 602*a* to implement the heat exchange is about 5 MW. The heating fluid at about 150° C. that exits the first heat exchanger 602*a* is circulated to a main heater to be mixed with the heated heating fluids from the eight other heat exchangers in the first heating fluid circuit 602.

Figure 6F:
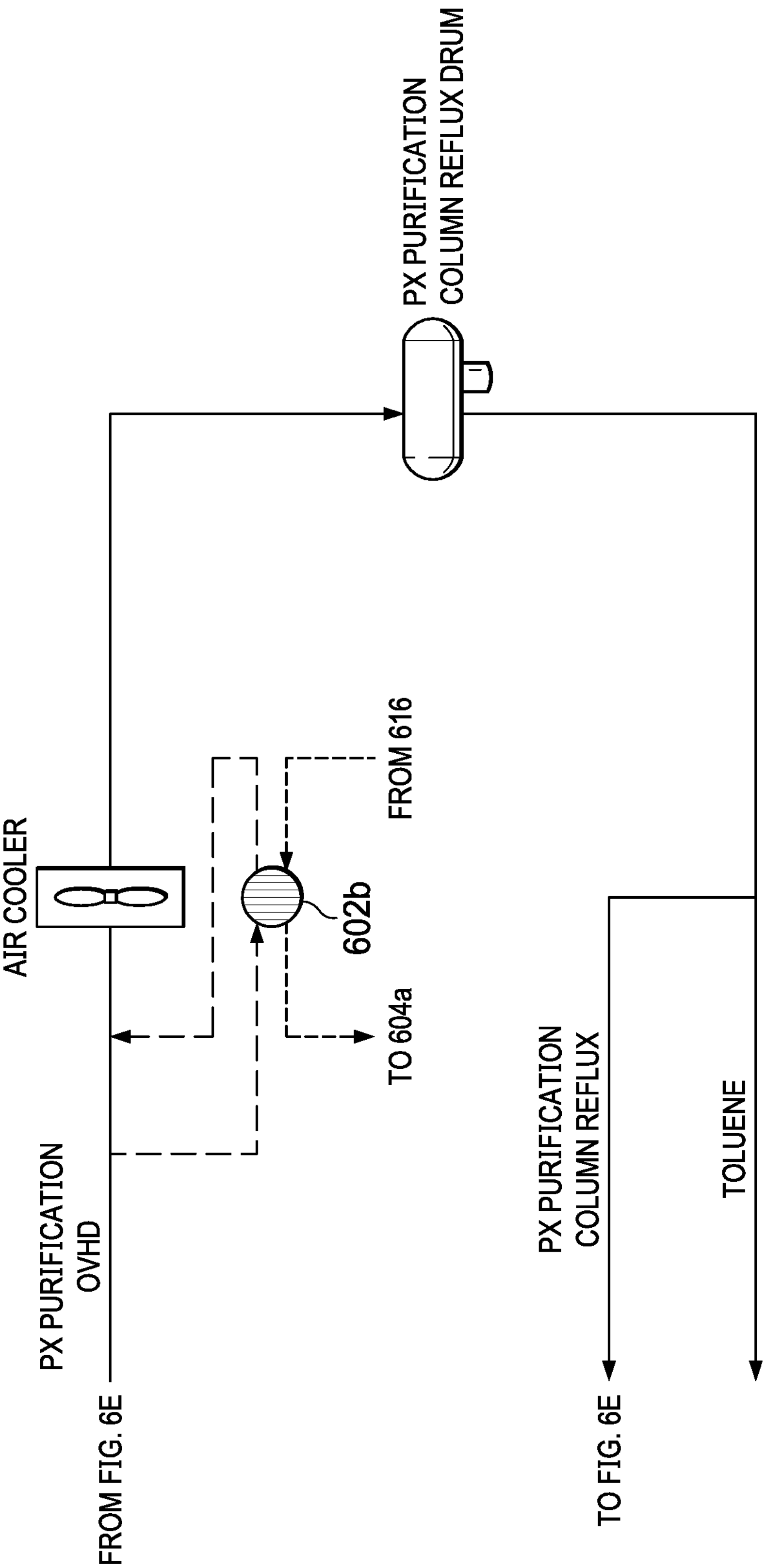

FIG. 6F shows the second heat exchanger 602*b* in the first heating fluid circuit 602 in the aromatics plant of the petrochemical refining system. The aromatics plant can include a para-Xylene separation plant. A stream from a para-Xylene purification column overhead and the heating fluid flow through the second heat exchanger 602*b* simultaneously. The second heat exchanger 602*b* cools down the stream from a higher temperature, for example, about 127° C., to a lower temperature, for example, about 84° C., and increases the temperature of the heating fluid from a lower temperature, for example, about 50° C., to a higher temperature, for example, about 122° C. The thermal duty of the second heat exchanger 602*b* to implement the heat exchange is about 14 MW. The heating fluid at about 122° C. that exits the second heat exchanger 602*b* is circulated to a main heater to be mixed with the heated heating fluids from the eight other heat exchangers in the first heating fluid circuit 602.

Figure 6G:
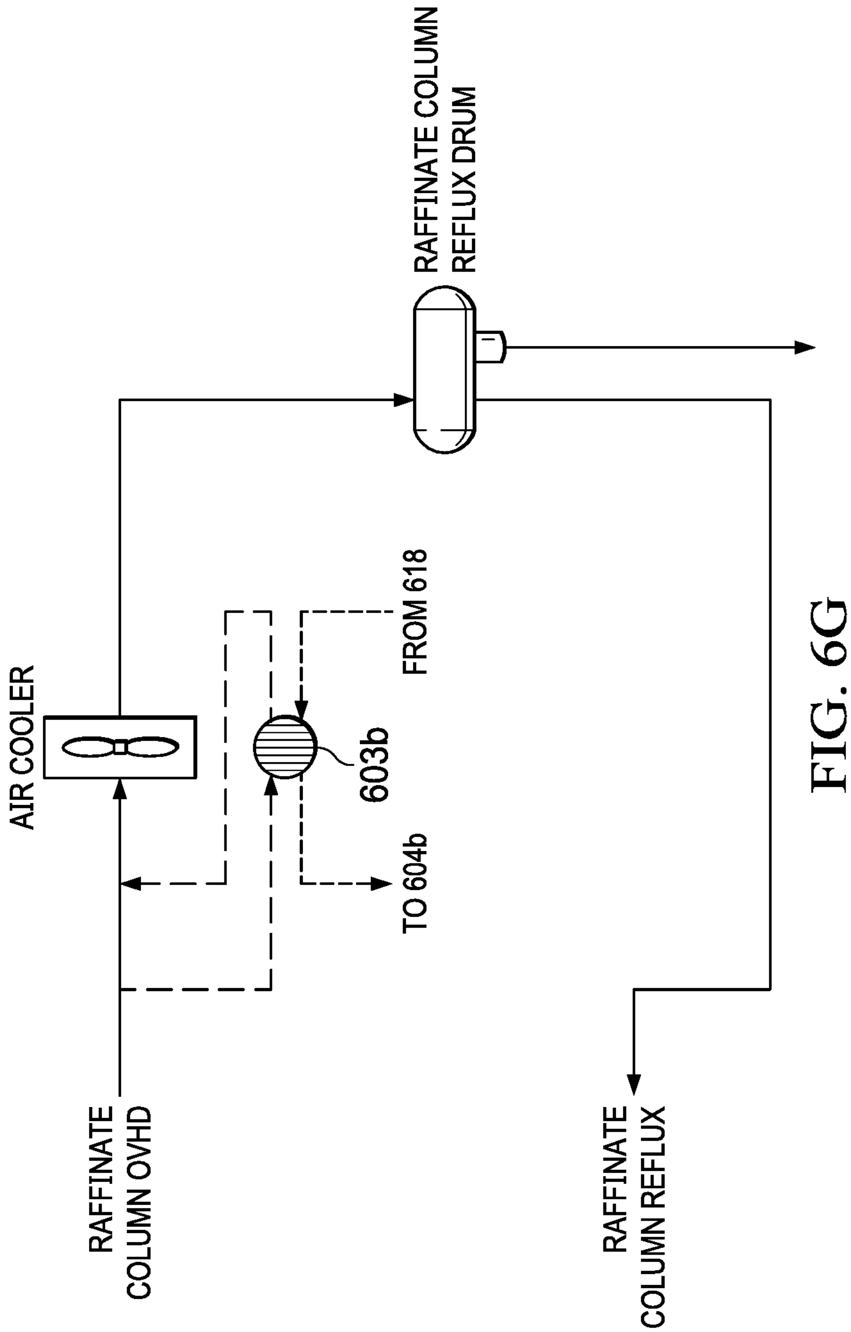

FIG. 6G shows the second heat exchanger 603*b* in the second heating fluid circuit 603 in the aromatics plant of the petrochemical refining system. The aromatics plant can include a para-Xylene separation plant. A stream from a Raffinate column overhead and the heating fluid flow through the second heat exchanger 603*b* simultaneously. The second heat exchanger 603*b* cools down the stream from a higher temperature, for example, about 162° C., to a lower temperature, for example, about 130° C., and increases the temperature of the heating fluid from a lower temperature, for example, about 605° C., to a higher temperature, for example, about 157° C. The thermal duty of the second heat exchanger 603*b* to implement the heat exchange is about 91 MW. The heating fluid at about 157° C. that exits the second heat exchanger 603*b* is circulated to a main heater to be mixed with the heated heating fluid from the other heat exchanger in the second heating fluid circuit 603.

Figure 6H:
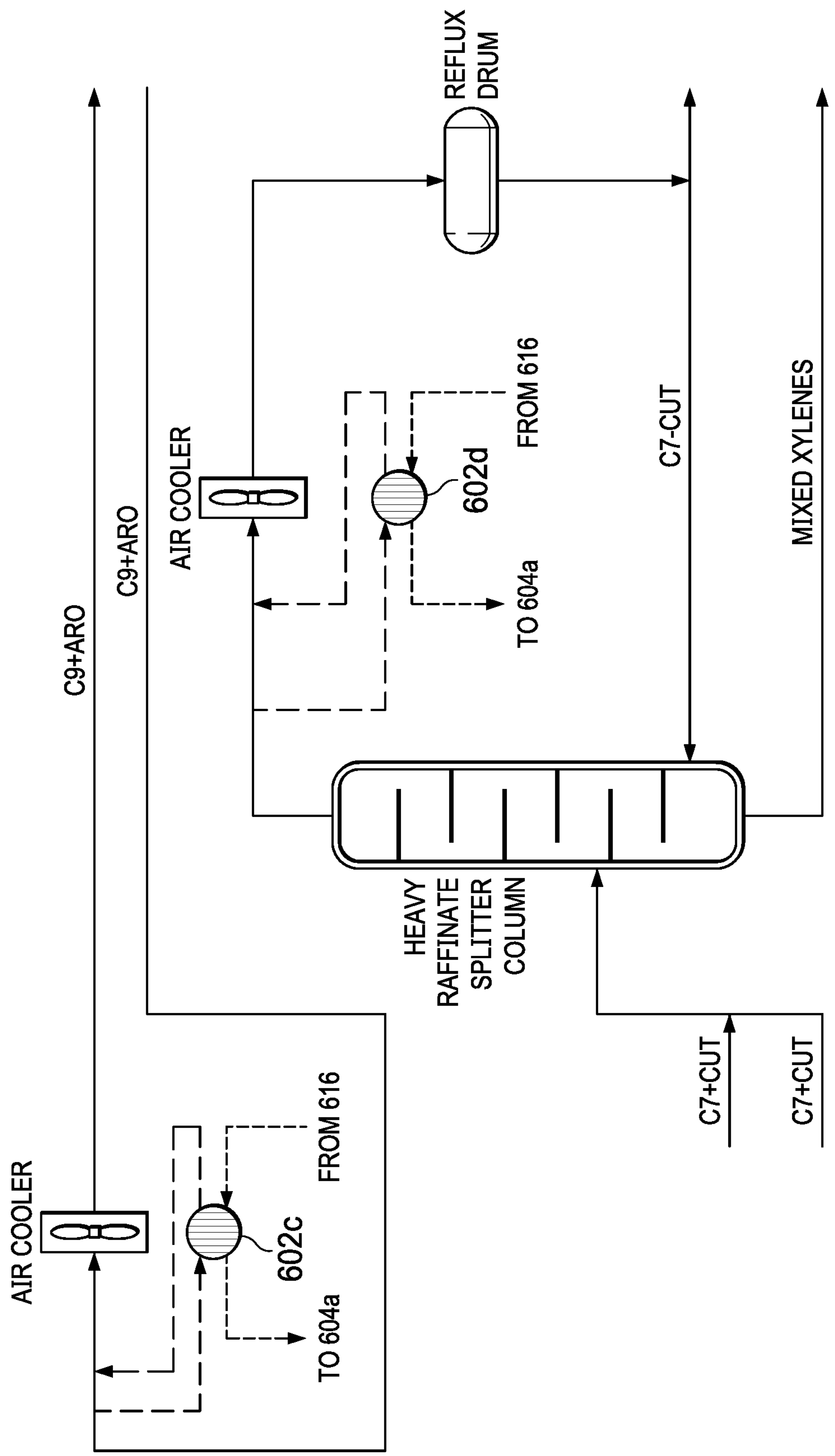

FIG. 6H shows the third heat exchanger 602*c* in the first heating fluid circuit 602 in the aromatics plant of the petrochemical refining system. The aromatics plant can include a C9+ aromatics unit. A stream from a C9+ aromatics unit and the heating fluid flow through the third heat exchanger 602*c* simultaneously. The third heat exchanger 602*c* cools down the stream from a higher temperature, for example, about 169° C., to a lower temperature, for example, about 60° C., and increases the temperature of the heating fluid from a lower temperature, for example, about 50° C., to a higher temperature, for example, about 164° C. The thermal duty of the third heat exchanger 602*c* to implement the heat exchange is about 7 MW. The heating fluid at about 164° C. that exits the third heat exchanger 602*c* is circulated to a main heater to be mixed with the heated heating fluids from the eight other heat exchangers in the first heating fluid circuit 602.

FIG. 6H also shows the fourth heat exchanger 602*d* in the first heating fluid circuit 602 in the aromatics plant of the petrochemical refining system. The aromatics plant can include a heavy Raffinate column splitter. A stream from a heavy Raffinate splitter column overhead and the heating fluid flow through the fourth heat exchanger 602*d* simultaneously. The fourth heat exchanger 602*d* cools down the stream from a higher temperature, for example, about 126° C., to a lower temperature, for example, about 113° C., and increases the temperature of the heating fluid from a lower temperature, for example, about 50° C., to a higher temperature, for example, about 121° C. The thermal duty of the fourth heat exchanger 602*d* to implement the heat exchange is about 32 MW. The heating fluid at about 121° C. that exits the fourth heat exchanger 602*d* is circulated to a main heater to be mixed with the heated heating fluids from the eight other heat exchangers in the first heating fluid circuit 602.

Figure 6I:
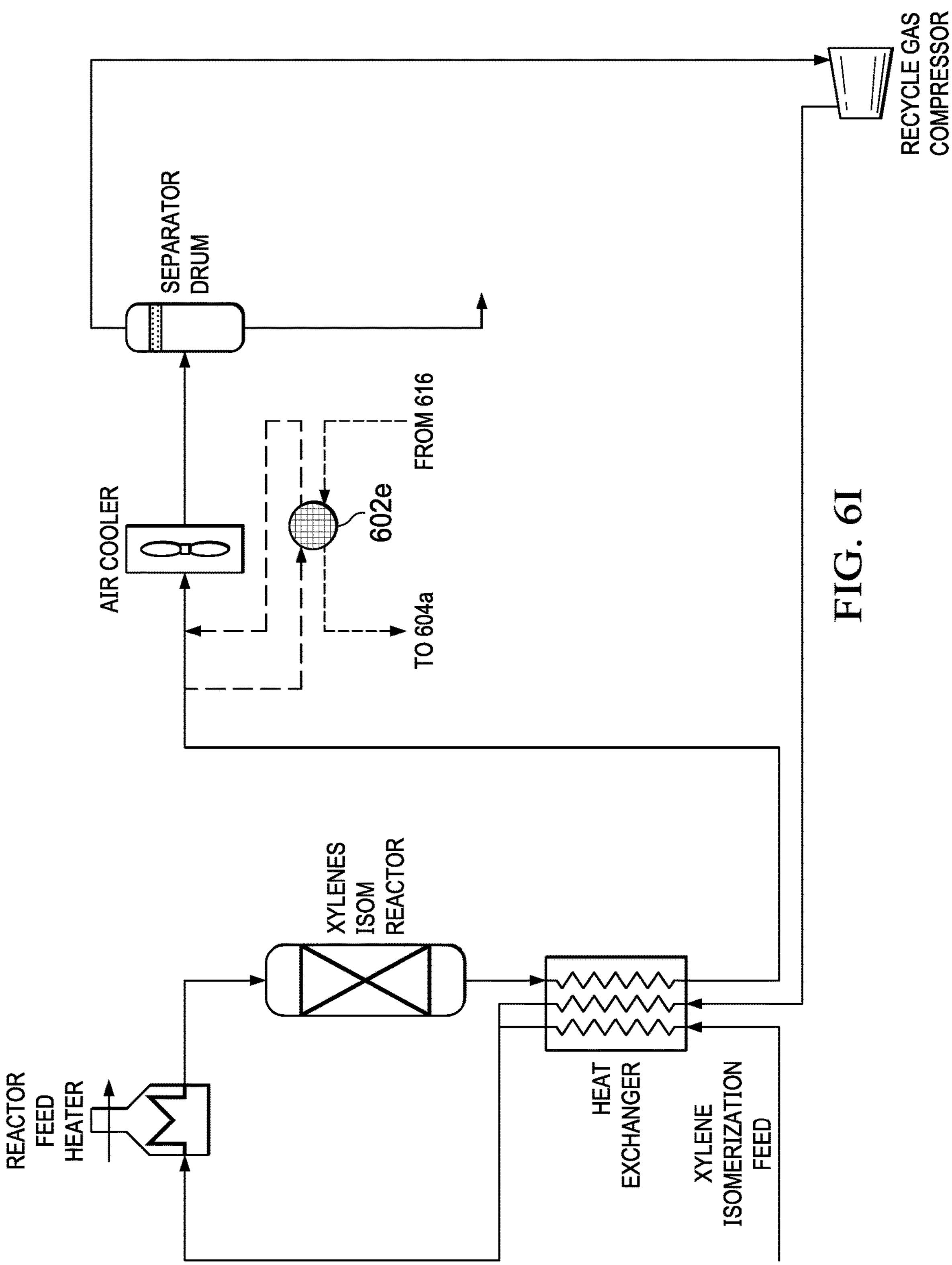

FIG. 6I shows the fifth heat exchanger 602*e* in the first heating fluid circuit 602 in the aromatics plant of the petrochemical refining system. The aromatics plant can include a Xylene isomerization reactor. A stream from a Xylene isomerization reactor outlet and the heating fluid flow through the fifth heat exchanger 602*e* simultaneously. The fifth heat exchanger 602*e* cools down the stream from a higher temperature, for example, about 114° C., to a lower temperature, for example, about 47° C., and increases the temperature of the heating fluid from a lower temperature, for example, about 50° C., to a higher temperature, for example, about 109° C. The thermal duty of the fifth heat exchanger 602*e* to implement the heat exchange is about 16 MW. The heating fluid at about 109° C. that exits the fifth heat exchanger 602*e* is circulated to a main heater to be mixed with the heated heating fluids from the eight other heat exchangers in the first heating fluid circuit 602.

Figure 6J:
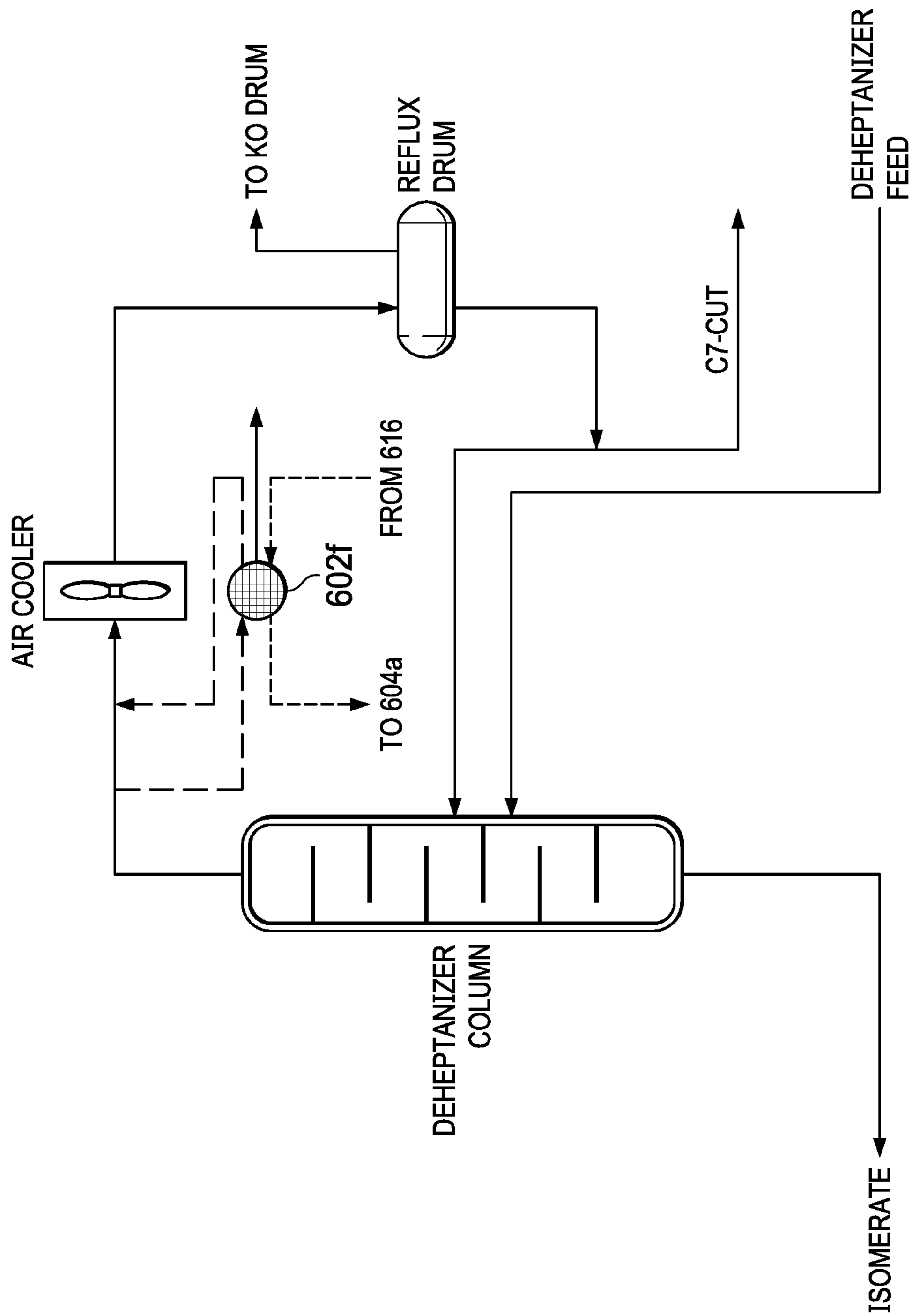

FIG. 6J shows the sixth heat exchanger 602*f* in the first heating fluid circuit 602 in the aromatics plant of the petrochemical refining system. The aromatics plant can include a Xylene isomerization de-heptanizer. A stream from a Xylene isomerization de-heptanizer column overhead and the heating fluid flow through the sixth heat exchanger 602*f* simultaneously. The sixth heat exchanger 602*f* cools down the stream from a higher temperature, for example, about 112° C., to a lower temperature, for example, about 59° C., and increases the temperature of the heating fluid from a lower temperature, for example, about 50° C., to a higher temperature, for example, about 607° C. The thermal duty of the sixth heat exchanger 602*f* to implement the heat exchange is about 21 MW. The heating fluid at about 607° C. that exits the sixth heat exchanger 602*f* is circulated to a main heater to be mixed with the heated heating fluids from the eight other heat exchangers in the first heating fluid circuit 602.

Figure 6K:
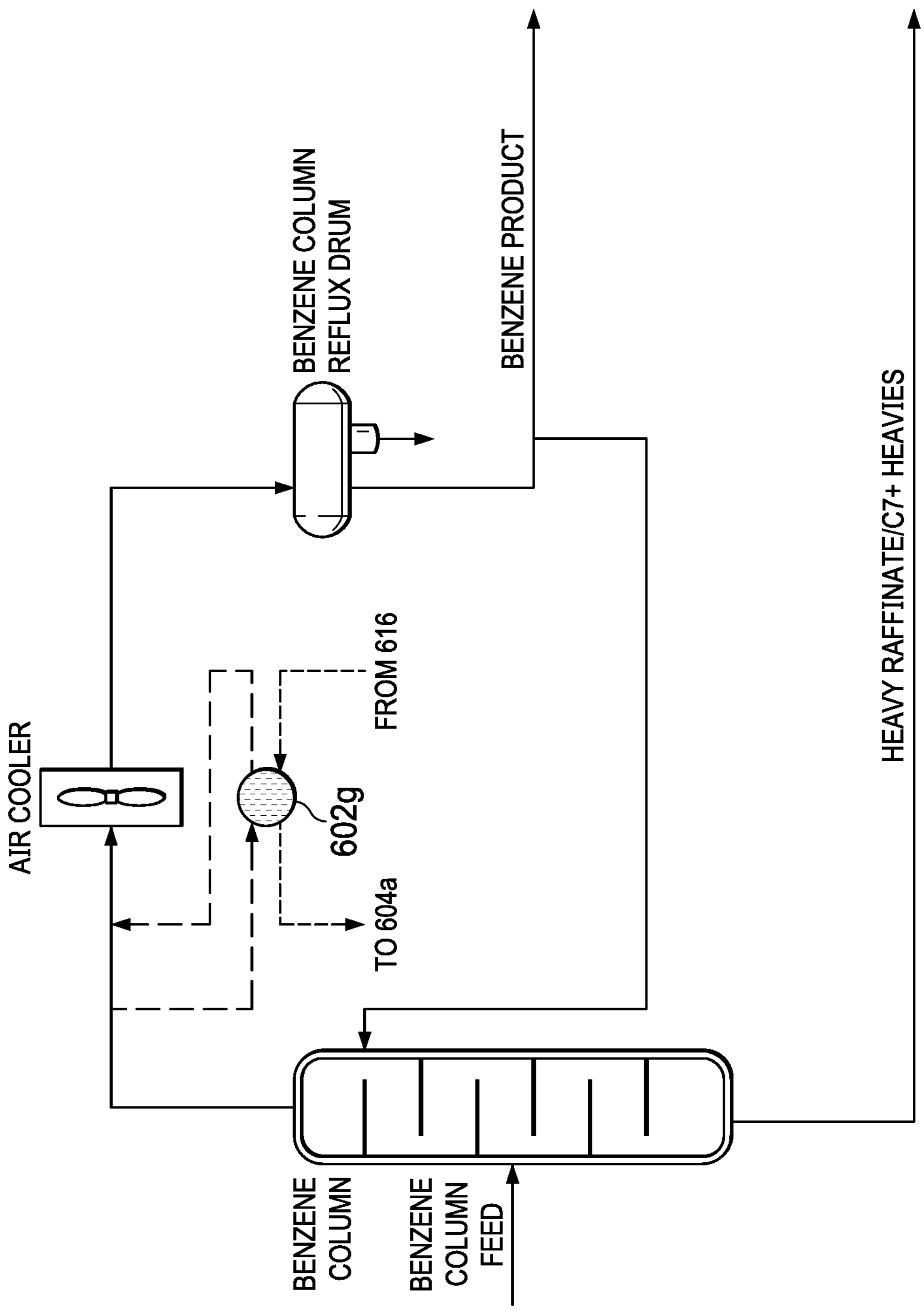

FIG. 6K shows the seventh heat exchanger 602*g* in the first heating fluid circuit 602 in the aromatics plant of the petrochemical refining system. The aromatics plant can include an aromatics benzene extraction unit. A stream from a benzene column overhead and the heating fluid flow through the seventh heat exchanger 602*g* simultaneously. The seventh heat exchanger 602*g* cools down the stream from a higher temperature, for example, about 604° C., to a lower temperature, for example, about 600° C., and increases the temperature of the heating fluid from a lower temperature, for example, about 50° C., to a higher temperature, for example, about 99° C. The thermal duty of the seventh heat exchanger 602*g* to implement the heat exchange is about 5 MW. The heating fluid at about 99° C. that exits the seventh heat exchanger 602*g* is circulated to a main heater to be mixed with the heated heating fluids from the eight other heat exchangers in the first heating fluid circuit 602.

Figure 6L:
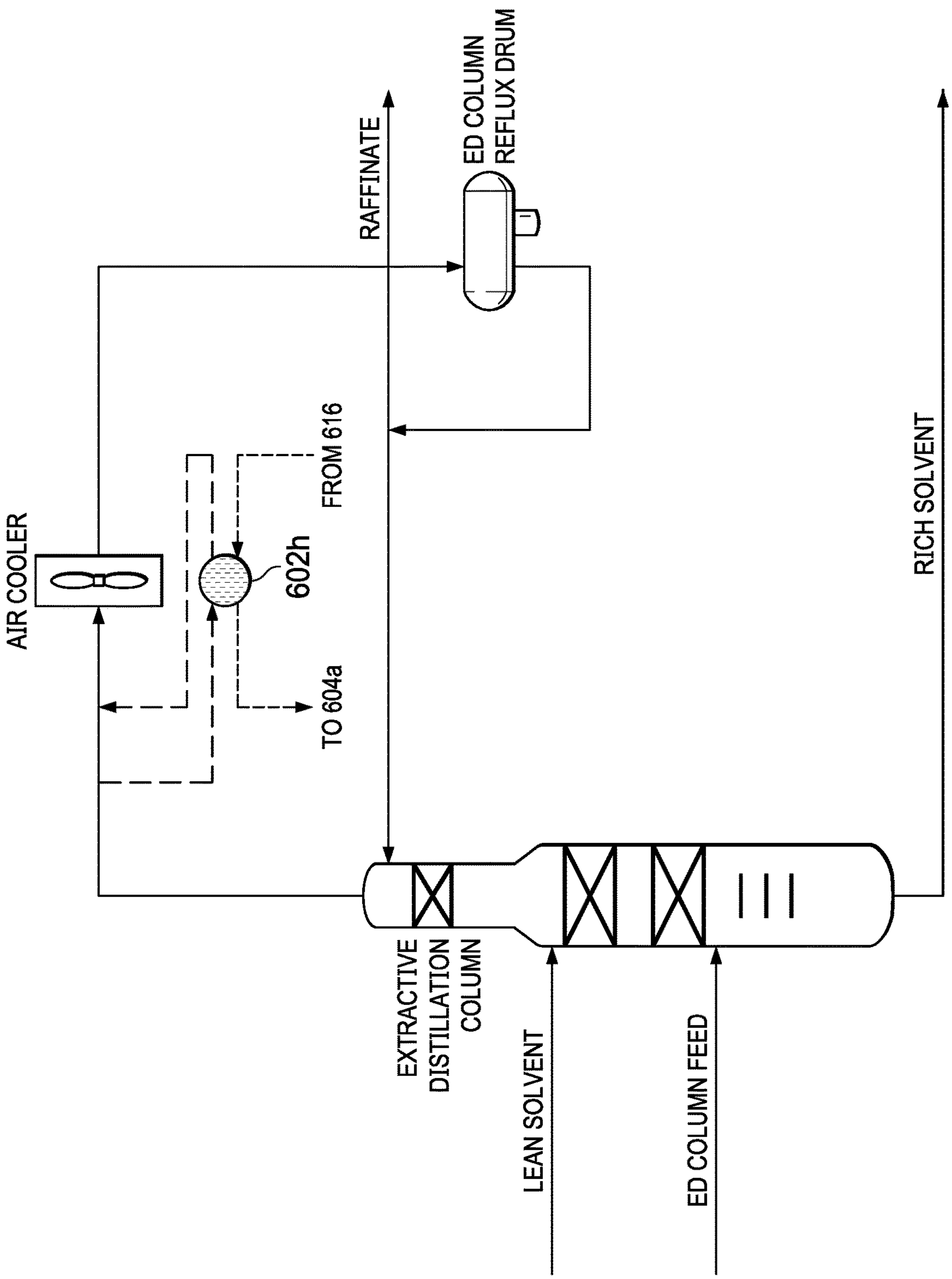

FIG. 6L shows the eighth heat exchanger 602*h* in the first heating fluid circuit 602 in the aromatics plant of the petrochemical refining system. The aromatics plant can include an aromatics complex extractive distillation column unit. A stream from an extractive distillation column overhead and the heating fluid flow through the eighth heat exchanger 602*h* simultaneously. The eighth heat exchanger 602*h* cools down the stream from a higher temperature, for example, about 92° C., to a lower temperature, for example, about 73° C., and increases the temperature of the heating fluid from a lower temperature, for example, about 50° C., to a higher temperature, for example, about 87° C. The thermal duty of the eighth heat exchanger 602*h* to implement the heat exchange is about 8 MW. The heating fluid at about 87° C. that exits the eighth heat exchanger 602*h* is circulated to a main heater to be mixed with the heated heating fluids from the eight other heat exchangers in the first heating fluid circuit 602.

Figure 6M:
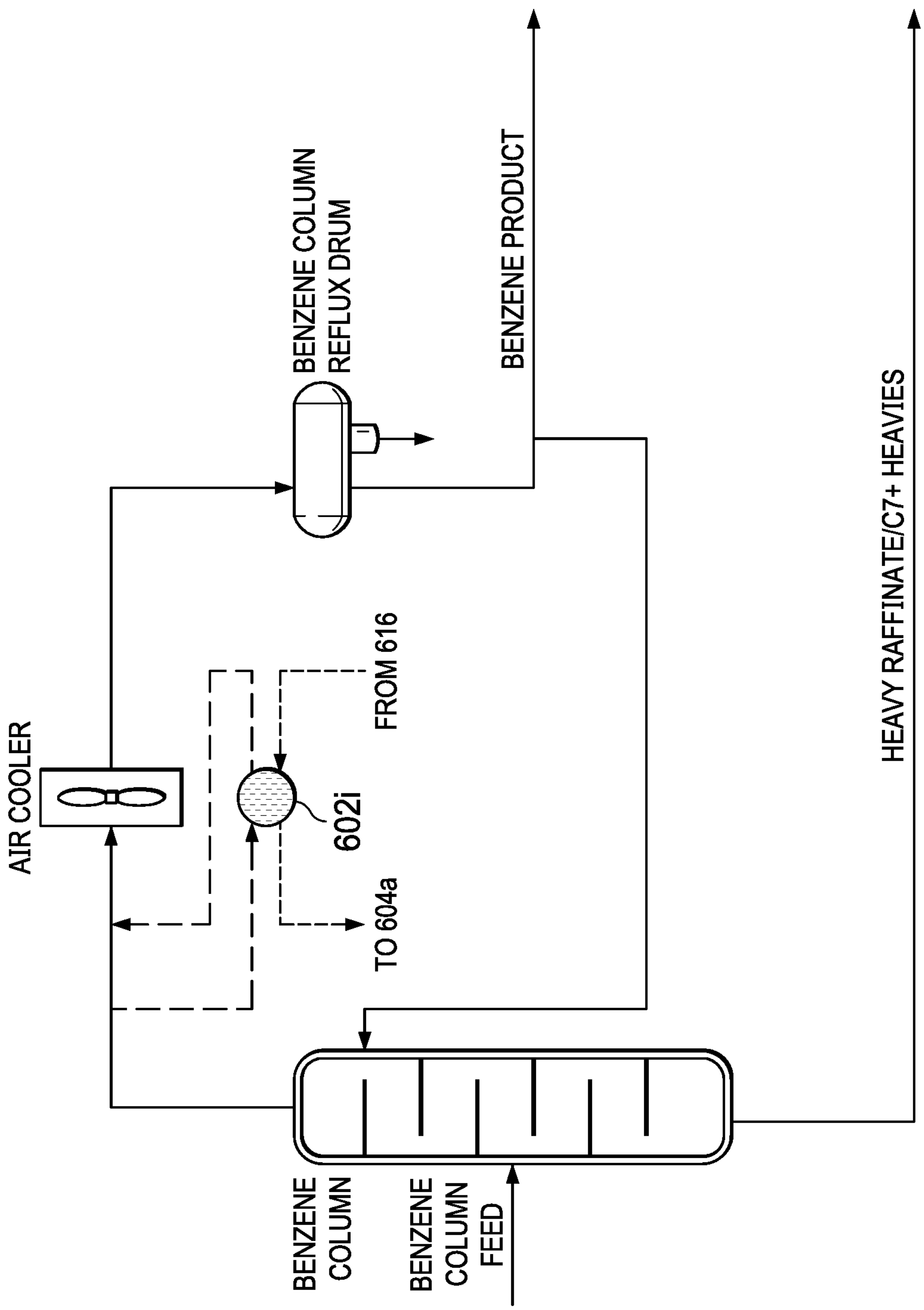
Figure 6N:
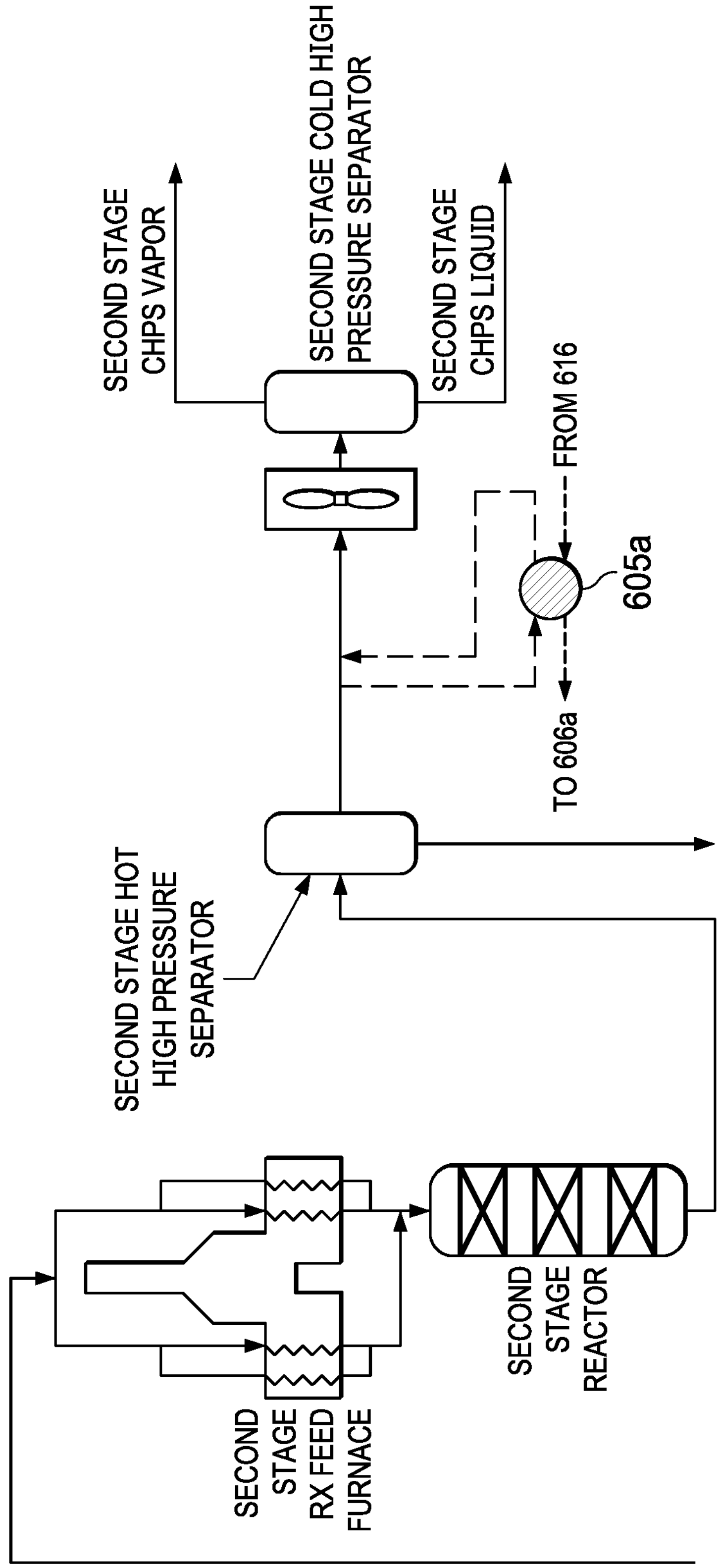
FIGS. 6N-6P are schematic diagrams of heat sources in a hydrocracking plant.
Figure 6O:
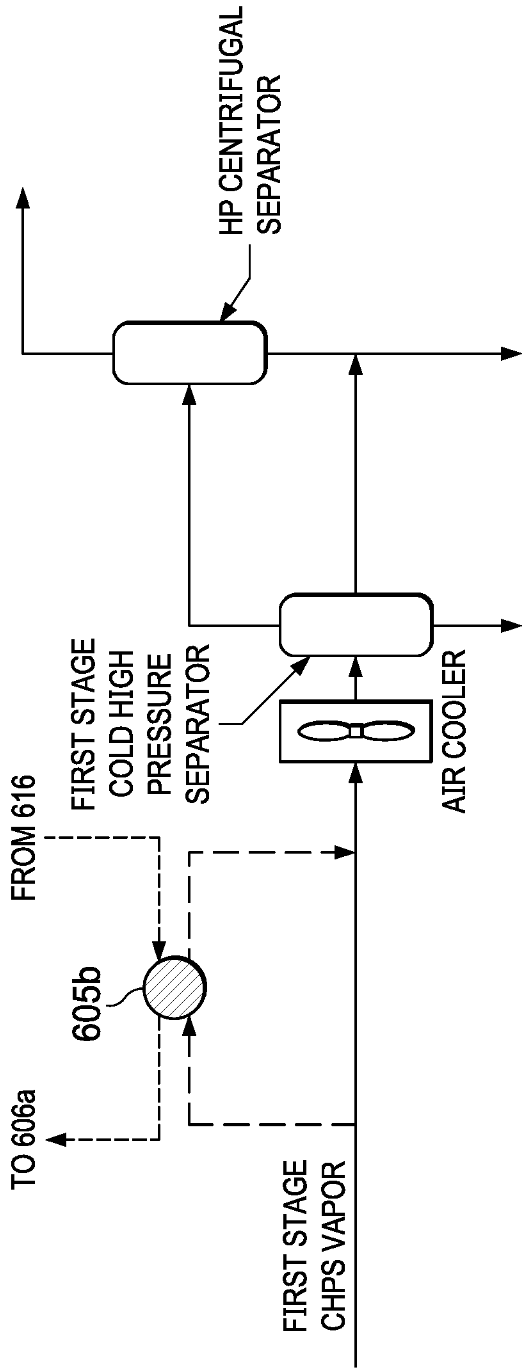
Figure 6P:
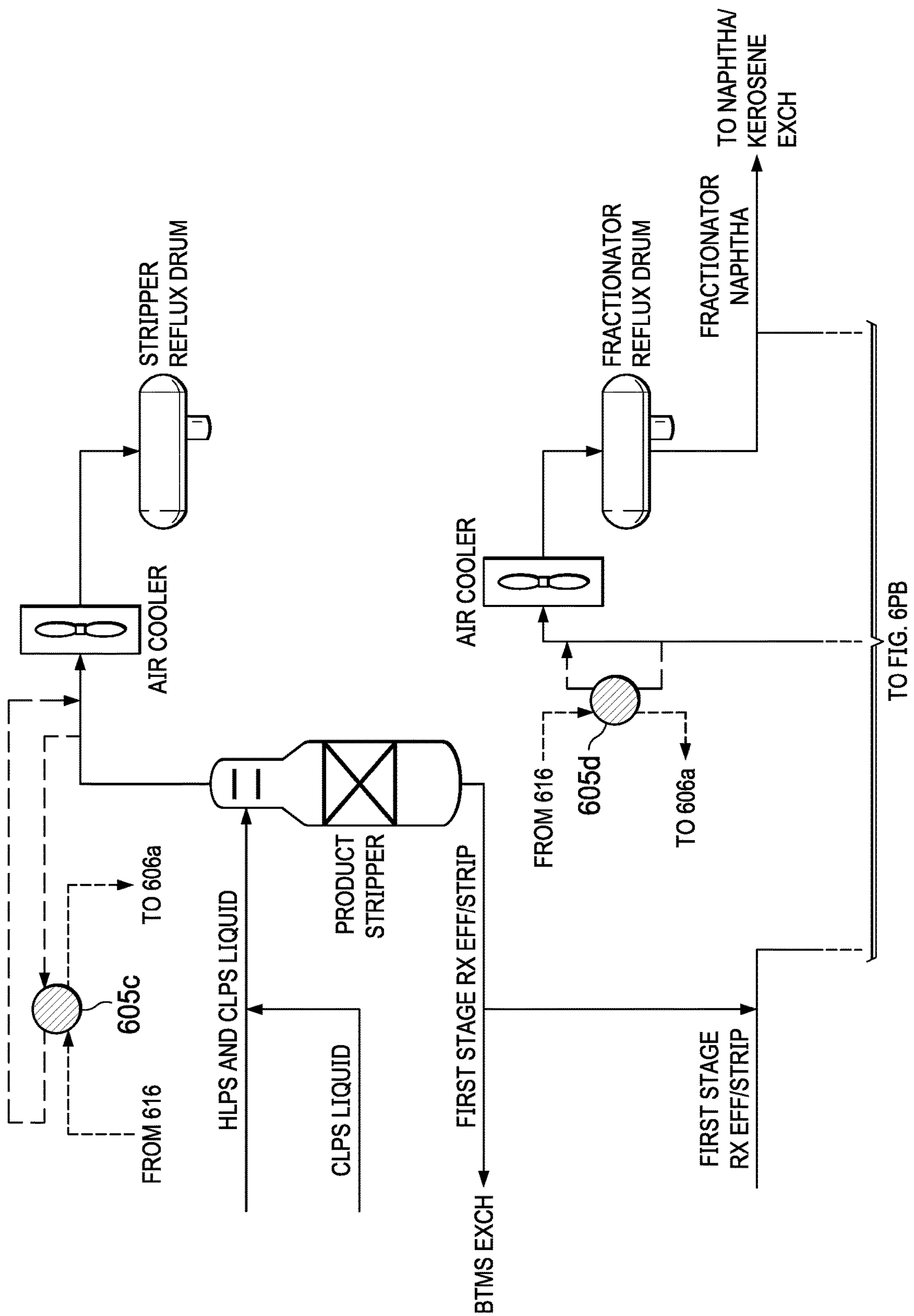
Figure 6P:
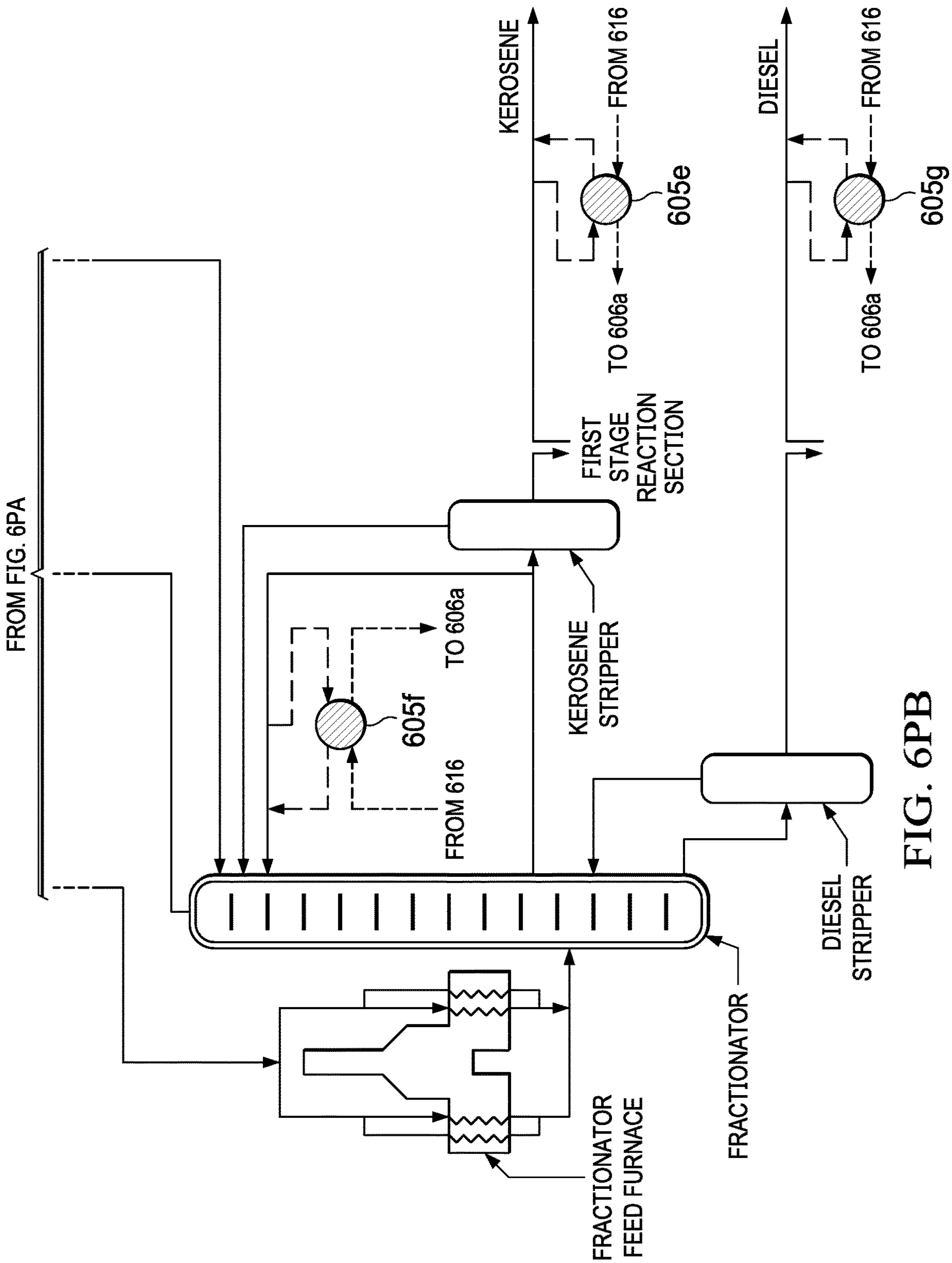
Figure 6Q:
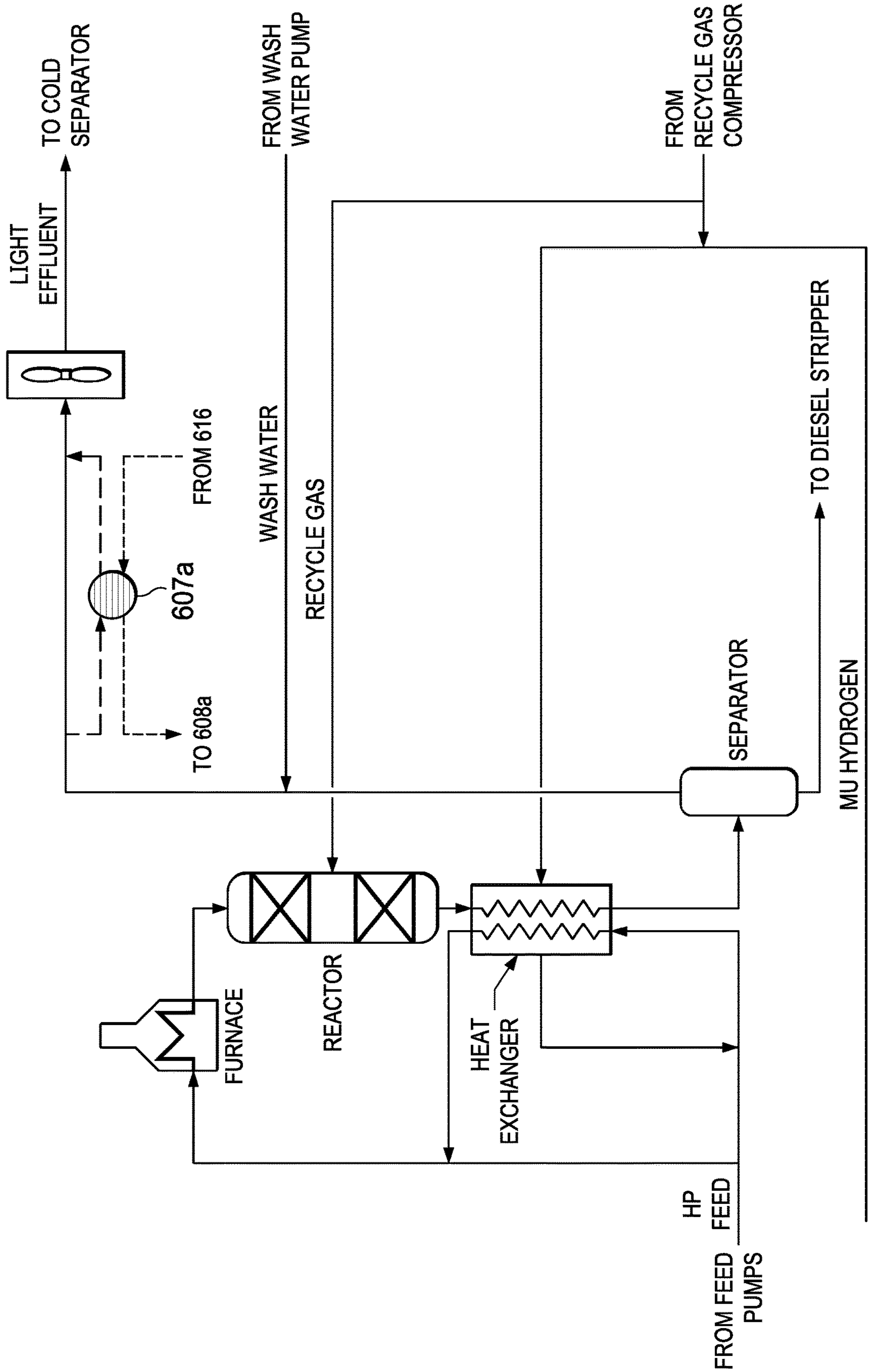
FIGS. 6Q and 6R are schematic diagrams of heat sources in a diesel hydro-treating plant.
Figure 6R:
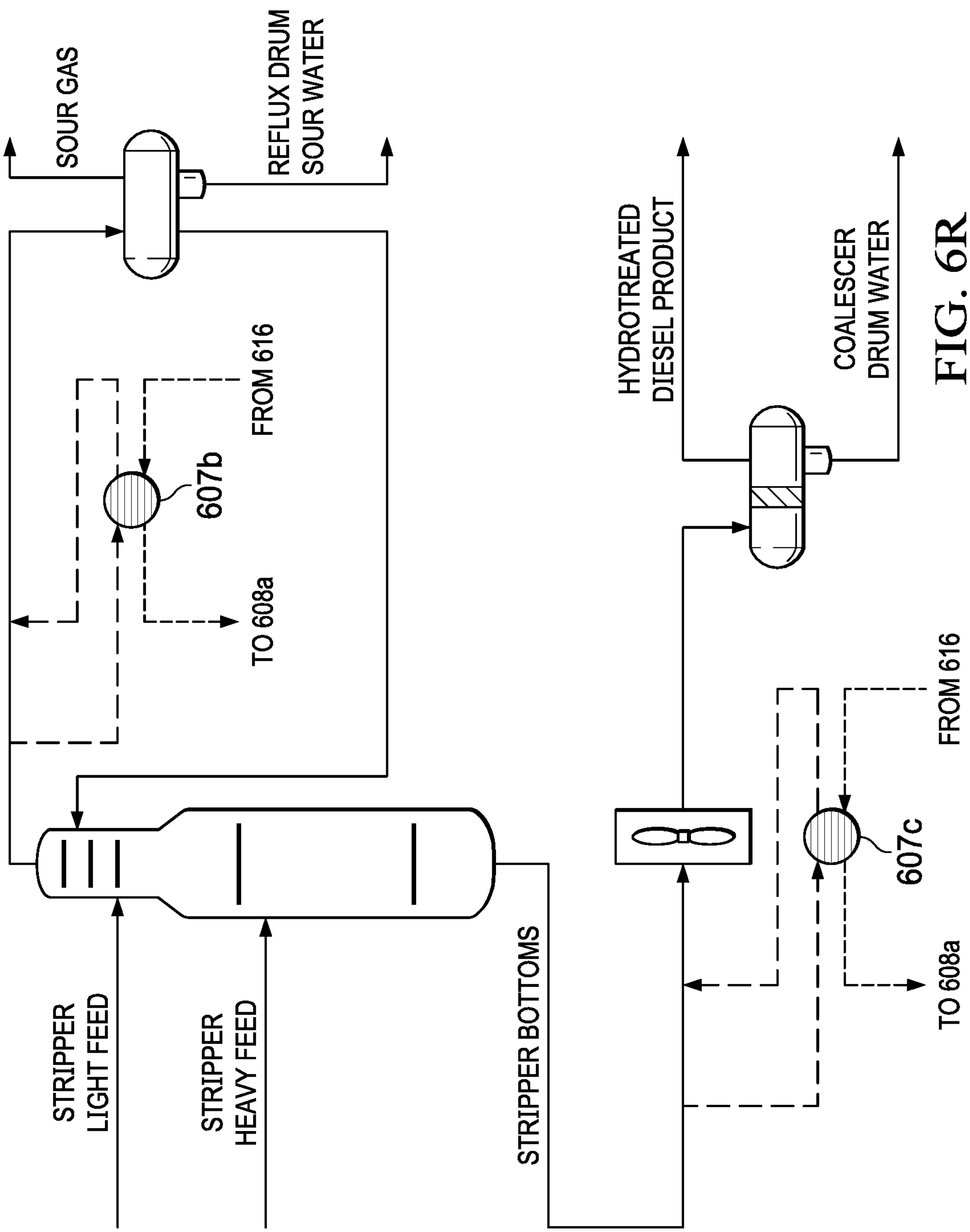

FIG. 6M shows the ninth heat exchanger 602*i* in the first heating fluid circuit 602 in the aromatics plant of the petrochemical refining system. The aromatics plant can include an aromatics complex Raffinate splitter. A stream from a Raffinate splitter overhead and the heating fluid flow through the ninth heat exchanger 602*i* simultaneously. The ninth heat exchanger 602*i* cools down the stream from a higher temperature, for example, about 76° C., to a lower temperature, for example, about 60° C., and increases the temperature of the heating fluid from a lower temperature, for example, about 50° C., to a higher temperature, for example, about 71° C. The thermal duty of the ninth heat exchanger 602*i* to implement the heat exchange is about 9 MW. The heating fluid at about 71° C. that exits the ninth heat exchanger 602*i* is circulated to a main heater to be mixed with the heated heating fluids from the eight other heat exchangers in the first heating fluid circuit 602.

The heating fluids received from the seven heat exchangers in the third heating circuit are mixed in the main header resulting in a heating fluid at a temperature of about 156° C. The heated heating fluid from the third heating fluid circuit 605 is circulated through the evaporator 606*a* of the ORC of the second power generation system 606. In some implementations, the evaporator 606*a* increase the temperature of the working fluid (for example, isobutane or other working fluid) from about 31° C. at about 20 bar to about 99° C. at about 20 bar at a thermal duty of about 257 MW. The gas expander 606*b* expands the high temperature, high pressure working fluid to generate power, for example, about 32 MW, at an efficiency of about 85%. The expansion decreases the temperature and pressure of the working fluid, for example, to about 52° C. and about 4.3 bar, respectively. The working fluid flows through the condenser 606*c* which further decreases the temperature and pressure of the working fluid at a thermal duty of about 228 MW. For example, cooling fluid flows through the condenser 606*c* at a lower temperature, for example, about 20° C., exchanges heat with the working fluid, and exits the condenser 606*c* at a higher temperature, for example, about 30° C. The cooled working fluid (for example, isobutane liquid) is pumped by the pump 606*d* at an efficiency, for example, of about 75%, and an input power, for example, of about 3 MW. The pump 606*d* increases the temperature of the working fluid to about 31° C. and pumps the working fluid at a mass flow rate of about 630 kg/s to the evaporator 606*a*, which repeats the Rankine cycle to generate power.

FIGS. 6N, 6O, and 6PA and 6PB (collectively, FIG. 6P) are schematic diagrams of heat sources in a hydrocracking plant. FIG. 6N shows the first heat exchanger 605*a* in the third heating fluid circuit 605 in the hydrocracking plant of the petrochemical refining system. A stream from a hydrocracking 2$^{nd}$ stage reaction section feed to 2$^{nd}$ stage cold high pressure separator and the heating fluid flow through the first heat exchanger 605*a* simultaneously. The first heat exchanger 605*a* cools down the stream from a higher temperature, for example, about 157° C., to a lower temperature, for example, about 60° C., and increases the temperature of the heating fluid from a lower temperature, for example, about 50° C., to a higher temperature, for example, about 152° C. The thermal duty of the first heat exchanger 605*a* to implement the heat exchange is about 26 MW. The heating fluid at about 152° C. that exits the first heat exchanger 605*a* is circulated to a main heater to be mixed with the heated heating fluid from the other heat exchangers in the third heating fluid circuit 605.

FIG. 6O shows the second heat exchanger 605*b* in the third heating fluid circuit 605 in the hydrocracking plant of the petrochemical refining system. A stream from a hydrocracking 1$^{st}$ stage reaction section feed to 1$^{st}$ stage cold high pressure separator and the heating fluid flow through the first heat exchanger 605*a* simultaneously. The second heat exchanger 605*b* cools down the stream from a higher temperature, for example, about 159° C., to a lower temperature, for example, about 60° C., and increases the temperature of the heating fluid from a lower temperature, for example, about 50° C., to a higher temperature, for example, about 154° C. The thermal duty of the second heat exchanger 605*b* to implement the heat exchange is about 82 MW. The heating fluid at about 154° C. that exits the second heat exchanger 605*b* is circulated to a main heater to be mixed with the heated heating fluid from the other heat exchangers in the third heating fluid circuit 605.

FIG. 6P shows the fifth heat exchanger 605*e* in the third heating fluid circuit 605 in the hydrocracking plant of the petrochemical refining system. A stream from a hydrocracking main fractionator kerosene product after steam generation and the heating fluid flow through the fifth heat exchanger 605*e* simultaneously. The fifth heat exchanger 605*e* cools down the stream from a higher temperature, for example, about 160° C., to a lower temperature, for example, about 60° C., and increases the temperature of the heating fluid from a lower temperature, for example, about 50° C., to a higher temperature, for example, about 155° C. The thermal duty of the fifth heat exchanger 605*e* to implement the heat exchange is about 20 MW. The heating fluid at about 155° C. that exits the fifth heat exchanger 605*e* is circulated to a main heater to be mixed with the heated heating fluid from the other heat exchangers in the third heating fluid circuit 605.

FIG. 6P also shows the seventh heat exchanger 605*g* in the third heating fluid circuit 605 in the hydrocracking plant of the petrochemical refining system. A stream from a hydrocracking main fractionator diesel product after steam generation and the heating fluid flow through the seventh heat exchanger 605*g* simultaneously. The seventh heat exchanger 605*g* cools down the stream from a higher temperature, for example, about 160° C., to a lower temperature, for example, about 121° C., and increases the temperature of the heating fluid from a lower temperature, for example, about 50° C., to a higher temperature, for example, about 155° C. The thermal duty of the seventh heat exchanger 605*g* to implement the heat exchange is about 6 MW. The heating fluid at about 155° C. that exits the seventh heat exchanger 605*g* is circulated to a main heater to be mixed with the heated heating fluid from the other heat exchangers in the third heating fluid circuit 605.

FIG. 6P additionally shows the third heat exchanger 605*c* in the third heating fluid circuit 605 in the hydrocracking plant of the petrochemical refining system. A stream from a hydrocracking product stripper overhead and the heating fluid flow through the third heat exchanger 605*c* simultaneously. The third heat exchanger 605*c* cools down the stream from a higher temperature, for example, about 169° C., to a lower temperature, for example, about 60° C., and increases the temperature of the heating fluid from a lower temperature, for example, about 50° C., to a higher temperature, for example, about 164° C. The thermal duty of the third heat exchanger 605*c* to implement the heat exchange is about 37 MW. The heating fluid at about 164° C. that exits the third heat exchanger 605*c* is circulated to a main heater to be mixed with the heated heating fluid from the other heat exchangers in the third heating fluid circuit 605.

FIG. 6P further shows the fourth heat exchanger 605*d* in the third heating fluid circuit 605 in the hydrocracking plant of the petrochemical refining system. A stream from a hydrocracking main fractionator overhead and the heating fluid flow through the fourth heat exchanger 605*d* simultaneously. The fourth heat exchanger 605*d* cools down the stream from a higher temperature, for example, about 136° C., to a lower temperature, for example, about 60° C., and increases the temperature of the heating fluid from a lower temperature, for example, about 50° C., to a higher temperature, for example, about 131° C. The thermal duty of the fourth heat exchanger 605*d* to implement the heat exchange is about 89 MW. The heating fluid at about 131° C. that exits the fourth heat exchanger 605*d* is circulated to a main heater to be mixed with the heated heating fluid from the other heat exchangers in the third heating fluid circuit 605.

FIG. 6P shows the sixth heat exchanger 605*f* in the third heating fluid circuit 605 in the hydrocracking plant of the petrochemical refining system. A stream from a hydrocracking main fractionator kerosene pumparound and the heating fluid flow through the sixth heat exchanger 605*f* simultaneously. The sixth heat exchanger 605*f* cools down the stream from a higher temperature, for example, about 160° C., to a lower temperature, for example, about 130° C., and increases the temperature of the heating fluid from a lower temperature, for example, about 50° C., to a higher temperature, for example, about 155° C. The thermal duty of the sixth heat exchanger 605*f* to implement the heat exchange is about 5 MW. The heating fluid at about 155° C. that exits the sixth heat exchanger 605*f* is circulated to a main heater to be mixed with the heated heating fluid from the other heat exchangers in the third heating fluid circuit 605.

FIGS. 6Q and 6R are schematic diagrams of heat sources in a diesel hydro-treating plant. FIG. 6Q shows the first heat exchanger 607*a* in the fourth heating fluid circuit 607 in the diesel hydro-treating plant of the petrochemical refining system. A stream from a light effluent to cold separator and the heating fluid flow through the first heat exchanger 607*a* simultaneously. The first heat exchanger 607*a* cools down the stream from a higher temperature, for example, about 127° C., to a lower temperature, for example, about 60° C., and increases the temperature of the heating fluid from a lower temperature, for example, about 50° C., to a higher temperature, for example, about 122° C. The thermal duty of the first heat exchanger 607*a* to implement the heat exchange is about 23 MW. The heating fluid at about 122° C. that exits the first heat exchanger 607*a* is circulated to a main heater to be mixed with the heated heating fluid from the two other heat exchangers in the fourth heating fluid circuit 607.

FIG. 6R shows the second heat exchanger 607*b* in the fourth heating fluid circuit 607 in the diesel hydro-treating plant of the petrochemical refining system. A stream from a diesel stripper overhead and the heating fluid flow through the second heat exchanger 607*b* simultaneously. The second heat exchanger 607*b* cools down the stream from a higher temperature, for example, about 160° C., to a lower temperature, for example, about 60° C., and increases the temperature of the heating fluid from a lower temperature, for example, about 50° C., to a higher temperature, for example, about 155° C. The thermal duty of the second heat exchanger 607*b* to implement the heat exchange is about 34 MW. The heating fluid at about 155° C. that exits the second heat exchanger 607*b* is circulated to a main heater to be mixed with the heated heating fluid from the two other heat exchangers in the fourth heating fluid circuit 607.

FIG. 6R also shows the third heat exchanger 607*c* in the fourth heating fluid circuit 607 in the diesel hydro-treating plant of the petrochemical refining system. A stream from a diesel stripper product and the heating fluid flow through the third heat exchanger 607*c* simultaneously. The third heat exchanger 607*c* cools down the stream from a higher temperature, for example, about 162° C., to a lower temperature, for example, about 60° C., and increases the temperature of the heating fluid from a lower temperature, for example, about 50° C., to a higher temperature, for example, about 157° C. The thermal duty of the third heat exchanger 607*c* to implement the heat exchange is about 61 MW. The heating fluid at about 157° C. that exits the third heat exchanger 607*c* is circulated to a main heater to be mixed with the heated heating fluid from the two other heat exchangers in the fourth heating fluid circuit 607.

The heating fluids received from the three heat exchangers in the fourth heating fluid circuit 607 are mixed in the main header resulting in a heating fluid at a temperature of about 147° C. The heated heating fluid from the fourth heating fluid circuit 607 is circulated through the evaporator 608*a* of the ORC of the third power generation system 608. In some implementations, the evaporator 608*a* increases the temperature of the working fluid (for example, isobutane or other working fluid) from about 31° C. at about 20 bar to about 99° C. at about 20 bar at a thermal duty of about 605 MW. The gas expander 608*b* expands the high temperature, high pressure working fluid to generate power, for example, about 13 MW, at an efficiency of about 85%. The expansion decreases the temperature and pressure of the working fluid, for example, to about 52° C. and about 4.3 bar, respectively. The working fluid flows through the condenser 608*c* which further decreases the temperature and pressure of the working fluid at a thermal duty of about 93 MW. For example, cooling fluid flows through the condenser 608*c* at a lower temperature, for example, about 20° C., exchanges heat with the working fluid, and exits the condenser 606*c* at a higher temperature, for example, about 30° C. The cooled working fluid (for example, isobutane liquid) is pumped by the pump 608*d* at an efficiency, for example, of about 75%, and an input power, for example, of about 1 MW. The pump 608*d* increases the temperature of the working fluid to about 31° C. and pumps the working fluid at a mass flow rate of about 258 kg/s to the evaporator 608*a*, which repeats the Rankine cycle to generate power.

Figure 6S:
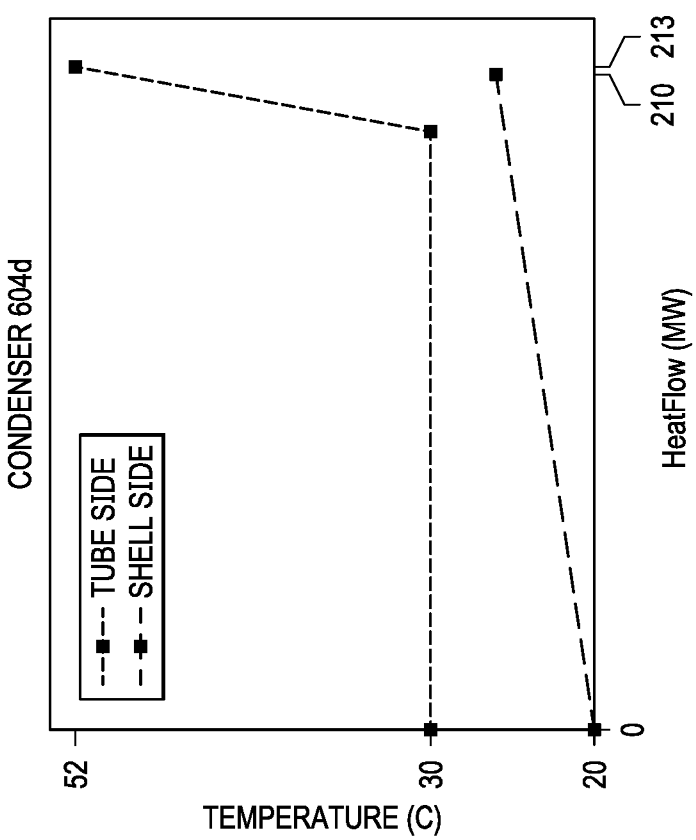
FIGS. 6SA-6SC are graphs that show a tube side fluid temperature and a shell side fluid temperature in respective condensers during an operation of the network of FIGS. 6A, 6B, and 6C.
Figure 6S:
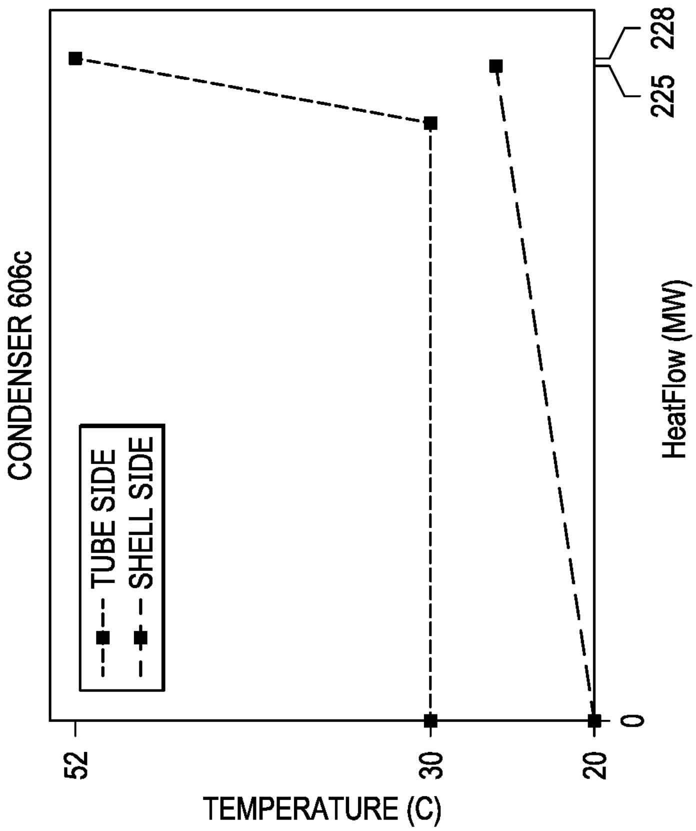
Figure 6S:
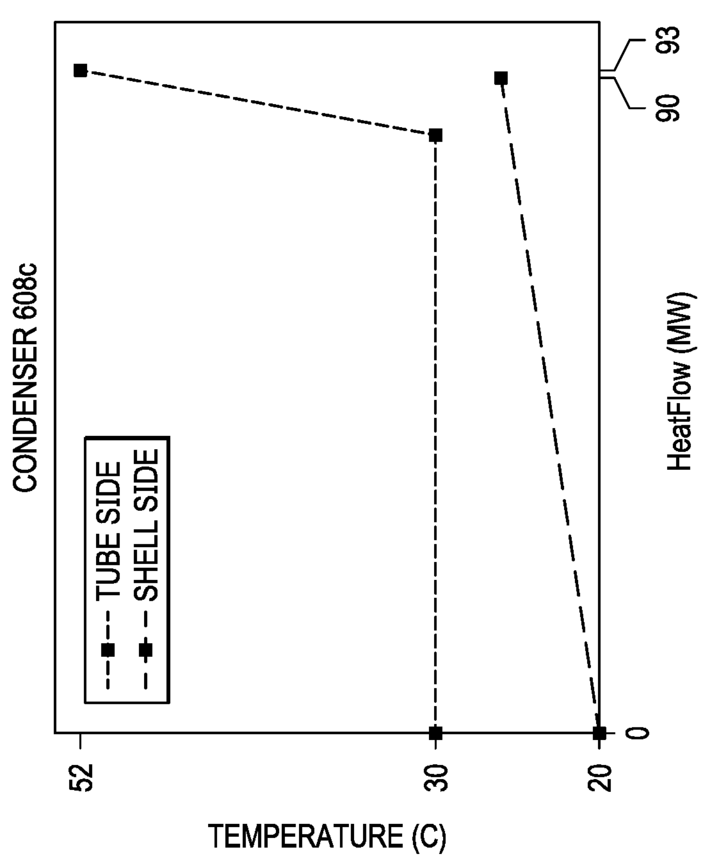

FIGS. 6SA-6SC are graphs that show a tube side fluid temperature (for example, a cooling, or condenser, fluid flow) and a shell side fluid temperature (for example, an ORC working fluid flow) in the condensers 604*d*, 606*c*, and 608*c*, respectively, during an operation of the system 600. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature.

As shown in these figures, the condenser water (entering the tubes of the condensers 604*d*, 606*c*, and 608*c*) enters at about 20° C. and leaves at about 25-27° C. The ORC working fluid (entering the shell side of the condensers) enters as a vapor at about 52° C., and then condenses at 30° C. and leaves the condensers as a liquid at 30° C.

Figure 6T:
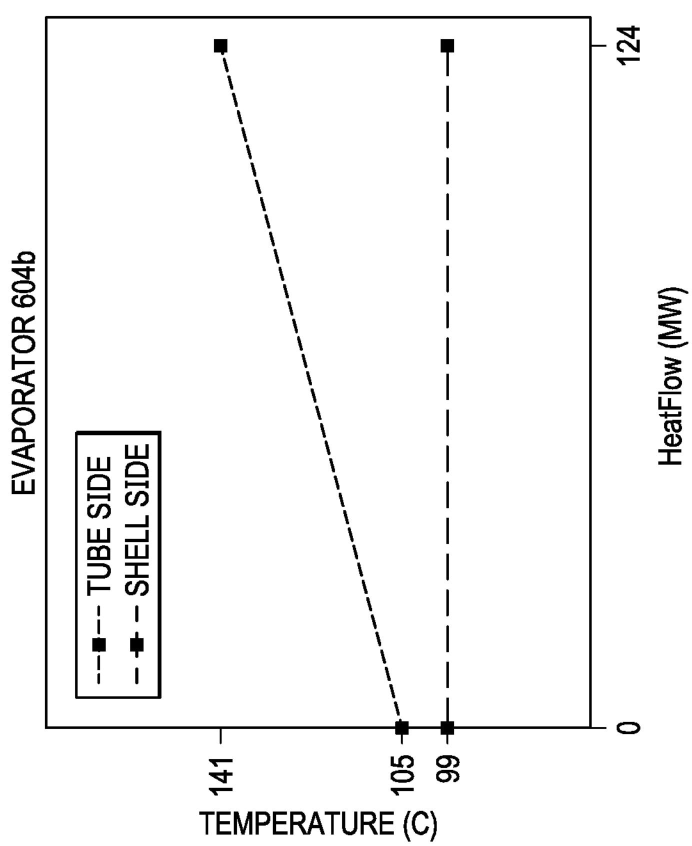
FIGS. 6TA-6TC are graphs that show a tube side fluid temperature and a shell side fluid temperature in respective evaporators during an operation of the network of FIGS. 6A, 6B, and 6C.
Figure 6T:
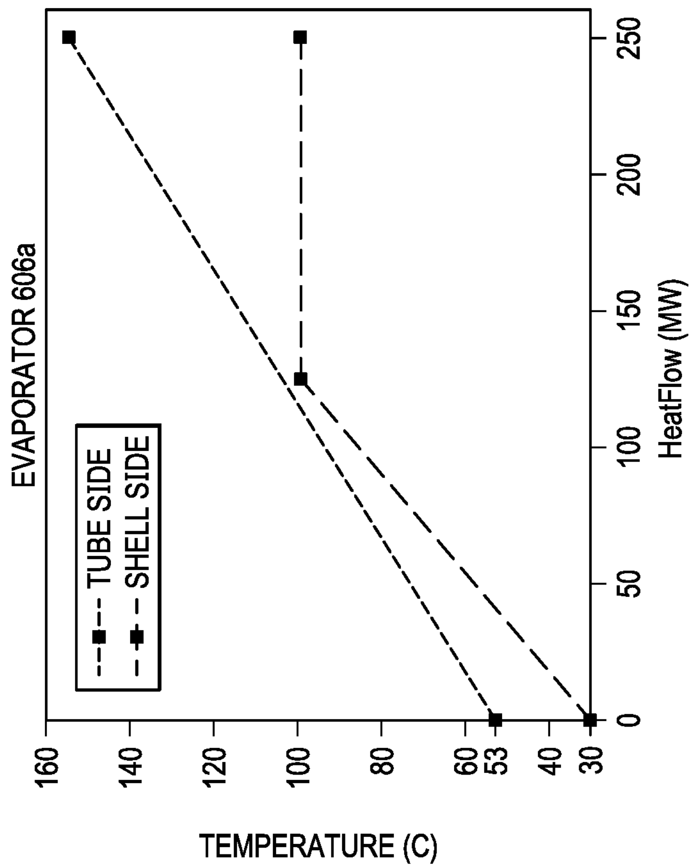
Figure 6T:
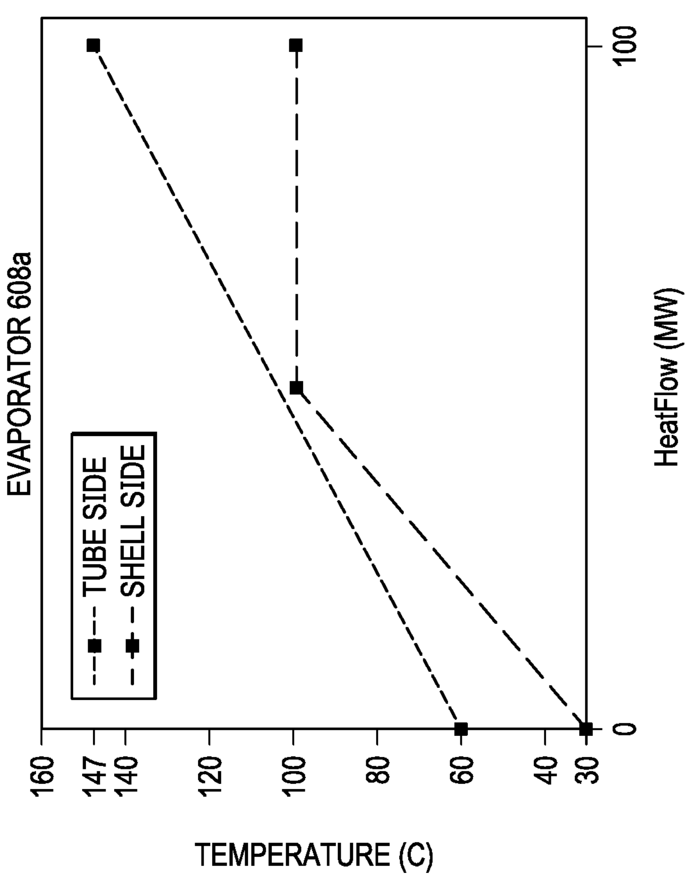

FIGS. 6TA-6TC are graphs that show a tube side fluid temperature (for example, a heating fluid flow) and a shell side fluid temperature (for example, an ORC working fluid flow) in the evaporators 604*b*, 606*a*, and 608*a*, respectively during an operation of the system 600. These graphs show a temperature difference between the fluids on the y-axis relative to a heat flow between the fluids on the x-axis. For example, as shown in these figures, as the temperature difference between the fluids decreases, a heat flow between the fluids can increase. These graphs each show a temperature difference between the fluids on the y-axis relative to a heat flow between the fluids on the x-axis. For example, as shown in FIG. 6TA, as the tube side fluid (for example, the hot oil or water in the heating fluid circuit 603) is circulated through the evaporator 604*b*, heat is transferred from that fluid to the shell side fluid (for example, the ORC working fluid). Thus, the tube side fluid enters the evaporator 604*b* at about 141° C. and leaves the evaporator 604*b* at about 605° C. The shell side fluid enters the evaporator 604*b*, from the pre-heater 604*a*, at about 99° C. (for example, as a liquid or mixed phase fluid) and leaves the evaporator 604*b* also at about 99° C. (for example, as a vapor with some superheating).

As shown in FIG. 6TB, as the tube side fluid (for example, the hot oil or water in the heating fluid circuit 605) is circulated through the evaporator 606*a*, heat is transferred from that fluid to the shell side fluid (for example, the ORC working fluid). Thus, the tube side fluid enters the evaporator 606*a* at about 160° C. and leaves the evaporator 606*a* at about 53° C. The shell side fluid enters the evaporator 606*a* at about 30° C. (for example, as a liquid) and leaves the evaporator 606*a* at about 99° C. (for example, as a vapor).

As shown in FIG. 6TC, as the tube side fluid (for example, the hot oil or water in the heating fluid circuit 607) is circulated through the evaporator 608*a*, heat is transferred from that fluid to the shell side fluid (for example, the ORC working fluid). Thus, the tube side fluid enters the evaporator 608*a* at about 147° C. and leaves the evaporator 608*a* at about 60° C. The shell side fluid enters the evaporator 608*a* at about 30° C. (for example, as a liquid) and leaves the evaporator 608*a* at about 99° C. (for example, as a vapor).

Each of the graphs shown in FIGS. 6TB and 6TC include a "pinch point" for the shell-side fluid (for example, the ORC working fluid). The pinch point, which occurs as the fluid reaches about 99° C., represents the temperature at which the shell-side fluid vaporizes. As the shell-side fluid continues through the respective evaporator, the fluid temperature remains substantially constant (that is, about 99° C.) as the fluid complete vaporizes and, in some aspects, becomes superheated.

Figure 6U:
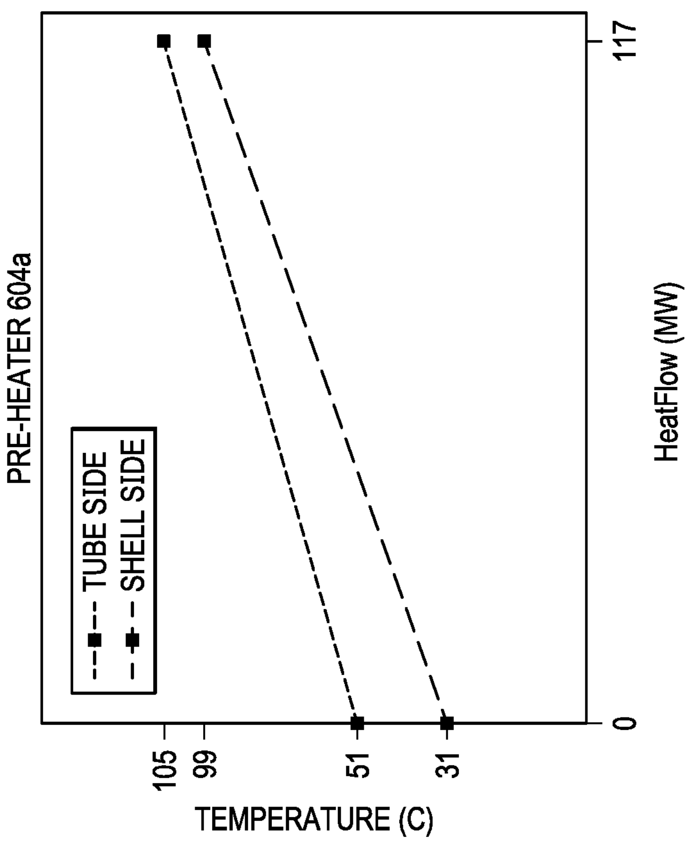
FIG. 6U is a graph that shows a tube side fluid temperature and a shell side fluid temperature in a pre-heater during an operation of the network of FIGS. 6A, 6B, and 6C.

FIG. 6U is a graph that show a tube side fluid temperature (for example, a heating fluid flow) and a shell side fluid temperature (for example, an ORC working fluid flow) in the pre-heater 604*a* during an operation of the system 600. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 6U, as the tube side fluid (for example, the hot oil or water in the heating fluid circuit 602) is circulated through the pre-heater 604*a*, heat is transferred from that fluid to the shell side fluid (for example, the ORC working fluid). Thus, the tube side fluid enters the pre-heater 604*a* at about 605° C. and leaves the pre-heater 604*a* at about 50° C. The shell side fluid enters the pre-heater 604*a* at about 30° C. (for example, as a liquid) and leaves the pre-heater 604*a* at about 99° C. (for example, also as a liquid or mixed phase fluid).

Figure 7A:
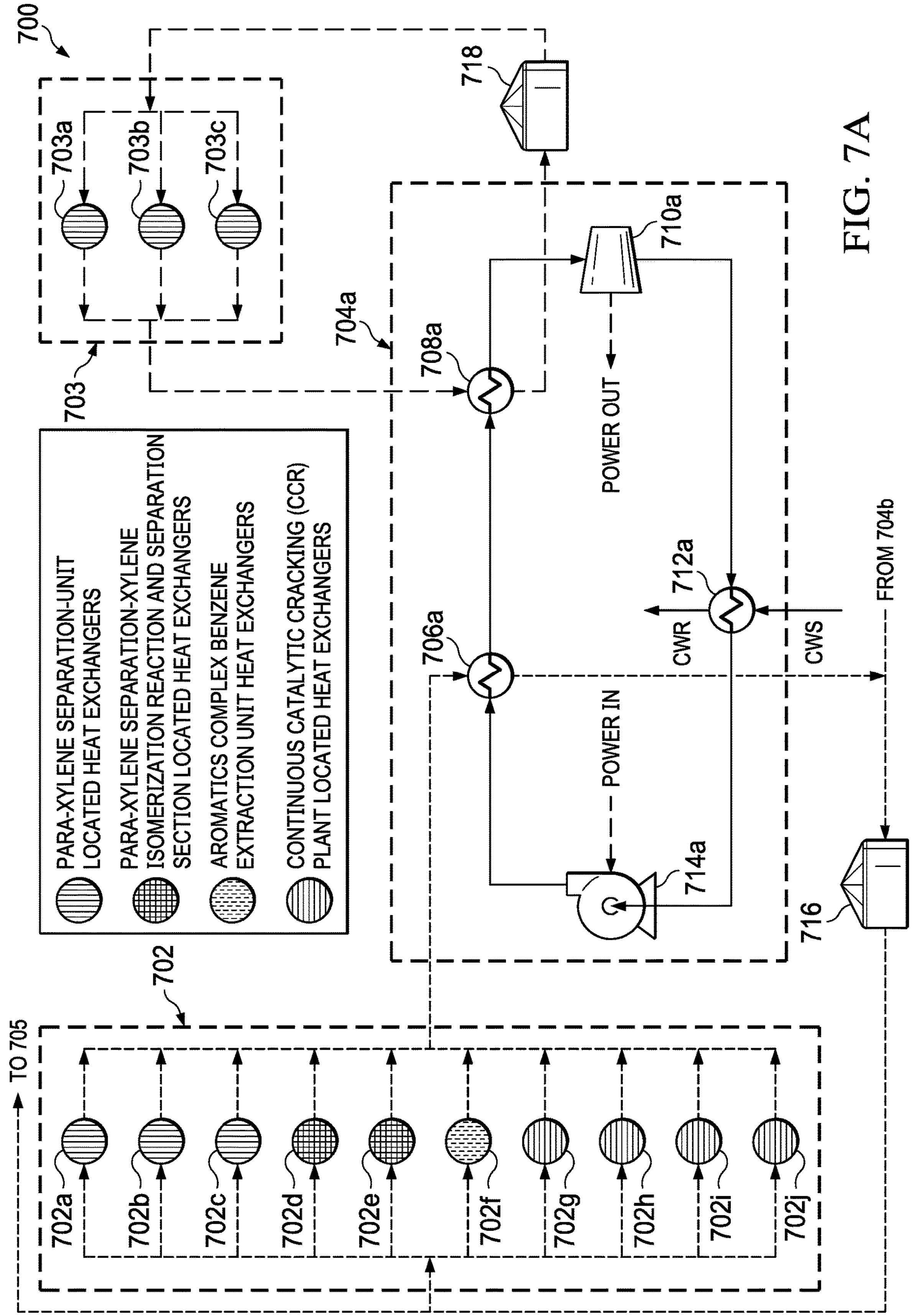
FIGS. 7A-7T are schematic illustrations of a power generation system that utilizes waste heat from one or more heat sources in a petrochemical refining plant.
Figure 7B:
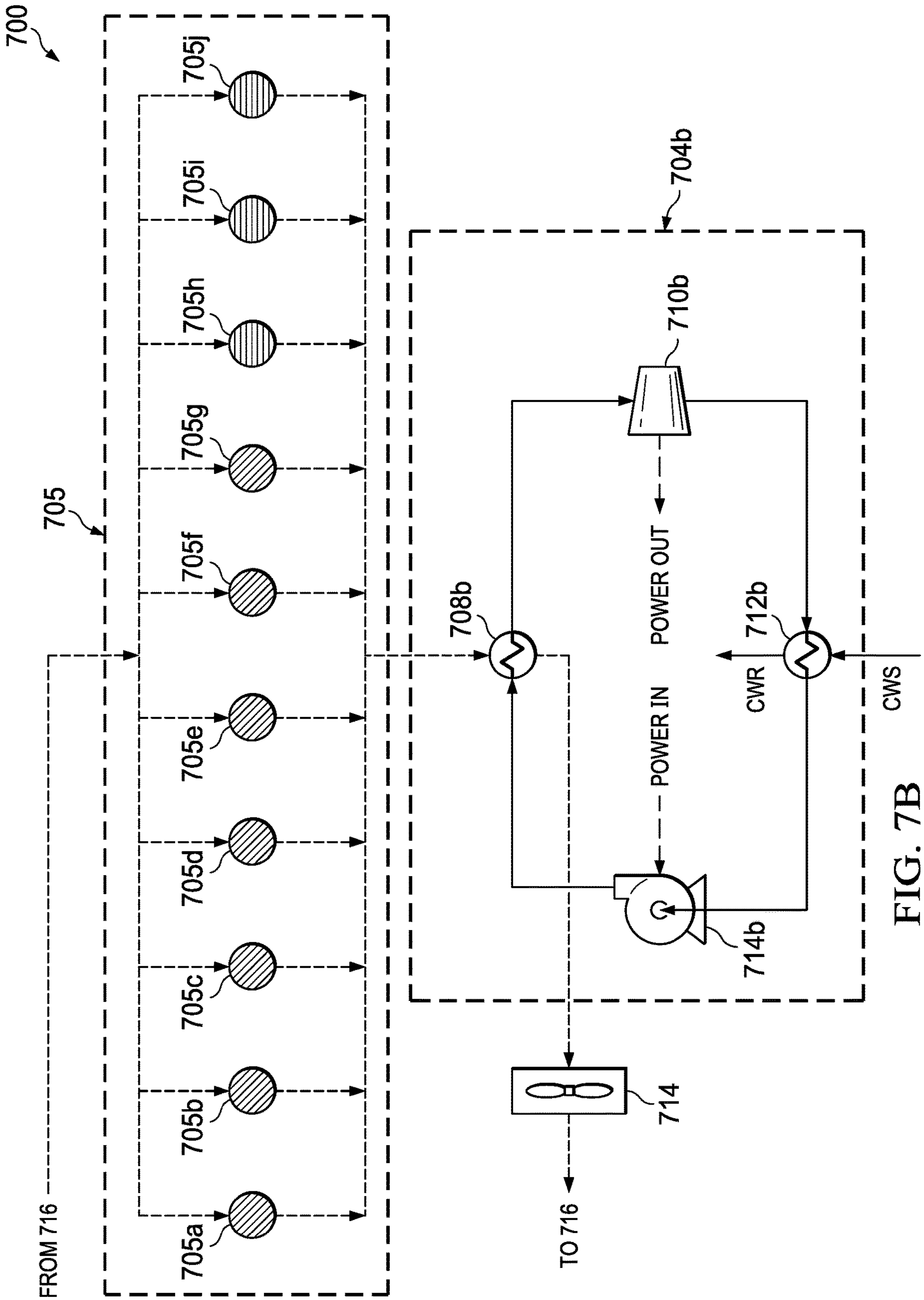
FIGS. 7U-7X are graphs that illustrate heat exchanger performance of heat exchangers in the power generation system shown in FIGS. 7S-7T.
Figure 7C:
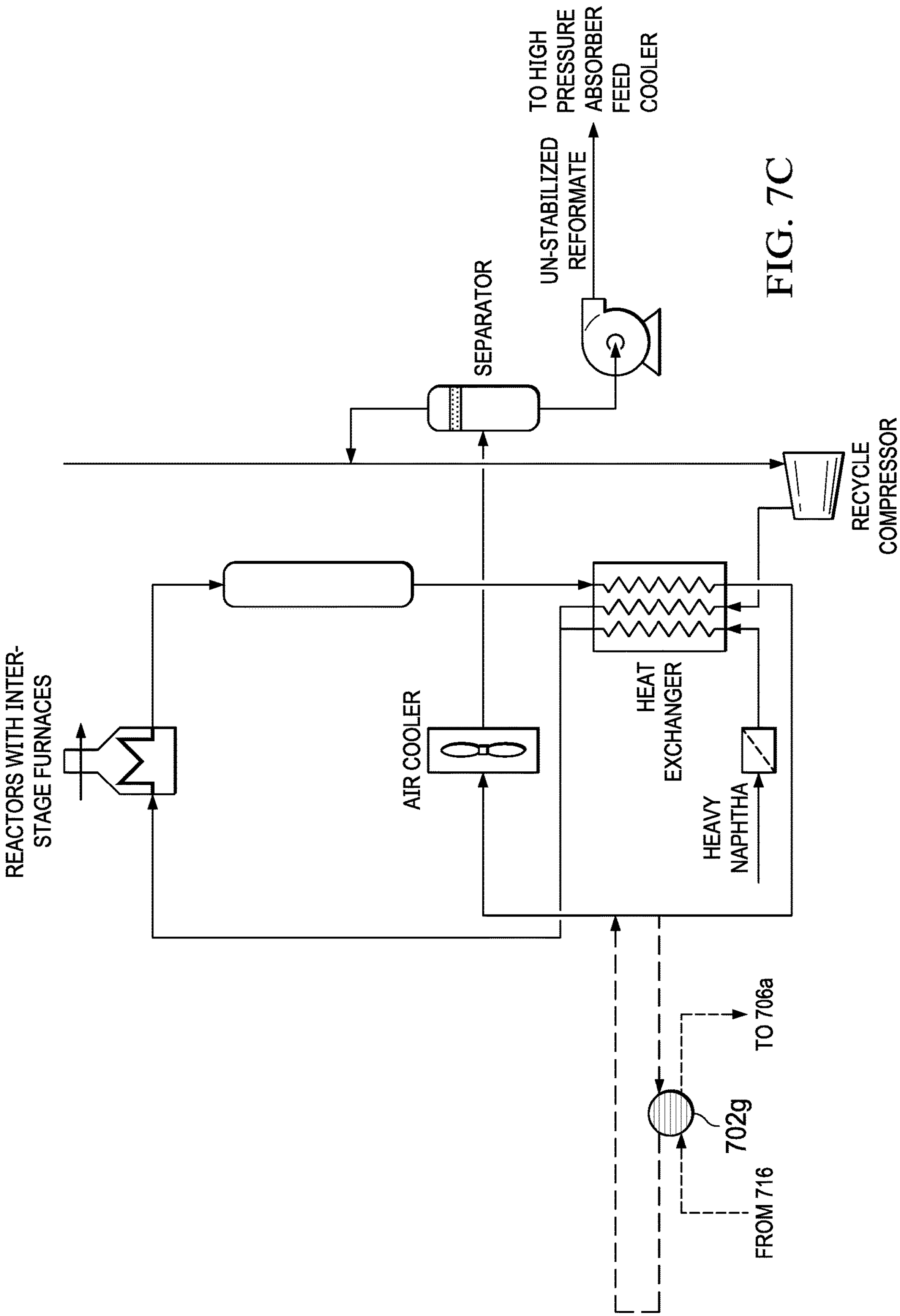
Figure 7D:
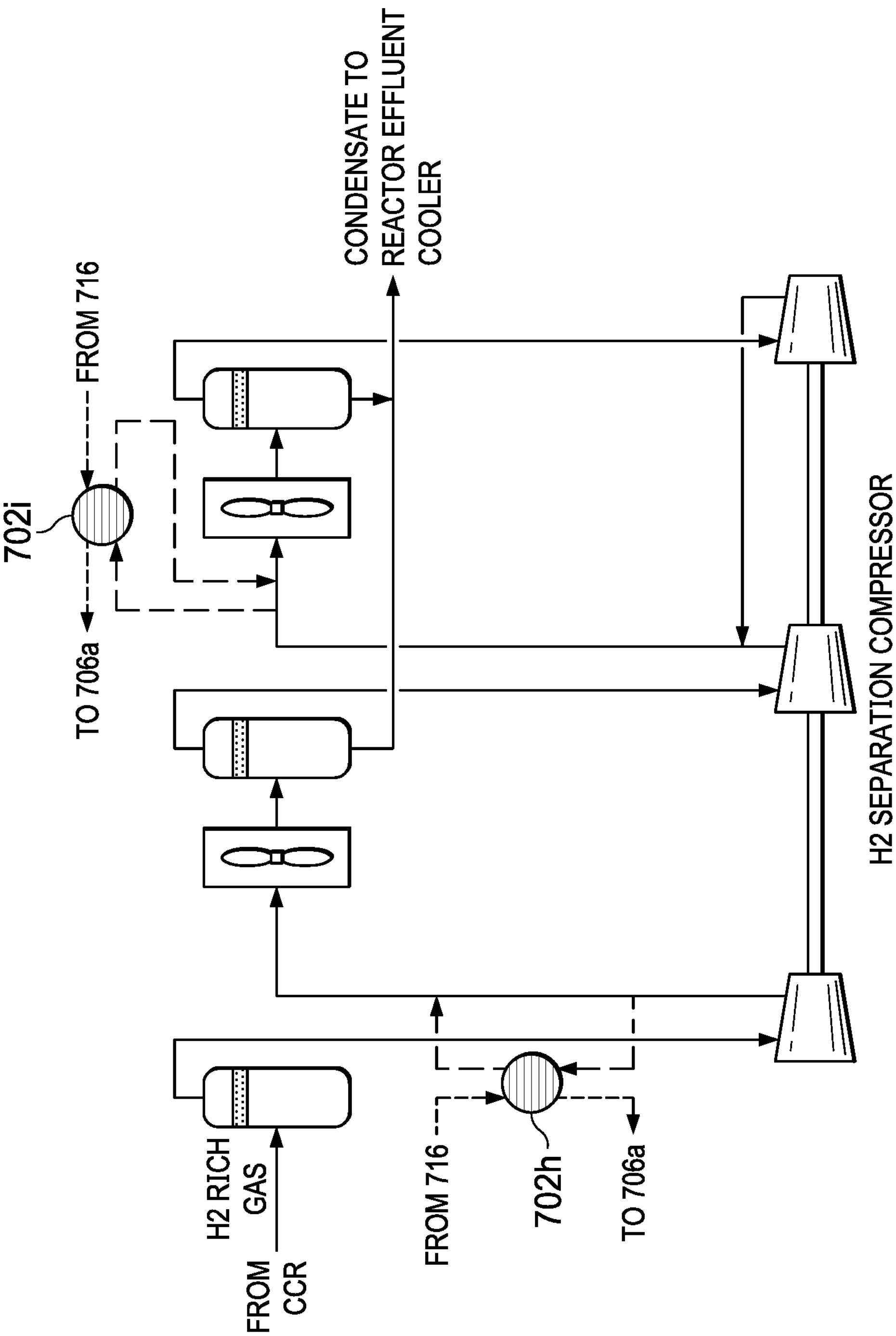
Figure 7E:
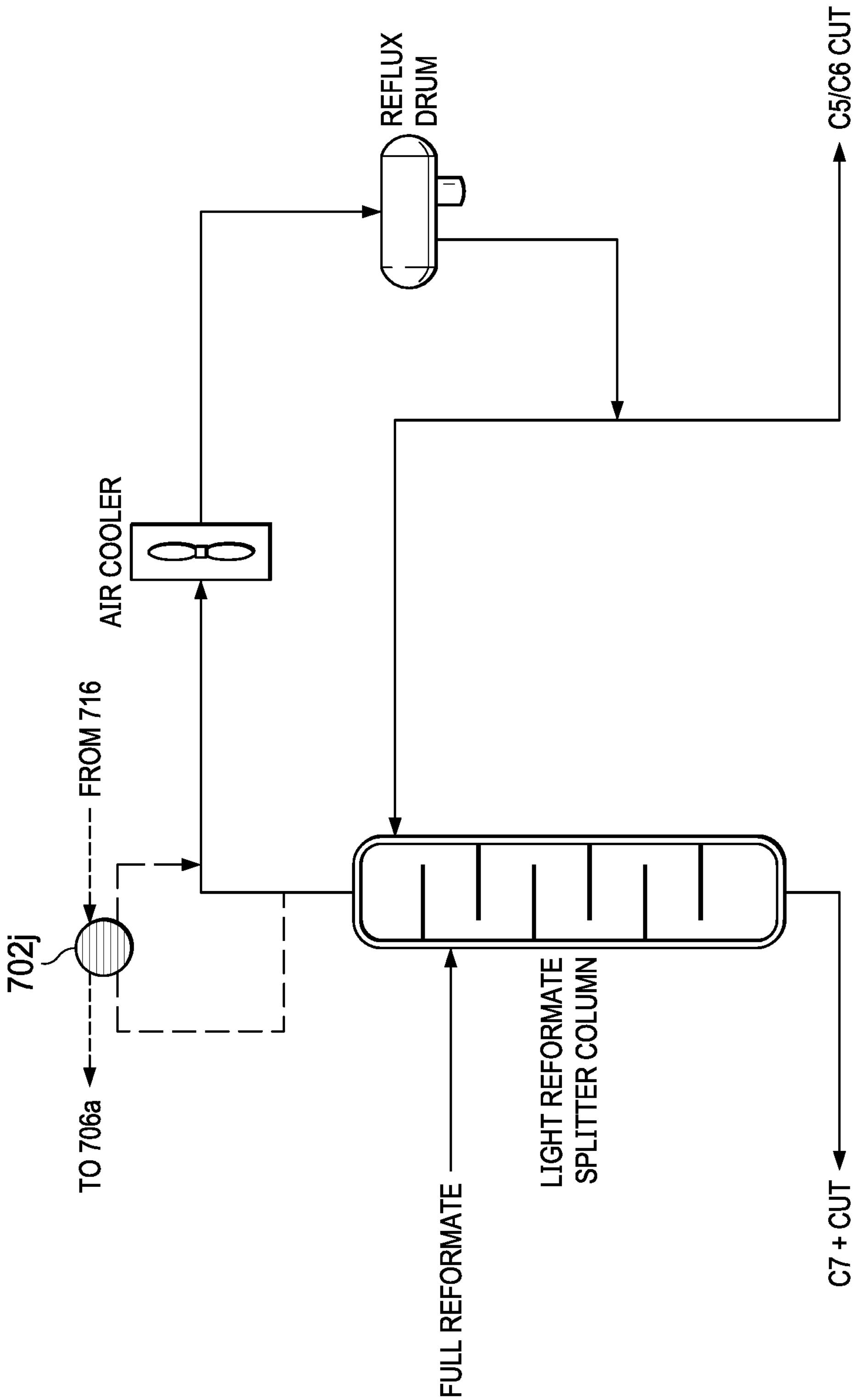
Figure 7F:
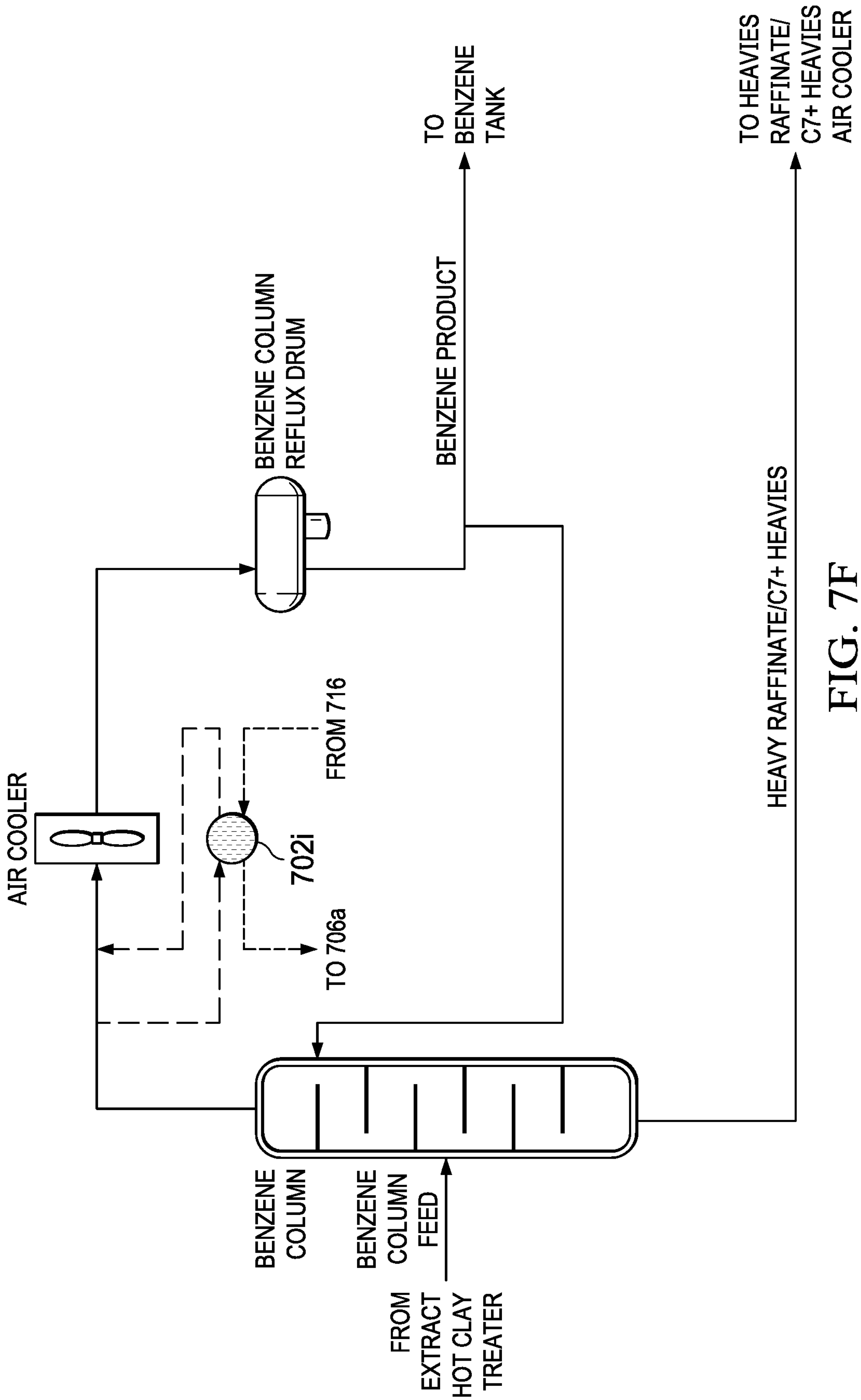
Figure 7G:
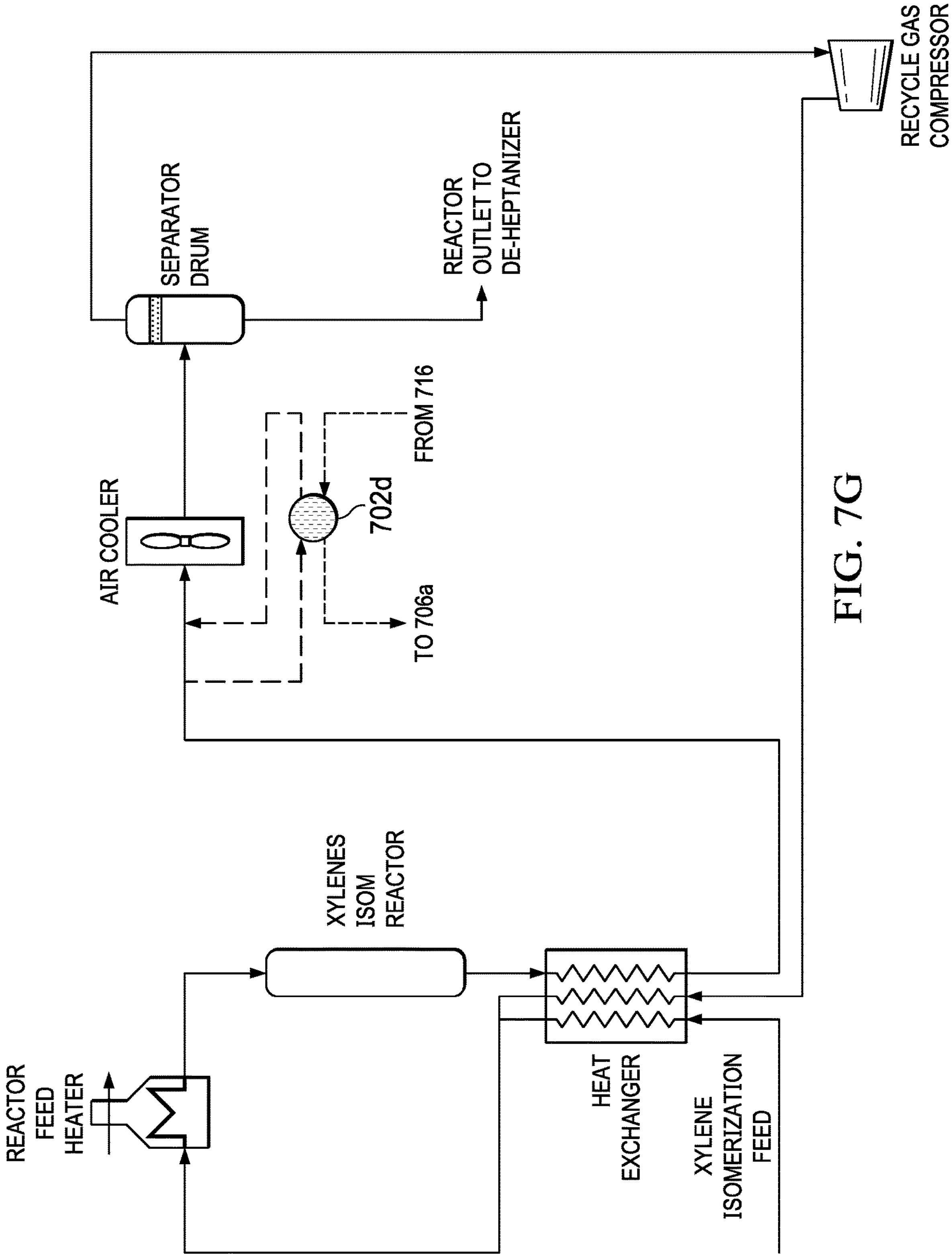
Figure 7H:
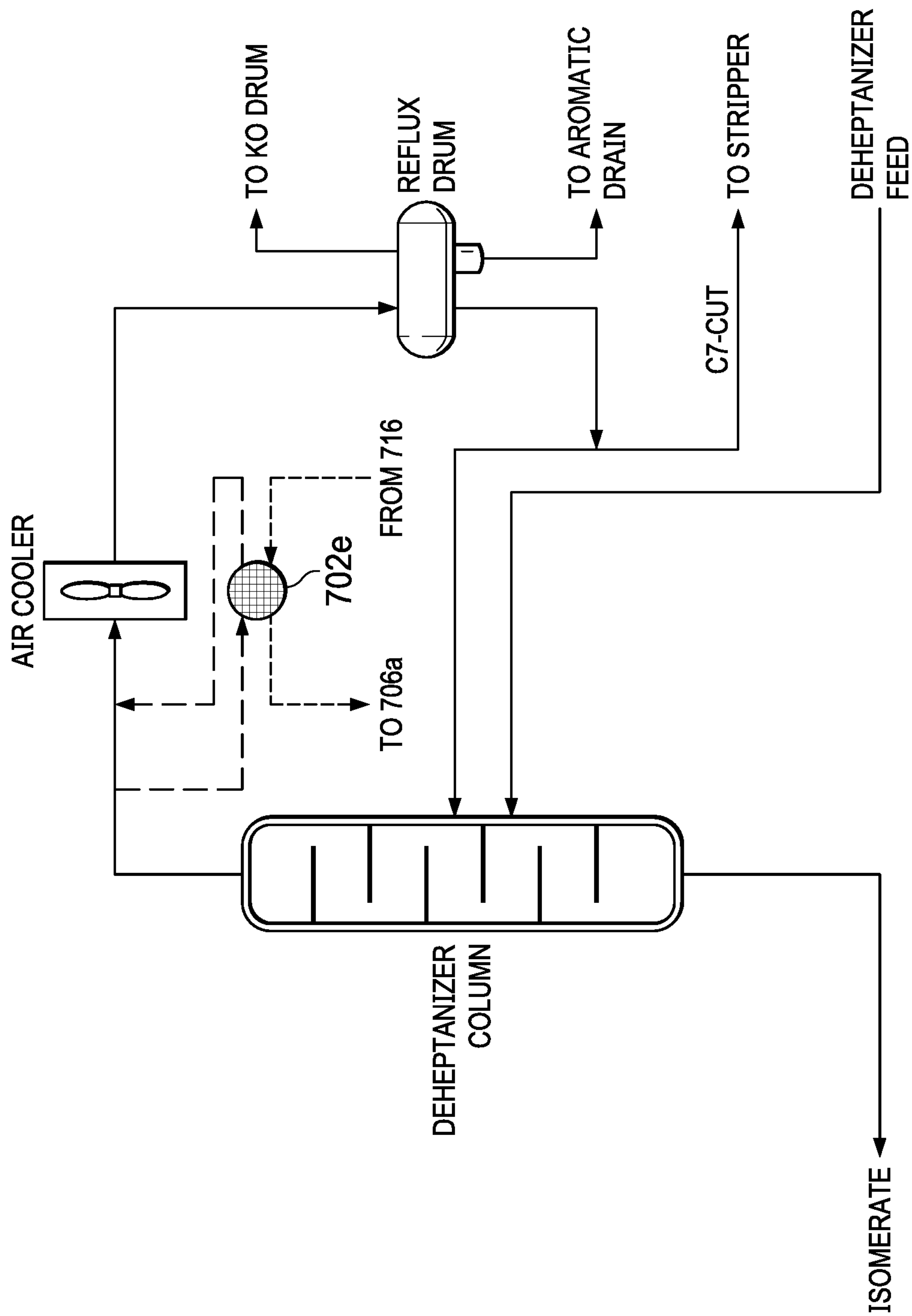
Figure 7I:
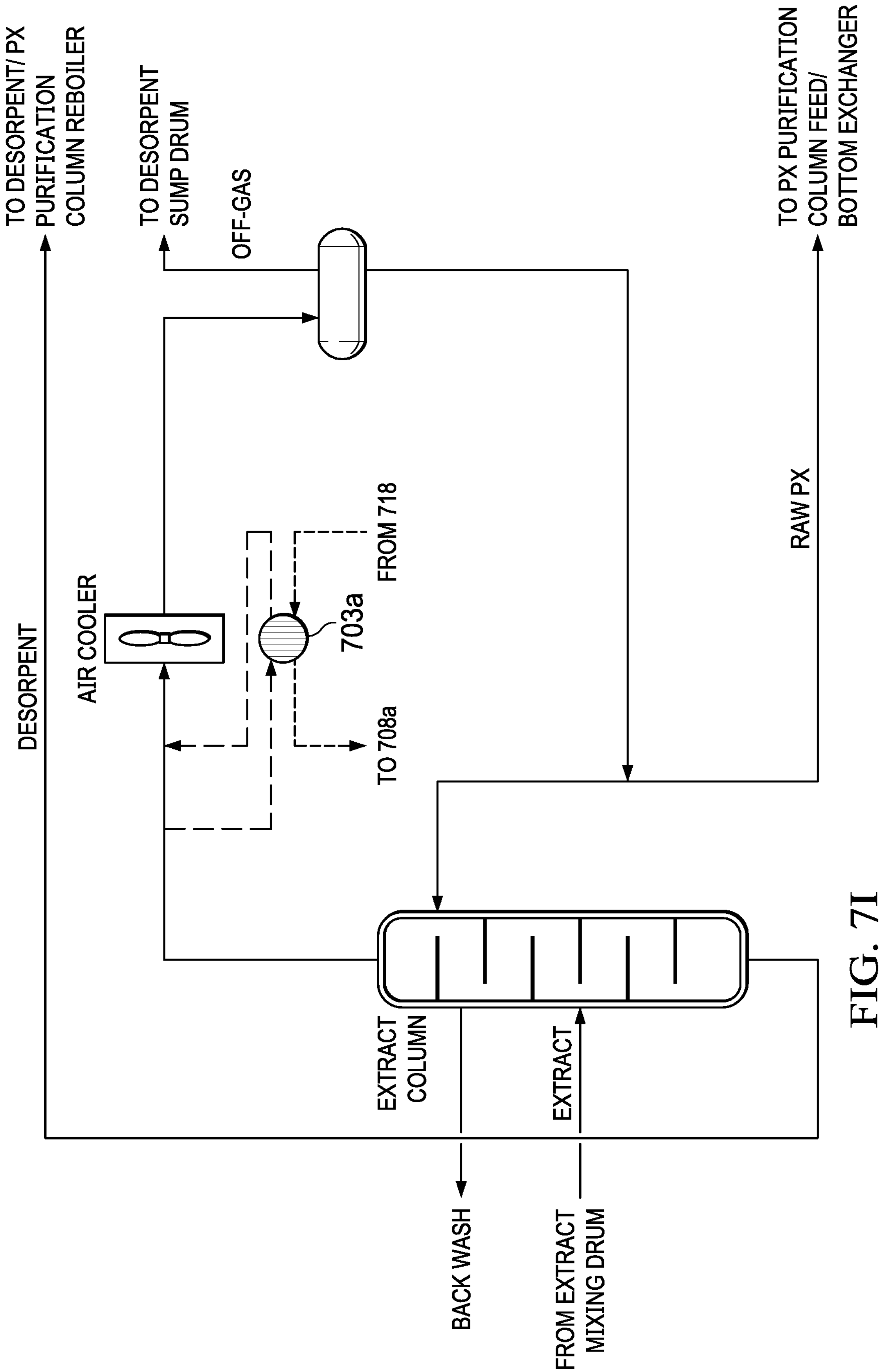
Figure 7J:
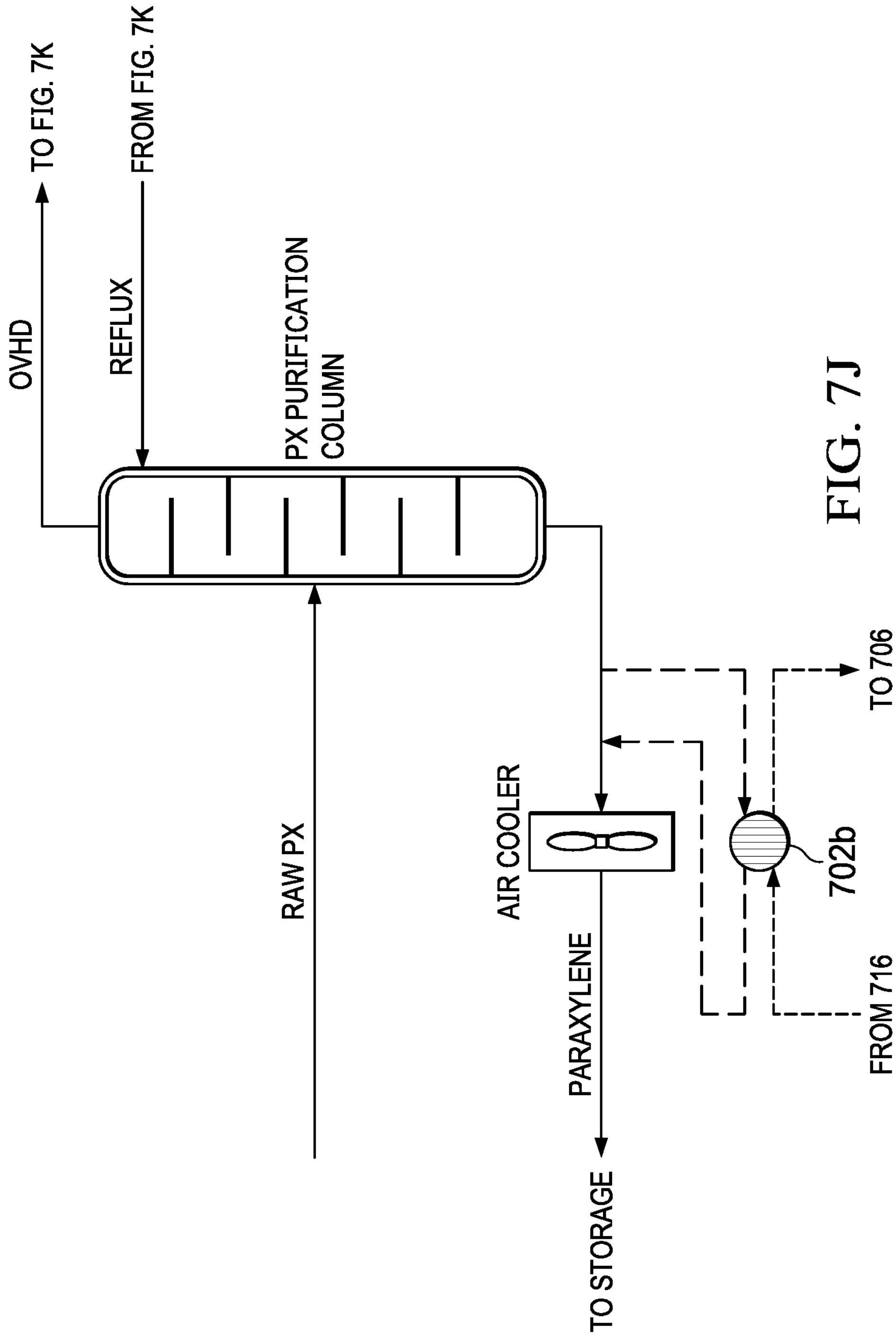
Figure 7K:
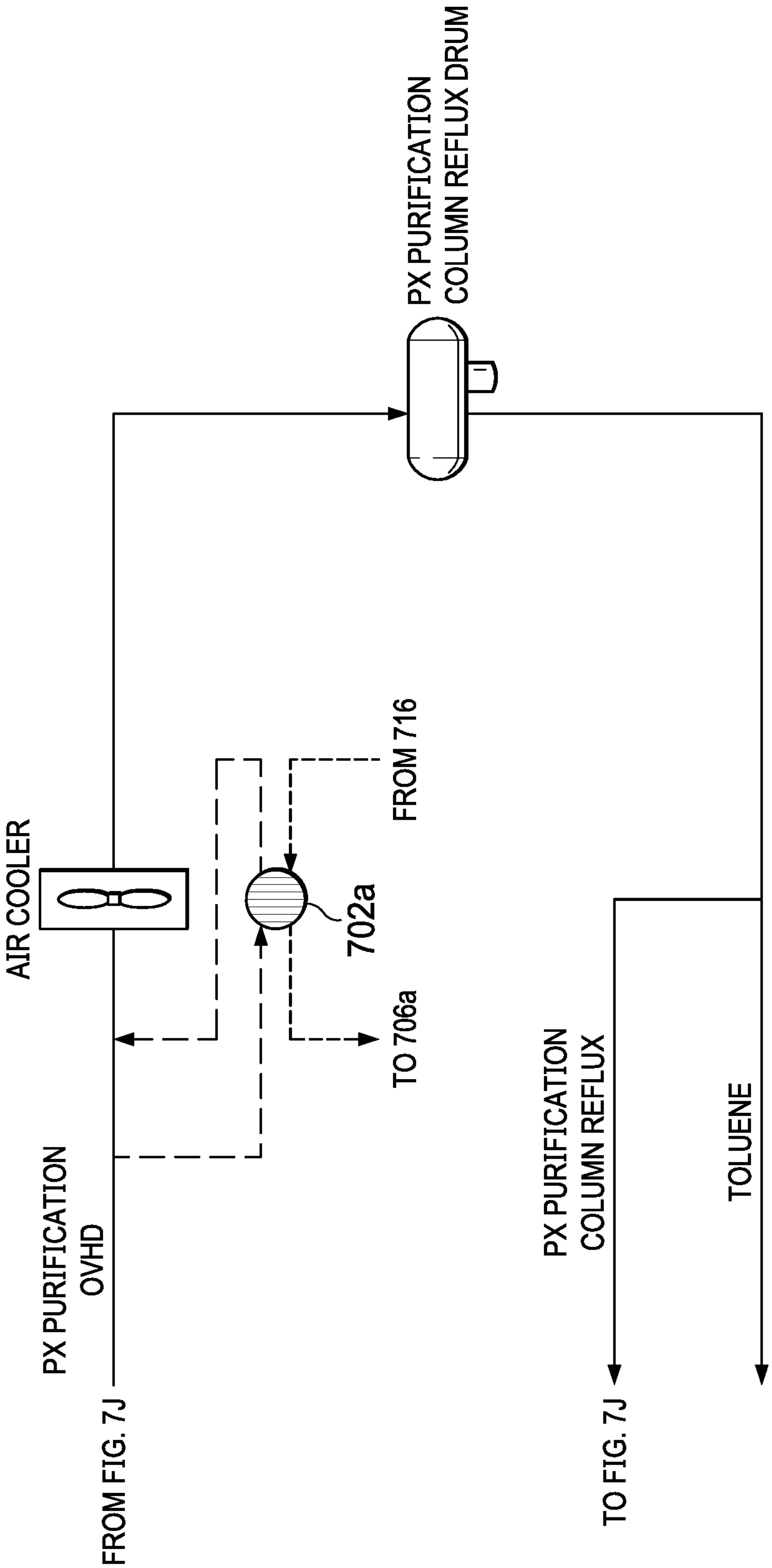
Figure 7L:
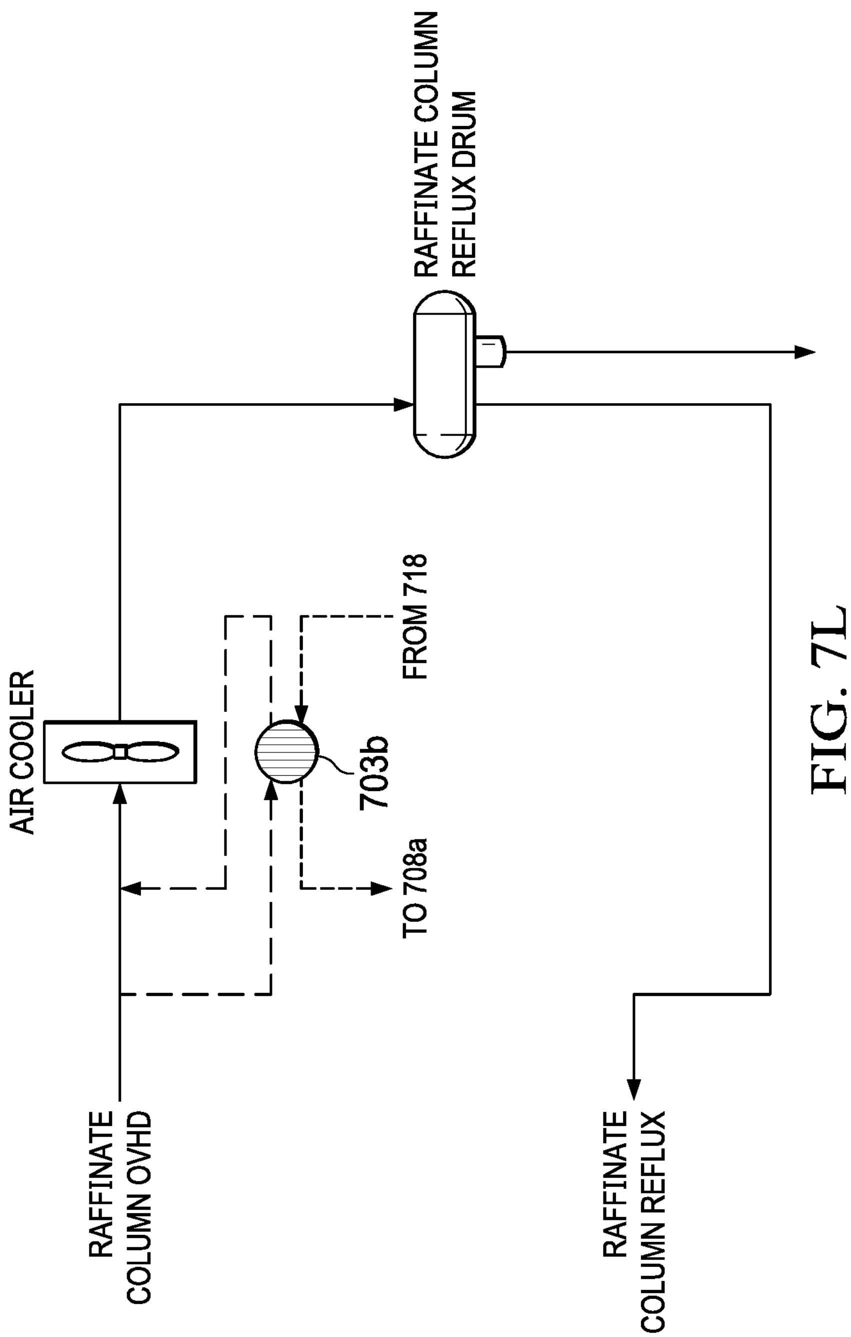
Figure 7M:
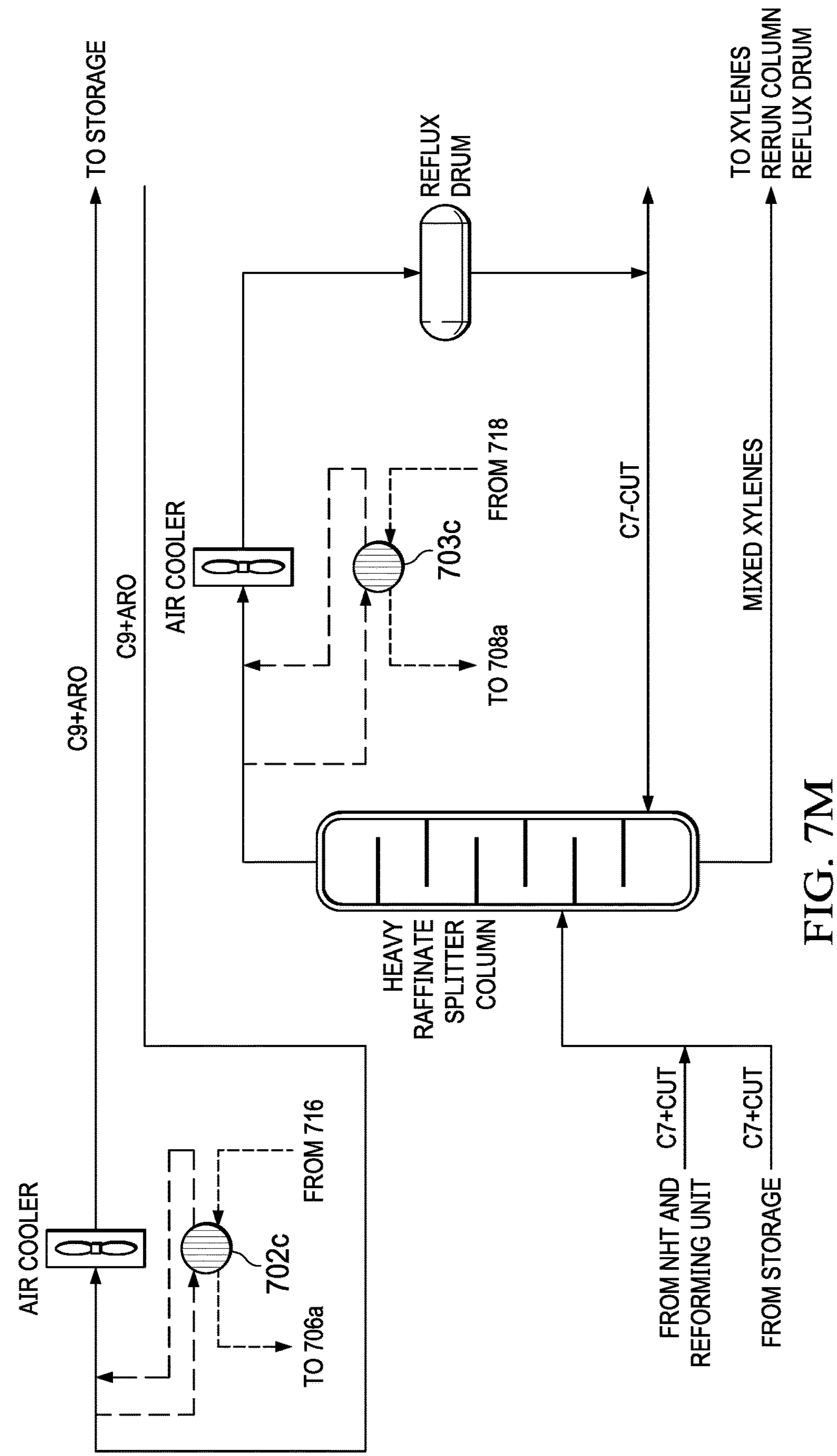
Figure 7N:
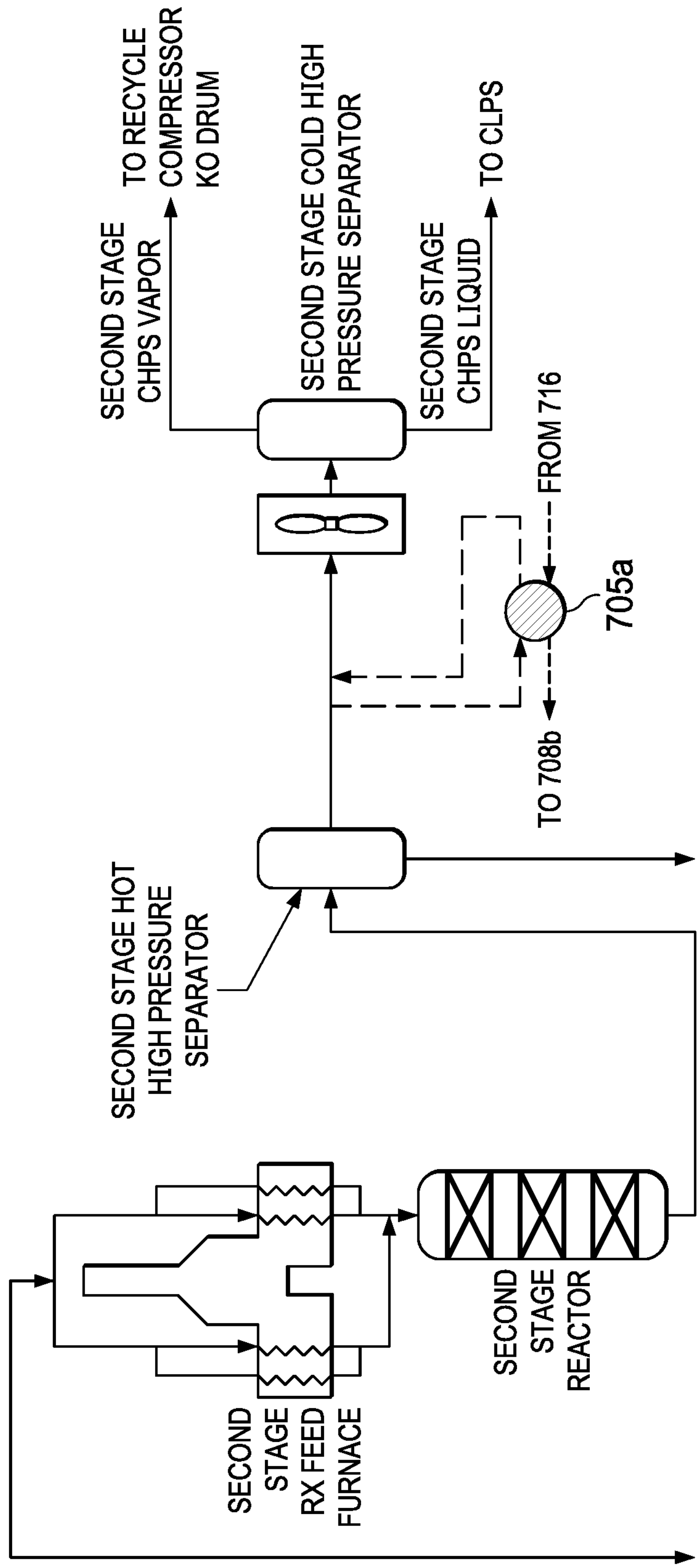
Figure 7O:
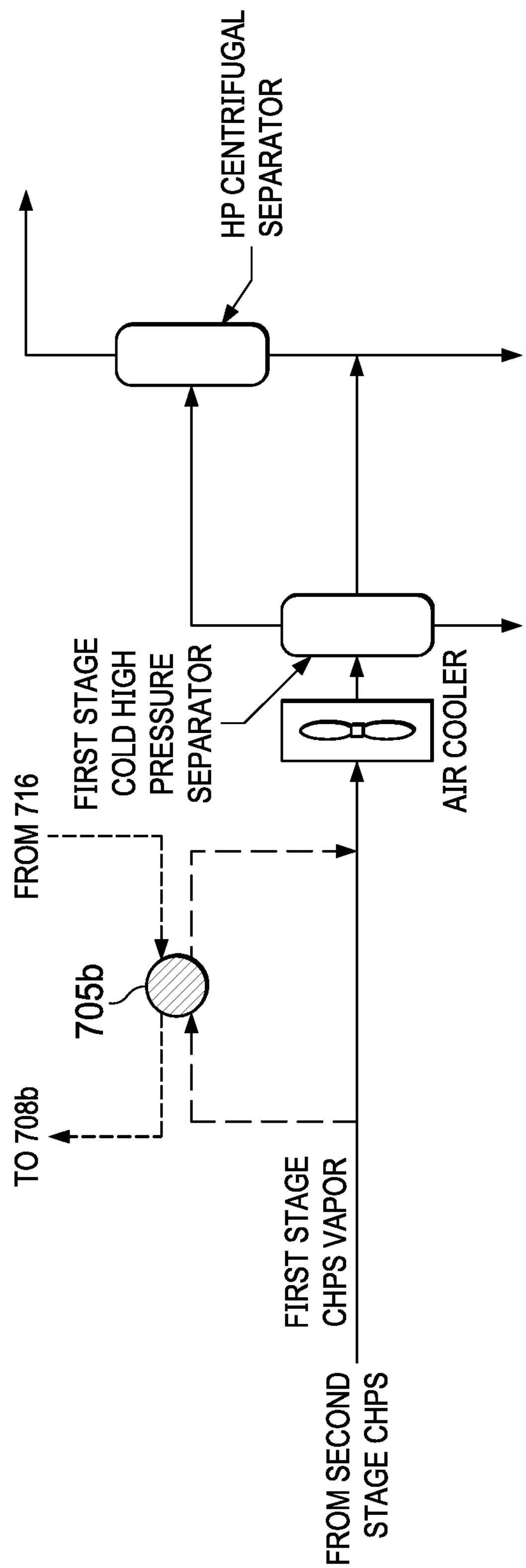
Figure 7P:
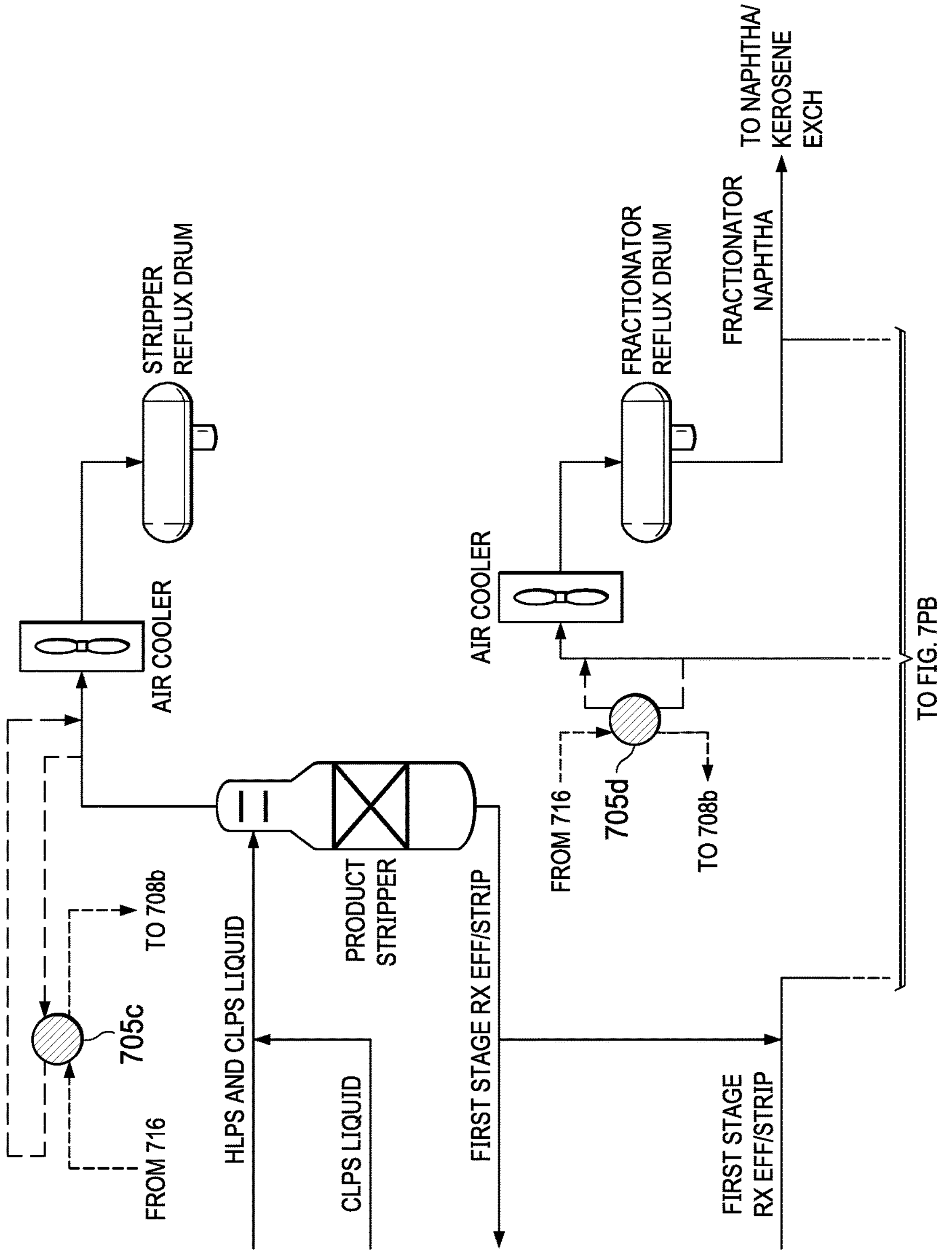
Figure 7P:
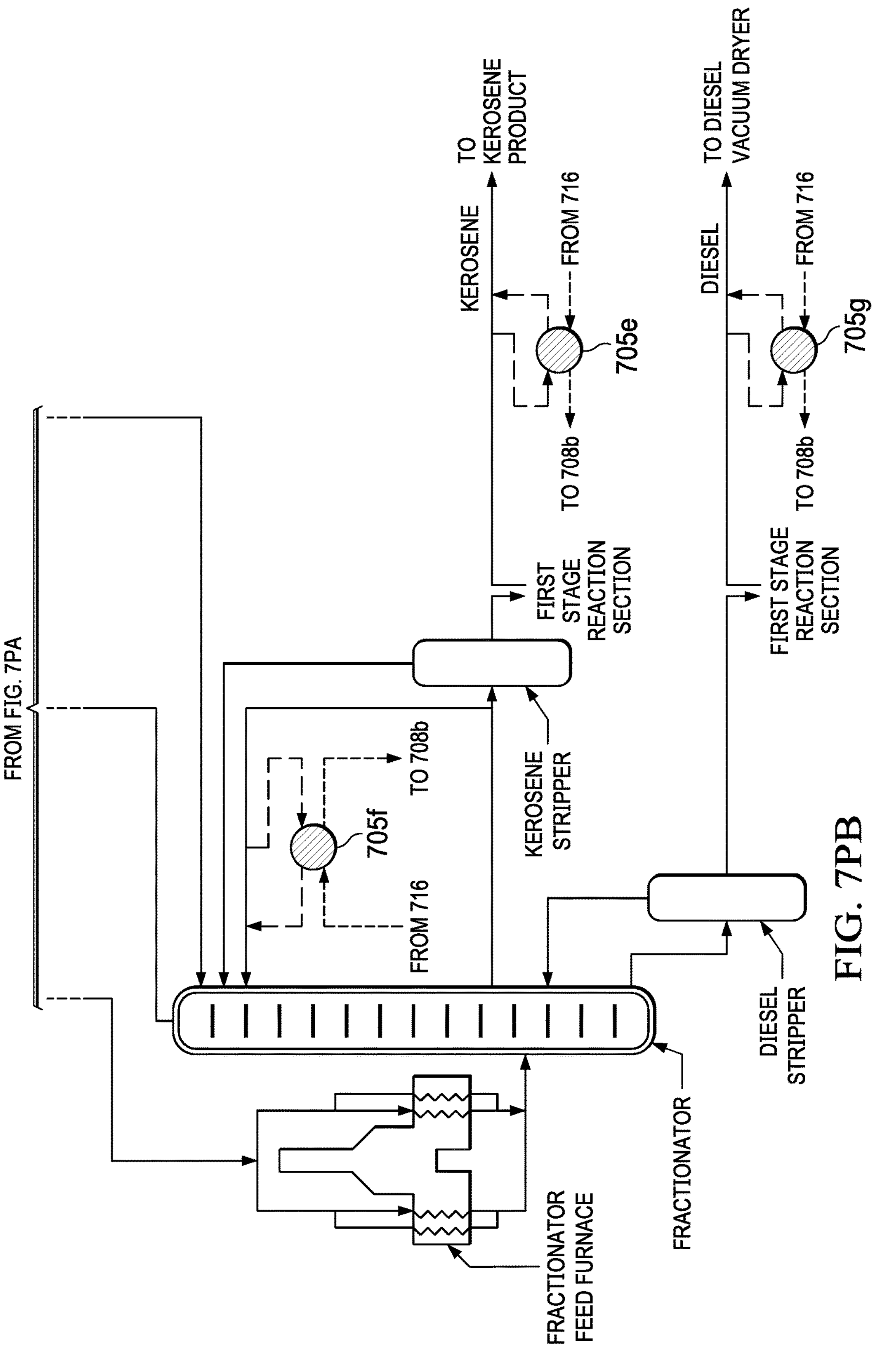
Figure 7Q:
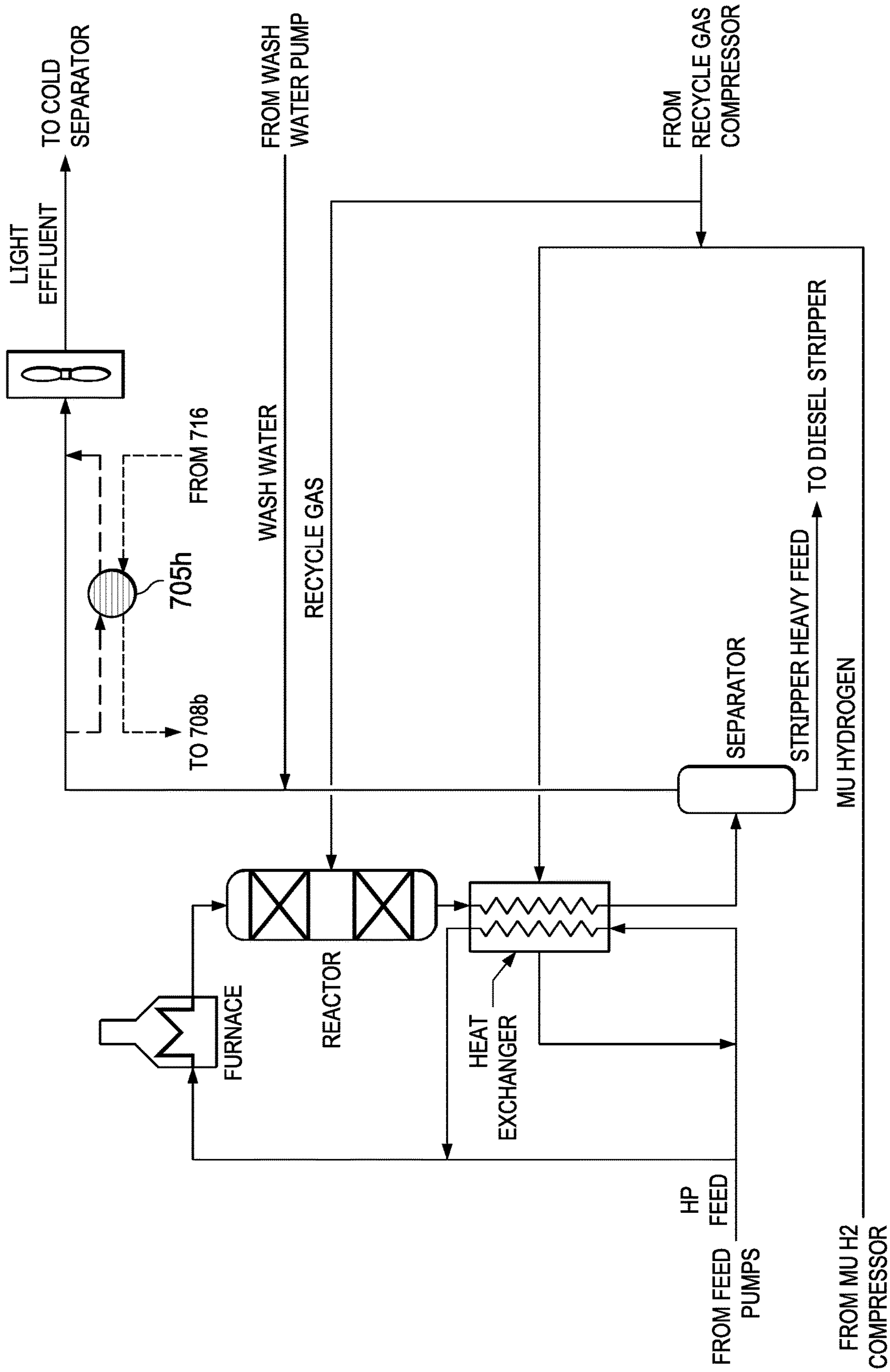
Figure 7R:
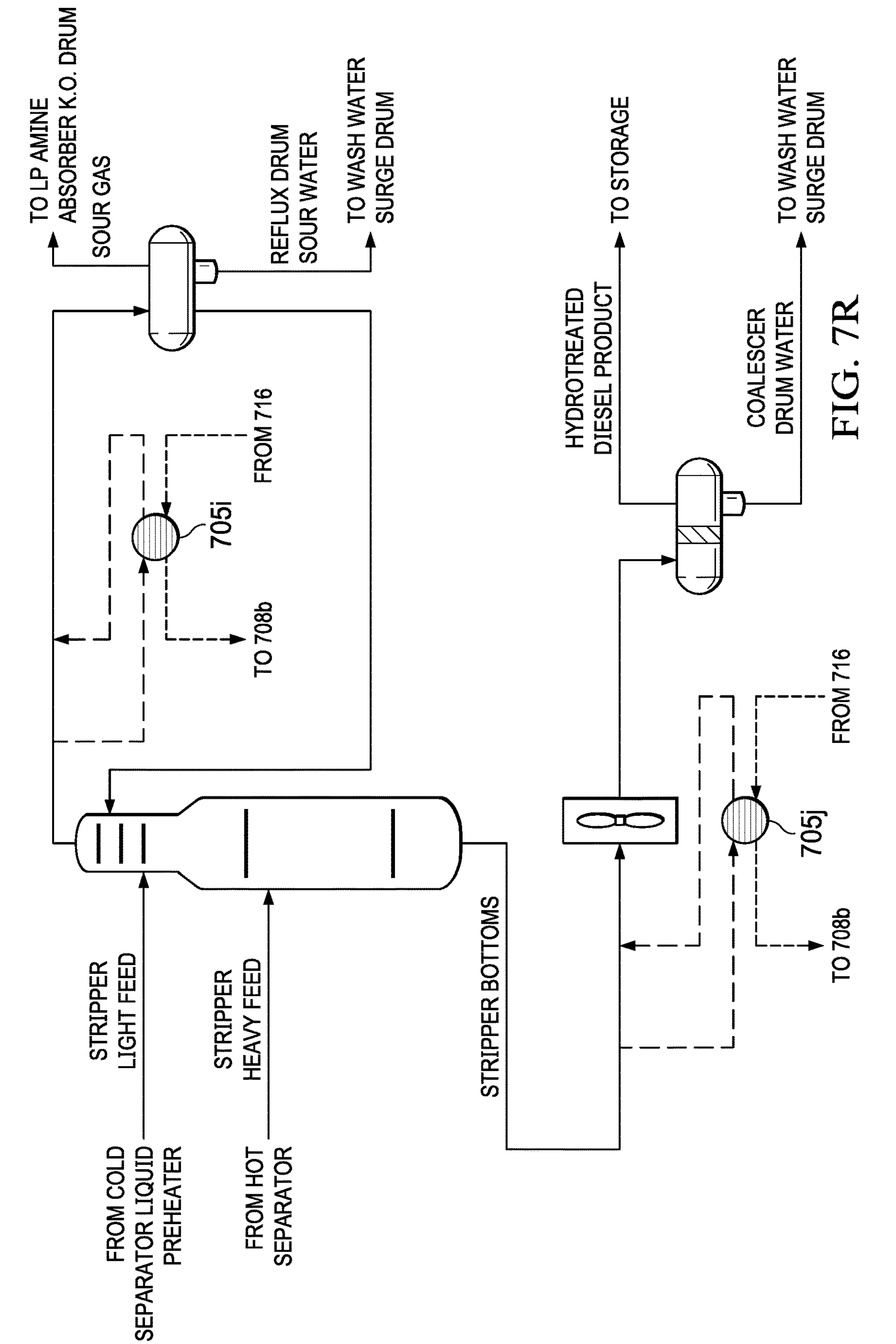
Figure 7S:
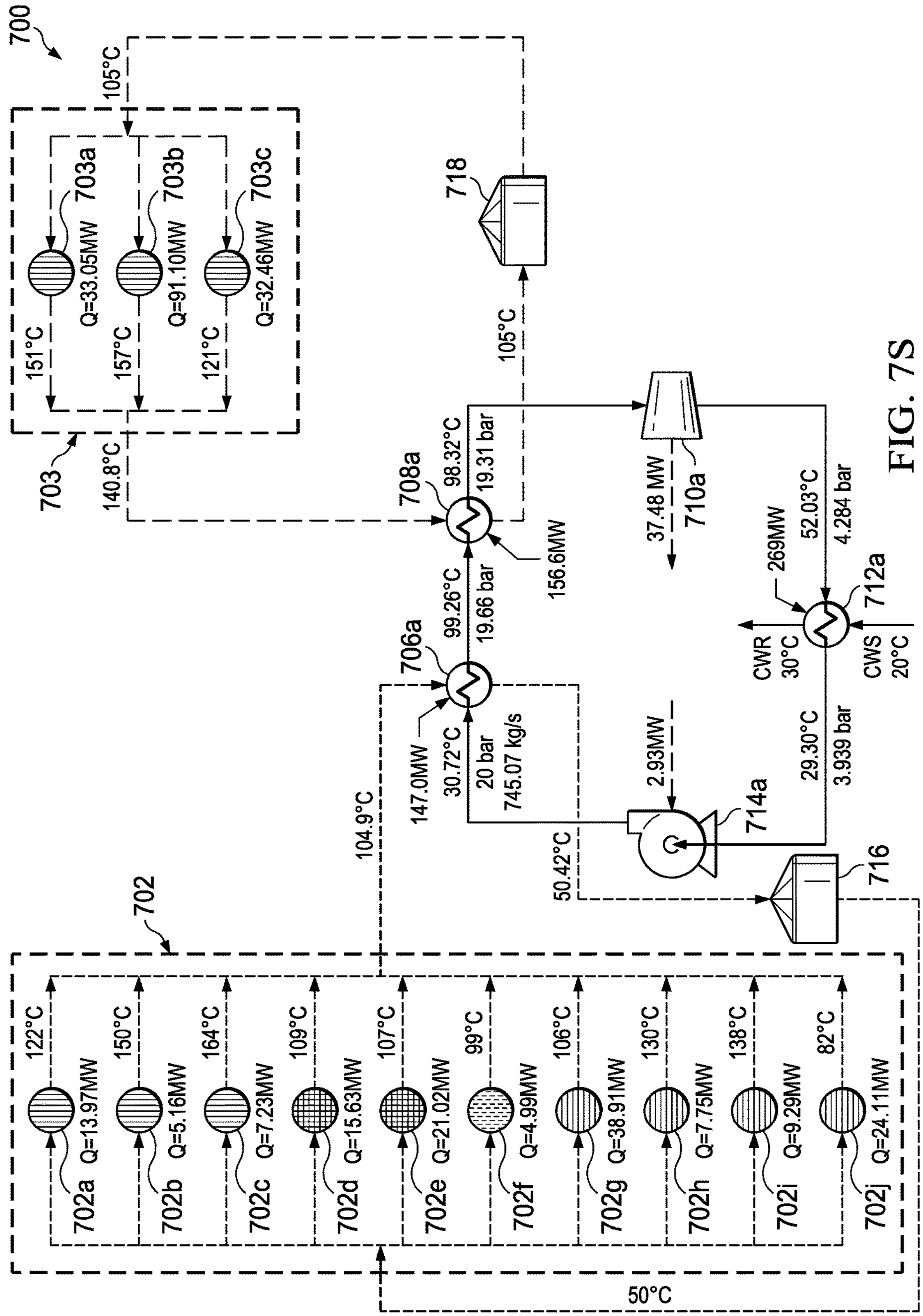
Figure 7T:
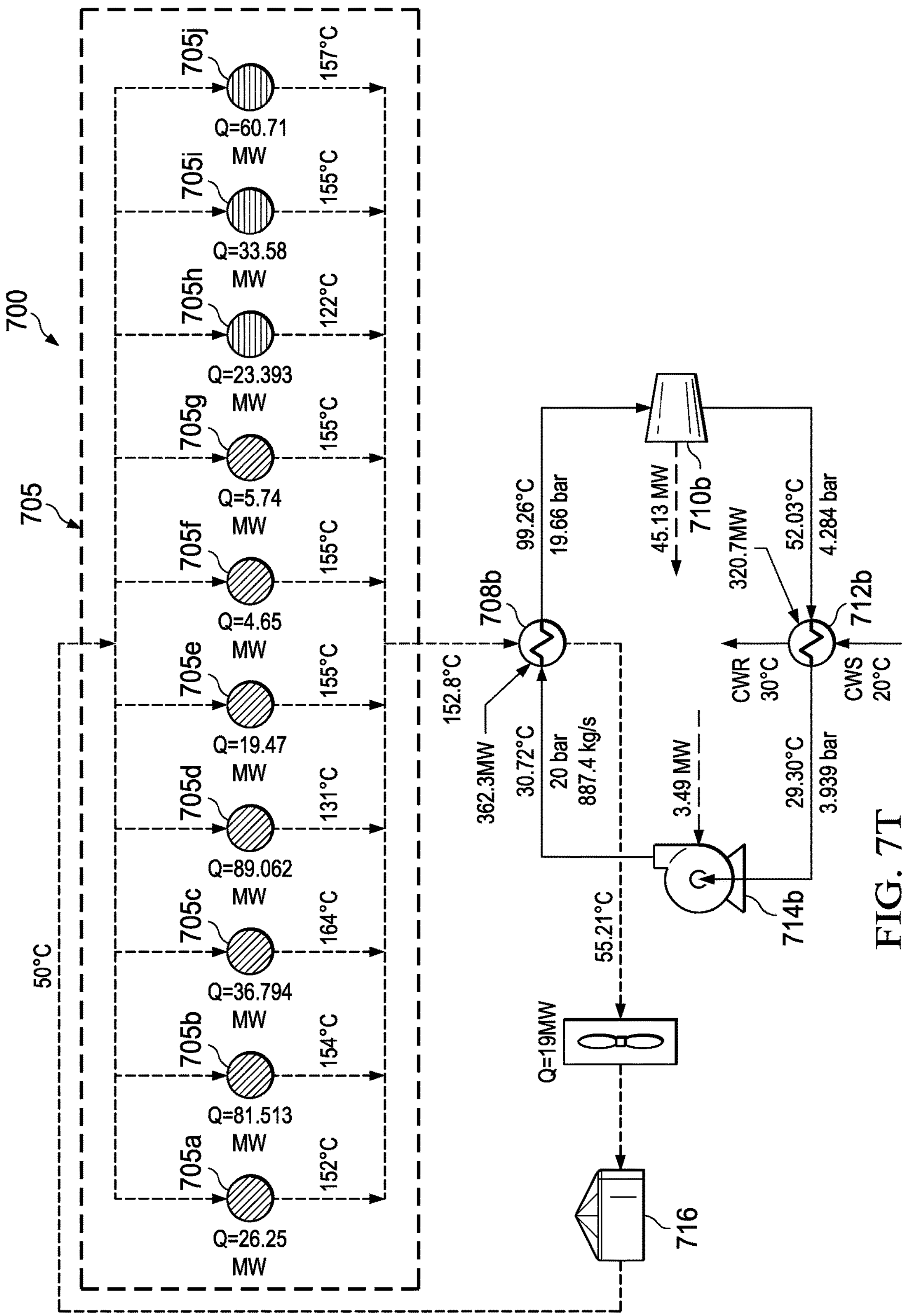
Figure 7V:
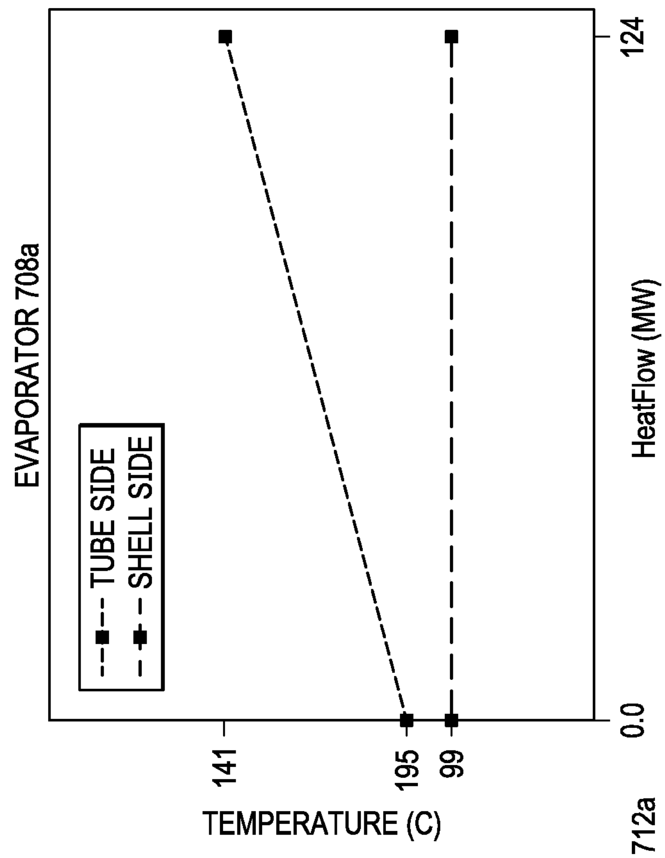
Figure 7U:
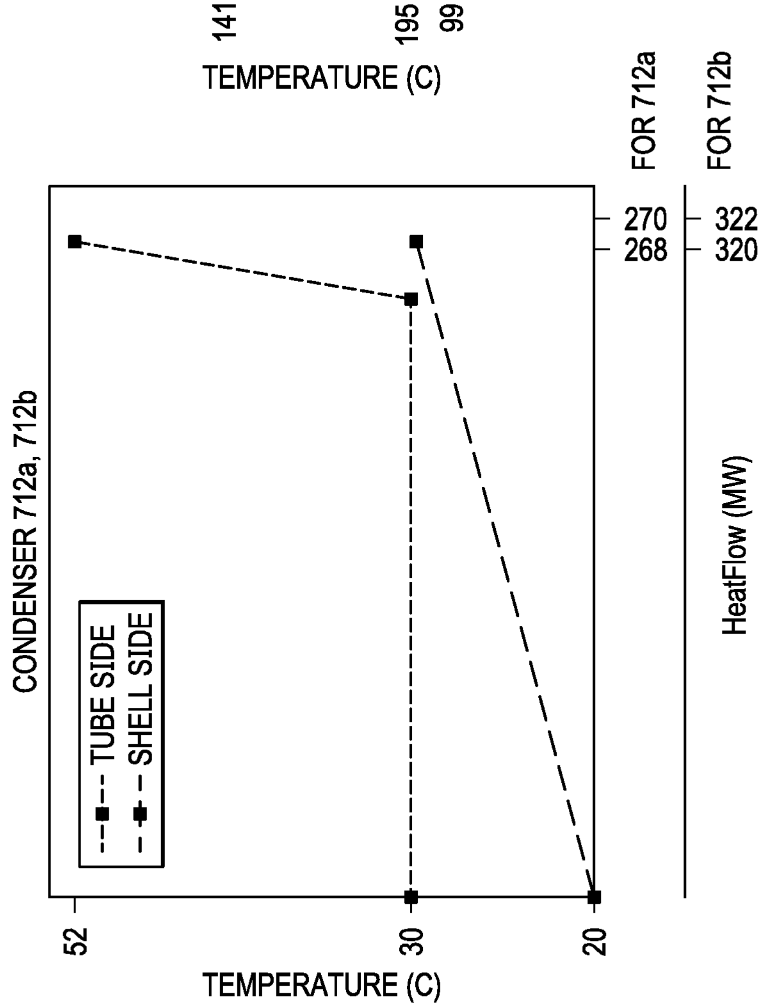

FIGS. 7A-7U illustrate schematic views of an example system 700 for a power conversion network that includes waste heat sources associated with a diesel hydrotreating-hydrocracking plant and a continuous-catalytic-cracking-aromatics plant. In this example system 700, a mini-power plant synthesis uses two independent circuits of ORC systems, sharing hot water (or other heating fluid) and isobutane systems infrastructure, to generate power from specific portions of a crude oil refining-petrochemical site-wide low-low grade waste heat sources, including hydrocracking, diesel hydrotreating and CCR, aromatics plants. In some aspects, the system 700 can be implemented in one or more steps, where each phase can be separately implemented without hindering future steps to implement the system 700. In some aspects, a minimum approach temperature across a heat exchanger used to transfer heat from a heat source to a working fluid (for example, water) can be as low as 3° C. or may be higher. Higher minimum approach temperatures can be used in the beginning of the phases at the expense of less waste heat recovery and power generation, while reasonable power generation economics of scale designs are still attractive in the level of tens of megawatts of power generation.

In some aspects of system 700, optimized efficiency is realized upon using a minimum approach temperature recommended for the specific heat source streams used in the system design. In such example situations, optimized power generation can be realized without re-changing the initial topology or the sub-set of low grade waste heat streams selected/utilized from the whole crude oil refining-petrochemical complex utilized in an initial phase. System 700 and its related process scheme can be implemented for safety and operability through two ORC systems using one or more buffer streams such as hot oil or high pressure hot water systems or a mix of specified connections among buffer systems. The low-low grade waste-heat-to-power-conversion (for example, lower than the low grade waste heat temperature defined by U.S. Department of Energy DOE as 232° C.) may be implemented using one or more ORC systems using isobutane as an organic fluid at specific operating conditions using two buffer systems shared by the two systems of power generation but can be working independently too. In some aspects of system 700, one of the two ORC systems has only an evaporator while the other ORC system has an evaporator and pre-heater.

System 700 may not change with future changes inside individual hydrocracking, hydrotreating, CCR, and aromatics plants to enhance energy efficiency and system 700 may not need to be changed upon improvements in plant waste heat recovery practices, such as heat integration among hot and cold streams. System 700 may use "low-low" grade waste heat, below 160° C. available in heat sources in the medium level crude oil semi-conversion refining facilities and aromatics complex.

FIGS. 7A-7B is a schematic diagram of an example system 700 for a power conversion network that includes waste heat sources associated with a diesel hydrotreating-hydrocracking plant and a continuous-catalytic-crackingaromatics plant. In this example implementation, system 700 utilizes twenty-three distinct heat sources that feed heat through a working fluid (for example, hot water, hot oil, or otherwise) to two ORC systems to produce power. In the illustrated example, the twenty-three heat sources are separated among three heat recovery circuits. For instance, heat recovery circuit 702 includes heat exchangers 702*a*-702*j*. Heat recovery circuit 703 includes heat exchangers 703*a*-703*c*. Heat recovery circuit 705 includes heat exchangers 705*a*-705*j*.

In the illustrated example, each heat exchanger facilitates heat recovery from a heat source in a particular industrial unit to the working fluid. For example, heat exchangers 702*a*-702*c* recover heat from heat sources in a para-xylene separation unit. Heat exchangers 702*d*-702*e* recover heat from heat sources in a para-xylene isomerization reaction and separation unit(s). Heat exchanger 702*f* recovers heat from a heat source(s) in a benzene extraction unit. Heat exchangers 702*g*-702*j* recover heat from heat sources in a continuous catalytic reforming plant (CCR). Together, heat exchangers in the heat recovery circuit 702 recover low grade waste heat from specific streams in a "Naphtha Block" to deliver the heat via the working fluid to an ORC 704*a*. In this example, the heat from heat recovery circuit 702 is provided to a pre-heater 706*a* of the ORC 704*a*.

Generally, the heat recovery circuit 702 receives (for example, from an inlet header that fluidly couples a heating fluid tank 716 to the heat exchangers 702*a*-702*j*) high pressure working fluid (for example, hot water, hot oil, or otherwise) for instance, at between about 40° C. to 60° C. and supplies heated fluid (for example, at an outlet header fluidly coupled to the heat exchangers 702*a*-702*j*) at or about 100-115° C. The heat exchangers 702*a*-702*j* may be positioned or distributed along the CCR-Aromatics module complex and fluidly coupled to low grade waste heat sources from the refining-petrochemical plants. Para-Xylene products separation plant streams may be used as heat sources in the heat recovery circuit 702, along with other plants such as the benzene extraction unit, CCR, and xylene isomerization reaction and separation sections.

Heat exchangers 703*a*-703*c* recover heat from heat sources in a refining-petrochemicals complex portion that contains the para-xylene separation unit. Together, the heat exchangers in the heat recovery circuit 703 recover low grade waste heat to deliver the heat via the working fluid to the ORC 704*a*. In this example, the heat from heat recovery circuit 703 is provided to an evaporator 708*a* of the ORC 704*a*.

Generally, the heat recovery circuit 703 receives (for example, from an inlet header that fluidly couples a heating fluid tank 718 to the heat exchangers 703*a*-703*c*) high pressure working fluid (for example, hot water, hot oil, or otherwise) at or about 100-710° C. and it heats it up to about 125-160° C. The heat exchangers 703*a*-703*c* may be distributed along the CCR-Aromatics module of the refining-petrochemical complex using low grade waste heat sources in the refining-petrochemical complex plants using only para-xylene products separation plant streams.

Heat exchangers 705*a*-705*g* in heat recovery circuit 705, in this example, recover heat from heat sources in a hydrocracking plant separation unit. Heat exchangers 705*h*-705*j* in heat recovery circuit 705, in this example, recover heat from heat sources in a hydrotreating plant separation unit. Together, the heat exchangers in the heat recovery circuit 705 recover low grade waste heat to deliver the heat via the working fluid to an ORC 704*b*. In this example, the heat from heat recovery circuit 705 is provided to an evaporator 708*b* of the ORC 704*b*.

Generally, the heat recovery circuit 705 receives (for example, from an inlet header that fluidly couples the heating fluid tank 716 to the heat exchangers 705*a*-705*j*) high pressure working fluid (for example, hot water, hot oil, or otherwise) at or about 40-60° C. and it heats it up to about 120-160° C.

In the example implementation of system 700, the ORC 704*a* includes a working fluid that is thermally coupled to the heat recovery circuits 702 and 703 to heat the working fluid. In some implementations, the working fluid can be isobutane. The ORC 704*a* can also include a gas expander 710*a* (for example, a turbine-generator) configured to generate electrical power from the heated working fluid. As shown in FIG. 7A, the ORC 704*a* can additionally include a pre-heater 706*a*, an evaporator 708*a*, a pump 714*a*, and a condenser 712*a*. In this example implementation, the heat recovery circuit 702 supplies a heated working, or heating, fluid to the pre-heater 706*a*, while the heat recovery circuit 703 supplies a heated working, or heating, fluid to the evaporator 708*a*.

In the example implementation of system 700, the ORC 704*b* includes a working fluid that is thermally coupled to the heat recovery circuit 705 to heat the working fluid. In some implementations, the working fluid can be isobutane. The ORC 704*b* can also include a gas expander 710*b* (for example, a turbine-generator) configured to generate electrical power from the heated working fluid. As shown in FIG. 7B, the ORC 704*b* can additionally include an evaporator 708*b*, a pump 714*b*, and a condenser 714*b*. In this example implementation, the heat recovery circuit 705 supplies a heated working, or heating, fluid to the evaporator 708*b*.

In a general operation, a working, or heating, fluid (for example, water, oil, or other fluid) is circulated through the heat exchangers of the heat recovery circuits 702, 703, and 705. An inlet temperature of the heating fluid that is circulated into the inlets of each of the heat exchangers may be the same or substantially the same subject to any temperature variations that may result as the heating fluid flows through respective inlets, and may be circulated directly from a heating fluid tank 716 or 718. Each heat exchanger heats the heating fluid to a respective temperature that is greater than the inlet temperature. The heated heating fluids from the heat exchangers are combined in their respective heat recovery circuits and circulated through one of the pre-heater 706*a*, the evaporator 708*a*, or the evaporator 708*b* of the ORC. Heat from the heated heating fluid heats the working fluid of the respective ORC thereby increasing the working fluid pressure and temperature. The heat exchange with the working fluid results in a decrease in the temperature of the heating fluid. The heating fluid is then collected in the heating fluid tank 716 or the heating fluid tank 718 and can be pumped back through the respective heat exchangers to restart the waste heat recovery cycle.

The heating fluid circuit to flow heating fluid through the heat exchangers of system 700 can include multiple valves that can be operated manually or automatically. For example, a modulating control valve (as one example) may be positioned in fluid communication with an inlet or outlet of each heat exchanger, on the working fluid and heat source side. In some aspects, the modulating control valve may be a shut-off valve or additional shut-off valves may also be positioned in fluid communication with the heat exchangers. An operator can manually open each valve in the circuit to cause the heating fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

In the manner described earlier, the heating fluid can be looped through the heat exchangers to recover heat that would otherwise go to waste in the hydrocracking, hydrotreating, CCR, and aromatics plants, and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

FIG. 7C is a schematic diagram that illustrates an example placement of heat exchanger 702*g* in a crude oil refinery continuous catalytic reforming (CCR) plant. In an example implementation illustrated in FIGS. 7C and 7T, this heat exchanger 702*g* may cool down the CCR last stage reactor outlet after the feed-effluent heat exchanger stream from 111° C. to 60° C. using the high pressure working fluid stream of the heat recovery circuit 702 at 50° C. to raise the working fluid temperature to 706° C. The thermal duty of this heat exchanger 702*g* may be about 38.9 MW. The heating fluid stream at 706° C. is sent to the header of heat recovery circuit 702.

FIG. 7D is a schematic diagram that illustrates an example placement of heat exchangers 702*h* and 702*i* in the crude oil refinery continuous catalytic reforming (CCR) plant. In an example implementation illustrated in FIGS. 7D and 7S, these two heat exchangers 702*h* and 702*i* have thermal duties of 7.75 MW and 9.29 MW, respectively. Heat exchanger 702*h* cools down a 1st stage compressor outlet stream from 135° C. to 60° C. using the working fluid stream of heat recovery circuit 702 at 50° C. to raise its temperature to 130° C. The heating fluid stream at 130° C. is sent to the header of heat recovery circuit 702. The heat exchanger 702*i* cools down a 2nd stage compressor outlet stream from 143° C. to 60° C. using the working fluid stream of heat recovery circuit 702 at 50° C. to raise its temperature to 138° C. The heating fluid stream at 138° C. is sent to the header of heat recovery circuit 702.

FIG. 7G is a schematic diagram that illustrates an example placement of heat exchanger 702*j* in the crude oil refinery continuous catalytic reforming (CCR) plant. In an example implementation illustrated in FIGS. 7G and 7S, this heat exchanger 702*j* cools down the CCR light reformate splitter column overhead stream from 87° C. to 60° C. using the working fluid stream of heat recovery circuit 702 at 50° C. to raise the working fluid stream temperature to 82° C. The thermal duty of this heat exchanger 702*j* is about 24.1 MW. The heating fluid at 82° C. is sent to the header of heat recovery circuit 702.

FIG. 7F is a schematic diagram that illustrates an example placement of heat exchanger 702*f* in the benzene extraction unit. In an example implementation illustrated in FIGS. 7F and 7S, this heat exchanger 702*f* cools down an overhead stream from 704° C. to 700° C. using the working fluid stream of heat recovery circuit 702 at 50° C. to raise the working fluid stream temperature to 99° C. The thermal duty of this heat exchanger 702*f* is 4.99 MW. The heating fluid at 99° C. is sent to the header of heat recovery circuit 702.

FIG. 7G is a schematic diagram that illustrates an example placement of heat exchanger 702*d* in the Para-Xylene separation plant. In an example implementation illustrated in FIGS. 7G and 7S, this heat exchanger 702*d* cools down the Xylene isomerization reactor outlet stream before the separator drum from 714° C. to 60° C. using the working fluid stream of heat recovery circuit 702 at 50° C. to raise the working fluid stream temperature to 109° C. The thermal duty of this heat exchanger 702*d* is about 15.6 MW. The heating fluid at 109° C. is sent to the header of heat recovery circuit 702.

FIG. 7H is a schematic diagram that illustrates an example placement of heat exchanger 702*e* in the xylene isomerization de-heptanizer of the Para-Xylene separation plant. In an example implementation illustrated in FIGS. 7H and 7S, this heat exchanger 702*e* cools down the de-heptanizer column overhead stream from 112° C. to 60° C. using the working fluid stream of heat recovery circuit 702 at 50° C. to raise the working fluid stream temperature to 107° C. The thermal duty of this heat exchanger 702*e* is about 21 MW. The heating fluid at 107° C. is sent to the header of heat recovery circuit 702.

FIG. 7I is a schematic diagram that illustrates an example placement of heat exchanger 703*a* in the Para-Xylene separation plant. In an example implementation illustrated in FIGS. 7I and 7S, this heat exchanger 703*a* cools down an extract column overhead stream from 156° C. to 133° C. using the working fluid stream of heat recovery circuit 703 at 705° C. to raise the working fluid stream temperature to 151° C. The thermal duty of this heat exchanger 703*a* is about 33 MW. The heating fluid at 151° C. is sent to the header of heat recovery circuit 703.

FIG. 7J is a schematic diagram that illustrates an example placement of heat exchanger 702*b* in the Para-Xylene separation plant. In an example implementation illustrated in FIGS. 7J and 7S, this heat exchanger 702*b* cools down the PX purification column bottom product stream from 155° C. to 60° C. using the working fluid stream of heat recovery circuit 702 at 50° C. to raise the working fluid stream temperature to 150° C. The thermal duty of this heat exchanger 702*b* is about 5.16 MW. The heating fluid at 150° C. is sent to the header of heat recovery circuit 702.

FIG. 7K is a schematic diagram that illustrates an example placement of heat exchanger 702*a* in the Para-Xylene separation plant. In an example implementation illustrated in FIGS. 7K and 7S, this heat exchanger 702*a* cools down the PX purification column overhead stream from 127° C. to 84° C. using the working fluid stream of heat recovery circuit 702 at 50° C. to raise the working fluid stream temperature to 122° C. The thermal duty of this heat exchanger 702*a* is about 13.97 MW. The heating fluid at 122° C. is sent to the header of heat recovery circuit 702.

FIG. 7L is a schematic diagram that illustrates an example placement of heat exchanger 703*b* in the Para-Xylene separation plant. In an example implementation illustrated in FIGS. 7L and 7S, this heat exchanger 703*b* cools down a Raffinate column overhead stream from 162° C. to 130° C. using the working fluid stream of heat recovery circuit 703 at 705° C. to raise the working fluid stream temperature to 157° C. The thermal duty of this heat exchanger **703*b* is about 91.1 MW. The heating fluid at 157° C. is sent to the header of heat recovery circuit 703**.

FIG. 7M is a schematic diagram that illustrates an example placement of heat exchangers **702*c* and 703*c* in the Para-Xylene separation plant. In an example implementation illustrated in FIGS. 7M and 7S, these two heat exchangers 702*c* and 703*c* have thermal duties of 7.23 MW and 32.46 MW, respectively. Heat exchanger 702*c* cools down the C9+ aromatics before the storage tank from 169° C. to 60° C. using the working fluid stream of heat recovery circuit 702 at 50° C. to raise its temperature to 164° C. The heating fluid stream at 164° C. is sent to the header of heat recovery circuit 702. The heat exchanger 703*c* cools down the heavy Raffinate splitter column overhead stream from 126° C. to 113° C. using the working fluid stream of heat recovery circuit 703 at 705° C. to raise its temperature to 121° C. The heating fluid stream at 121° C. is sent to the header of heat recovery circuit 703**.

FIG. 7N is a schematic diagram that illustrates an example placement of heat exchanger **705*a* in the hydrocracking plant. In an example implementation illustrated in FIGS. 7N and 7T, this heat exchanger 705*a* cools down the 2nd reaction section 2nd stage cold high pressure separator feed stream from 157° C. to 60° C. using the working fluid stream of heat recovery circuit 705 at 50° C. to raise the working fluid stream temperature to 152° C. The thermal duty of this heat exchanger 705*a* is about 26.25 MW. The heating fluid at 152° C. is sent to the header of heat recovery circuit 705**.

FIG. 7O is a schematic diagram that illustrates an example placement of heat exchanger **705*b* in the hydrocracking plant. In an example implementation illustrated in FIGS. 7O and 7T, this heat exchanger 705*b* cools down the 1st reaction section 1st stage cold high pressure separator feed stream from 159° C. to 60° C. using the working fluid stream of heat recovery circuit 705 at 50° C. to raise the working fluid stream temperature to 152° C. The thermal duty of this heat exchanger 705*b* is about 81.51 MW. The heating fluid at 152° C. is sent to the header of heat recovery circuit 705**.

FIGS. 7PA and 7PB illustrates a schematic diagram that illustrates an example placement of heat exchangers **705*c*-705*g* in the hydrocracking plant. In an example implementation illustrated in FIGS. 7PA-7PB and 7S, these heat exchangers 705*c*-705*g* have thermal duties of 36.8 MW, 89 MW, 19.5 MW, 4.65 MW, and 5.74 MW, respectively. Heat exchanger 705*c* cools down the product stripper overhead stream from 169° C. to 60° C. using the working fluid stream of heat recovery circuit 705 at 50° C. to raise its temperature to 164° C. The heating fluid stream at 164° C. is sent to the header of heat recovery circuit 705. The heat exchanger 705*d* cools down the main fractionator overhead stream from 136° C. to 60° C. using the working fluid stream of heat recovery circuit 705 at 50° C. to raise its temperature to 131° C. The heating fluid stream at 131° C. is sent to the header of heat recovery circuit 705. The heat exchanger 705*e* cools down the kerosene product stream from 160° C. to 60° C. using the working fluid stream of heat recovery circuit 705 at 50° C. to raise its temperature to 155° C. The heating fluid stream at 155° C. is sent to the header of heat recovery circuit 705. In an example aspect, a steam generator with a thermal duty of about 5.45 MW using a hot stream temperature of 187° C. is used before this heat exchanger 705*e* to generate low pressure steam for process use. The heat exchanger 705*f* cools down the kerosene pumparound stream from 160° C. to 60° C. using the working fluid stream of heat recovery circuit 705 at 50° C. to raise its temperature to 155° C. The heating fluid stream at 155° C. is sent to the header of heat recovery circuit 705. In an example aspect, a steam generator with a thermal duty of about 5.58 MW using a hot stream temperature of 196° C. is used before this heat exchanger 705*f* to generate low pressure steam for process use. The heat exchanger 705*g* cools down the diesel product stream from 160° C. to 60° C. using the working fluid stream of heat recovery circuit 705 at 50° C. to raise its temperature to 155° C. The heating fluid stream at 155° C. is sent to the header of heat recovery circuit 705. In an example aspect, a steam generator with a thermal duty of about 6.47 MW using a hot stream temperature of 204° C. is used before this heat exchanger 705*g*** to generate low pressure steam for process use.

FIG. 7Q is a schematic diagram that illustrates an example placement of heat exchanger **705*h* in the hydrotreating plant. In an example implementation illustrated in FIGS. 7Q and 7T, this heat exchanger 705*h* cools down the light effluent to cold separator stream from 127° C. to 60° C. using the working fluid stream of heat recovery circuit 705 at 50° C. to raise the working fluid stream temperature to 122° C. The thermal duty of this heat exchanger 705*h* is about 23.4 MW. The heating fluid at 122° C. is sent to the header of heat recovery circuit 705**.

FIG. 7R is a schematic diagram that illustrates an example placement of heat exchangers **705*i* and 705*j* in the hydrotreating plant. In an example implementation illustrated in FIGS. 7R and 7T, these heat exchangers have thermal duties of 33.58 MW and 60.71 MW, respectively. The heat exchanger 705*i* cools down the diesel stripper overhead stream from 160° C. to 60° C. using the working fluid stream of heat recovery circuit 705 at 50° C. to raise the working fluid stream temperature to 155° C. The heating fluid at 155° C. is sent to the header of heat recovery circuit 705. In an example aspect, a steam generator with a thermal duty of about 6.38 MW using an overhead hot stream temperature of 182° C. is used before this heat exchanger 705*i* to generate low pressure steam for process use. The heat exchanger 705*i* cools down the diesel stripper product stream from 162° C. to 60° C. using the working fluid stream of heat recovery circuit 705 at 50° C. to raise the working fluid stream temperature to 157° C. The heating fluid at 157° C. is sent to the header of heat recovery circuit 705**.

As described earlier, FIGS. 7S-7T illustrate a specific example of the system 700, including some example temperatures, thermal duties, efficiencies, power inputs, and power outputs. For example, as illustrated in FIG. 7S, the CCR-Aromatics module generates a power output (with a gas turbine **710*a* using efficiency of 85%) of about 37.5 MW and the power consumed in the pump using efficiency of 75% is about 2.9 MW. The ORC 704*a* high pressure at the inlet of the turbine is about 20 bar and at the outlet is about 4.3 bar. The condenser 712*a* water supply temperature is assumed to be at 20° C. and return temperature is assumed to be at 30° C. The evaporator 708*a* thermal duty is about 157 MW to vaporize about 745 Kg/s of isobutane. The ORC 704*a* isobutane pre-heater 706*a* thermal duty is about 147 MW to heat up the isobutane from about 31° C. to 99° C. The condenser 712*a*** cooling duty is 269 MW to cool down and condense the same flow of isobutane from about 52° C. to 30° C.

As illustrated in FIG. 7T, the Hydrocracking-Diesel Hydrotreating module generates about 45 MW (with the gas turbine **710*b* using efficiency of 85%), and the power consumed in the pump 714*b* using efficiency of 75% is about 3.5 MW. The ORC 704*b* high pressure at the inlet of the turbine 710*b*** is about 20 bar and at the outlet is about 4.3 bar.

The condenser 712*b* water supply temperature is assumed to be at 20° C. and return temperature is assumed to be at 30° C. The evaporator 708*b* thermal duty is about 363 MW to pre-heat and vaporize about 887 Kg/s of isobutane from about 31° C. to 99° C., and the condenser 712*b* cooling duty is about 321 MW to cool down and condense the same flow of isobutane from about 52° C. to 30° C.

FIG. 7U is a graph that shows a tube side fluid temperature (for example, a cooling, or condenser, fluid flow) and a shell side fluid temperature (for example, an ORC working fluid flow) in the condensers 712*a* and 712*b* during an operation of the system 700. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature. As shown in FIG. 7U, the condenser water (entering the tubes of the condensers 712*a* and 712*b*) enters at about 20° C. and leaves at about 30° C. The ORC working fluid (entering the shell-side of the condensers) enters as a vapor at about 52° C., and then condenses at 30° C. and leaves the condensers as a liquid at 30° C.

FIG. 7V is a graph that shows a tube side fluid temperature (for example, a heating fluid flow) and a shell side fluid temperature (for example, an ORC working fluid flow) in the evaporator 708*a* during an operation of the system 700. This graph shows a temperature difference between the fluids on the y-axis relative to a heat flow between the fluids on the x-axis. For example, as shown in this figure, as the temperature difference between the fluids decreases, a heat flow between the fluids can increase. For example, as shown in FIG. 7V, as the tube-side fluid (for example, the hot oil or water in the heating fluid circuit 703) is circulated through the evaporator 708*a*, heat is transferred from that fluid to the shell-side fluid (for example, the ORC working fluid). Thus, the tube-side fluid enters the evaporator 708*a* at about 141° C. and leaves the evaporator 708*a* at about 705° C. The shell-side fluid enters the evaporator 708*a*, from the pre-heater 706*a*, at about 99° C. (for example, as a liquid or mixed phase fluid) and leaves the evaporator 708*a* also at about 99° C. (for example, as a vapor with some superheating).

Figure 7W:
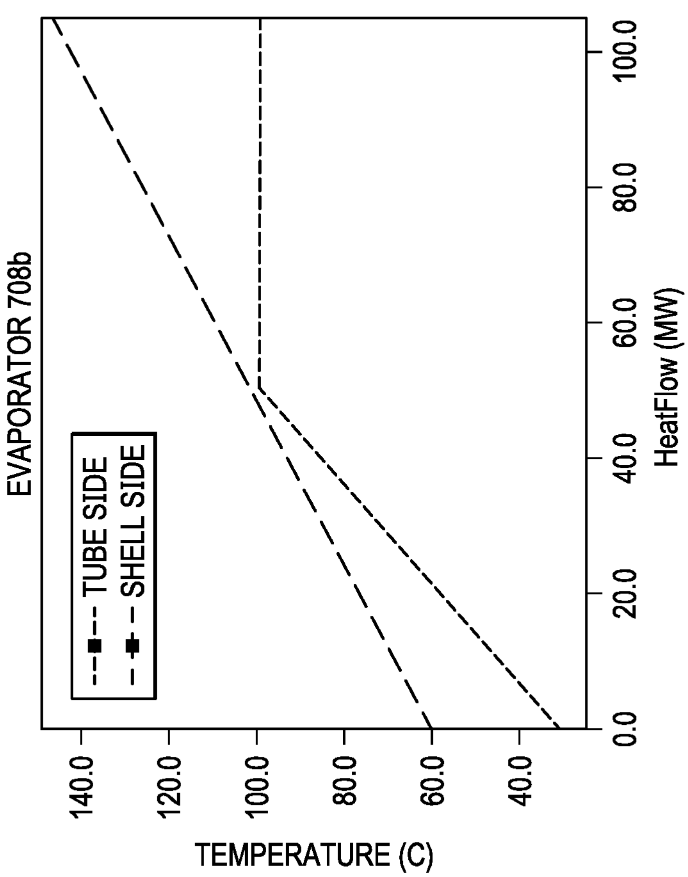

FIG. 7W is a graph that shows a tube side fluid temperature (for example, a heating fluid flow) and a shell side fluid temperature (for example, an ORC working fluid flow) in the evaporator 708*b* during an operation of the system 700. This graph shows a temperature difference between the fluids on the y-axis relative to a heat flow between the fluids on the x-axis. For example, as shown in this figure, as the temperature difference between the fluids decreases, a heat flow between the fluids can increase. As shown in FIG. 7W, as the tube-side fluid (for example, the hot oil or water in the heating fluid circuit 705) is circulated through the evaporator 708*b*, heat is transferred from that fluid to the shell-side fluid (for example, the ORC working fluid). Thus, the tube-side fluid enters the evaporator 708*b* at about 140° C. and leaves the evaporator 708*b* at about 705° C. The shell-side fluid enters the evaporator 708*b* at about 30° C. (for example, as a liquid) and leaves the evaporator 708*b* at about 99° C. (for example, as a vapor). The graph in FIG. 7W includes a "pinch point" for the shell-side fluid (for example, the ORC working fluid). The pinch point, which occurs as the fluid reaches about 99° C., represents the temperature at which the shell-side fluid vaporizes. As the shell-side fluid continues through the respective evaporator, the fluid temperature remains substantially constant (that is, about 99° C.) as the fluid complete vaporizes and, in some aspects, becomes superheated.

Figure 7X:
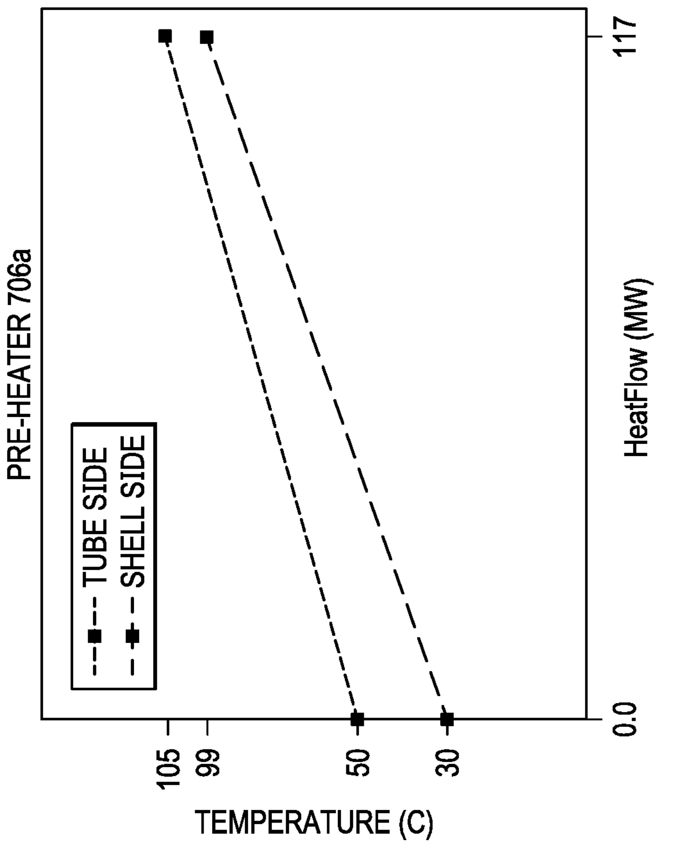

FIG. 7X is a graph that show a tube-side fluid temperature (for example, a heating fluid flow) and a shell-side fluid temperature (for example, an ORC working fluid flow) in the pre-heater 706*a* during an operation of the system 700. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 7X, as the tube-side fluid (for example, the hot oil or water in the heating fluid circuit 702) is circulated through the pre-heater 706*a*, heat is transferred from that fluid to the shell-side fluid (for example, the ORC working fluid). Thus, the tube-side fluid enters the pre-heater 706*a* at about 705° C. and leaves the pre-heater 706*a* at about 50° C. The shell-side fluid enters the pre-heater 706*a* at about 30° C. (for example, as a liquid) and leaves the pre-heater 706*a* at about 99° C. (for example, also as a liquid or mixed phase fluid).

In the illustrated example, system 700 may include two-independent modules-based power generation using a diesel hydrotreating-hydrocracking plant module and a continuous-catalytic-cracking-aromatics plant module for a more energy efficient and "greener" configuration in refining-petrochemical complex via converting its low-low grade waste heat to net power by about 76 MW for local utilization or export to the national electricity grid. System 700 may facilitate the reduction in power-generation-based GHG emissions with desired operability due to the independent nature of the two modules in the scheme.

Figure 8A:
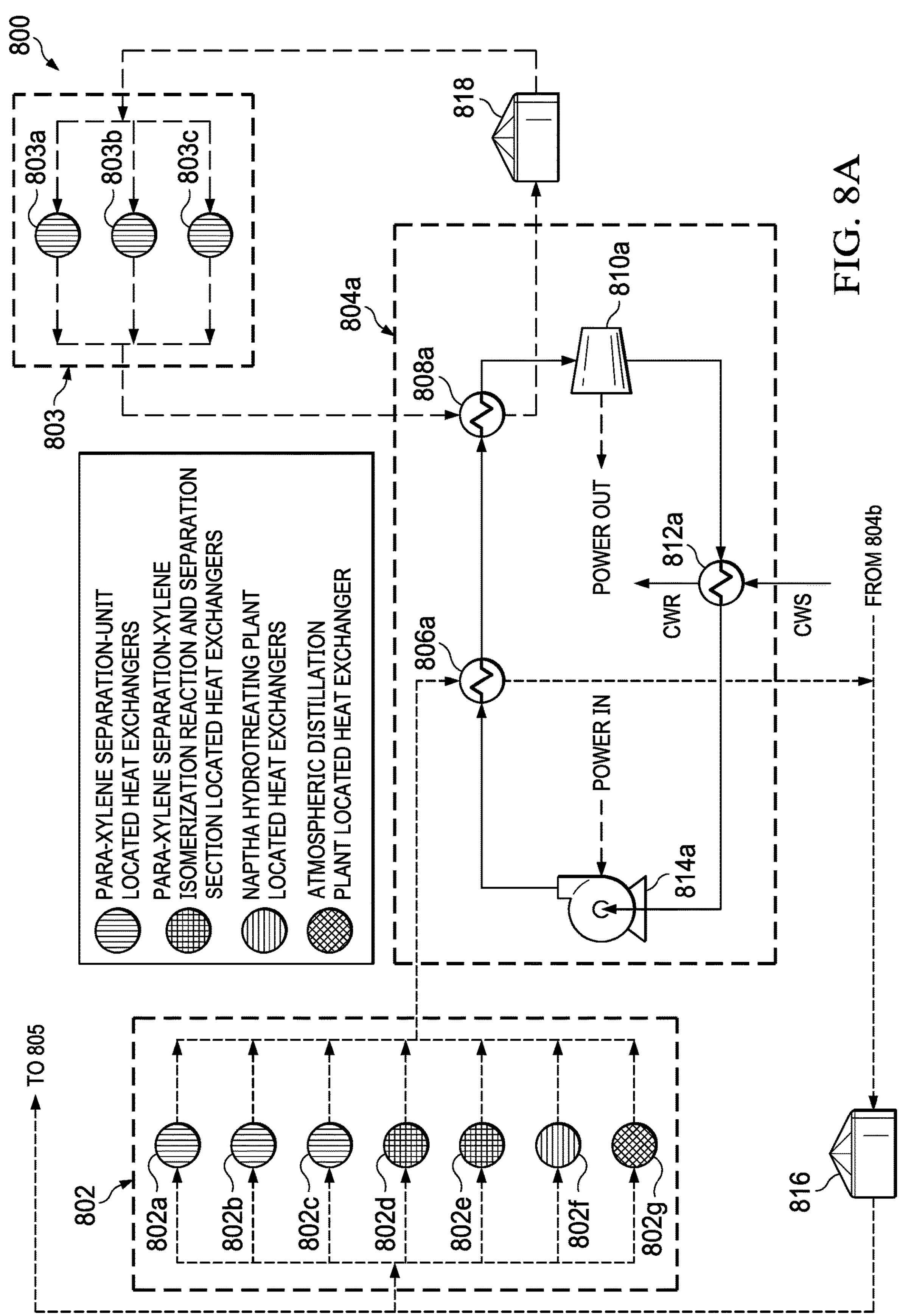
FIGS. 8A-8R are schematic illustrations of a power generation system that utilizes waste heat from one or more heat sources in a petrochemical refining plant.
Figure 8B:
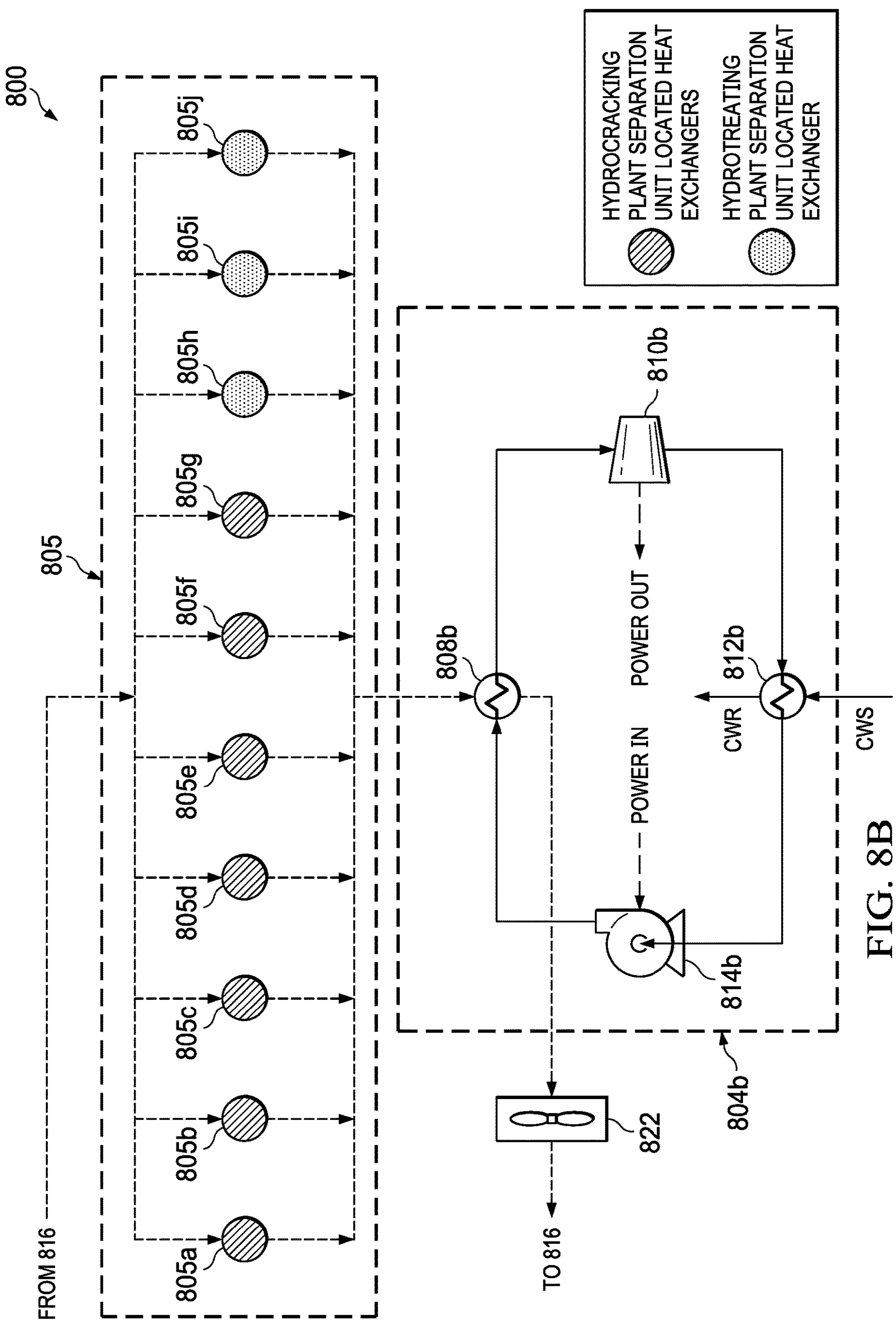
FIGS. 8S-8UB are graphs that illustrate heat exchanger performance of heat exchangers in the power generation system shown in FIGS. 8Q-8R.
Figure 8C:
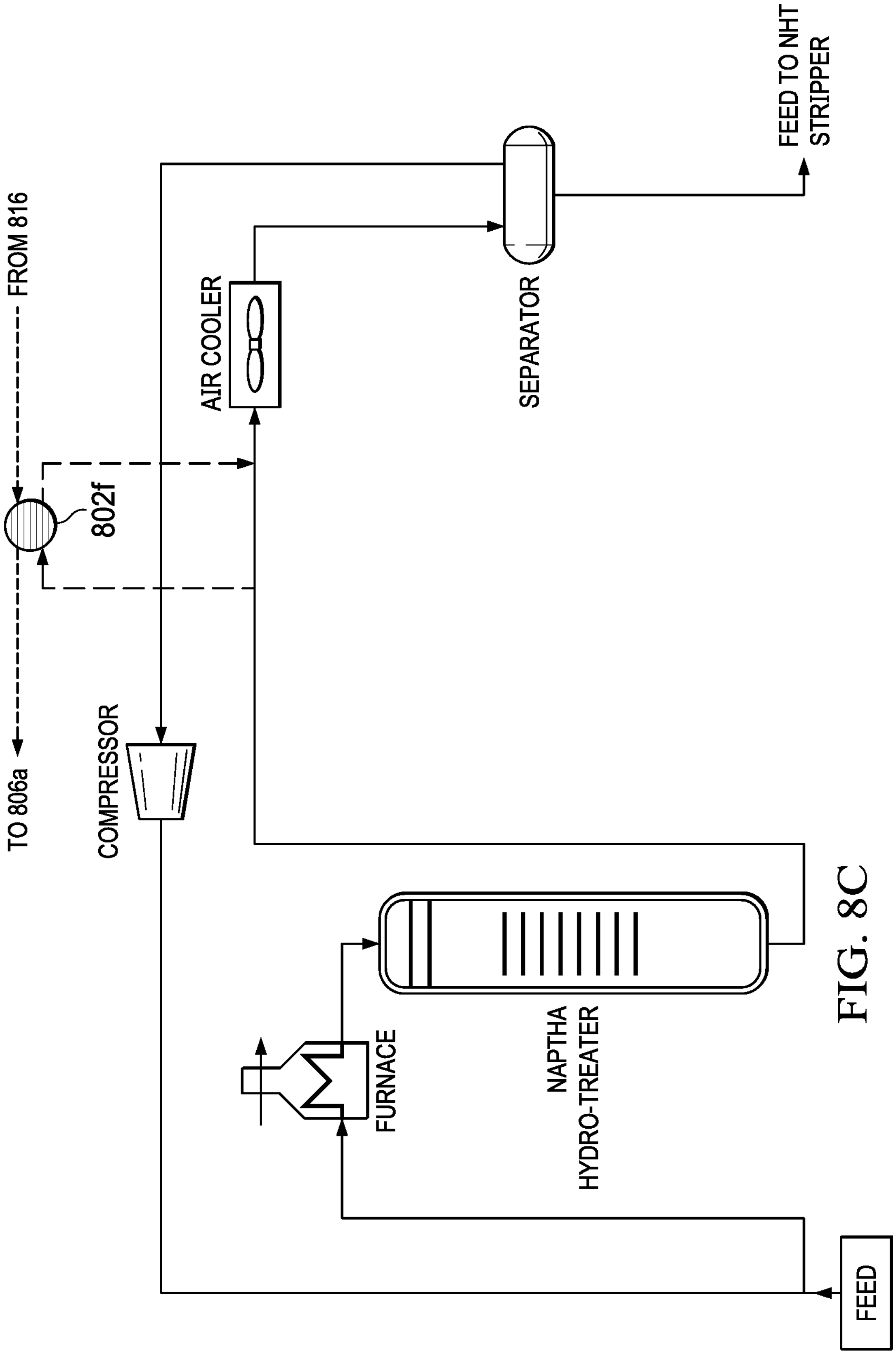
Figure 8D:
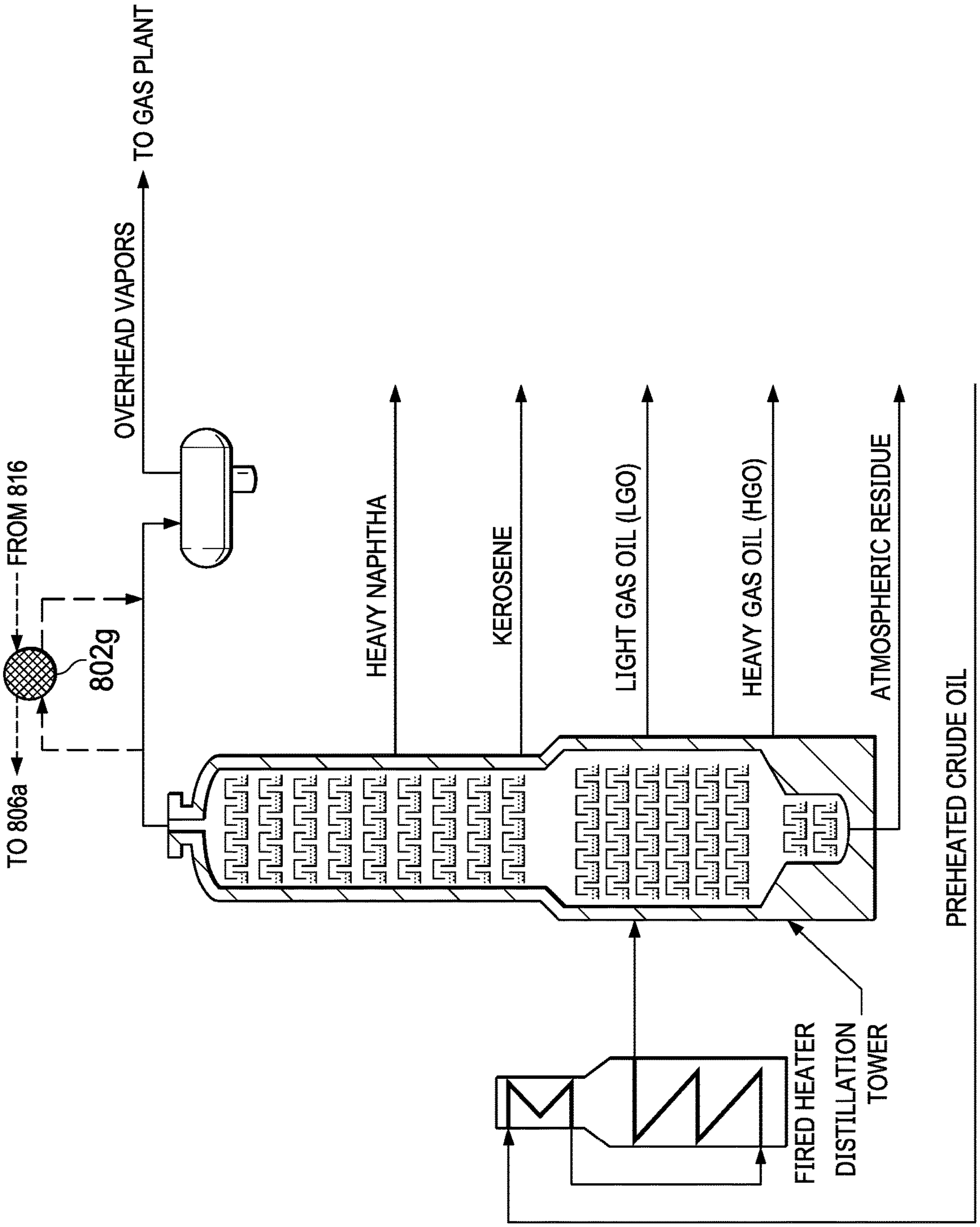
Figure 8E:
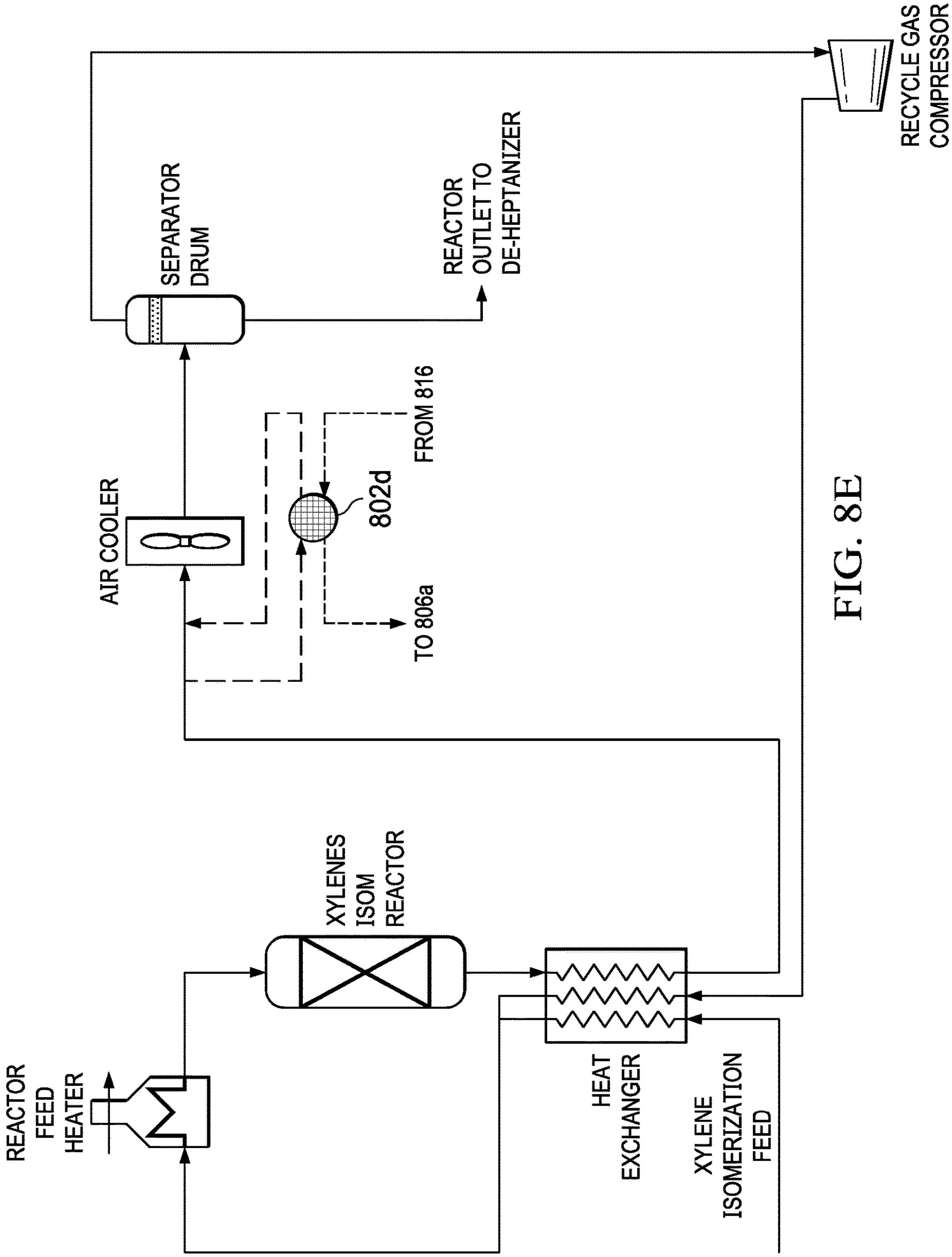
Figure 8F:
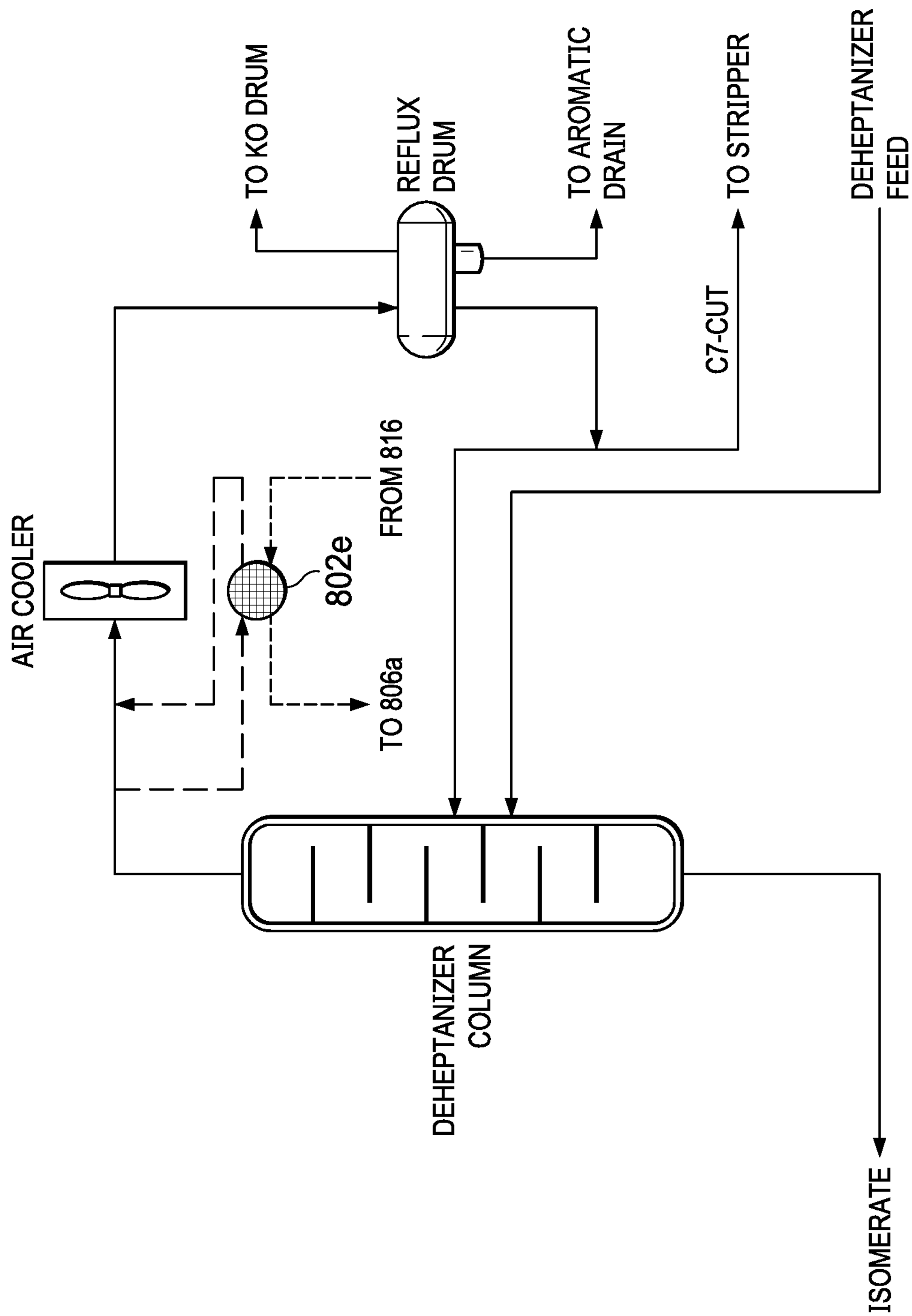
Figure 8G:
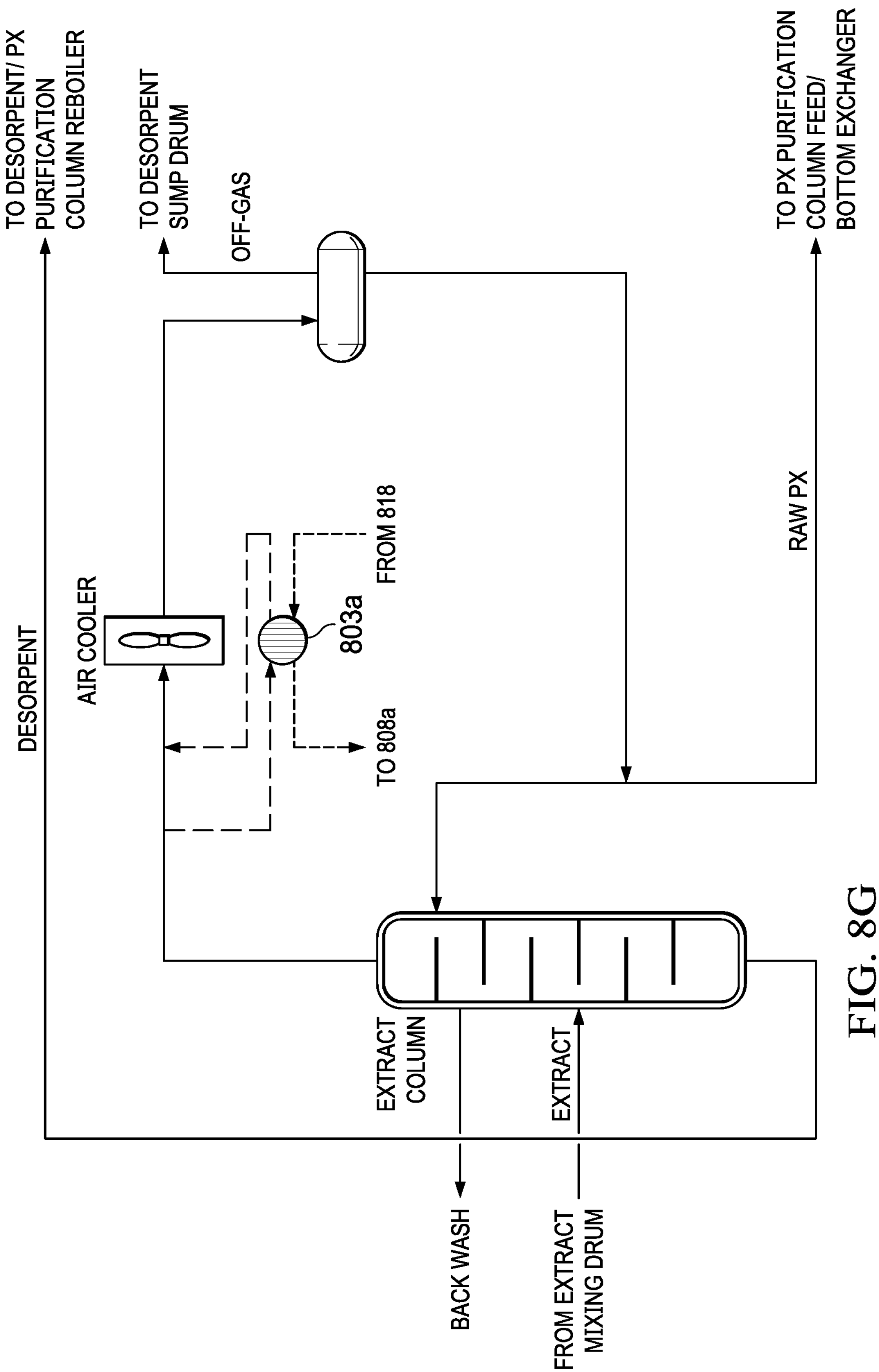
Figure 8H:
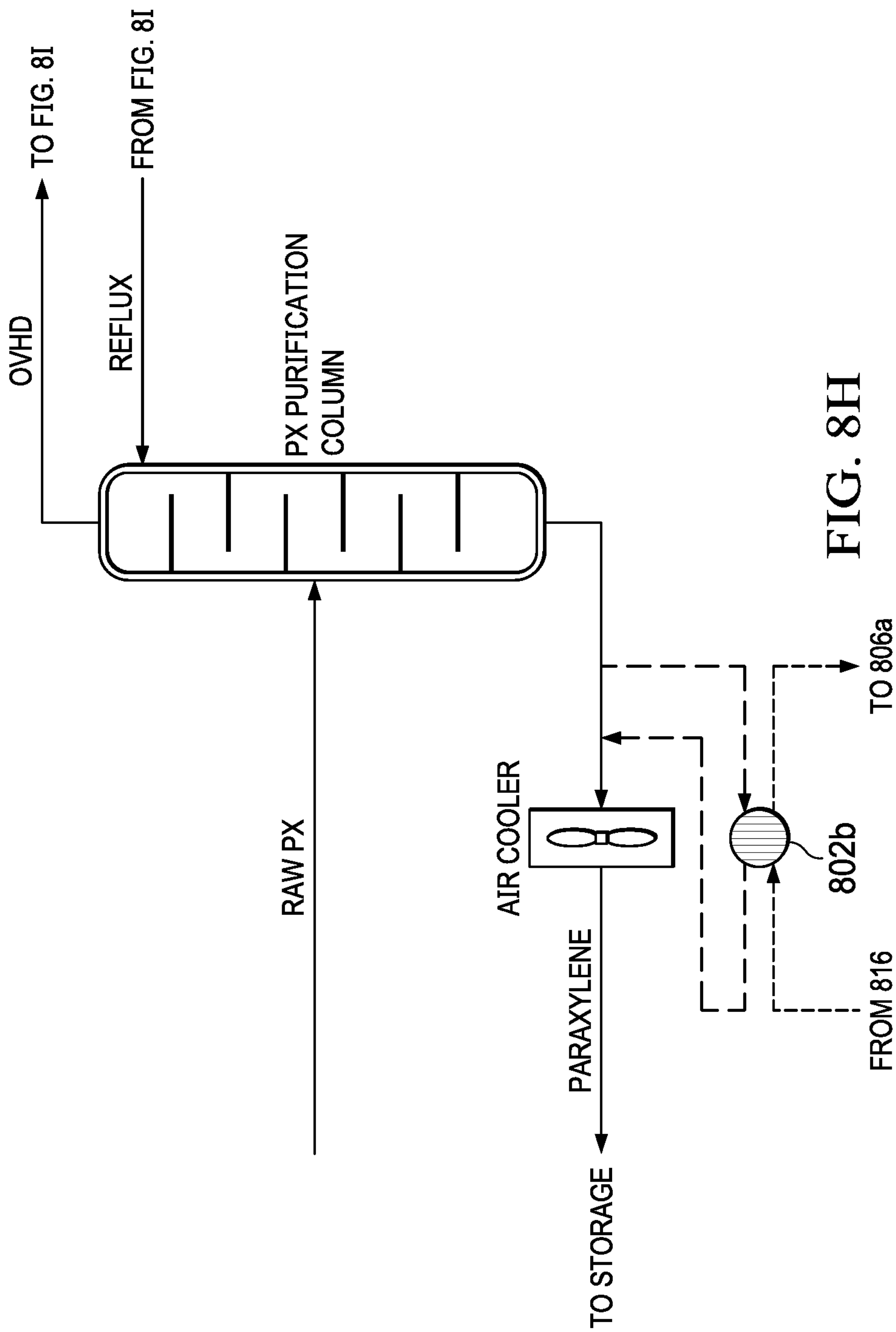
Figure 8I:
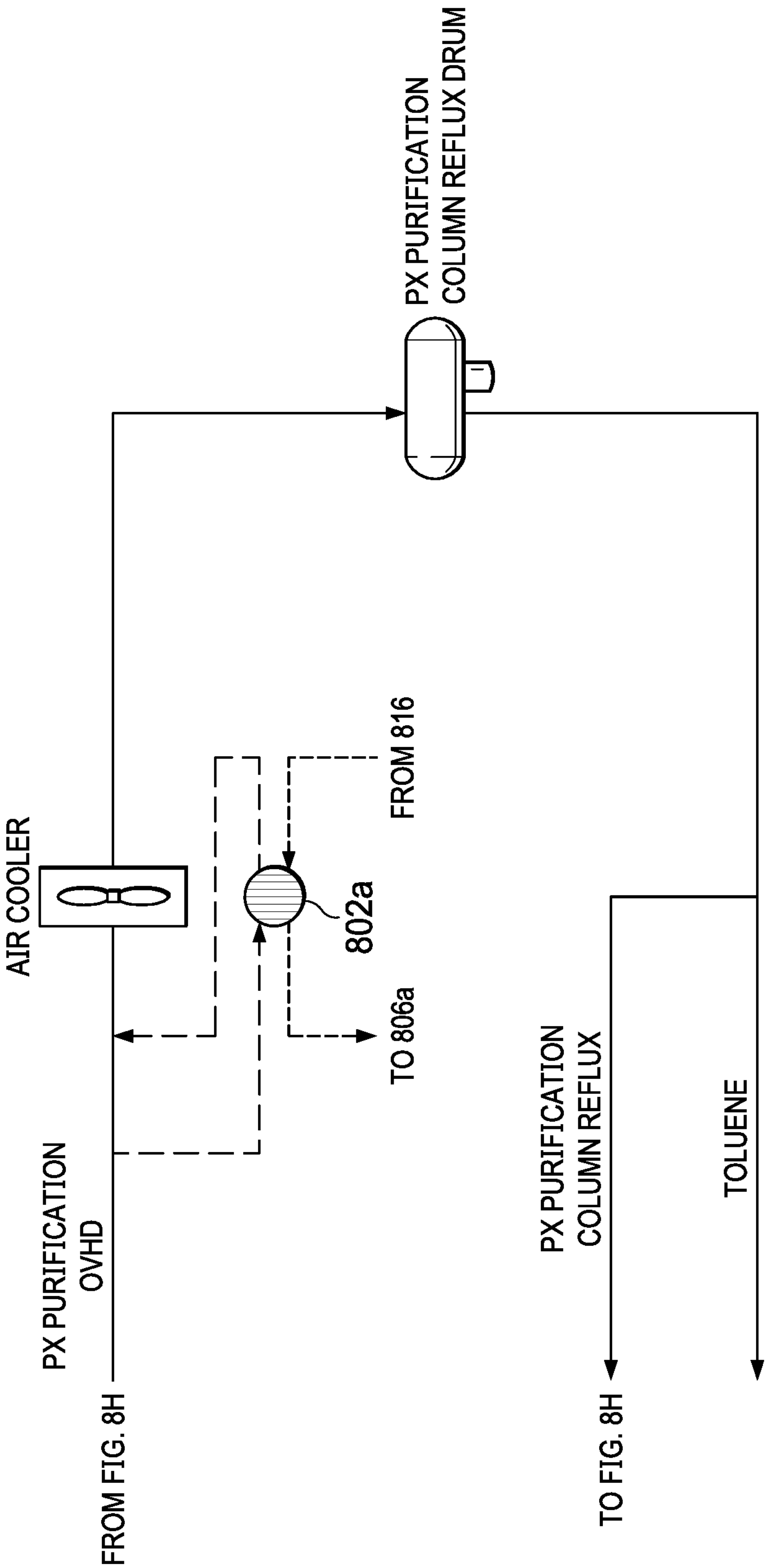
Figure 8J:
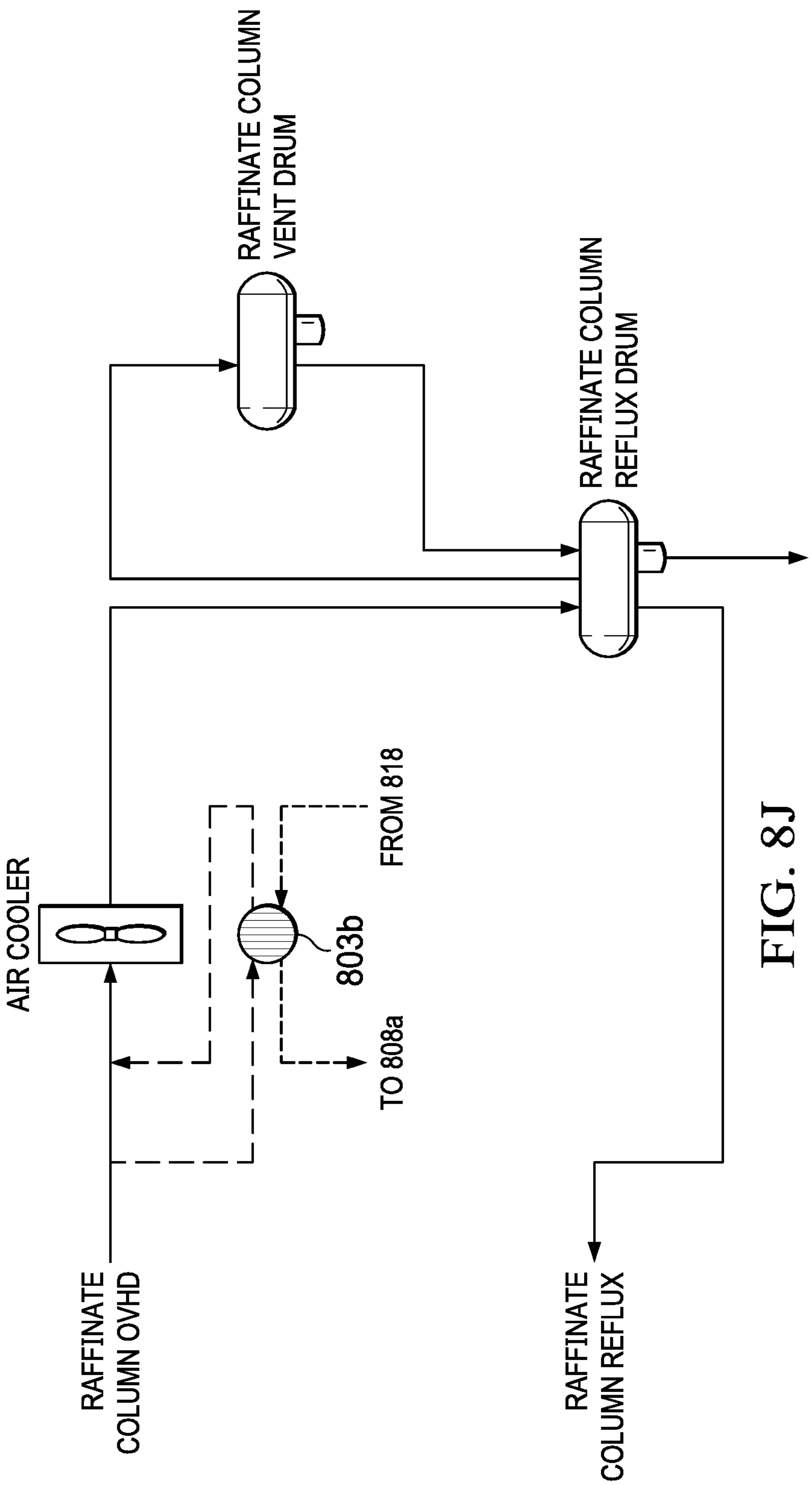
Figure 8K:
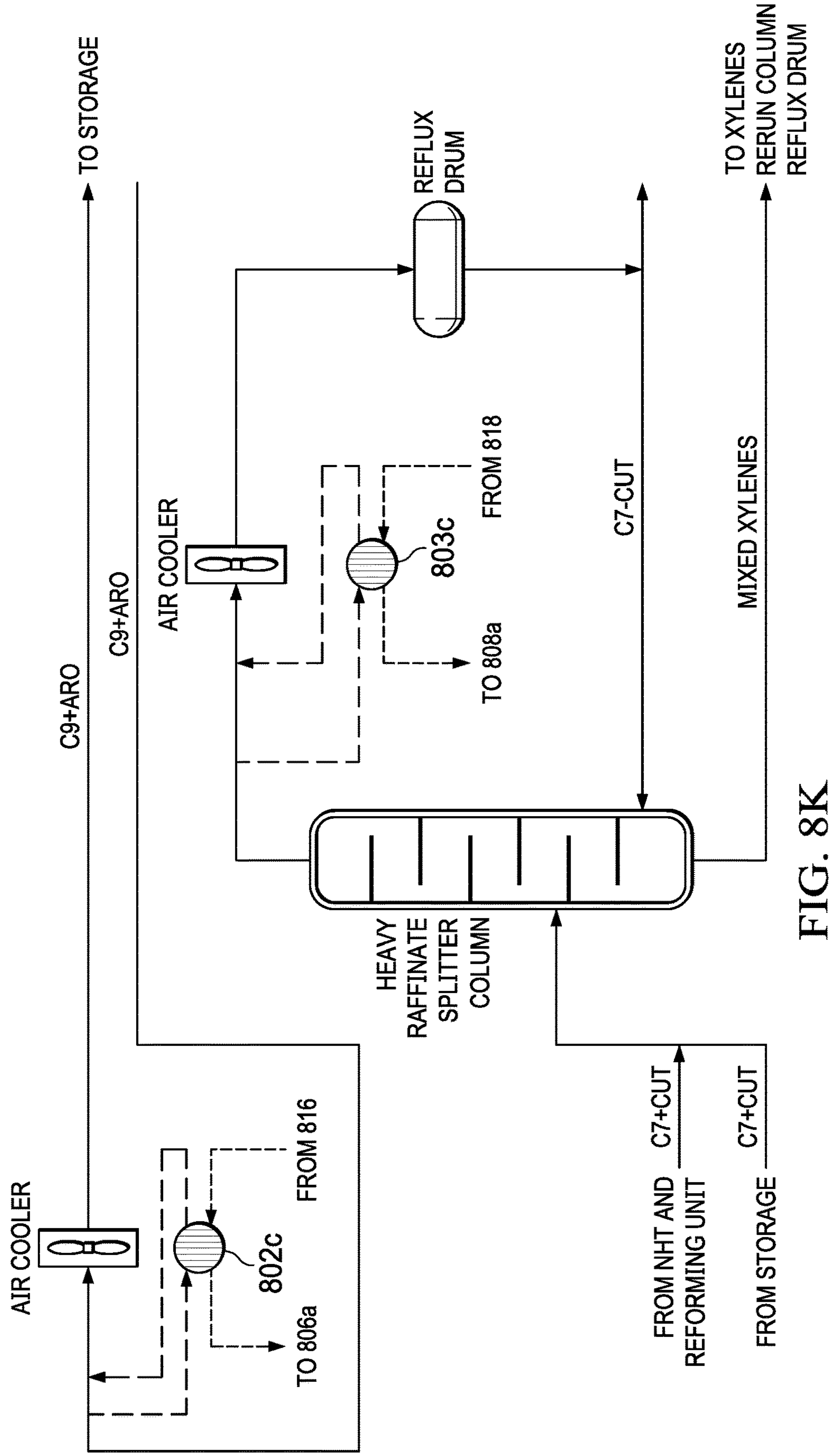
Figure 8L:
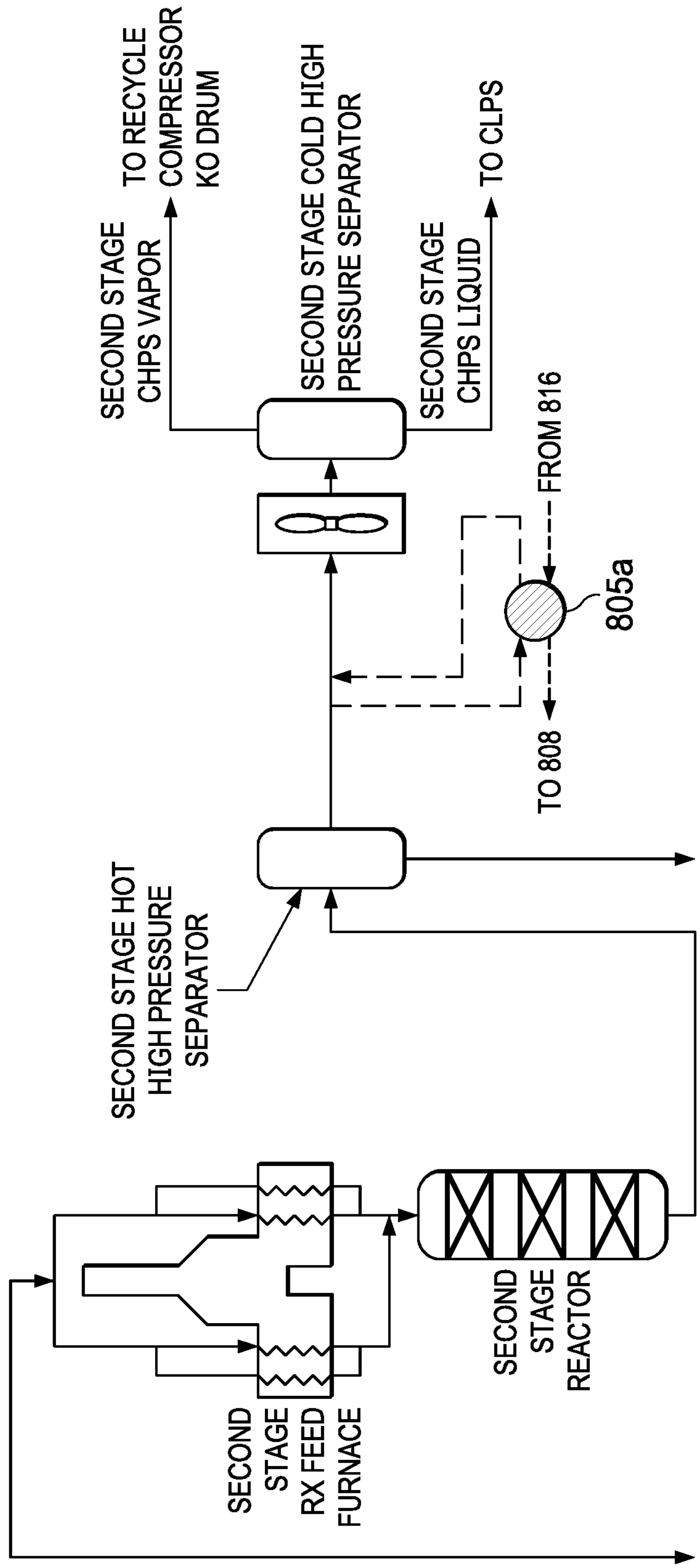
Figure 8M:
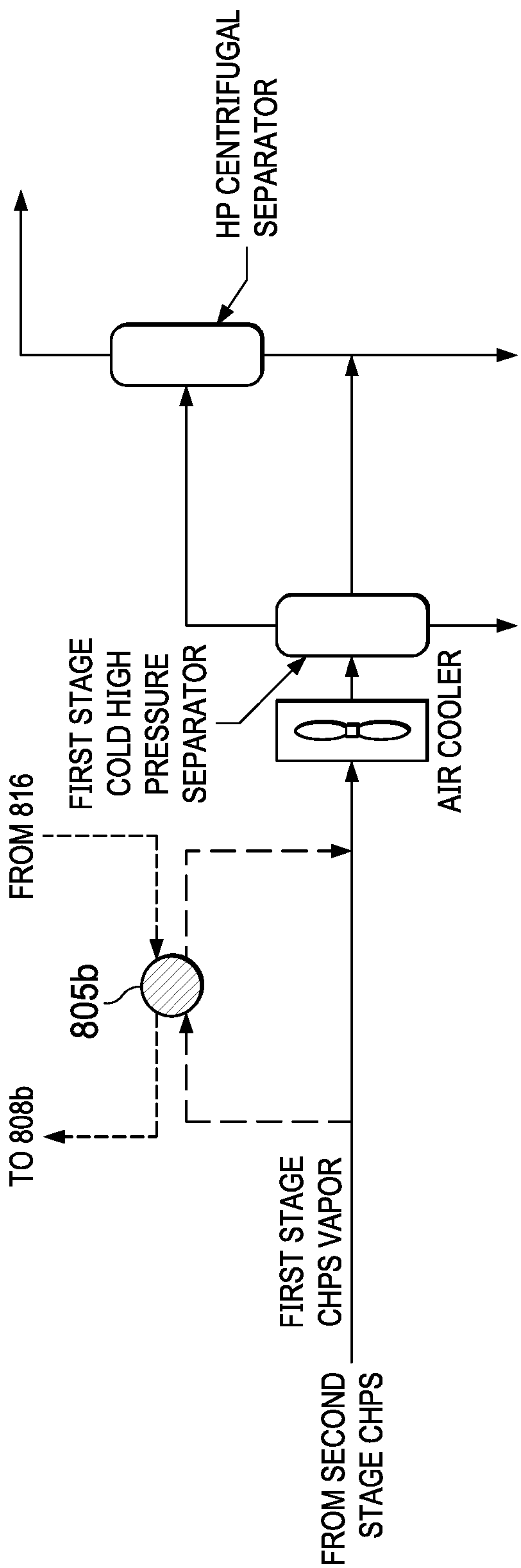
Figure 8N:
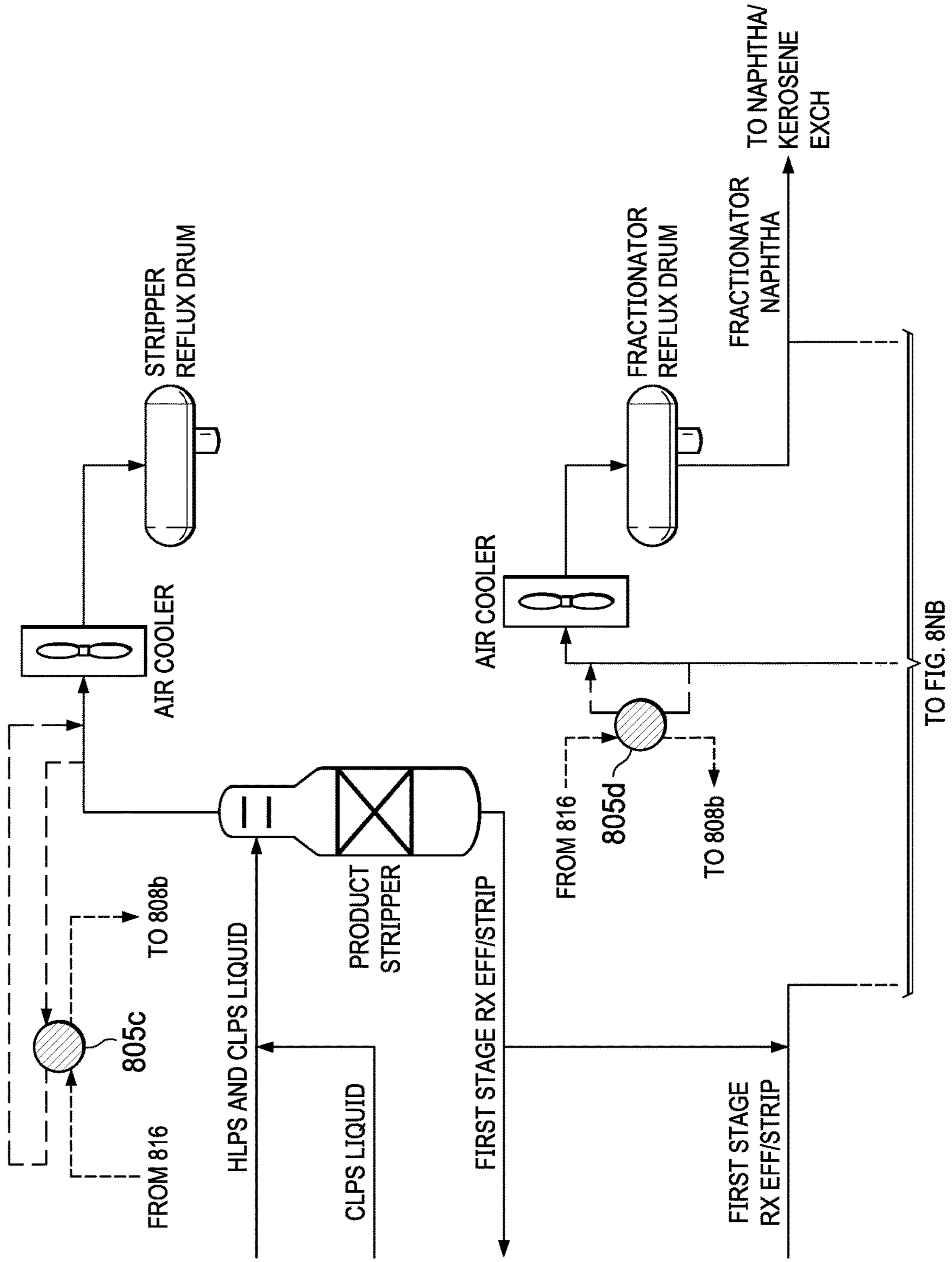
Figure 8N:
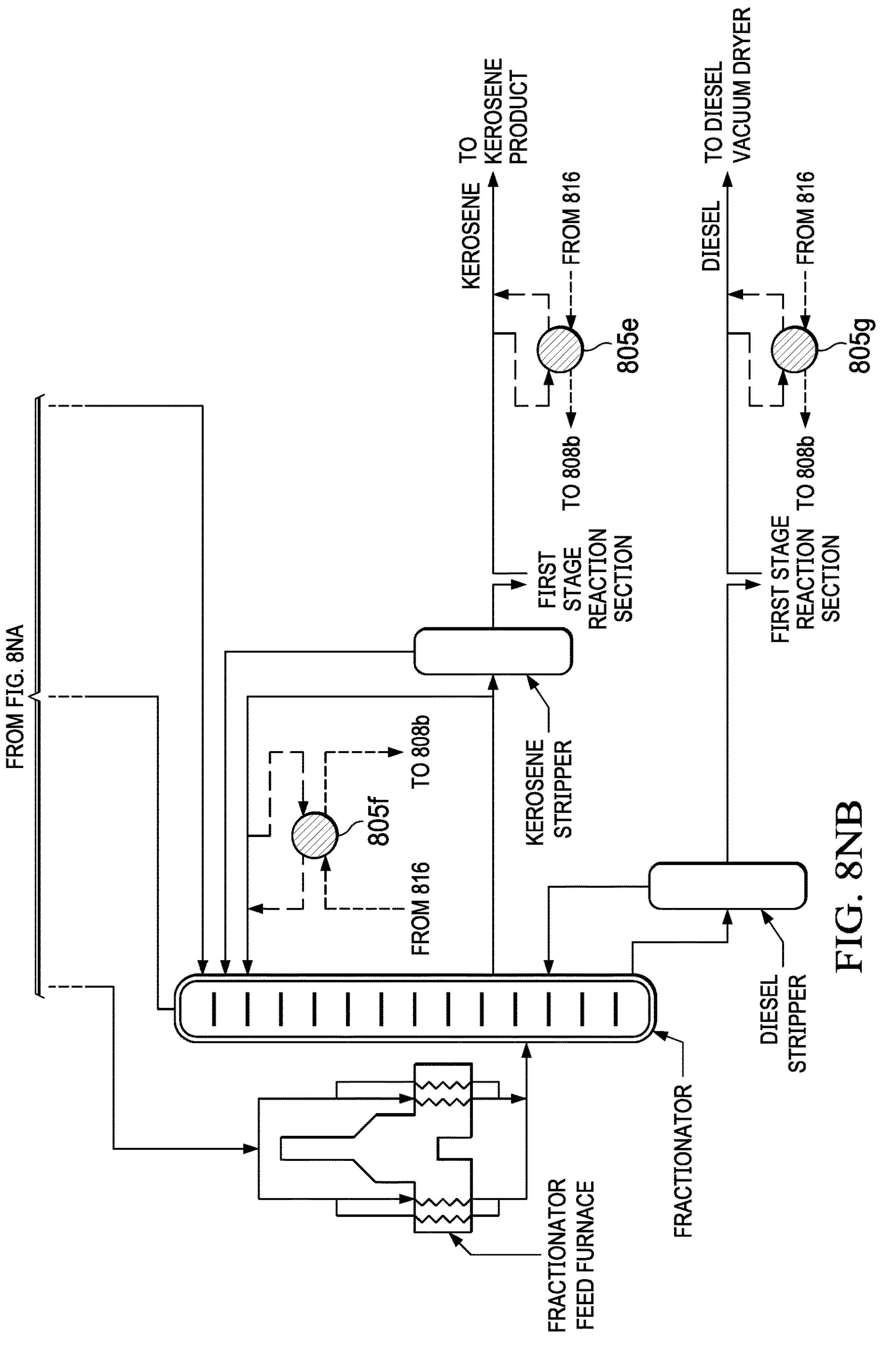
Figure 8O:
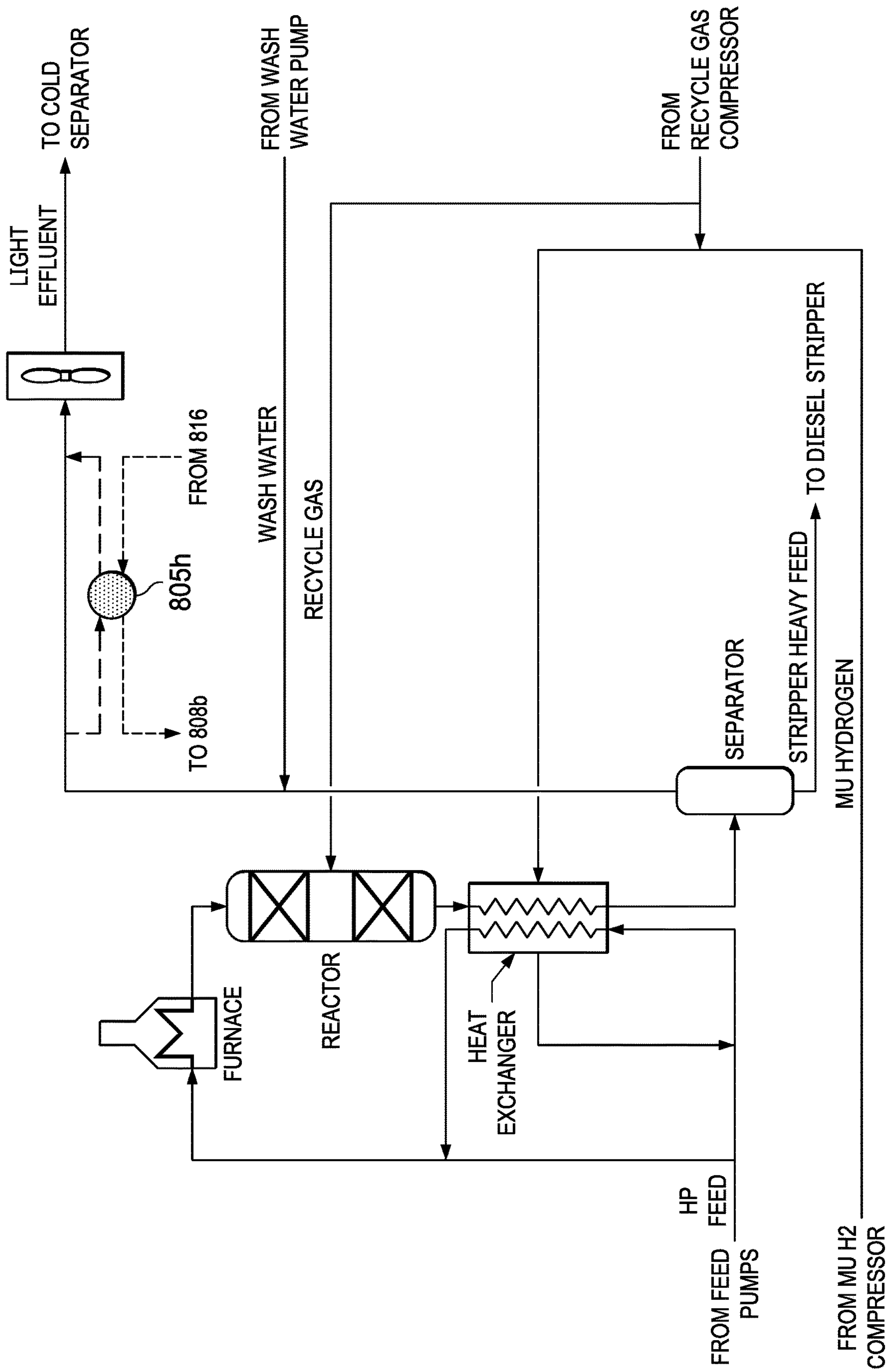
Figure 8P:
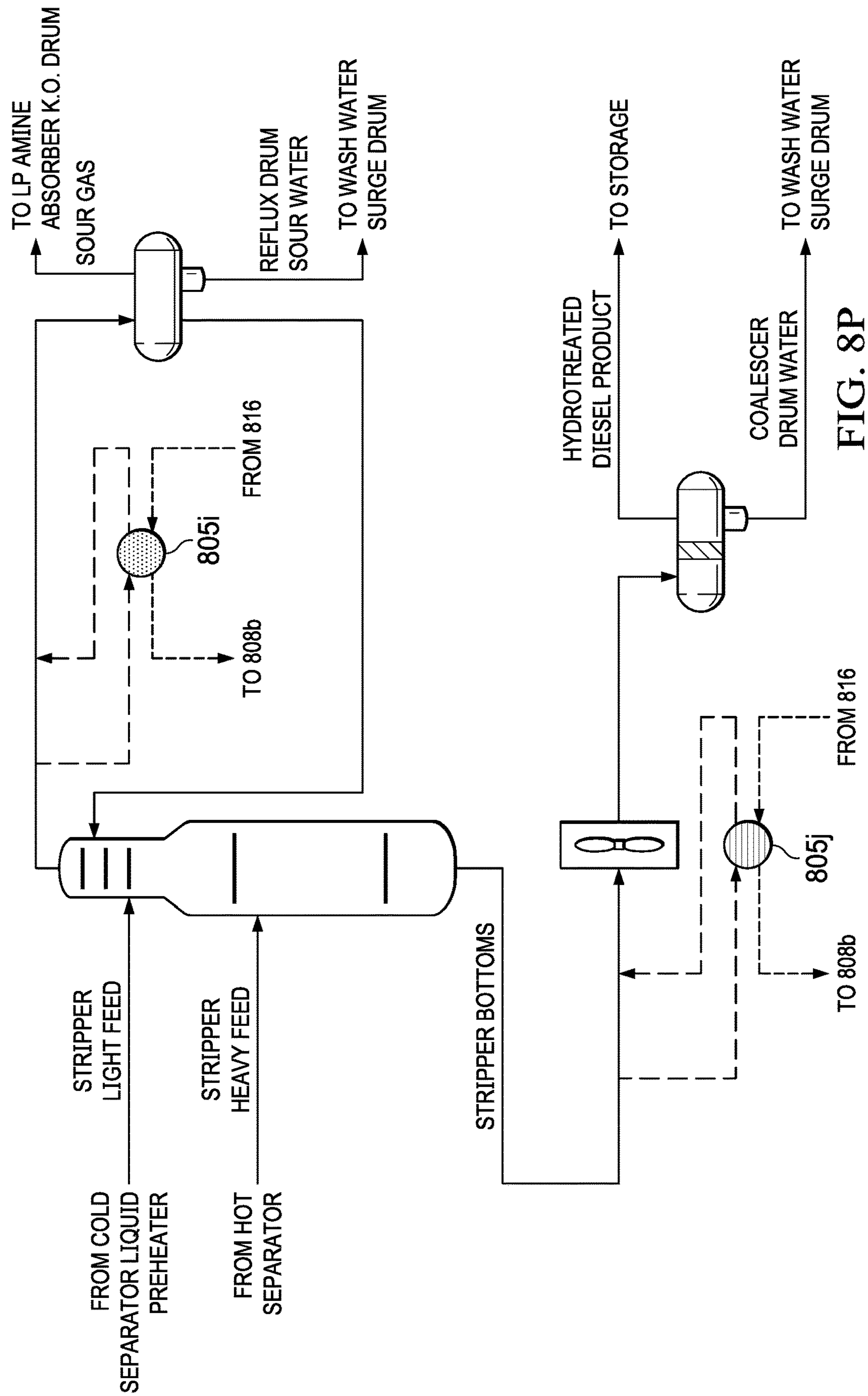
Figure 8Q:
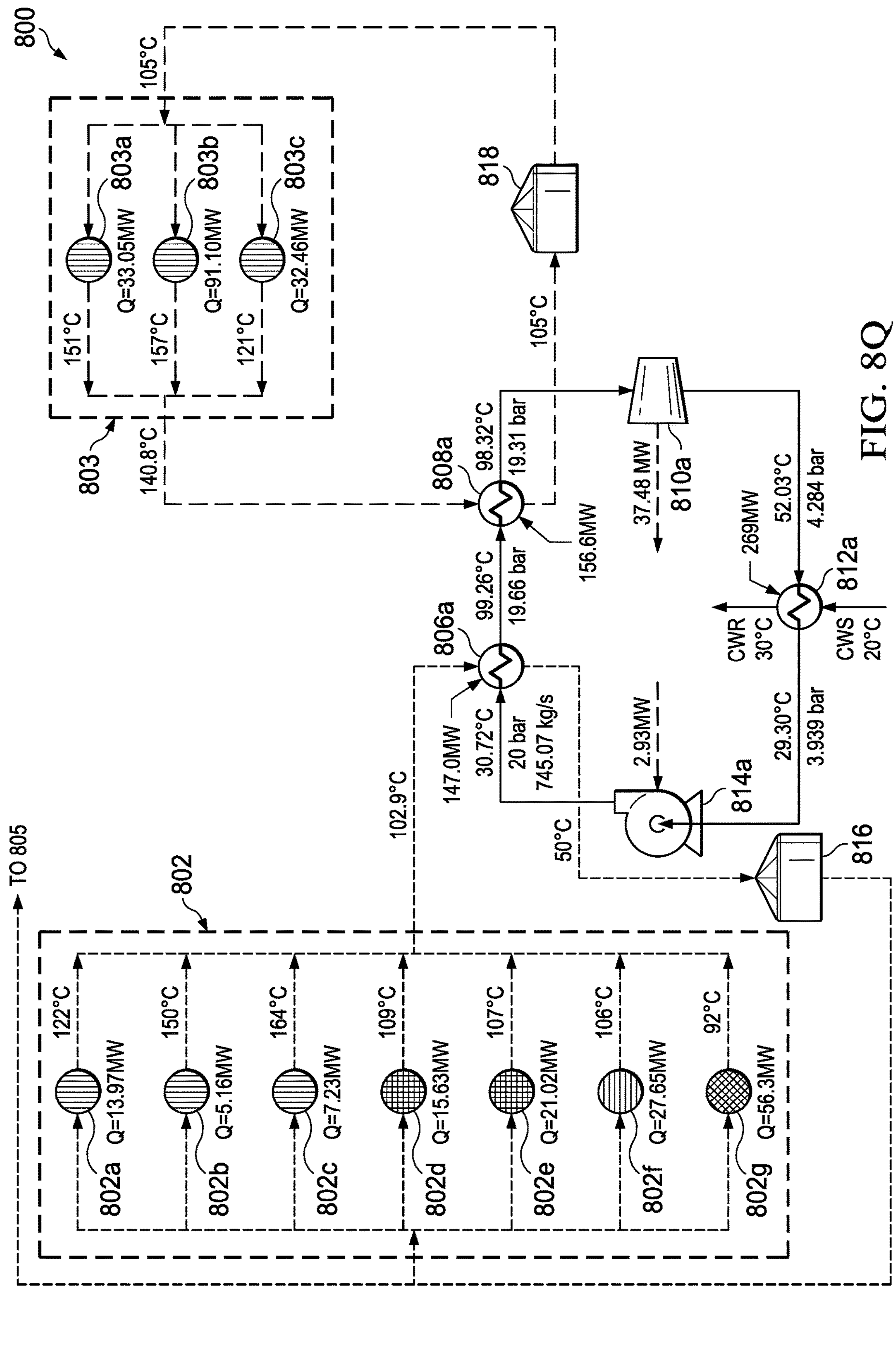
Figure 8R:
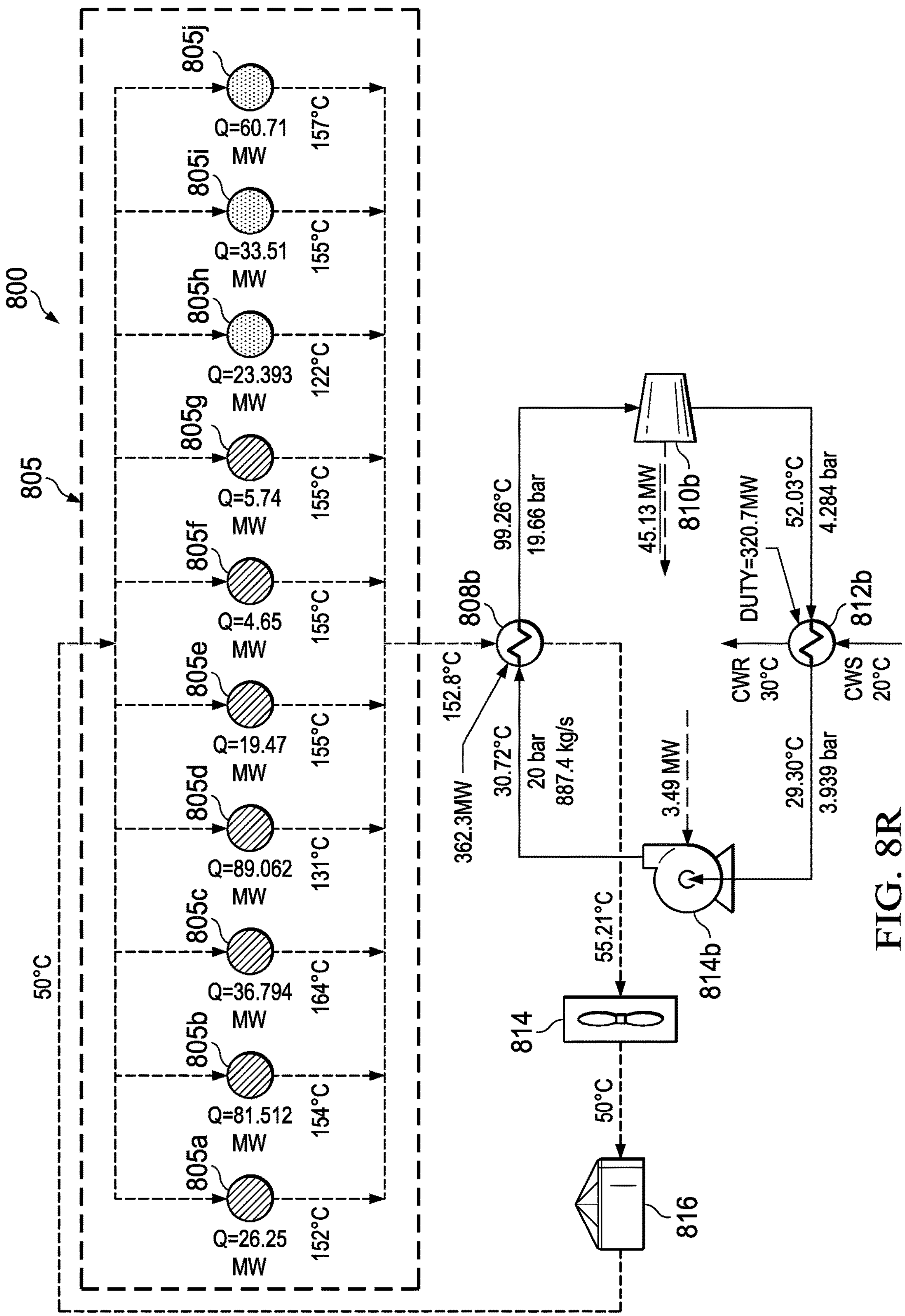

FIGS. 8A-8R illustrate schematic views of an example system 800 of a power conversion network that includes waste heat sources associated with a diesel hydrotreating-hydrocracking plant and an atmospheric distillation-Naphtha hydrotreating-aromatics plant. In this example system 800, a mini-power plant synthesis uses two independent circuits of ORC systems, sharing hot water (or other heating fluid) and isobutane systems infrastructure, to generate power from specific portions of a crude oil refining-petrochemical site-wide low-low grade waste heat sources, including hydrocracking-diesel, hydrotreating, and aromatics-atmospheric distillation-Naphtha hydrotreating plants. In some aspects, the system 800 can be implemented in one or more steps, where each phase can be separately implemented without hindering future steps to implement the system 800. In some aspects, a minimum approach temperature across a heat exchanger used to transfer heat from a heat source to a working fluid (for example, water) can be as low as 3° C. or may be higher. Higher minimum approach temperatures can be used in the beginning of the phases at the expense of less waste heat recovery and power generation, while reasonable power generation economics of scale designs are still attractive in the level of tens of megawatts of power generation.

In some aspects of system 800, optimized efficiency is realized upon using a minimum approach temperature recommended for the specific heat source streams used in the system design. In such example situations, optimized power generation can be realized without re-changing the initial topology or the sub-set of low grade waste heat streams selected/utilized from the whole crude oil refining-petrochemical complex utilized in an initial phase. System 800 and its related process scheme can be implemented for safety and operability through two ORC systems using one or more buffer streams such as hot oil or high pressure hot water systems or a mix of specified connections among buffer systems. The low-low grade waste-heat-to-power-conversion (for example, lower than the low grade waste heat temperature defined by DOE as 232° C.) may be implemented using one or more ORC systems using isobutane as an organic fluid at specific operating conditions using two buffer systems shared by the two systems of power generation but can be working independently too. In some aspects of system 800, one of the two ORC systems has only an evaporator while the other ORC system has an evaporator and pre-heater.

System 800 may not change with future changes inside individual hydrocracking-diesel, hydrotreating, and aromatics-atmospheric distillation-Naphtha hydrotreating plants to enhance energy efficiency and system 800 may not need to be changed upon improvements in plant waste heat recovery practices, such as heat integration among hot and cold streams. System 800 may use "low-low" grade waste heat, below 160° C. available in heat sources in the medium level crude oil semi-conversion refining facilities and aromatics complex.

FIGS. 8A-8B is a schematic diagram of an example system 800 for a power conversion network that includes waste heat sources associated with aromatics-atmospheric distillation-Naphtha hydrotreating triple plants and hydrocracking-hydrotreating plants. In this example implementation, system 800 utilizes twenty distinct heat sources that feed heat through a working fluid (for example, hot water, hot oil, or otherwise) to two ORC systems to produce power. In the illustrated example, the twenty heat sources are separated among three heat recovery circuits. For instance, heat recovery circuit 802 includes heat exchangers 802*a*-802*g*. Heat recovery circuit 803 includes heat exchangers 803*a*-803*c*. Heat recovery circuit 805 includes heat exchangers 805*a*-805*j*.

In the illustrated example, each heat exchanger facilitates heat recovery from a heat source in a particular industrial unit to the working fluid. For example, heat exchangers 802*a*-802*c* recover heat from heat sources in a para-xylene separation unit. Heat exchangers 802*d*-802*e* recover heat from heat sources in a para-xylene isomerization reaction and separation unit(s). Heat exchanger 802*f* recovers heat from a heat source(s) in a Naphtha hydrotreating plant (NHT) reaction section. Heat exchanger 802*g* recovers heat from a heat source in an atmospheric distillation plant. Together, heat exchangers in the heat recovery circuit 802 recover low grade waste heat from specific streams in a crude distillation Naphtha hydrotreating and aromatics triple plants separation-system-site-waste-heat-recovery-network to deliver the heat via the working fluid to an ORC 804*a*. In this example, the heat from heat recovery circuit 802 is provided to a pre-heater 806*a* of the ORC 804*a*.

Generally, the heat recovery circuit 802 receives (for example, from an inlet header that fluidly couples a heating fluid tank 816 to the heat exchangers 802*a*-802*g*) high pressure working fluid (for example, hot water, hot oil, or otherwise) for instance, at between about 40° C. to 60° C. and supplies heated fluid (for example, at an outlet header fluidly coupled to the heat exchangers 802*a*-802*g*) at or about 100-115° C. The heat exchangers 802*a*-802*g* may be positioned or distributed in the Naphtha Block that consists of a Naphtha Hydrotreating (NHT) plant, CCR plant and Aromatics plant and fluidly coupled to low grade waste heat sources from the refining-petrochemical plants.

Heat exchangers 803*a*-803*c* recover heat from heat sources in a refining-petrochemicals complex portion that contains the para-xylene separation unit. Together, the heat exchangers in the heat recovery circuit 803 recover low grade waste heat to deliver the heat via the working fluid to the ORC 804*a*. In this example, the heat from heat recovery circuit 803 is provided to an evaporator 808*a* of the ORC 804*a*.

Generally, the heat recovery circuit 803 receives (for example, from an inlet header that fluidly couples a heating fluid tank 818 to the heat exchangers 803*a*-803*c*) high pressure working fluid (for example, hot water, hot oil, or otherwise) at or about 100-110° C. and it heats it up to about 125-160° C. The heat exchangers 803*a*-803*c* may be distributed along the CCR-Aromatics module of the refining-petrochemical complex using low grade waste heat sources in the refining-petrochemical complex plants using only para-xylene products separation plant streams.

Heat exchangers 805*a*-805*g* in heat recovery circuit 805, in this example, recover heat from heat sources in a hydrocracking plant separation unit. Heat exchangers 805*h*-805*j* in heat recovery circuit 805, in this example, recover heat from heat sources in a hydrotreating plant separation unit. Together, the heat exchangers in the heat recovery circuit 805 recover low grade waste heat to deliver the heat via the working fluid to an ORC 804*b*. In this example, the heat from heat recovery circuit 805 is provided to an evaporator 808*b* of the ORC 804*b*.

Generally, the heat recovery circuit 805 receives (for example, from an inlet header that fluidly couples the heating fluid tank 816 to the heat exchangers 805*a*-805*j*) high pressure working fluid (for example, hot water, hot oil, or otherwise) at or about 40-60° C. and it heats it up to about 120-160° C.

In the example implementation of system 800, the ORC 804*a* includes a working fluid that is thermally coupled to the heat recovery circuits 802 and 803 to heat the working fluid. In some implementations, the working fluid can be isobutane. The ORC 804*a* can also include a gas expander 810*a* (for example, a turbine-generator) configured to generate electrical power from the heated working fluid. As shown in FIG. 8A, the ORC 804*a* can additionally include a pre-heater 806*a*, an evaporator 808*a*, a pump 814*a*, and a condenser 812*a*. In this example implementation, the heat recovery circuit 802 supplies a heated working, or heating, fluid to the pre-heater 806*a*, while the heat recovery circuit 803 supplies a heated working, or heating, fluid to the evaporator 808*a*.

In the example implementation of system 800, the ORC 804*b* includes a working fluid that is thermally coupled to the heat recovery circuit 805 to heat the working fluid. In some implementations, the working fluid can be isobutane. The ORC 804*b* can also include a gas expander 810*b* (for example, a turbine-generator) configured to generate electrical power from the heated working fluid. As shown in FIG. 8B, the ORC 804*b* can additionally include an evaporator 808*b*, a pump 814*b*, and a condenser 812*b*. In this example implementation, the heat recovery circuit 805 supplies a heated working, or heating, fluid to the evaporator 808*b*. As further shown in FIG. 8B, an air cooler 822 cools the heat recovery circuit 805 exiting the evaporator 808*b* before the heating fluid in the circuit 805 is circulated to the heating fluid tank 816.

In a general operation, a working, or heating, fluid (for example, water, oil, or other fluid) is circulated through the heat exchangers of the heat recovery circuits 802, 803, and 805. An inlet temperature of the heating fluid that is circulated into the inlets of each of the heat exchangers may be the same or substantially the same subject to any temperature variations that may result as the heating fluid flows through respective inlets, and may be circulated directly from a heating fluid tank 816 or 818. Each heat exchanger heats the heating fluid to a respective temperature that is greater than the inlet temperature. The heated heating fluids from the heat exchangers are combined in their respective heat recovery circuits and circulated through one of the pre-heater 806*a*, the evaporator 808*a*, or the evaporator 808*b* of the ORC. Heat from the heated heating fluid heats the working fluid of the respective ORC thereby increasing the working fluid pressure and temperature. The heat exchange with the working fluid results in a decrease in the temperature of the heating fluid. The heating fluid is then collected in the heating fluid tank 816 or the heating fluid tank 818 and can be pumped back through the respective heat exchangers to restart the waste heat recovery cycle.

The heating fluid circuit to flow heating fluid through the heat exchangers of system 800 can include multiple valves that can be operated manually or automatically. For example, a modulating control valve (as one example) may be positioned in fluid communication with an inlet or outlet of each heat exchanger, on the working fluid and heat source side. In some aspects, the modulating control valve may be a shut-off valve or additional shut-off valves may also be positioned in fluid communication with the heat exchangers. An operator can manually open each valve in the circuit to cause the heating fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

In the manner described earlier, the heating fluid can be looped through the heat exchangers to recover heat that would otherwise go to waste in the diesel hydrotreating-hydrocracking and atmospheric distillation-Naphtha hydrotreating-aromatics plants, and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

FIG. 8C is a schematic diagram that illustrates an example placement of heat exchanger 802*f* in a Naphtha Hydrotreating (NHT) plant. In an example implementation illustrated in FIGS. 8C and 8Q, this heat exchanger 802*f* may cool down the hydrotreater/reactor product outlet before the separator from 111° C. to 60° C. using the high pressure working fluid stream of the heat recovery circuit 802 at 50° C. to raise the working fluid temperature to 106° C. The thermal duty of this heat exchanger 802*f* may be about 27.1 MW. The heating fluid stream at 106° C. is sent to the header of heat recovery circuit 802.

FIG. 8D is a schematic diagram that illustrates an example placement of heat exchanger 802*g* in the atmospheric distillation plant waste heat recovery network. In an example implementation illustrated in FIGS. 8D and 8Q, this heat exchanger 802*g* cools down the atmospheric crude tower overhead stream from 97° C. to 64.4° C. using the working fluid stream of heat recovery circuit 802 at 50° C. to raise its temperature to 92° C. The thermal duty of this heat exchanger 802*g* is about 56.8 MW. The heating fluid stream at 92° C. is sent to the header of heat recovery circuit 802.

FIG. 8E is a schematic diagram that illustrates an example placement of heat exchanger 802*d* in the Para-Xylene separation plant. In an example implementation illustrated in FIGS. 8E and 8Q, this heat exchanger 802*d* cools down the Xylene isomerization reactor outlet stream before the separator drum from 114° C. to 60° C. using the working fluid stream of heat recovery circuit 802 at 50° C. to raise the working fluid stream temperature to 107° C. The thermal duty of this heat exchanger 802*d* is about 15.6 MW. The heating fluid at 107° C. is sent to the header of heat recovery circuit 802.

FIG. 8F is a schematic diagram that illustrates an example placement of heat exchanger 802*e* in the xylene isomerization de-heptanizer of the Para-Xylene separation plant. In an example implementation illustrated in FIGS. 8F and 8Q, this heat exchanger 802*e* cools down the de-heptanizer column overhead stream from 112° C. to 60° C. using the working fluid stream of heat recovery circuit 802 at 50° C. to raise the working fluid stream temperature to 107° C. The thermal duty of this heat exchanger 802*e* is 21 MW. The heating fluid at 107° C. is sent to the header of heat recovery circuit 802.

FIG. 8G is a schematic diagram that illustrates an example placement of heat exchanger 803*a* in the Para-Xylene separation plant. In an example implementation illustrated in FIGS. 8G and 8Q, this heat exchanger 803*a* cools down the Extract column overhead stream from 156° C. to 133° C. using the working fluid stream of heat recovery circuit 803 at 105° C. to raise the working fluid stream temperature to 151° C. The thermal duty of this heat exchanger 803*a* is about 33.05 MW. The heating fluid at 151° C. is sent to the header of heat recovery circuit 803.

FIG. 8H is a schematic diagram that illustrates an example placement of heat exchanger 802*b* in the Para-Xylene separation plant. In an example implementation illustrated in FIGS. 8H and 8Q, this heat exchanger 802*b* cools down the PX purification column bottom product stream from 155° C. to 60° C. using the working fluid stream of heat recovery circuit 802 at 50° C. to raise the working fluid stream temperature to 150° C. The thermal duty of this heat exchanger 802*b* is about 5.16 MW. The heating fluid at 150° C. is sent to the header of heat recovery circuit 802.

FIG. 8I is a schematic diagram that illustrates an example placement of heat exchanger 802*a* in the Para-Xylene separation plant. In an example implementation illustrated in FIGS. 8I and 8Q, this heat exchanger 802*a* cools down the PX purification column overhead stream from 127° C. to 14° C. using the working fluid stream of heat recovery circuit 802 at 50° C. to raise the working fluid stream temperature to 122° C. The thermal duty of this heat exchanger 802*a* is about 13.97 MW. The heating fluid at 122° C. is sent to the header of heat recovery circuit 802.

FIG. 8J is a schematic diagram that illustrates an example placement of heat exchanger 803*b* in the Para-Xylene separation plant. In an example implementation illustrated in FIGS. 8J and 8Q, this heat exchanger 803*b* cools down the Raffinate column overhead stream from 160° C. to 132° C. using the working fluid stream of heat recovery circuit 803 at 105° C. to raise the working fluid stream temperature to 157° C. The thermal duty of this heat exchanger 803*b* is about 91.1 MW. The heating fluid at 157° C. is sent to the header of heat recovery circuit 803.

FIG. 8K is a schematic diagram that illustrates an example placement of heat exchangers 802*c* and 803*c* in the Para-Xylene separation plant. In an example implementation illustrated in FIGS. 8K and 8Q, these two heat exchangers 802*c* and 803*c* have thermal duties of 7.23 MW and 32.46 MW, respectively. Heat exchanger 802*c* cools down the C9+ aromatics before the storage tank from 169° C. to 60° C. using the working fluid stream of heat recovery circuit 802 at 50° C. to raise its temperature to 164° C. The heating fluid stream at 164° C. is sent to the header of heat recovery circuit 802. The heat exchanger 803*c* cools down the heavy Raffinate splitter column overhead stream from 126° C. to 113° C. using the working fluid stream of heat recovery circuit 803 at 105° C. to raise its temperature to 121° C. The heating fluid stream at 121° C. is sent to the header of heat recovery circuit 803.

FIG. 8L is a schematic diagram that illustrates an example placement of heat exchanger 805*a* in the hydrocracking plant. In an example implementation illustrated in FIGS. 8L and 8R, this heat exchanger 805*a* cools down the 2nd reaction section 2nd stage cold high pressure separator feed stream from 157° C. to 60° C. using the working fluid stream of heat recovery circuit 805 at 50° C. to raise the working fluid stream temperature to 152° C. The thermal duty of this heat exchanger 805*a* is about 26.25 MW. The heating fluid at 152° C. is sent to the header of heat recovery circuit 805.

FIG. 8M is a schematic diagram that illustrates an example placement of heat exchanger 805*b* in the hydrocracking plant. In an example implementation illustrated in FIGS. 8M and 8R, this heat exchanger 805*b* cools down the 1st reaction section 1st stage cold high pressure separator feed stream from 159° C. to 60° C. using the working fluid stream of heat recovery circuit 805 at 50° C. to raise the working fluid stream temperature to 154° C. The thermal duty of this heat exchanger 805*b* is about 81.51 MW. The heating fluid at 154° C. is sent to the header of heat recovery circuit 805.

FIGS. 8NA-8NB show a schematic diagram that illustrates an example placement of heat exchangers 805*c*-805*g* in the hydrocracking plant. In an example implementation illustrated in FIGS. 8NA-8NB and 8Q, these heat exchangers 805*c*-805*g* have thermal duties of 36.8 MW, 89 MW, 19.5 MW, 4.65 MW, and 5.74 MW, respectively. Heat exchanger 805*c* cools down the product stripper overhead stream from 169° C. to 60° C. using the working fluid stream of heat recovery circuit 805 at 50° C. to raise its temperature to 164° C. The heating fluid stream at 164° C. is sent to the header of heat recovery circuit 805. The heat exchanger 805*d* cools down the main fractionator overhead stream from 136° C. to 60° C. using the working fluid stream of heat recovery circuit 805 at 50° C. to raise its temperature to 131° C. The heating fluid stream at 131° C. is sent to the header of heat recovery circuit 805. The heat exchanger 805*e* cools down the kerosene product stream from 160° C. to 60° C. using the working fluid stream of heat recovery circuit 805 at 50° C. to raise its temperature to 155° C. The heating fluid stream at 155° C. is sent to the header of heat recovery circuit 805. In an example aspect, a steam generator with a thermal duty of about 5.45 MW using a hot stream temperature of 187° C. is used before this heat exchanger 805*e* to generate low pressure steam for process use. The heat exchanger 805*f* cools down the kerosene pumparound stream from 160° C. to 60° C. using the working fluid stream of heat recovery circuit 805 at 50° C. to raise its temperature to 155° C. The heating fluid stream at 155° C. is sent to the header of heat recovery circuit 805. In an example aspect, a steam generator with a thermal duty of about 5.58 MW using a hot stream temperature of 196° C. is used before this heat exchanger 805*f* to generate low pressure steam for process use. The heat exchanger 805*g* cools down the diesel product stream from 160° C. to 60° C. using the working fluid stream of heat recovery circuit 805 at 50° C. to raise its temperature to 155° C. The heating fluid stream at 155° C. is sent to the header of heat recovery circuit 805. In an example aspect, a steam generator with a thermal duty of about 6.47 MW using a hot stream temperature of 204° C. is used before this heat exchanger 805*g* to generate low pressure steam for process use.

FIG. 8O is a schematic diagram that illustrates an example placement of heat exchanger 805*h* in the hydrotreating plant. In an example implementation illustrated in FIGS. 8O and 8R, this heat exchanger 805*h* cools down the light effluent to cold separator stream from 127° C. to 60° C. using the working fluid stream of heat recovery circuit 805 at 50° C. to raise the working fluid stream temperature to 122° C. The thermal duty of this heat exchanger 805*h* is about 23.4 MW. The heating fluid at 122° C. is sent to the header of heat recovery circuit 805.

FIG. 8P is a schematic diagram that illustrates an example placement of heat exchangers 805*i* and 805*j* in the hydrotreating plant. In an example implementation illustrated in FIGS. 8P and 8R, these heat exchangers have thermal duties of 33.58 MW and 60.71 MW, respectively. The heat exchanger 805*i* cools down the diesel stripper overhead stream from 160° C. to 60° C. using the working fluid stream of heat recovery circuit 805 at 50° C. to raise the working fluid stream temperature to 155° C. The heating fluid at 155° C. is sent to the header of heat recovery circuit 805. In an example aspect, a steam generator with a thermal duty of about 6.38 MW using an overhead hot stream temperature of 182° C. is used before this heat exchanger 805*i* to generate low pressure steam for process use. The heat exchanger 805*h* cools down the diesel stripper product stream from 162° C. to 60° C. using the working fluid stream of heat recovery circuit 805 at 50° C. to raise the working fluid stream temperature to 157° C. The heating fluid at 157° C. is sent to the header of heat recovery circuit 805.

As described earlier, FIGS. 8Q-8R illustrate a specific example of the system 800, including some example temperatures, thermal duties, efficiencies, power inputs, and power outputs. For example, as illustrated in FIG. 8Q, the aromatics-atmospheric distillation-Naphtha hydrotreating module generates a power output (with a gas turbine 810*a* using efficiency of 85%) of about 37.5 MW and the power consumed in the pump using efficiency of 75% is about 2.9 MW. The ORC 804*a* high pressure at the inlet of the turbine is about 20 bar and at the outlet is about 4.3 bar. The condenser 812*a* water supply temperature is assumed to be at 20° C. and return temperature is assumed to be at 30° C. The evaporator 808*a* thermal duty is about 157 MW to vaporize about 775 Kg/s of isobutane. The ORC 804*a* isobutane pre-heater 806*a* thermal duty is about 147 MW to heat up the isobutane from about 31° C. to 99° C. The condenser 812*a* cooling duty is 269 MW to cool down and condense the same flow of isobutane from about 52° C. to 30° C.

As illustrated in FIG. 8R, the Hydrocracking-Diesel Hydrotreating module generates about 45 MW (with the gas turbine 810*b* using efficiency of 85%), and the power consumed in the pump 814*b* using efficiency of 75% is about 3.5 MW. The ORC 804*b* high pressure at the inlet of the turbine 810*b* is about 20 bar and at the outlet is about 4.3 bar. The condenser 812*b* water supply temperature is assumed to be at 20° C. and return temperature is assumed to be at 30° C. The evaporator 808*b* thermal duty is about 363 MW to pre-heat and vaporize about 887 Kg/s of isobutane from about 31° C. to 99° C., and the condenser 812*b* cooling duty is about 321 MW to cool down and condense the same flow of isobutane from about 52° C. to 30° C.

Figure 8S:
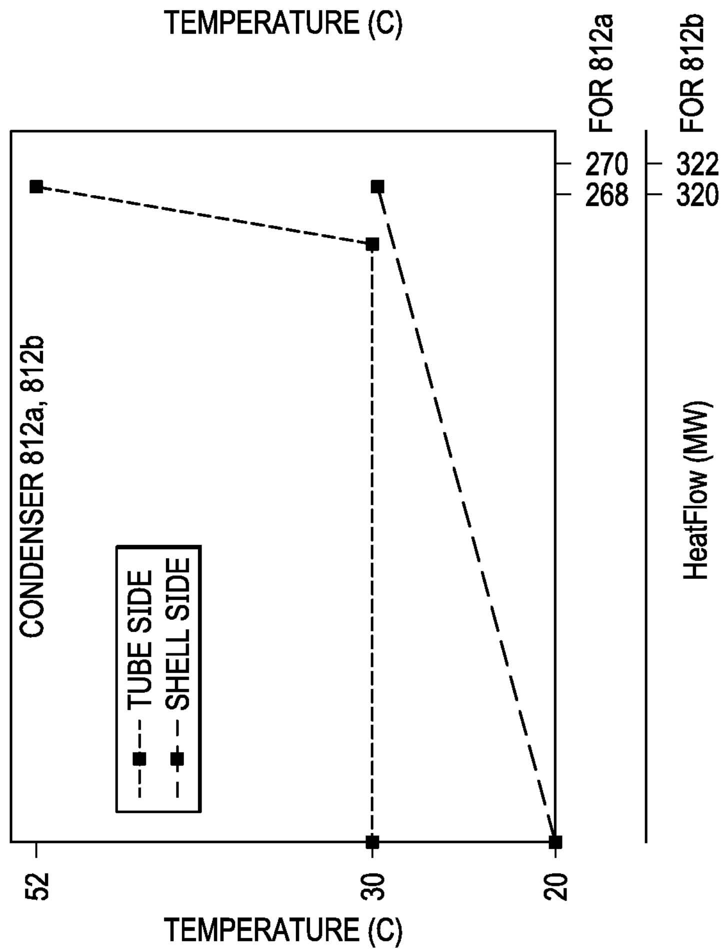

FIG. 8S is a graph that shows a tube side fluid temperature (for example, a cooling, or condenser, fluid flow) and a shell side fluid temperature (for example, an ORC working fluid flow) in the condensers 812*a* and 812*b* during an operation of the system 800. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature. As shown in FIG. 8S, the condenser water (entering the tubes of the condensers 812*a* and 812*b*) enters at about 20° C. and leaves at about 30° C. The ORC working fluid (entering the shell-side of the condensers) enters as a vapor at about 52° C., and then condenses at 30° C. and leaves the condensers as a liquid at 30° C.

Figure 8T:
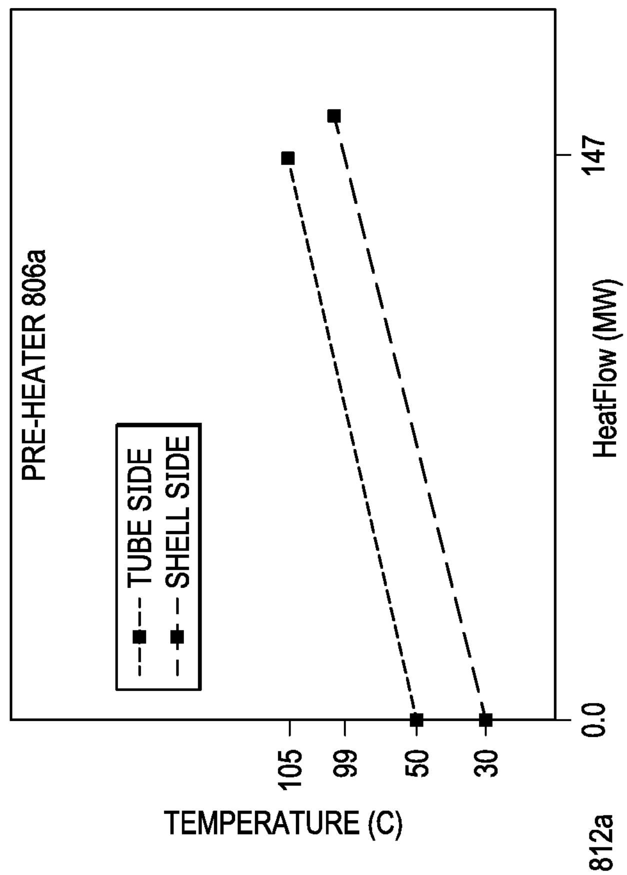

FIG. 8T is a graph that show a tube-side fluid temperature (for example, a heating fluid flow) and a shell-side fluid temperature (for example, an ORC working fluid flow) in the pre-heater 806*a* during an operation of the system 800. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 8T, as the tube-side fluid (for example, the hot oil or water in the heating fluid circuit 802) is circulated through the pre-heater 806*a*, heat is transferred from that fluid to the shell-side fluid (for example, the ORC working fluid). Thus, the tube-side fluid enters the pre-heater 806*a* at about 103° C. and leaves the pre-heater 806*a* at about 50° C. The shell-side fluid enters the pre-heater 806*a* at about 30° C. (for example, as a liquid) and leaves the pre-heater 806*a* at about 99° C. (for example, also as a liquid or mixed phase fluid).

Figure 8U:
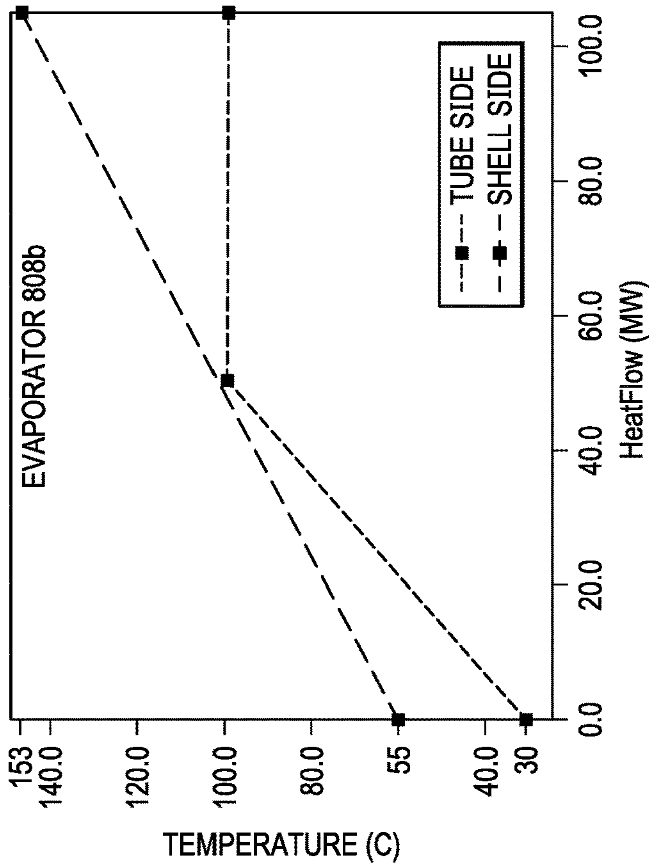
Figure 8U:
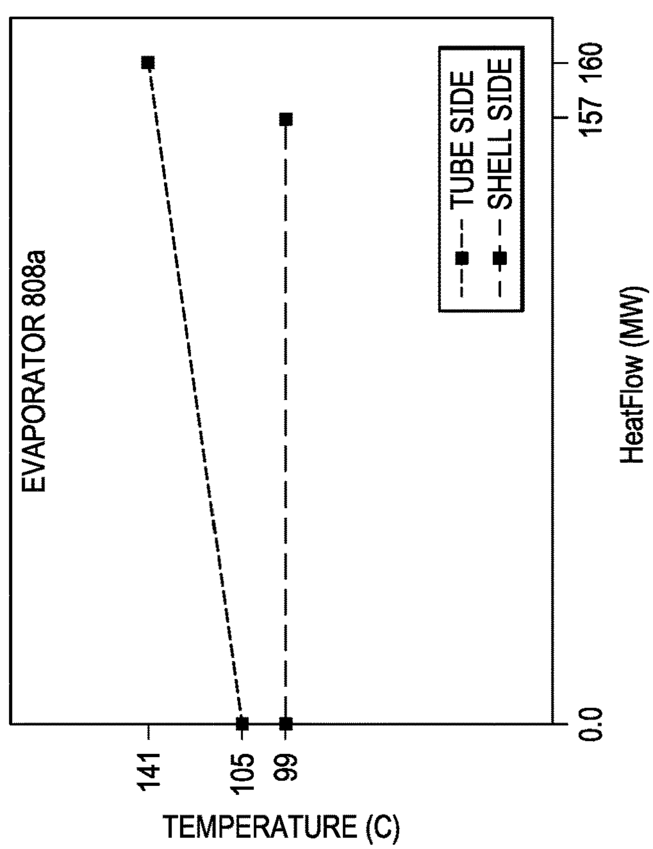

FIGS. 8UA-8UB are graphs that show a tube-side fluid temperature (for example, a heating fluid flow) and a shell-side fluid temperature (for example, an ORC working fluid flow) in the evaporators 808*a* and 808*b*, respectively during an operation of the system 800. These graphs show a temperature difference between the fluids on the y-axis relative to a heat flow between the fluids on the x-axis. For example, as shown in these figures, as the temperature difference between the fluids decreases, a heat flow between the fluids can increase. These graphs each show a temperature difference between the fluids on the y-axis relative to a heat flow between the fluids on the x-axis. For example, as shown in FIG. 8UA, as the tube-side fluid (for example, the hot oil or water in the heating fluid circuit 803) is circulated through the evaporator 808*a*, heat is transferred from that fluid to the shell-side fluid (for example, the ORC working fluid). Thus, the tube-side fluid enters the evaporator 808*a* at about 141° C. and leaves the evaporator 808*a* at about 105° C. The shell-side fluid enters the evaporator 808*a*, from the pre-heater 806*a*, at about 99° C. (for example, as a liquid or mixed phase fluid) and leaves the evaporator 808*a* also at about 99° C. (for example, as a vapor with some superheating).

As shown in FIG. 8UB, as the tube-side fluid (for example, the hot oil or water in the heating fluid circuit 805) is circulated through the evaporator 808*b*, heat is transferred from that fluid to the shell-side fluid (for example, the ORC working fluid). Thus, the tube-side fluid enters the evaporator 808*b* at about 153° C. and leaves the evaporator 808*b* at about 55° C. The shell-side fluid enters the evaporator 808*b* at about 30° C. (for example, as a liquid) and leaves the evaporator 808*b* at about 99° C. (for example, as a vapor). The graph shown in FIG. 8UB includes a "pinch point" for the shell-side fluid (for example, the ORC working fluid). The pinch point, which occurs as the fluid reaches about 99° C., represents the temperature at which the shell-side fluid vaporizes. As the shell-side fluid continues through the respective evaporator, the fluid temperature remains substantially constant (that is, about 99° C.) as the fluid complete vaporizes and, in some aspects, becomes superheated.

In the illustrated example, system 800 may include two-independent modules-based power generation using a hydrocracking; —diesel hydrotreating module couple and an aromatics-atmospheric distillation-Naphtha hydrotreating module for a more energy efficient and "greener" configuration in refining-petrochemical complex via converting its low-low grade waste heat to net power by about 76 MW for local utilization or export to the national electricity grid. System 800 may facilitate the reduction in power-generation-based GHG emissions with desired operability due to the independent nature of the two modules in the scheme.

Figure 9A:
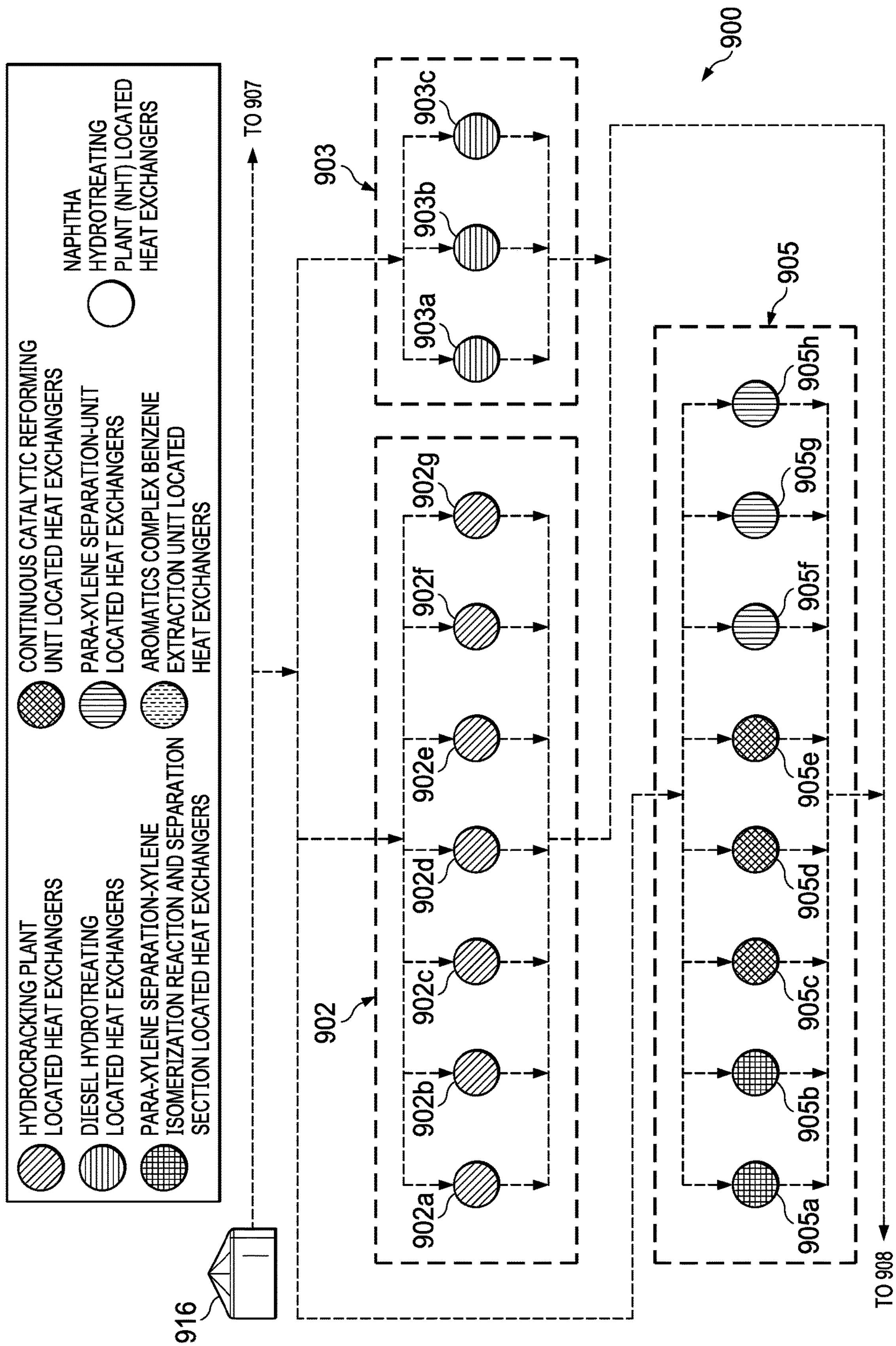
FIGS. 9A-9U are schematic illustrations of a power generation system that utilizes waste heat from one or more heat sources in a petrochemical refining plant.
Figure 9B:
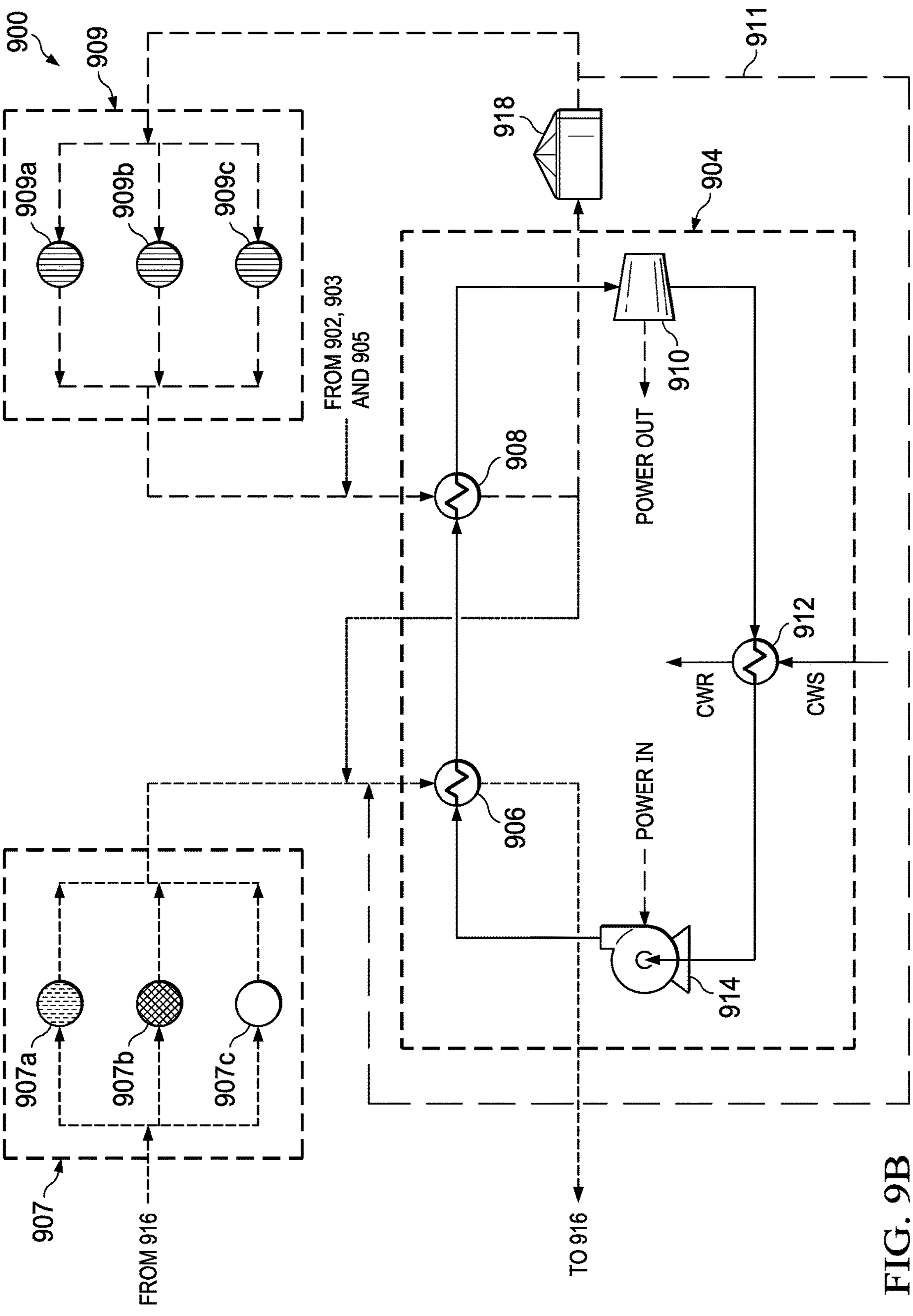
FIGS. 9V-9X are graphs that illustrate heat exchanger performance of heat exchangers in the power generation system shown in FIGS. 9T-9U.
Figure 9C:
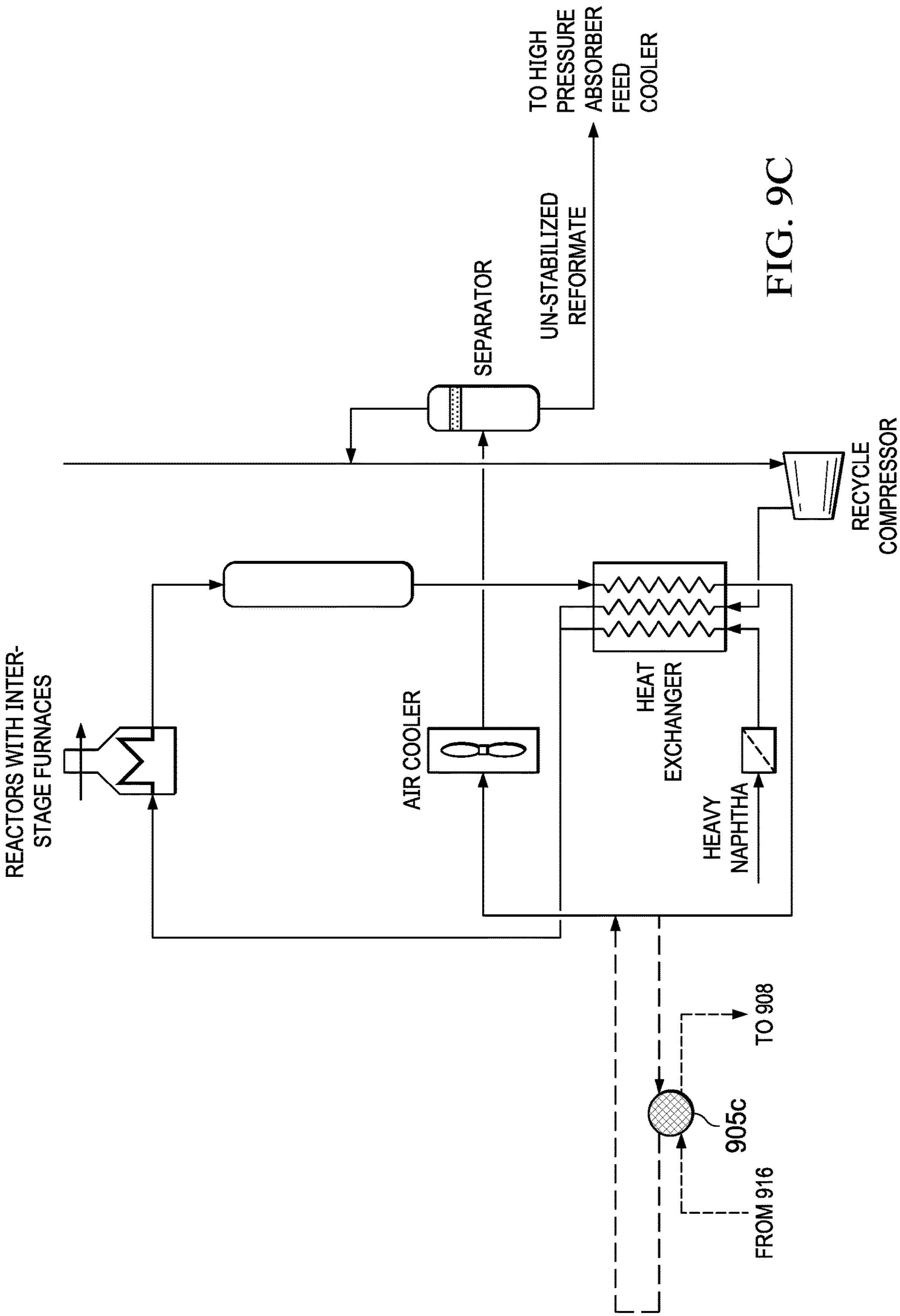
Figure 9D:
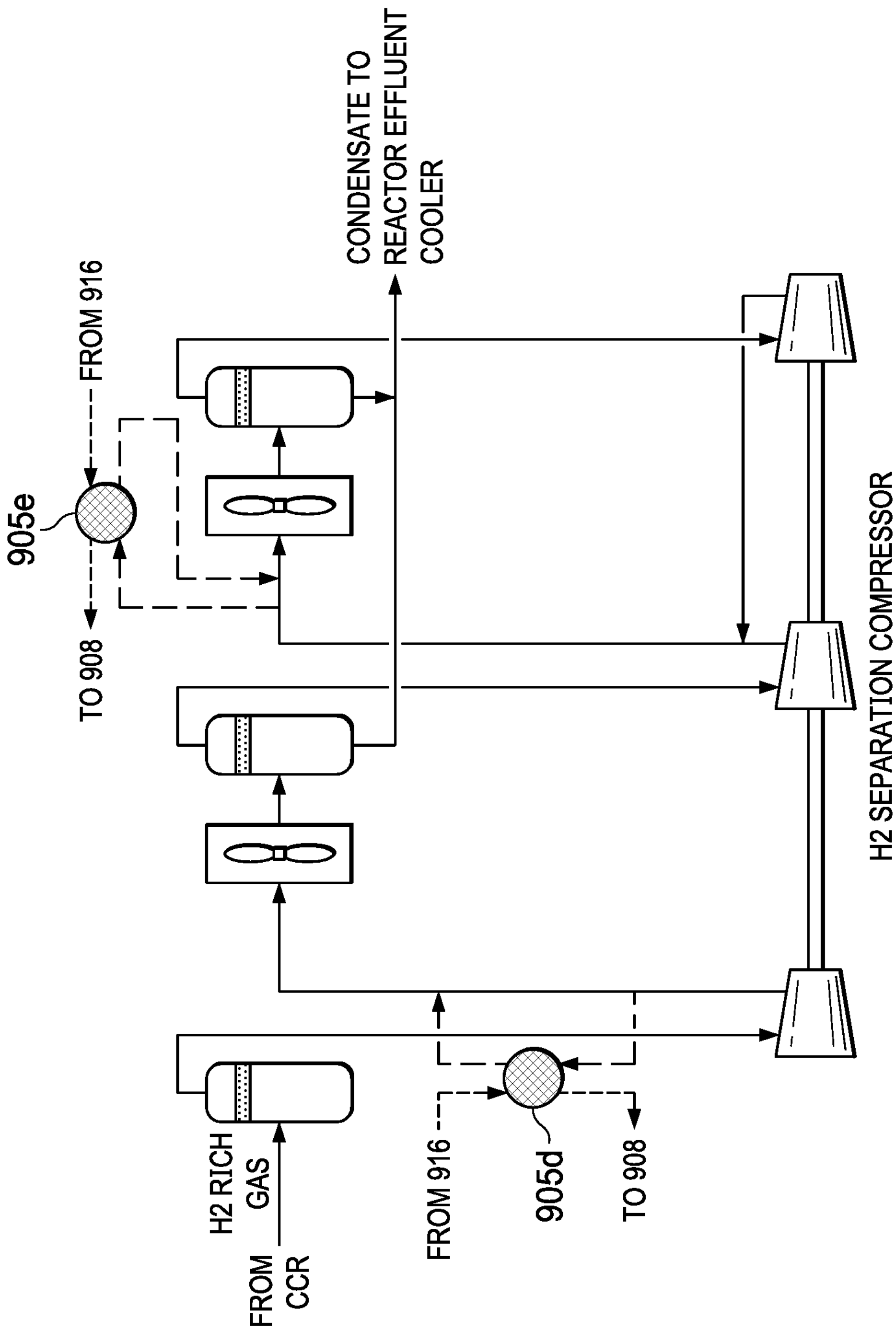
Figure 9E:
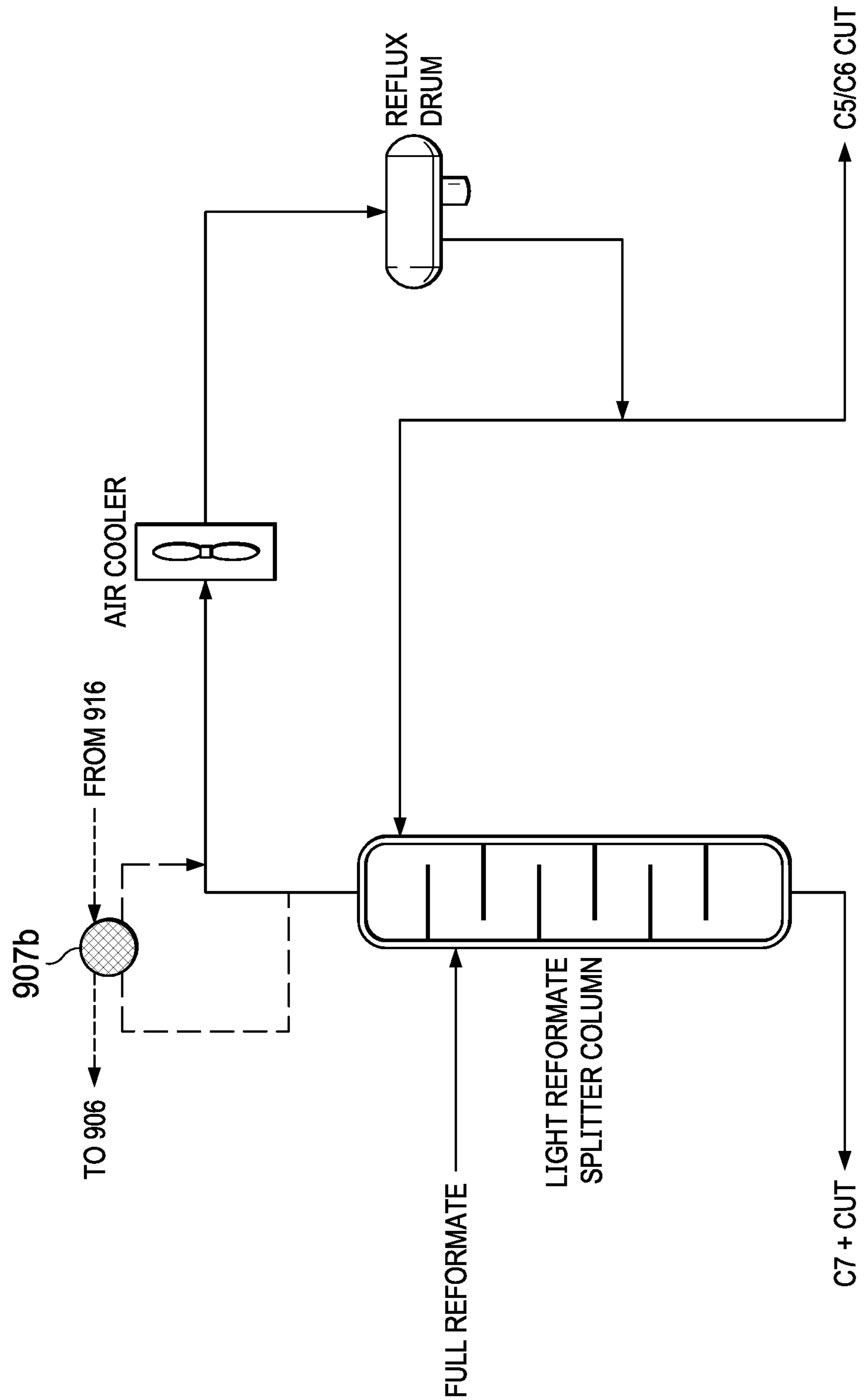
Figure 9F:
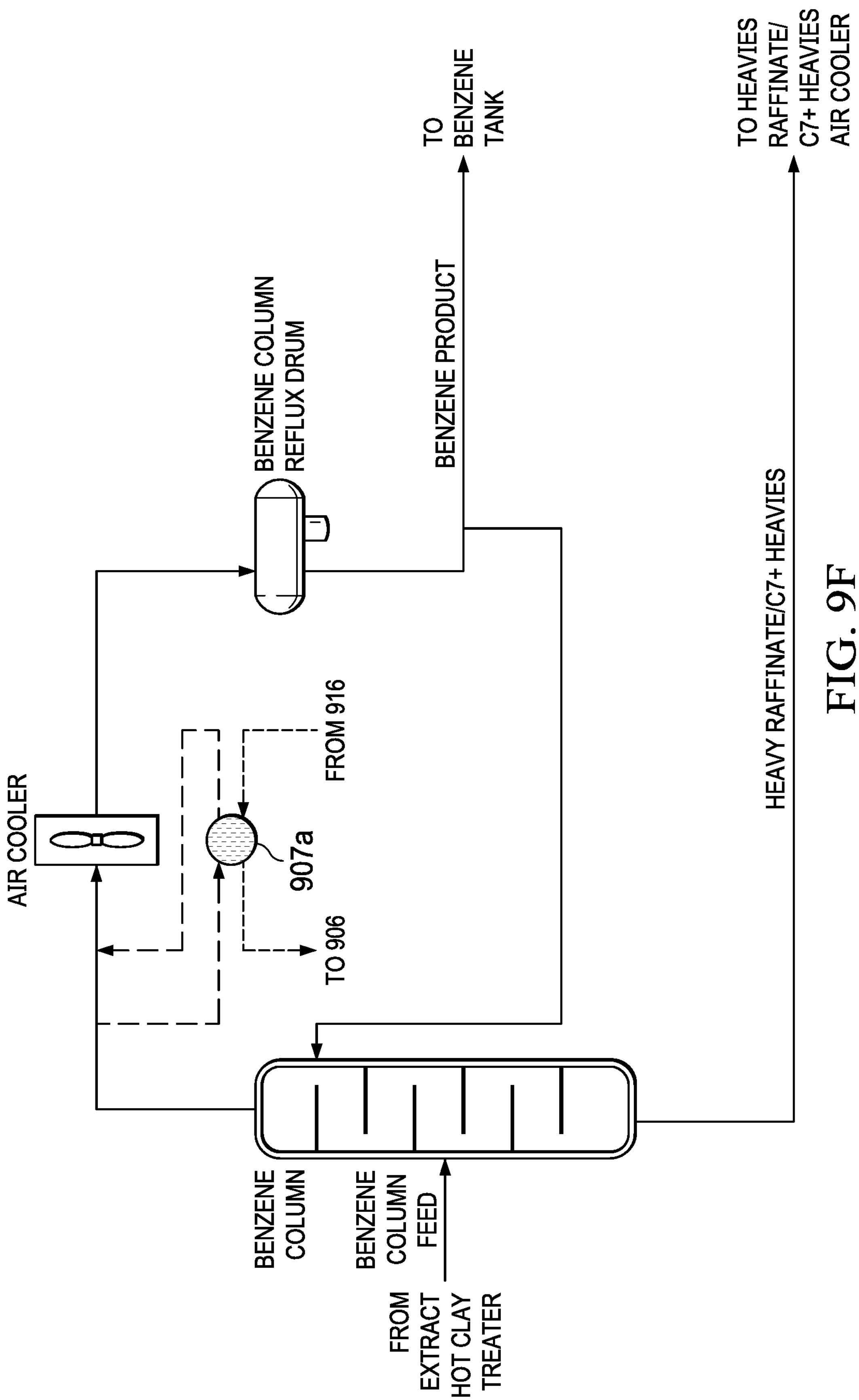
Figure 9G:
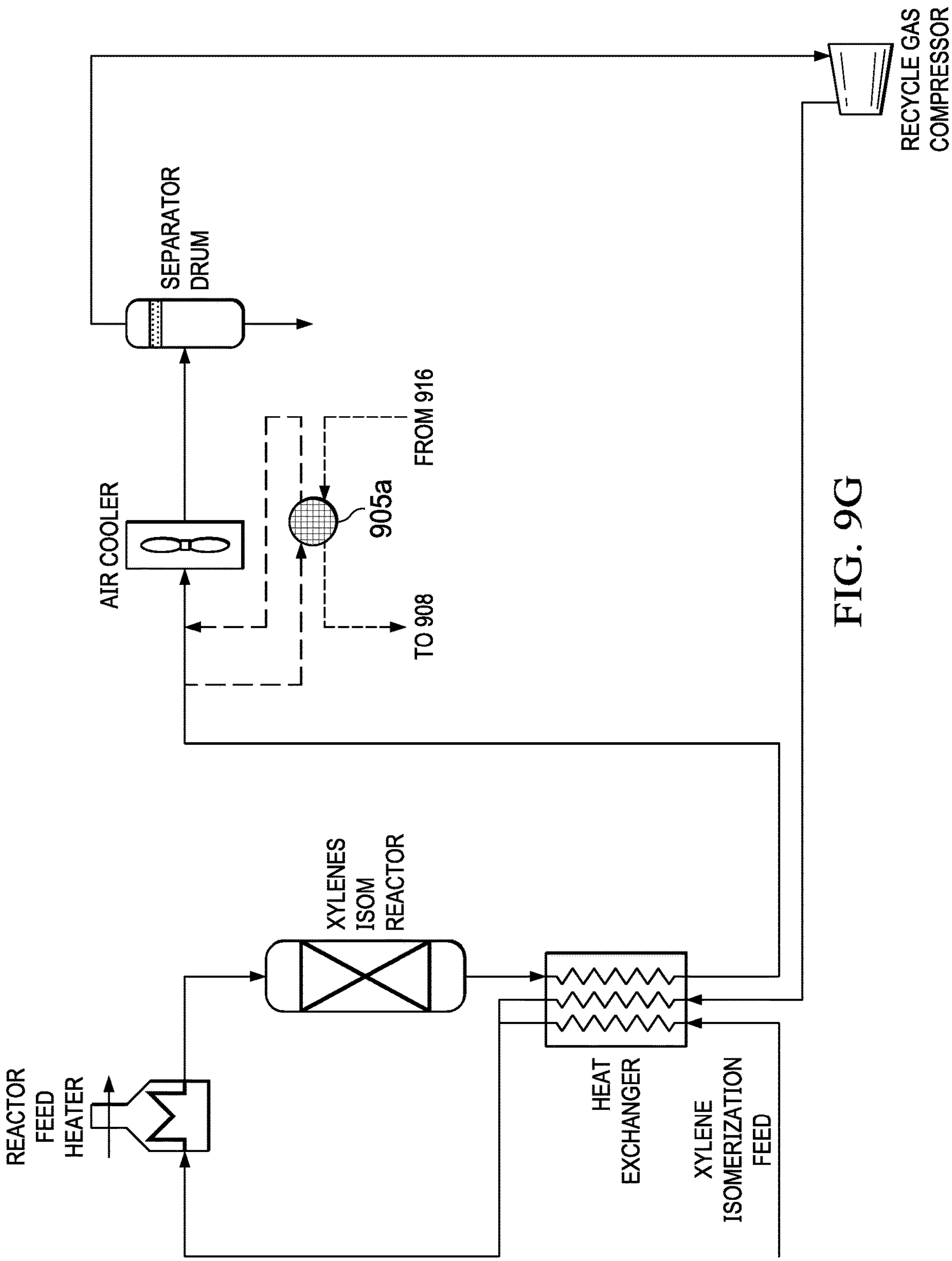
Figure 9H:
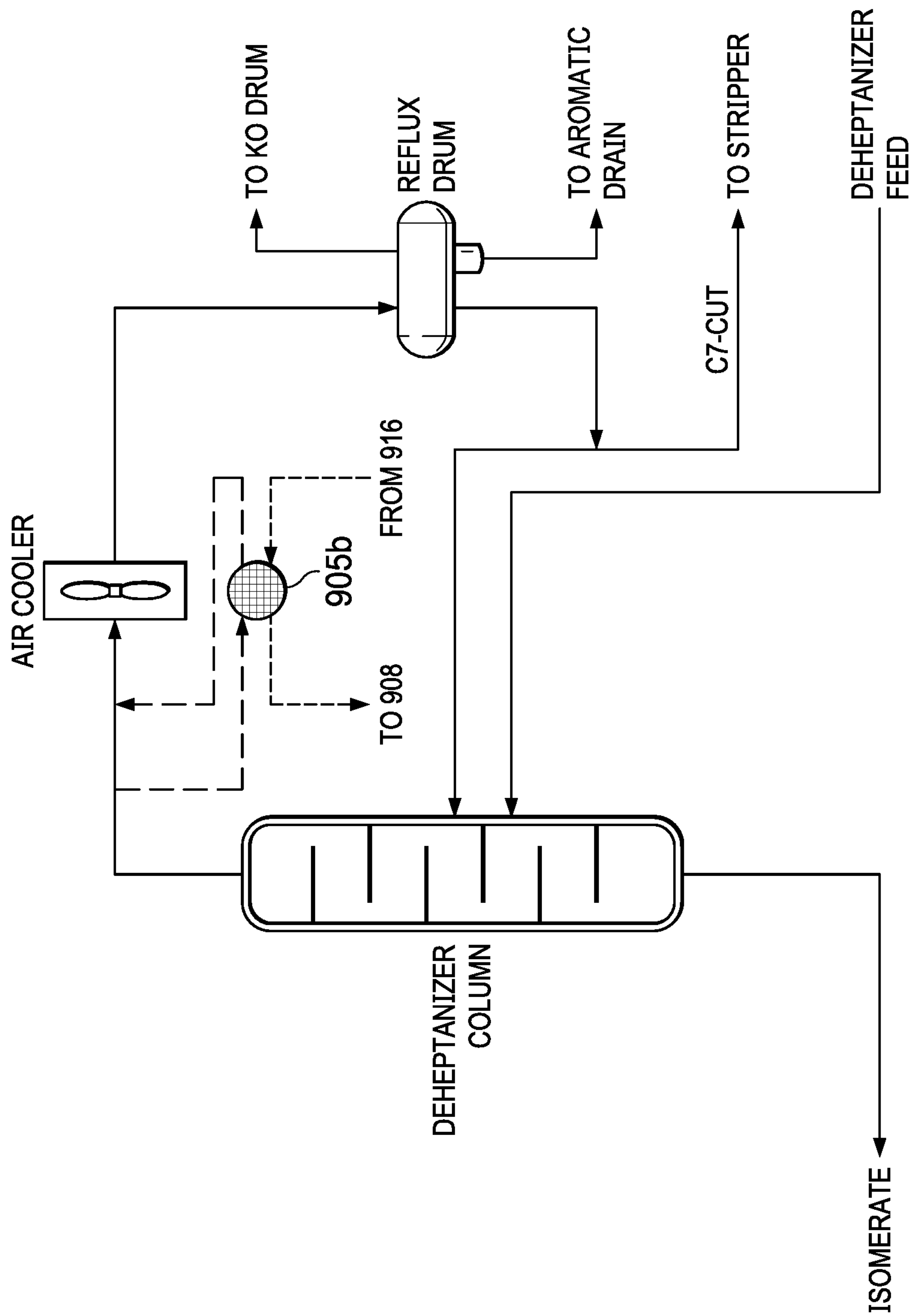
Figure 9I:
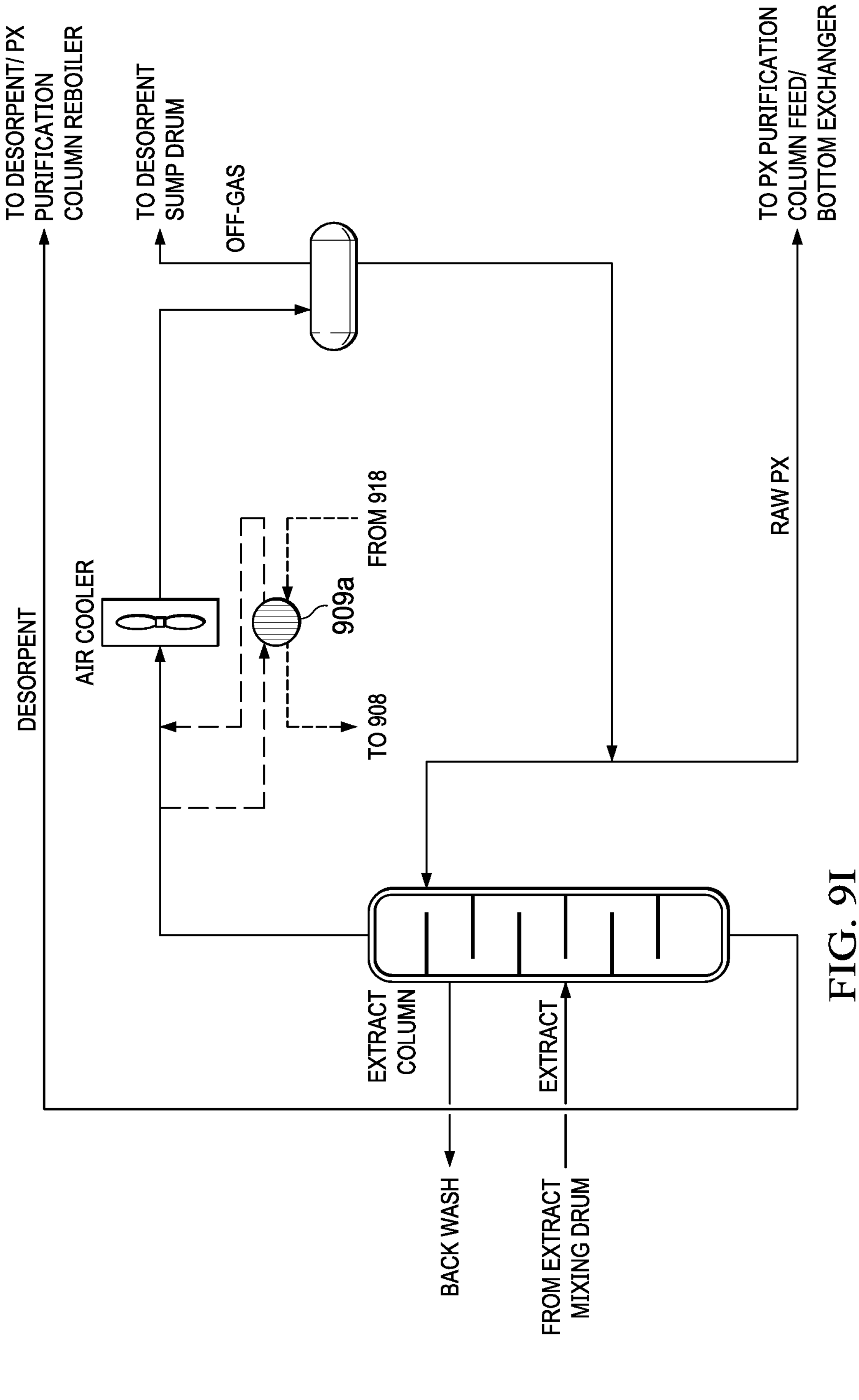
Figure 9J:
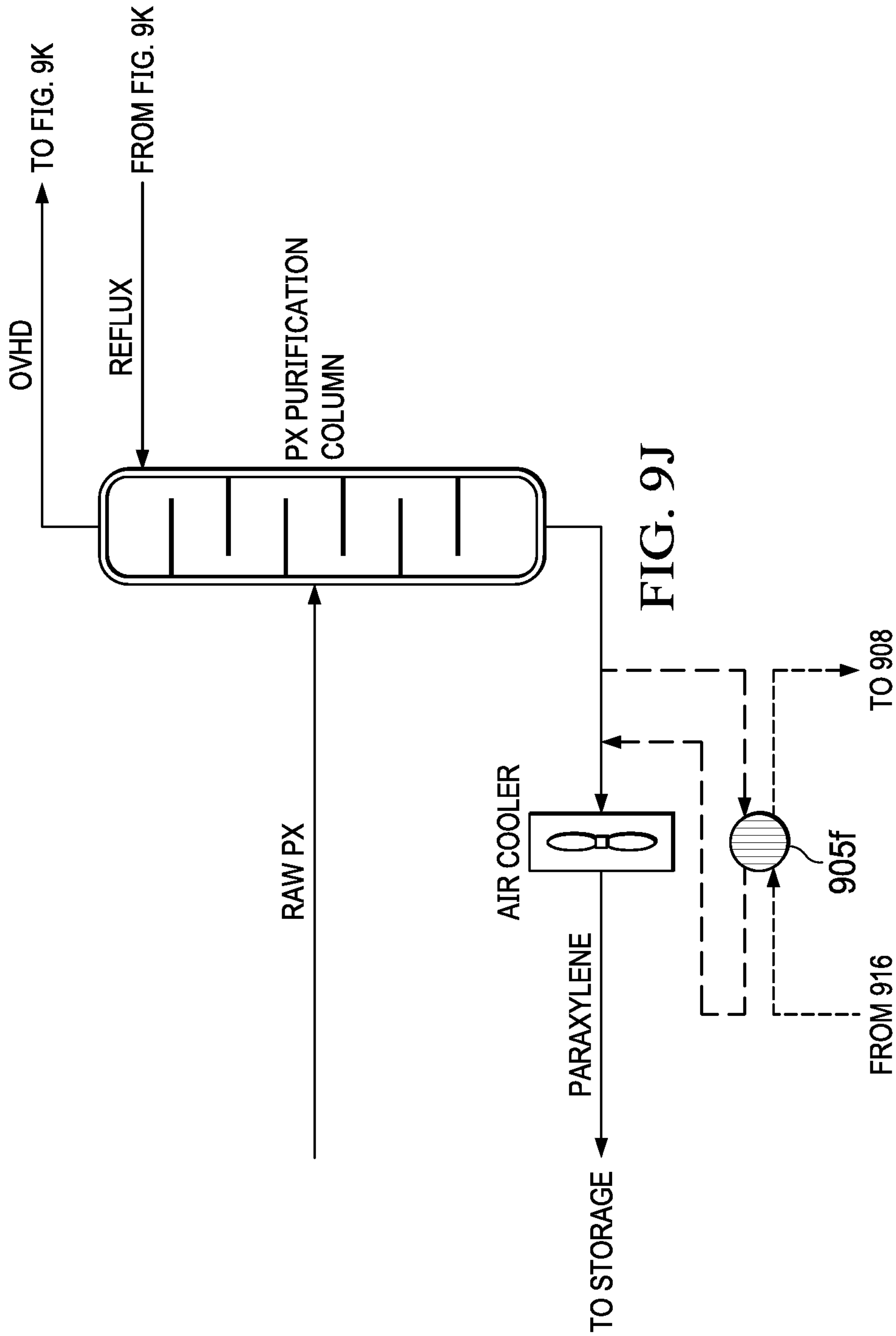
Figure 9K:
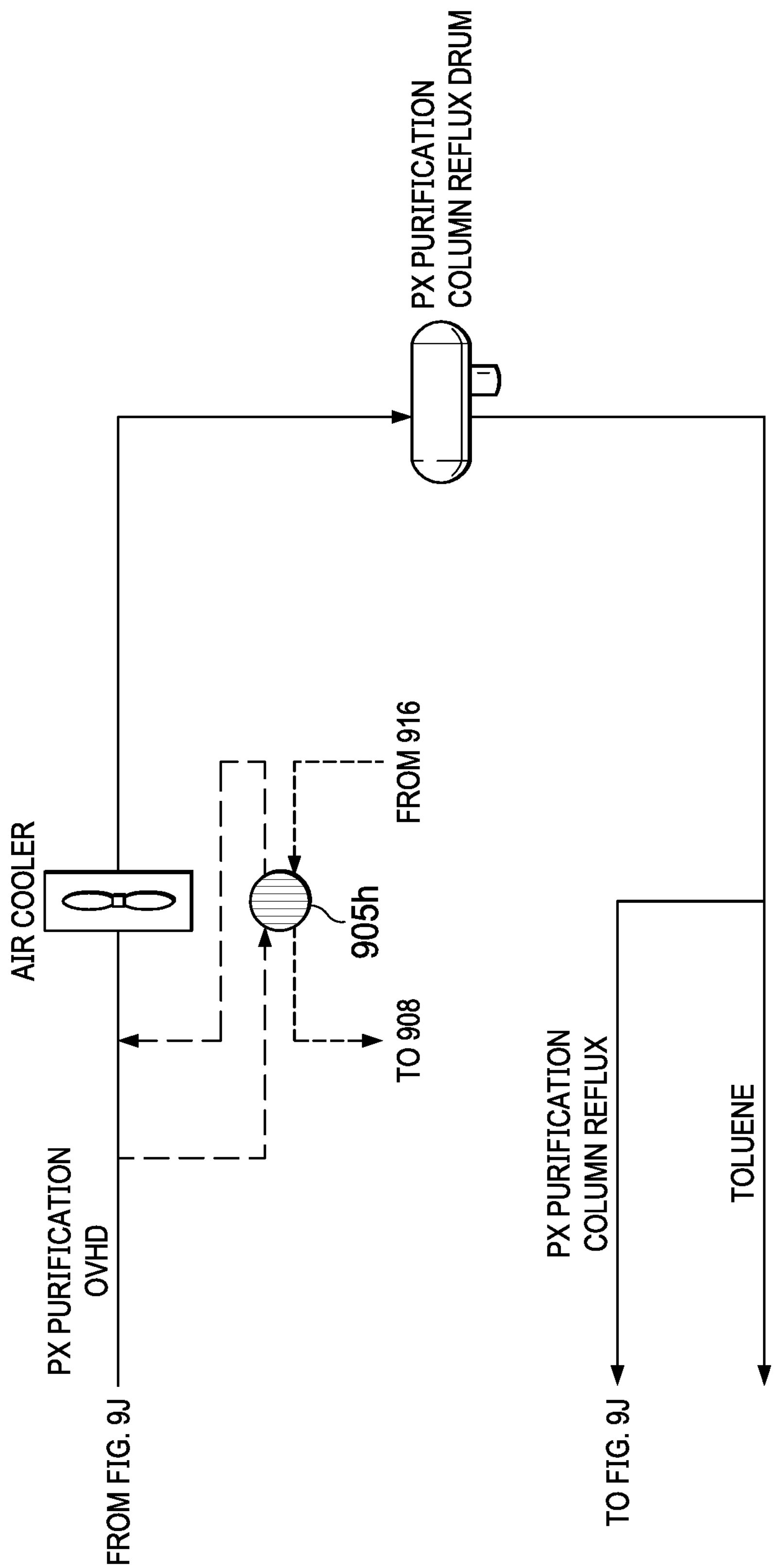
Figure 9L:
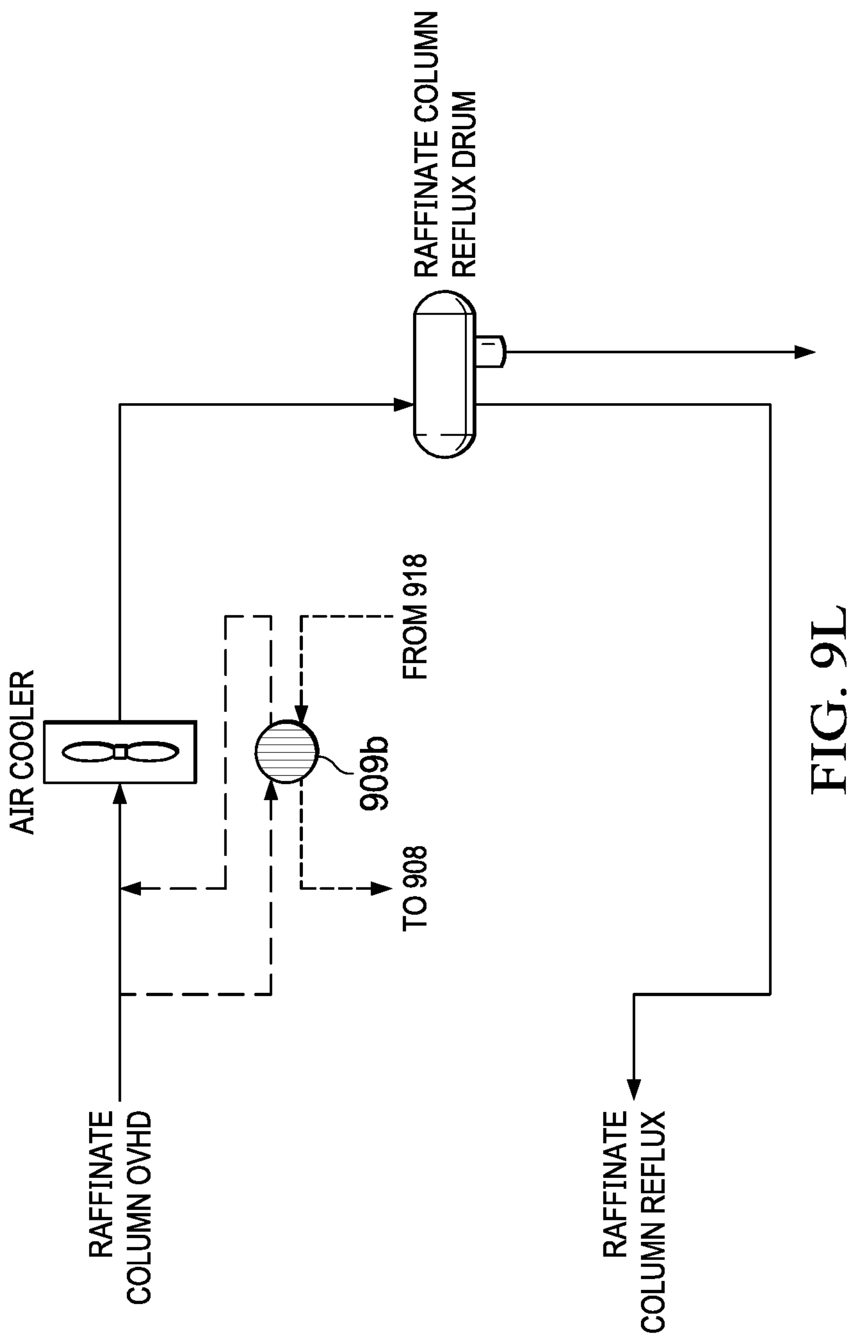
Figure 9M:
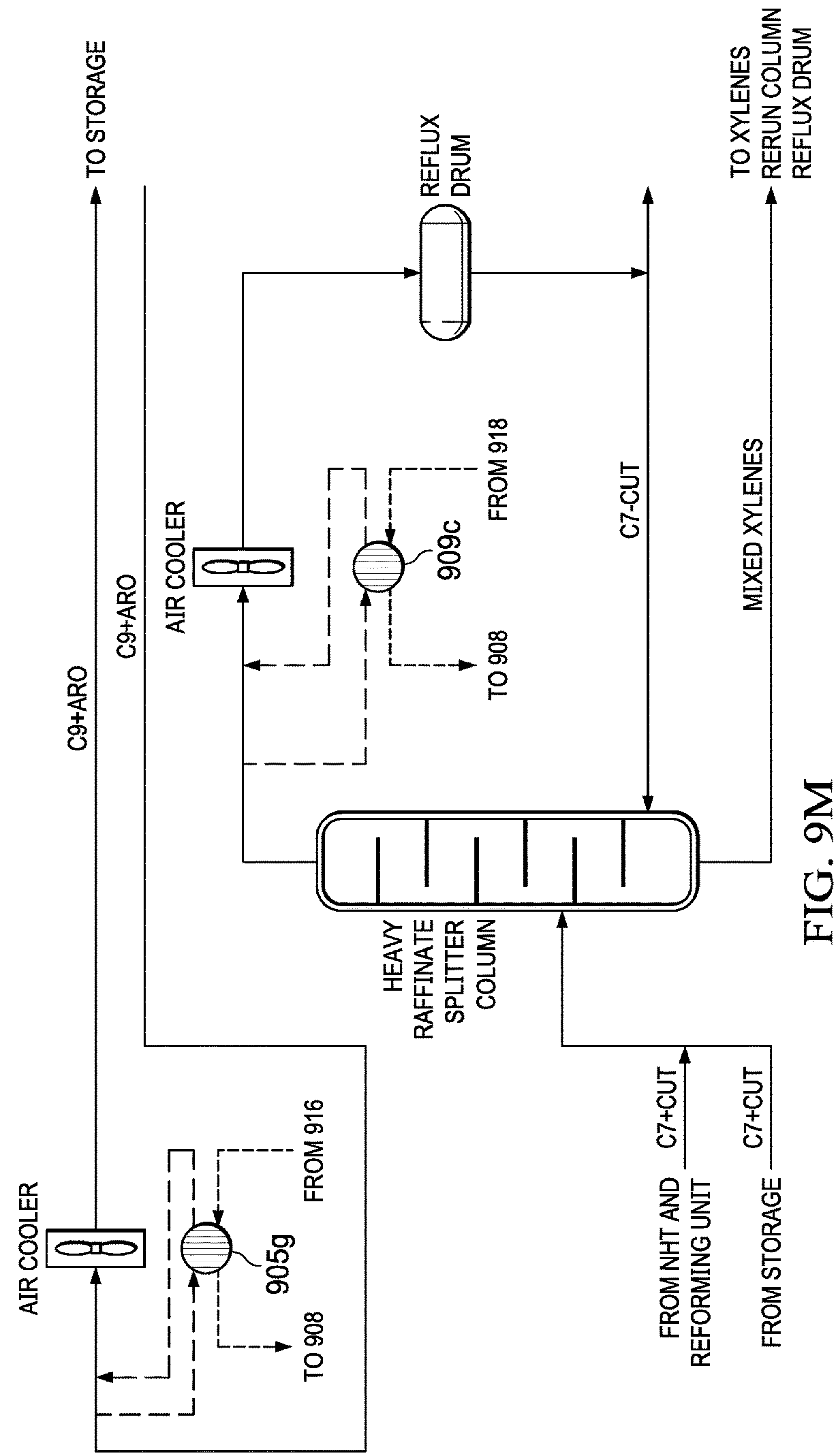
Figure 9N:
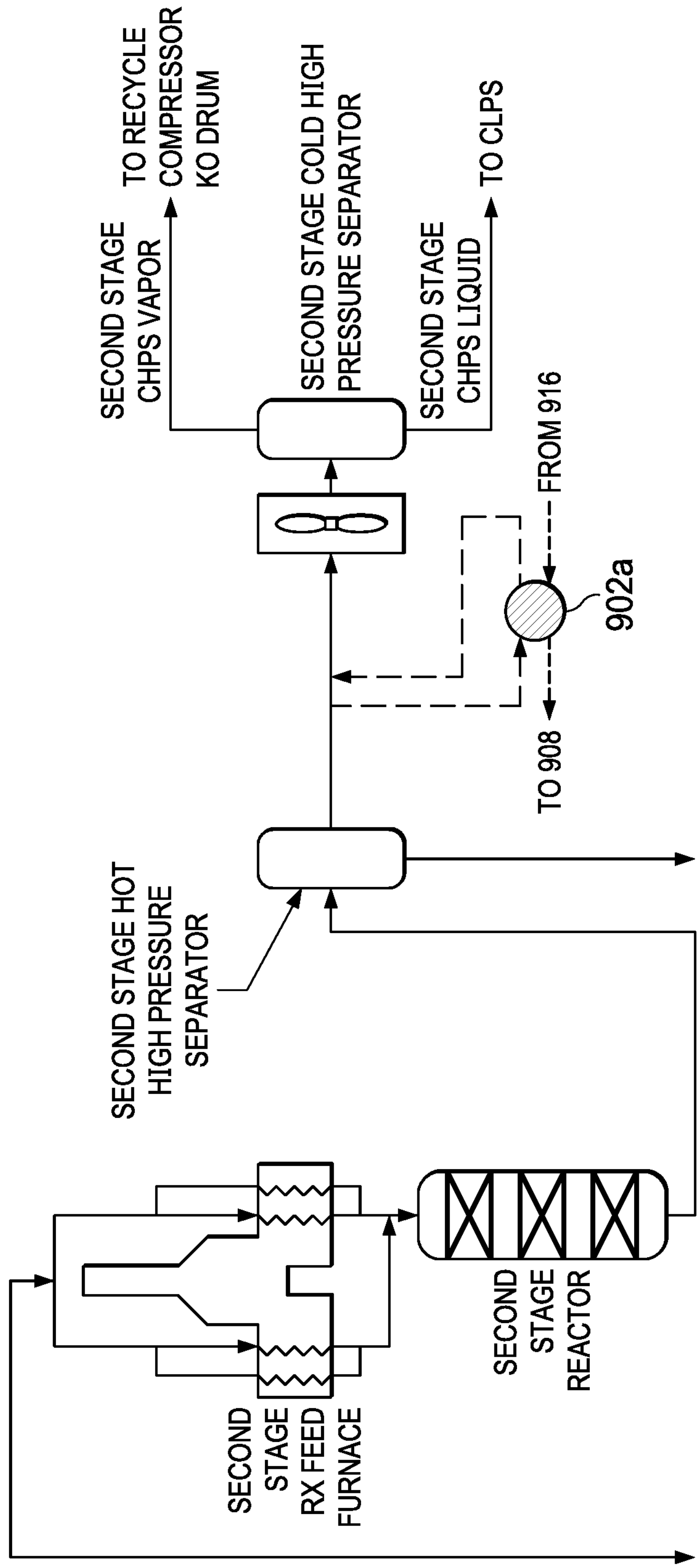
Figure 9O:
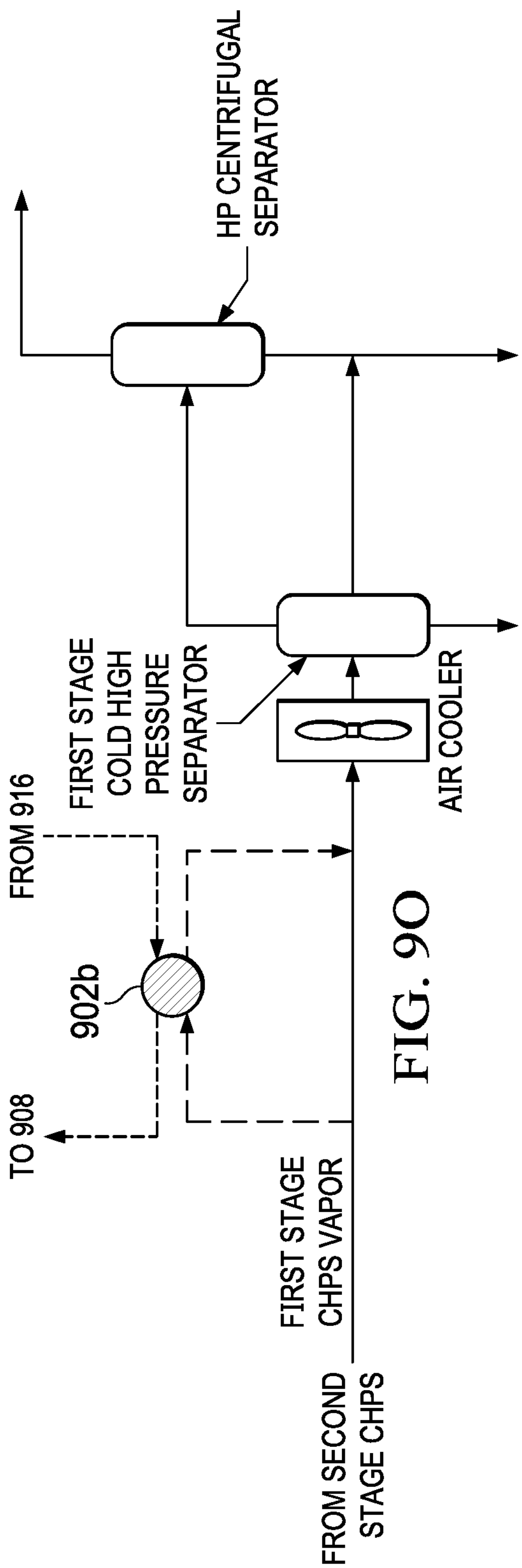
Figure 9P:
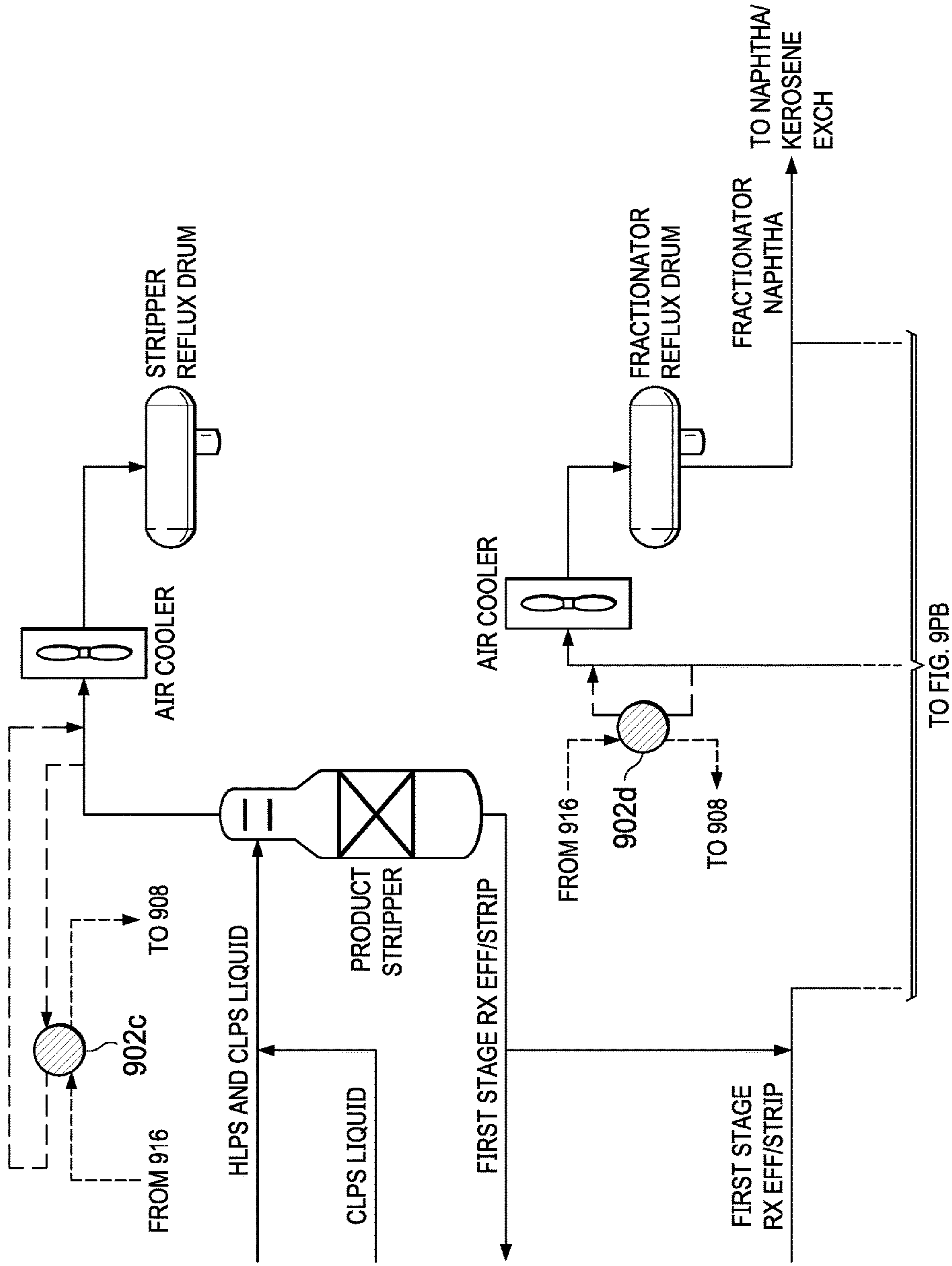
Figure 9P:
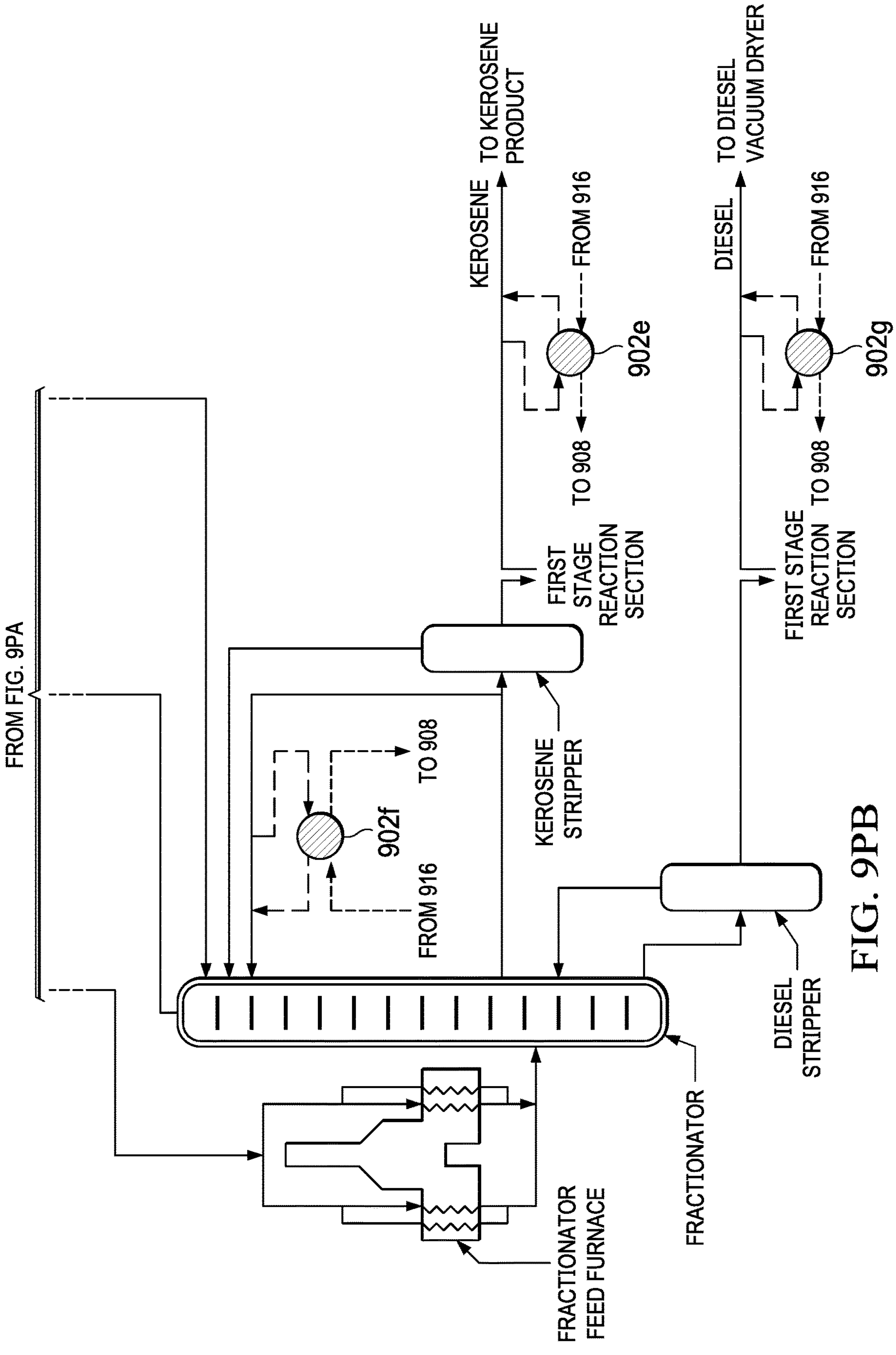
Figure 9Q:
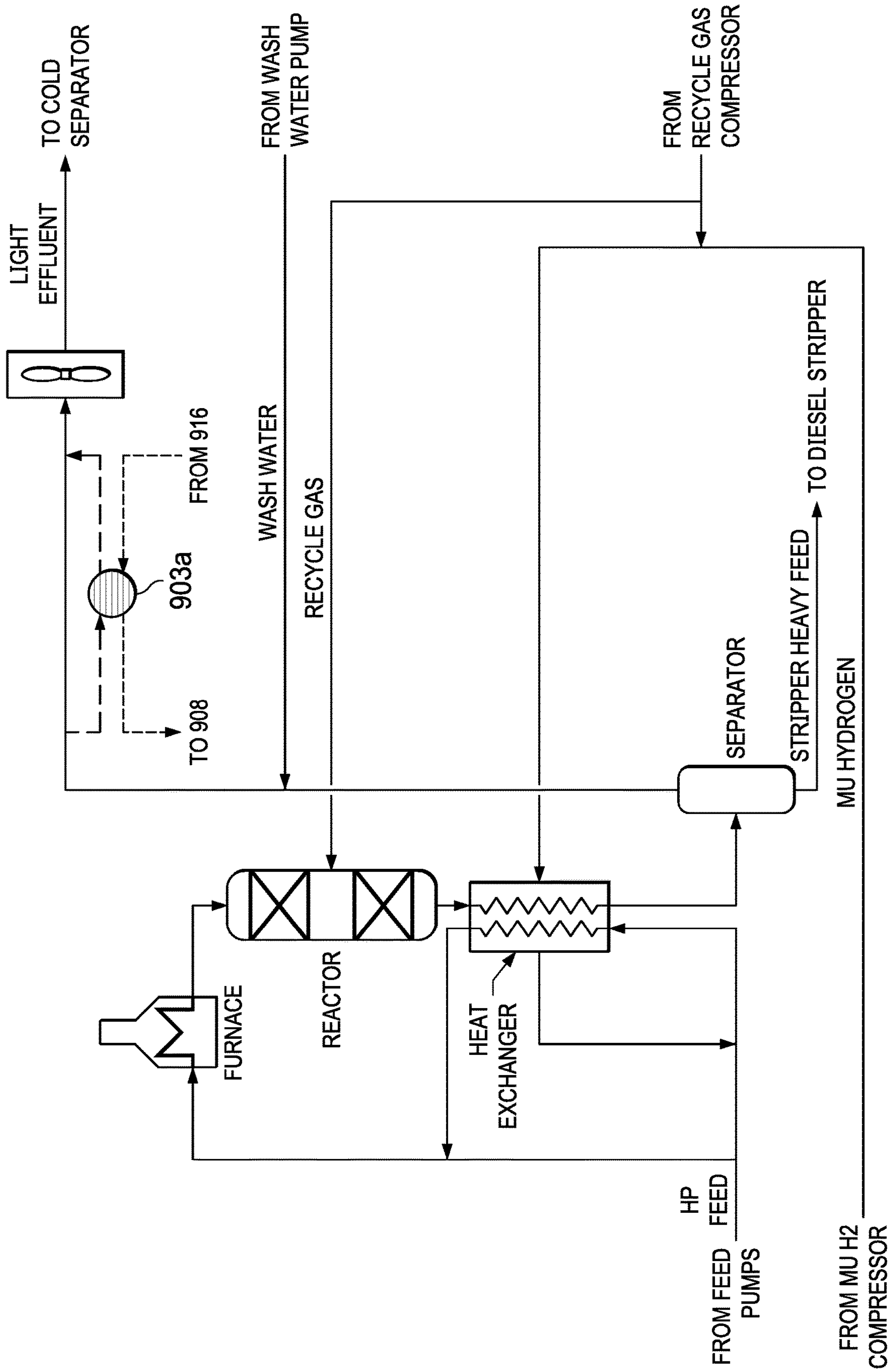
Figure 9R:
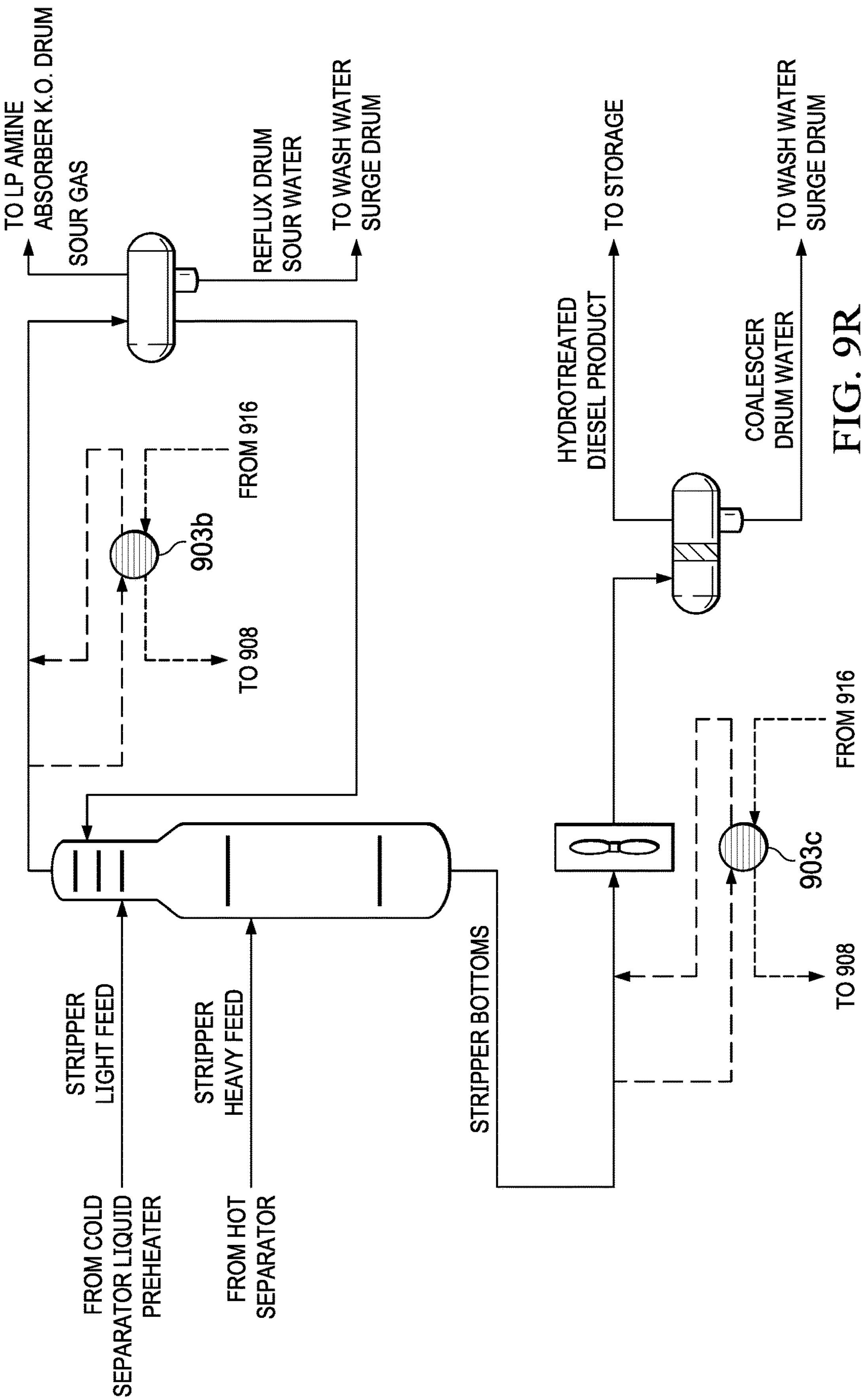
Figure 9S:
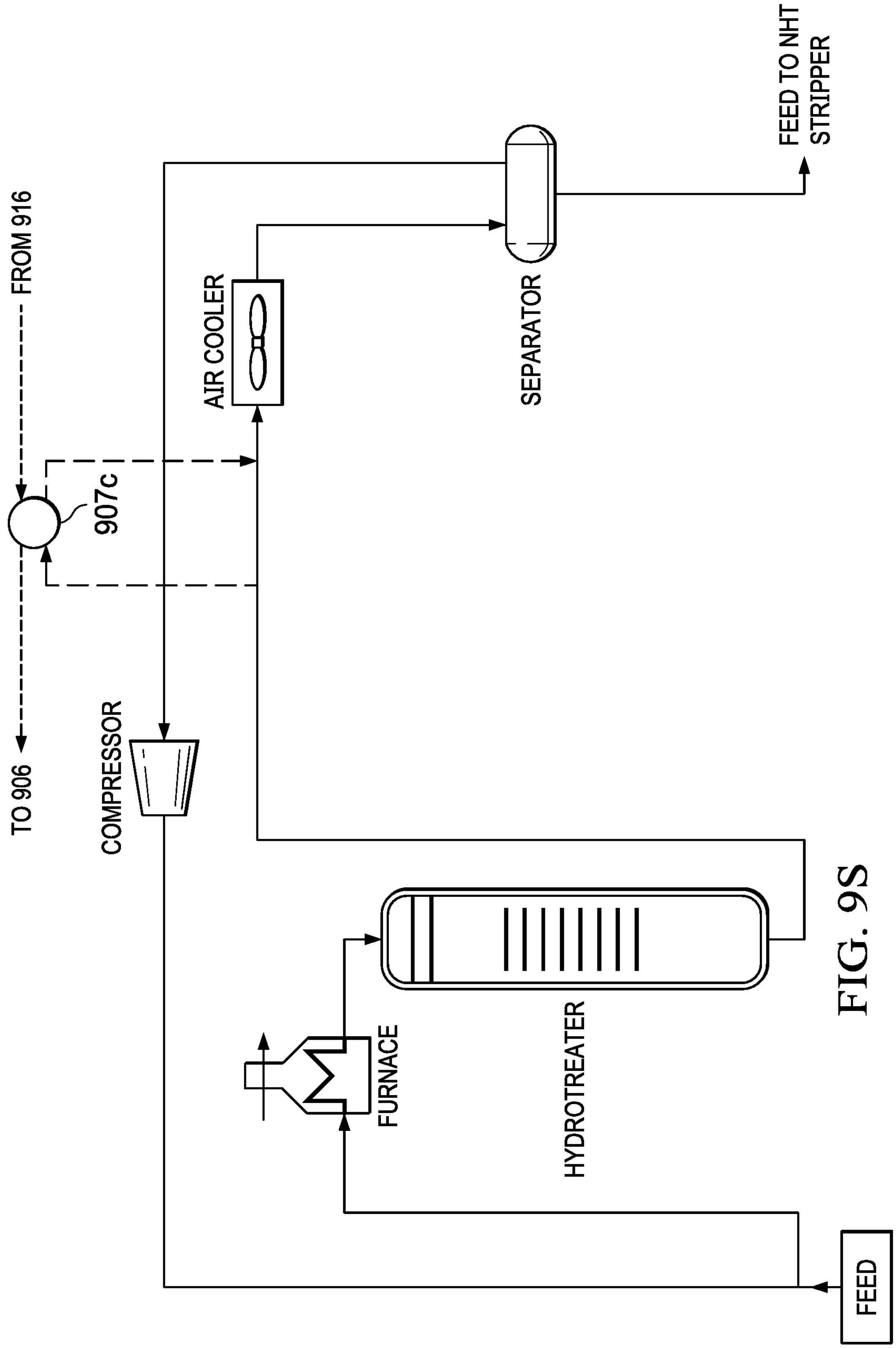
Figure 9T:
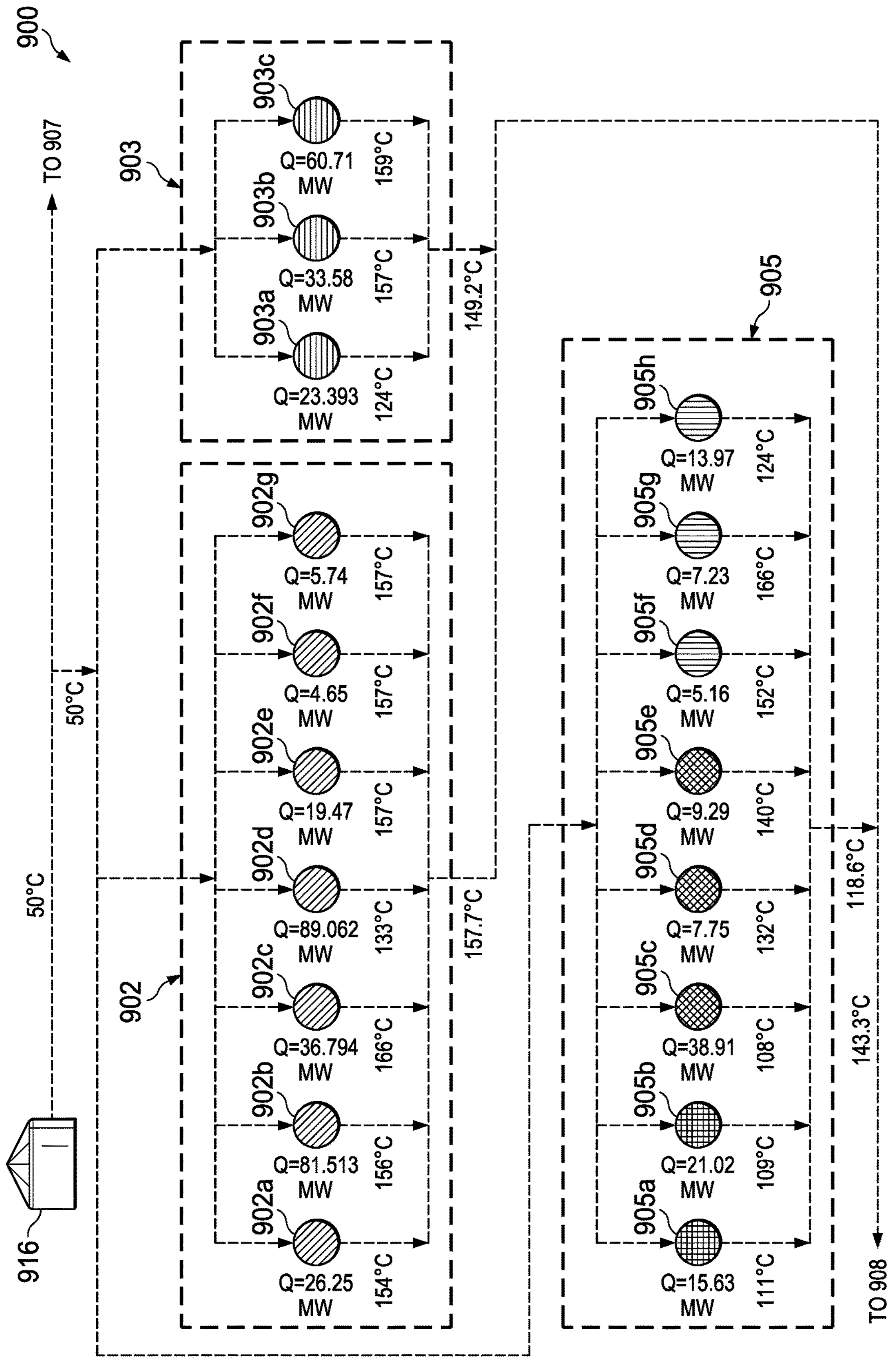
Figure 9U:
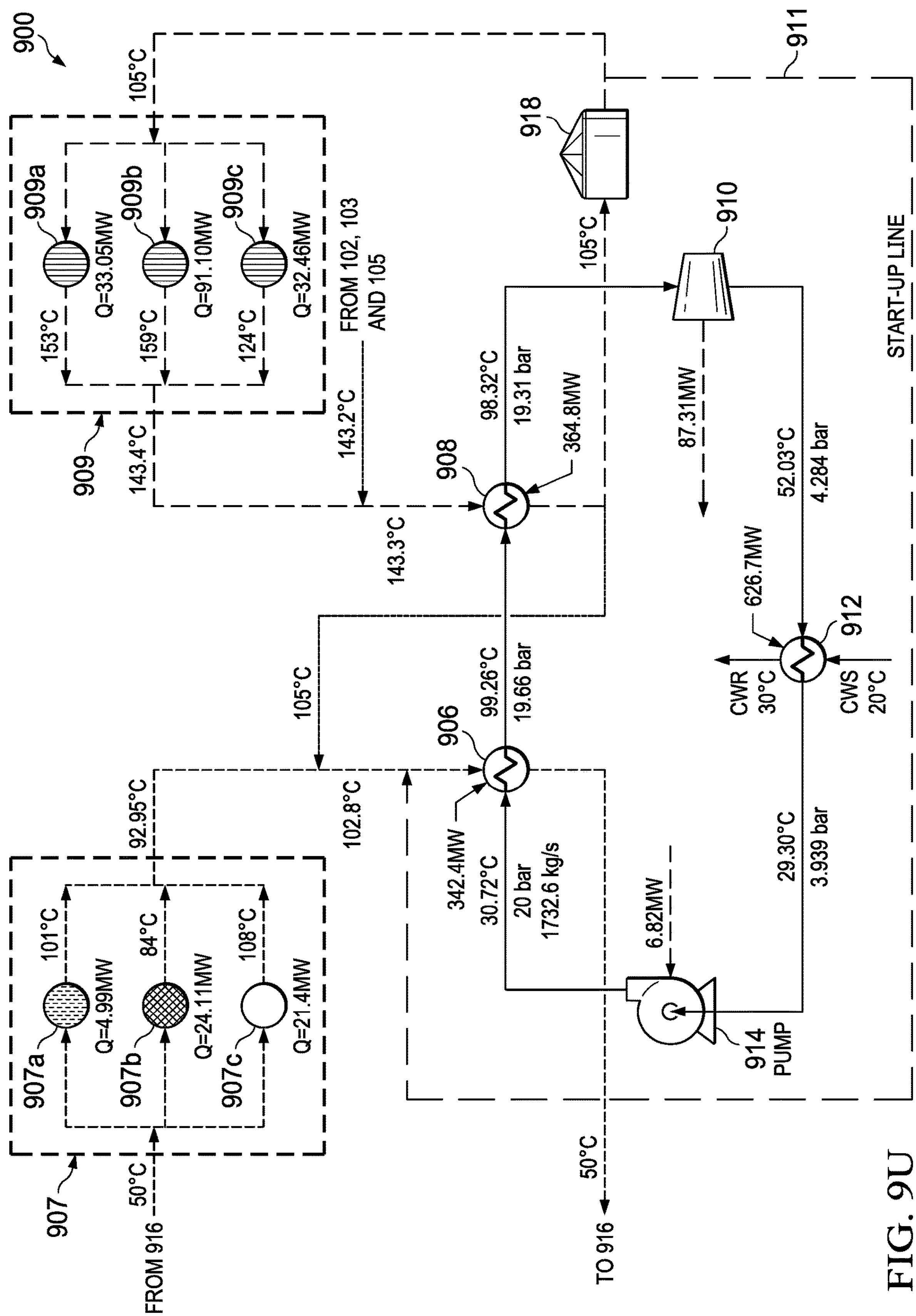

FIGS. 9A-9U illustrate schematic views of an example system 900 of a power conversion network that includes waste heat sources associated with a medium crude oil semi-conversion refining-petrochemicals plant. In this example system 900, a mini-power plant synthesis uses an ORC system having a hot water (or other heating fluid) and isobutane system infrastructure, to generate power from specific portions of a crude oil refining-petrochemical site-wide low-low grade waste heat sources, including hydrocracking-diesel hydrotreating, aromatics, CCR and Naphtha hydrotreating plants. In some aspects, the system 900 can be implemented in one or more steps, where each phase can be separately implemented without hindering future steps to implement the system 900. In some aspects, a minimum approach temperature across a heat exchanger used to transfer heat from a heat source to a working fluid (for example, water) can be as low as 3° C. or may be higher. Higher minimum approach temperatures can be used in the beginning of the phases at the expense of less waste heat recovery and power generation, while reasonable power generation economics of scale designs are still attractive in the level of tens of megawatts of power generation.

In some aspects of system 900, optimized efficiency is realized upon using a minimum approach temperature recommended for the specific heat source streams used in the system design. In such example situations, optimized power generation can be realized without re-changing the initial topology or the sub-set of low grade waste heat streams selected/utilized from the whole crude oil refining-petrochemical complex utilized in an initial phase. System 900 and its related process scheme can be implemented for safety and operability through two ORC systems using one or more buffer streams such as hot oil or high pressure hot water systems or a mix of specified connections among buffer systems. The low-low grade waste-heat-to-power-conversion (for example, lower than the low grade waste heat temperature defined by DOE as 232° C.) may be implemented using an ORC system using isobutane as an organic fluid at specific operating conditions.

System 900 may not change with future changes inside individual hydrocracking-diesel hydrotreating, aromatics, CCR and Naphtha hydrotreating plants to enhance energy efficiency and system 900 may not need to be changed upon improvements in plant waste heat recovery practices, such as heat integration among hot and cold streams. System 900 may use “low-low” grade waste heat, below 160° C. available in heat sources in the medium level crude oil semi-conversion refining facilities and aromatics complex.

FIGS. 9A-9B is a schematic diagram of an example system 900 for a power conversion network that includes waste heat sources associated with hydrocracking-diesel hydrotreating, aromatics, CCR, and Naphtha hydrotreating plants. In this example implementation, system 900 utilizes twenty-four distinct heat sources that feed heat through a working fluid (for example, hot water, hot oil, or otherwise) to an ORC system to produce power. In the illustrated example, the twenty-four heat sources are separated among five heat recovery circuits. For instance, heat recovery circuit 902 includes heat exchangers 902*a*-902*g*. Heat recovery circuit 903 includes heat exchangers 903*a*-903*c*. Heat recovery circuit 905 includes heat exchangers 905*a*-905*h*. Heat recovery circuit 907 includes heat exchangers 907*a*-907*c*. Heat recovery circuit 909 includes heat exchangers 909*a*-909*c*.

In the illustrated example, each heat exchanger facilitates heat recovery from a heat source in a particular industrial unit to the working fluid. For example, heat exchangers 902*a*-902*g* recover heat from heat sources in a hydrocracking plant separation unit. In this example, the heat from heat recovery circuit 902 is provided to a heating fluid stream that combines with heating fluid streams from heat recovery circuits 903, 905, and 909, which are then circulated to an evaporator 908 of the ORC 904.

Generally, the heat recovery circuit 902 receives (for example, from an inlet header that fluidly couples a heating fluid tank 916 to the heat exchangers 902*a*-902*g*) high pressure working fluid (for example, hot water, hot oil, or otherwise) for instance, at between about 40° C. to 60° C. and supplies heated fluid (for example, at an outlet header fluidly coupled to the heat exchangers 902*a*-902*g*) at or about 120-160° C. The heat exchangers 902*a*-902*g* may be positioned or distributed along the hydrocracking plant separation system and fluidly coupled to low grade waste heat sources from the system.

Heat exchangers 903*a*-903*c* in heat recovery circuit 903, in this example, recover heat from heat sources in a diesel hydrotreating plant separation unit. Together, the heat exchangers in the heat recovery circuit 903 recover low grade waste heat to deliver the heat via the working fluid to a heating fluid stream that combines with heating fluid streams from heat recovery circuits 902, 905, and 909, which are then circulated to the evaporator 908 of the ORC 904. Generally, the heat recovery circuit 903 receives (for example, from an inlet header that fluidly couples the heating fluid tank 916 to the heat exchangers 903*a*-903*c*) high pressure working fluid (for example, hot water, hot oil, or otherwise) at or about 40-60° C. and it heats it up to about 120-160° C.

Heat exchangers 905*a*-905*h* recover heat from heat sources in a CCR plant and a portion of the aromatics plants separation system. Heat exchanger 905*a*-905*b* and 905*f*-905*h* recover heat from heat source(s) in the portion of the aromatics plants separation system. Heat exchangers 905*c*-905*e* recover heat from heat sources in the CCR. Together, the heat exchangers in the heat recovery circuit 905 recover low grade waste heat to deliver the heat via the working fluid to a heating fluid stream that combines with heating fluid streams from heat recovery circuits 902, 903, and 909, which are then circulated to the evaporator 908 of the ORC 904. Generally, the heat recovery circuit 905 receives (for example, from an inlet header that fluidly couples a heating fluid tank 916 to the heat exchangers 905*a*-905*h*) high pressure working fluid (for example, hot water, hot oil, or otherwise) at or about 40-60° C. and it heats it up to about 120-160° C.

Heat exchangers 907*a*-907*c* in heat recovery circuit 907, in this example, recover heat from heat sources in a Naphtha hydrotreating plant (for example, 907*c*), a CCR plant (for example, 907*b*), and an aromatics plant (for example, 907*a*). Together, the heat exchangers in the heat recovery circuit 907 recover low grade waste heat to deliver the heat via the working fluid to a heating fluid stream that combines with an output of a heating fluid stream from the evaporator 908 and is then circulated to a pre-heater 906 of the ORC 904. Generally, the heat recovery circuit 907 receives (for example, from an inlet header that fluidly couples the heating fluid tank 916 to the heat exchangers 907*a*-907*c*) high pressure working fluid (for example, hot water, hot oil, or otherwise) at or about 40-60° C. and it heats it up to about 70-110° C.

Heat exchangers 909*a*-909*c* in heat recovery circuit 909, in this example, recover heat from heat sources in a separation system of the aromatics plants. Together, the heat exchangers in the heat recovery circuit 909 recover low grade waste heat to deliver the heat via the working fluid to a heating fluid stream that combines with heating fluid streams from heat recovery circuits 902, 903, and 905, which are then circulated to the evaporator 908 of the ORC 904. Generally, the heat recovery circuit 909 receives (for example, from an inlet header that fluidly couples the heating fluid tank 918 to the heat exchangers 909*a*-909*c*) high pressure working fluid (for example, hot water, hot oil, or otherwise) at or about 90-110° C. and it heats it up to about 120-160° C.

In the example implementation of system 900, the ORC 904 includes a working fluid that is thermally coupled to the heat recovery circuits 902, 903, 905, 907, and 909 to heat the working fluid. In some implementations, the working fluid can be isobutane. The ORC 904 can also include a gas expander 910 (for example, a turbine-generator) configured to generate electrical power from the heated working fluid. As shown in FIG. 9B, the ORC 904 can additionally include a pre-heater 906, an evaporator 908, a pump 914, and a condenser 912. In this example implementation, the heat recovery circuit 907 (in combination with an output heated fluid from the evaporator 908) supplies a heated working, or heating, fluid to the pre-heater 906, while the heat recovery circuits 902, 903, 905, and 909 supply a heated working, or heating, fluid to the evaporator 908. As illustrated, a heating fluid stream 911 from the heating fluid tank 918 may be supplied as a start-up fluid stream to the pre-heater 906

In a general operation, a working, or heating, fluid (for example, water, oil, or other fluid) is circulated through the heat exchangers of the heat recovery circuits 902, 903, 905, 907, and 909. An inlet temperature of the heating fluid that is circulated into the inlets of each of the heat exchangers may be the same or substantially the same subject to any temperature variations that may result as the heating fluid flows through respective inlets, and may be circulated directly from a heating fluid tank 916 or 918. Each heat exchanger heats the heating fluid to a respective temperature that is greater than the inlet temperature. The heated heating fluids from the heat exchangers are combined in their respective heat recovery circuits and circulated through one of the pre-heater 906 or the evaporator 908 of the ORC 904. Heat from the heated heating fluid heats the working fluid of the ORC 904 thereby increasing the working fluid pressure and temperature. The heat exchange with the working fluid results in a decrease in the temperature of the heating fluid. The heating fluid is then collected in the heating fluid tank 916 or the heating fluid tank 918 (which also receives a portion of the output of the evaporator 908) and can be pumped back through the respective heat exchangers to restart the waste heat recovery cycle.

The heating fluid circuit to flow heating fluid through the heat exchangers of system 900 can include multiple valves that can be operated manually or automatically. For example, a modulating control valve (as one example) may be positioned in fluid communication with an inlet or outlet of each heat exchanger, on the working fluid and heat source side. In some aspects, the modulating control valve may be a shut-off valve or additional shut-off valves may also be positioned in fluid communication with the heat exchangers. An operator can manually open each valve in the circuit to cause the heating fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

In the manner described earlier, the heating fluid can be looped through the heat exchangers to recover heat that would otherwise go to waste in the hydrocracking-diesel hydrotreating, aromatics, CCR and Naphtha hydrotreating plants, and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

FIG. 9C is a schematic diagram that illustrates an example placement of heat exchanger 905*c* in a crude oil refinery continuous catalytic reforming (CCR) plant. In an example implementation illustrated in FIG. 9C, this heat exchanger 905*c* may cool down the CCR last stage reactor outlet after the feed-effluent heat exchanger stream from 111° C. to 60° C. using the high pressure working fluid stream of the heat recovery circuit 905 at 50° C. to raise the working fluid temperature to 108° C. The thermal duty of this heat exchanger 905*c* may be about 38.9 MW. The heating fluid stream at 908° C. is sent to the header of heat recovery circuit 905.

FIG. 9D is a schematic diagram that illustrates an example placement of heat exchangers 905*d* and 905*e* in the crude oil refinery continuous catalytic reforming (CCR) plant. In an example implementation illustrated in FIG. 9D, these two heat exchangers 905*d* and 905*e* have thermal duties of 7.75 MW and 9.29 MW, respectively. Heat exchanger 905*d* cools down a 1st stage compressor outlet stream from 135° C. to 60° C. using the working fluid stream of heat recovery circuit 905 at 50° C. to raise its temperature to 132° C. The heating fluid stream at 132° C. is sent to the header of heat recovery circuit 905. The heat exchanger 905*e* cools down a 2nd stage compressor outlet stream from 143° C. to 60° C. using the working fluid stream of heat recovery circuit 905 at 50° C. to raise its temperature to 140° C. The heating fluid stream at 140° C. is sent to the header of heat recovery circuit 905.

FIG. 9E is a schematic diagram that illustrates an example placement of heat exchanger 907*b* in the crude oil refinery continuous catalytic reforming (CCR) plant. In an example implementation illustrated in FIG. 9E, this heat exchanger 907*b* cools down the CCR light reformate splitter column overhead stream from 87° C. to 60° C. using the working fluid stream of heat recovery circuit 907 at 50° C. to raise the working fluid stream temperature to 84° C. The thermal duty of this heat exchanger 907*b* is about 24.1 MW. The heating fluid at 84° C. is sent to the header of heat recovery circuit 907.

FIG. 9F is a schematic diagram that illustrates an example placement of heat exchanger 907*a* in the benzene extraction unit. In an example implementation illustrated in FIG. 9F, this heat exchanger 907*a* cools down an overhead stream from 104° C. to 100° C. using the working fluid stream of heat recovery circuit 907 at 50° C. to raise the working fluid stream temperature to 101° C. The thermal duty of this heat exchanger 907*a* is 4.99 MW. The heating fluid at 101° C. is sent to the header of heat recovery circuit 907.

FIG. 9G is a schematic diagram that illustrates an example placement of heat exchanger 905*a* in the Para-Xylene separation plant. In an example implementation illustrated in FIG. 9G, this heat exchanger 905*a* cools down the Xylene isomerization reactor outlet stream before the separator drum from 114° C. to 60° C. using the working fluid stream of heat recovery circuit 905 at 50° C. to raise the working fluid stream temperature to 111° C. The thermal duty of this heat exchanger 905*a* is about 15.6 MW. The heating fluid at 111° C. is sent to the header of heat recovery circuit 905.

FIG. 9H is a schematic diagram that illustrates an example placement of heat exchanger 905*b* in the xylene isomerization de-heptanizer of the Para-Xylene separation plant. In an example implementation illustrated in FIG. 9H, this heat exchanger 905*b* cools down the de-heptanizer column overhead stream from 112° C. to 60° C. using the working fluid stream of heat recovery circuit 905 at 50° C. to raise the working fluid stream temperature to 109° C. The thermal duty of this heat exchanger 905*b* is about 21 MW. The heating fluid at 109° C. is sent to the header of heat recovery circuit 905.

FIG. 9I is a schematic diagram that illustrates an example placement of heat exchanger 909*a* in the Para-Xylene separation plant. In an example implementation illustrated in FIG. 9I, this heat exchanger 909*a* cools down an extract column overhead stream from 156° C. to 133° C. using the working fluid stream of heat recovery circuit 909 at 105° C. to raise the working fluid stream temperature to 153° C. The thermal duty of this heat exchanger 909*a* is about 33 MW. The heating fluid at 153° C. is sent to the header of heat recovery circuit 909.

FIG. 9J is a schematic diagram that illustrates an example placement of heat exchanger 905*f* in the Para-Xylene separation plant. In an example implementation illustrated in FIG. 9J, this heat exchanger 905*f* cools down the PX purification column bottom product stream from 155° C. to 60° C. using the working fluid stream of heat recovery circuit 905 at 50° C. to raise the working fluid stream temperature to 152° C. The thermal duty of this heat exchanger 905*f* is about 5.16 MW. The heating fluid at 152° C. is sent to the header of heat recovery circuit 905.

FIG. 9K is a schematic diagram that illustrates an example placement of heat exchanger 905*h* in the Para-Xylene separation plant. In an example implementation illustrated in FIG. 9K, this heat exchanger 905*h* cools down the PX purification column overhead stream from 127° C. to 84° C. using the working fluid stream of heat recovery circuit 905 at 50° C. to raise the working fluid stream temperature to 124° C. The thermal duty of this heat exchanger 905*h* is about 13.97 MW. The heating fluid at 124° C. is sent to the header of heat recovery circuit 905.

FIG. 9L is a schematic diagram that illustrates an example placement of heat exchanger 909*b* in the Para-Xylene separation plant. In an example implementation illustrated in FIG. 9L, this heat exchanger 909*b* cools down a Raffinate column overhead stream from 162° C. to 130° C. using the working fluid stream of heat recovery circuit 909 at 105° C. to raise the working fluid stream temperature to 159° C. The thermal duty of this heat exchanger 909*b* is about 91.1 MW. The heating fluid at 159° C. is sent to the header of heat recovery circuit 909.

FIG. 9M is a schematic diagram that illustrates an example placement of heat exchangers 905*g* and 909*c* in the Para-Xylene separation plant. In an example implementation illustrated in FIG. 9M, these two heat exchangers 905*g* and 909*c* have thermal duties of 7.23 MW and 32.46 MW, respectively. Heat exchanger 905*g* cools down the C9+ aromatics before the storage tank from 169° C. to 60° C. using the working fluid stream of heat recovery circuit 905 at 50° C. to raise its temperature to 166° C. The heating fluid stream at 166° C. is sent to the header of heat recovery circuit 905. The heat exchanger 909*c* cools down the heavy Raffinate splitter column overhead stream from 127° C. to 113° C. using the working fluid stream of heat recovery circuit 909 at 105° C. to raise its temperature to 124° C. The heating fluid stream at 124° C. is sent to the header of heat recovery circuit 909.

FIG. 9N is a schematic diagram that illustrates an example placement of heat exchanger 902*a* in the hydrocracking plant. In an example implementation illustrated in FIG. 9N, this heat exchanger 902*a* cools down the 2nd reaction section 2nd stage cold high pressure separator feed stream from 157° C. to 60° C. using the working fluid stream of heat recovery circuit 902 at 50° C. to raise the working fluid stream temperature to 154° C. The thermal duty of this heat exchanger 902*a* is about 26.25 MW. The heating fluid at 154° C. is sent to the header of heat recovery circuit 902.

FIG. 9O is a schematic diagram that illustrates an example placement of heat exchanger 902*b* in the hydrocracking plant. In an example implementation illustrated in FIG. 9O, this heat exchanger 902*b* cools down the 1st reaction section 1st stage cold high pressure separator feed stream from 159° C. to 60° C. using the working fluid stream of heat recovery circuit 902 at 50° C. to raise the working fluid stream temperature to 156° C. The thermal duty of this heat exchanger 902*b* is about 81.51 MW. The heating fluid at 156° C. is sent to the header of heat recovery circuit 902.

FIGS. 9PA and 9PB is a schematic diagram that illustrates an example placement of heat exchangers 902*c*-902*g* in the hydrocracking plant. In an example implementation illustrated in FIGS. 9PA and 9PB, these heat exchangers 902*c*-902*g* have thermal duties of 36.8 MW, 89 MW, 19.5 MW, 4.65 MW, and 5.74 MW, respectively. Heat exchanger 902*c* cools down the product stripper overhead stream from 169° C. to 60° C. using the working fluid stream of heat recovery circuit 902 at 50° C. to raise its temperature to 166° C. The heating fluid stream at 166° C. is sent to the header of heat recovery circuit 902. The heat exchanger 902*d* cools down the main fractionator overhead stream from 136° C. to 60° C. using the working fluid stream of heat recovery circuit 902 at 50° C. to raise its temperature to 133° C. The heating fluid stream at 133° C. is sent to the header of heat recovery circuit 902. The heat exchanger 902*e* cools down the kerosene product stream from 160° C. to 60° C. using the working fluid stream of heat recovery circuit 902 at 50° C. to raise its temperature to 157° C. The heating fluid stream at 157° C. is sent to the header of heat recovery circuit 902. In an example aspect, a steam generator with a thermal duty of about 5.45 MW using a hot stream temperature of 187° C. is used before this heat exchanger 902*e* to generate low pressure steam for process use. The heat exchanger 902*f* cools down the kerosene pumparound stream from 160° C. to 60° C. using the working fluid stream of heat recovery circuit 902 at 50° C. to raise its temperature to 157° C. The heating fluid stream at 157° C. is sent to the header of heat recovery circuit 902. In an example aspect, a steam generator with a thermal duty of about 5.58 MW using a hot stream temperature of 196° C. is used before this heat exchanger 902*f* to generate low pressure steam for process use. The heat exchanger 902*g* cools down the diesel product stream from 160° C. to 60° C. using the working fluid stream of heat recovery circuit 902 at 50° C. to raise its temperature to 157° C. The heating fluid stream at 157° C. is sent to the header of heat recovery circuit 902. In an example aspect, a steam generator with a thermal duty of about 6.47 MW using a hot stream temperature of 204° C. is used before this heat exchanger 902*g* to generate low pressure steam for process use.

FIG. 9Q is a schematic diagram that illustrates an example placement of heat exchanger 903*a* in the hydrotreating plant. In an example implementation illustrated in FIG. 9Q, this heat exchanger 903*a* cools down the light effluent to cold separator stream from 127° C. to 60° C. using the working fluid stream of heat recovery circuit 903 at 50° C. to raise the working fluid stream temperature to 124° C. The thermal duty of this heat exchanger 903*a* is about 23.4 MW. The heating fluid at 124° C. is sent to the header of heat recovery circuit 903.

FIG. 9R is a schematic diagram that illustrates an example placement of heat exchangers 903*b* and 903*c* in the hydrotreating plant. In an example implementation illustrated in FIG. 9R, these heat exchangers have thermal duties of 33.58 MW and 60.71 MW, respectively. The heat exchanger 903*b* cools down the diesel stripper overhead stream from 160° C. to 60° C. using the working fluid stream of heat recovery circuit 903 at 50° C. to raise the working fluid stream temperature to 157° C. The heating fluid at 157° C. is sent to the header of heat recovery circuit 903. In an example aspect, a steam generator with a thermal duty of about 6.38 MW using an overhead hot stream temperature of 182° C. is used before this heat exchanger 905*i* to generate low pressure steam for process use. The heat exchanger 903*c* cools down the diesel stripper product stream from 162° C. to 60° C. using the working fluid stream of heat recovery circuit 903 at 50° C. to raise the working fluid stream temperature to 159° C. The heating fluid at 159° C. is sent to the header of heat recovery circuit 903.

FIG. 9S is a schematic diagram that illustrates an example placement of heat exchanger 907*c* in the Naphtha Hydrotreating (NHT) plant. In an example implementation illustrated in FIG. 9S, this heat exchanger 907*c* cools down the hydrotreater/reactor product outlet before the separator from 116° C. to 60° C. using the working fluid stream of heat recovery circuit 907 at 50° C. to raise the working fluid stream temperature to 108° C. The thermal duty of this heat exchanger 907*c* is about 21.4 MW. The heating fluid at 108° C. is sent to the header of heat recovery circuit 907.

As described earlier, FIGS. 9T-9U illustrate a specific example of the system 900, including some example temperatures, thermal duties, efficiencies, power inputs, and power outputs. For example, as illustrated in FIG. 9U, the system 900 generates a power output (with a gas turbine 910 using efficiency of 85%) of about 87.31 MW and the power consumed in the pump using efficiency of 75% is about 6.82 MW. The ORC 904 high pressure at the inlet of the turbine is about 20 bar and at the outlet is about 4.3 bar. The condenser 912 water supply temperature is assumed to be at 20° C. and return temperature is assumed to be at 30° C. The evaporator 908 thermal duty is about 364.8 MW to vaporize about 1735.6 Kg/s of isobutane. The ORC 904 isobutane pre-heater 906 thermal duty is about 342.4 MW to heat up the isobutane from about 31° C. to 99° C. The condenser 912 cooling duty is 626.7 MW to cool down and condense the same flow of isobutane from about 52° C. to 30° C.

Figure 9V:
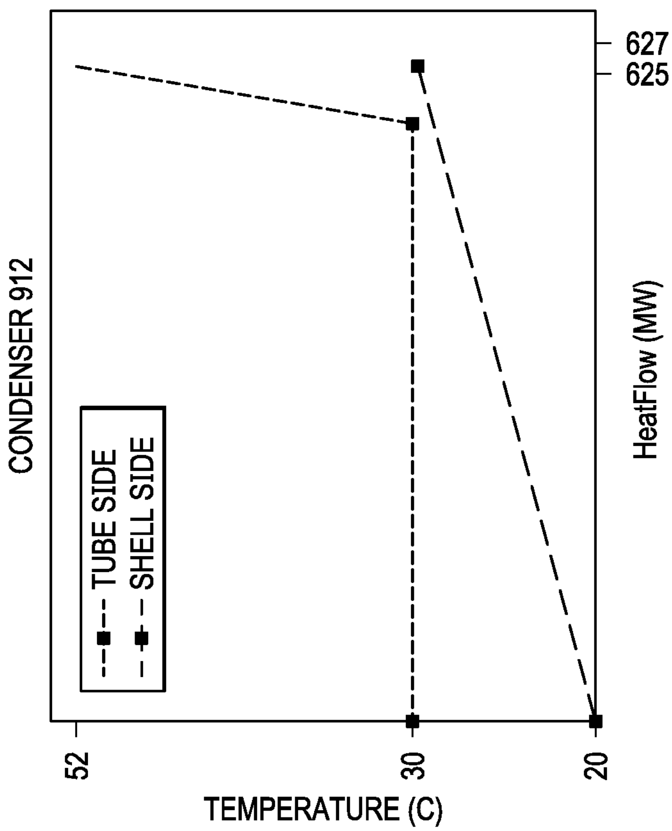

FIG. 9V is a graph that shows a tube side fluid temperature (for example, a cooling, or condenser, fluid flow) and a shell side fluid temperature (for example, an ORC working fluid flow) in the condenser 912 during an operation of the system 900. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature. As shown in FIG. 9V, the condenser water (entering the tubes of the condenser 912) enters at about 20° C. and leaves at about 30° C. The ORC working fluid (entering the shell-side of the condensers) enters as a vapor at about 52° C., and then condenses at about 30° C. and leaves the condensers as a liquid at about 30° C.

Figure 9W:
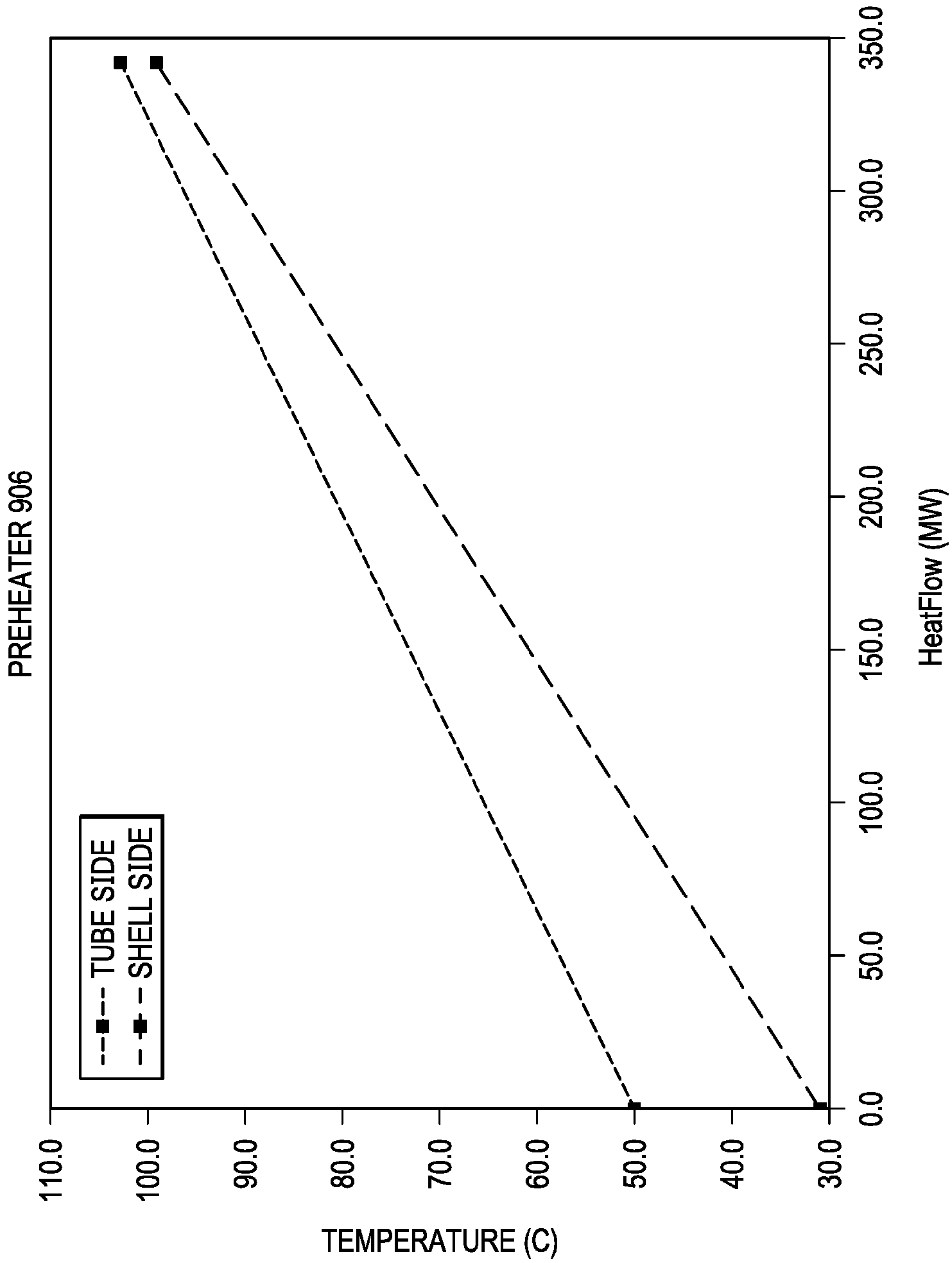

FIG. 9W is a graph that show a tube-side fluid temperature (for example, a heating fluid flow) and a shell-side fluid temperature (for example, an ORC working fluid flow) in the pre-heater 906 during an operation of the system 900. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 9W, as the tube-side fluid (for example, the hot oil or water in the heating fluid circuit 907 and leaving the evaporator 908) is circulated through the pre-heater 906, heat is transferred from that fluid to the shell-side fluid (for example, the ORC working fluid). Thus, the tube-side fluid enters the pre-heater 906 at about 103° C. and leaves the pre-heater 906 at about 50° C. The shell-side fluid enters the pre-heater 906 at about 30° C. (for example, as a liquid) and leaves the pre-heater 906 at about 99° C. (for example, also as a liquid or mixed phase fluid).

Figure 9X:
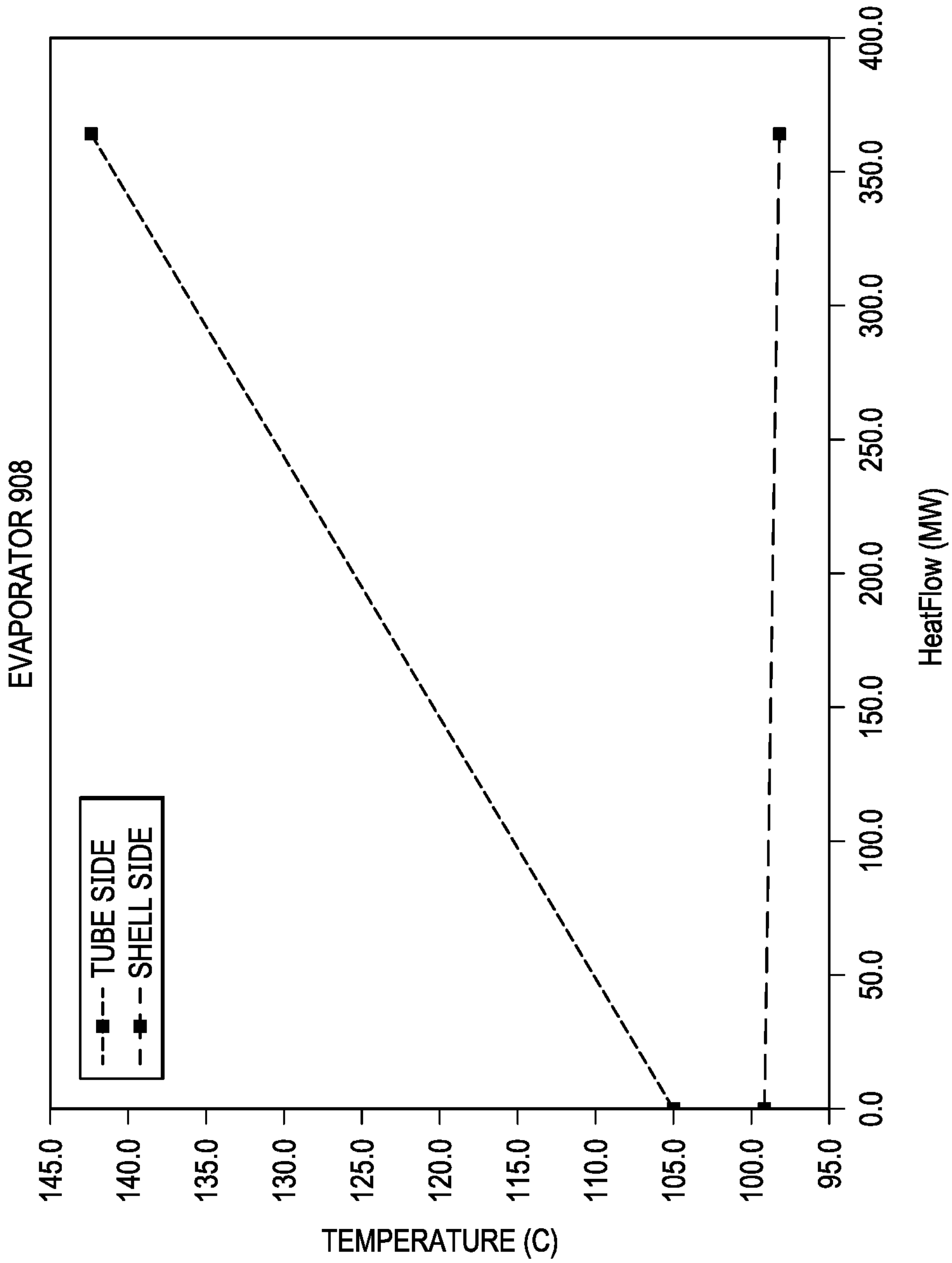

FIG. 9X is a graph that shows a tube side fluid temperature (for example, a heating fluid flow) and a shell side fluid temperature (for example, an ORC working fluid flow) in the evaporator 908 during an operation of the system 900. This graph shows a temperature difference between the fluids on the y-axis relative to a heat flow between the fluids on the x-axis. For example, as shown in this figure, as the temperature difference between the fluids increases, a heat flow between the fluids can increase. For example, as shown in FIG. 9X, as the tube-side fluid (for example, the hot oil or water in the heating fluid circuits 902, 903, 905, and 909) is circulated through the evaporator 908, heat is transferred from that fluid to the shell-side fluid (for example, the ORC working fluid). Thus, the tube-side fluid enters the evaporator 908 at about 143° C. and leaves the evaporator 908 at about 105° C. The shell-side fluid enters the evaporator 908, from the pre-heater 906, at about 99° C. (for example, as a liquid or mixed phase fluid) and leaves the evaporator 908 also at about 99° C. (for example, as a vapor with some superheating).

In the illustrated example, system 900 may include an independent power generation system using a diesel hydrotreating-hydrocracking plant module and aromatics, Naphtha hydrotreating and CCR plants for a more energy efficient and "greener" configuration in refining-petrochemical complex via converting its low-low grade waste heat to net power by about 80.5 MW for local utilization or export to the national electricity grid.

Figure 10A:
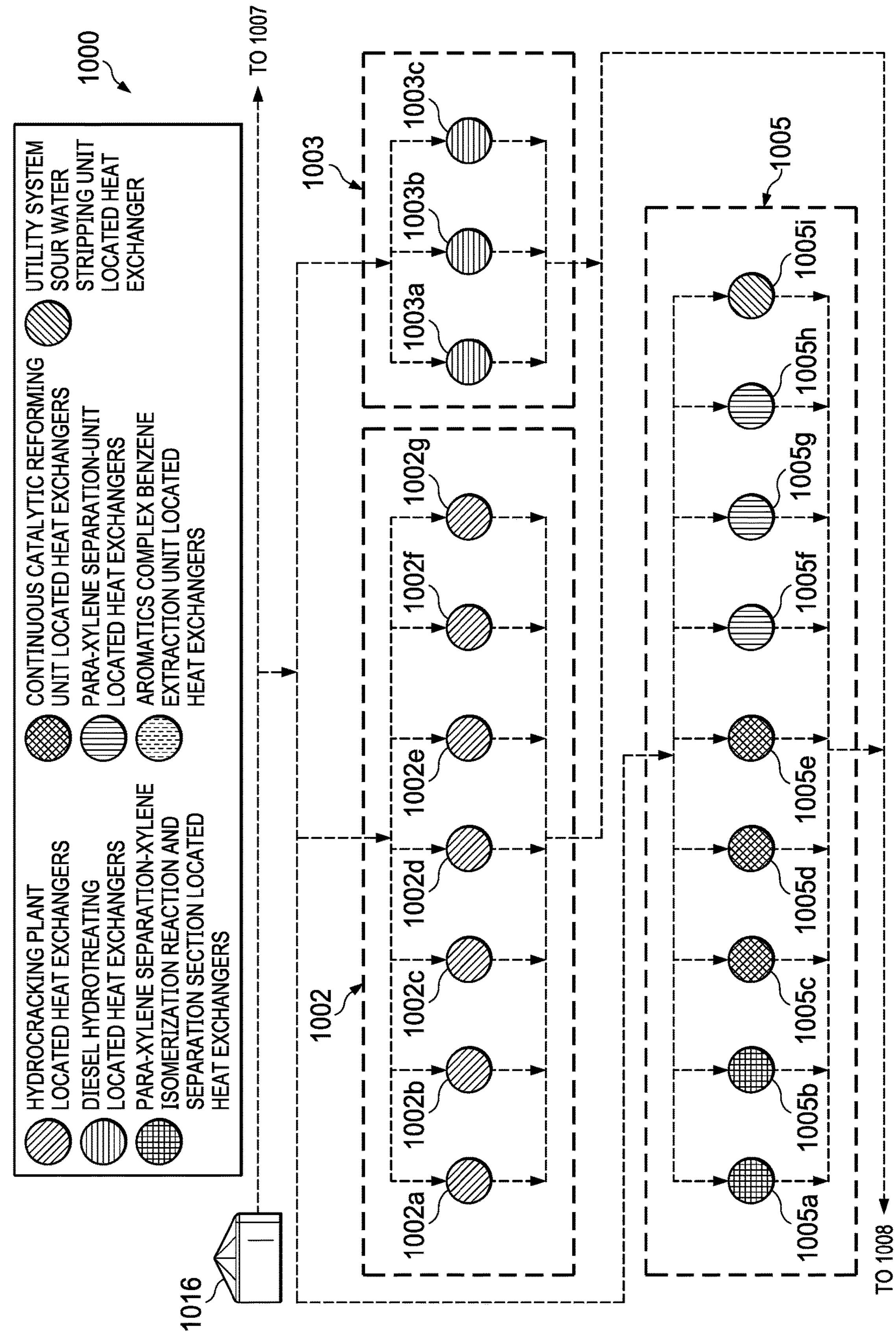
FIGS. 10A-10U are schematic illustrations of a power generation system that utilizes waste heat from one or more heat sources in a petrochemical refining plant.
Figure 10B:
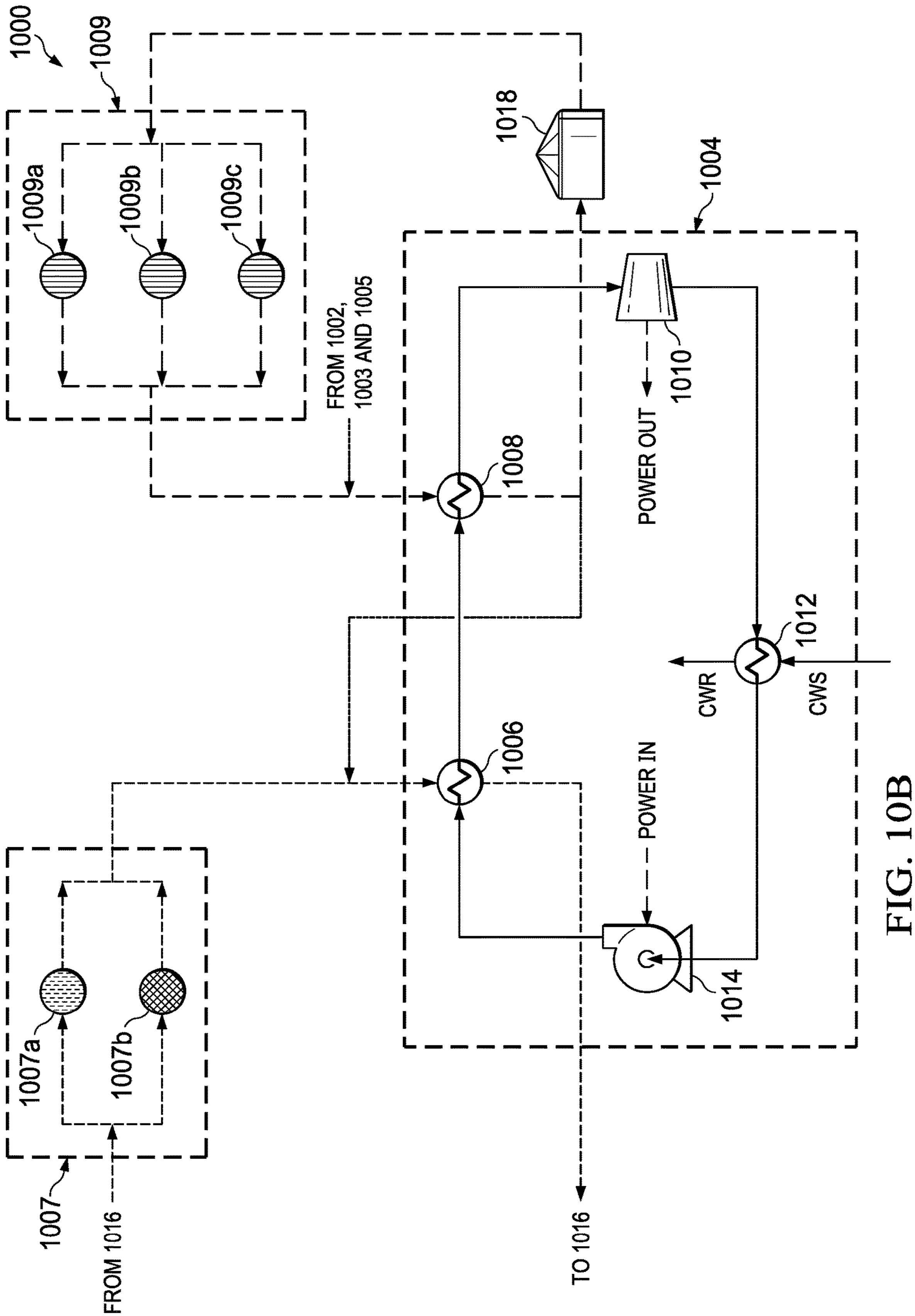
FIGS. 10V-10X are graphs that illustrate heat exchanger performance of heat exchangers in the power generation system shown in FIGS. 10T-10U.
Figure 10C:
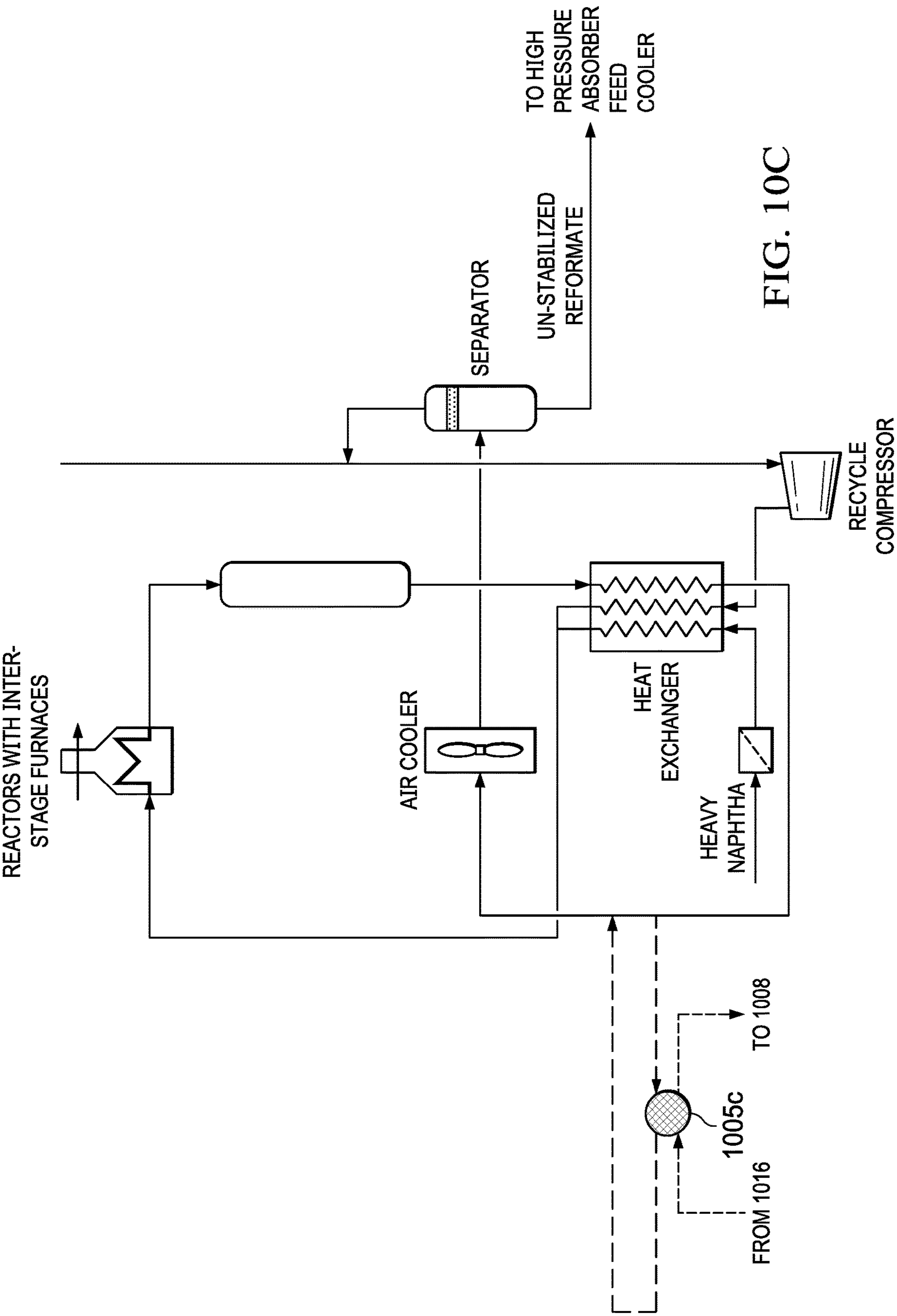
Figure 10D:
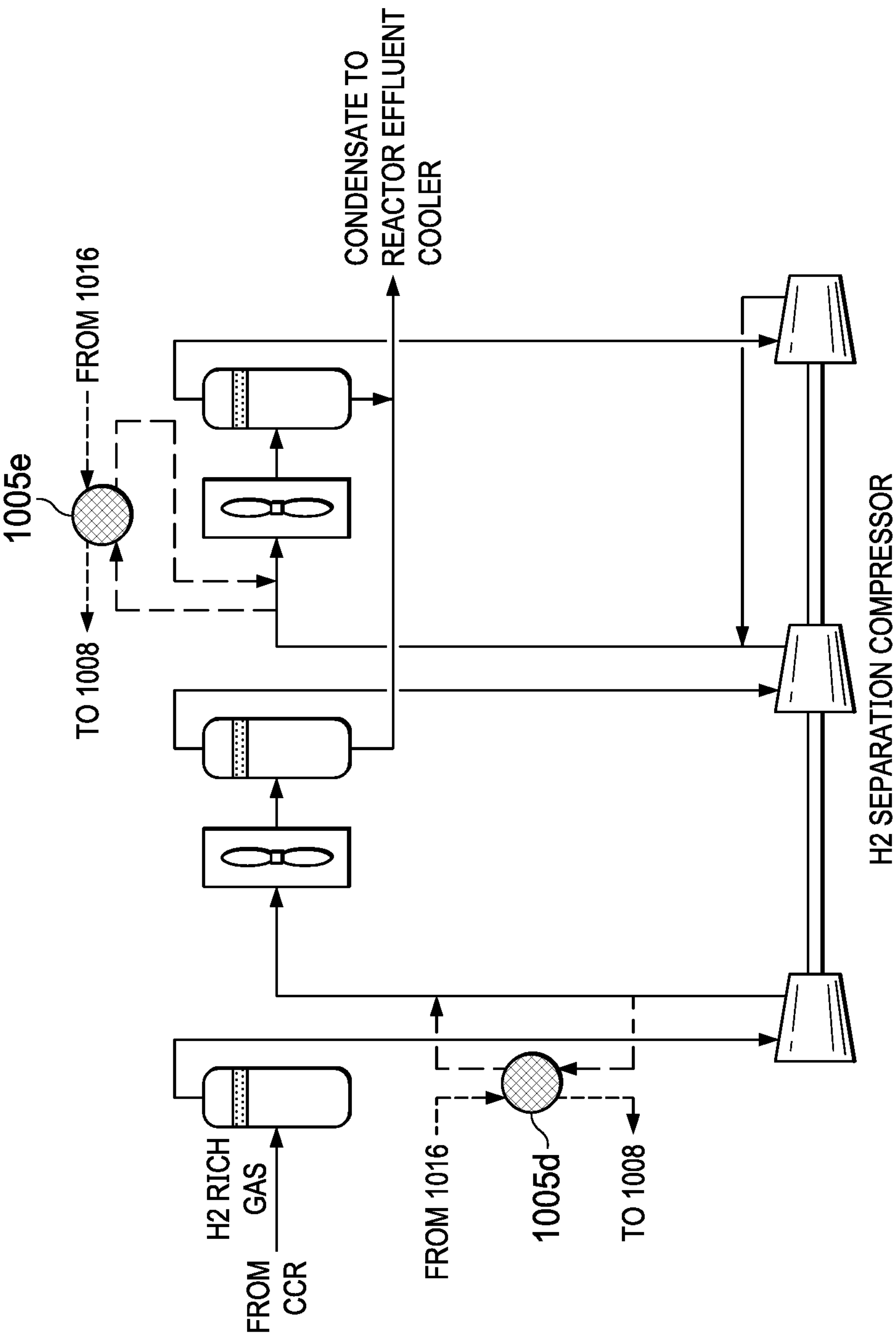
Figure 10E:
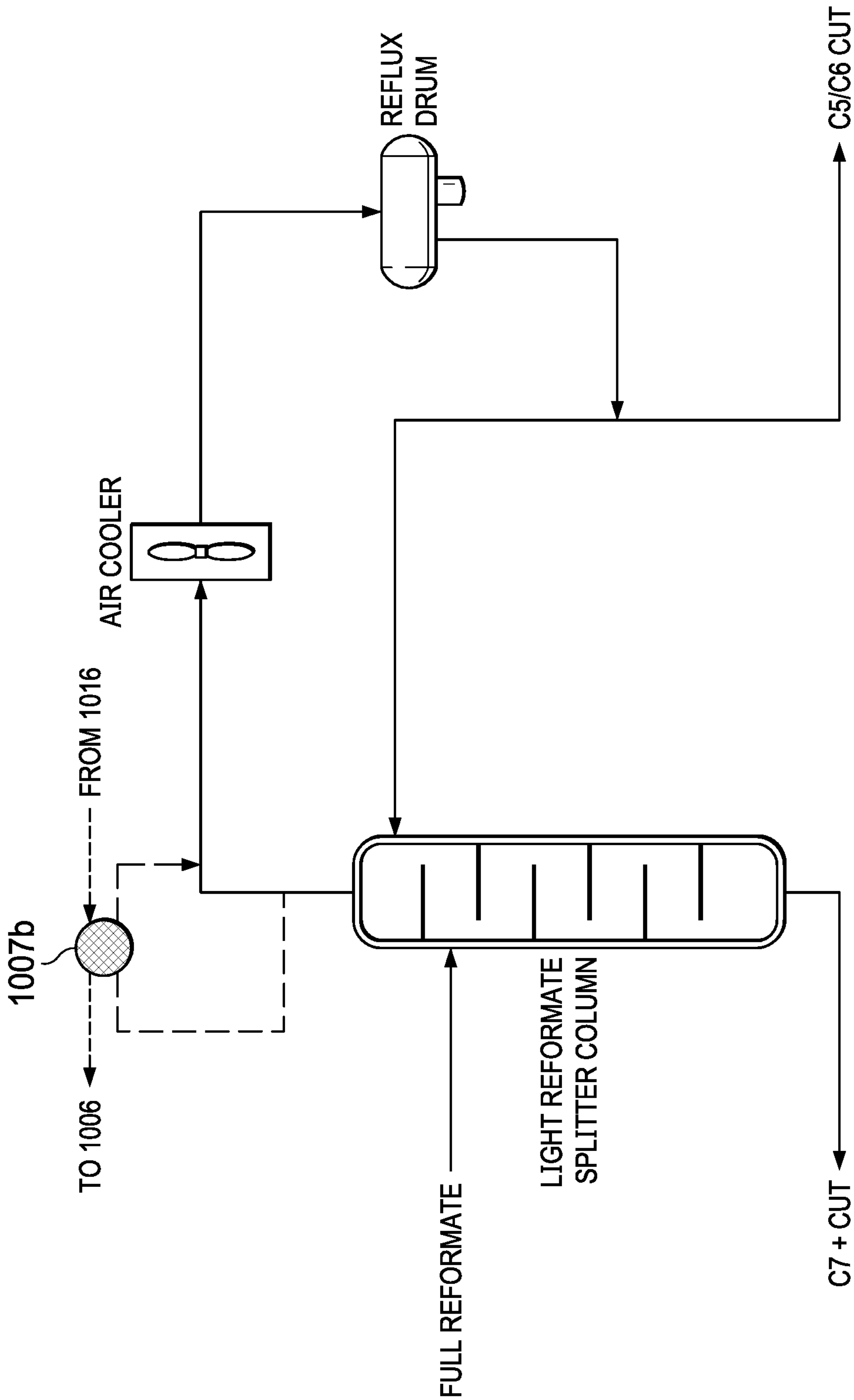
Figure 10F:
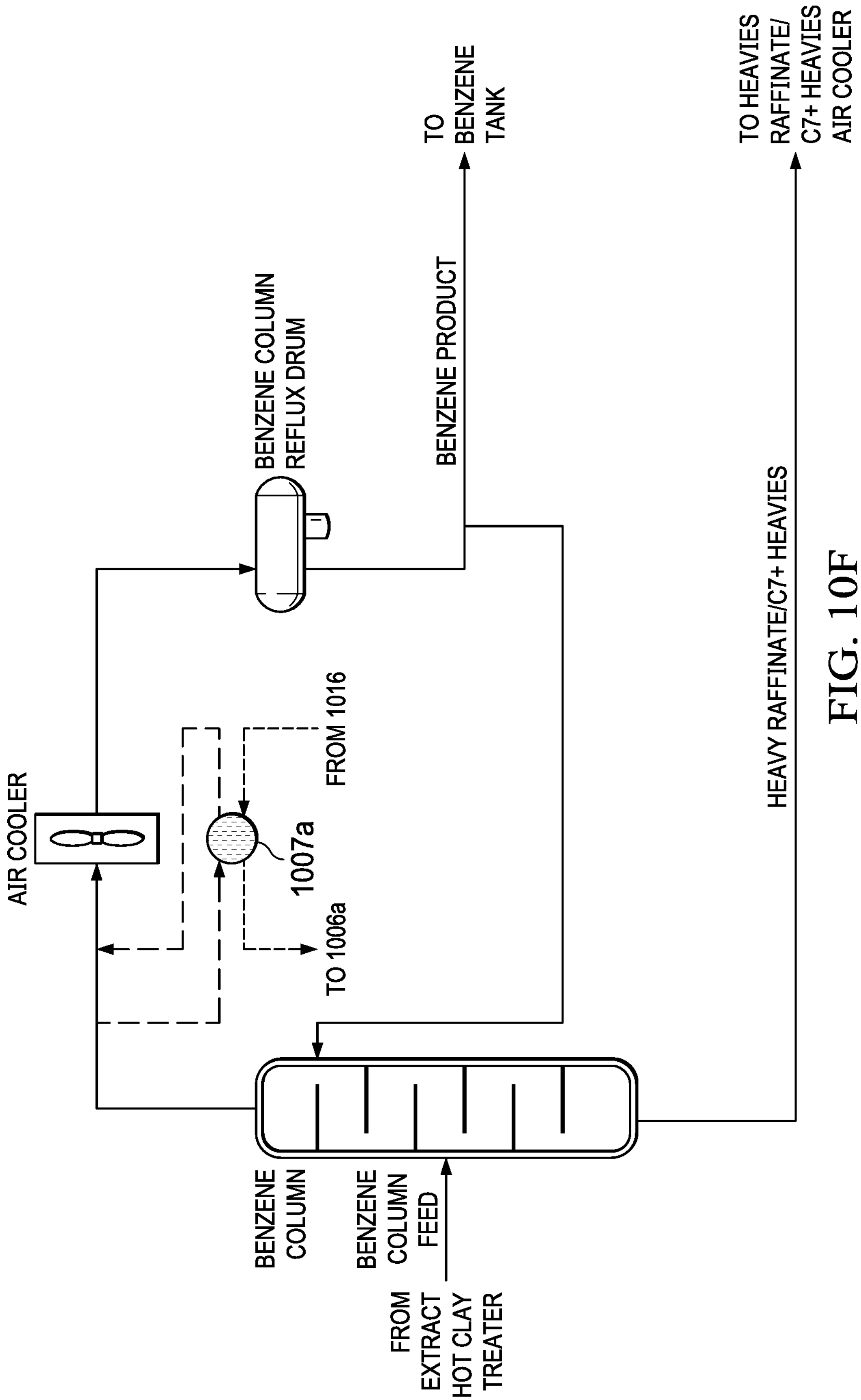
Figure 10G:
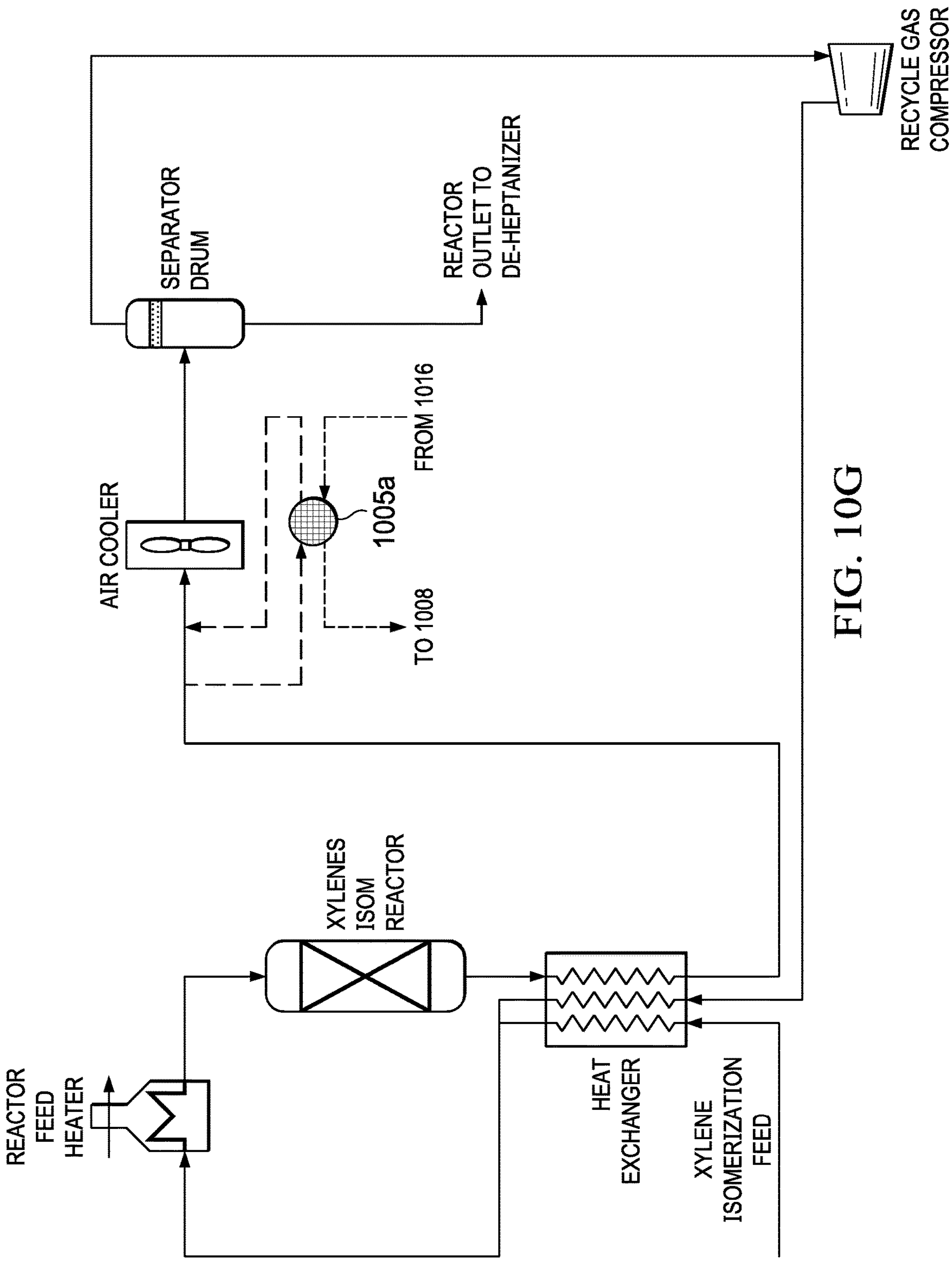
Figure 10H:
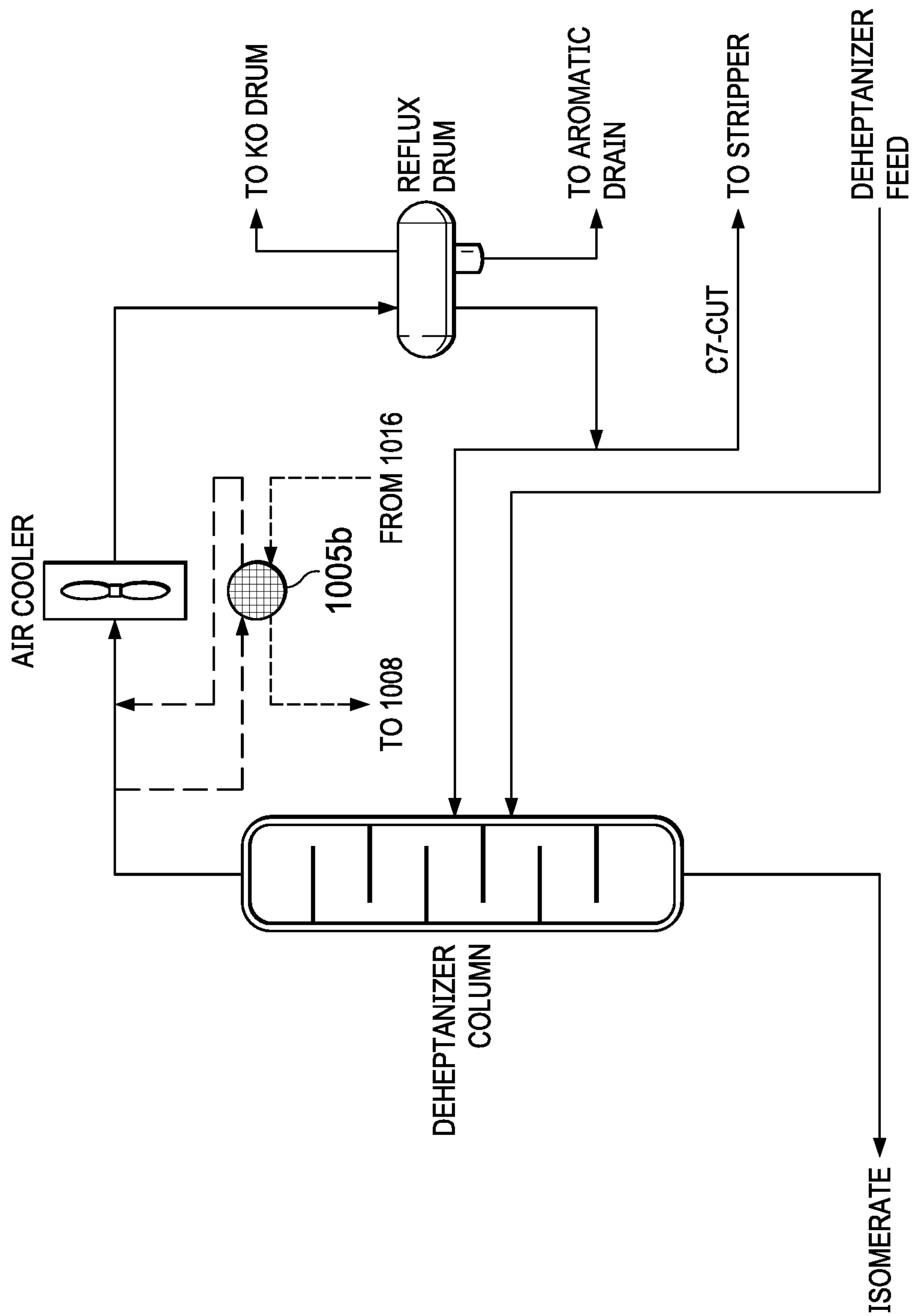
Figure 10I:
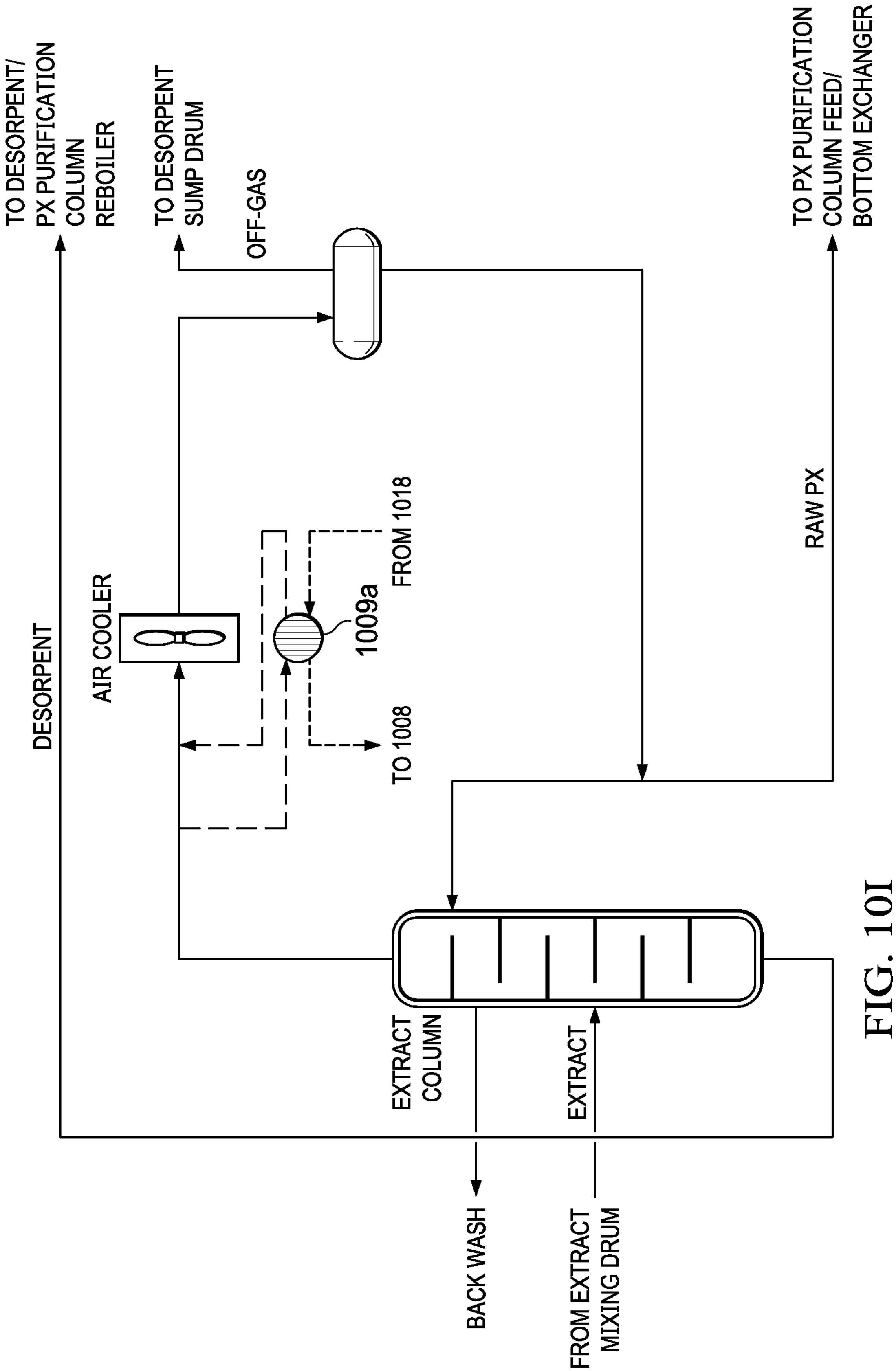
Figure 10J:
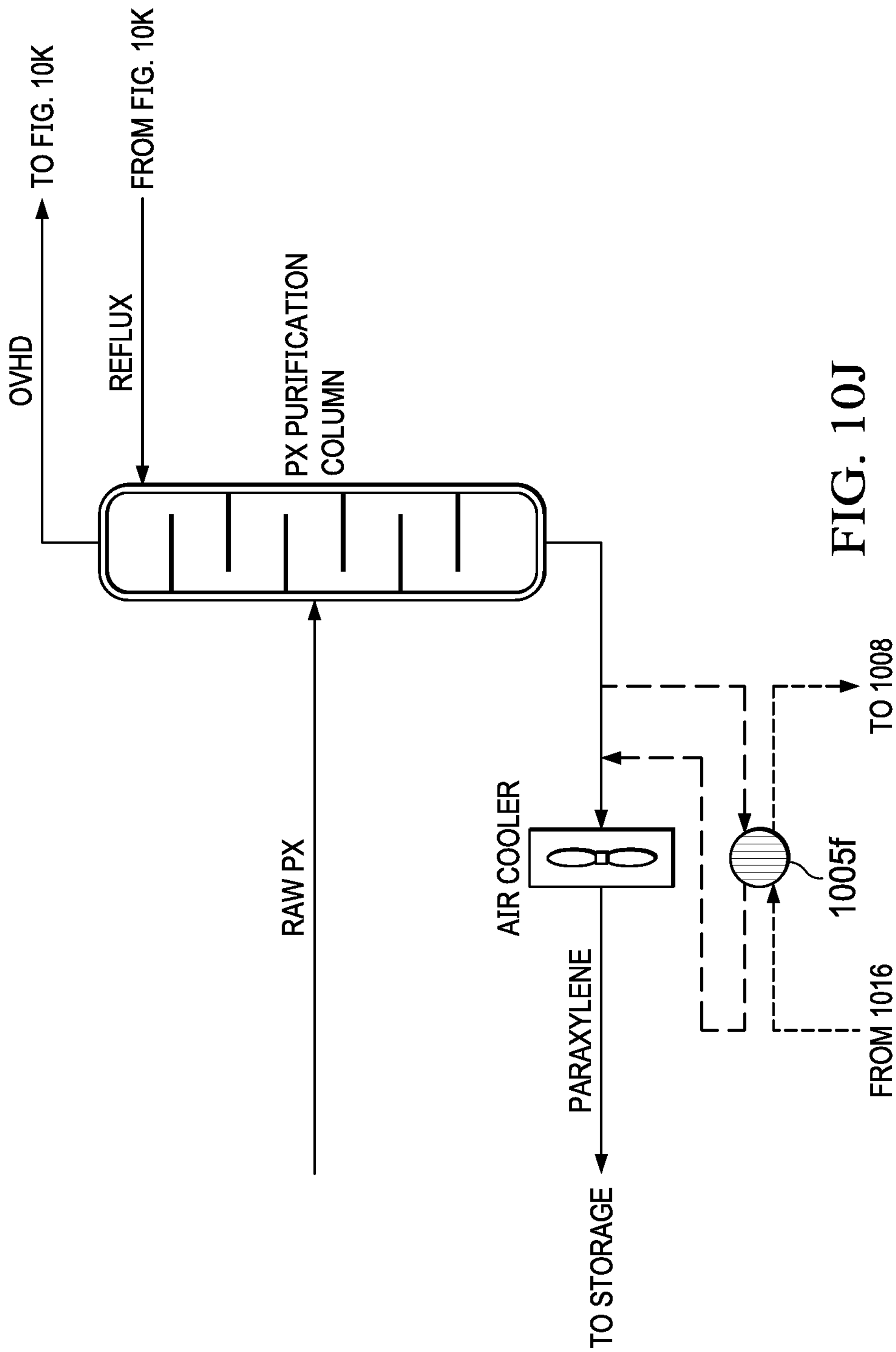
Figure 10K:
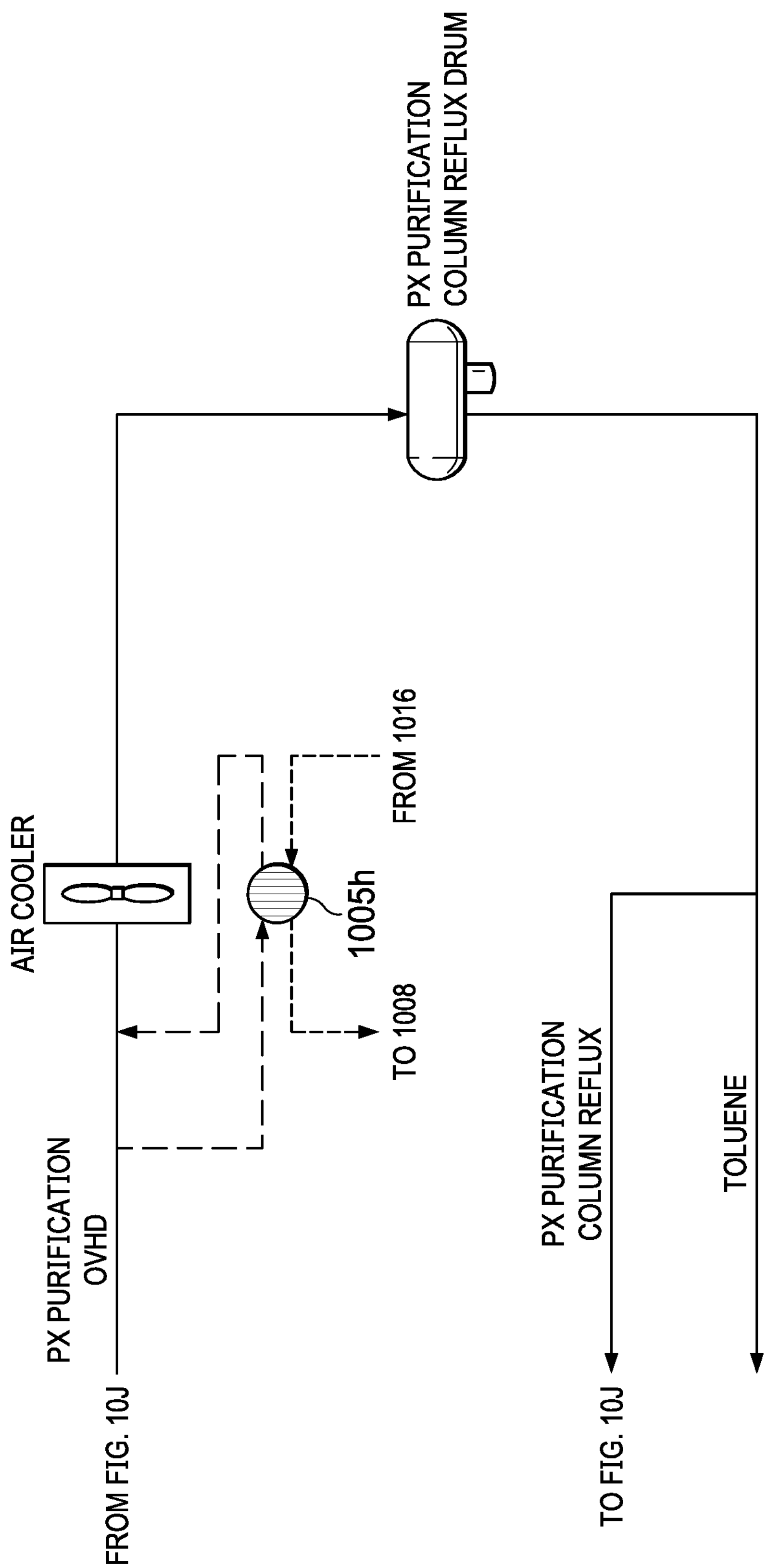
Figure 10L:
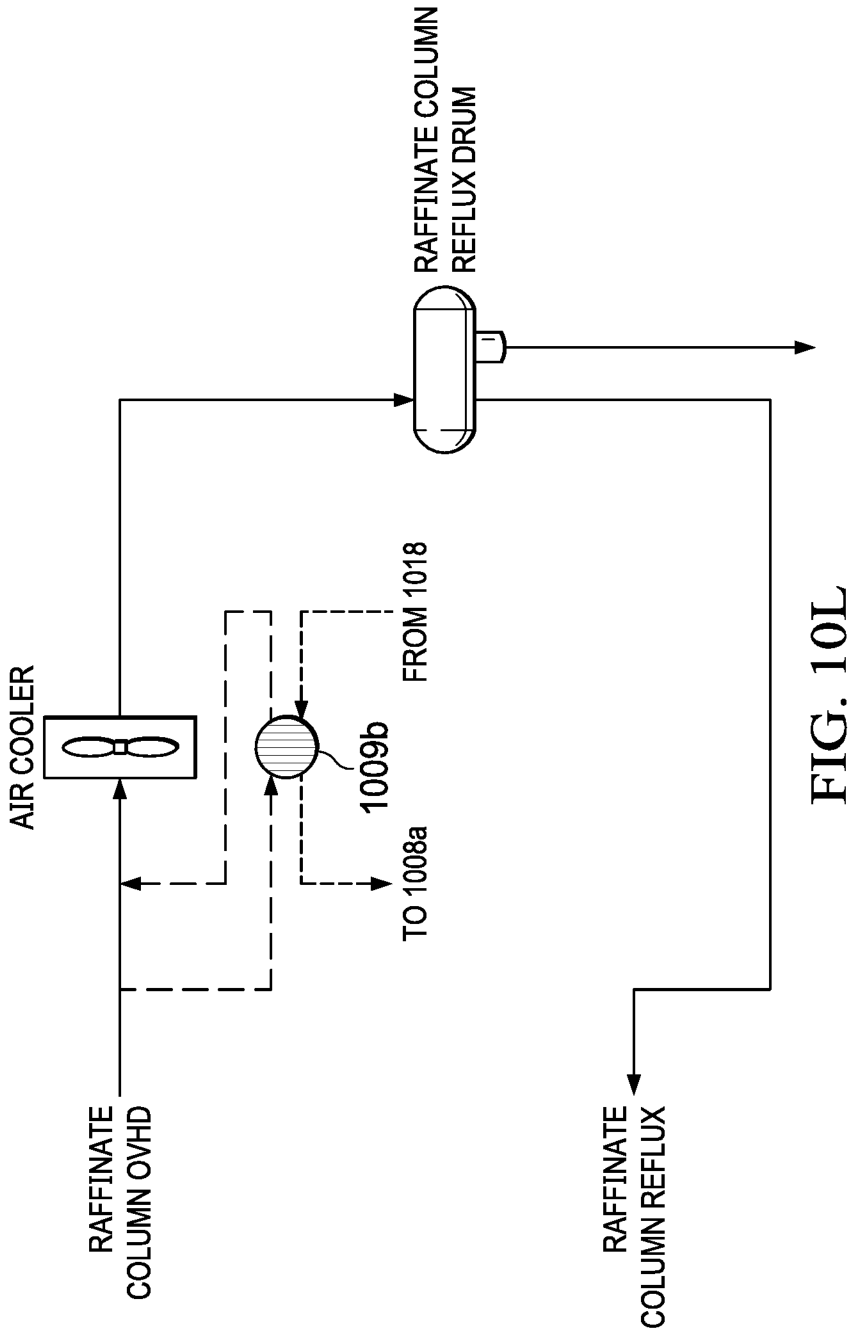
Figure 10M:
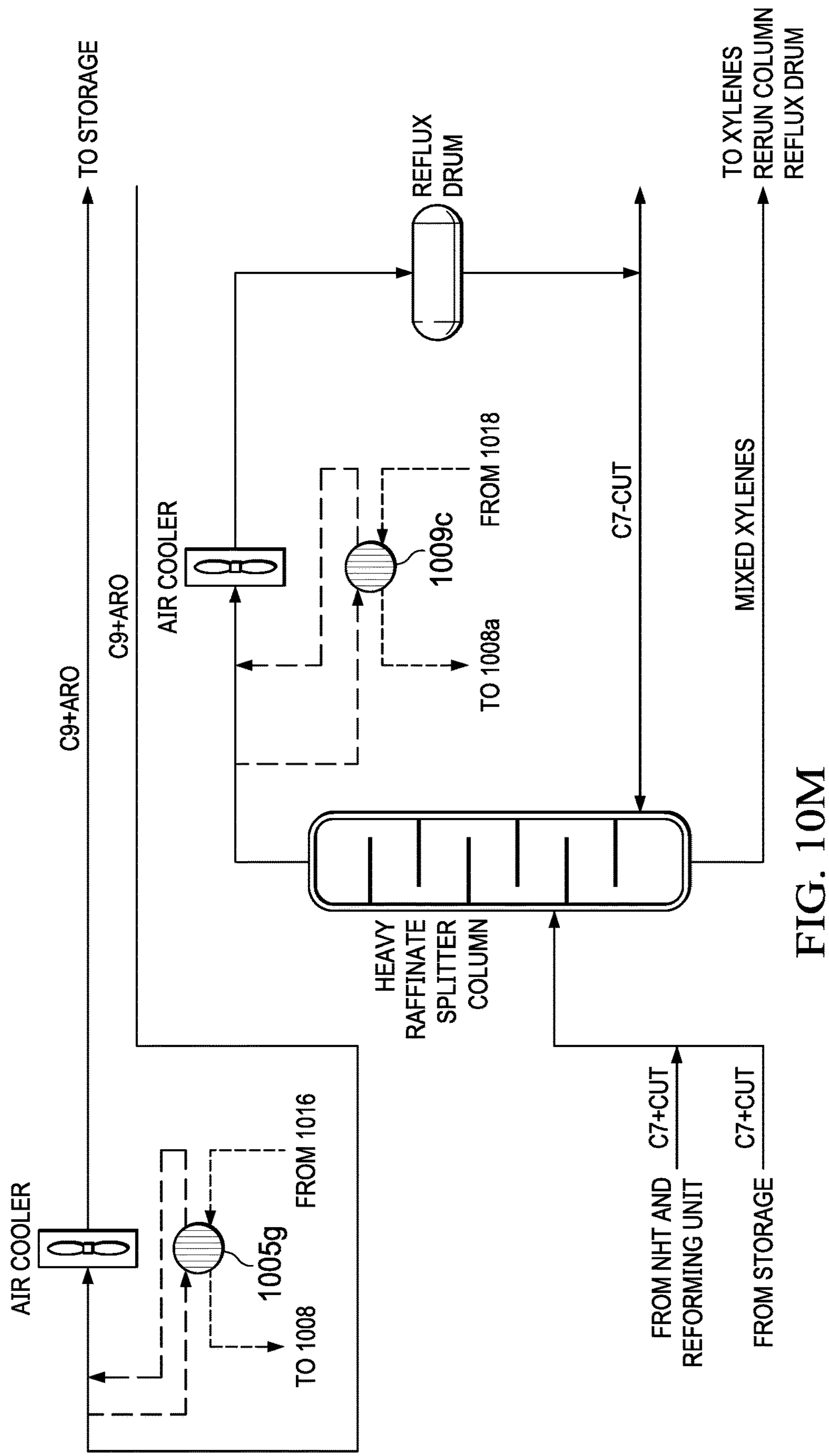
Figure 10N:
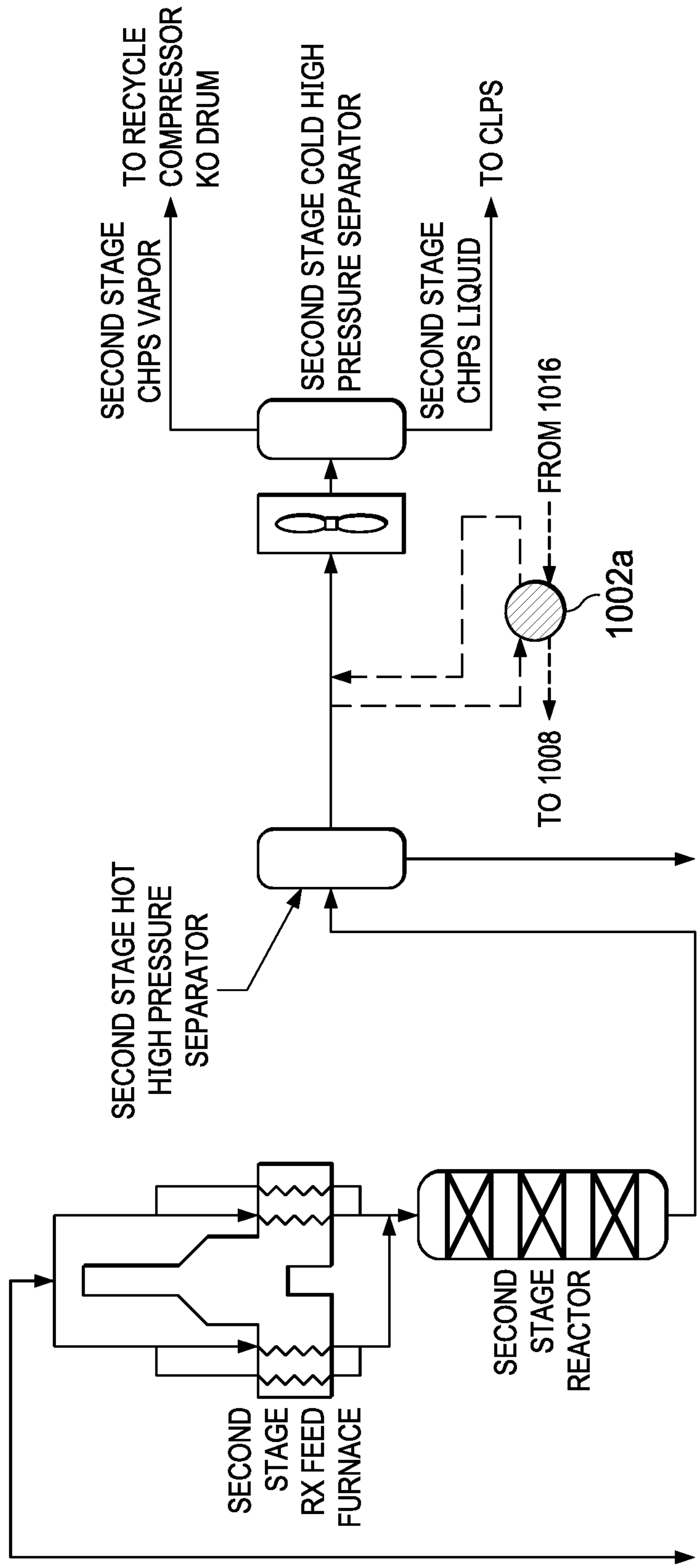
Figure 10O:
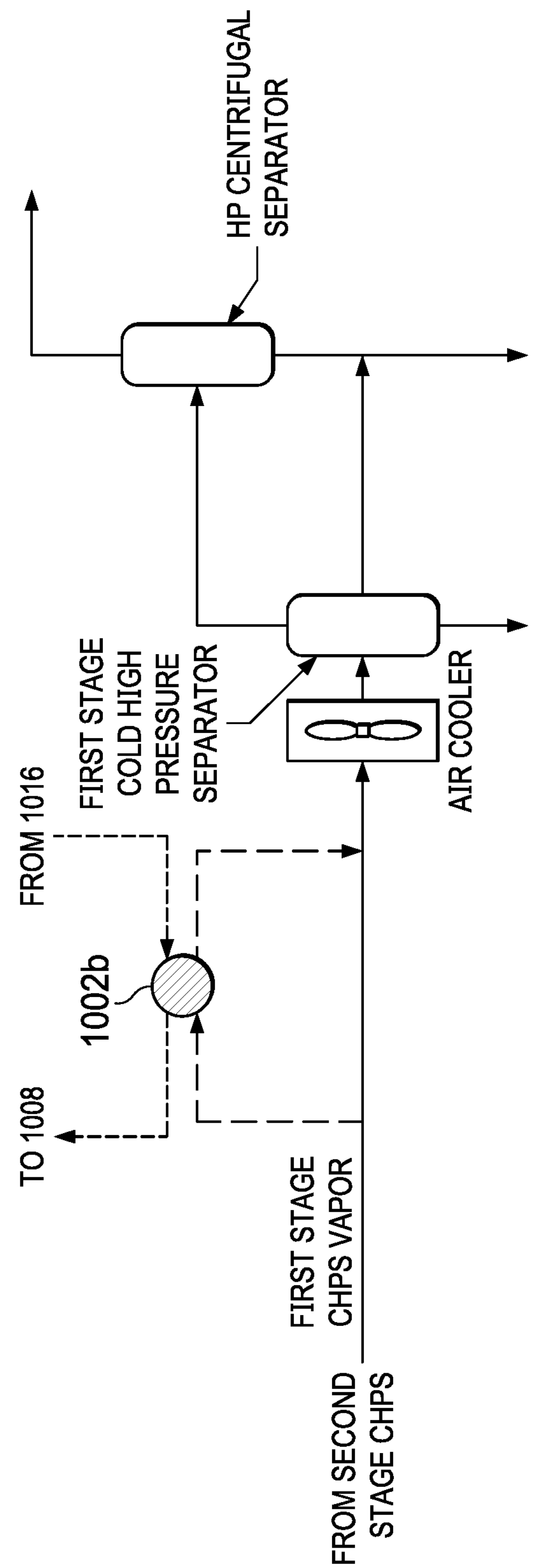
Figure 10P:
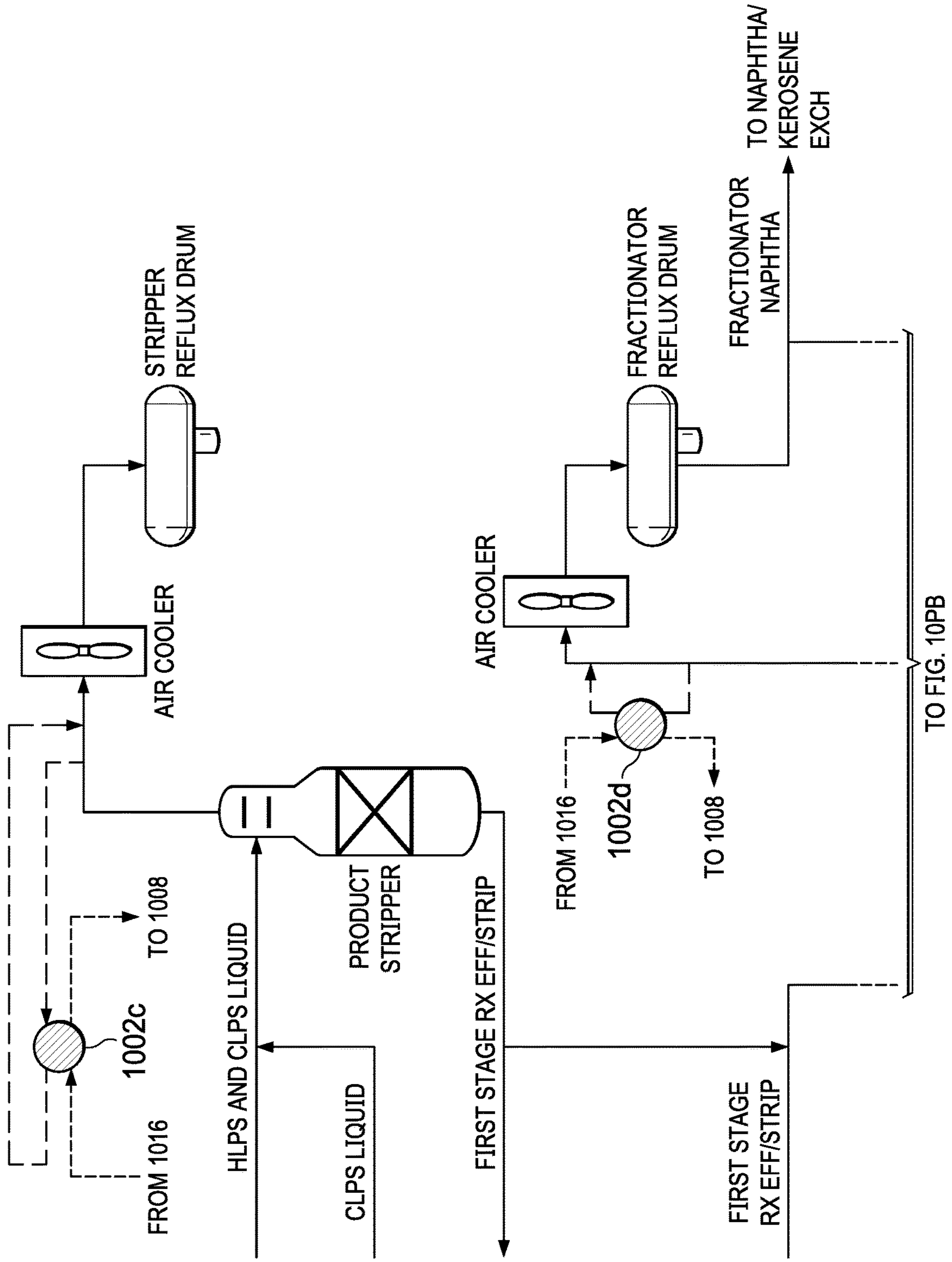
Figure 10P:
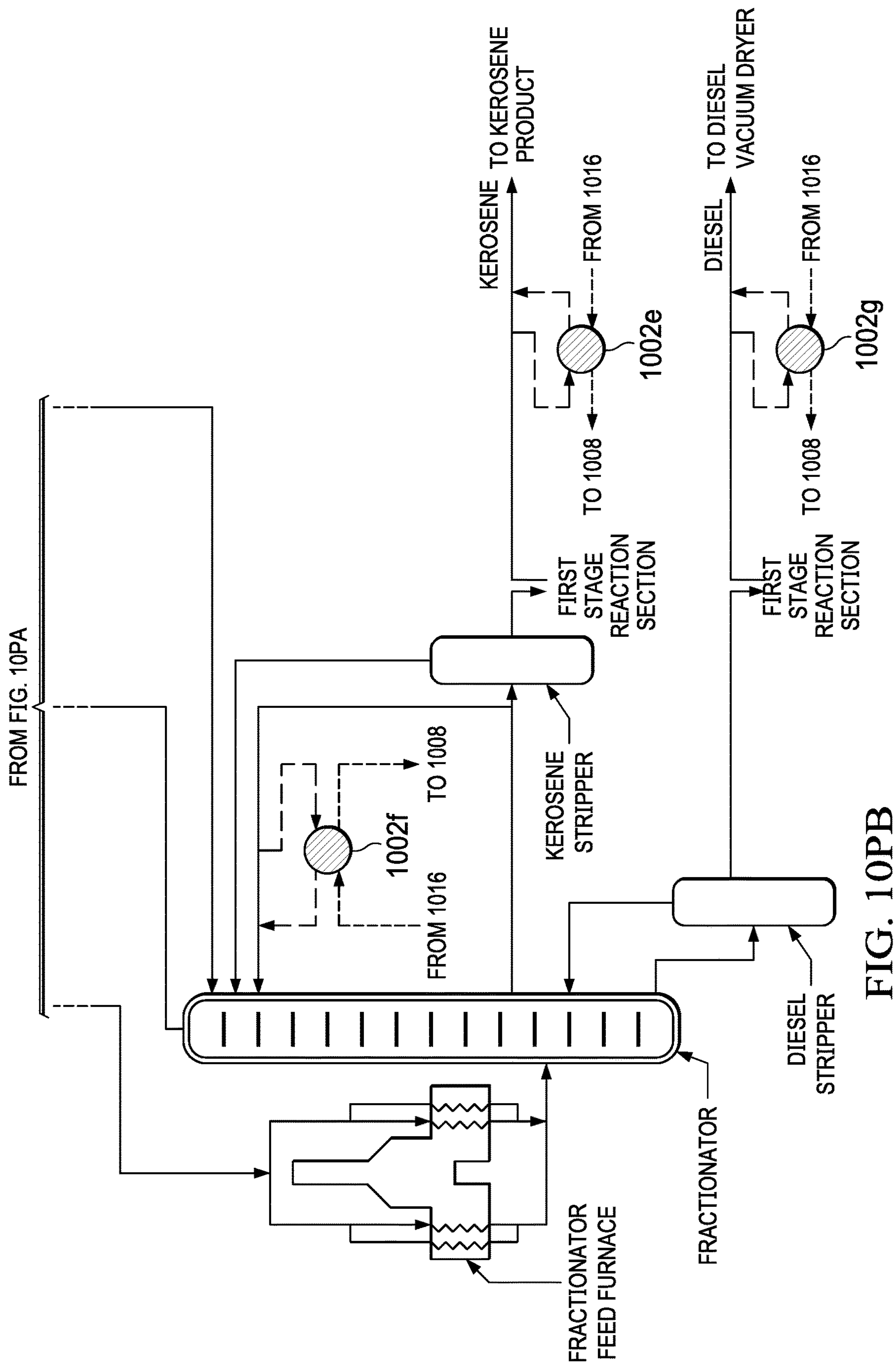
Figure 10Q:
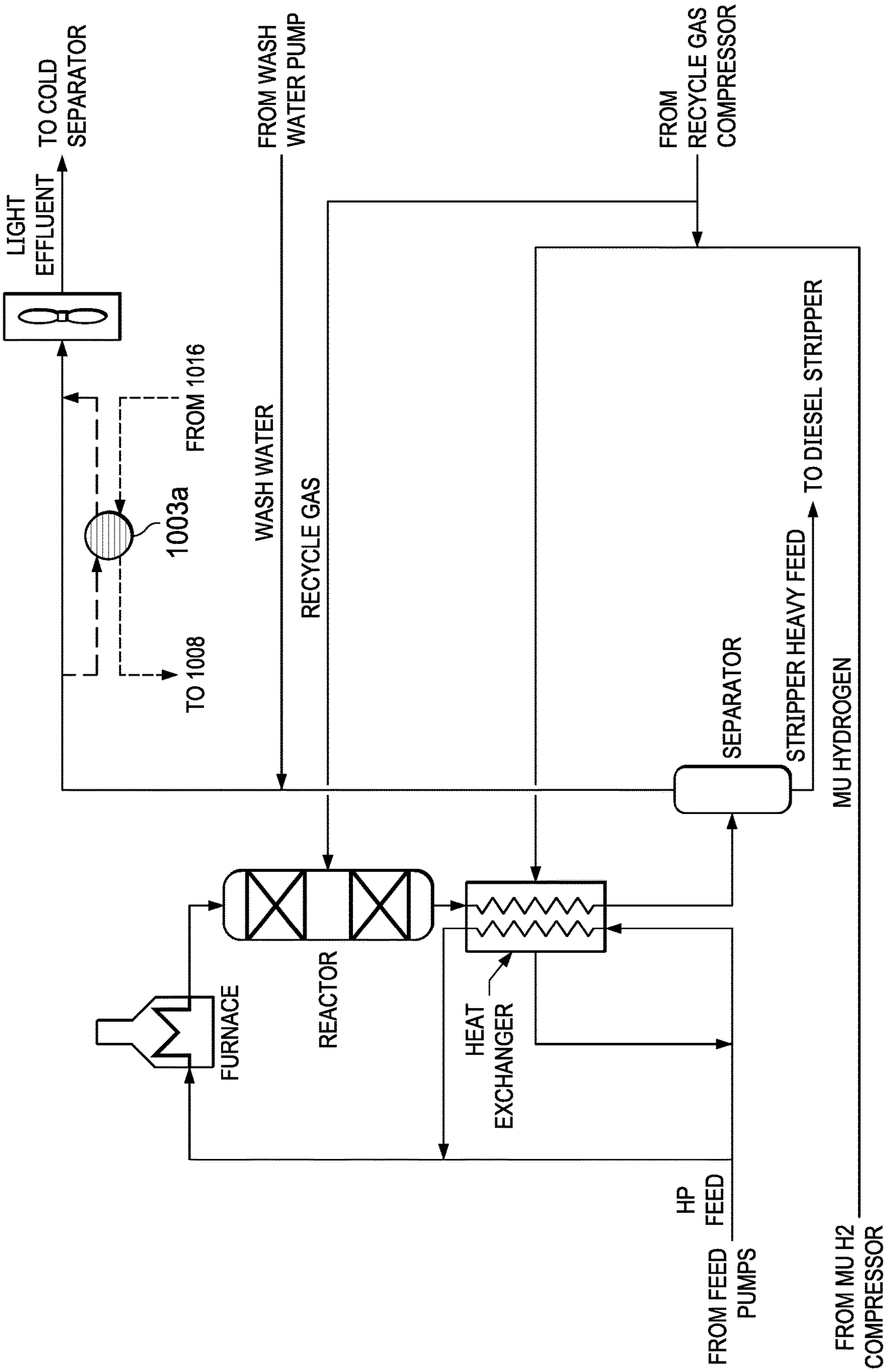
Figure 10R:
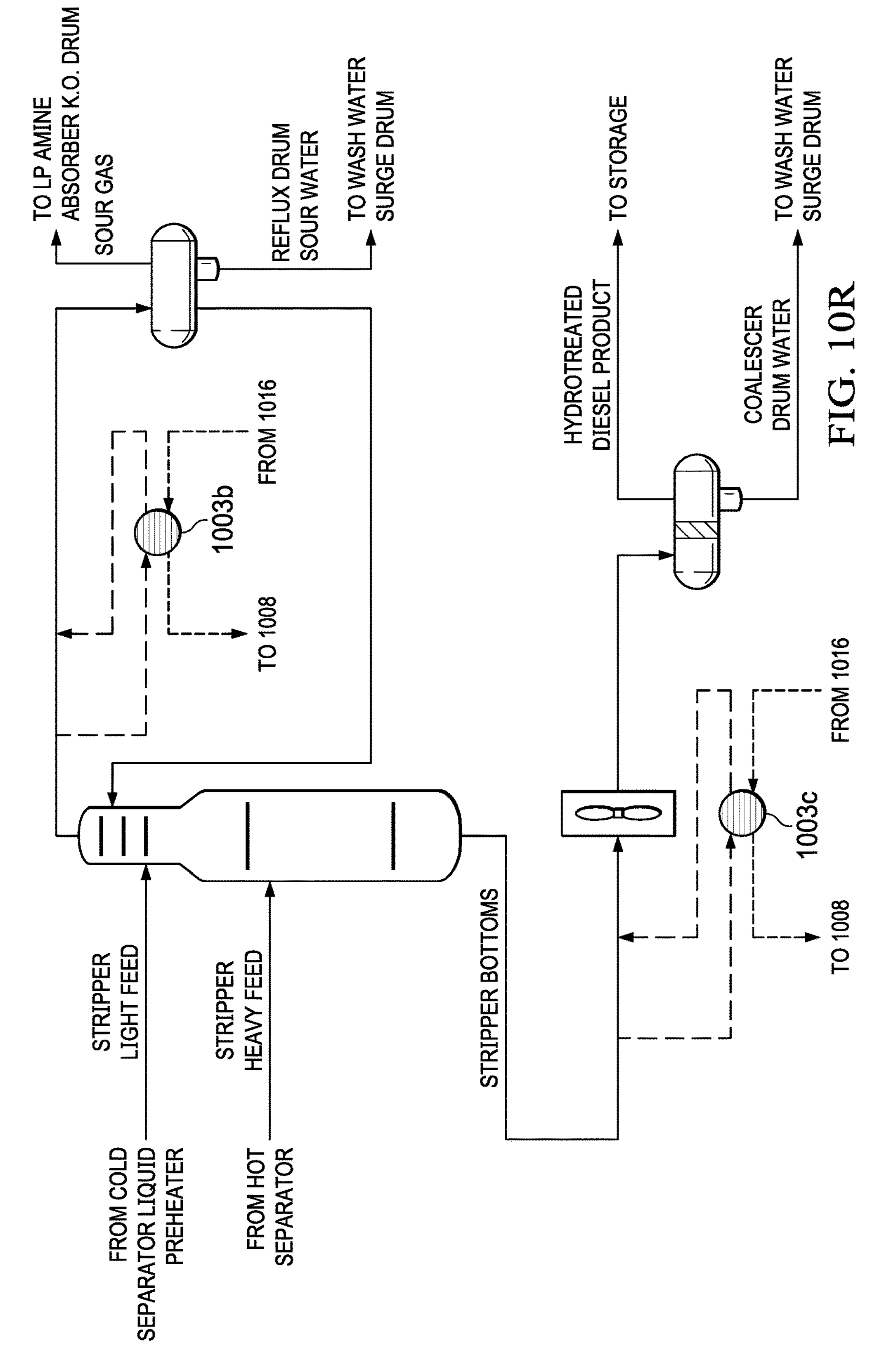
Figure 10S:
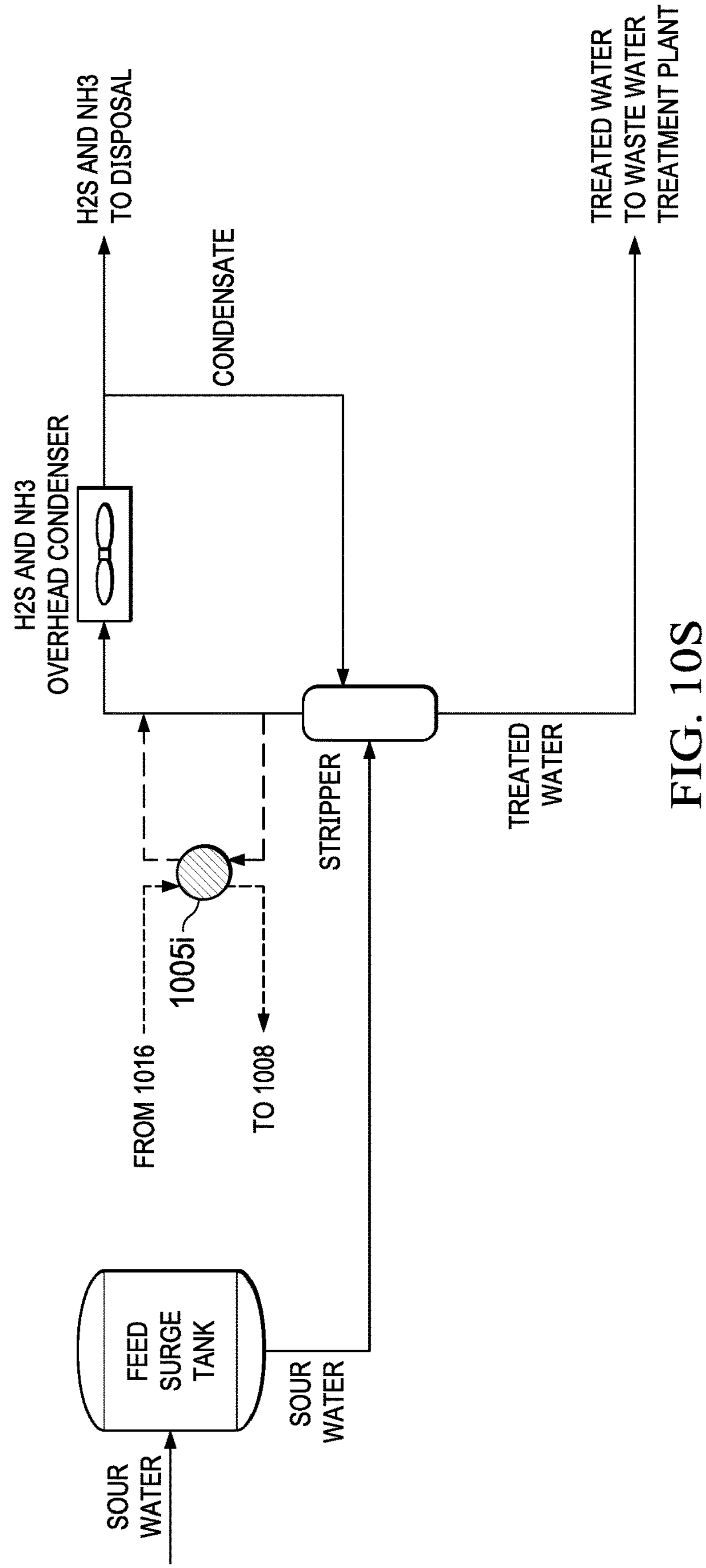
Figure 10T:
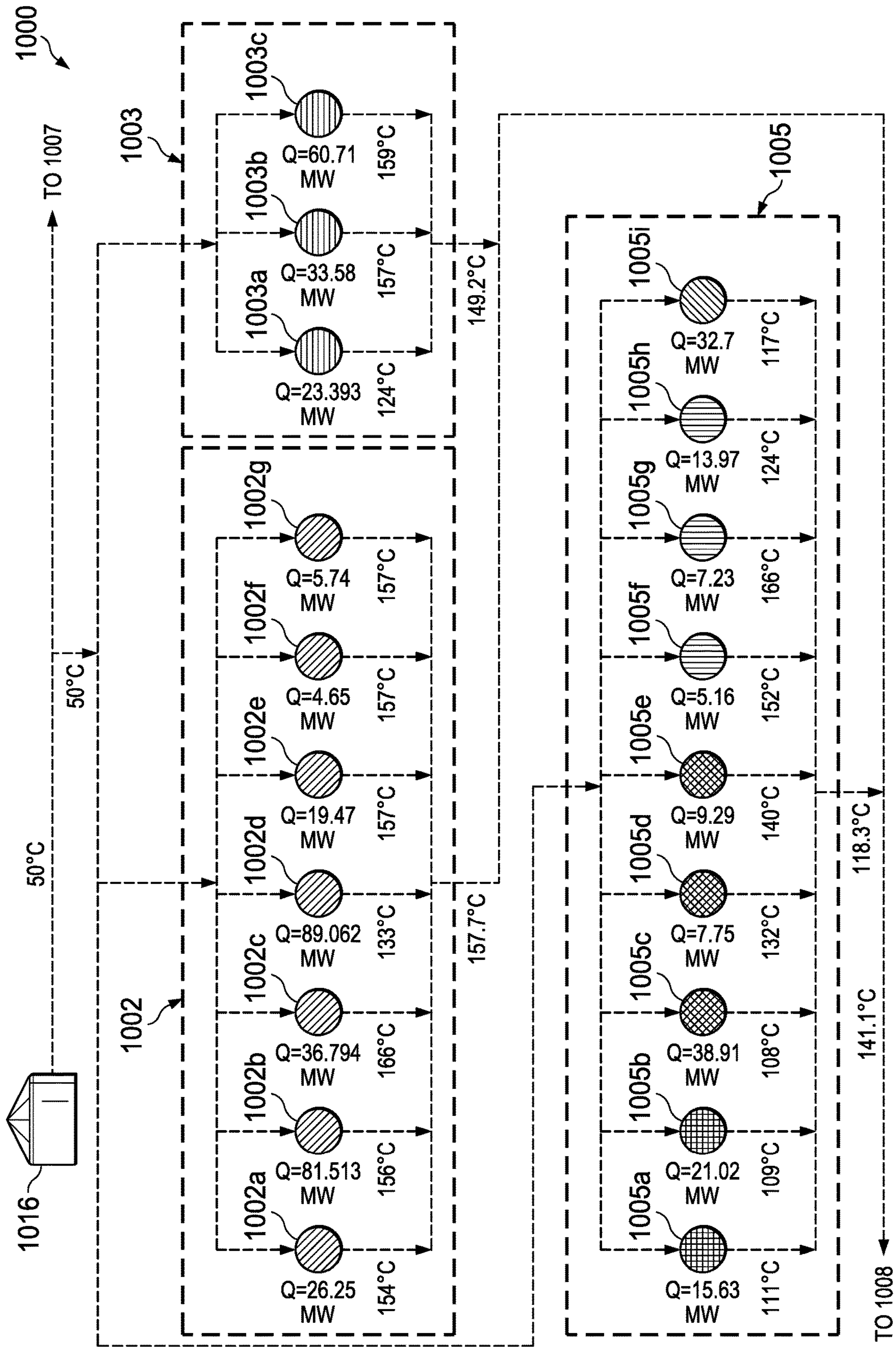
Figure 10U:
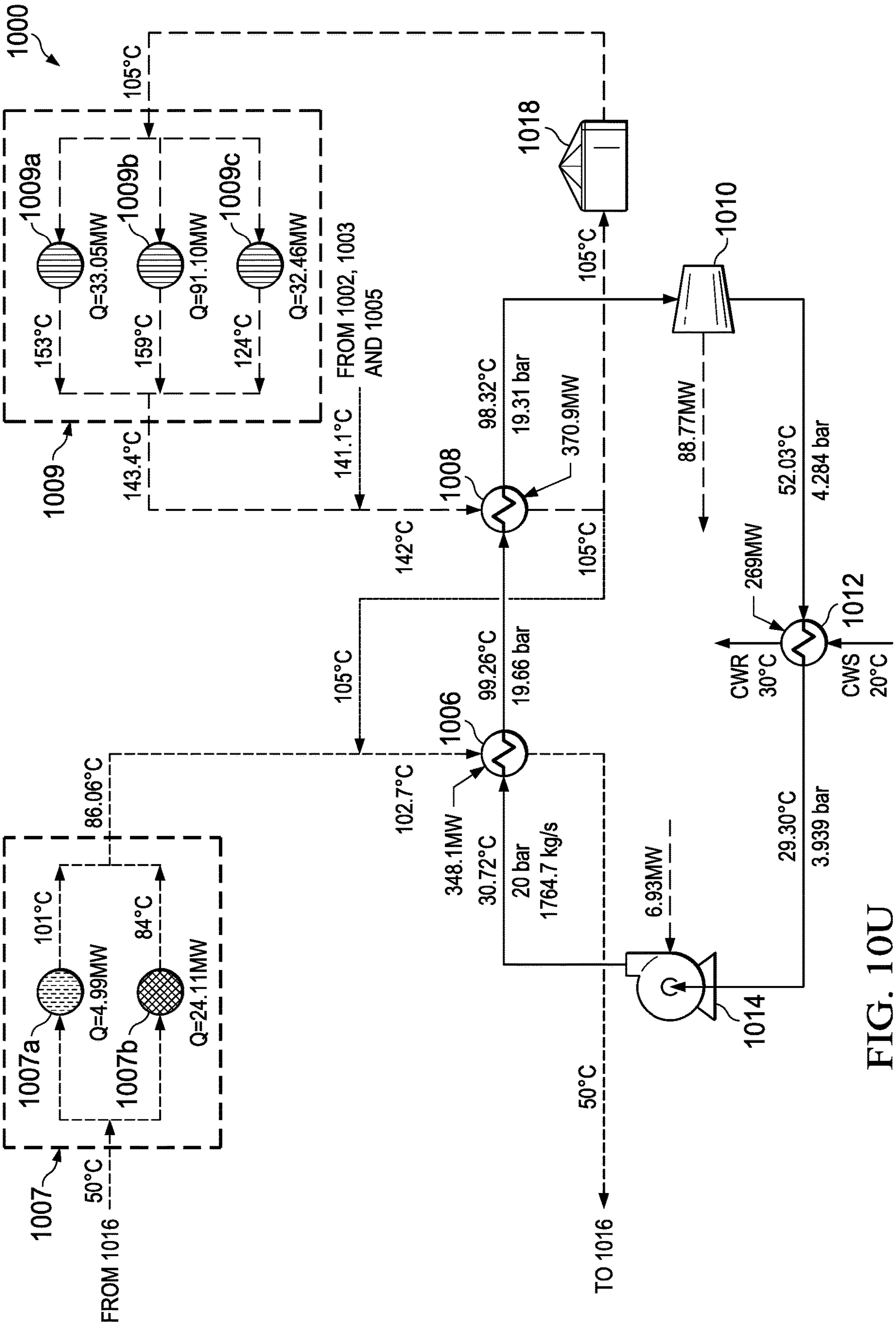
Figure 10V:
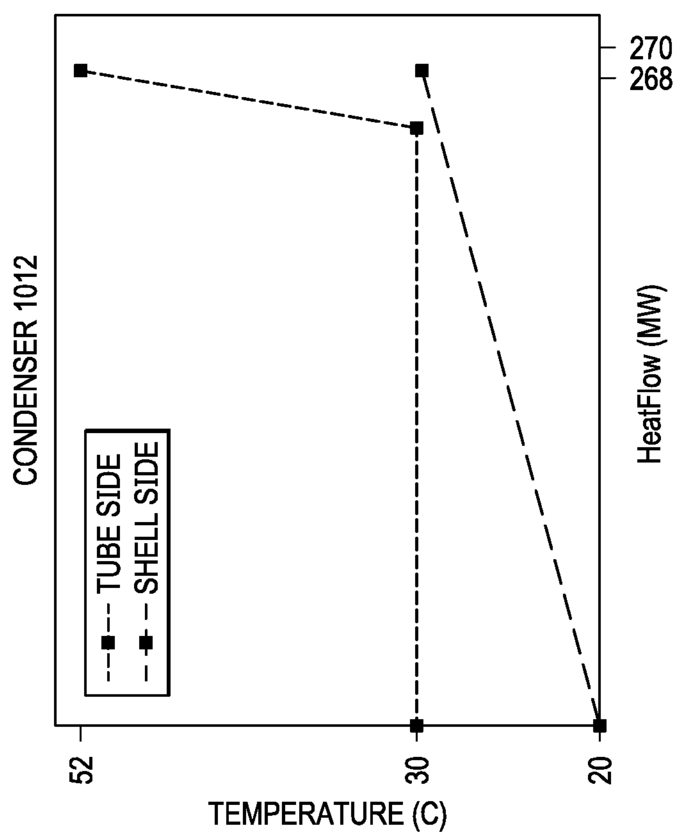

FIGS. 10A-10V illustrate schematic views of another example system 1000 of a power conversion network that includes waste heat sources associated with a medium crude oil semi-conversion refining-petrochemicals plant. In this example system 1000, a mini-power plant synthesis uses an ORC system having a hot water (or other heating fluid) and isobutane system infrastructure, to generate power from specific portions of a crude oil refining-petrochemical site-wide low-low grade waste heat sources, including hydrocracking-diesel hydrotreating, aromatics, CCR and utility system sour water stripping plants. In some aspects, the system 1000 can be implemented in one or more steps, where each phase can be separately implemented without hindering future steps to implement the system 1000. In some aspects, a minimum approach temperature across a heat exchanger used to transfer heat from a heat source to a working fluid (for example, water) can be as low as 3° C. or may be higher. Higher minimum approach temperatures can be used in the beginning of the phases at the expense of less waste heat recovery and power generation, while reasonable power generation economics of scale designs are still attractive in the level of tens of megawatts of power generation.

In some aspects of system 1000, optimized efficiency is realized upon using a minimum approach temperature recommended for the specific heat source streams used in the system design. In such example situations, optimized power generation can be realized without re-changing the initial topology or the sub-set of low grade waste heat streams selected/utilized from the whole crude oil refining-petrochemical complex utilized in an initial phase. System 1000 and its related process scheme can be implemented for safety and operability through two ORC systems using one or more buffer streams such as hot oil or high pressure hot water systems or a mix of specified connections among buffer systems. The low-low grade waste-heat-to-power-conversion (for example, lower than the low grade waste heat temperature defined by DOE as 232° C.) may be implemented using an ORC system using isobutane as an organic fluid at specific operating conditions.

System 1000 may not change with future changes inside individual hydrocracking-diesel hydrotreating, aromatics, CCR and utility system sour water stripping plants to enhance energy efficiency and system 1000 may not need to be changed upon improvements in plant waste heat recovery practices, such as heat integration among hot and cold streams. System 1000 may use "low-low" grade waste heat, below 160° C. available in heat sources in the medium level crude oil semi-conversion refining facilities and aromatics complex.

FIGS. 10A-10B is a schematic diagram of an example system 1000 for a power conversion network that includes waste heat sources associated with hydrocracking-diesel hydrotreating, aromatics, CCR, and utility system sour water stripping plants. In this example implementation, system 1000 utilizes twenty-four distinct heat sources that feed heat through a working fluid (for example, hot water, hot oil, or otherwise) to an ORC system to produce power. In the illustrated example, the twenty-four heat sources are separated among five heat recovery circuits. For instance, heat recovery circuit 1002 includes heat exchangers 1002*a*-1002*g*. Heat recovery circuit 1003 includes heat exchangers 1003*a*-1003*c*. Heat recovery circuit 1005 includes heat exchangers 1005*a*-1005*i*. Heat recovery circuit 1007 includes heat exchangers 1007*a*-1007*b*. Heat recovery circuit 1009 includes heat exchangers 1009*a*-1009*c*.

In the illustrated example, each heat exchanger facilitates heat recovery from a heat source in a particular industrial unit to the working fluid. For example, heat exchangers 1002*a*-1002*g* recover heat from heat sources in a hydrocracking plant. In this example, the heat from heat recovery circuit 1002 is provided to a heating fluid stream that combines with heating fluid streams from heat recovery circuits 1003, 1005, and 1009, which are then circulated to an evaporator 1008 of the ORC 1004.

Generally, the heat recovery circuit 1002 receives (for example, from an inlet header that fluidly couples a heating fluid tank 1016 to the heat exchangers 1002*a*-1002*g*) high pressure working fluid (for example, hot water, hot oil, or otherwise) for instance, at between about 40° C. to 60° C. and supplies heated fluid (for example, at an outlet header fluidly coupled to the heat exchangers 1002*a*-1002*g*) at or about 120-160° C. The heat exchangers 1002*a*-1002*g* may be positioned or distributed along the hydrocracking plant separation system and fluidly coupled to low grade waste heat sources from the system.

Heat exchangers 1003*a*-1003*c* in heat recovery circuit 1003, in this example, recover heat from heat sources in a diesel hydrotreating plant separation unit. Together, the heat exchangers in the heat recovery circuit 1003 recover low grade waste heat to deliver the heat via the working fluid to a heating fluid stream that combines with heating fluid streams from heat recovery circuits 1002, 1005, and 1009, which are then circulated to the evaporator 1008 of the ORC 1004. Generally, the heat recovery circuit 1003 receives (for example, from an inlet header that fluidly couples the heating fluid tank 1016 to the heat exchangers 1003*a*-1003*c*) high pressure working fluid (for example, hot water, hot oil, or otherwise) at or about 40-60° C. and it heats it up to about 120-160° C.

Heat exchangers 1005*a*-1005*i* recover heat from heat sources in a CCR plant, a portion of the aromatics plants separation system, and a utility system sour water stripping plant. Heat exchangers 1005*a*-1005*b* and 1005*f*-1005*h* recover heat from heat source(s) in the portion of the aromatics plants separation system. Heat exchangers 1005*c*-1005*e* recover heat from heat sources in the CCR. Heat exchanger 1005*i* recovers heat from heat source(s) in the utility system sour water stripping plant. Together, the heat exchangers in the heat recovery circuit 1005 recover low grade waste heat to deliver the heat via the working fluid to a heating fluid stream that combines with heating fluid streams from heat recovery circuits 1002, 1003, and 1009, which are then circulated to the evaporator 1008 of the ORC 1004. Generally, the heat recovery circuit 1005 receives (for example, from an inlet header that fluidly couples a heating fluid tank 1016 to the heat exchangers 1005*a*-1005*i*) high pressure working fluid (for example, hot water, hot oil, or otherwise) at or about 40-60° C. and it heats it up to about 120-160° C.

Heat exchangers 1007*a*-1007*b* in heat recovery circuit 1007, in this example, recover heat from heat sources in the CCR and aromatics plant. Together, the heat exchangers in the heat recovery circuit 1007 recover low grade waste heat to deliver the heat via the working fluid to a heating fluid stream that combines with an output of a heating fluid stream from the evaporator 1008 and is then circulated to a pre-heater 1006 of the ORC 1004. Generally, the heat recovery circuit 1007 receives (for example, from an inlet header that fluidly couples the heating fluid tank 1016 to the heat exchangers 1007*a*-1007*b*) high pressure working fluid (for example, hot water, hot oil, or otherwise) at or about 40-60° C. and it heats it up to about 70-110° C.

Heat exchangers 1009*a*-1009*c* in heat recovery circuit 1009, in this example, recover heat from heat sources in a separation system of the aromatics plant. Together, the heat exchangers in the heat recovery circuit 1009 recover low grade waste heat to deliver the heat via the working fluid to a heating fluid stream that combines with heating fluid streams from heat recovery circuits 1002, 1003, and 1005, which are then circulated to the evaporator 1008 of the ORC 1004. Generally, the heat recovery circuit 1009 receives (for example, from an inlet header that fluidly couples the heating fluid tank 1018 to the heat exchangers 1009*a*-1009*c*) high pressure working fluid (for example, hot water, hot oil, or otherwise) at or about 90-110° C. and it heats it up to about 120-160° C.

In the example implementation of system 1000, the ORC 1004 includes a working fluid that is thermally coupled to the heat recovery circuits 1002, 1003, 1005, 1007, and 1009 to heat the working fluid. In some implementations, the working fluid can be isobutane. The ORC 1004 can also include a gas expander 1010 (for example, a turbine-generator) configured to generate electrical power from the heated working fluid. As shown in FIG. 10B, the ORC 1004 can additionally include a pre-heater 1006, an evaporator 1008, a pump 1014, and a condenser 1012. In this example implementation, the heat recovery circuit 1007 (in combination with an output heated fluid from the evaporator 1008) supplies a heated working, or heating, fluid to the pre-heater 1006, while the heat recovery circuits 1002, 1003, 1005, and 1009 supply a heated working, or heating, fluid to the evaporator 1008.

In a general operation, a working, or heating, fluid (for example, water, oil, or other fluid) is circulated through the heat exchangers of the heat recovery circuits 1002, 1003, 1005, 1007, and 1009. An inlet temperature of the heating fluid that is circulated into the inlets of each of the heat exchangers may be the same or substantially the same subject to any temperature variations that may result as the heating fluid flows through respective inlets and may be circulated directly from a heating fluid tank 1016 or 1018. Each heat exchanger heats the heating fluid to a respective temperature that is greater than the inlet temperature. The heated heating fluids from the heat exchangers are combined in their respective heat recovery circuits and circulated through one of the pre-heater 1006 or the evaporator 1008 of the ORC 1004. Heat from the heated heating fluid heats the working fluid of the ORC 1004 thereby increasing the working fluid pressure and temperature. The heat exchange with the working fluid results in a decrease in the temperature of the heating fluid. The heating fluid is then collected in the heating fluid tank 1016 or the heating fluid tank 1018 (which also receives a portion of the output of the evaporator 1008) and can be pumped back through the respective heat exchangers to restart the waste heat recovery cycle.

The heating fluid circuit to flow heating fluid through the heat exchangers of system 1000 can include multiple valves that can be operated manually or automatically. For example, a modulating control valve (as one example) may be positioned in fluid communication with an inlet or outlet of each heat exchanger, on the working fluid and heat source side. In some aspects, the modulating control valve may be a shut-off valve or additional shut-off valves may also be positioned in fluid communication with the heat exchangers. An operator can manually open each valve in the circuit to cause the heating fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

In the manner described earlier, the heating fluid can be looped through the heat exchangers to recover heat that would otherwise go to waste in the hydrocracking-diesel hydrotreating, aromatics, CCR, and utility system sour water stripping plants, and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be higher or lower than the power output from the power generation system that does not implement the waste heat recovery network. Where the power output is less, the difference may not be statistically significant. Consequently, a power generation efficiency of the petrochemical refining system can be increased.

FIG. 10C is a schematic diagram that illustrates an example placement of heat exchanger 1005*c* in a crude oil refinery continuous catalytic reforming (CCR) plant. In an example implementation illustrated in FIG. 10C, this heat exchanger 1005*c* may cool down the CCR last stage reactor outlet after the feed-effluent heat exchanger stream from 111° C. to 60° C. using the high pressure working fluid stream of the heat recovery circuit 1005 at 50° C. to raise the working fluid temperature to 108° C. The thermal duty of this heat exchanger 1005*c* may be about 38.9 MW. The heating fluid stream at 108° C. is sent to the header of heat recovery circuit 1005.

FIG. 10D is a schematic diagram that illustrates an example placement of heat exchangers 1005*d* and 1005*e* in the crude oil refinery continuous catalytic reforming (CCR) plant. In an example implementation illustrated in FIG. 10D, these two heat exchangers 1005*d* and 1005*e* have thermal duties of 7.75 MW and 9.29 MW, respectively. Heat exchanger 1005*d* cools down a 1st stage compressor outlet stream from 135° C. to 60° C. using the working fluid stream of heat recovery circuit 1005 at 50° C. to raise its temperature to 132° C. The heating fluid stream at 132° C. is sent to the header of heat recovery circuit 1005. The heat exchanger 1005*e* cools down a 2nd stage compressor outlet stream from 143° C. to 60° C. using the working fluid stream of heat recovery circuit 1005 at 50° C. to raise its temperature to 140° C. The heating fluid stream at 140° C. is sent to the header of heat recovery circuit 1005.

FIG. 10E is a schematic diagram that illustrates an example placement of heat exchanger 1007*b* in the crude oil refinery continuous catalytic reforming (CCR) plant. In an example implementation illustrated in FIG. 10E, this heat exchanger 1007*b* cools down the CCR light reformate splitter column overhead stream from 87° C. to 60° C. using the working fluid stream of heat recovery circuit 1007 at 50° C. to raise the working fluid stream temperature to 84° C. The thermal duty of this heat exchanger 1007*b* is about 24.1 MW. The heating fluid at 84° C. is sent to the header of heat recovery circuit 1007.

FIG. 10F is a schematic diagram that illustrates an example placement of heat exchanger 1007*a* in the benzene extraction unit. In an example implementation illustrated in FIG. 10F, this heat exchanger 1007*a* cools down an overhead stream from 104° C. to 100° C. using the working fluid stream of heat recovery circuit 1007 at 50° C. to raise the working fluid stream temperature to 101° C. The thermal duty of this heat exchanger 1007*a* is 4.99 MW. The heating fluid at 101° C. is sent to the header of heat recovery circuit 1007.

FIG. 10G is a schematic diagram that illustrates an example placement of heat exchanger 1005*a* in the Para-Xylene separation plant. In an example implementation illustrated in FIG. 10G, this heat exchanger 1005*a* cools down the Xylene isomerization reactor outlet stream before the separator drum from 114° C. to 60° C. using the working fluid stream of heat recovery circuit 1005 at 50° C. to raise the working fluid stream temperature to 111° C. The thermal duty of this heat exchanger 1005*a* is about 15.6 MW. The heating fluid at 111° C. is sent to the header of heat recovery circuit 1005.

FIG. 10H is a schematic diagram that illustrates an example placement of heat exchanger 1005*b* in the xylene isomerization de-heptanizer of the Para-Xylene separation plant. In an example implementation illustrated in FIG. 10H, this heat exchanger 1005*b* cools down the de-heptanizer column overhead stream from 112° C. to 60° C. using the working fluid stream of heat recovery circuit 1005 at 50° C. to raise the working fluid stream temperature to 109° C. The thermal duty of this heat exchanger 1005*b* is about 21 MW. The heating fluid at 109° C. is sent to the header of heat recovery circuit 1005.

FIG. 10I is a schematic diagram that illustrates an example placement of heat exchanger 1009*a* in the Para- Xylene separation plant. In an example implementation illustrated in FIG. 10I, this heat exchanger 1009*a* cools down an extract column overhead stream from 156° C. to 133° C. using the working fluid stream of heat recovery circuit 1009 at 105° C. to raise the working fluid stream temperature to 153° C. The thermal duty of this heat exchanger 1009*a* is about 33 MW. The heating fluid at 153° C. is sent to the header of heat recovery circuit 1009.

FIG. 10J is a schematic diagram that illustrates an example placement of heat exchanger 1005*f* in the Para-Xylene separation plant. In an example implementation illustrated in FIG. 10J, this heat exchanger 1005*f* cools down the PX purification column bottom product stream from 155° C. to 60° C. using the working fluid stream of heat recovery circuit 1005 at 50° C. to raise the working fluid stream temperature to 152° C. The thermal duty of this heat exchanger 1005*f* is about 5.16 MW. The heating fluid at 152° C. is sent to the header of heat recovery circuit 1005.

FIG. 10K is a schematic diagram that illustrates an example placement of heat exchanger 1005*h* in the Para-Xylene separation plant. In an example implementation illustrated in FIG. 10K, this heat exchanger 1005*h* cools down the PX purification column overhead stream from 127° C. to 84° C. using the working fluid stream of heat recovery circuit 1005 at 50° C. to raise the working fluid stream temperature to 124° C. The thermal duty of this heat exchanger 1005*h* is about 13.97 MW. The heating fluid at 124° C. is sent to the header of heat recovery circuit 1005.

FIG. 10L is a schematic diagram that illustrates an example placement of heat exchanger 1009*b* in the Para-Xylene separation plant. In an example implementation illustrated in FIG. 10L, this heat exchanger 1009*b* cools down a Raffinate column overhead stream from 162° C. to 130° C. using the working fluid stream of heat recovery circuit 1009 at 105° C. to raise the working fluid stream temperature to 159° C. The thermal duty of this heat exchanger 1009*b* is about 91.1 MW. The heating fluid at 159° C. is sent to the header of heat recovery circuit 1009.

FIG. 10M is a schematic diagram that illustrates an example placement of heat exchangers 1005*g* and 1009*c* in the Para-Xylene separation plant. In an example implementation illustrated in FIG. 10M, these two heat exchangers 1005*g* and 1009*c* have thermal duties of 7.23 MW and 32.46 MW, respectively. Heat exchanger 1005*g* cools down the C9+ aromatics before the storage tank from 169° C. to 60° C. using the working fluid stream of heat recovery circuit 1005 at 50° C. to raise its temperature to 166° C. The heating fluid stream at 166° C. is sent to the header of heat recovery circuit 1005. The heat exchanger 1009*c* cools down the heavy Raffinate splitter column overhead stream from 127° C. to 113° C. using the working fluid stream of heat recovery circuit 1009 at 105° C. to raise its temperature to 124° C. The heating fluid stream at 124° C. is sent to the header of heat recovery circuit 1009.

FIG. 10N is a schematic diagram that illustrates an example placement of heat exchanger 1002*a* in the hydrocracking plant. In an example implementation illustrated in FIG. 10N, this heat exchanger 1002*a* cools down the 2nd reaction section 2nd stage cold high pressure separator feed stream from 157° C. to 60° C. using the working fluid stream of heat recovery circuit 1002 at 50° C. to raise the working fluid stream temperature to 154° C. The thermal duty of this heat exchanger 1002*a* is about 26.25 MW. The heating fluid at 154° C. is sent to the header of heat recovery circuit 1002.

FIG. 10O is a schematic diagram that illustrates an example placement of heat exchanger 1002*b* in the hydrocracking plant. In an example implementation illustrated in FIG. 10O, this heat exchanger 1002*b* cools down the 1st reaction section 1st stage cold high pressure separator feed stream from 159° C. to 60° C. using the working fluid stream of heat recovery circuit 1002 at 50° C. to raise the working fluid stream temperature to 156° C. The thermal duty of this heat exchanger 1002*b* is about 81.51 MW. The heating fluid at 156° C. is sent to the header of heat recovery circuit 1002.

FIG. 10P is a schematic diagram that illustrates an example placement of heat exchangers 1002*c*-1002*g* in the hydrocracking plant. In an example implementation illustrated in FIG. 10P, these heat exchangers 1002*c*-1002*g* have thermal duties of 36.8 MW, 89 MW, 19.5 MW, 4.65 MW, and 5.74 MW, respectively. Heat exchanger 1002*c* cools down the product stripper overhead stream from 169° C. to 60° C. using the working fluid stream of heat recovery circuit 1002 at 50° C. to raise its temperature to 166° C. The heating fluid stream at 166° C. is sent to the header of heat recovery circuit 1002. The heat exchanger 1002*d* cools down the main fractionator overhead stream from 136° C. to 60° C. using the working fluid stream of heat recovery circuit 1002 at 50° C. to raise its temperature to 133° C. The heating fluid stream at 133° C. is sent to the header of heat recovery circuit 1002. The heat exchanger 1002*e* cools down the kerosene product stream from 160° C. to 60° C. using the working fluid stream of heat recovery circuit 1002 at 50° C. to raise its temperature to 157° C. The heating fluid stream at 157° C. is sent to the header of heat recovery circuit 1002. In an example aspect, a steam generator with a thermal duty of about 5.45 MW using a hot stream temperature of 187° C. is used before this heat exchanger 1002*e* to generate low pressure steam for process use. The heat exchanger 1002*f* cools down the kerosene pumparound stream from 160° C. to 60° C. using the working fluid stream of heat recovery circuit 1002 at 50° C. to raise its temperature to 157° C. The heating fluid stream at 157° C. is sent to the header of heat recovery circuit 1002. In an example aspect, a steam generator with a thermal duty of about 5.58 MW using a hot stream temperature of 196° C. is used before this heat exchanger 1002*f* to generate low pressure steam for process use. The heat exchanger 1002*g* cools down the diesel product stream from 160° C. to 60° C. using the working fluid stream of heat recovery circuit 1002 at 50° C. to raise its temperature to 157° C. The heating fluid stream at 157° C. is sent to the header of heat recovery circuit 1002. In an example aspect, a steam generator with a thermal duty of about 6.47 MW using a hot stream temperature of 204° C. is used before this heat exchanger 1002*g* to generate low pressure steam for process use.

FIG. 10Q is a schematic diagram that illustrates an example placement of heat exchanger 1003*a* in the hydrotreating plant. In an example implementation illustrated in FIG. 10Q, this heat exchanger 1003*a* cools down the light effluent to cold separator stream from 127° C. to 60° C. using the working fluid stream of heat recovery circuit 1003 at 50° C. to raise the working fluid stream temperature to 124° C. The thermal duty of this heat exchanger 1003*a* is about 23.4 MW. The heating fluid at 124° C. is sent to the header of heat recovery circuit 1003.

FIG. 10R is a schematic diagram that illustrates an example placement of heat exchangers 1003*b* and 1003*c* in the hydrotreating plant. In an example implementation illustrated in FIG. 10R, these heat exchangers have thermal duties of 33.58 MW and 60.71 MW, respectively. The heat exchanger 1003*b* cools down the diesel stripper overhead stream from 160° C. to 60° C. using the working fluid stream of heat recovery circuit 1003 at 50° C. to raise the working fluid stream temperature to 157° C. The heating fluid at 157°

C. is sent to the header of heat recovery circuit 1003. In an example aspect, a steam generator with a thermal duty of about 6.38 MW using an overhead hot stream temperature of 182° C. is used before this heat exchanger 1003*c* to generate low pressure steam for process use. The heat exchanger 1003*c* cools down the diesel stripper product stream from 162° C. to 60° C. using the working fluid stream of heat recovery circuit 1003 at 50° C. to raise the working fluid stream temperature to 159° C. The heating fluid at 159° C. is sent to the header of heat recovery circuit 1003.

FIG. 10S is a schematic diagram that illustrates an example placement of heat exchanger 1005*i* in the utility system sour water stripping plant. In an example implementation illustrated in FIG. 10S, this heat exchanger 1005*i* cools down the sour water stripper overhead stream from 120° C. to 93° C. using the working fluid stream of heat recovery circuit 1007 at 50° C. to raise the working fluid stream temperature to 117° C. The thermal duty of this heat exchanger 1005*i* is about 32.7 MW. The heating fluid at 117° C. is sent to the header of heat recovery circuit 1005.

As described earlier, FIGS. 10T-10U illustrate a specific example of the system 1000, including some example temperatures, thermal duties, efficiencies, power inputs, and power outputs. For example, as illustrated in FIG. 10U, the system 1000 generates a power output (with a gas turbine 1010 using efficiency of 85%) of about 88.77 MW and the power consumed in the pump using efficiency of 75% is about 6.93 MW. The ORC 1004 high pressure at the inlet of the turbine is about 20 bar and at the outlet is about 4.3 bar. The condenser 1012 water supply temperature is assumed to be at 20° C. and return temperature is assumed to be at 30° C. The evaporator 1008 thermal duty is about 370.9 MW to vaporize about 1764.7 Kg/s of isobutane. The ORC 1004 isobutane pre-heater 1006 thermal duty is about 348.1 MW to heat up the isobutane from about 31° C. to 99° C. The condenser 1012 cooling duty is 269 MW to cool down and condense the same flow of isobutane from about 52° C. to 30° C.

FIG. 10V is a graph that shows a tube side fluid temperature (for example, a cooling, or condenser, fluid flow) and a shell side fluid temperature (for example, an ORC working fluid flow) in the condenser 1012 during an operation of the system 1000. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even higher. In such cases, a gas expander outlet pressure (for example, pressure of the ORC working fluid exiting the gas expander) may be high enough to allow the condensation of the ORC working fluid at the available cooling fluid temperature. As shown in FIG. 10V, the condenser water (entering the tubes of the condenser 1012) enters at about 20° C. and leaves at about 30° C. The ORC working fluid (entering the shell-side of the condensers) enters as a vapor at about 52° C., and then condenses at about 30° C. and leaves the condensers as a liquid at about 30° C.

Figure 10W:
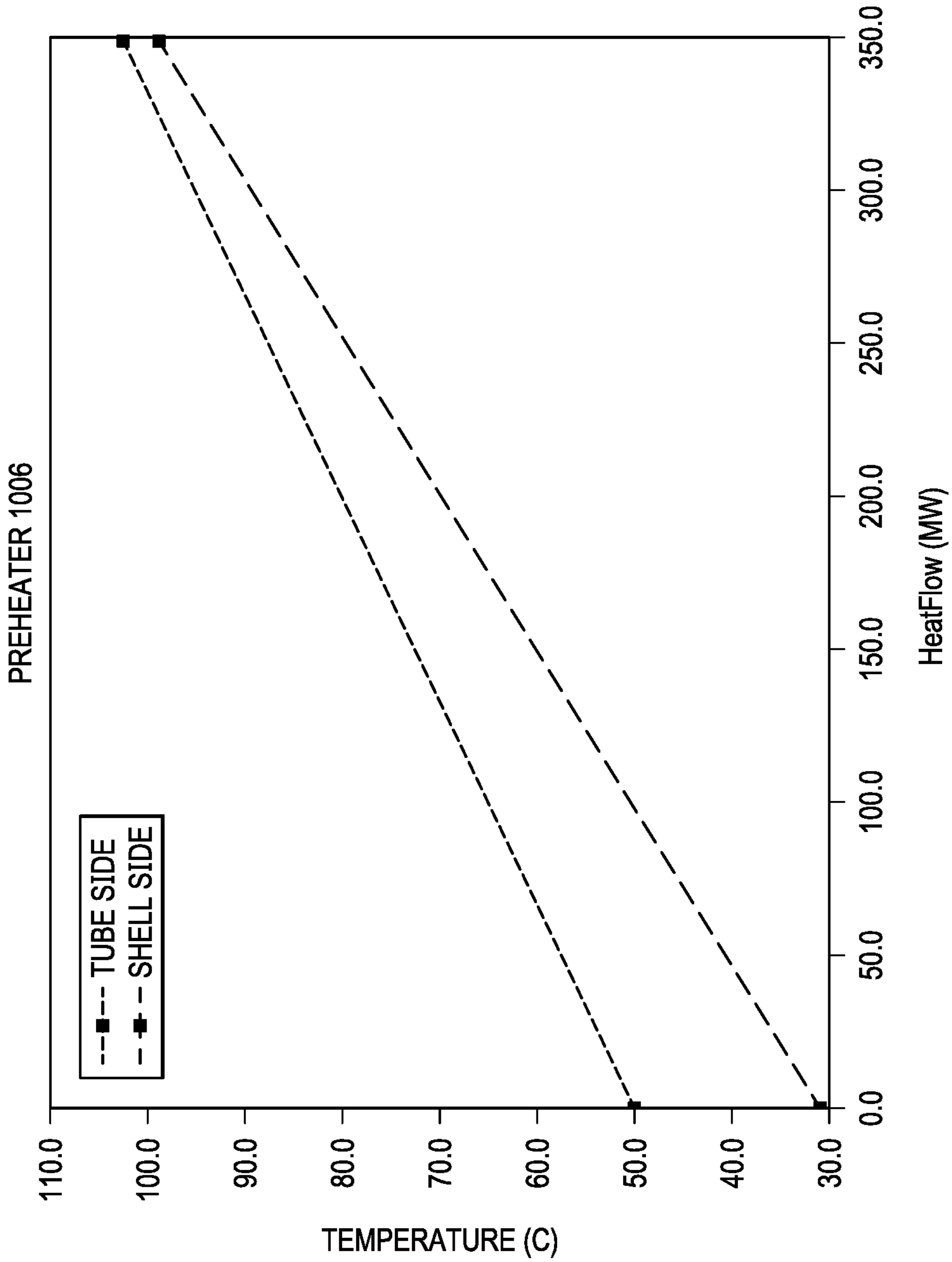

FIG. 10W is a graph that show a tube-side fluid temperature (for example, a heating fluid flow) and a shell-side fluid temperature (for example, an ORC working fluid flow) in the pre-heater 1006 during an operation of the system 1000. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 10W, as the tube-side fluid (for example, the hot oil or water in the heating fluid circuit 1007 and leaving the evaporator 1008) is circulated through the pre-heater 1006, heat is transferred from that fluid to the shell-side fluid (for example, the ORC working fluid). Thus, the tube-side fluid enters the pre-heater 1006 at about 103° C. and leaves the pre-heater 1006 at about 50° C. The shell-side fluid enters the pre-heater 1006 at about 30° C. (for example, as a liquid) and leaves the pre-heater 1006 at about 99° C. (for example, also as a liquid or mixed phase fluid).

Figure 10X:
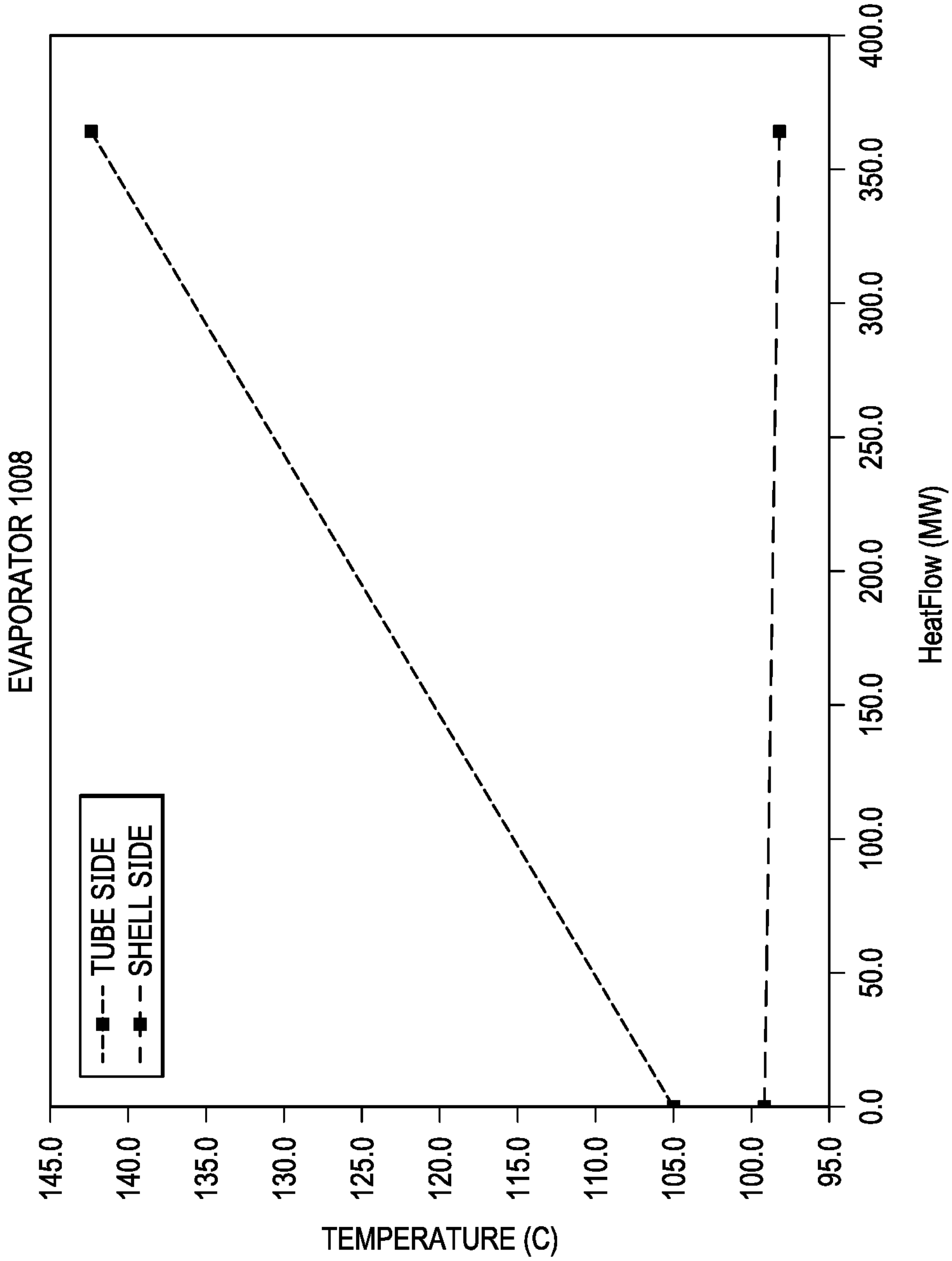

FIG. 10X is a graph that shows a tube side fluid temperature (for example, a heating fluid flow) and a shell side fluid temperature (for example, an ORC working fluid flow) in the evaporator 1008 during an operation of the system 1000. This graph shows a temperature difference between the fluids on the y-axis relative to a heat flow between the fluids on the x-axis. For example, as shown in this figure, as the temperature difference between the fluids increases, a heat flow between the fluids can increase. For example, as shown in FIG. 10X, as the tube-side fluid (for example, the hot oil or water in the heating fluid circuits 1002, 1003, 1005, and 1009) is circulated through the evaporator 1008, heat is transferred from that fluid to the shell-side fluid (for example, the ORC working fluid). Thus, the tube-side fluid enters the evaporator 1008 at about 142° C. and leaves the evaporator 1008 at about 105° C. The shell-side fluid enters the evaporator 1008, from the pre-heater 1006, at about 99° C. (for example, as a liquid or mixed phase fluid) and leaves the evaporator 1008 also at about 99° C. (for example, as a vapor with some superheating).

In the illustrated example, system 1000 may include an independent power generation system using a hydrocracking-diesel hydrotreating, aromatics, CCR, and utility system sour water stripping plants for a more energy efficient and "greener" configuration in refining-petrochemical complex via converting its low-low grade waste heat to net power by about 81 MW for local utilization or export to the national electricity grid.

The disclosed subject matter is beneficial at least in that it allows a medium level crude oil semi-conversion refining-petrochemical complex to be significantly more energy efficient/"greener" by converting its low-low grade waste heat in its "Naphtha Block" to net power generation (for example, by about 34.55 MW) for local utilization or export to the national electricity grid while such processing schemes allow the reduction in power-generation-based GHG emissions with desired operability due to the involvement of more than one plant in the scheme, processing schemes allow the power generation and power generation-based GHG reduction to be achieved in phases, power generation and power generation-based GHG reduction to be achieved without changing the insides of the "Naphtha Block" plants heat exchangers network streams' matching, allowing the power generation and power generation-based GHG reduction to be achieved for the "Naphtha Block" plants which are normally located together in crude oil refining-petrochemicals complexes, allowing the power generation and power generation-based GHG reduction to be achieved regardless of future energy saving inside the individual plants of the "Naphtha Block," and allowing the reduction in power-generation-based GHG emissions with desired operability due to the involvement of more than one plant in the scheme while keeping original cooling units.

In summary, this disclosure describes configurations and related processing schemes of mini-power plants synthesized for grassroots medium grade crude oil semi-conversion refineries to generate power from specific portions of low grade waste heat sources. The disclosure also describes configurations and related processing schemes of mini-power plants synthesized for integrated medium grade crude oil semi-conversion refineries and aromatics complex for power generation from specific portions of low grade waste sources.

The economics of industrial production, the limitations of global energy supply, and the realities of environmental conservation are concerns for all industries. It is believed that the world's environment has been negatively affected by global warming caused, in part, by the release of GHG into the atmosphere. Implementations of the subject matter described here can alleviate some of these concerns, and, in some cases, prevent certain refineries, which are having difficulty in reducing their GHG emissions, from having to shut down. By implementing the techniques described here, specific plants in a refinery or a refinery, as a whole, can be made more efficient and less polluting by carbon-free power generation from specific portions of low grade waste heat sources.

The techniques to recover heat energy generated by a petrochemical refining system described above can be implemented in at least one or both of two example scenarios. In the first scenario, the techniques can be implemented in a petrochemical refining system that is to be constructed. For example, a geographic layout to arrange multiple sub-units of a petrochemical refining system can be identified. The geographic layout can include multiple sub-unit locations at which respective sub-units are to be positioned. Identifying the geographic layout can include actively determining or calculating the location of each sub-unit in the petrochemical refining system based on particular technical data, for example, a flow of petrochemicals through the sub-units starting from crude petroleum and resulting in refined petroleum. Identifying the geographic layout can alternatively or in addition include selecting a layout from among multiple previously-generated geographic layouts. A first subset of sub-units of the petrochemical refining system can be identified. The first subset can include at least two (or more than two) heat-generating sub-units from which heat energy is recoverable to generate electrical power. In the geographic layout, a second subset of the multiple sub-unit locations can be identified. The second subset includes at least two sub-unit locations at which the respective sub-units in the first subset are to be positioned. A power generation system to recover heat energy from the sub-units in the first subset is identified. The power generation system can be substantially similar to the power generation system described earlier. In the geographic layout, a power generation system location can be identified to position the power generation system. At the identified power generation system location, a heat energy recovery efficiency is greater than a heat energy recovery efficiency at other locations in the geographic layout. The petrochemical refining system planners and constructors can perform modeling and/or computer-based simulation experiments to identify an optimal location for the power generation system to maximize heat energy recovery efficiency, for example, by minimizing heat loss when transmitting recovered heat energy from the at least two heat-generating sub-units to the power generation system. The petrochemical refining system can be constructed according to the geographic layout by positioning the multiple sub-units at the multiple sub-unit locations, positioning the power generation system at the power generation system location, interconnecting the multiple sub-units with each other such that the interconnected multiple sub-units are configured to refine petrochemicals, and interconnecting the power generation system with the sub-units in the first subset such that the power generation system is configured to recover heat energy from the sub-units in the first subset and to provide the recovered heat energy to the power generation system. The power generation system is configured to generate power using the recovered heat energy.

In the second scenario, the techniques can be implemented in an operational petrochemical refining system. In other words, the power generation system described earlier can be retrofitted to an already constructed and operational petrochemical refining system.

Thus, particular implementations of the subject matter have been described. Other implementations are within the scope of the following claims.

What is claimed is:

1. A power generation system, comprising:

a heating fluid circuit comprising:

a first heat exchanger to heat a heating fluid via a first heat source in a first sub-unit of a petrochemical refining system, the first sub-unit comprising an aromatics plant; and a second heat exchanger to heat the heating fluid via a second heat source in a second sub-unit of the petrochemical refining system;

a power generation sub-system that comprises a power generation cycle that comprises (i) a heat exchanger to heat a working fluid with heat from the heating fluid, and (ii) an expander configured to generate electrical power from the heated working fluid; and a control system configured to actuate a set of control valves to selectively thermally couple the heating fluid circuit to the first heat source and the second heat source.

2. The power generation system of claim 1, wherein the second sub-unit comprises a hydrocracking plant, a continuous catalyst regeneration (CCR) plant, or a para-xylene separation plant, and wherein the heat exchanger of the power generation cycle is not the first heat exchanger and is not the second heat exchanger.

3. The power generation system of claim 2, wherein the heating fluid circuit comprises a third heat exchanger to heat the heating fluid via a third heat source in a third sub-unit of the petrochemical refining system, wherein the third sub-unit comprises a diesel hydrotreating plant or an atmospheric distillation plant.

4. The power generation system of claim 3, wherein the heating fluid circuit comprises a fourth heat exchanger to heat the heating fluid via a fourth heat source in a fourth sub-unit of the petrochemical refining system, wherein the fourth sub-unit comprises a Naphtha hydrotreating plant or a hydrocracking-diesel hydrotreating module.

5. The power generation system of claim 1, wherein the first heat exchanger and the second heat exchanger each comprise a shell-and-tube heat exchanger, and wherein the heat exchanger of the power generation cycle to heat the working fluid with heat from the heating fluid discharged from the first heat exchanger or with heat from the heating fluid discharged from the second heat exchanger, or both.

6. The power generation system of claim 1, wherein the second sub-unit comprises a benzene extraction unit or a utility system sour water stripping plant.

7. The power generation system of claim 1, wherein the heat exchanger comprises an evaporator heat exchanger of the power generation cycle.

8. The power generation system of claim 1, wherein the heat exchanger comprises a pre-heating heat exchanger of the power generation cycle.

9. The power generation system of claim 1, wherein the heating fluid circuit comprises a first heating fluid circuit comprising the first heat exchanger and a second heating fluid circuit comprising the second heat exchanger.

10. The power generation system of claim 9, wherein the heat exchanger comprises two heat exchangers comprising an evaporator heat exchanger and a pre-heating heat exchanger, wherein the pre-heating heat exchanger to heat the working fluid with heat from the heating fluid discharged from the first heat exchanger, and wherein the evaporator heat exchanger to heat the working fluid with heat from the heating fluid discharged from the second heat exchanger.

11. The power generation system of claim 1, wherein the working fluid comprises isobutane.

12. The power generation system of claim 11, wherein the heating fluid comprises water or oil.

13. The power generation system of claim 1, comprising a heating fluid tank that is fluidly coupled to the heating fluid circuit and the heat exchanger of the power generation cycle, wherein the heating fluid comprises water or oil, and wherein the heating fluid circuit comprises a heat recovery circuit.

14. The power generation system of claim 1, comprising a heating fluid tank to receive heating fluid from the heat exchanger of the power generation cycle and discharge heating fluid to the first heat exchanger and the second heat exchanger.

15. The power generation system of claim 14, comprising an air cooler to further cool the heating fluid discharged from the heat exchanger before the heating fluid discharged from the heat exchanger is collected in the heating fluid tank, wherein the heating fluid comprises water or oil.

16. The power generation system of claim 1, wherein the power generation cycle comprises:
- a condenser fluidly coupled to a condenser fluid source to cool the working fluid; and
- a pump to circulate the working fluid through the power generation cycle.

17. The power generation system of claim 1, wherein the power generation cycle comprises two power generation cycles.

18. The power generation system of claim 9, wherein the heat exchanger of the power generation cycle comprises a pre-heating heat exchanger or an evaporator heat exchanger, or wherein the heat exchanger comprises two heat exchangers comprising the pre-heating heat exchanger and the evaporator heat exchanger.

19. The power generation system of claim 9, wherein the heating fluid circuit comprises a first heating fluid circuit and a second heating fluid circuit, wherein the control system is configured to actuate a first set of control valves to selectively thermally couple the first heating fluid circuit to the first heat source, and the control system is configured to actuate a second set of control valves to selectively thermally couple the second heating fluid circuit to the second heat sources.

20. A power generation system, comprising:
- a heating fluid circuit comprising:
  - a first heat exchanger to heat a heating fluid via a first heat source in a first sub-unit of a petrochemical refining system, the first sub-unit comprising an aromatics plant, a hydrocracking plant, a continuous catalyst regeneration (CCR) plant, a para-xylene separation plant, or a diesel hydrotreating plant, wherein the heating fluid comprises water or oil; and
  - a second heat exchanger to heat the heating fluid via a second heat source is a second sub-unit of the petrochemical refining system, the second sub-unit comprising a Naphtha hydrotreating plant, an atmospheric distillation plant, a hydrocracking-diesel hydrotreating module, a benzene extraction unit, or a utility system sour water stripping plant;
  - a power generation sub-system that comprises a power generation cycle that comprises (i) an evaporator heat exchanger or a pre-heating heat exchanger, or both, to heat a working fluid with heat from the heating fluid discharged from the first heat exchanger and the second heat exchanger, and (ii) an expander configured to generate electrical power from the heated working fluid; and
  - a control system configured to actuate a set of control valves to selectively thermally couple the heating fluid circuit to the first and second heat sources.

21. A method of recovering heat energy generated by a petrochemical refining system, the method comprising:
- circulating heating fluid through a heating fluid circuit comprising a first heat exchanger and a second heat exchanger;
- heating the heating fluid in the first heat exchanger via a first heat source in a first sub-unit of a petrochemical refining system, the first sub-unit comprising an aromatics plant, a hydrocracking plant, a continuous catalyst regeneration (CCR) plant, a para-xylene separation plant, or a diesel hydrotreating plant;
- heating the heating fluid in the second heat exchanger via a second heat source in a second sub-unit of the petrochemical refining system, the second sub-unit comprising a Naphtha hydrotreating plant, an atmospheric distillation plant, a hydrocracking-diesel hydrotreating plant, a benzene extraction plant, or a utility system sour water stripping plant;
- generating power through a power generation sub-system that comprises a power generation cycle that comprises (i) a working fluid thermally coupled via a heat exchanger to the heating fluid circuit, thereby heating the working fluid in the heat exchanger by the heating fluid, and (ii) an expander that generates electrical power from the heated working fluid; and
- actuating, with a control system, a set of control valves to selectively thermally couple the heating fluid circuit to the first and second heat sources.

22. The method of claim 21, wherein the working fluid is thermally coupled to the heating fluid circuit in the heat exchanger comprising an evaporator heat exchanger of the power generation cycle.

23. The method of claim 21, wherein the working fluid is thermally coupled to the heating fluid circuit in the heat exchanger comprising a pre-heating heat exchanger of the power generation cycle.

24. The method of claim 21, wherein the heat exchanger comprises two heat exchangers comprising a pre-heating heat exchanger and an evaporator exchanger, wherein the heating fluid circuit comprises two heating fluid circuits, and a first of the two heating fluid circuits is thermally coupled to the working fluid in the evaporator heat exchanger, and a second of the two heating fluid circuits is thermally coupled to the working fluid in the pre-heating heat exchanger.

25. The method of claim 21, comprising:

flowing the heating fluid from a heating fluid tank to the heating fluid circuit; and flowing the heating fluid from the heat exchanger of the one power generation cycle to the heating fluid tank.

26. The method of claim 21, wherein the heating fluid comprises water or oil.

27. The method of claim 21, comprising circulating a cooling fluid through a condenser of the power generation cycle to cool the working fluid.

28. The method of claim 25, wherein flowing the heating fluid from the heat exchanger to the heating fluid tank comprises cooling the heating fluid in an air cooler.

* * * * *